Dec. 24, 1968    D. W. ANDERSON ETAL    3,418,638
INSTRUCTION PROCESSING UNIT FOR PROGRAM BRANCHES
Filed Sept. 21, 1966    116 Sheets-Sheet 17

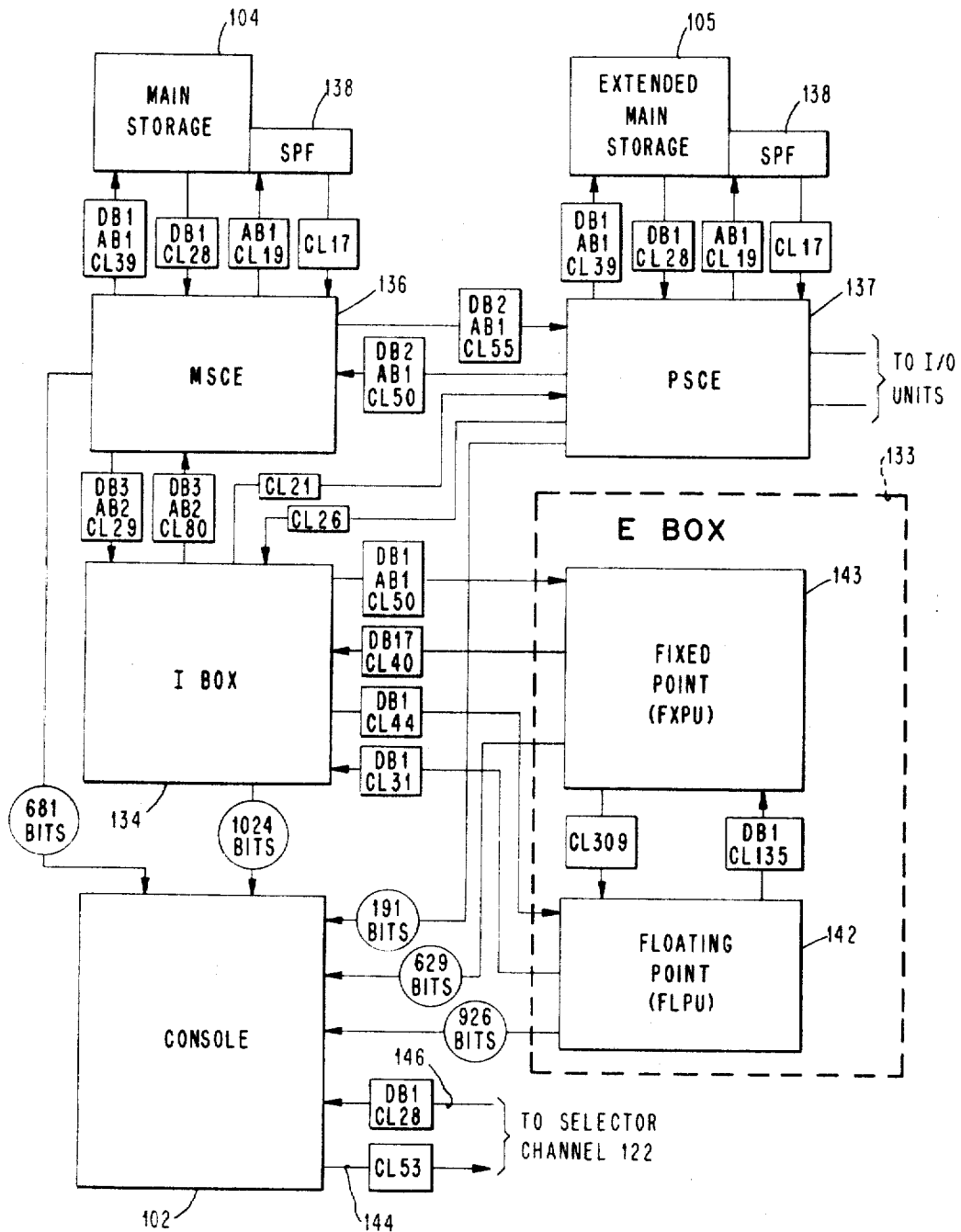

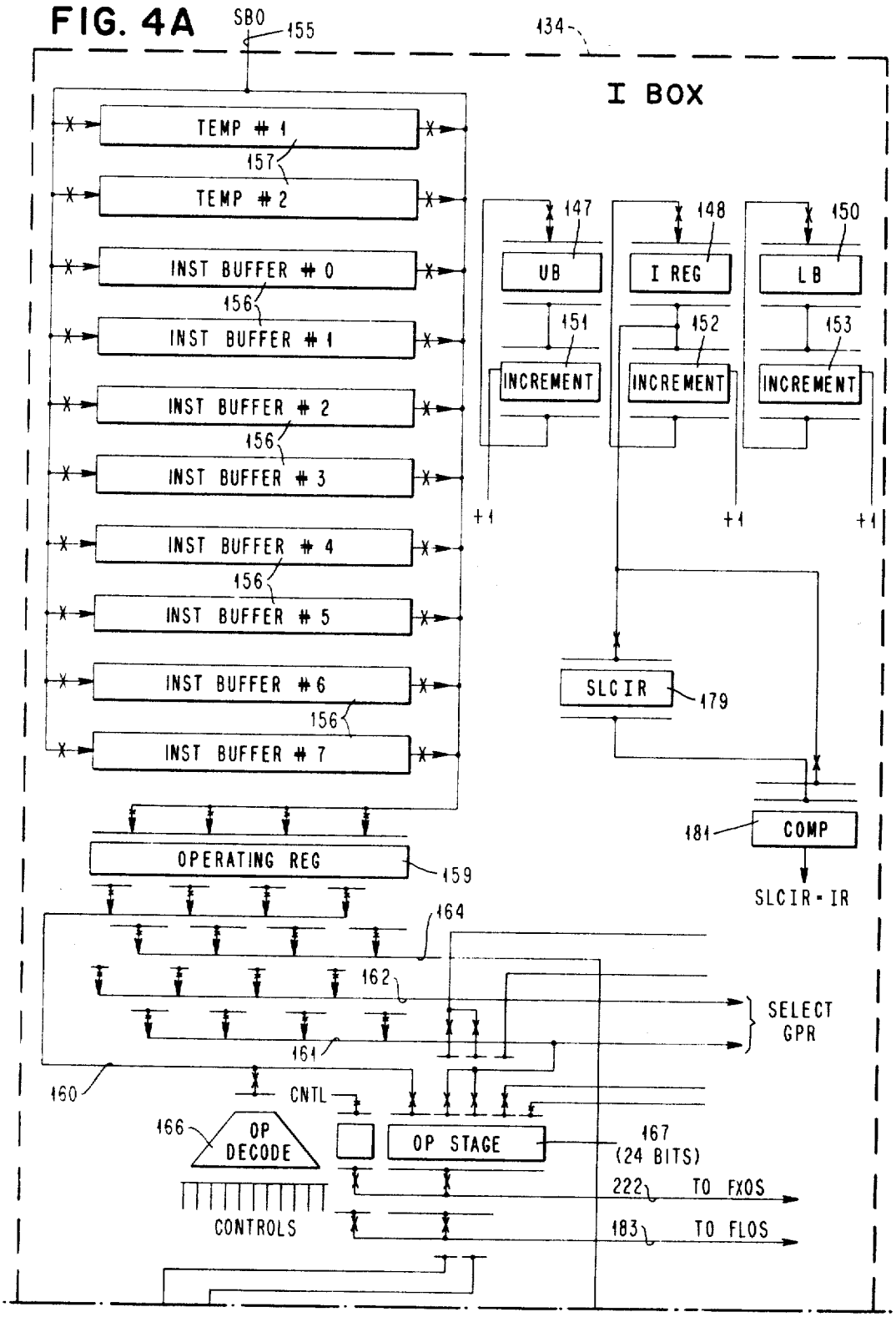

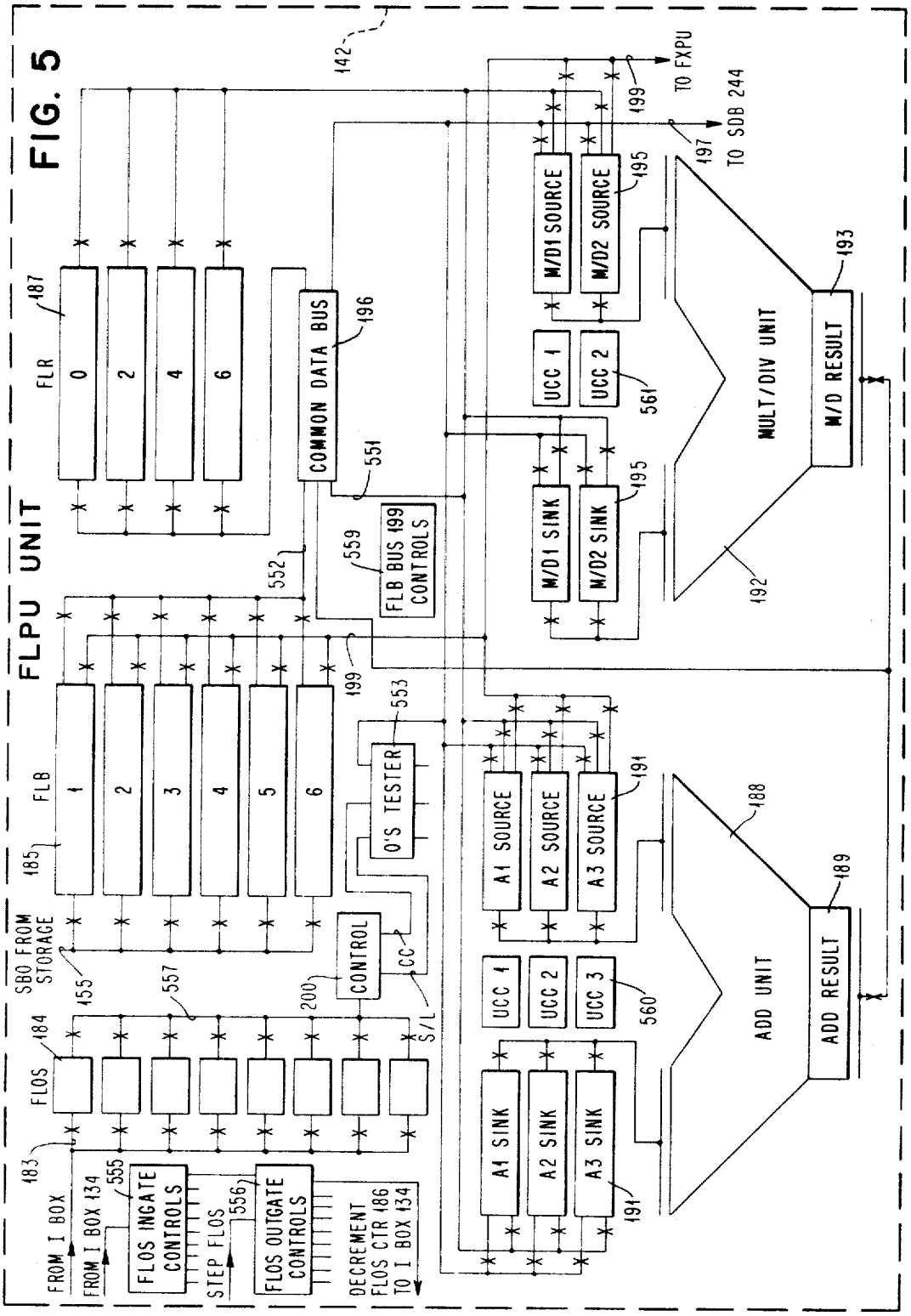

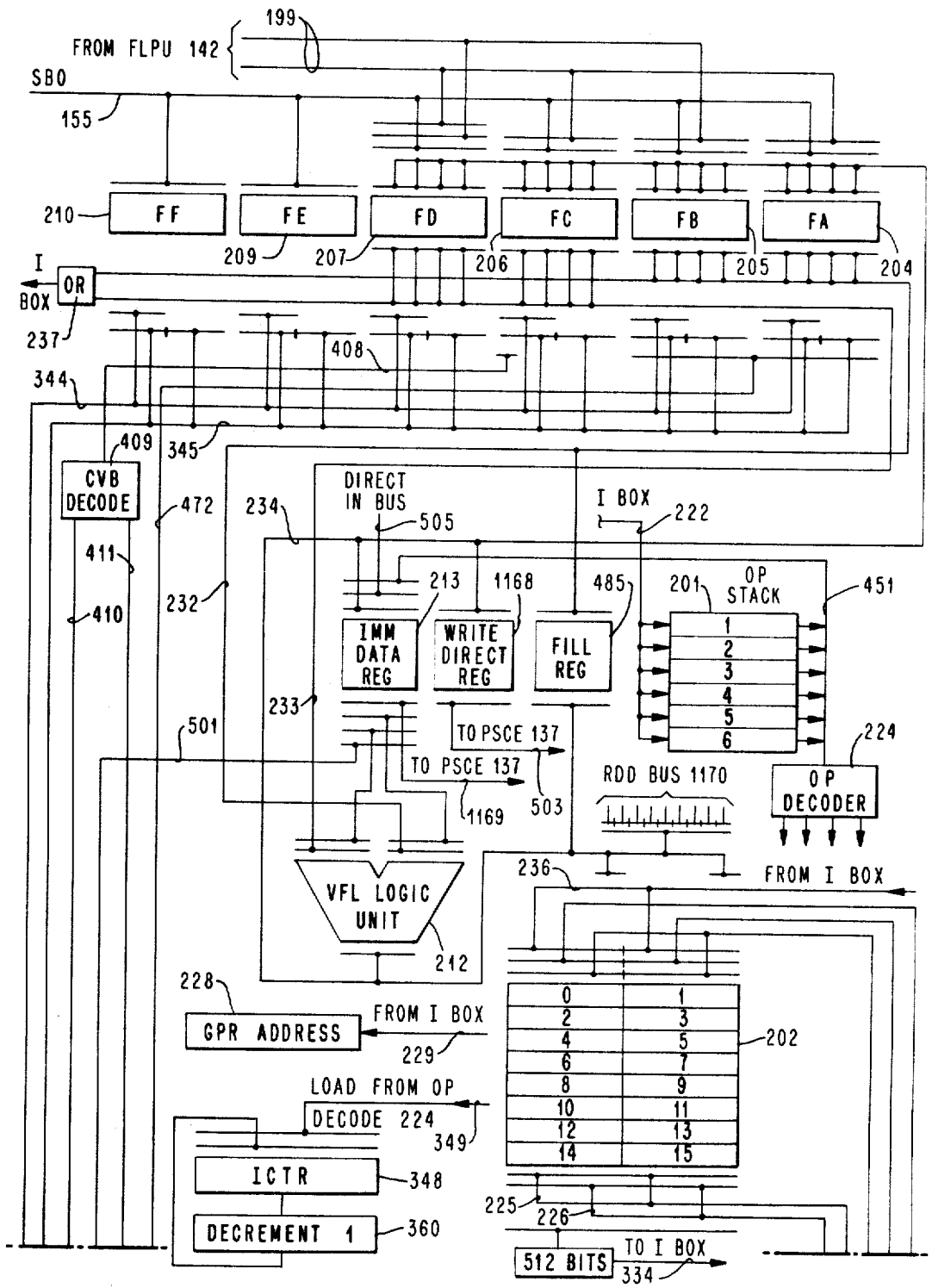

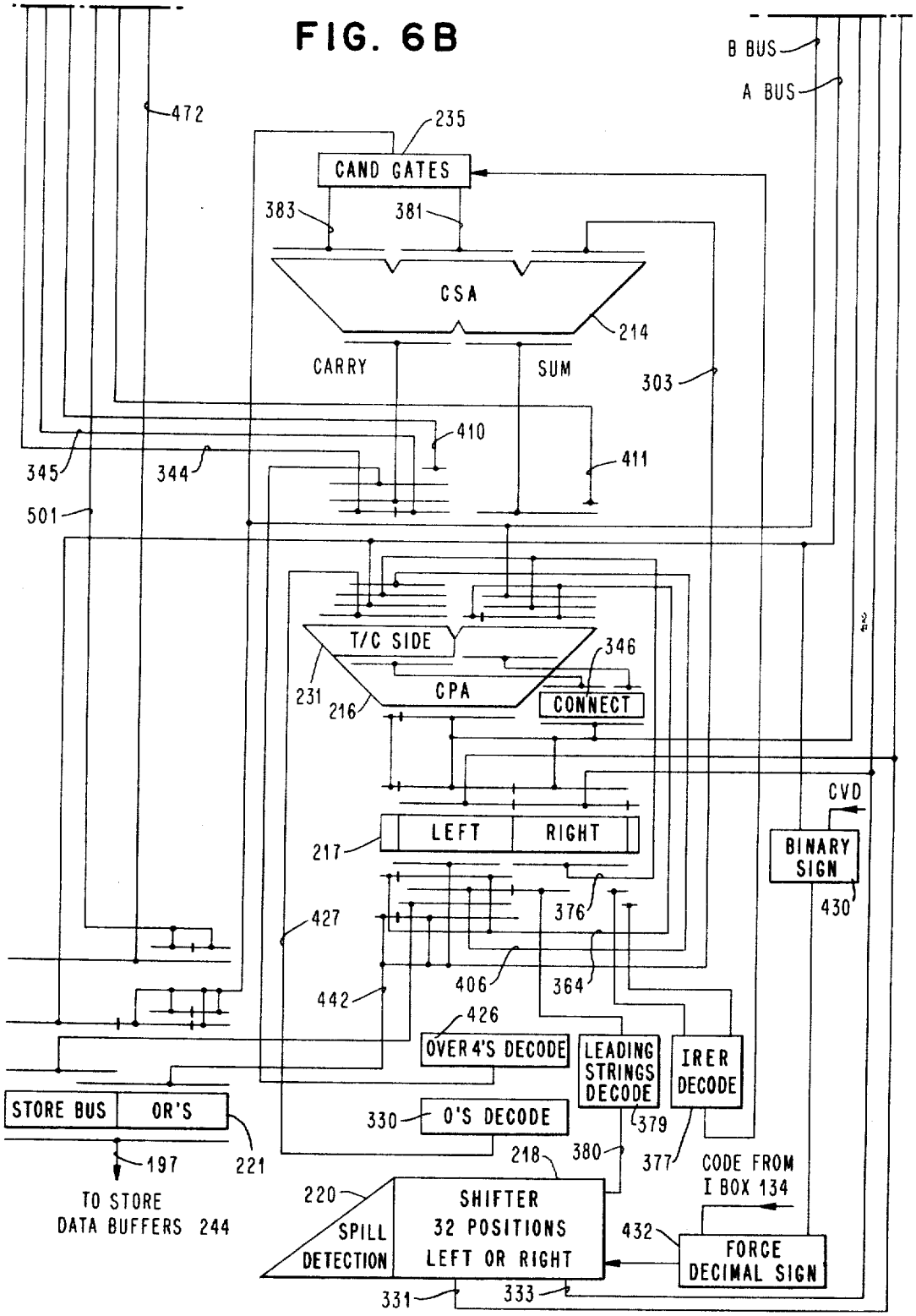

FIG. 17    DIVIDE 4

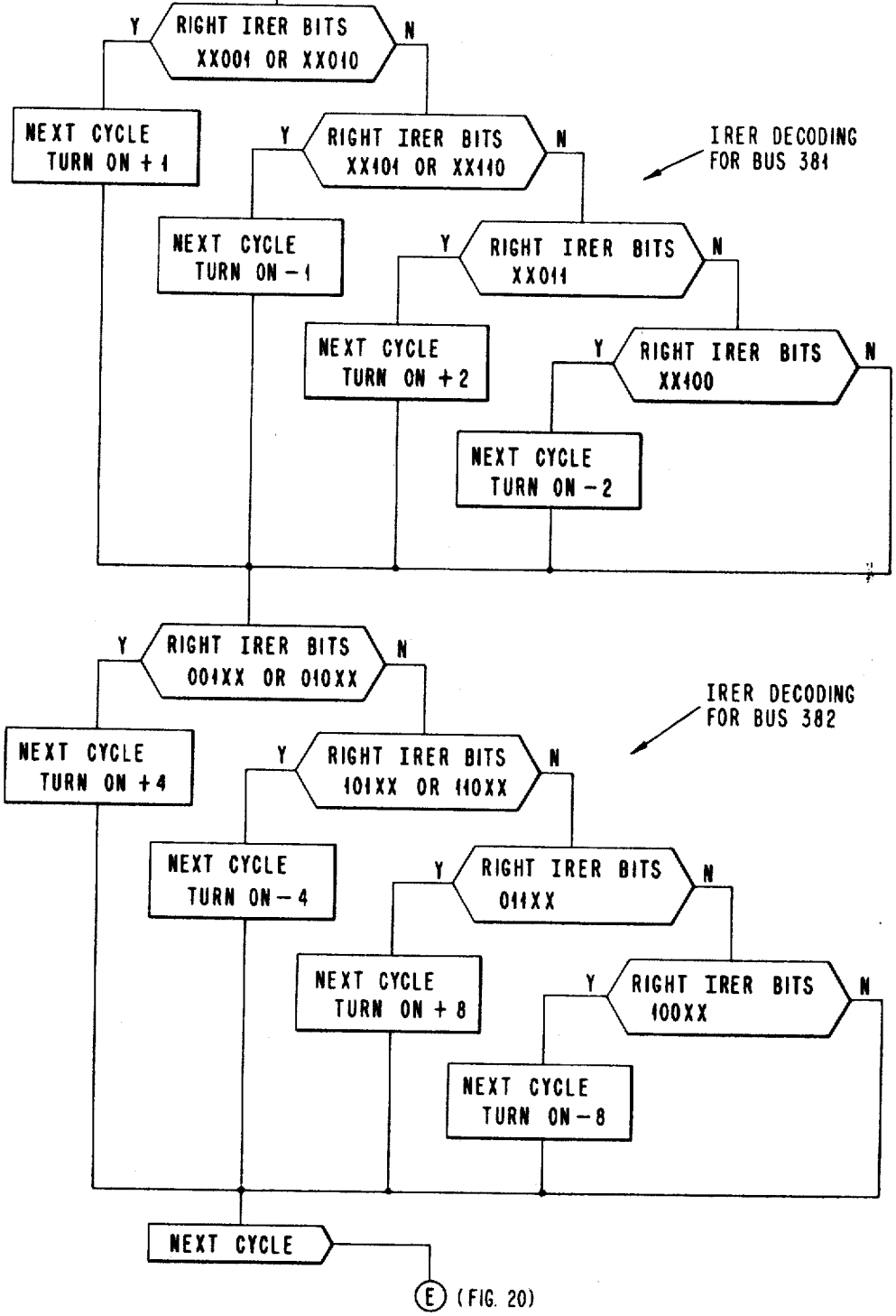

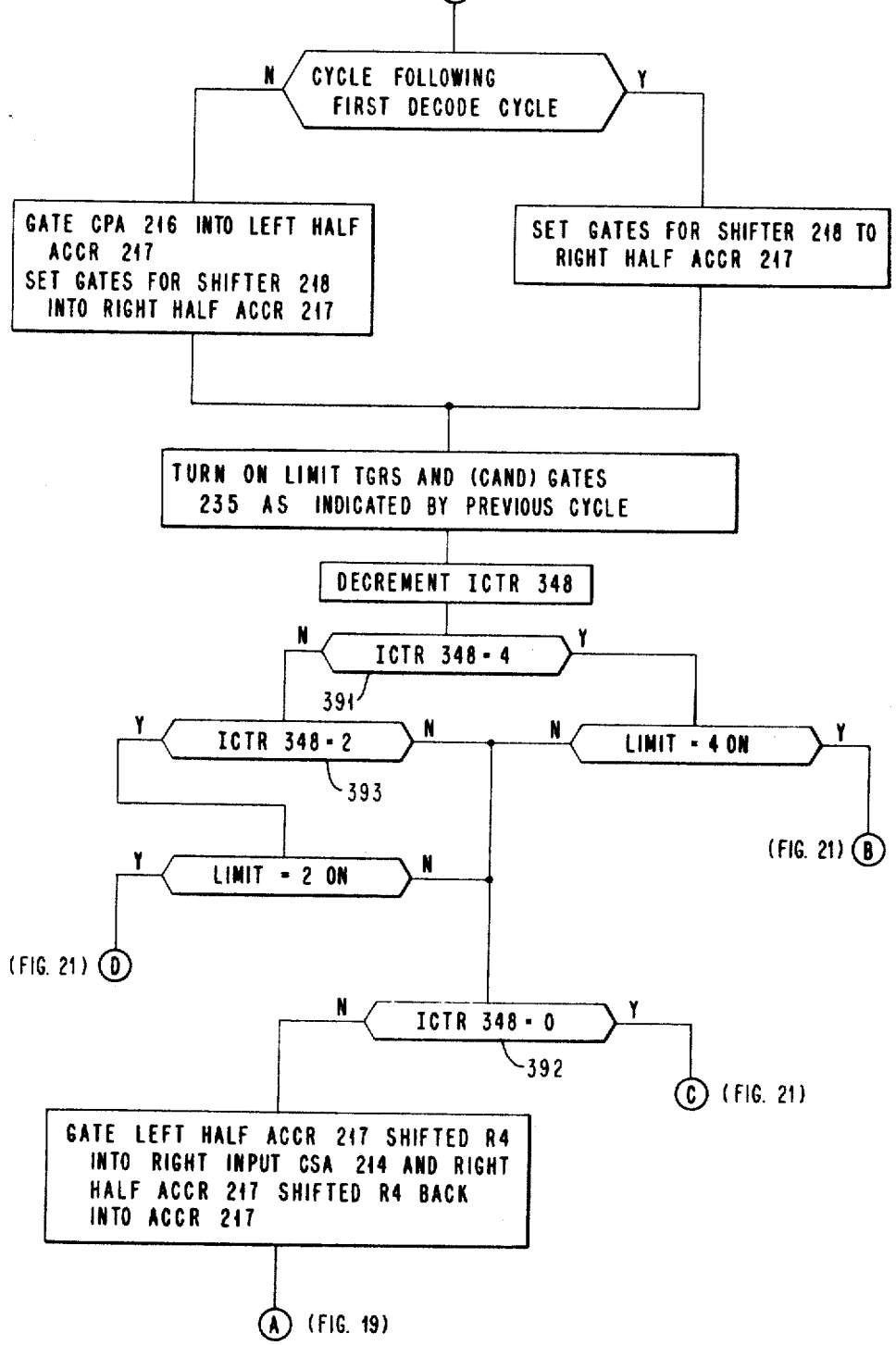

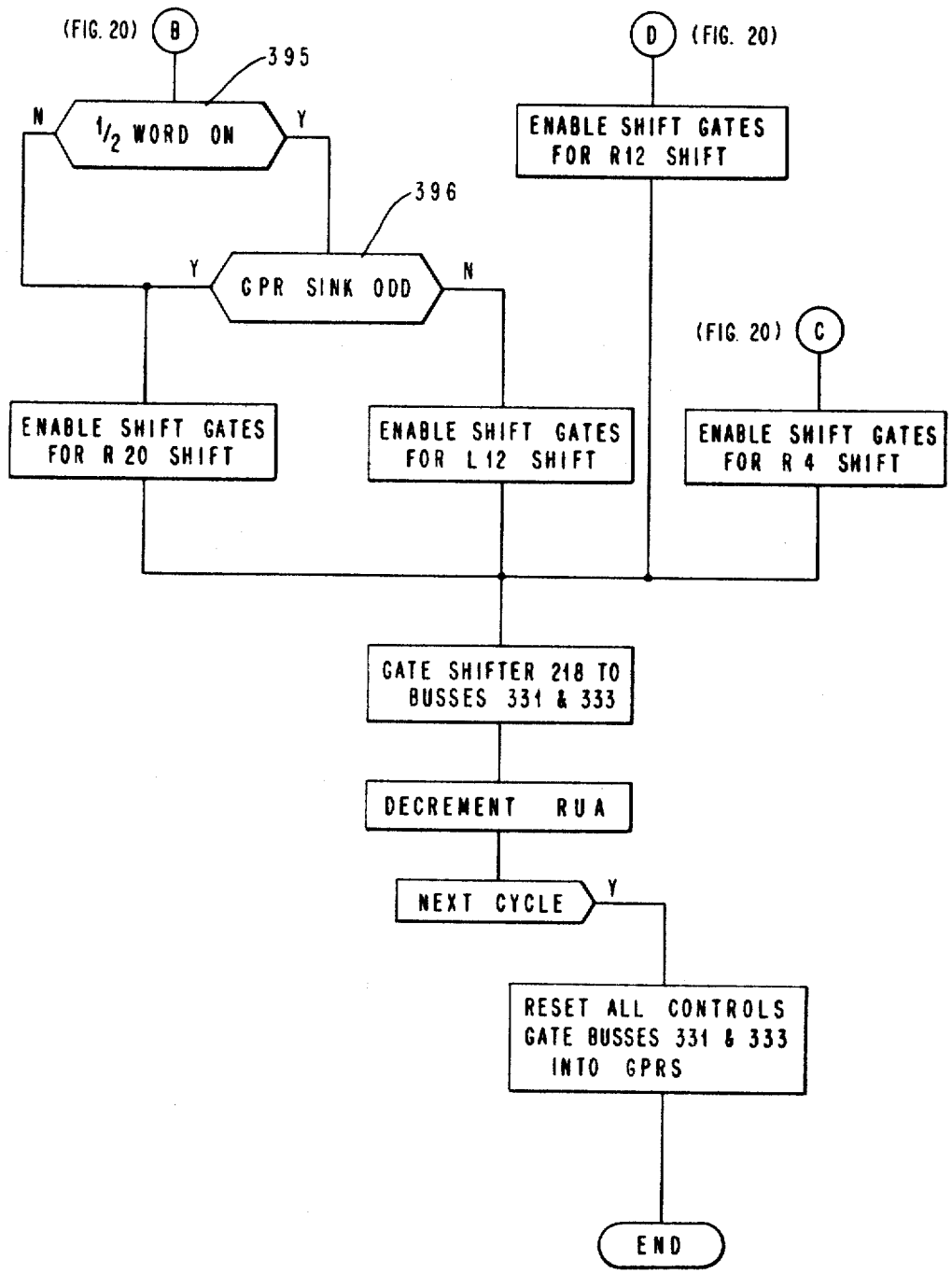

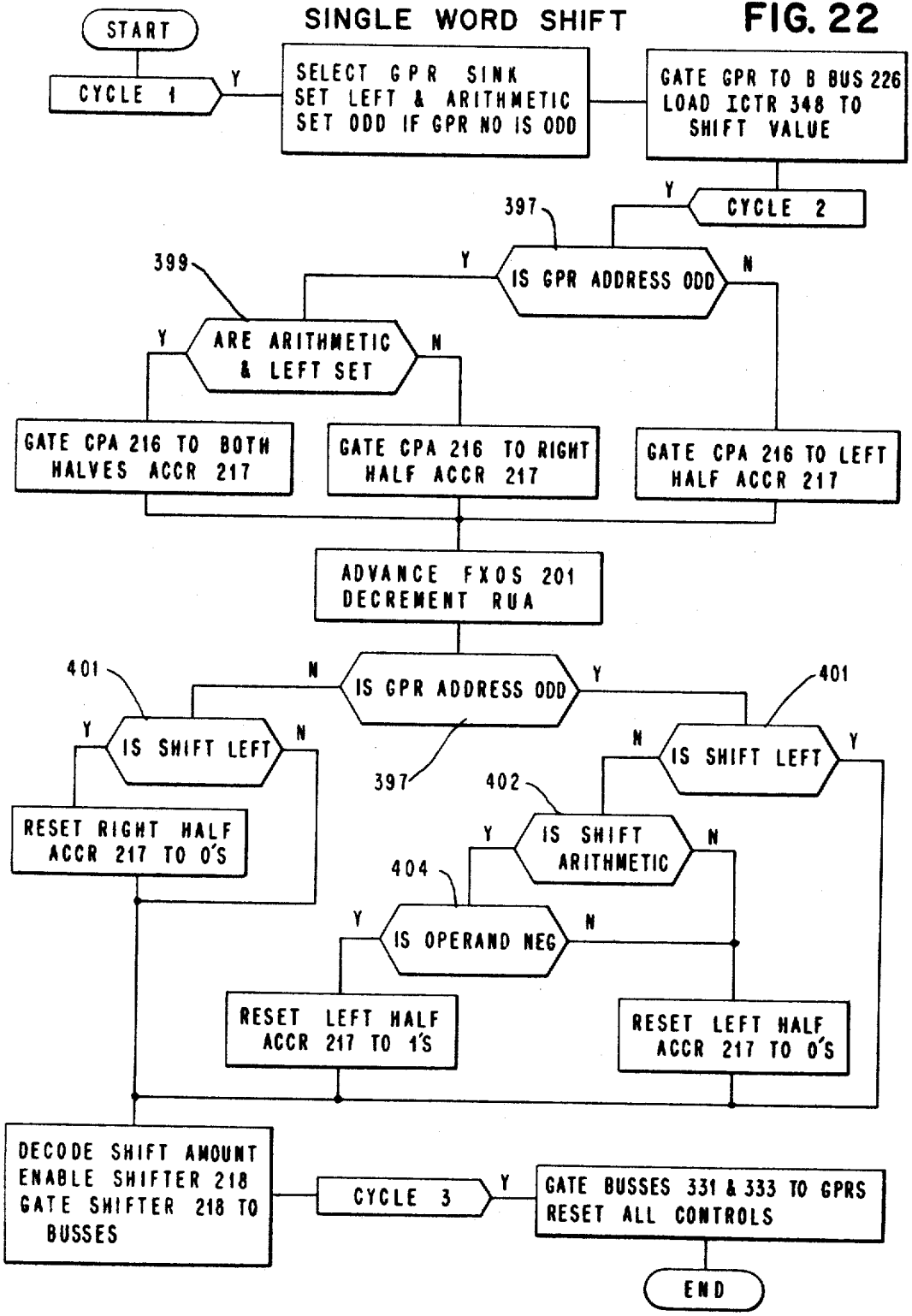
FIG. 22 SINGLE WORD SHIFT

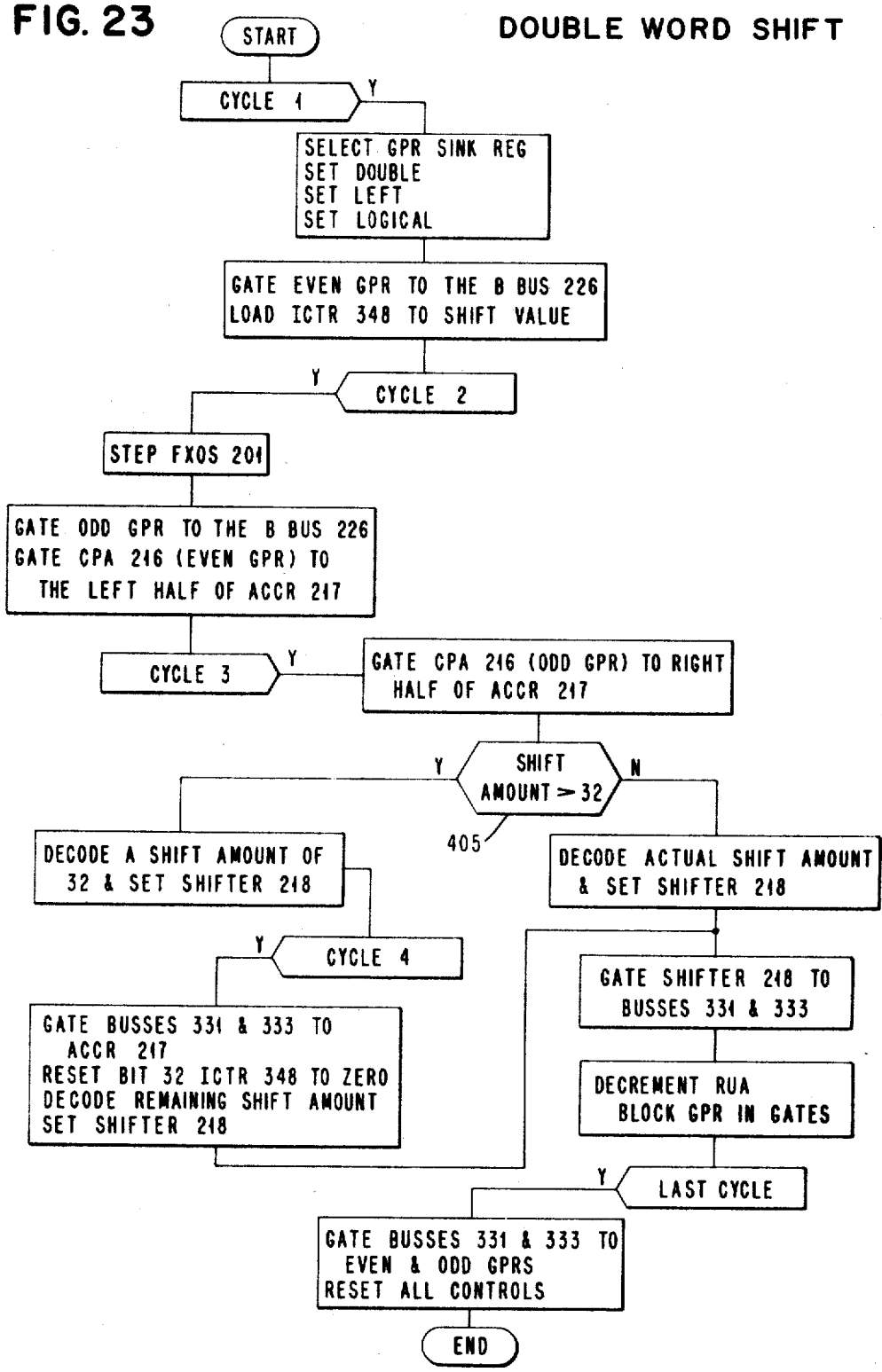
FIG. 23 DOUBLE WORD SHIFT

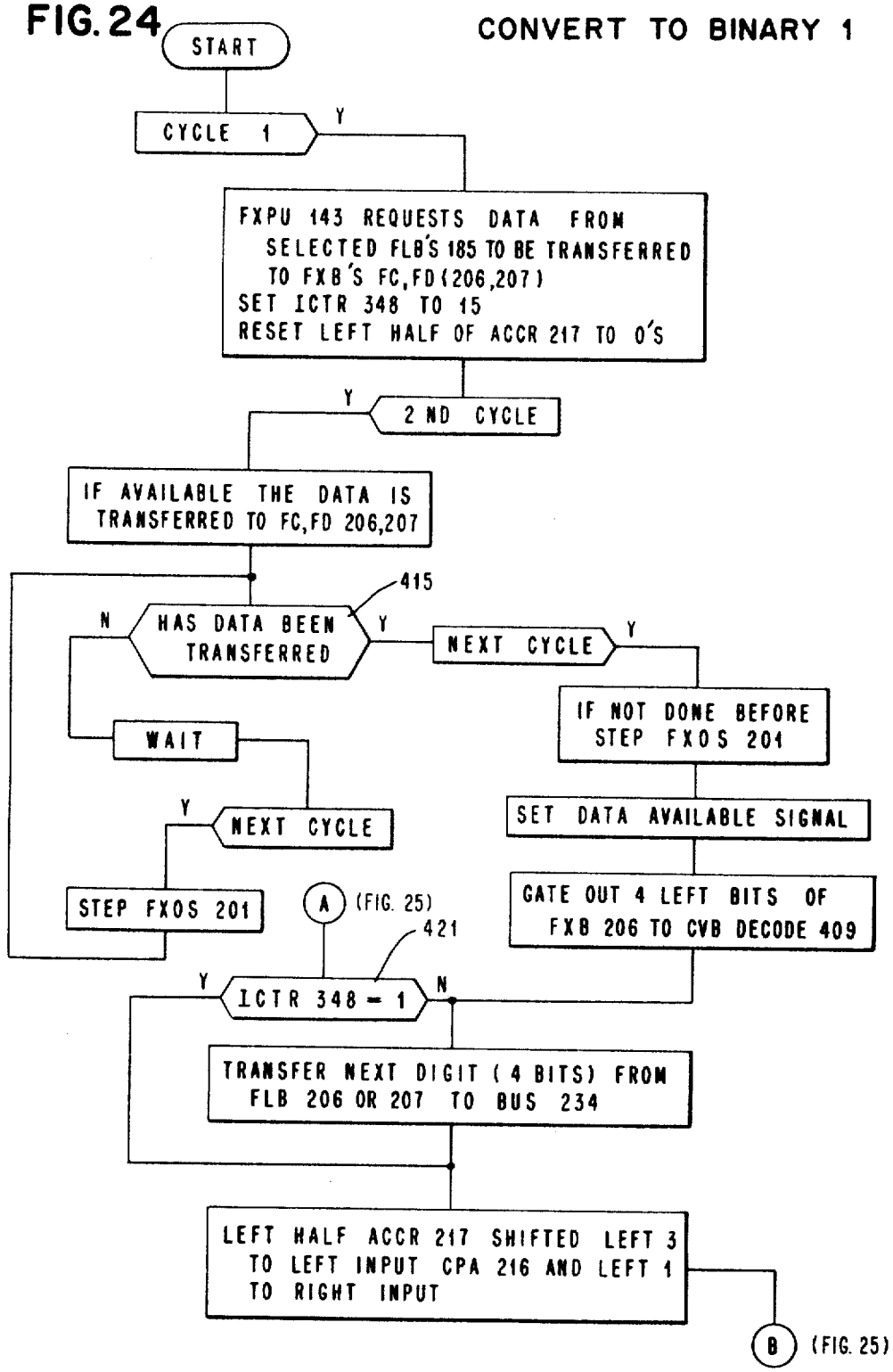

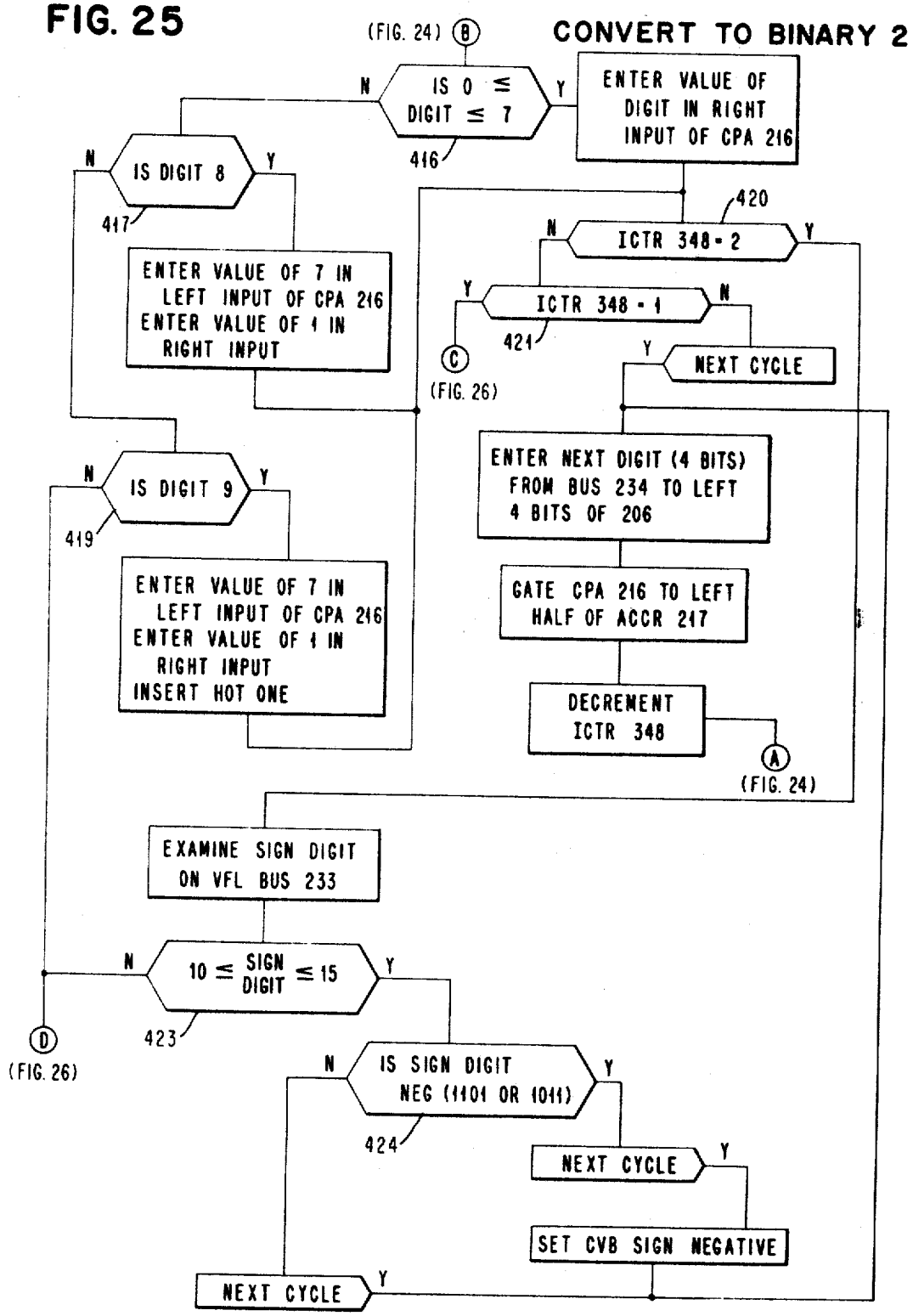

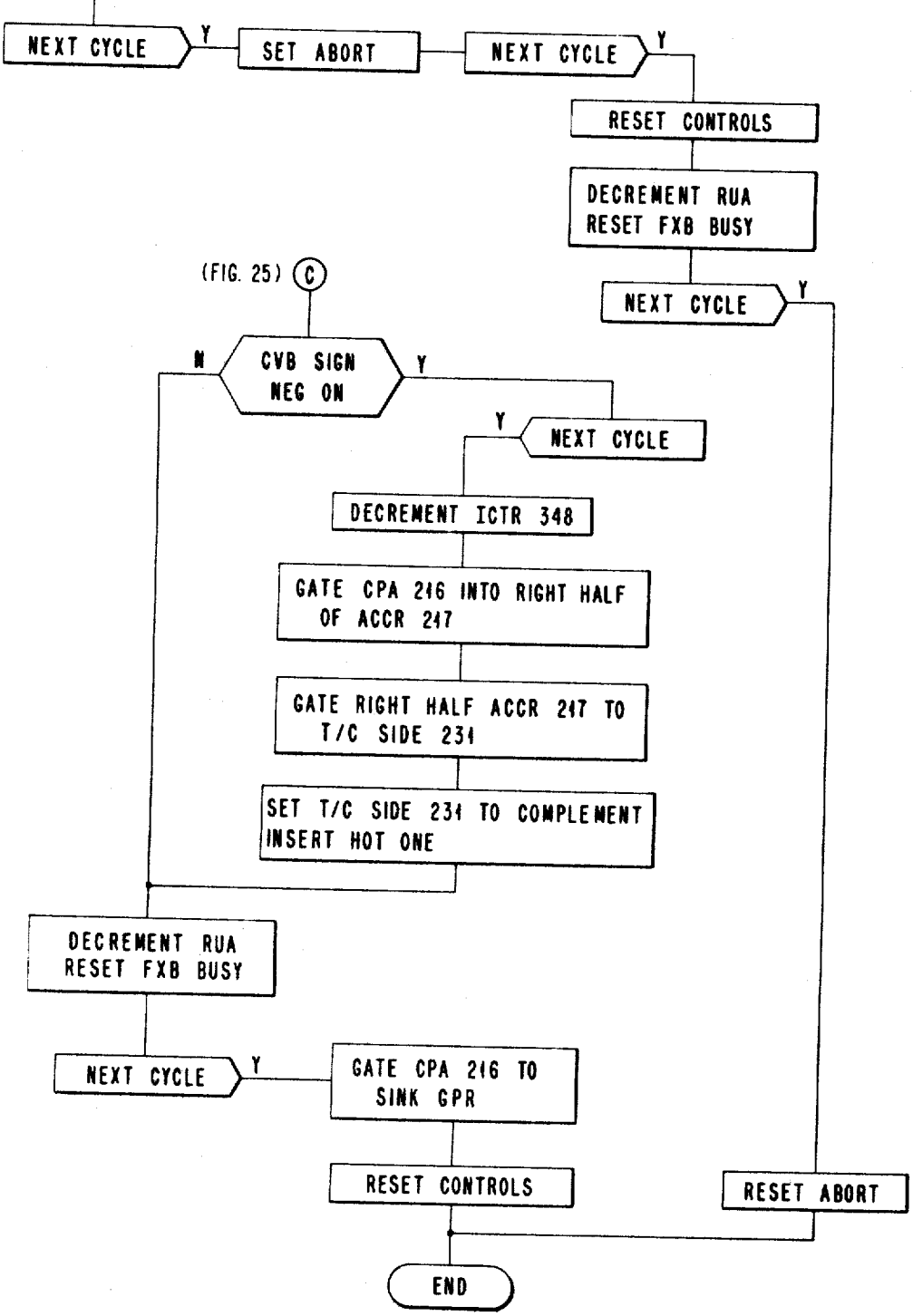

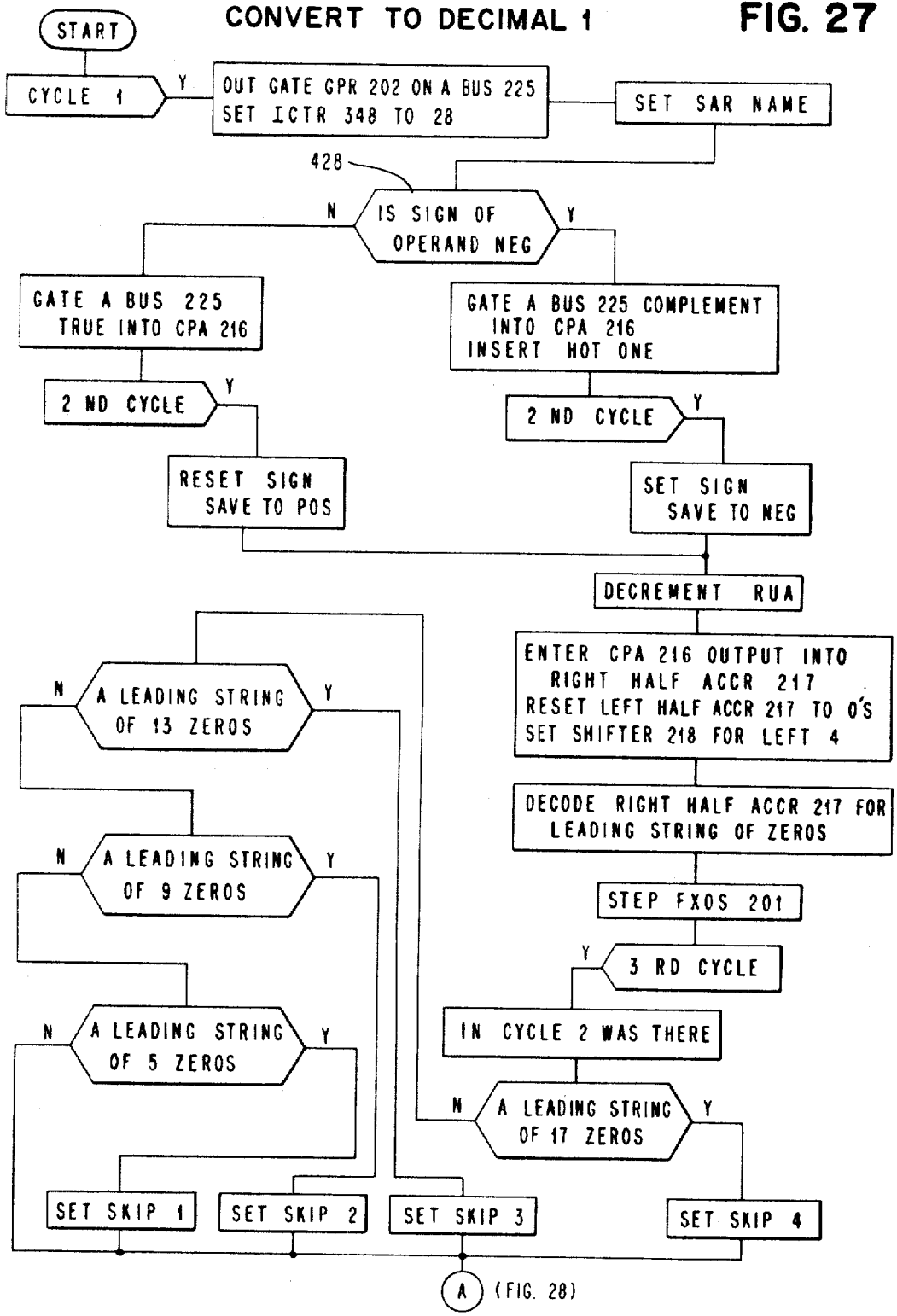
FIG. 27 — CONVERT TO DECIMAL 1

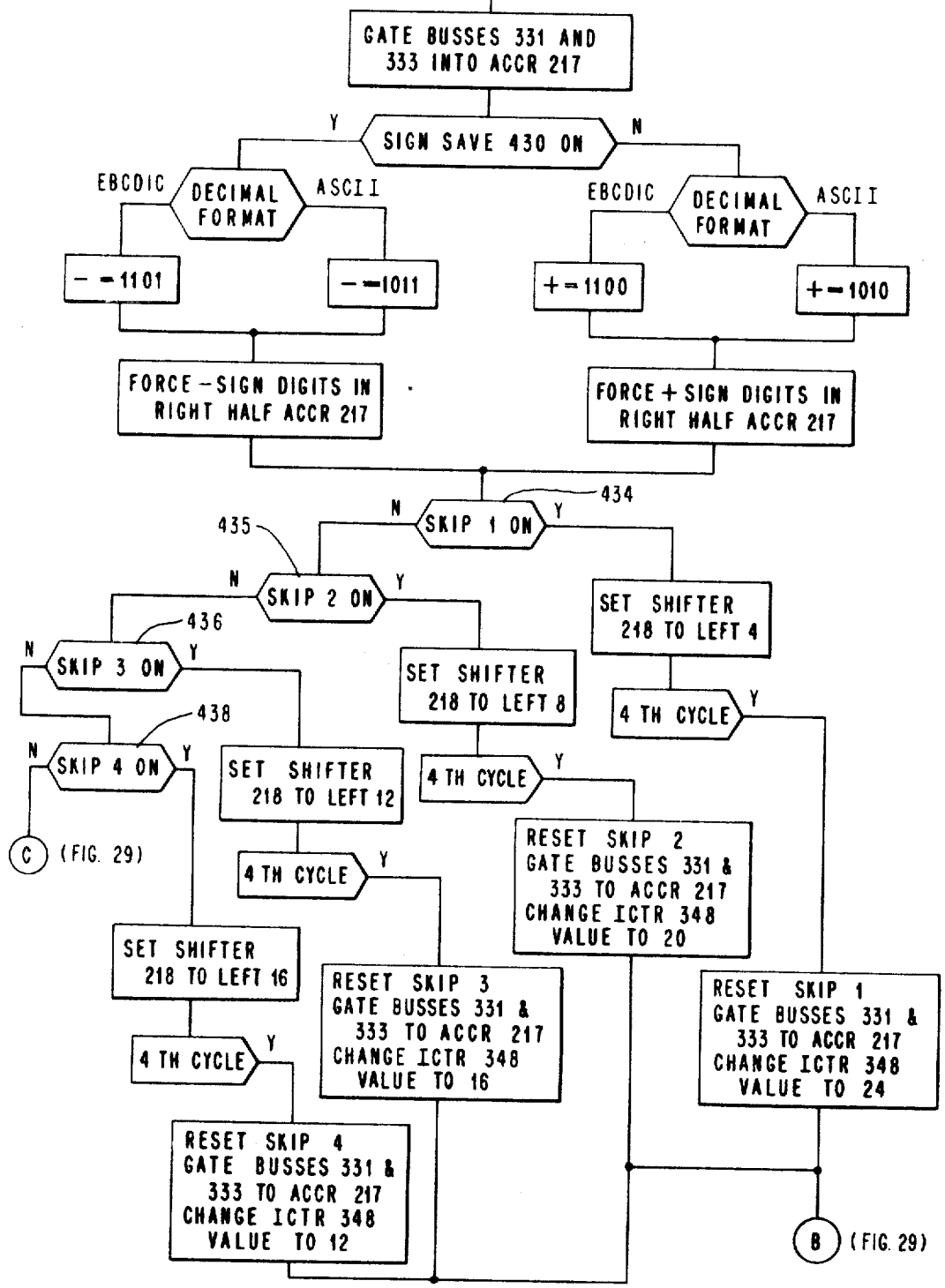

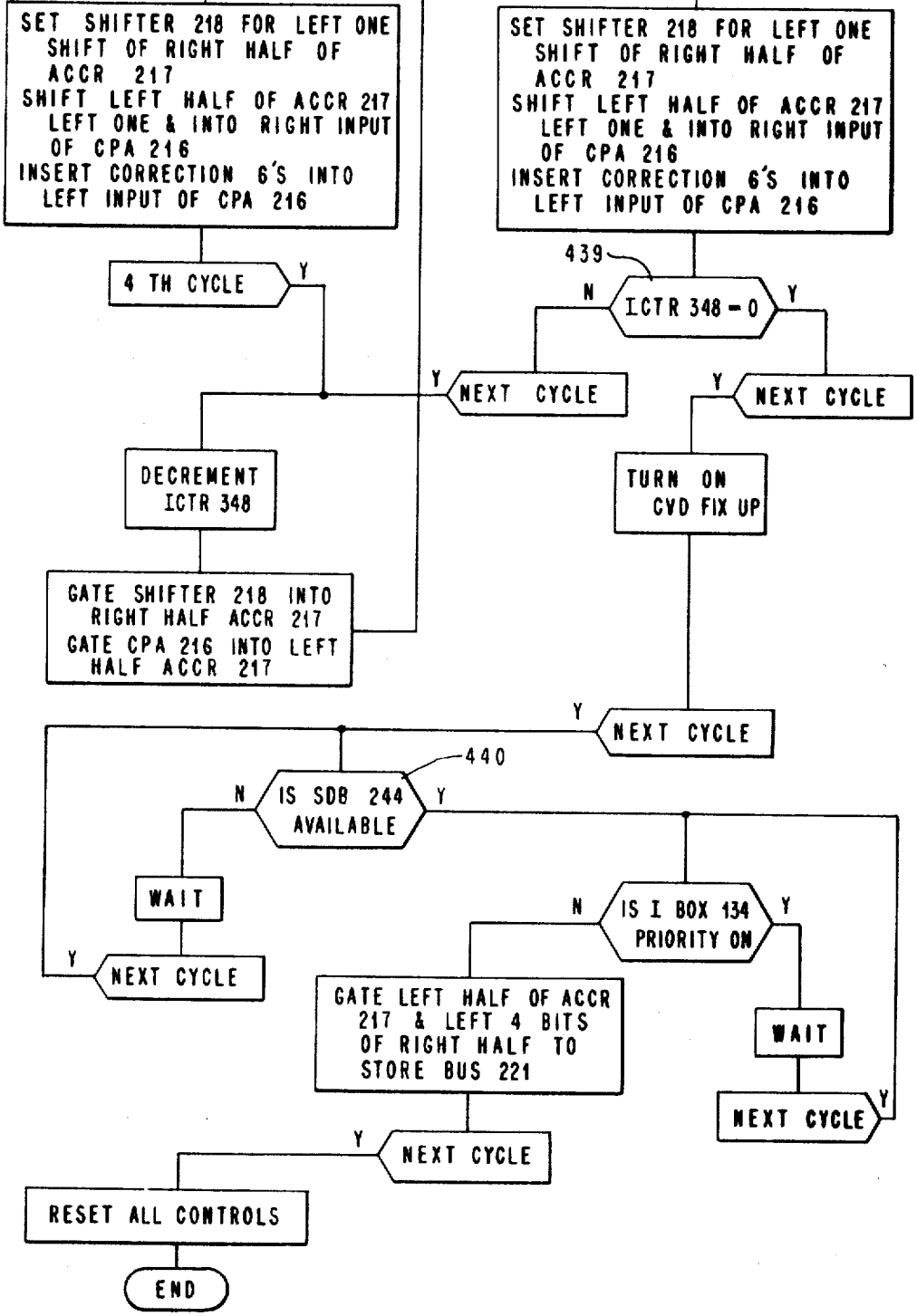

Dec. 24, 1968     D. W. ANDERSON ET AL     3,418,638
INSTRUCTION PROCESSING UNIT FOR PROGRAM BRANCHES
Filed Sept. 21, 1966     116 Sheets-Sheet 33

FIG. 32     CLC

FIG. 35     TR, TRT 2

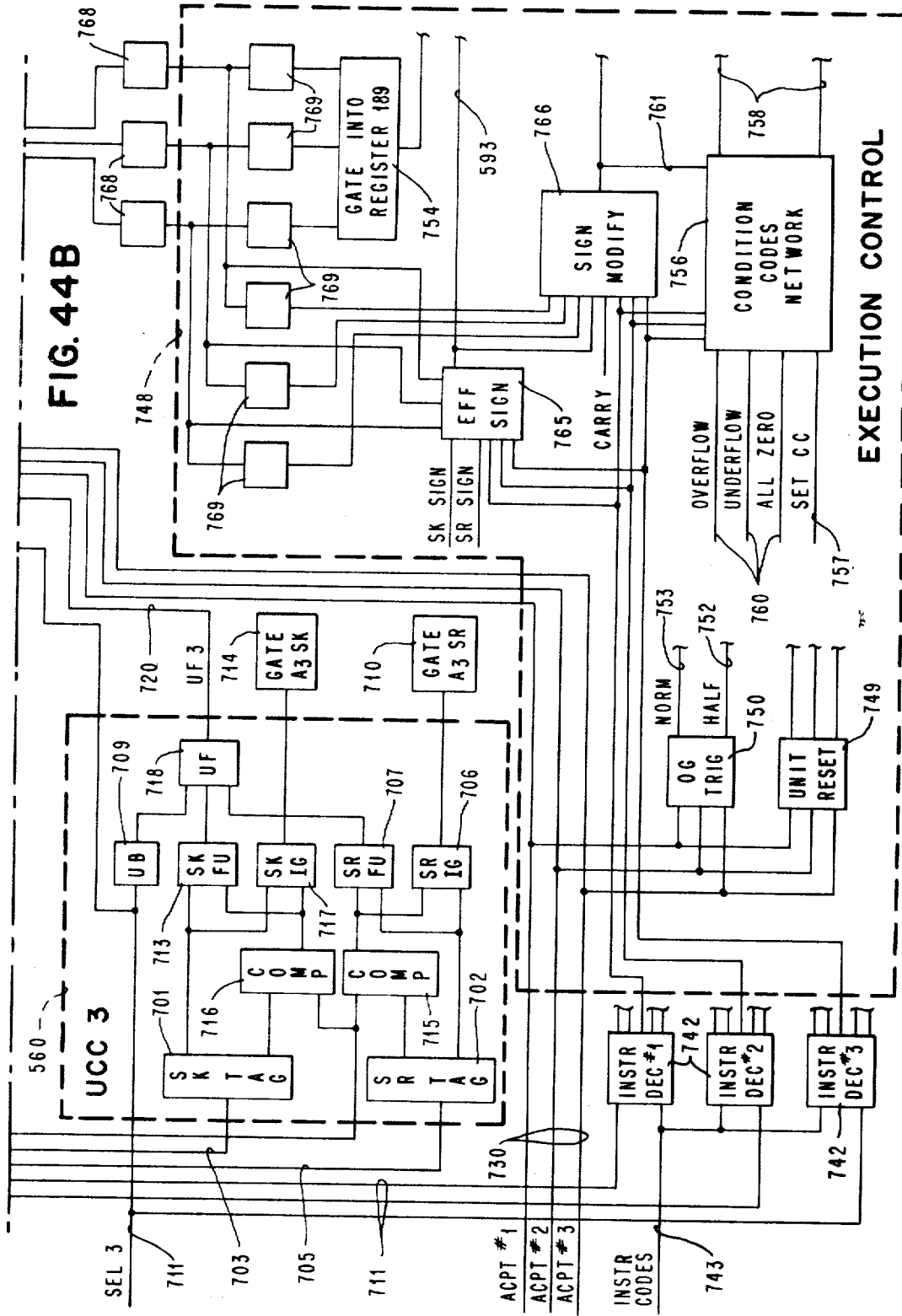

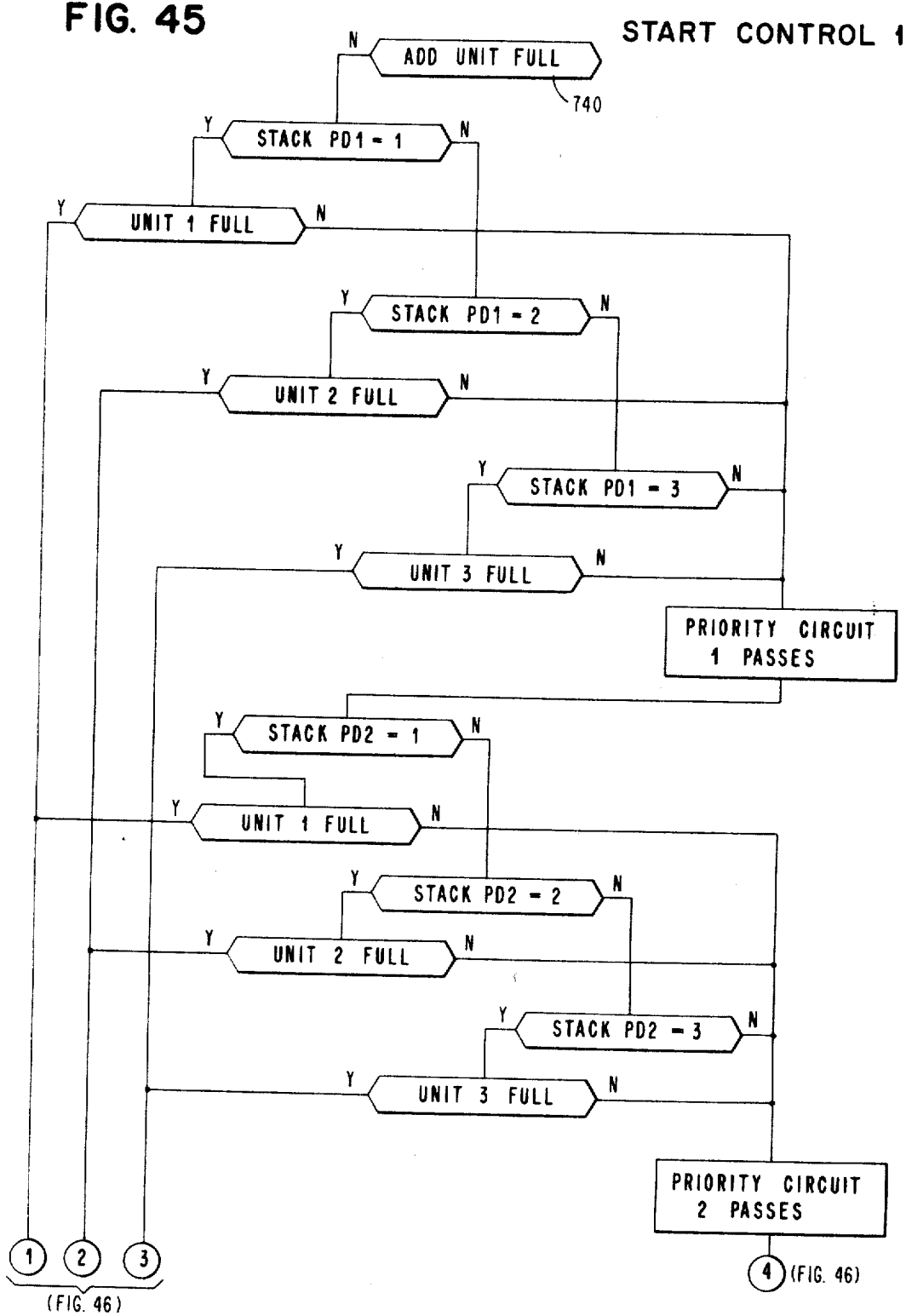

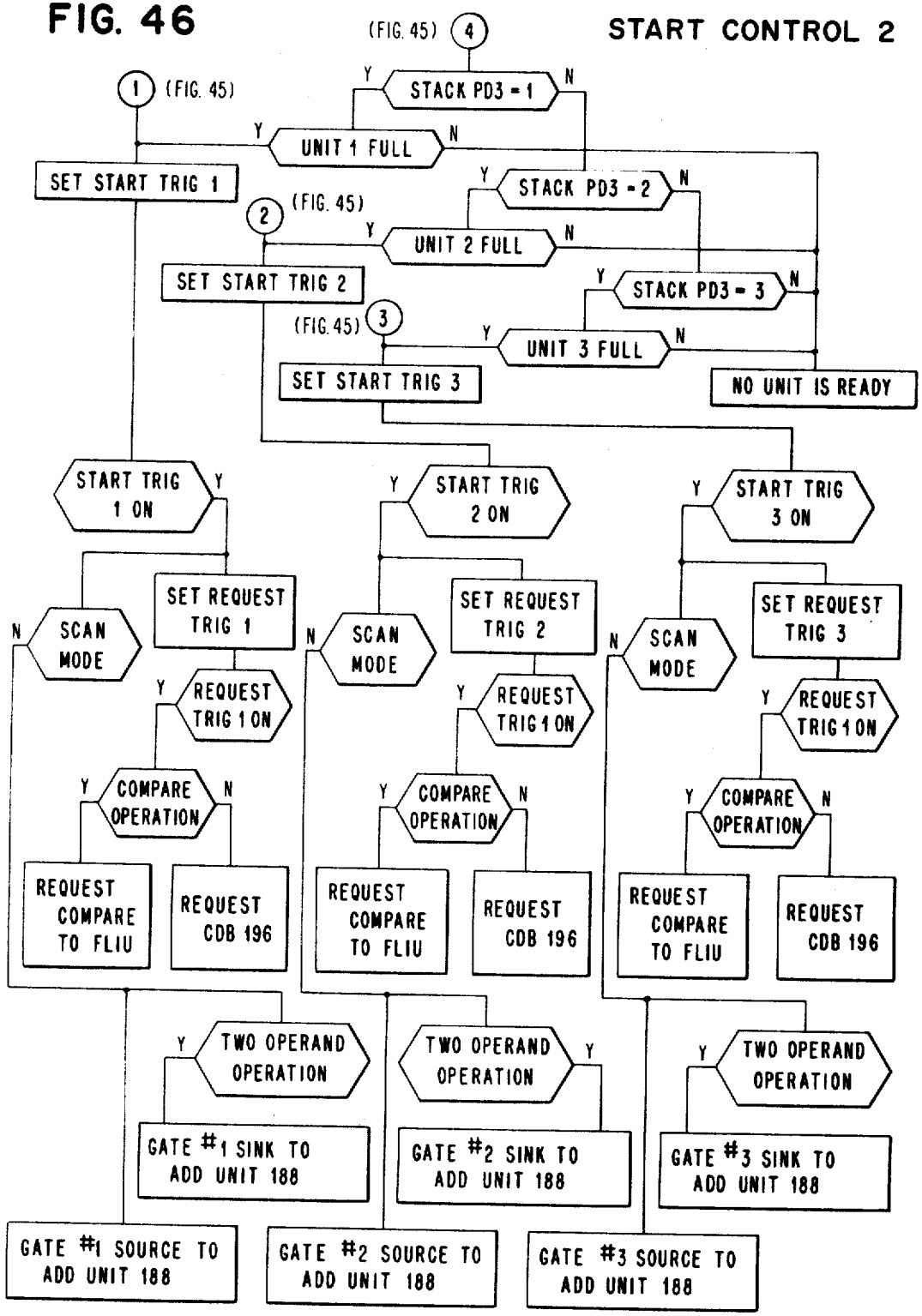
FIG. 46     START CONTROL 2

Dec. 24, 1968   D. W. ANDERSON ETAL   3,418,638
INSTRUCTION PROCESSING UNIT FOR PROGRAM BRANCHES
Filed Sept. 21, 1966
FIG. 47   INSTRUCTION DECODE
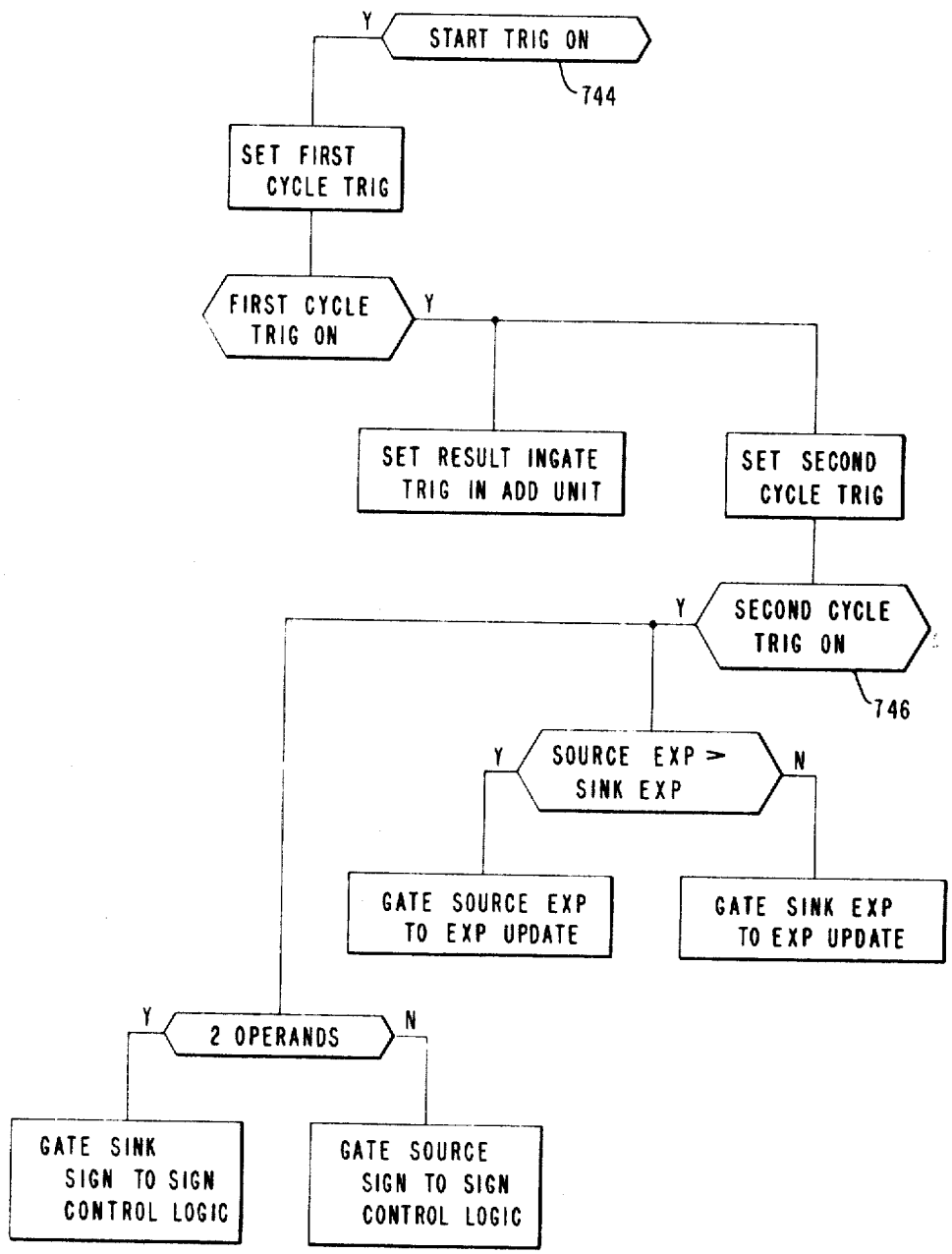

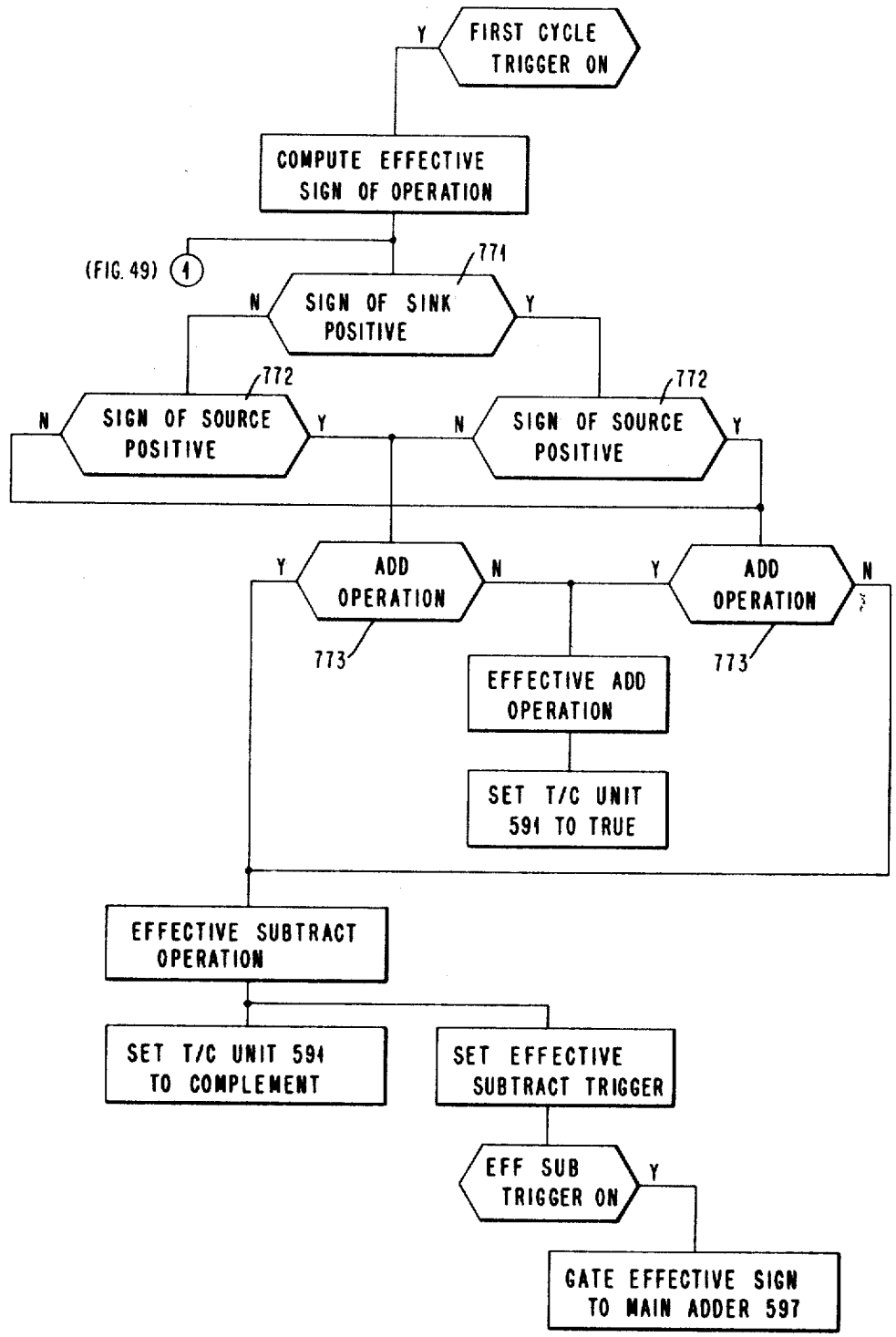

Dec. 24, 1968  D. W. ANDERSON ET AL  3,418,638
INSTRUCTION PROCESSING UNIT FOR PROGRAM BRANCHES
Filed Sept. 21, 1966
FIG. 49                        SIGN CONTROL 2
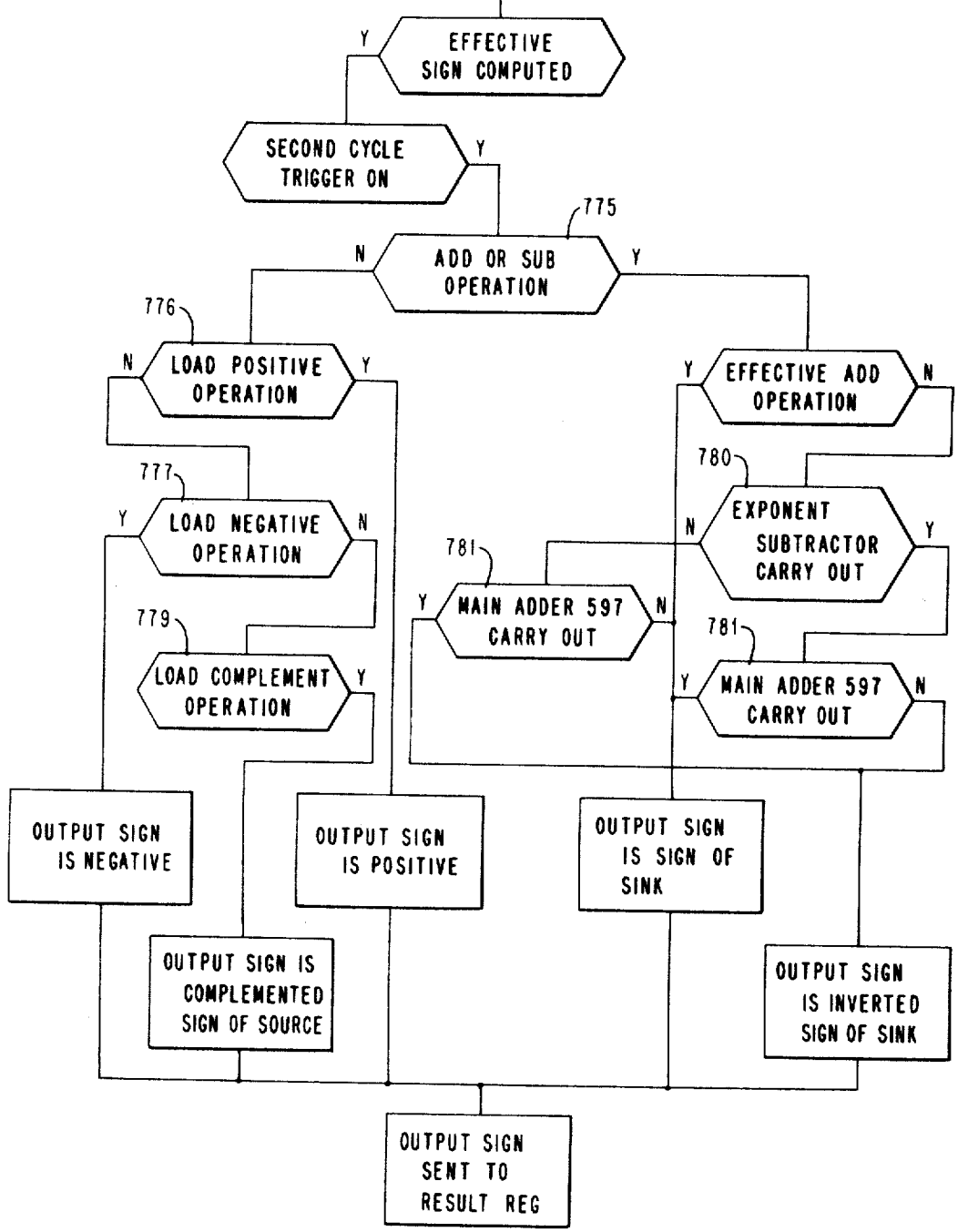

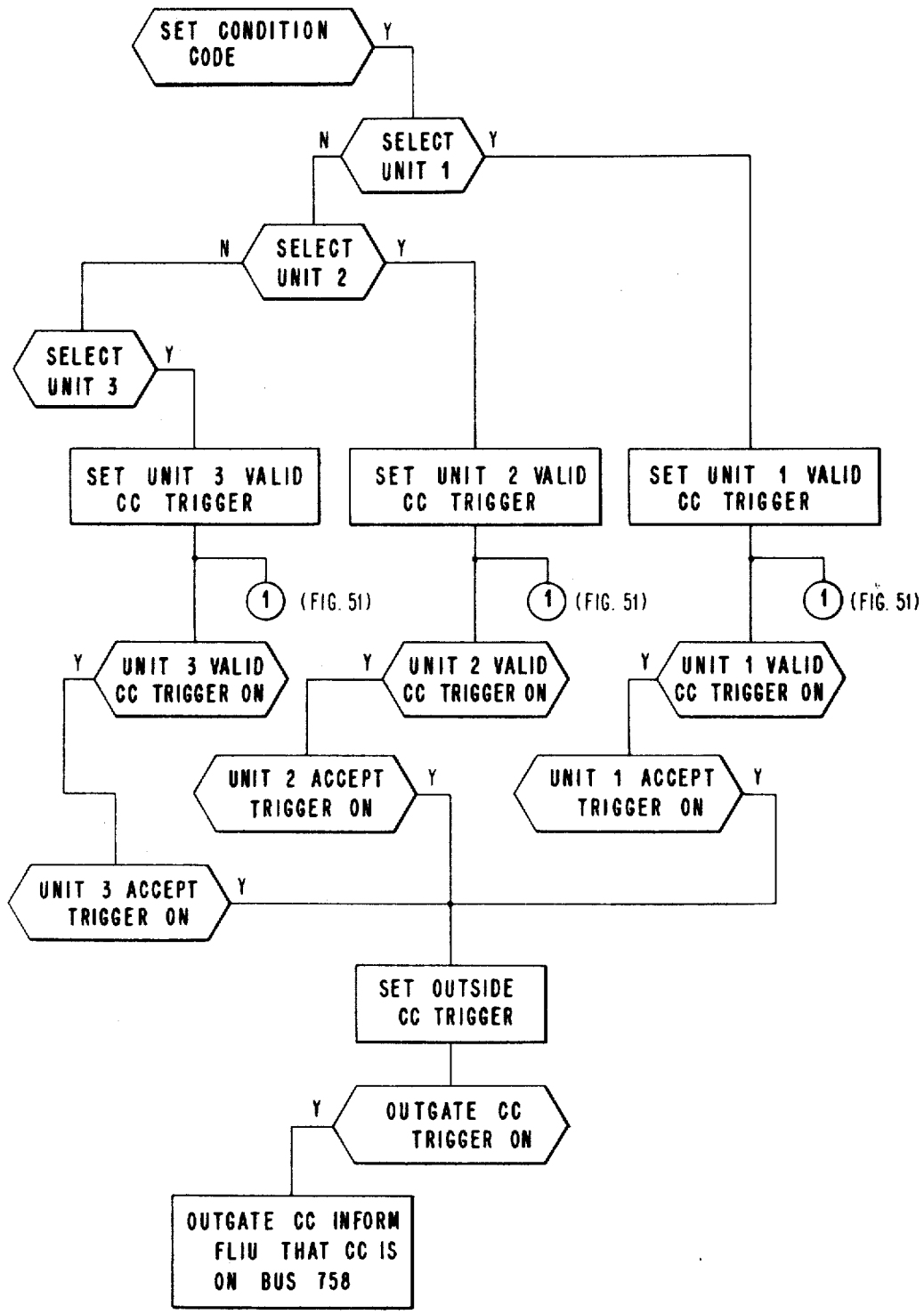

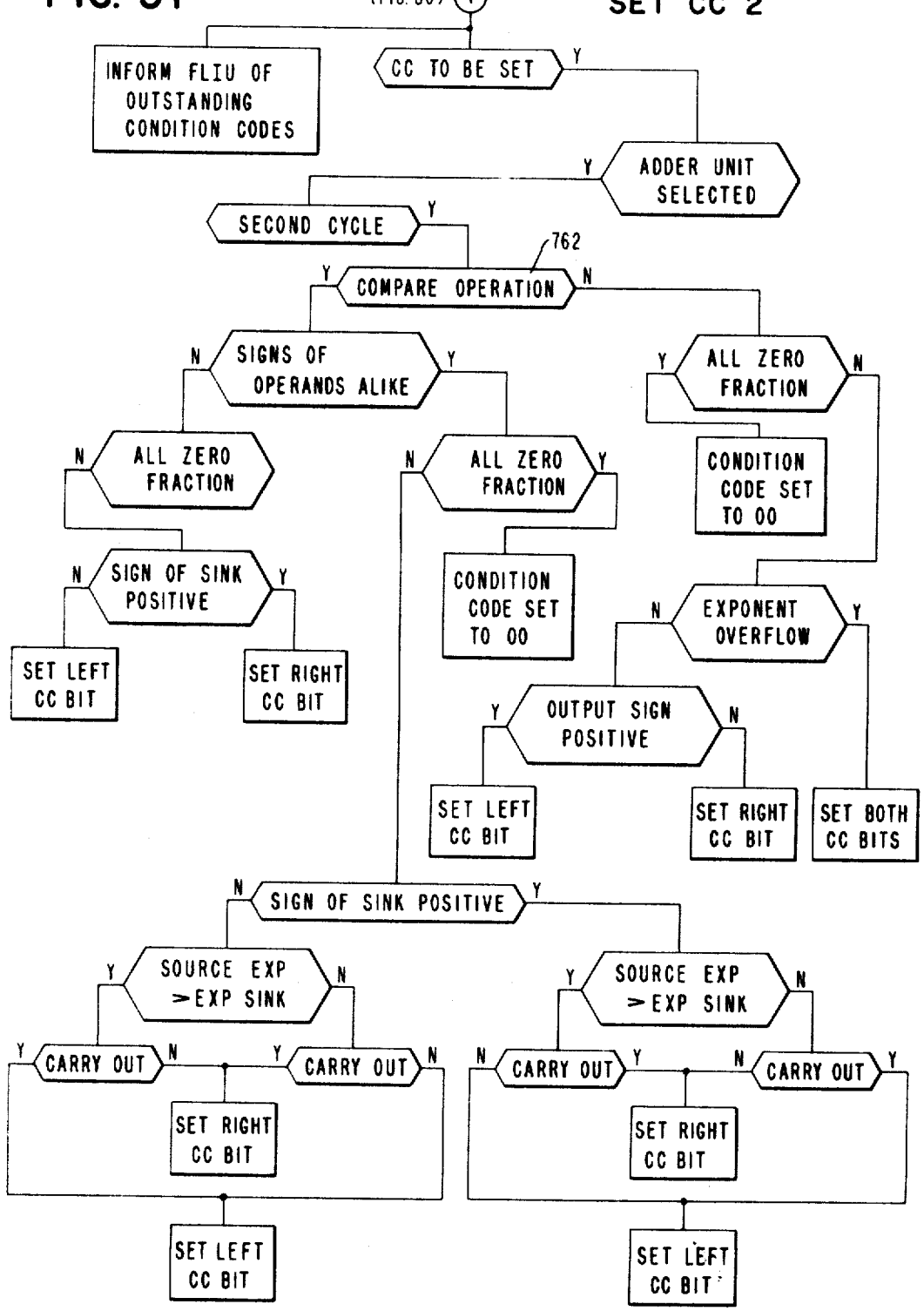

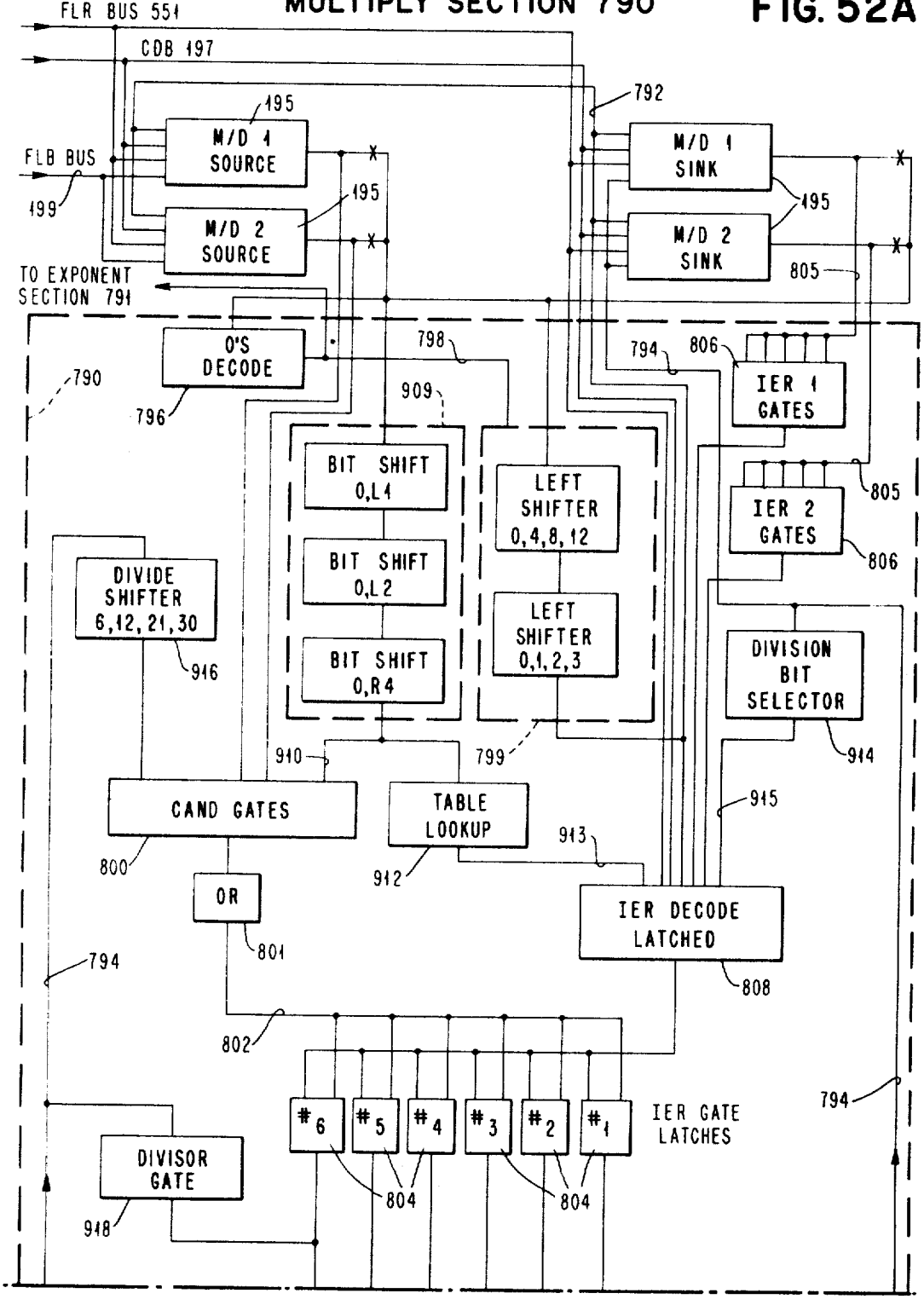

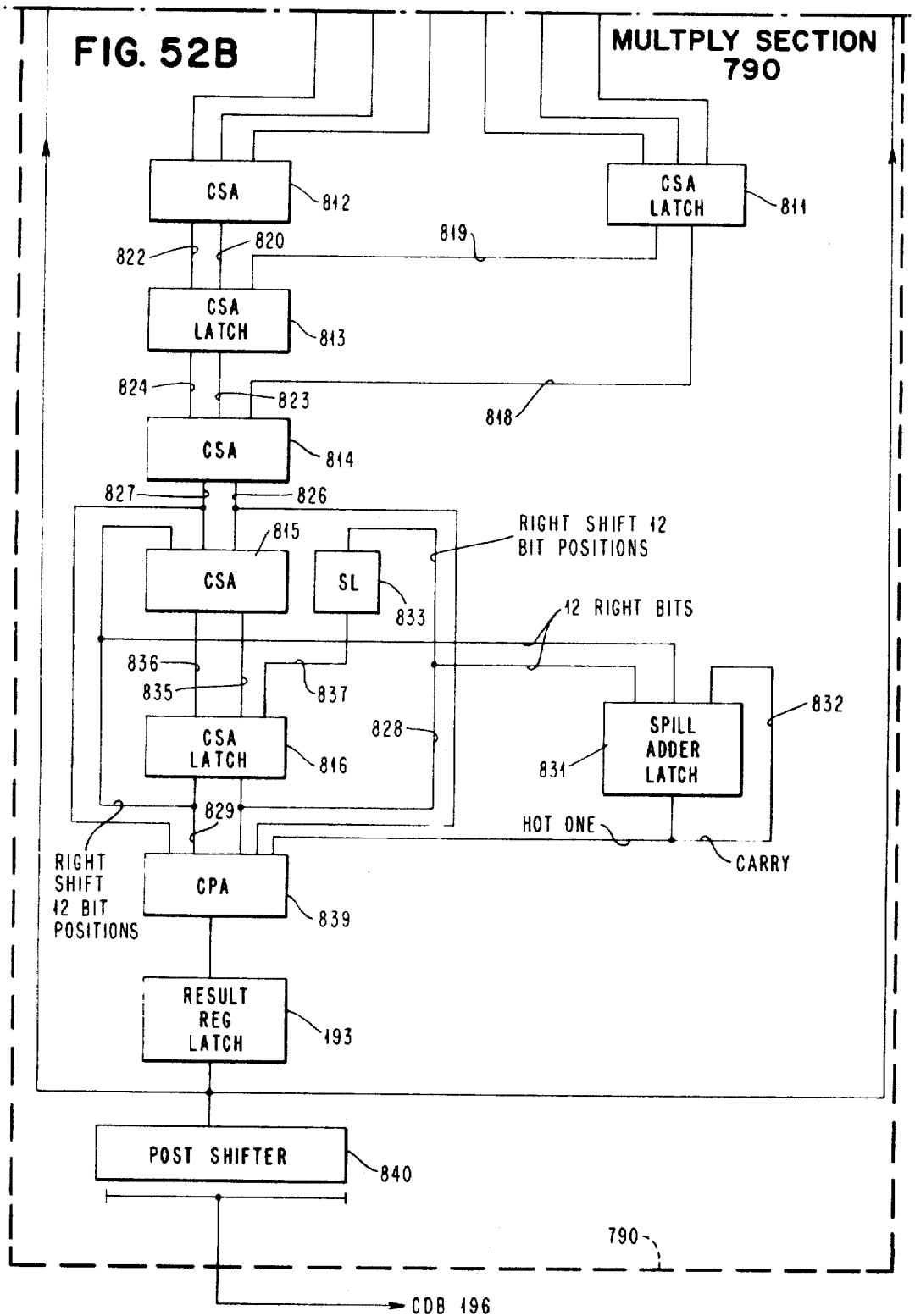

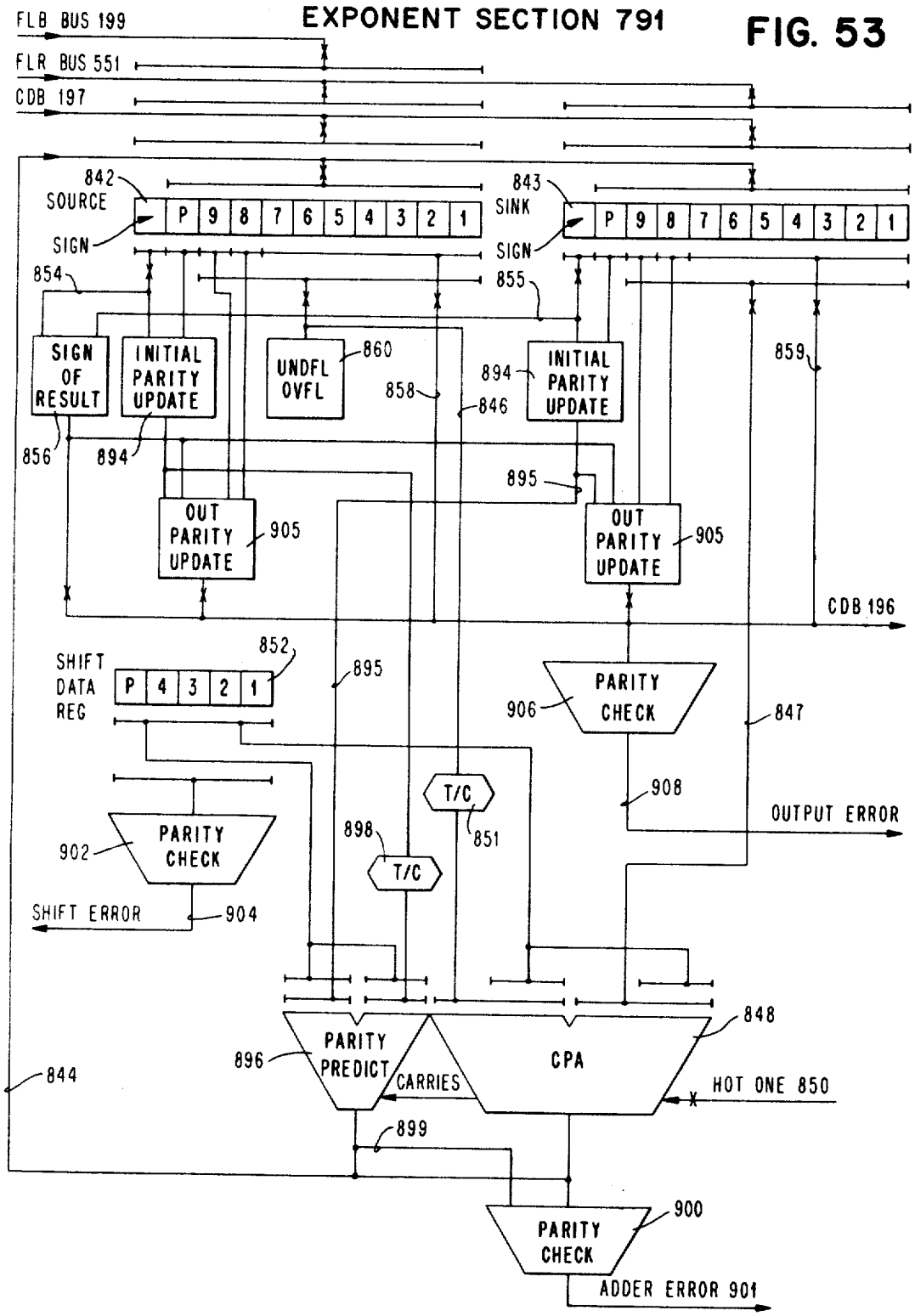

FIG. 54 MULTIPLIER OPERAND WORD DIGITS
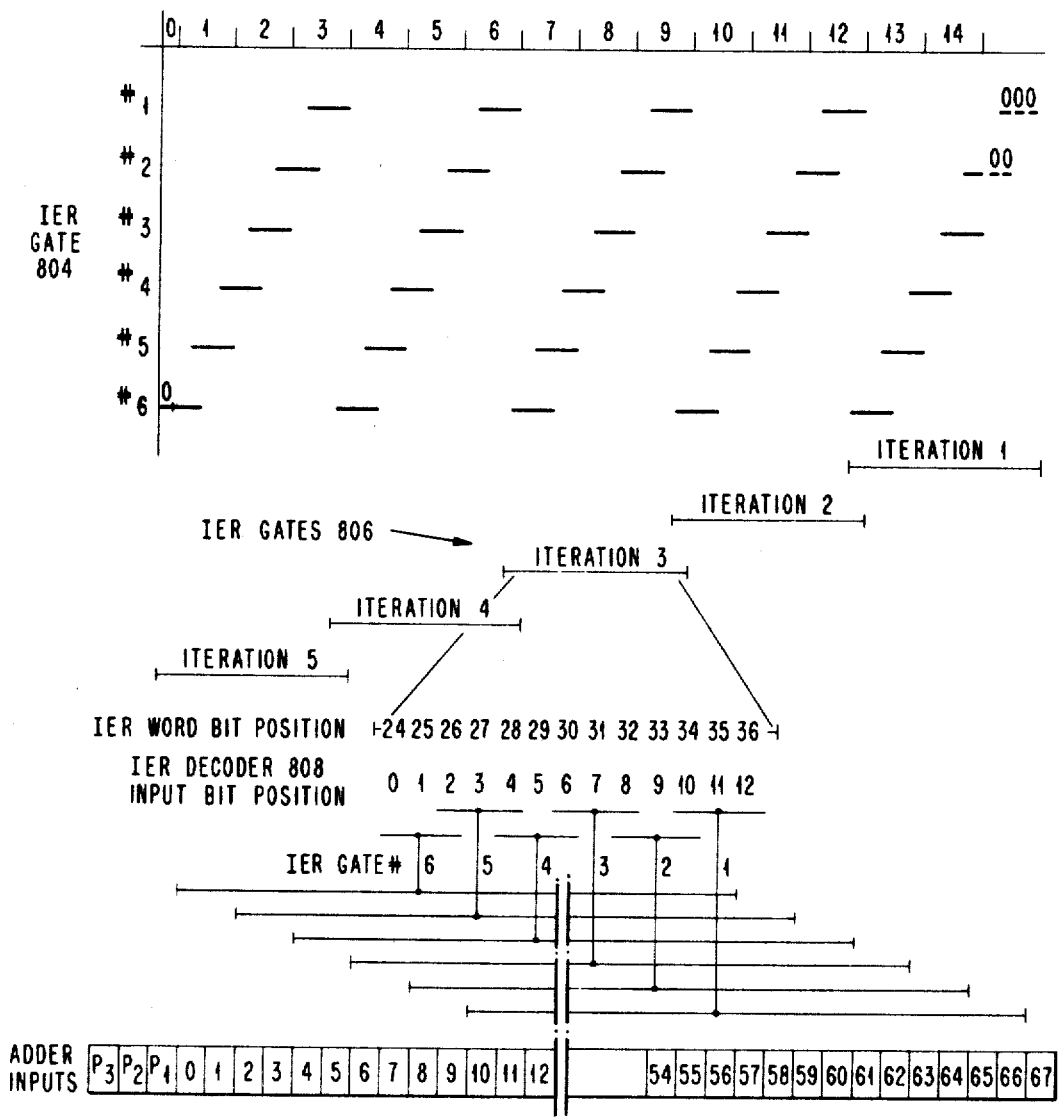

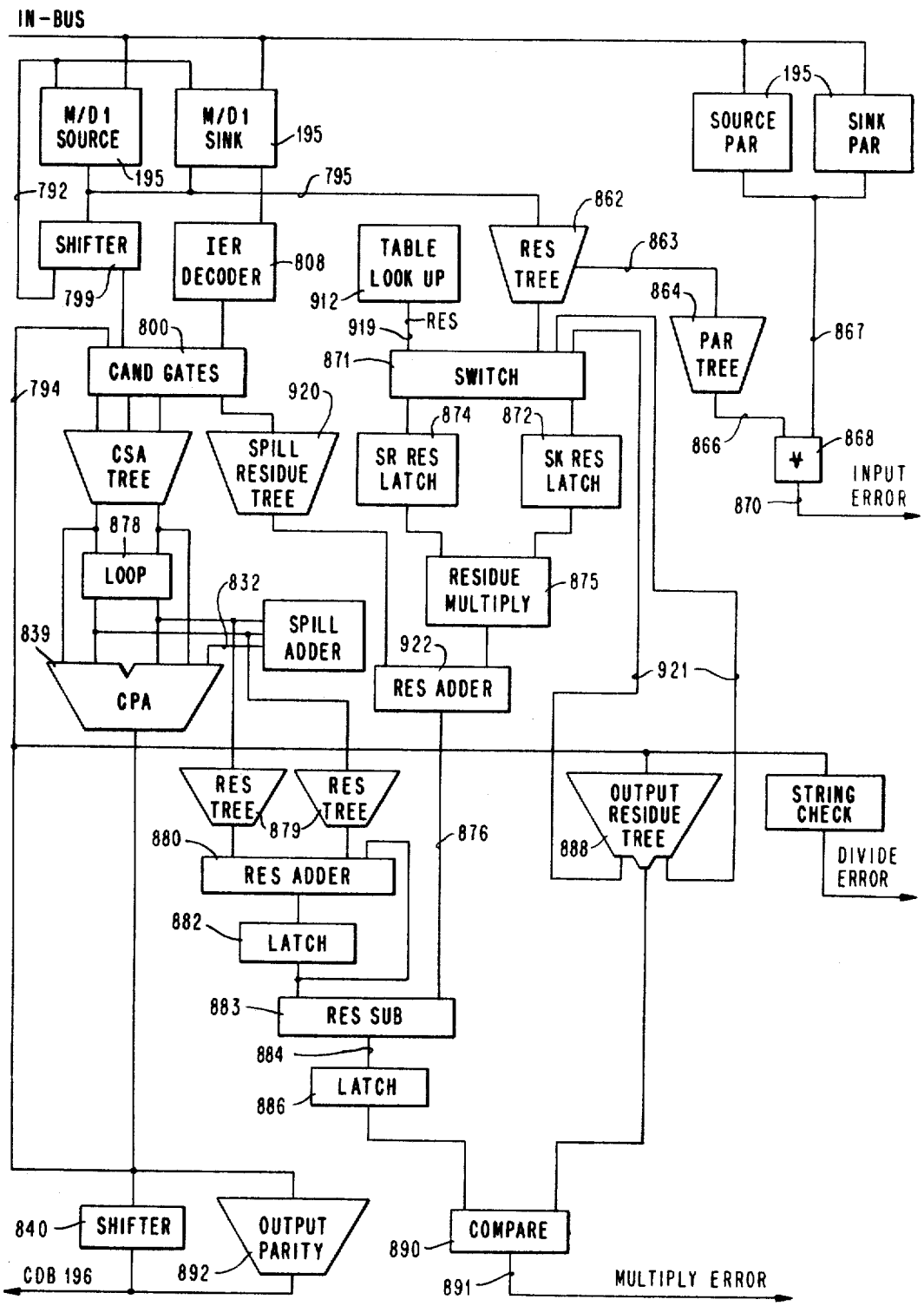
FIG. 55 MULTIPLY CHECKING

FIG. 56 FORMATS OF THE DENOMINATORS AND THEIR APPROXIMATE RECIPROCALS (Figure content omitted — table of binary bit patterns across digits 0–16 / bits 1–61 for $D_0$, $R_0$, $D_0 \times R_0 = D_1$, $R_1$, $D_1 \times R_1 = D_2$, $R_2$, $D_2 \times R_2 = D_3$, $R_3$, $D_3 \times R_3 = D_4$, $R_4$, $B_5$ (NOT FORMED), with annotations "DETERMINED BY TABLE LOOKUP OF DENOMINATOR" and "DETERMINED BY COMPLEMENTING DENOMINATOR".)

Dec. 24, 1968     D. W. ANDERSON ET AL     3,418,638
INSTRUCTION PROCESSING UNIT FOR PROGRAM BRANCHES
Filed Sept. 21, 1966     116 Sheets-Sheet 61

FIG. 57     OPERAND ALIGNMENT FOR DIVIDE ITERATIONS

| CAND GATE 800 BIT POSITIONS | 0 | 1 | 2 | 3 | 4 | 5 ... 11 | 12 | 13 ... 20 | 21 | 22 ... 29 | 30 | 31 ... 57 | 58 | 59 | 60 | 61 | 62 |
|---|---|---|---|---|---|---|---|---|---|---|---|---|---|---|---|---|---|
| FROM | | | | | | | | | | | | | | | | | |
| $D_0$ BIT POSITIONS | 01 | 02 | 03 | 04 | 05 | 06 ... 12 | 13 | 14 ... 21 | 22 | 23 ... 30 | 31 | 32 ... 58 | 59 | Z | Z | Z | Z |
| $D_1$ CPA 839 BIT POSITIONS | Z | Z | Z | Z | Z | 00 ...06 | 07 | 08 ...15 | 16 | 17 ...24 | 25 | 26 ...52 | 53 | 54 | 55 | 56 | 57 |
| $D_2$ CPA 839 BIT POSITIONS | Z | Z | Z | Z | Z | Z | 00 | 01 ...08 | 09 | 10 ...17 | 18 | 19 ...45 | 46 | 47 | 48 | 49 | 50 |
| $D_3$ CPA 839 BIT POSITIONS | Z | Z | Z | Z | Z | Z | Z | Z | 00 | 01 ...08 | 09 | 10 ...36 | 37 | 38 | 39 | 40 | 41 |
| $D_4$ CPA 839 BIT POSITIONS | Z | Z | Z | Z | Z | Z | Z | Z | Z | Z | 00 | 01 ...27 | 28 | 29 | 30 | 31 | 32 |

| IER DECODER 808 BIT POSITIONS | 0 | 1 | 2 | 3 | 4 | 5 | 6 | 7 | 8 | 9 | 10 | 11 | 12 |
|---|---|---|---|---|---|---|---|---|---|---|---|---|---|
| FROM | | | | | | | | | | | | | |
| IER 1 TABLE LOOK UP POSITIONS | Z | W | 01 | 02 | 03 | 04 | 05 | 06 | 07 | 08 | 09 | 10 | Z |
| IER 2 COMPLEMENT OF CPA POSITIONS | 05 | 06 | 07 | 08 | 09 | 10 | 11 | 12 | 13 | 14 | W | W | W |
| IER 3 COMPLEMENT OF CPA POSITIONS | 12 | 13 | 14 | 15 | 16 | 17 | 18 | 19 | 20 | 21 | 22 | 23 | W |
| IER 4 COMPLEMENT OF CPA POSITIONS | 21 | 22 | 23 | 24 | 25 | 26 | 27 | 28 | 29 | 30 | 31 | 32 | W |
| IER 5 COMPLEMENT OF CPA POSITIONS VIA S1 REGISTER 195 | 54 | 55 | 56 | 57 | 58 | 59 | 60 | 61 | 62 | 63 | 64 | W | W |
| IER 6 COMPLEMENT OF CPA POSITIONS VIA S1 REGISTER 195 | 42 | 43 | 44 | 45 | 46 | 47 | 48 | 49 | 50 | 51 | 52 | 53 | 54 |
| IER 7 COMPLEMENT OF CPA POSITIONS VIA S1 REGISTER 195 | 30 | 31 | 32 | 33 | 34 | 35 | 36 | 37 | 38 | 39 | 40 | 41 | 42 |

Z -- THIS BIT HAS VALUE ZERO
W -- THIS BIT HAS NONZERO VALUE

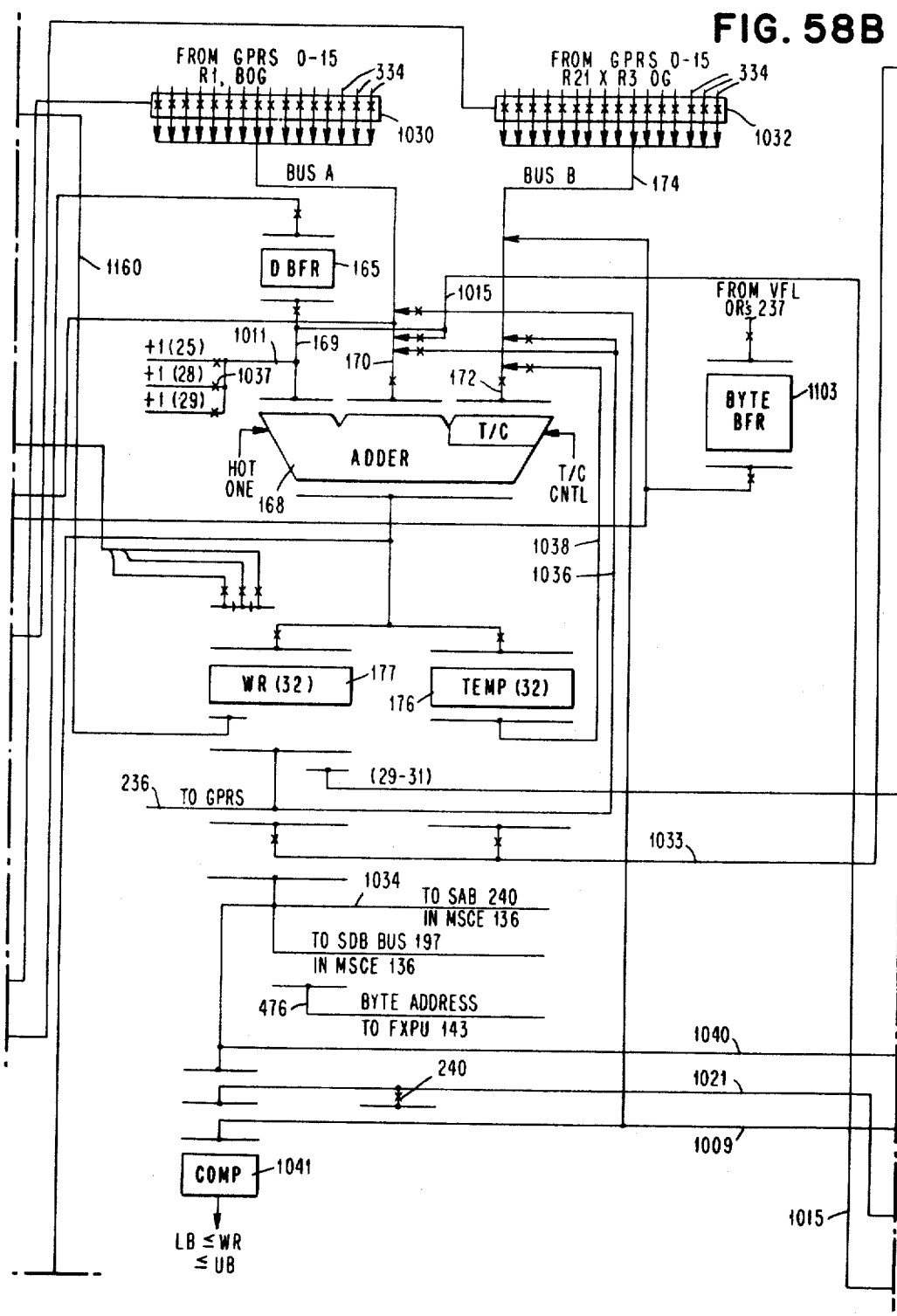

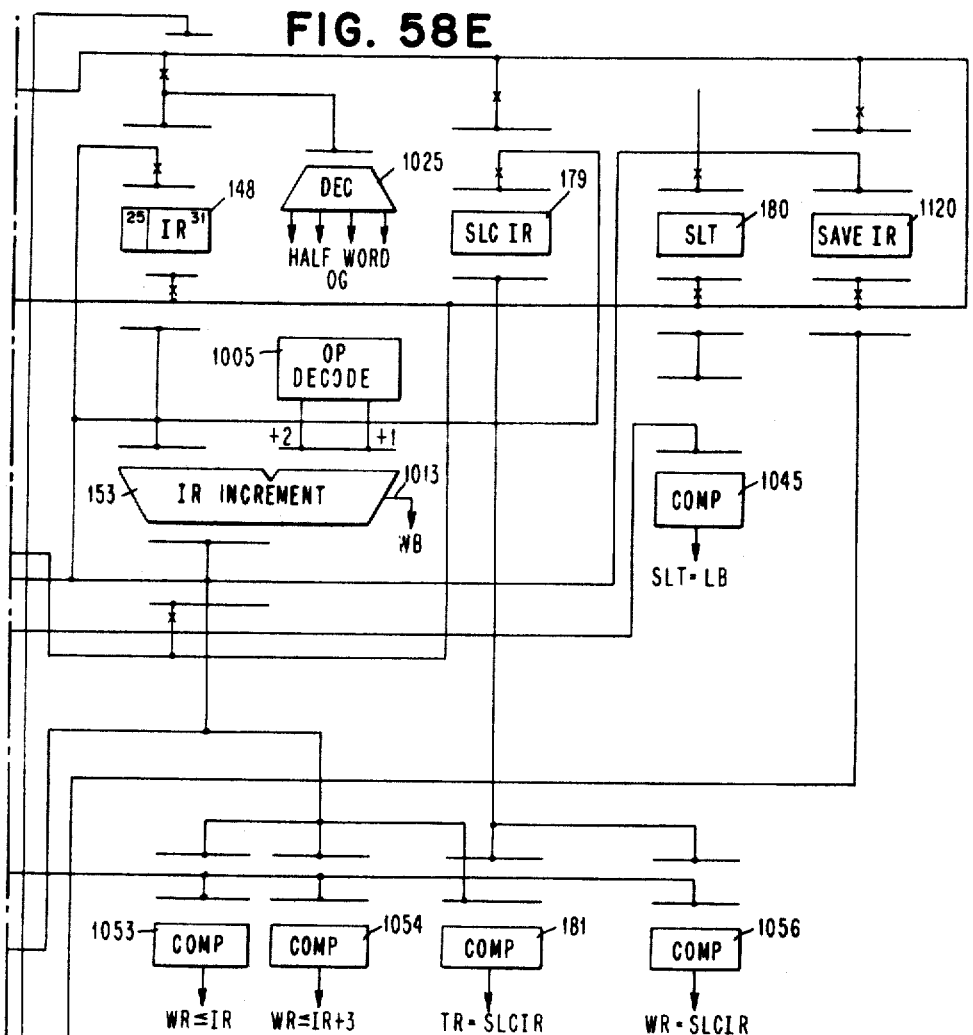

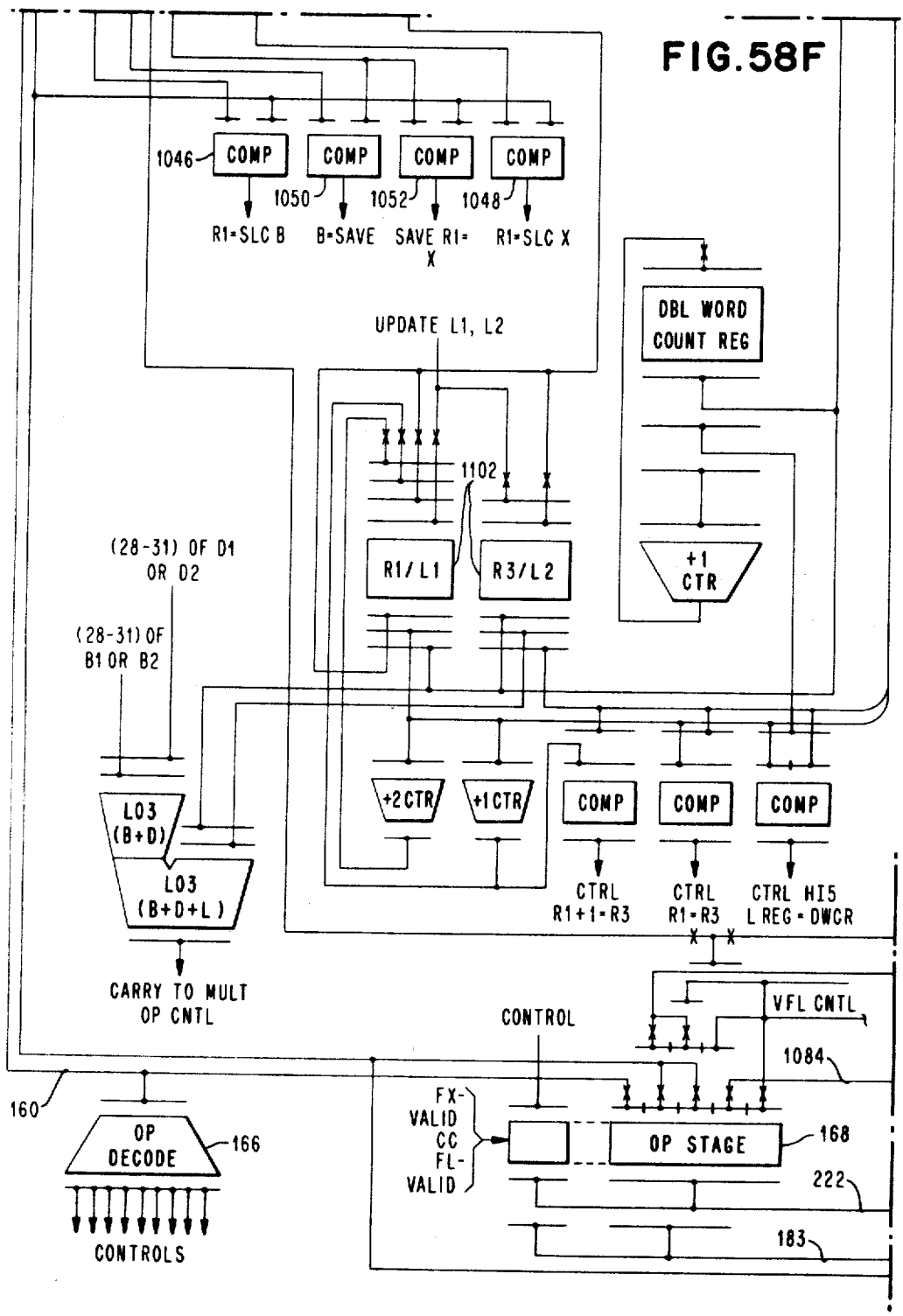

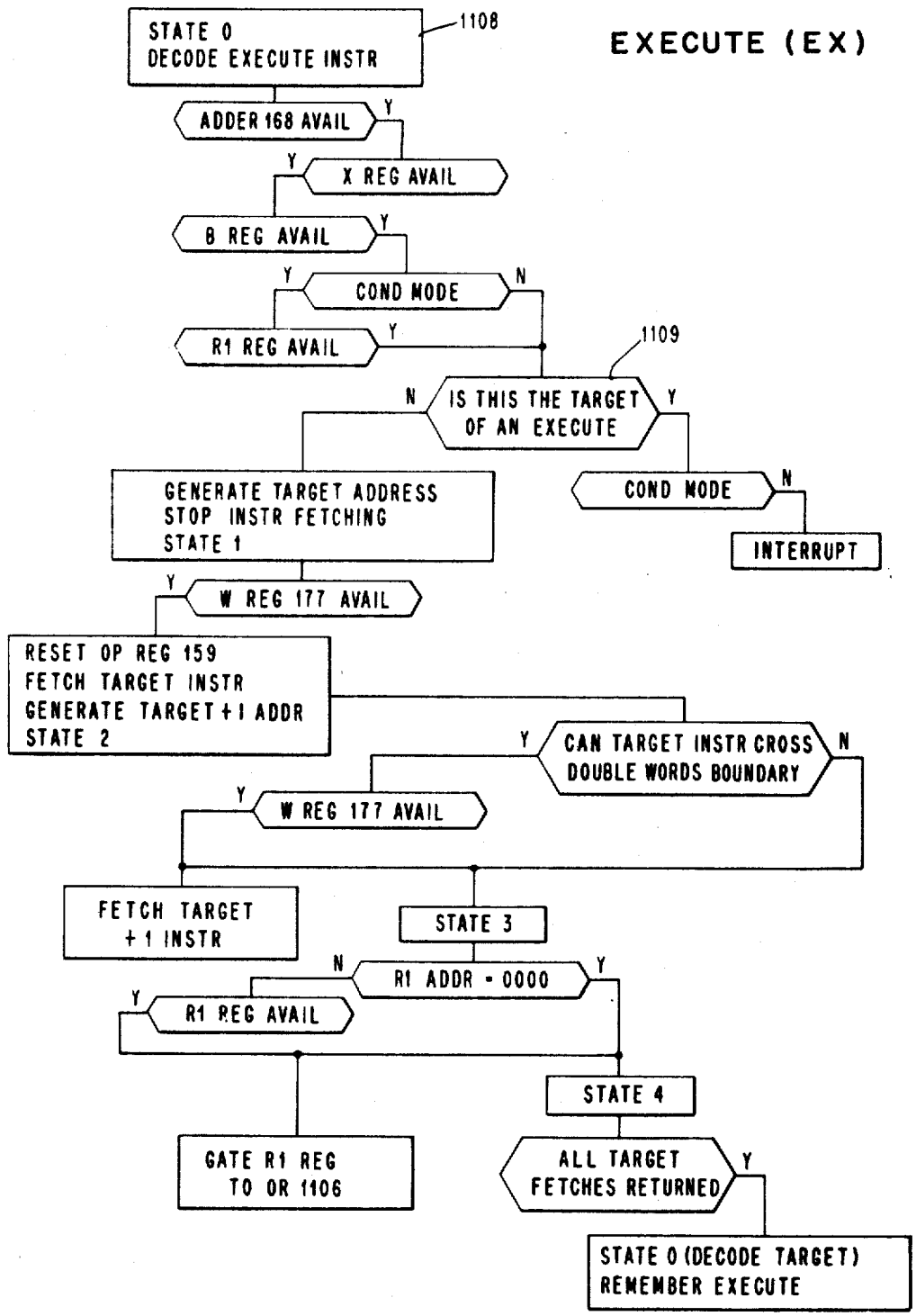
FIG. 59 EXECUTE (EX)

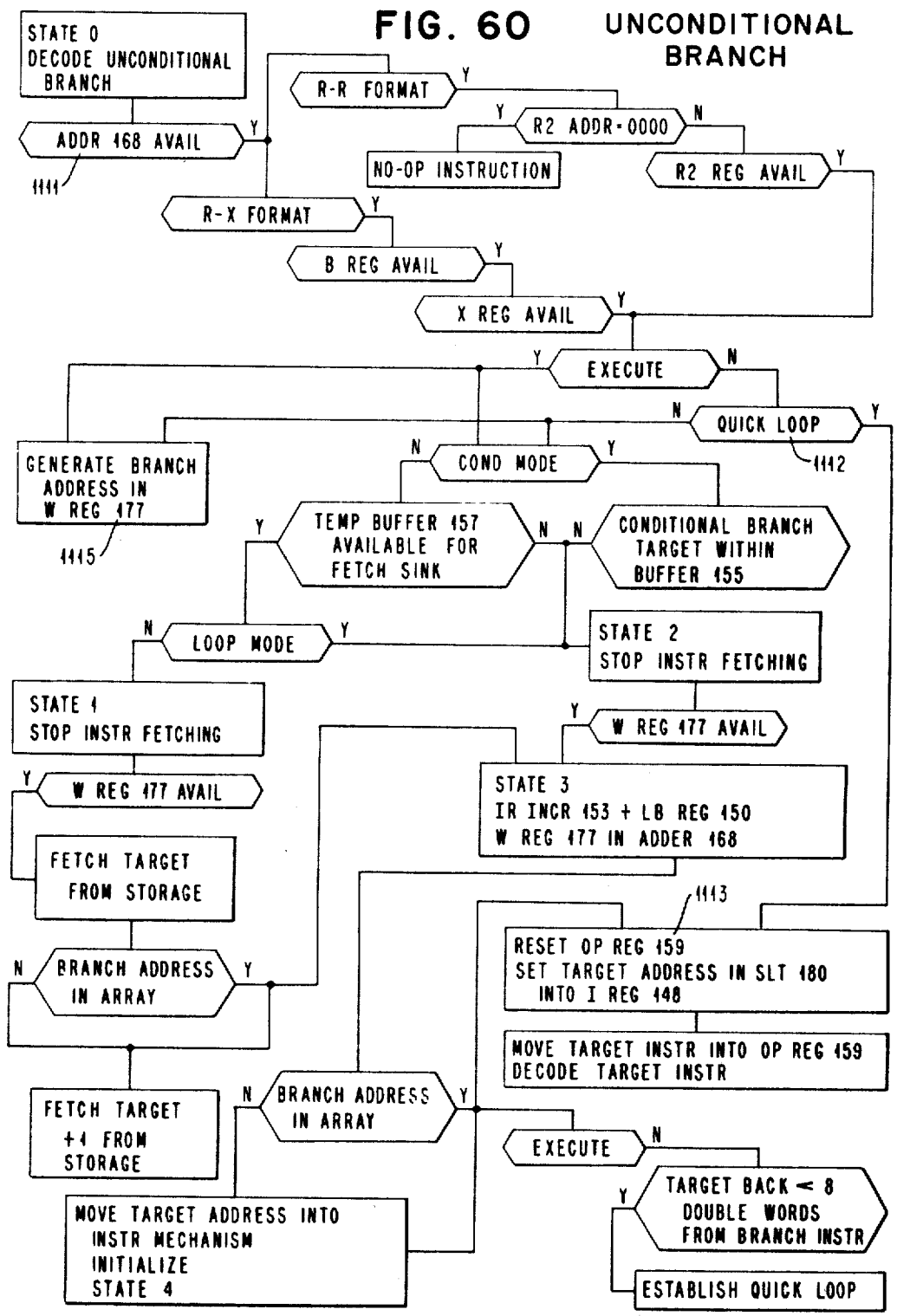

CONDITIONAL BRANCH
(BC, BCR) 1

CONDITIONAL BRANCH
(BC, BCR) 2

LOOP MODE

BRANCH ON INDEX
(BXH, BXLE, BCT, BCTR) 1

FIG. 66 — BRANCH ON INDEX (BXH, BXLE, BCT, BCTR) 3

FIG. 69 SET SYSTEM MASK (SSM)

Dec. 24, 1968  D. W. ANDERSON ET AL  3,418,638
INSTRUCTION PROCESSING UNIT FOR PROGRAM BRANCHES
Filed Sept 21, 1966  116 Sheets-Sheet 81

FIG. 70  SET PROGRAM MASK (SPM)

FIG. 71 SET STORAGE KEY (SSK)

FIG. 72   INSERT STORAGE KEY (ISR)

WRITE DIRECT (WRD)
READ DIRECT (RRD)

FIG. 74 TEST AND SET (TS)

Dec. 24, 1968   D. W. ANDERSON ETAL   3,418,638
INSTRUCTION PROCESSING UNIT FOR PROGRAM BRANCHES
Filed Sept. 21, 1966   116 Sheets-Sheet 86

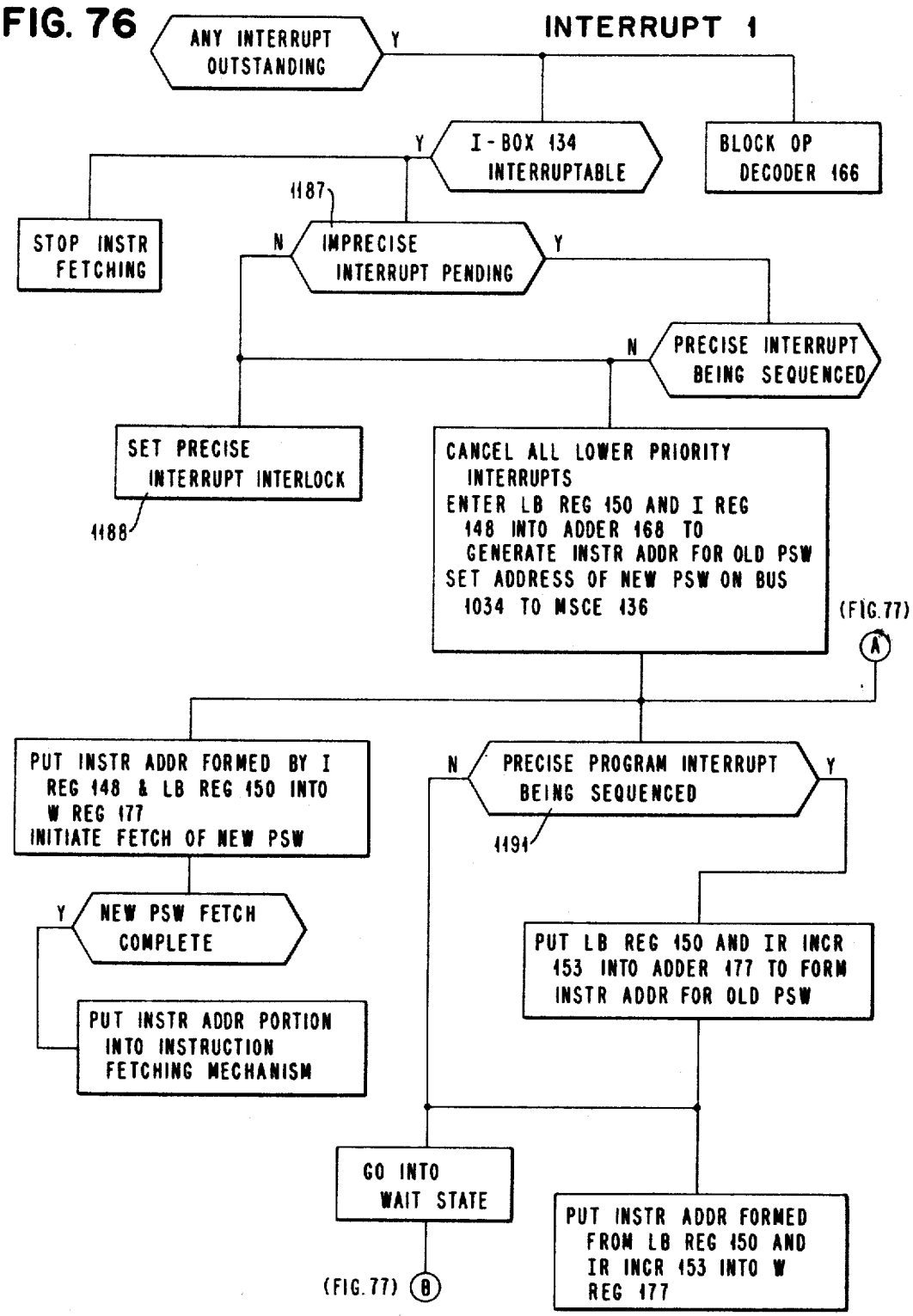

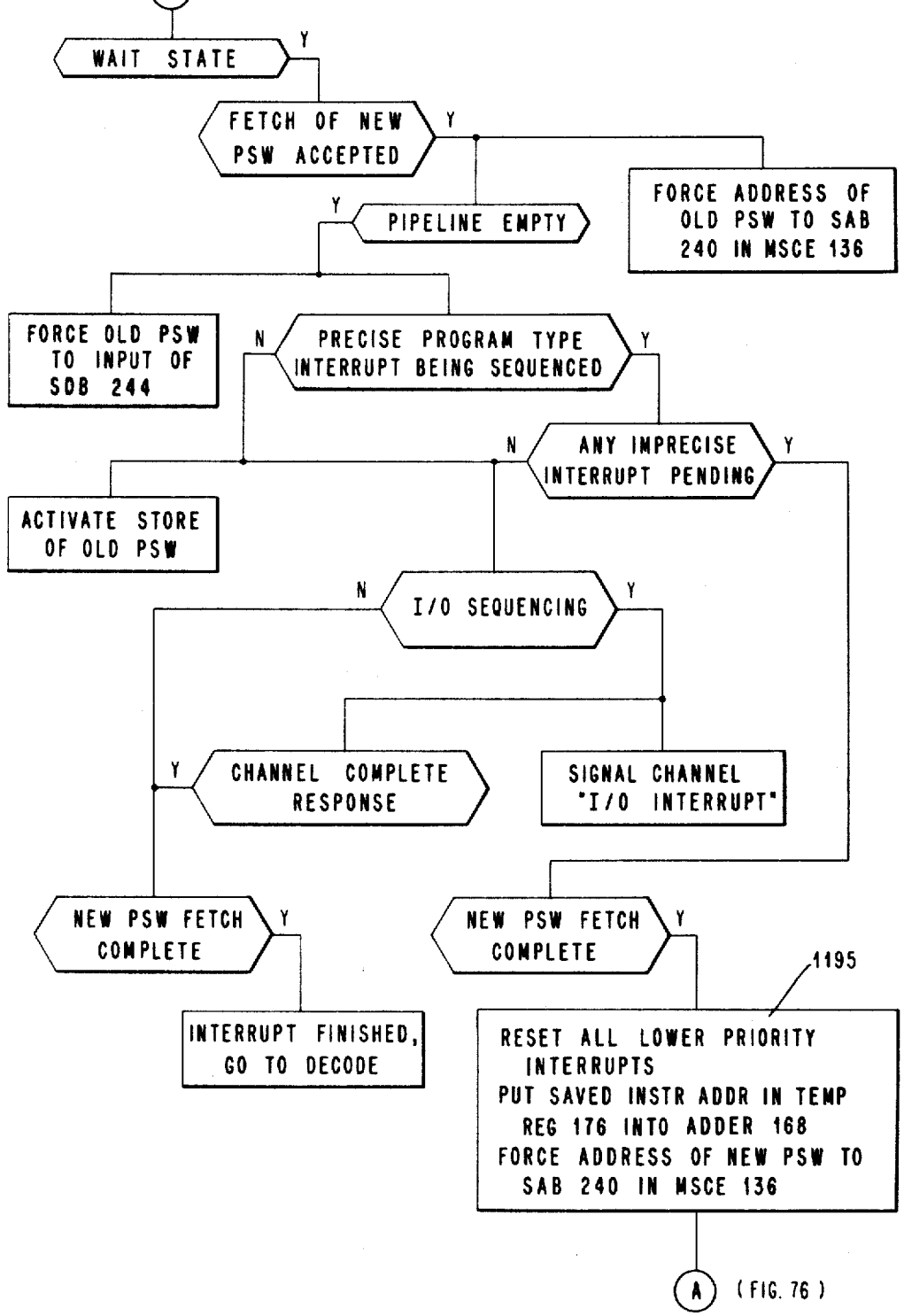
Dec. 24, 1968    D. W. ANDERSON ET AL    3,418,638
INSTRUCTION PROCESSING UNIT FOR PROGRAM BRANCHES
Filed Sept. 21, 1966     116 Sheets-Sheet 88
FIG. 77    INTERRUPT 2

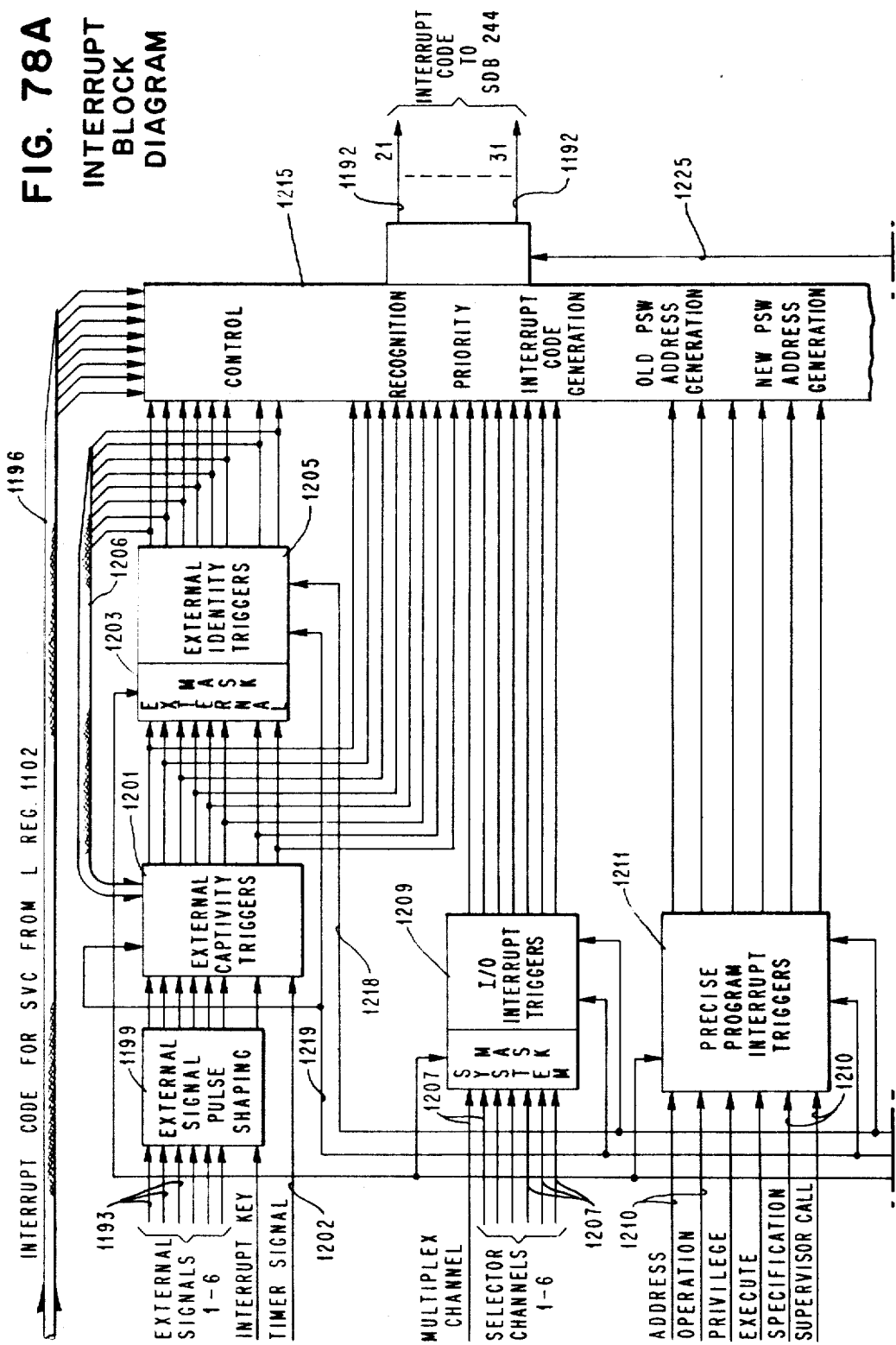

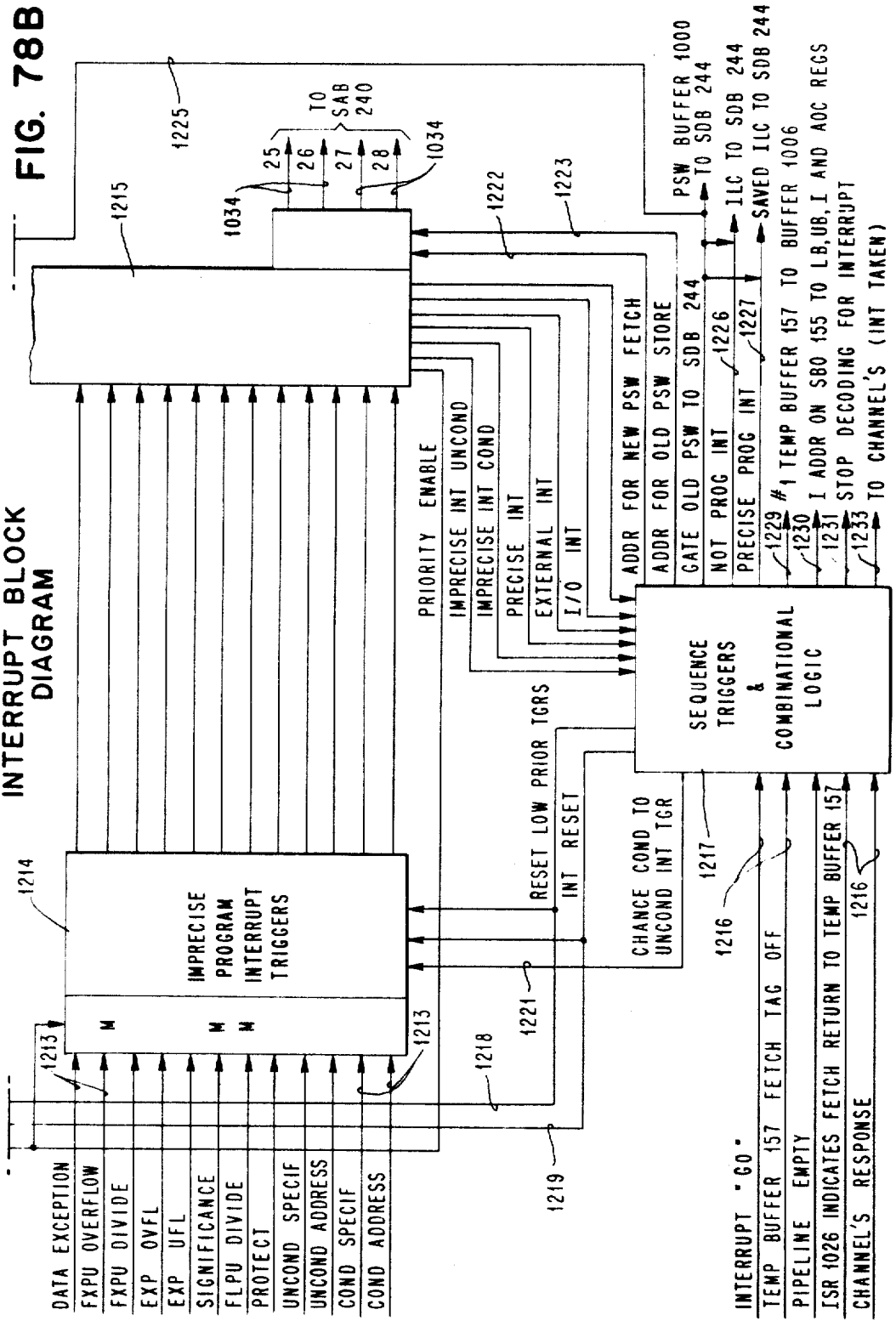

Dec. 24, 1968   D. W. ANDERSON ET AL   3,418,638
INSTRUCTION PROCESSING UNIT FOR PROGRAM BRANCHES
Filed Sept. 21, 1966   116 Sheets-Sheet 97

Dec. 24, 1968   D. W. ANDERSON ETAL   3,418,638
INSTRUCTION PROCESSING UNIT FOR PROGRAM BRANCHES
Filed Sept. 21, 1966   116 Sheets-Sheet 98

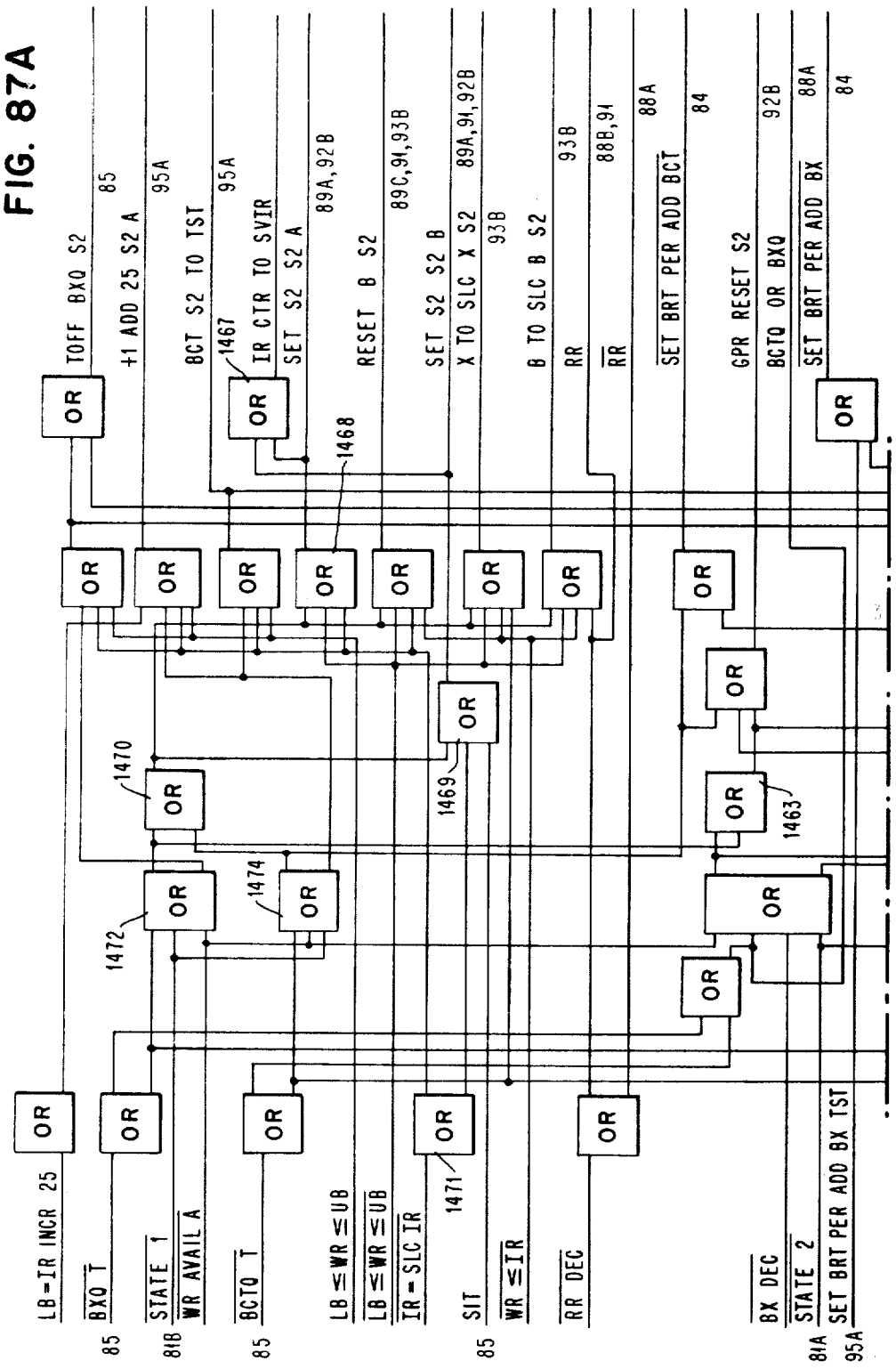

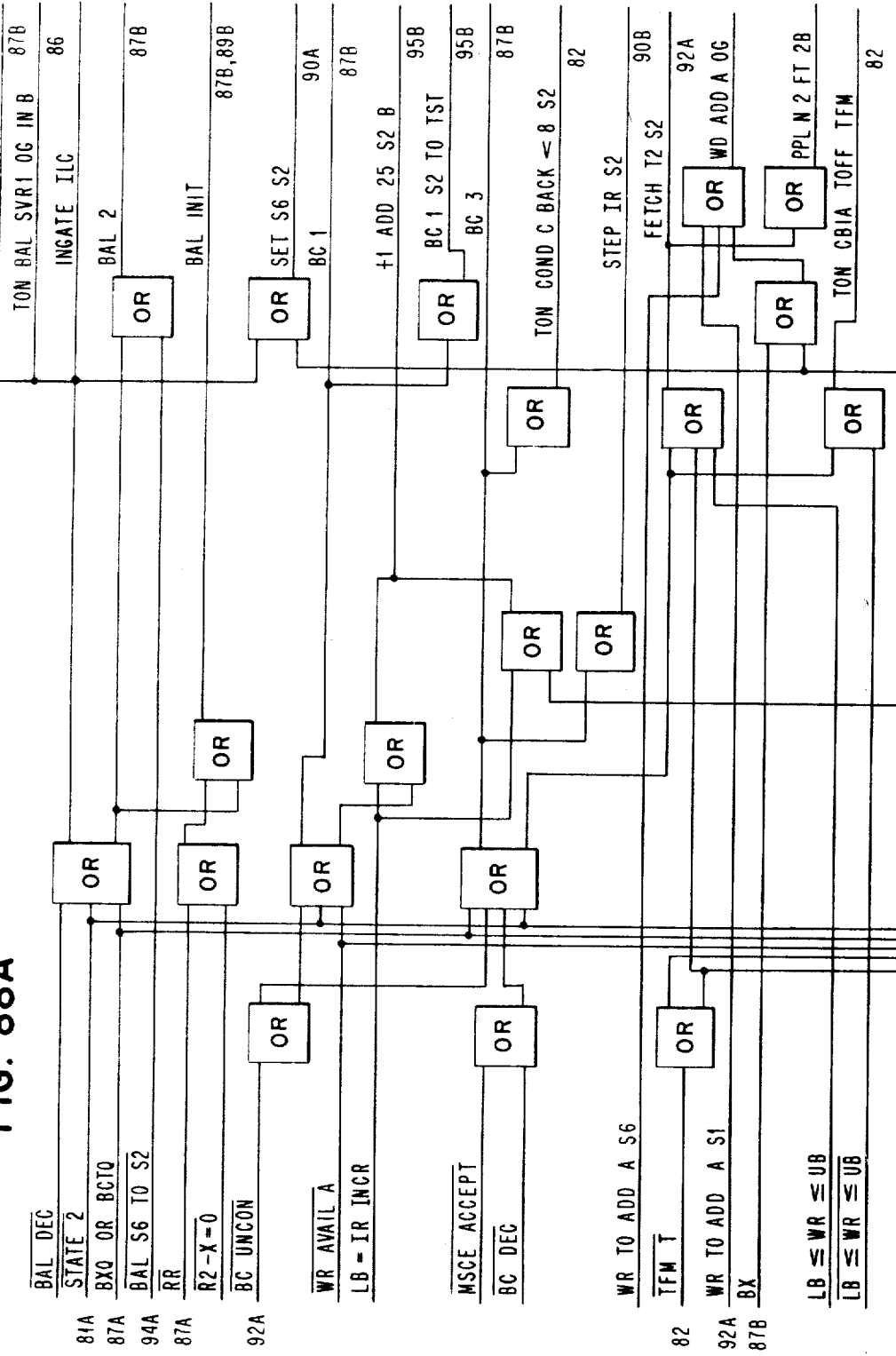

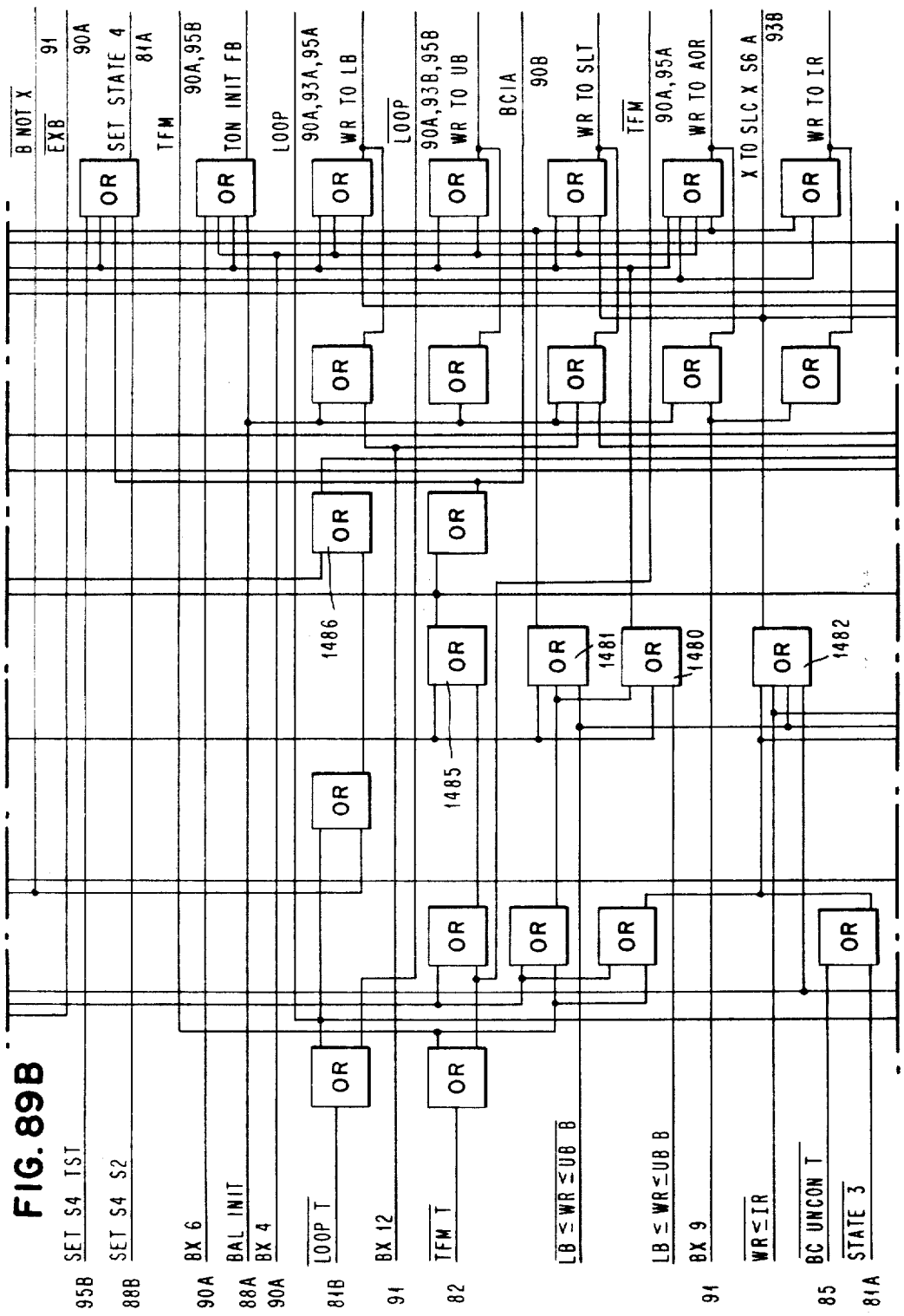

Dec. 24, 1968  D. W. ANDERSON ET AL  3,418,638
INSTRUCTION PROCESSING UNIT FOR PROGRAM BRANCHES
Filed Sept. 21, 1966  116 Sheets-Sheet 105

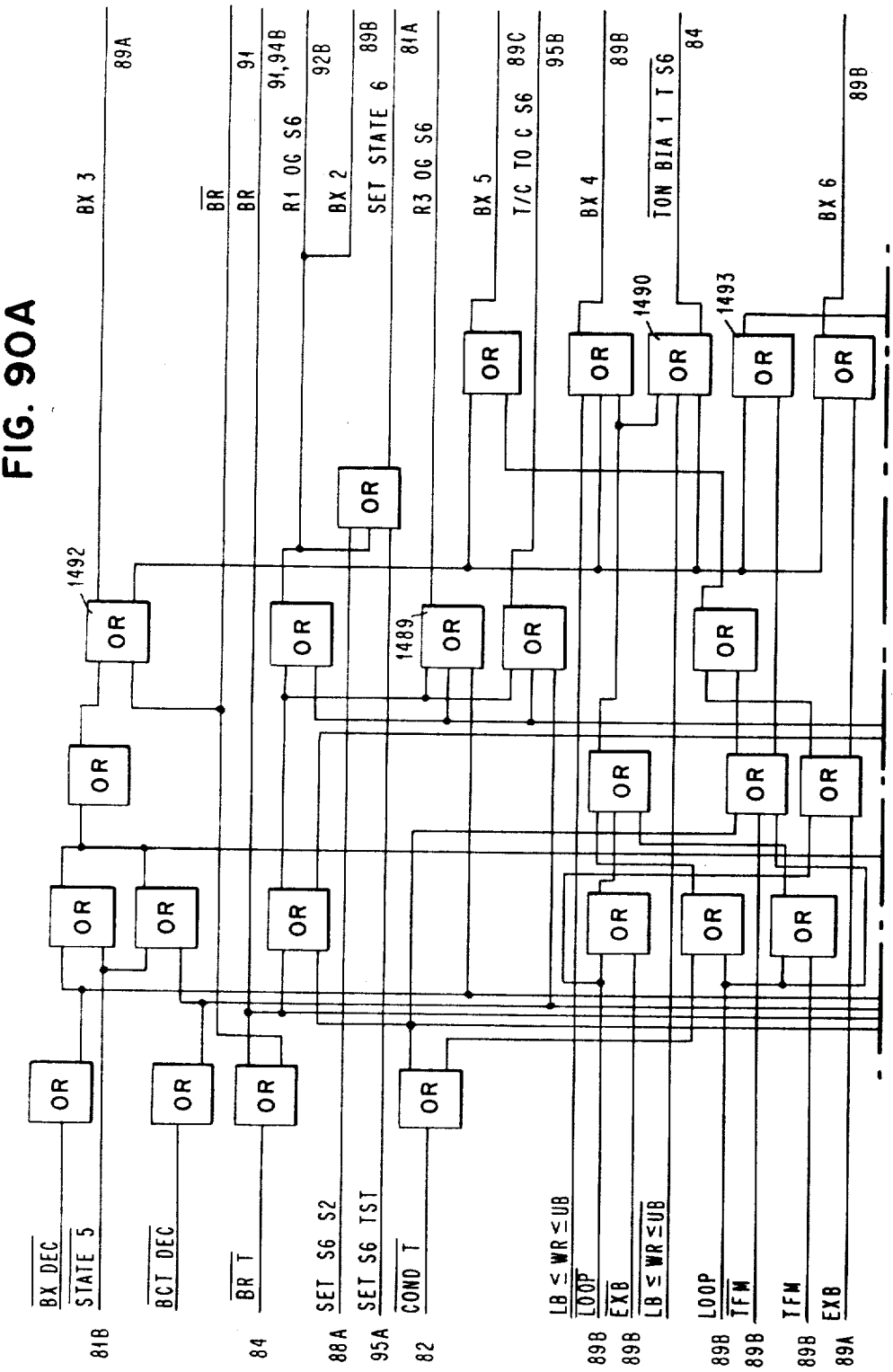

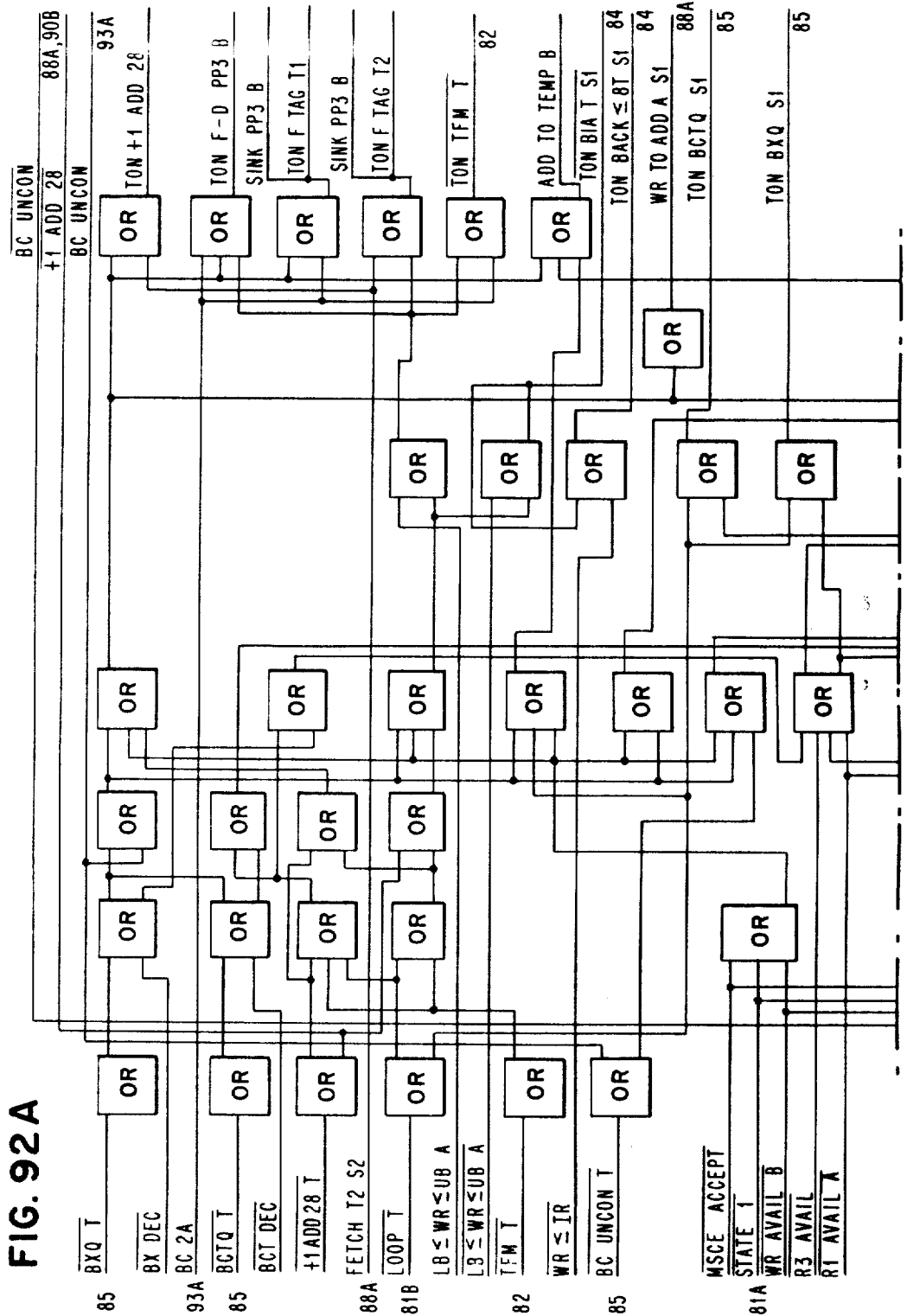

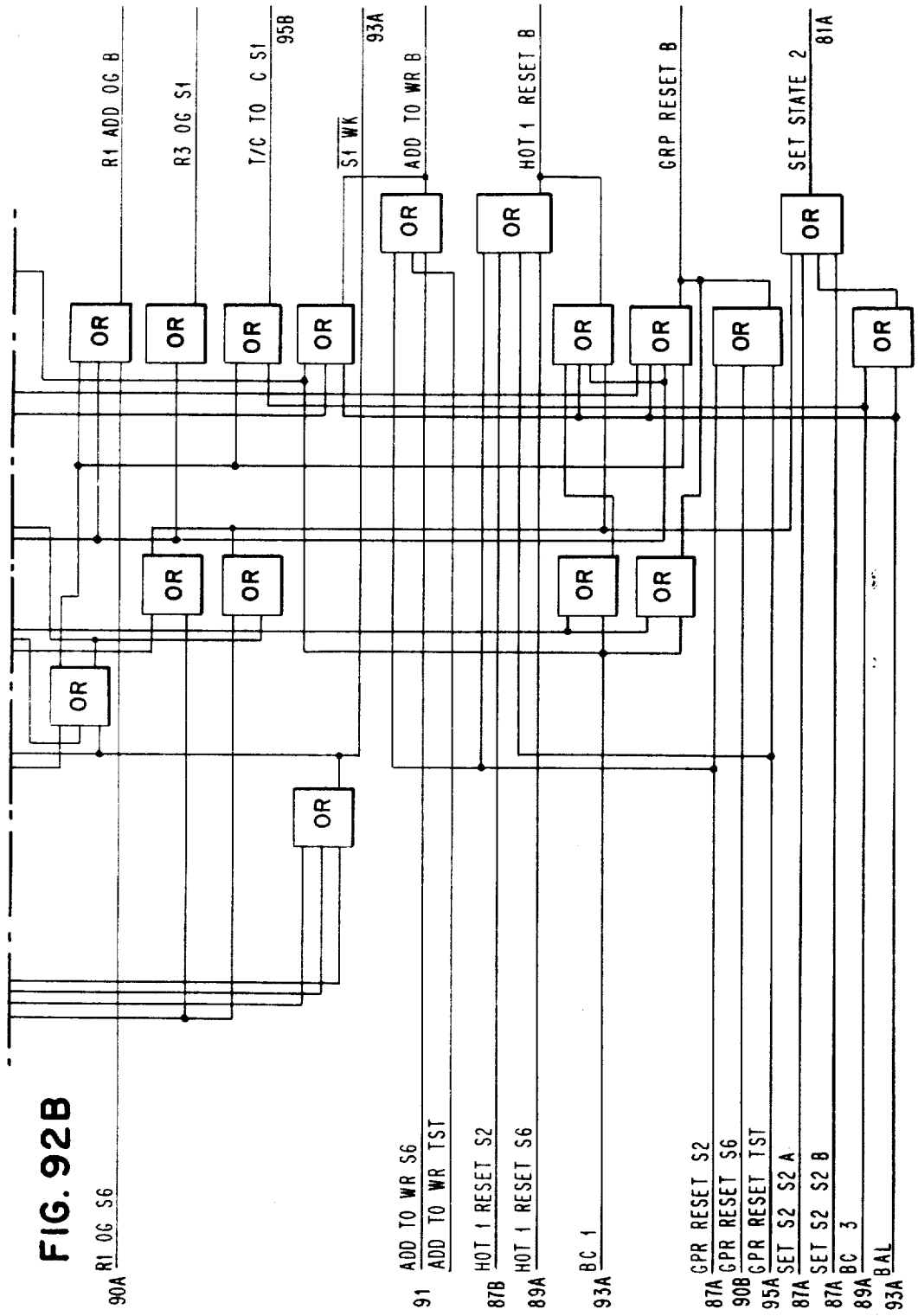

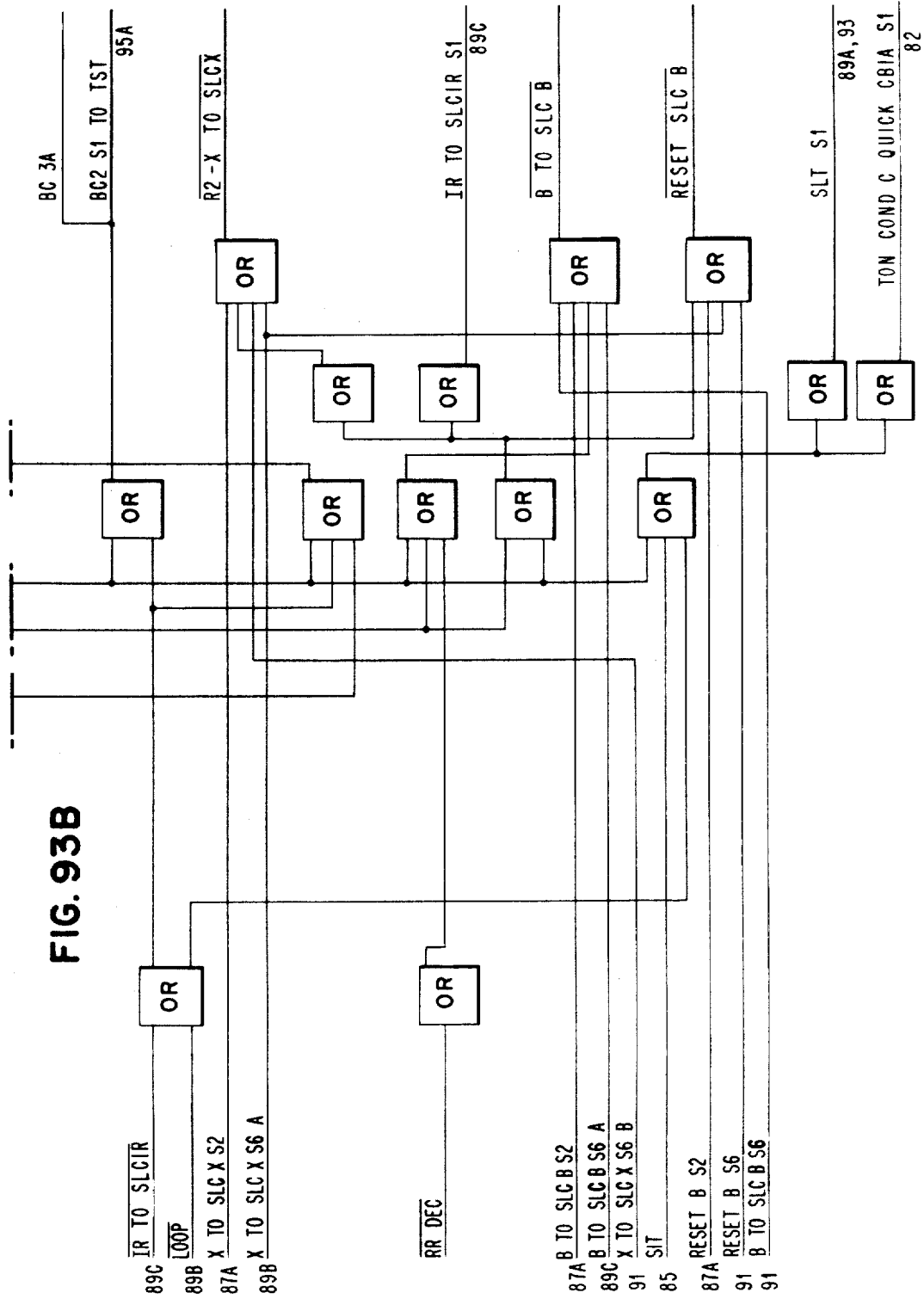

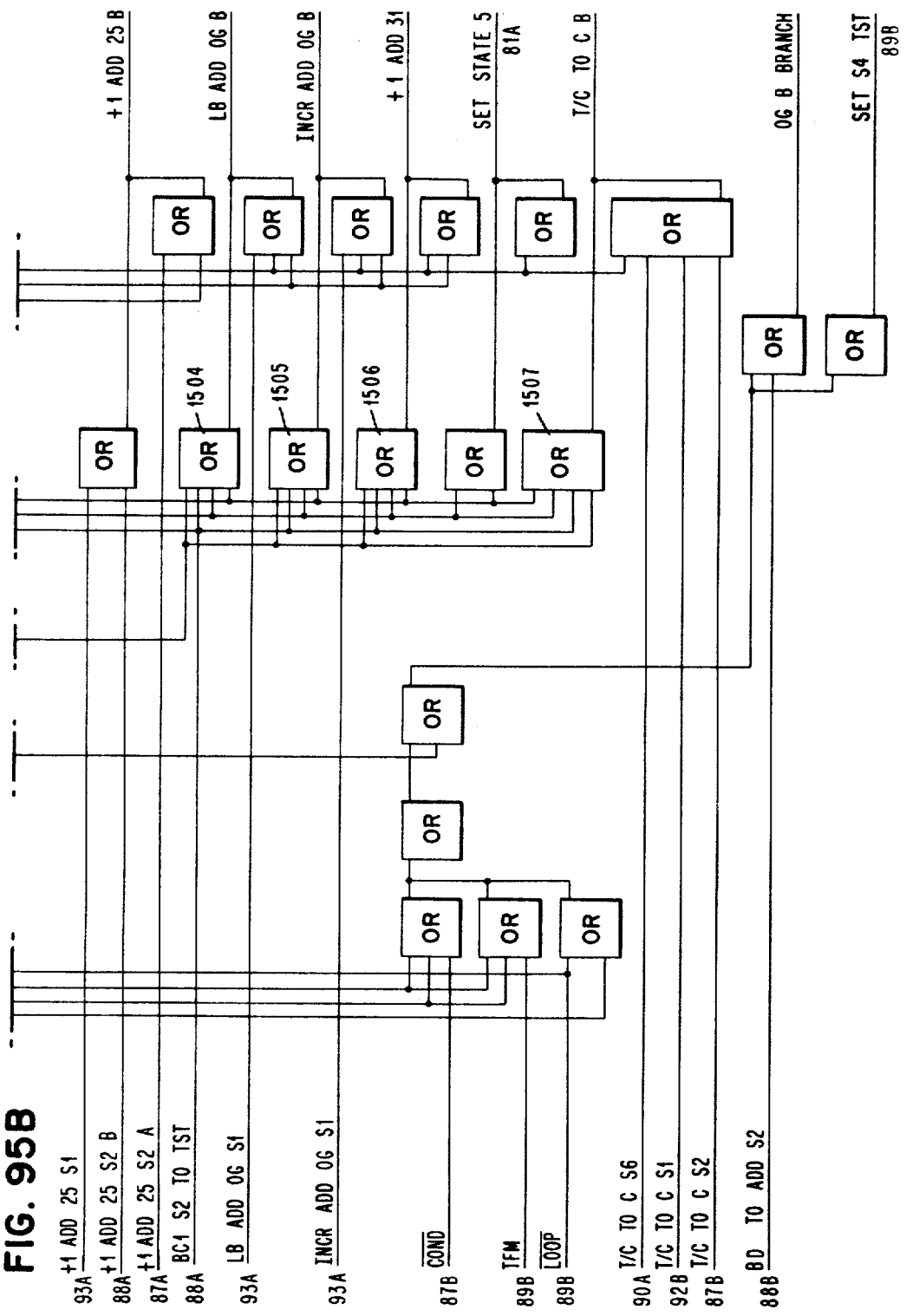

3,418,638
**INSTRUCTION PROCESSING UNIT FOR
PROGRAM BRANCHES**
David W. Anderson, Carl J. Conti, and Francis J.
Sparacio, Poughkeepsie, and Robert M. Tomasulo,
Staatsburg, N.Y., assignors to International Business Machines Corporation, Armonk, N.Y., a corporation of New York
Filed Sept. 21, 1966, Ser. No. 580,910
12 Claims. (Cl. 340—172.5)

The invention set out herein relates to branching within instruction programs of electronic data processing machines and, more particularly, to devices for the prefetching and predecoding of succeeding instructions to enable implementation of a branch on condition subsequent instruction at the highest possible speed, and with a minimum of delay in data processing.

In large-scale data processing systems, the ability of the system to throughput data has been increased by separating the system into a number of substantially independent subsystems connected through buffer registers whereby one subsystem is enabled to perform its function on an operand and then pass the partially completed instruction, or partially processed data into another subsystem for further processing without the need to delay the first subsystem if the subsequent subsystem is not ready to perform the further processing at that time. The presence of buffers on the inputs of a subsystem also permit a smooth flow of the processing operations for the subsystem does not normally have to wait for its next operand and can therefore proceed with its work without delays due to a wait for the preceding subsystem. It is possible in such a data processing system to prefetch instructions from the storage units and to place them in the buffer registers of an instruction unit for processing in order. It is conventional for instructions to be performed sequentially in the order of the addresses at which they are stored in the storage units so there is generally no difficulty in fetching enough instructions from storage to maintain continuous processing of the instructions. After an instruction has been processed as fully as the instruction unit is capable of processing it, the partially processed instruction is passed into the buffers of an execution unit where it will be further executed in its turn.

One break in the smooth flow of instruction processing in such a high speed buffered processor is found where execution of an instruction of a sequence designates the next instruction to be processed to be other than the one stored at the next sequential address and hence, not the next instruction which has been prefetched and is already in the instruction buffers. Since the instruction unit does not, in the absence of a special preprocessing unit, know that a branch instruction is in its instruction buffers until the instruction is reached for decoding, all subsequent instruction processing after the branch instruction must be effectively halted until it can be determined if the instruction branch is to be taken and, if the branch path is taken, then not until the required next instruction is fetched from storage into an instruction buffer and available to control further processing. In the present embodiment, no attempt is made to inspect incoming instruction words for a branch instruction which when found could be decoded enough to allow the instruction at the branch address to be prefetched for use if the branch is to be taken. The disclosed embodiment relies upon the instructions previously decoded and sent to the execution unit buffer registers to maintain the execution unit busy while the instruction unit is effectively halted because of the branch instruction.

It will be apparent, however, that the buffers of the instruction unit will, at the time the branch instruction is decoded, contain some subsequent instructions along the normal, sequentially addressed path of instructions, and these instructions can be effectively decoded as soon as the processor has determined that the conditions, if any, for the branch to the alternate program are not satisfied. The presently disclosed processor does therefore proceed with decoding of the prefetched and buffered sequential instructions after the branch instruction as soon as it has been determined that the branch program is not to be executed. On the other hand, if the processor finds that the branch to the new instruction sequence is unconditional or that the system conditions specified for the program branch have been met, instruction word fetching is started from the target address of the branch instruction and is continued at a high priority unitl enough instruction words are being fetched to fill about one-half of the instruction unit buffers, after which instruction word fetching will continue until the instruction buffers have been filled, but such additional fetching will be at a lower priority. Until the first of such instruction word fetches has returned the target instruction word to the instruction unit, the instruction unit can decode no further instructions and must wait.

In many instances, however, the conditions which determine which program path is to be taken after a branch instruction, are set as a result of the processing of operands in the execution unit. Due to the buffering of a substantial number of instructions in the execution unit, the determination of whether the conditions specified for the branch are present cannot generally be made until a substantial time after the instruction unit has decoded a branch instruction. To salvage as much as possible of this waiting time, the instruction unit makes an assumption as to which branch of the program will be taken and proceeds to decode and issue further instructions along that branch. These further instructions are issued based on an assumption that the program branch of which they are a part will be executed. They are therefore issued to the execution unit with a condition attached, the condition being that they are to be executed only if the assumption is correct. Such instructions are then issued with a conditional status tag attached, and when the conditions for branching are determined, the conditional status will be removed if the assumption of the instruction unit was correct, or the instruction will be cancelled if the assumption was incorrect. Thus, for about one-half of the conditional branch instructions whose conditions are not set at the time of decoding, a number of the further instructions to be executed are already decoded and can be made available to the execution units as soon as the conditions for the branch are determined. Additional time could of course be saved if some of the next instructions of both branches of the program could be predecoded with the designation of the proper instructions to be executed made as soon as the branching conditions were determined, but it is believed that at present the time saved by this additional structural complication could not be economically justified. It is, however, possible by the addition of a small amount of control circuitry to save at least a part of the time required to fetch the next instruction word if the assumption of the correct branch path was wrong, by requesting a fetch of such instruction word for the non-assumed branch, as soon as the branch instruction is decoded. Then if it is found that the assumption of the instruction unit was wrong, a start at least has been made on the branch now found to be correct, and the instruction unit can start its decoding of the correct branch of instructions immediately if the instruction word requested has been returned, otherwise as soon as the word is returned.

It is then an object of the present invention to provide in a high speed data processing device, instruction branching controls to enable branch instructions to be processed with a minimum of idle time.

It is also an object to provide in an instruction unit of a data processing device, mechanism to enable branching instructions to be executed in the most expeditious manner available in view of the status of the device.

It is a further object to provide in such an instruction unit, the ability to execute branch instructions in a plurality of different manners and to be capable of selecting the manner of execution in dependence upon the status of the unit.

It is still another object to devise an instruction unit for a data processing system in which the unit will select the manner of execution of a program branch instruction which will minimize the time used for execution of the instruction.

A still further object is the provision in the instruction unit of a data processing system of several temporary instruction buffer registers into which instructions along a branch path may be fetched when the unit cannot immediately determine which program branch is to be executed.

A further object is to provide an instruction unit for a data processing system which can process and conditionally issue instructions before the unit can know that the instructions are to be executed.

Still another object is the provision of such an instruction unit wherein such conditionally issued instructions can be validated or cancelled in accordance with subsequently determined conditions.

A further object is to provide an instruction unit for a data processing system, said unit being capable of assuming a future status for a condition to enable a conditional type of operation after a program branch instruction which depends upon a logically prior but temporally subsequent condition.

A still further object is to provide such an instruction unit which responds to a determination of the condition by abandoning said conditional type of operation as soon as it is determined that the assumption of the state of the condition under which the type of operation was proceeding is invalid.

The foregoing and other objects, features and advantages of the invention will be apparent from the following more particular description of the preferred embodiment of the invention, as illustrated in the accompanying drawings.

Other features of the herein described preferred embodiment of a data processing system are set out and claimed in the following U.S. patent applications assigned to the assignee of the present application by other inventors.

Ser. No. 581,052, filed Sept. 21, 1966, by D. W. Anderson et al. and titled, "Instruction Handling Unit for Program Loops."

Ser. No. 579,082, filed Sept. 12, 1966, by R. E. Goldschmidt et al., and titled, "High Speed Adder."

Ser. No. 576,157, filed Aug. 30, 1966, by R. E. Goldschmidt et al., and titled, "Multiplying Apparatus for Performing Division Using Successive Approximate Reciprocals of a Divisor."

Ser. No. 576,401, filed Aug. 31, 1966, by R. E. Goldschmidt et al. and titled, "Apparatus for Accumulating the Sum of a Plurality of Operands."

Ser. No. 582,675, filed Sept. 28, 1966, by R. M. Tomasulo et al., and titled, "Execution Unit With a Common Operand and Result Bussing System."

Ser. No. 578,745, filed Sept. 12, 1966, by L. J. Boland et al., and titled "Control System for Interleave Memory."

Ser. No. 573,360, filed Aug. 18, 1966, by S. A. Calta et al., and titled "Peripheral Data Exchange."

In the accompanying drawings:

FIG. 3 is a more detailed view of the unit of FIG. 2, showing the functional sections and the interconnections therebetween.

Figure 4B:
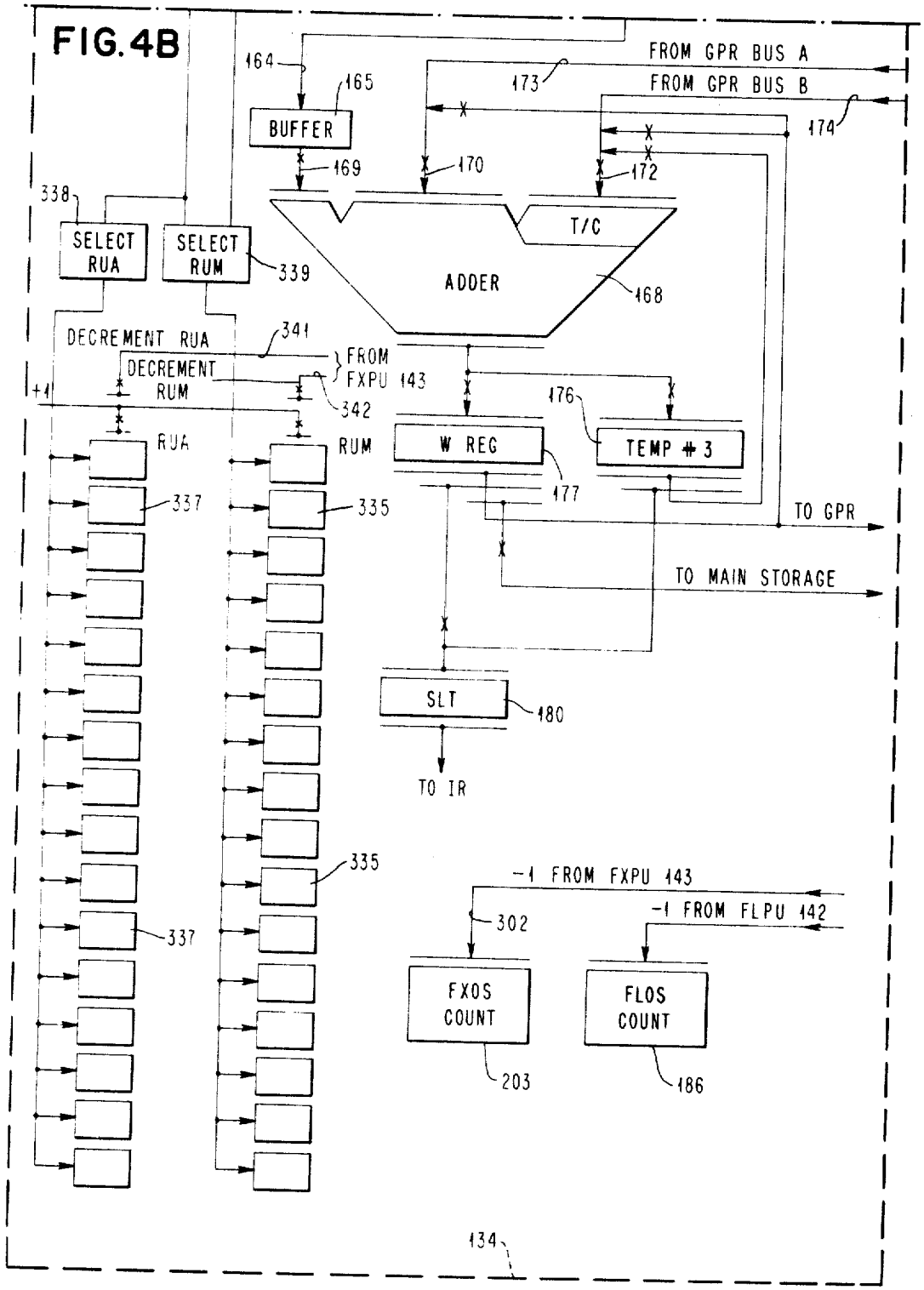

FIGS. 4A and 4B comprise a schematic showing of the functional parts and operand paths of the Instruction Unit of FIG. 3.

FIG. 5 is a schematic showing of the Floating Point Unit and its operand paths.

FIGS. 6A and B comprise a schematic showing of the functional parts and operand paths of the Fixed Point/Variable Field Length Unit.

Figure 7:
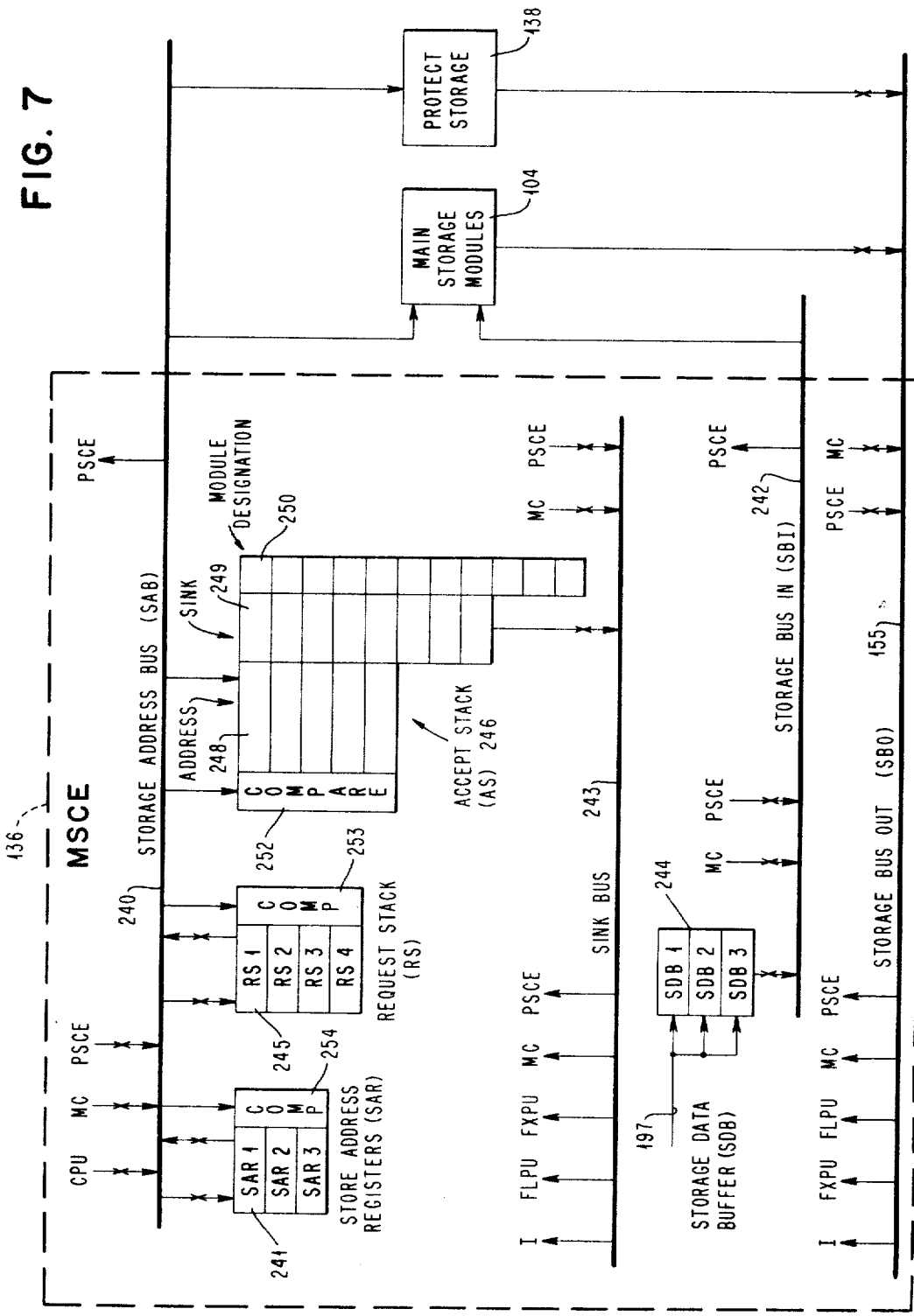

FIG. 7 is a schematic of the Main Storage Control Element showing its functional parts.

Figure 8:
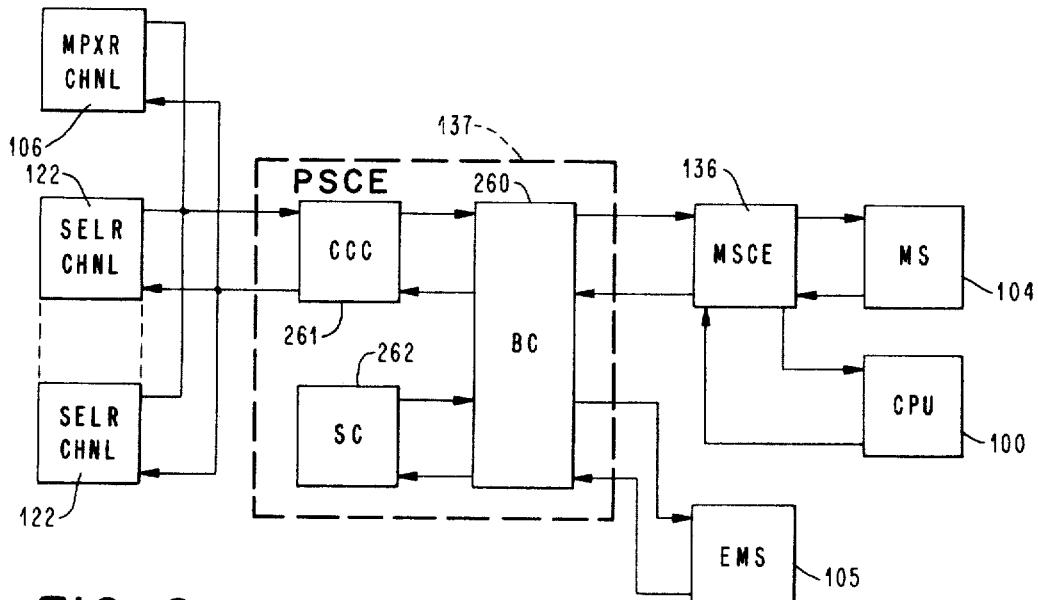

FIG. 8 is an overall schematic of the Peripheral Storage Control Element of FIG. 3.

Figure 9:
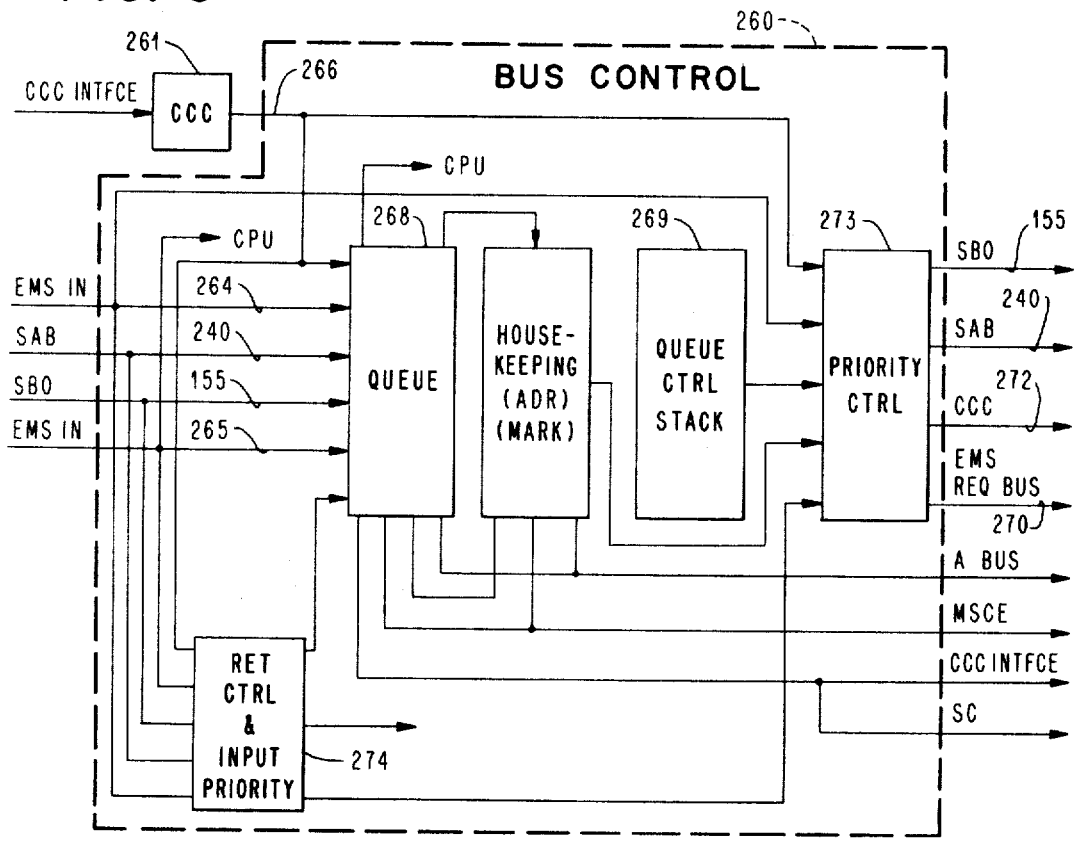

FIG. 9 shows the internal sections of the Peripheral Storage Control Element of FIG. 8.

Figure 10:
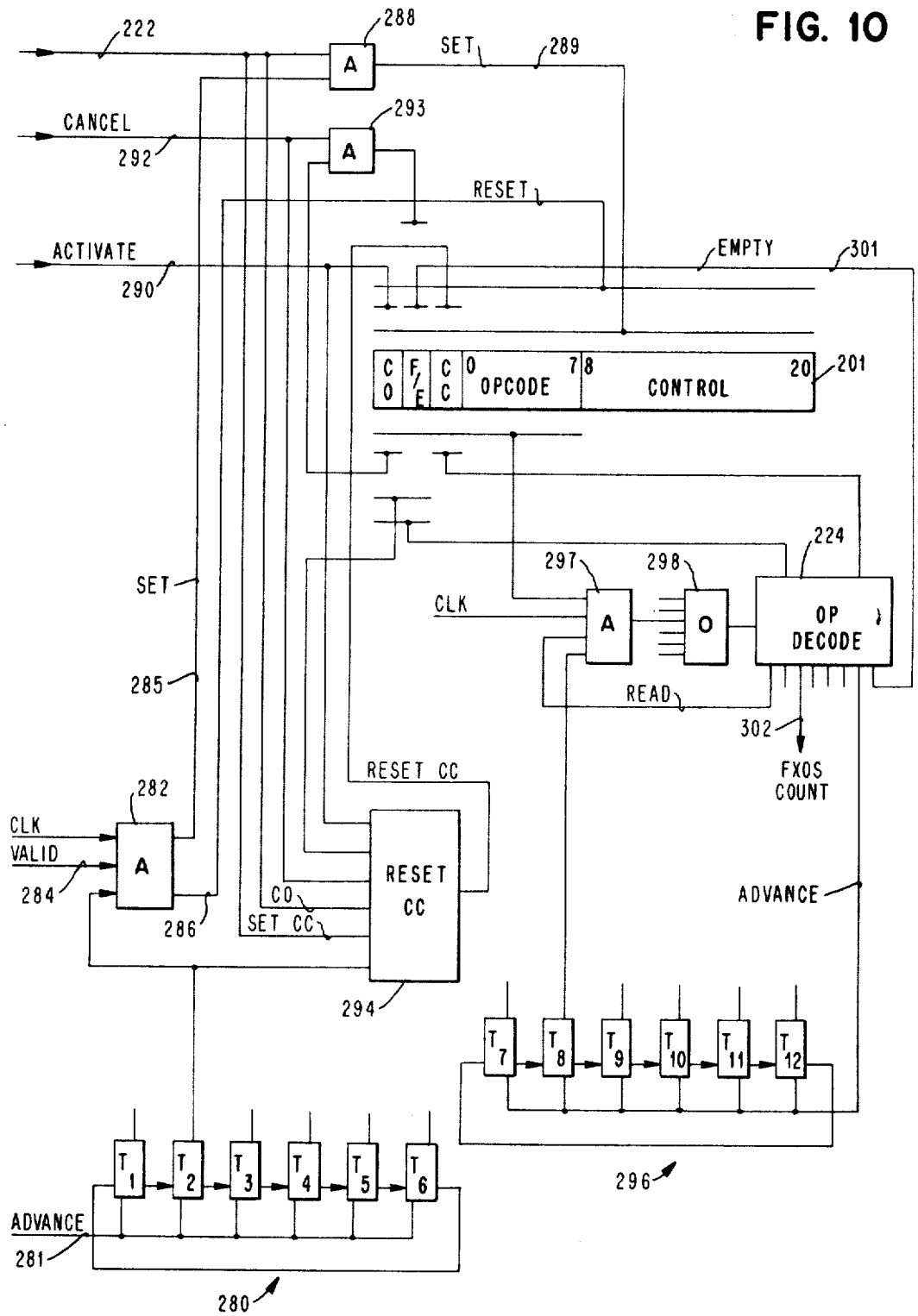

FIG. 10 is a more detailed showing of the parts of the OP Decoder of FIG. 6A.

Figure 11:
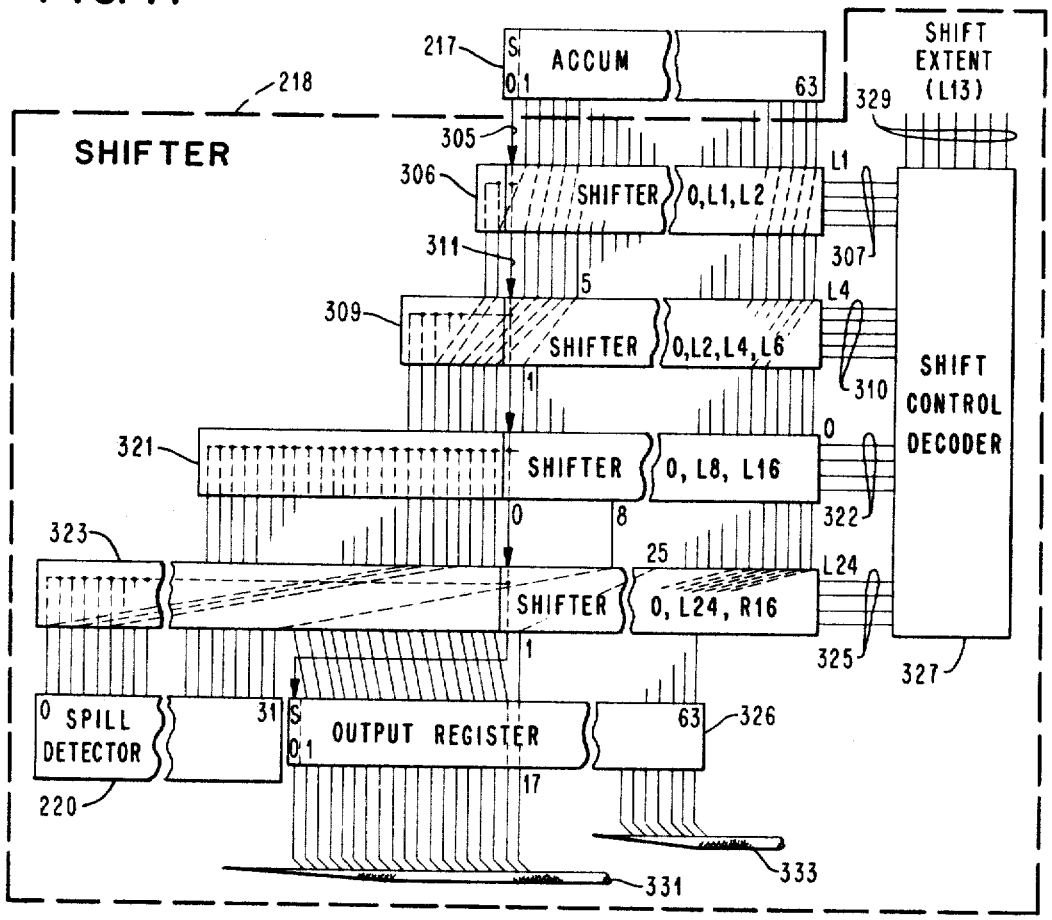

FIG. 11 is a detailed showing of the Shifter of FIG. 6B.

Figure 12:
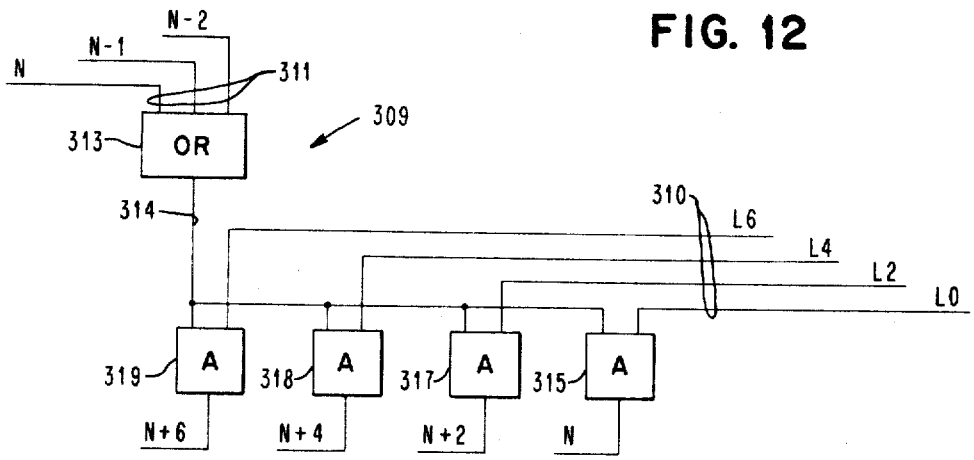

FIG. 12 is a detail of one of the shift gates of FIG. 11.

Figure 13:
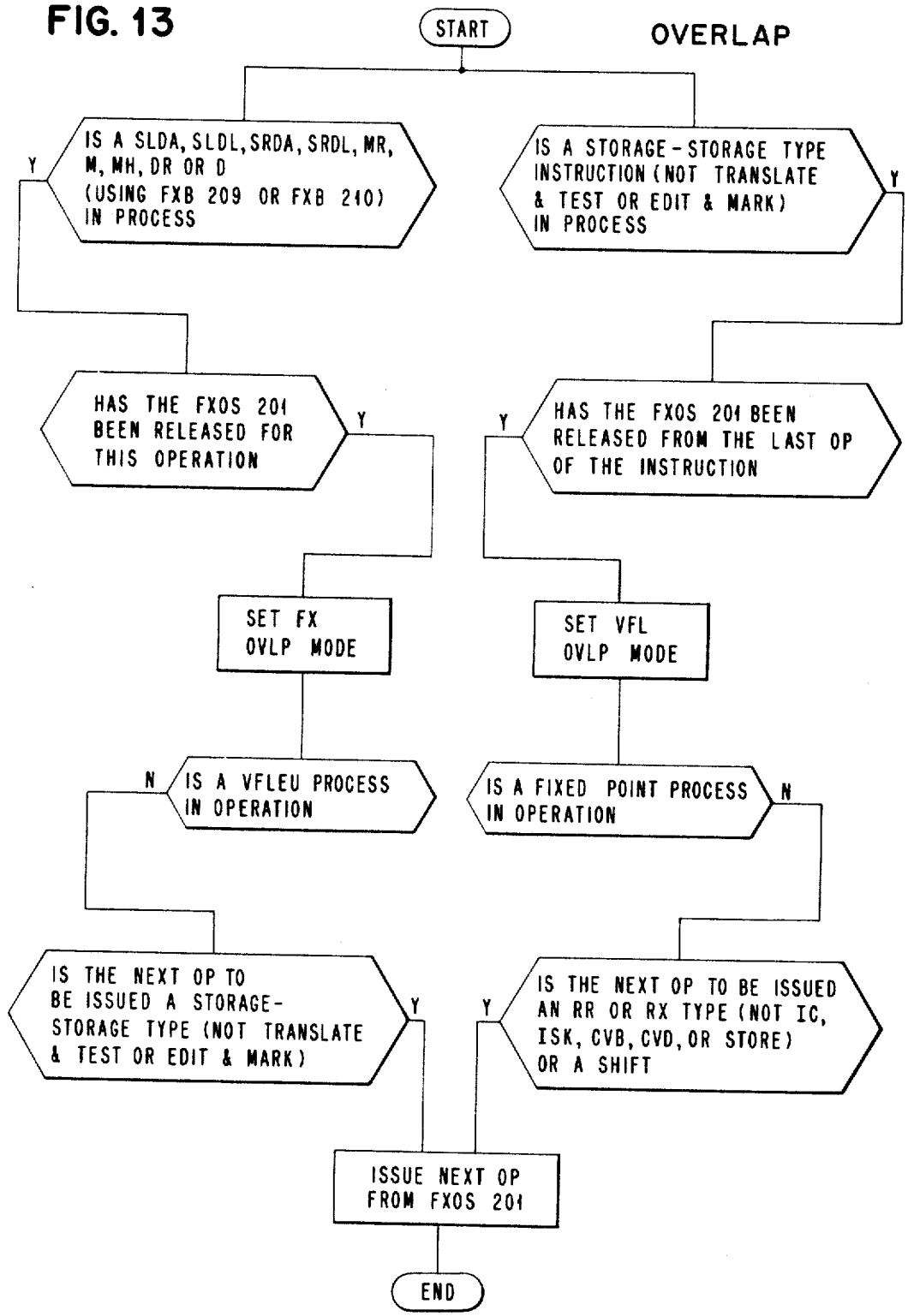
Figure 14:
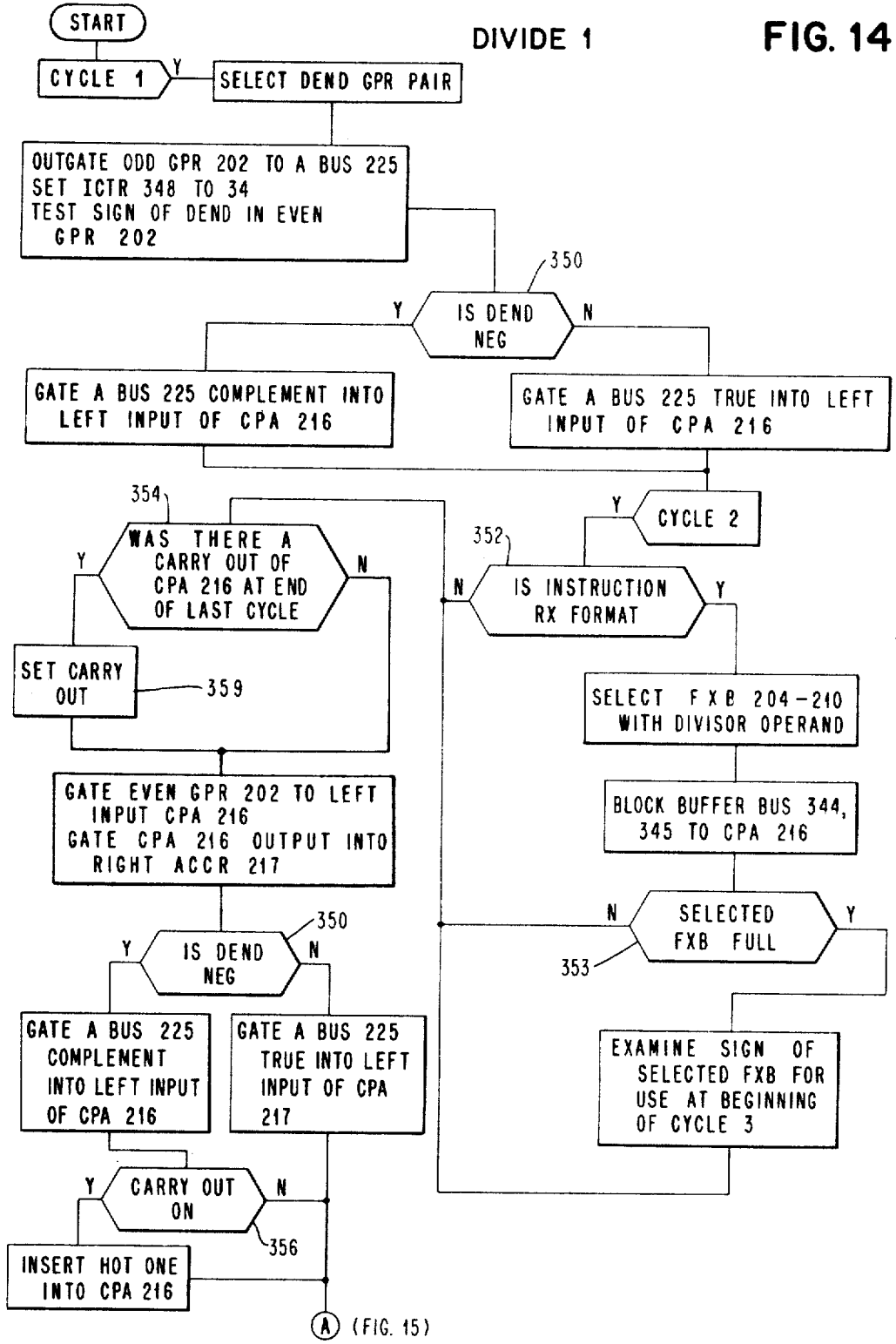

FIG. 13 is a flow chart of the Overlap type of operation of the Fixed Point Unit (FXPU).

FIGS. 14, 15, 16 and 17 combined are a flow chart of the Divide operation in the FXPU.

FIGS. 18, 19, 20, and 21 combined are a flow chart of the Multiply operation in the FXPU.

FIG. 22 is the flow chart for the Single Word Shift operation in the FXPU.

FIG. 23 shows the sequence of operations in the FXPU for the Double Word Shift instruction.

FIGS. 24, 25 and 26 combined are a flow chart showing the sequence of operations for the execution of the Convert to Binary instruction in the FXPU.

FIGS. 27, 28, and 29 combined are the flow chart showing the operation sequence for the execution of the Convert of Decimal instruction in the FXPU.

Figure 30A:
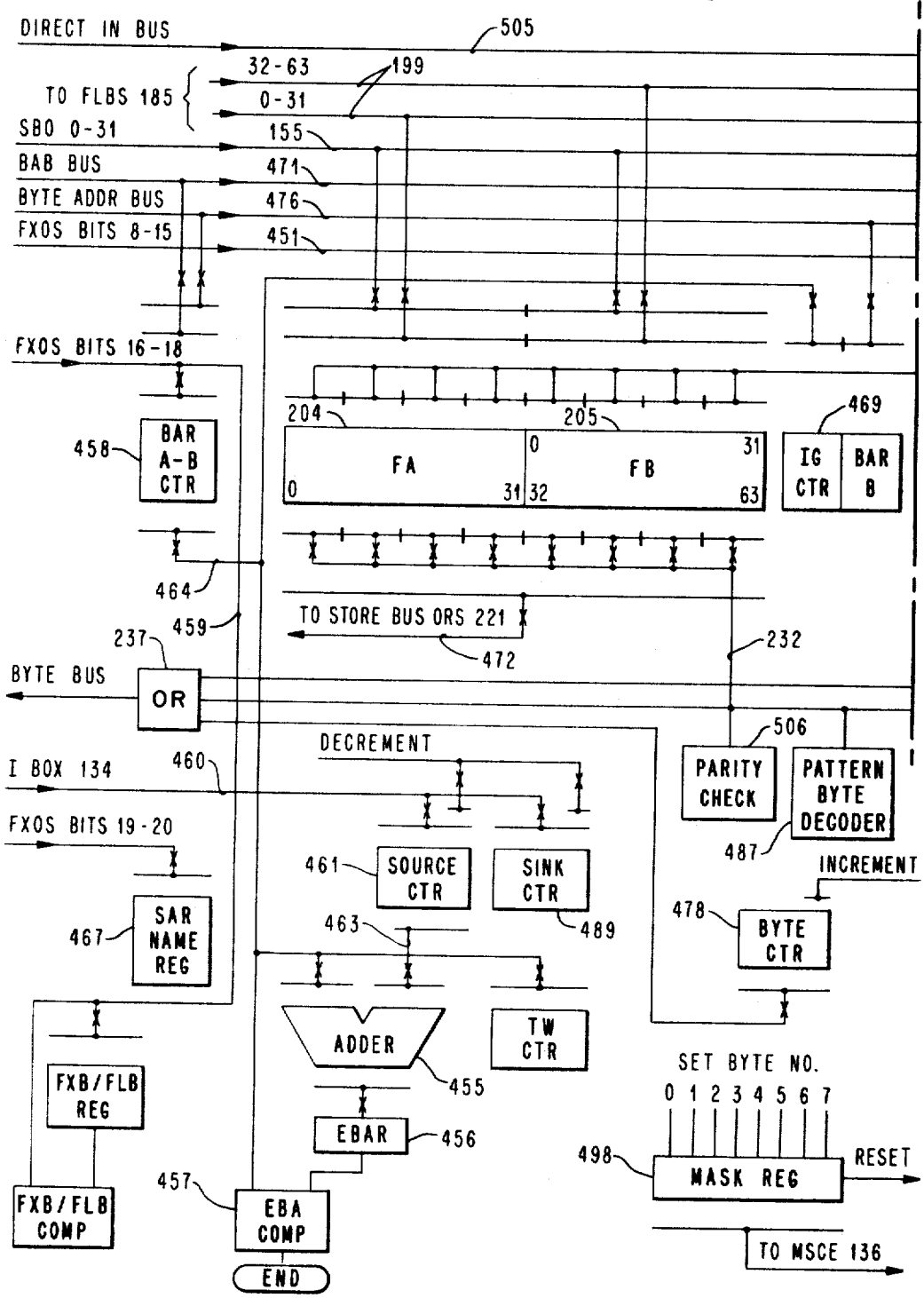
Figure 30B:
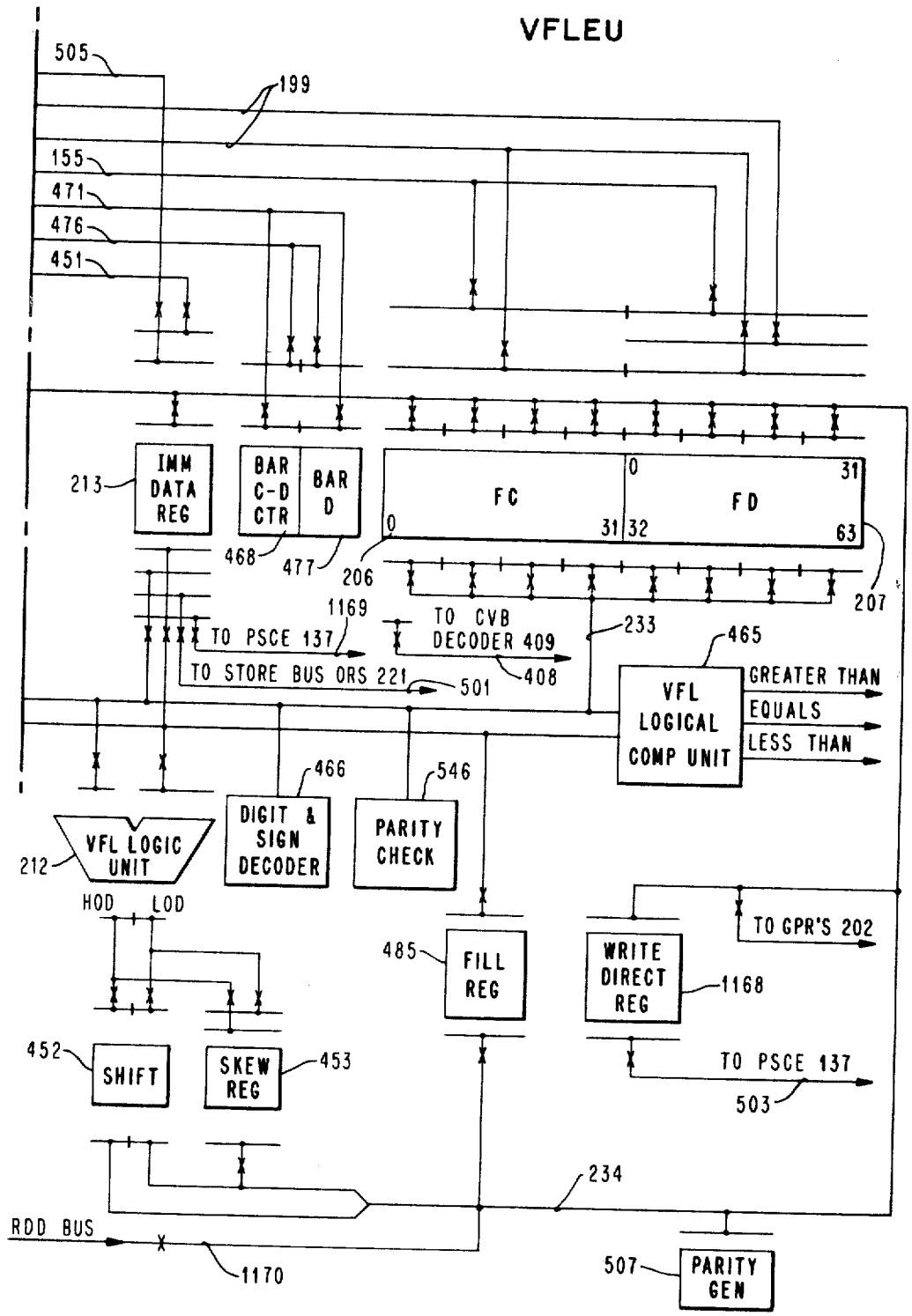

FIGS. 30A and 30B are a detailed schematic showing of the Variable Field Length part of the FXPU.

Figure 31:
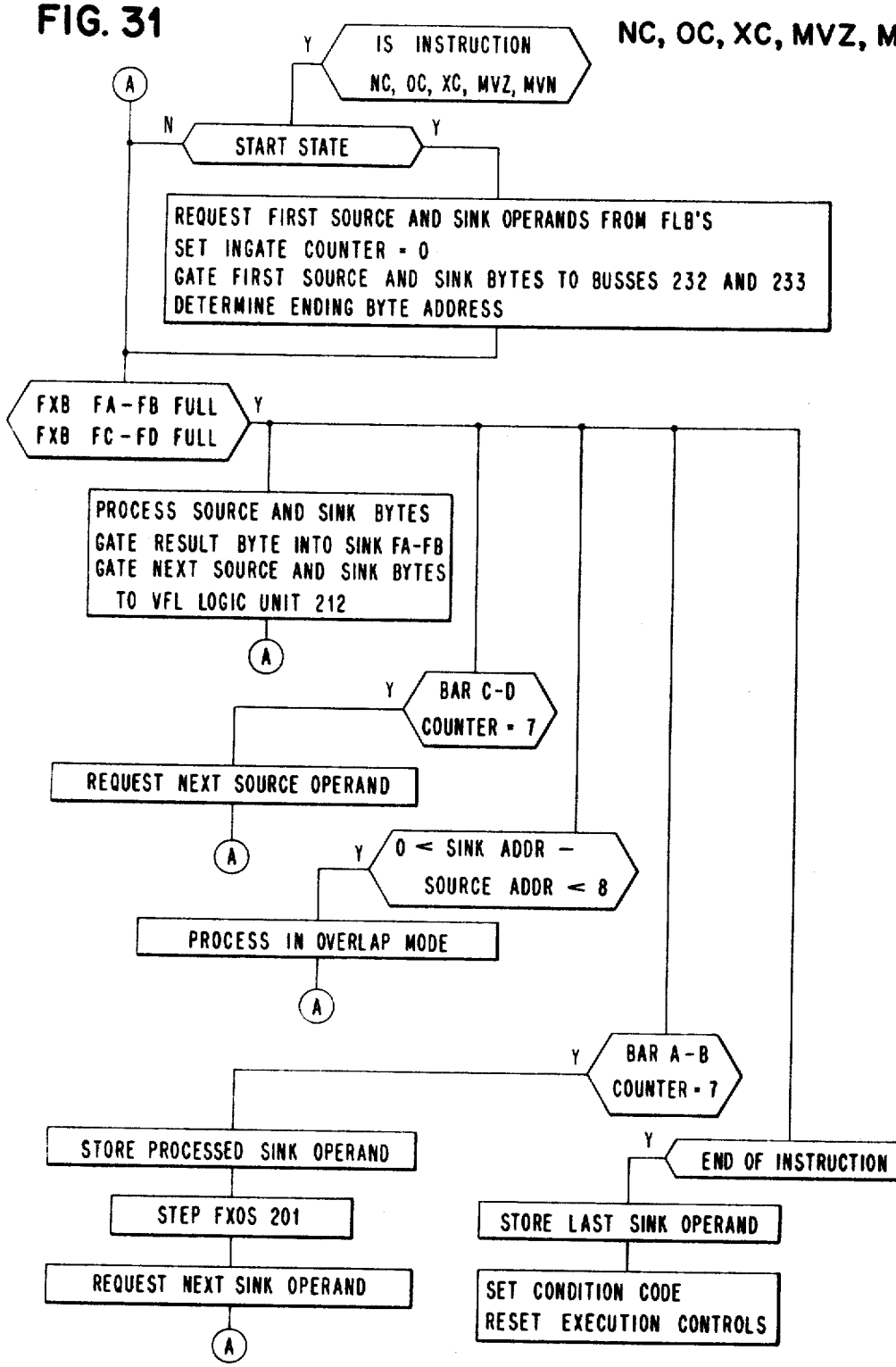

FIG. 31 is the flow chart for the execution of the variable field length instructions of AND, OR, Exclusive Or, Move Zones and Move Numerics.

Figure 32:
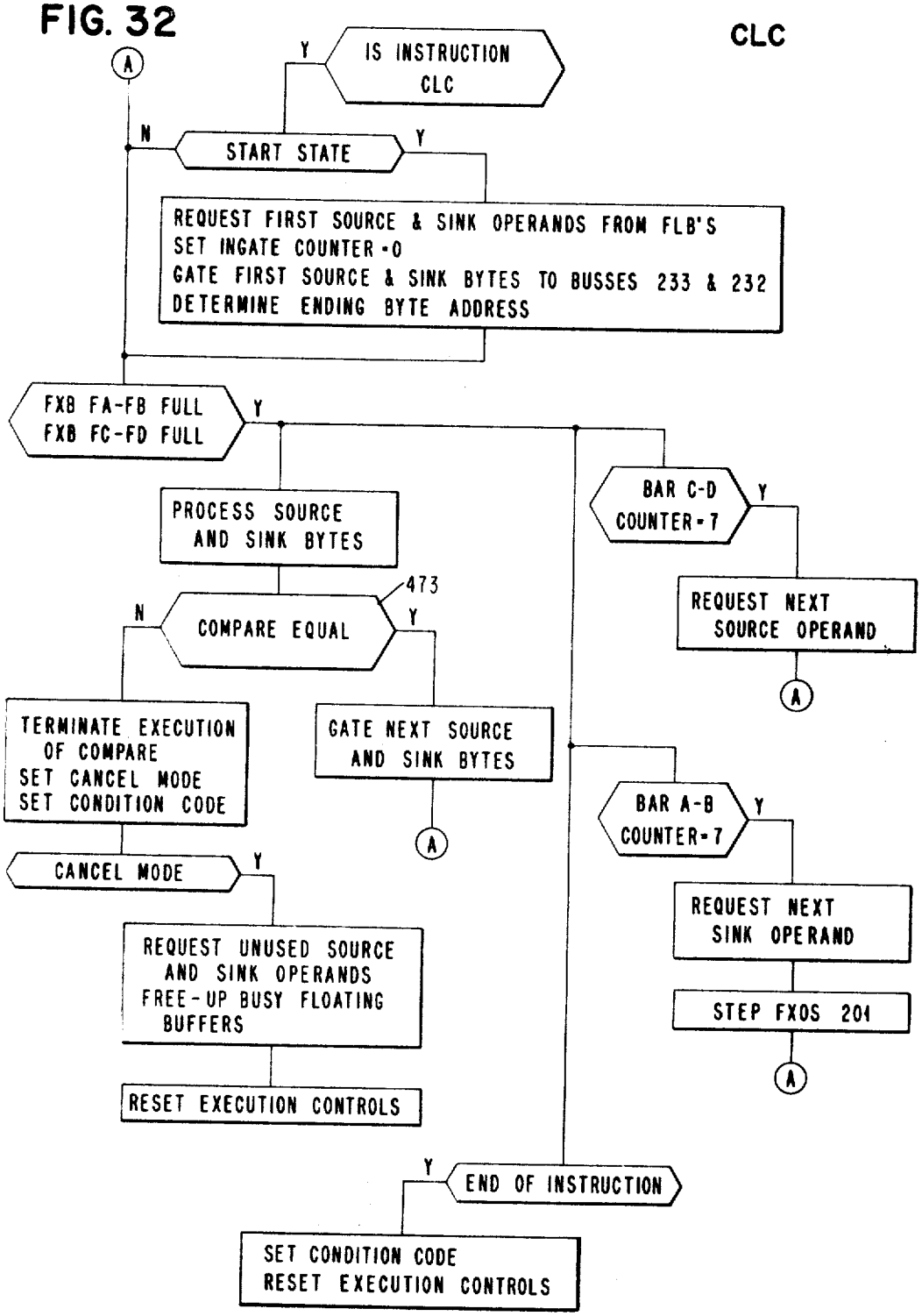

FIG. 32 is the flow chart for the variable field length instruction of Compare Logical.

Figure 33:
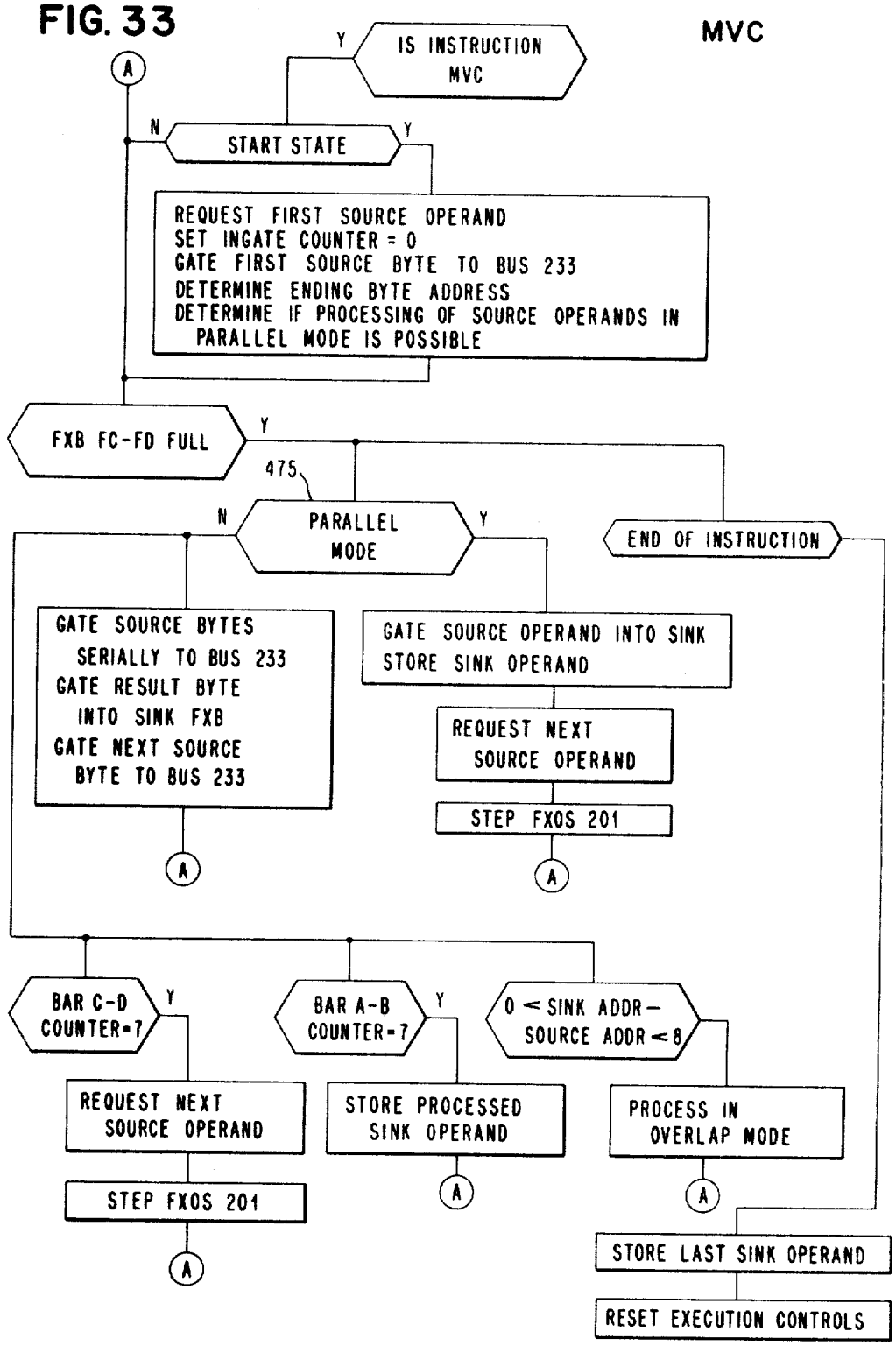

FIG. 33 is the flow chart for the operations used to perform the Move instruction for variable field length operands.

Figure 34:
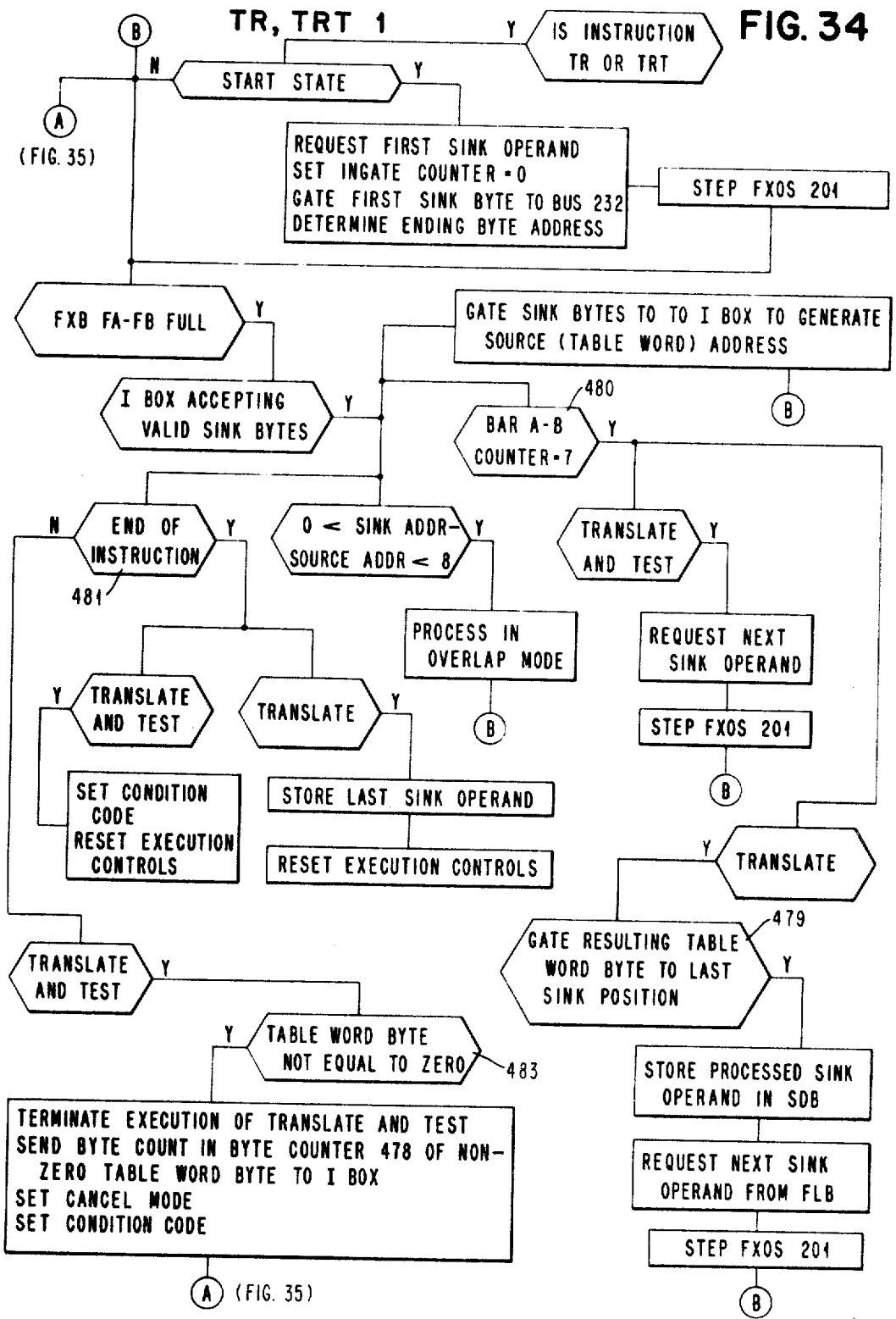
Figure 35:
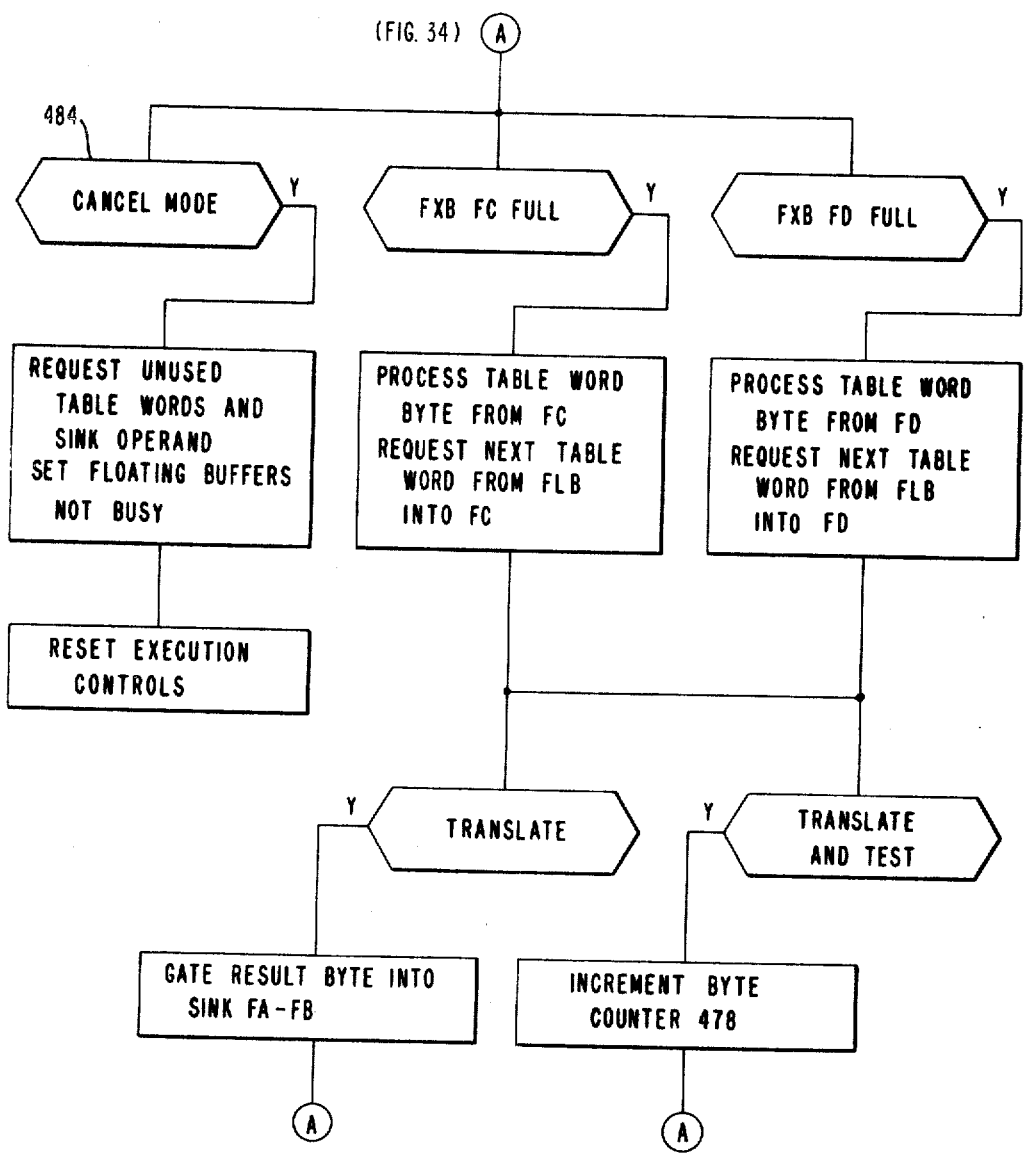

FIGS. 34 and 35 combined are the operational sequence in the variable field length part of the FXPU for the Translate and the Translate and Test instructions.

Figure 36:
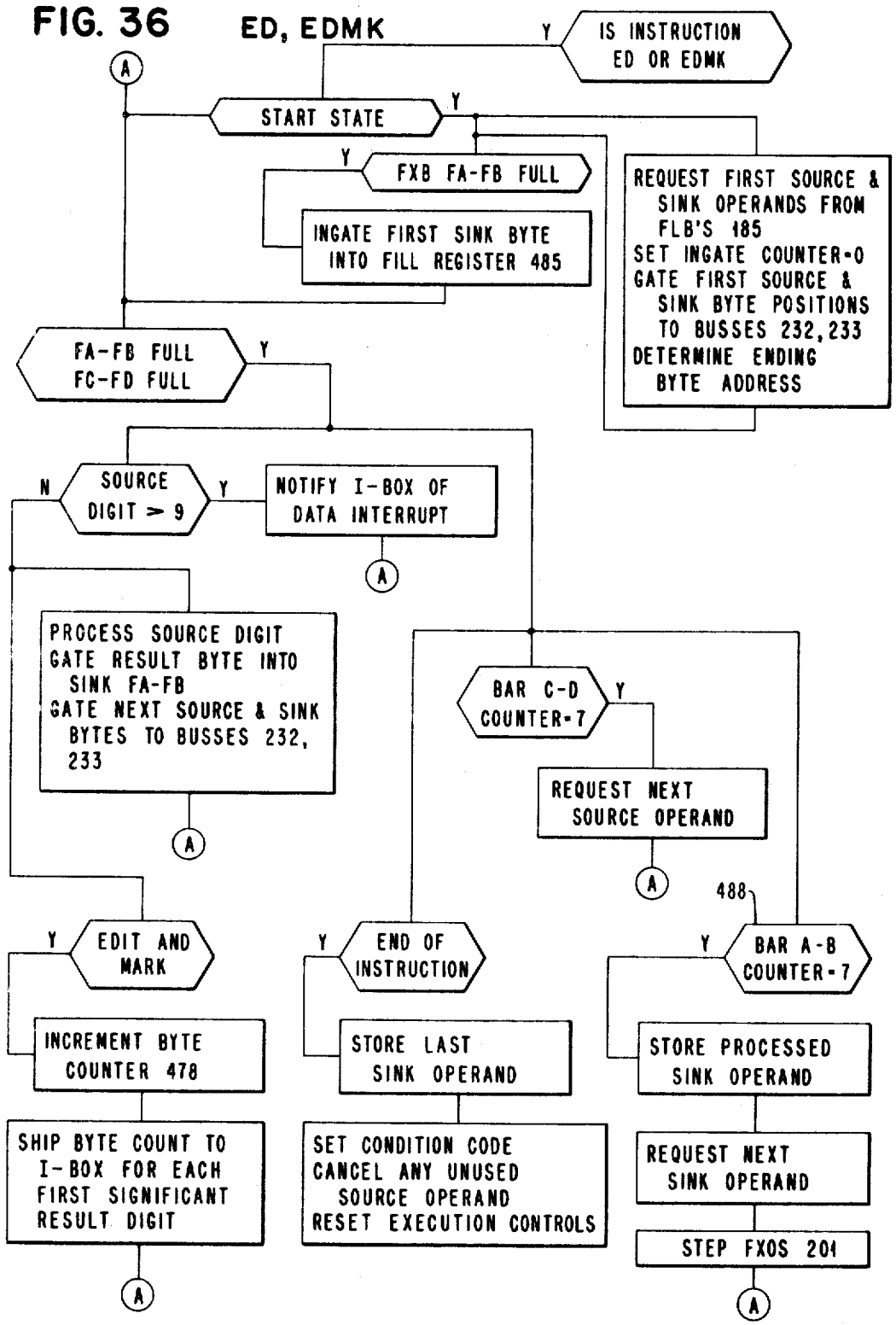

FIG. 36 shows the sequence of operations in the FXPU for the variable field length instructions of Edit and Edit and Mark.

Figure 37:
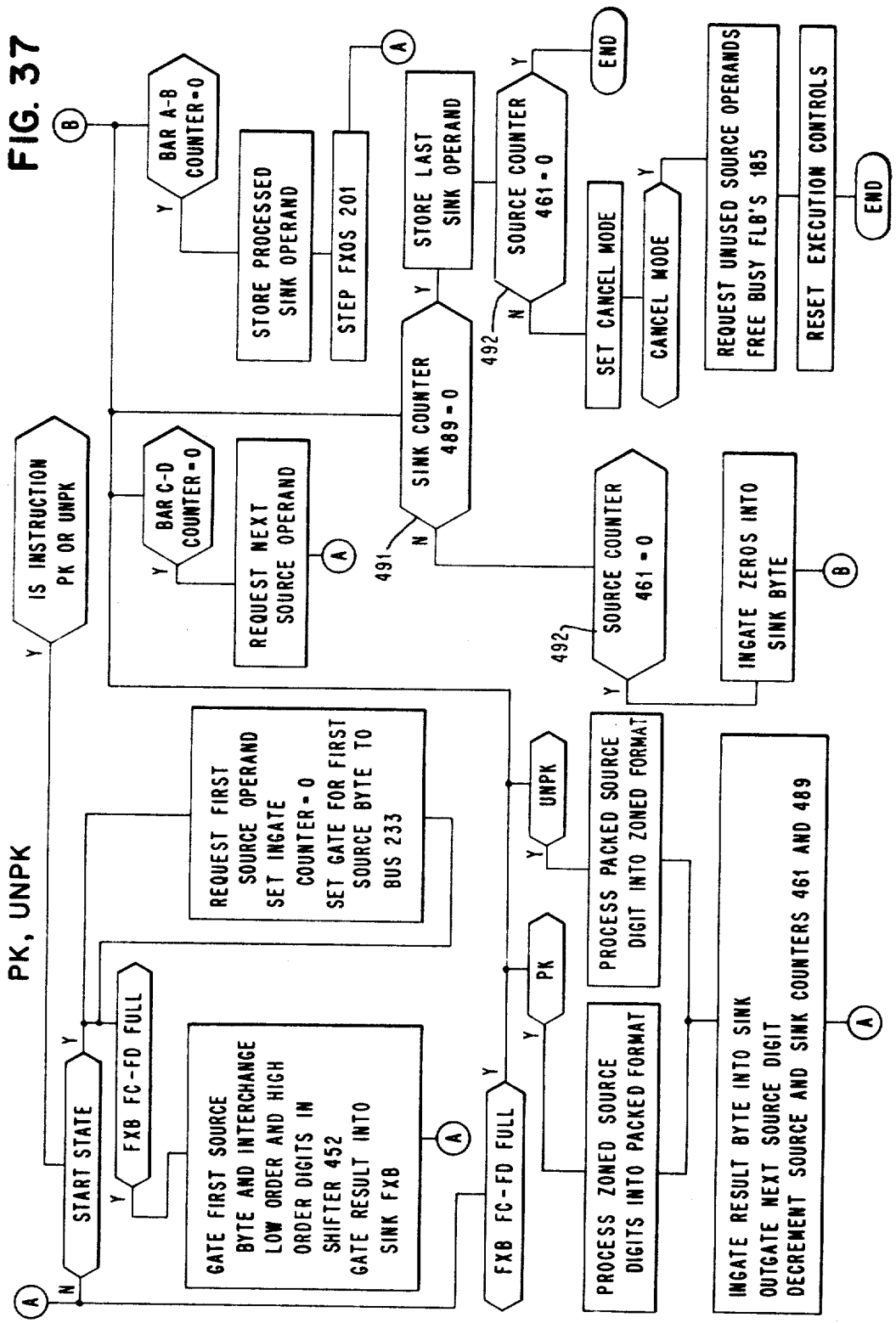

FIG. 37 shows the control sequence of operations for execution of the instructions Pack and Unpack in the FXPU.

Figure 38:
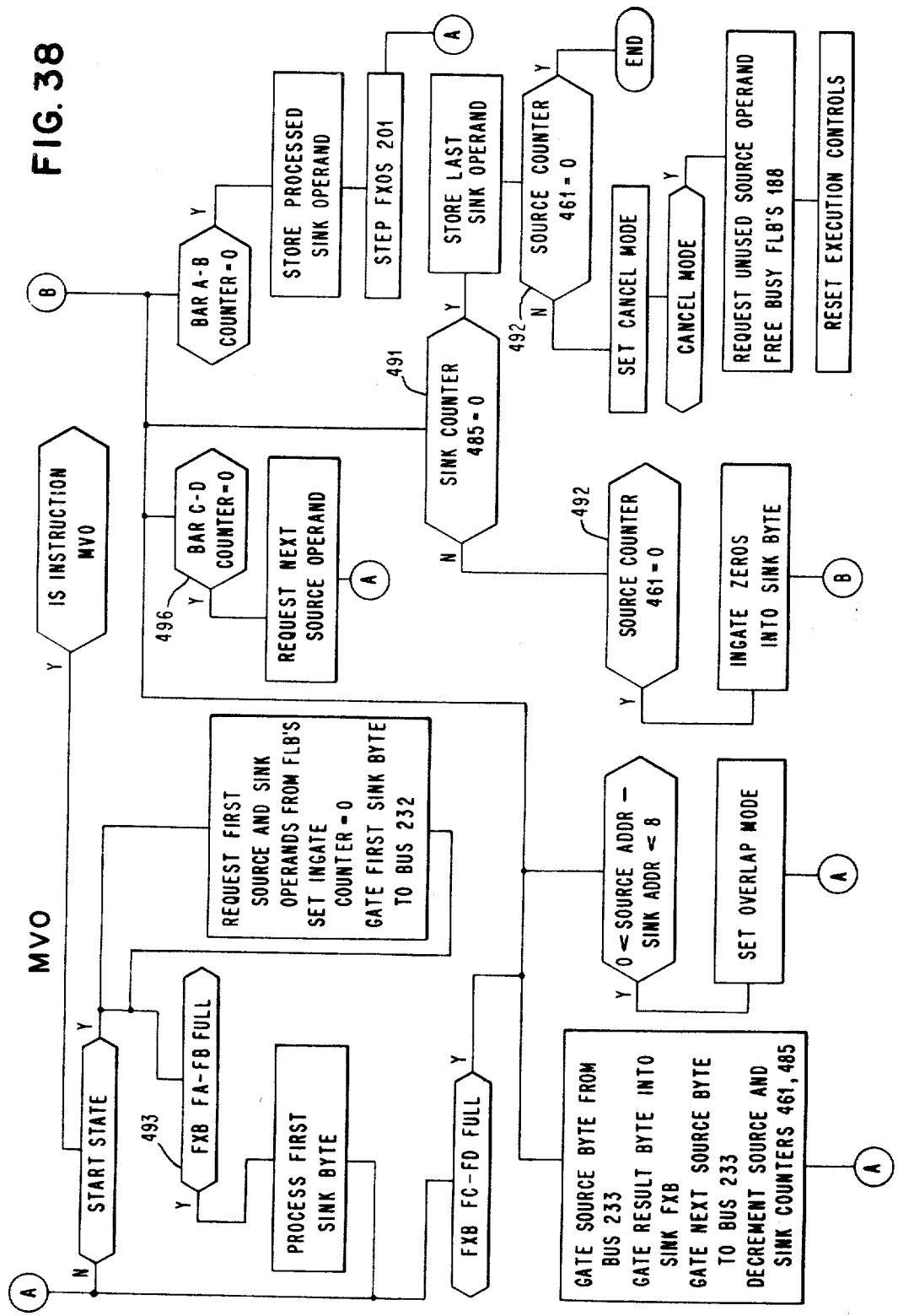

FIG. 38 is the operational sequence for the variable field length instruction Move With Offset.

FIGS. 39, 40, 41 and 42 combined show the sequence of operations within the Unit Communication Control for an add unit of the Floating Point Unit.

Figure 43A:
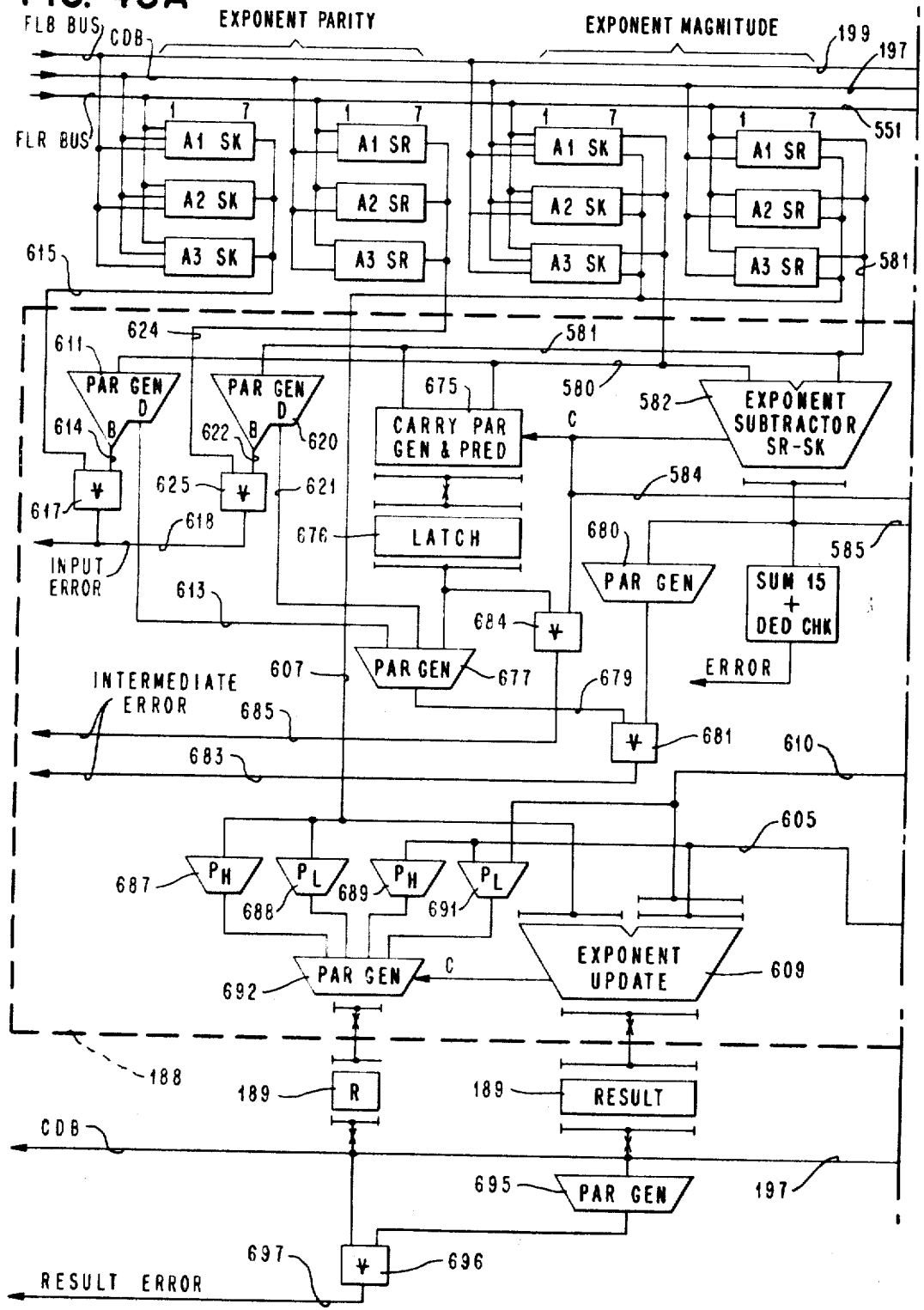
Figure 43B:
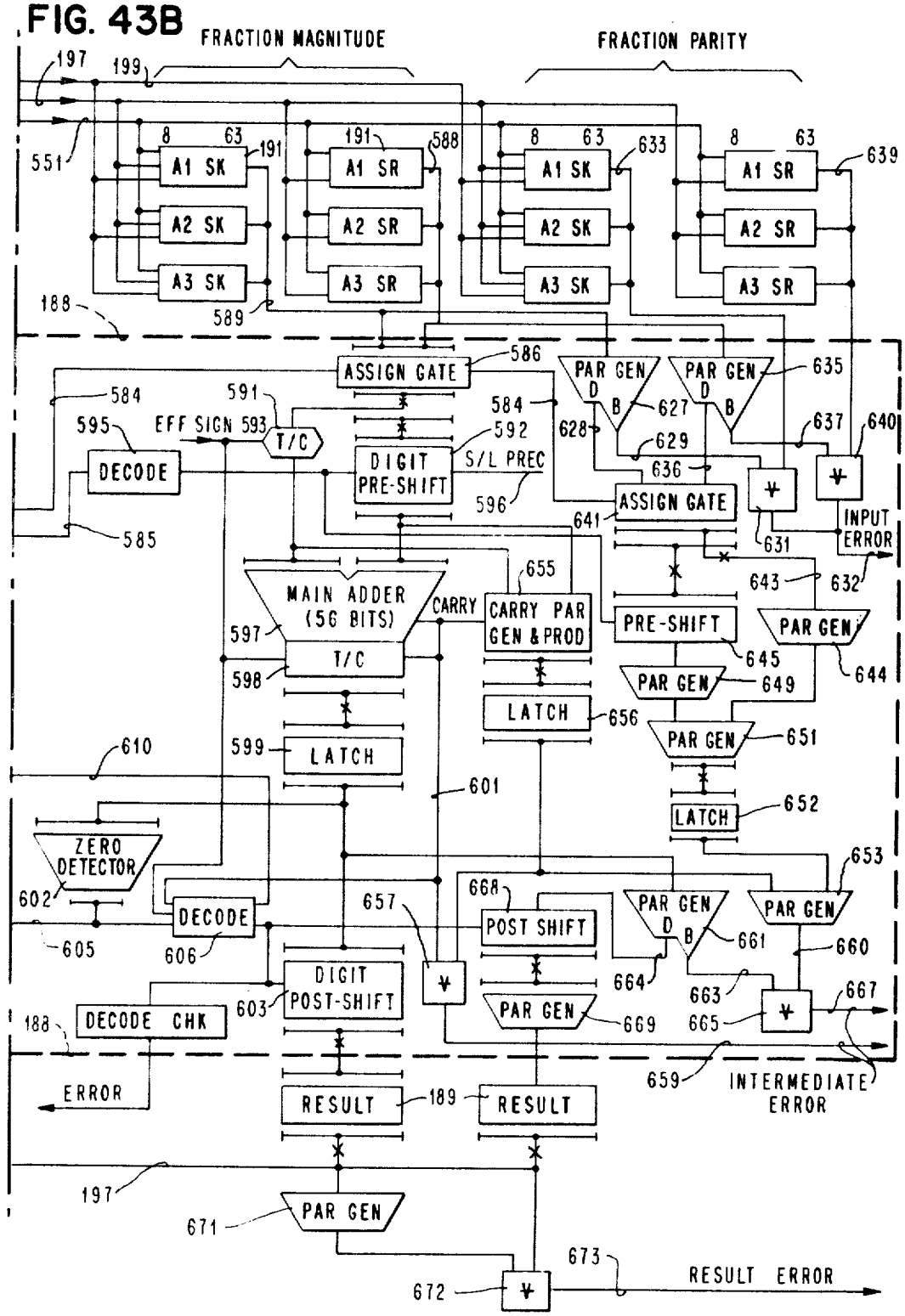

FIGS. 43A and 43B combined are a diagrammatic showing of the Add Units of the Floating Point Unit.

Figure 44A:
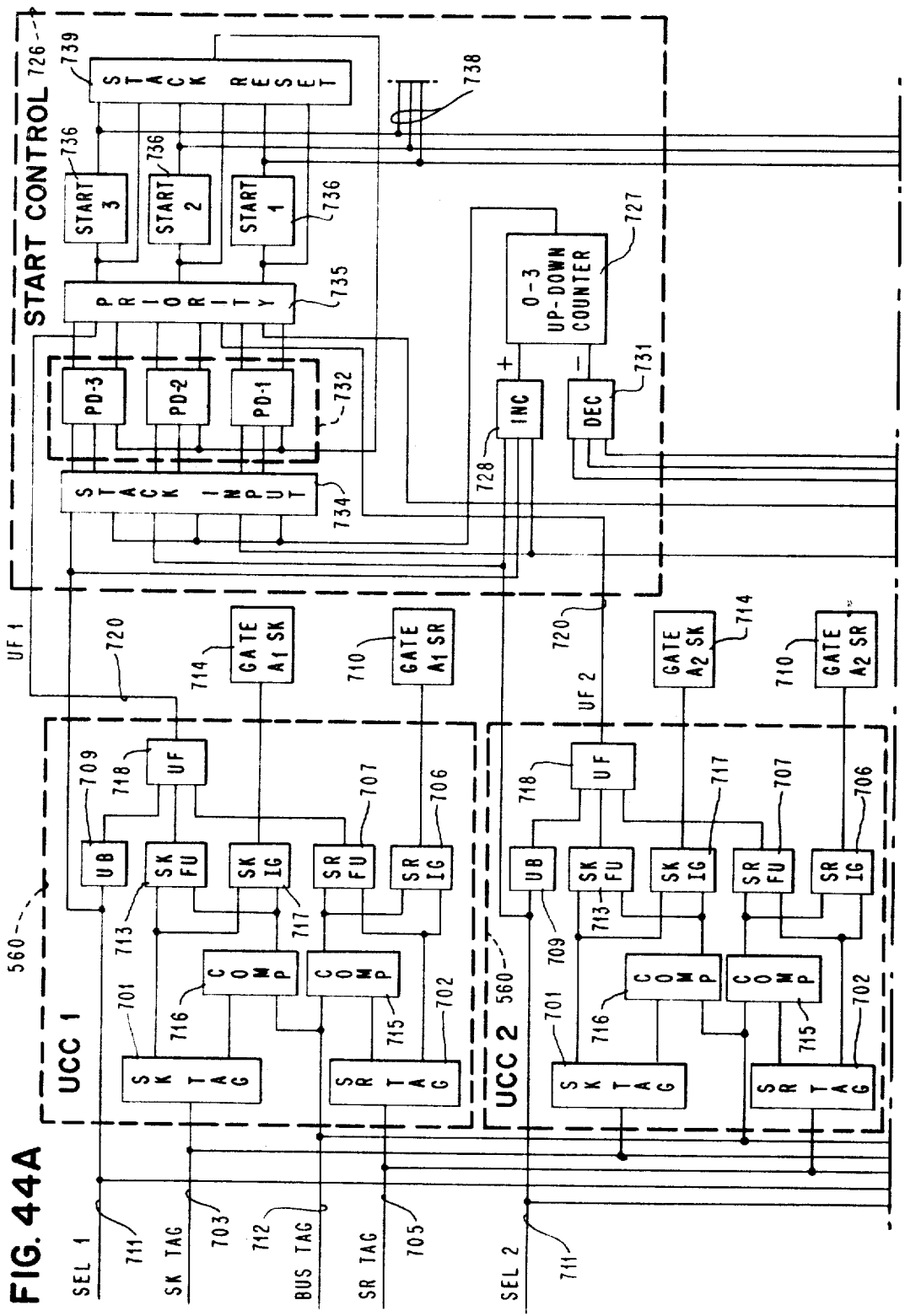

FIGS. 44A and 44B combined are a diagrammatic showing of the Unit Communication Controls for the Add Units.

FIGS. 45 and 46 together are a flow chart of the sequence of operations for the Start Control of an Add Unit.

FIG. 47 is the sequence of operations for the Instruction Decode controls for an Add Unit.

FIGS. 48 and 49 combined are a flow chart for the operational sequence for Sign Control in the Add Unit.

FIGS. 50 and 51 together are the operational sequence in the Add Unit for setting the Condition Code.

FIGS. 52A and 52B combined show diagrammatically the functional units of the Multiply/Divide Unit of the Floating Point Unit.

FIG. 53 is a diagrammatic representation of the Exponent Section of the Multiply/Divide Unit.

FIG. 54 is a diagram of the relationship between the multiplier and multiplicand digits and the Multiply/Divide Unit gates.

FIG. 55 shows the error checking circuits for the Multiply/Divide Unit.

FIG. 56 indicates the bit positions at which the successive divisor reciprocals are generated.

FIG. 57 indicates the alignment between the Mulitply Unit bit positions and the successive divisor iteration terms.

FIGS. 58A, 58B, 58C, 58D, 58E, 58F, 58G and 58H combined are a detailed diagram of the functional units of and the data flow in the Instruction Unit.

Figure 58A:
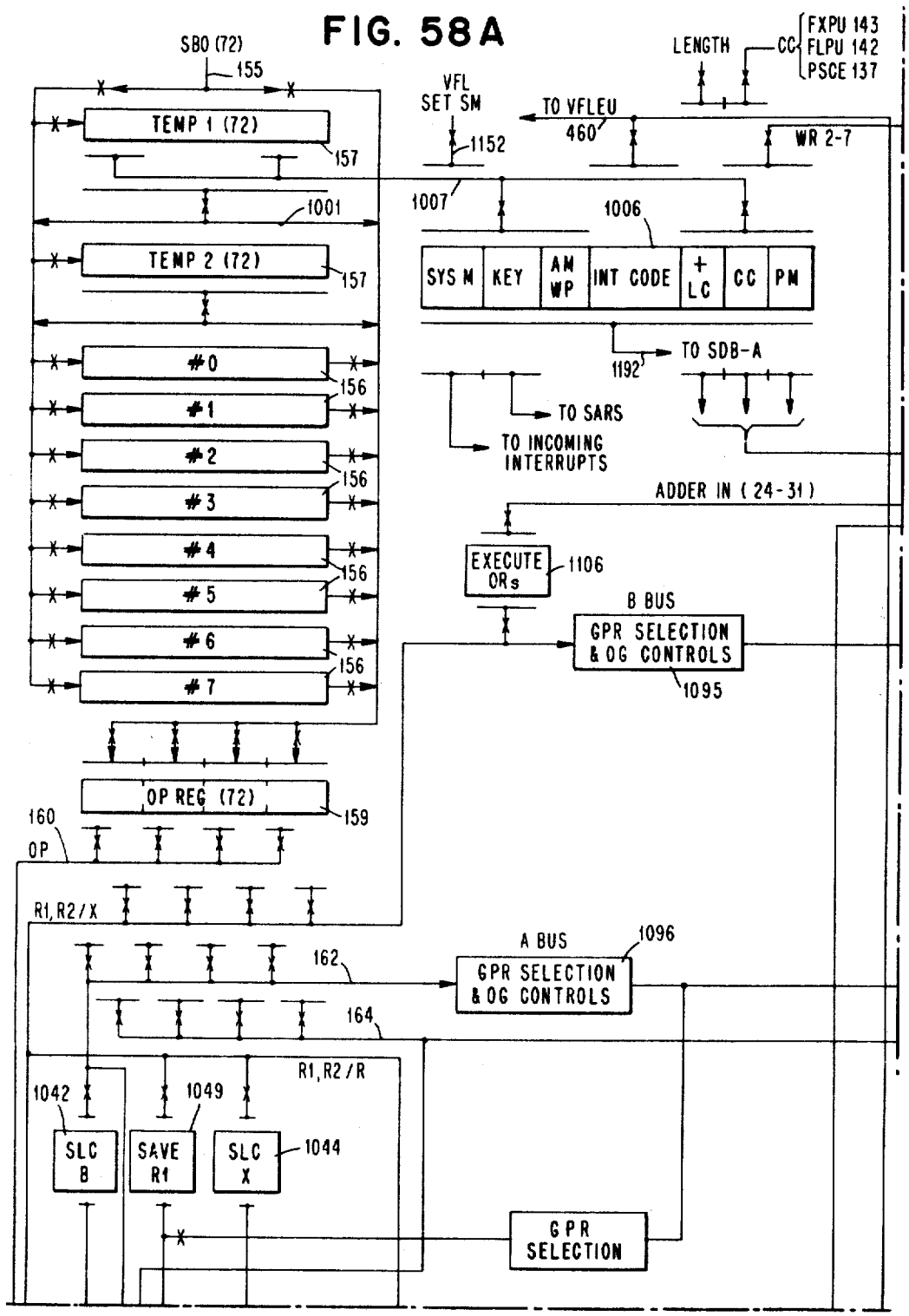
Figure 58C:
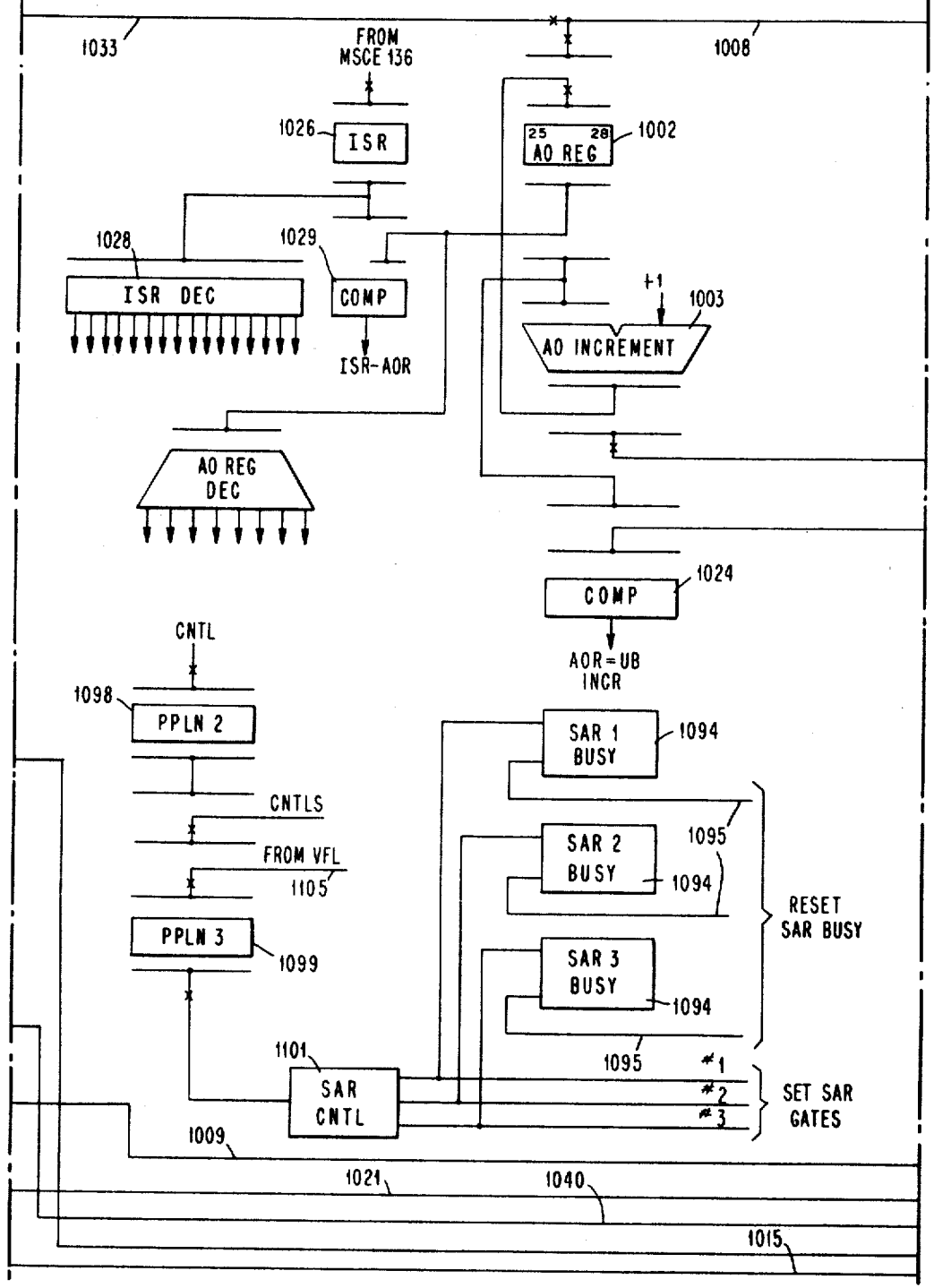
Figure 58D:
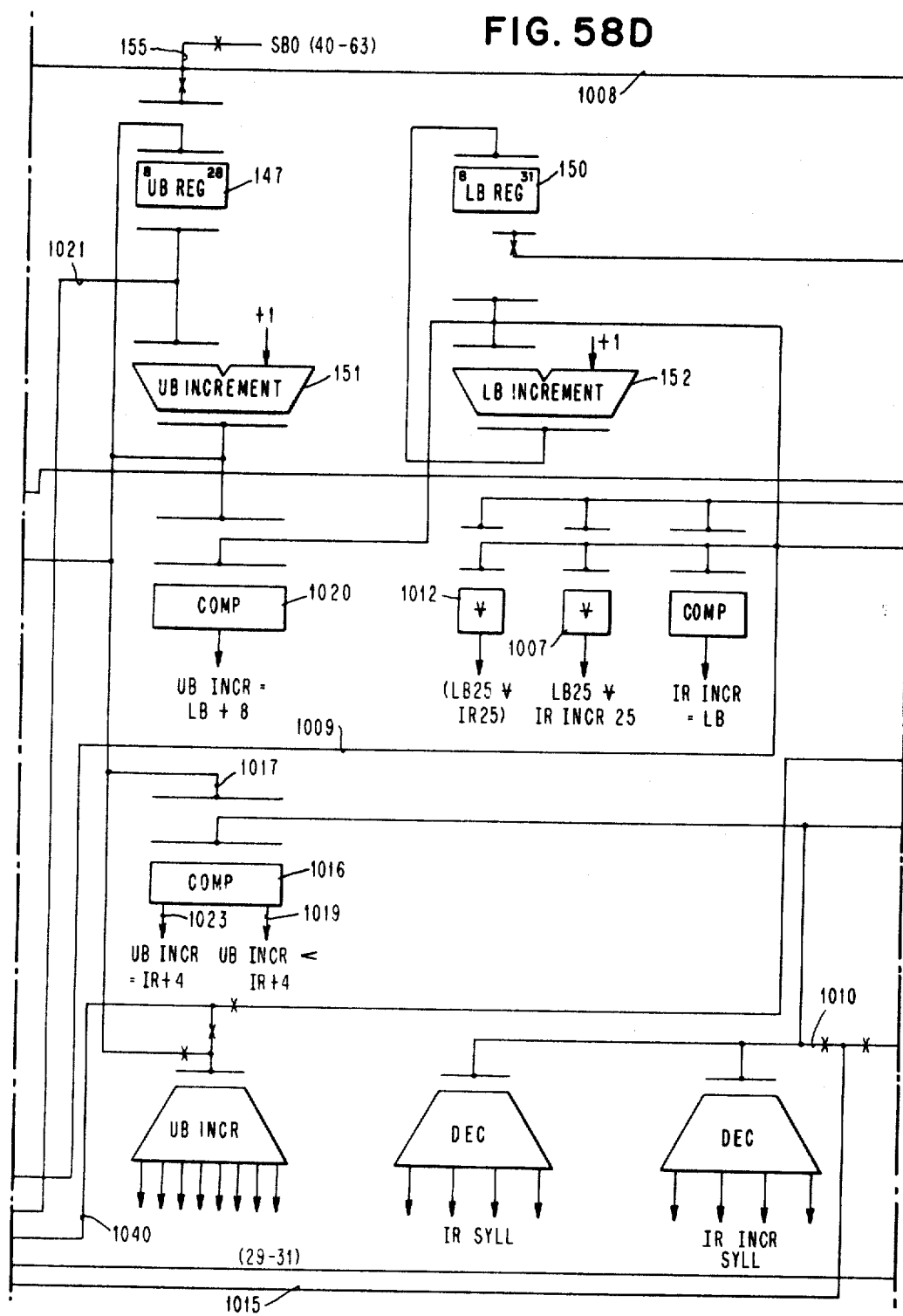
Figure 58G:
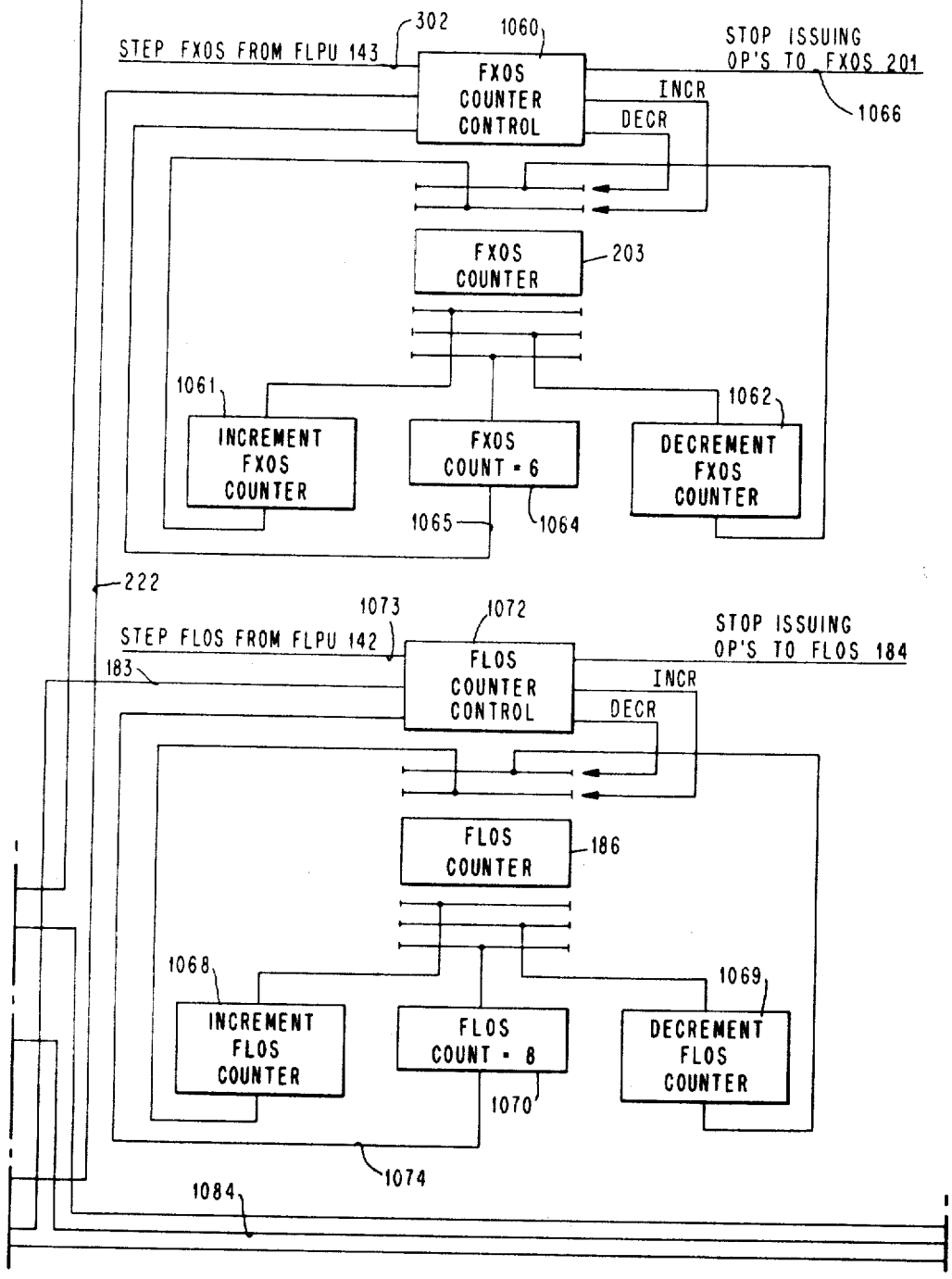
Figure 58H:
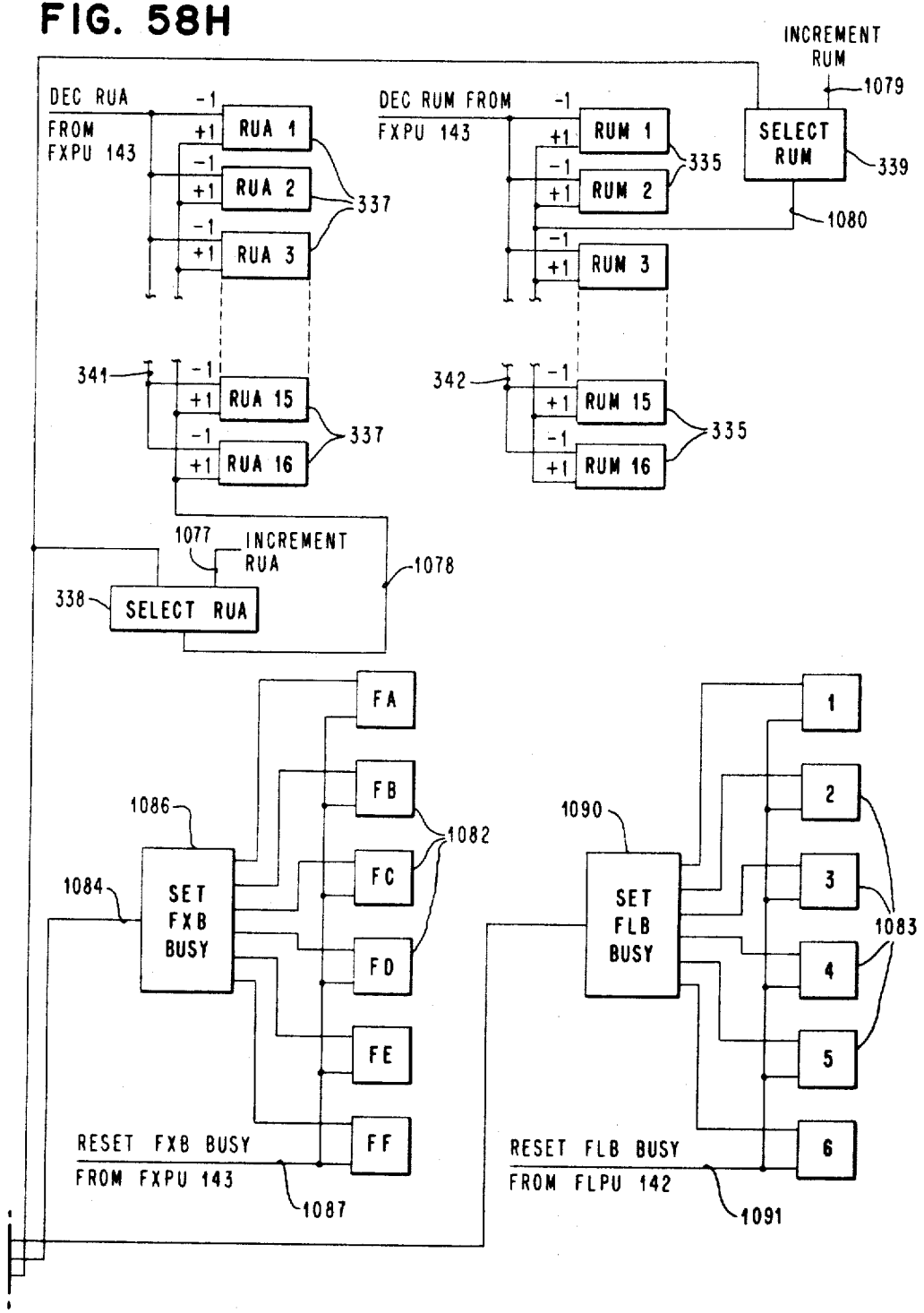

FIG. 58J is a diagram indicating the relative position of the FIGS. 58A to 58H inclusive.

FIG. 59 is a flow chart of the sequence of operations for an Execute instruction.

FIG. 60 is a flow chart of the operational sequence for an Unconditional Branch operation.

Figure 61:
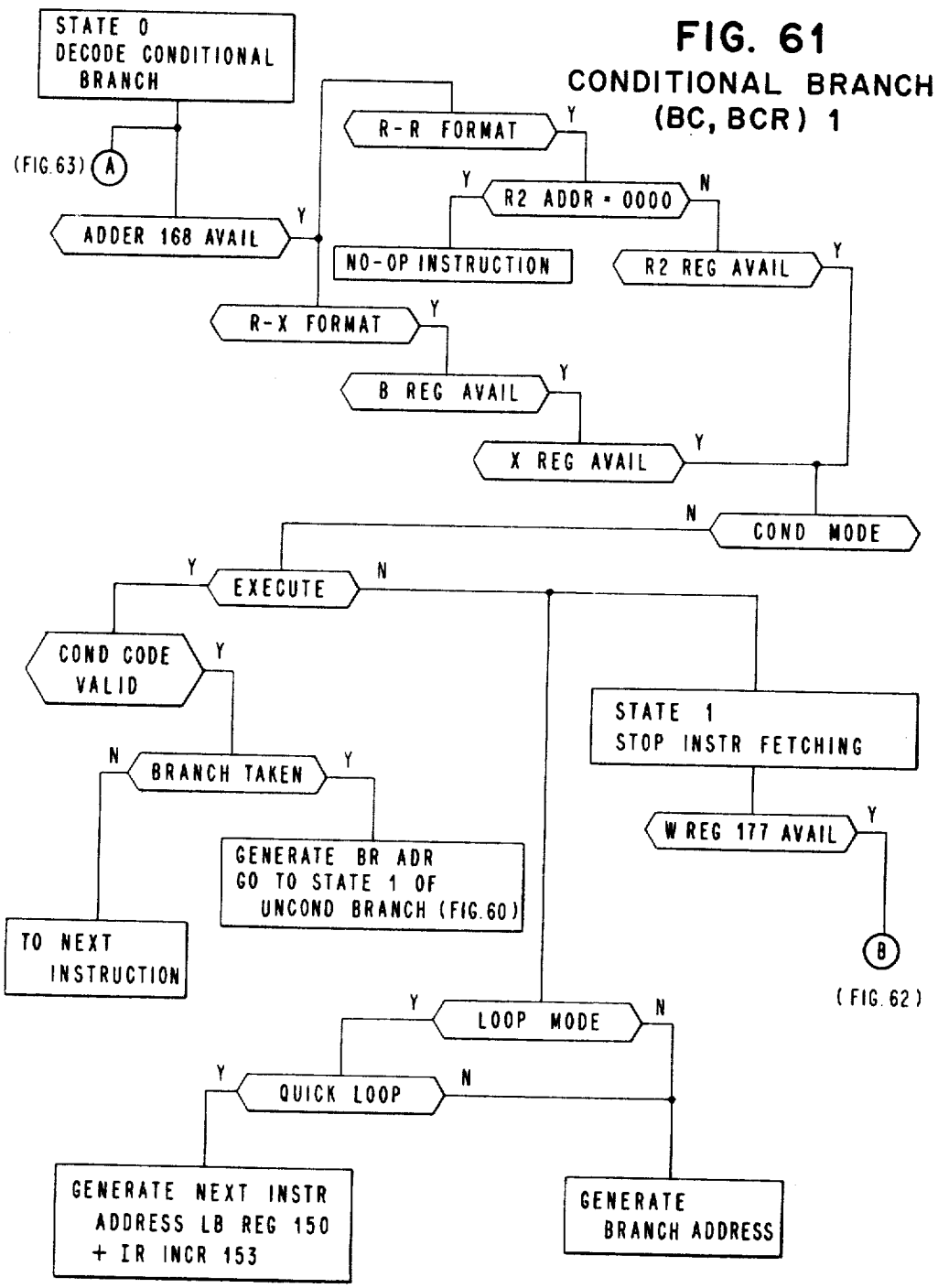
Figure 62:
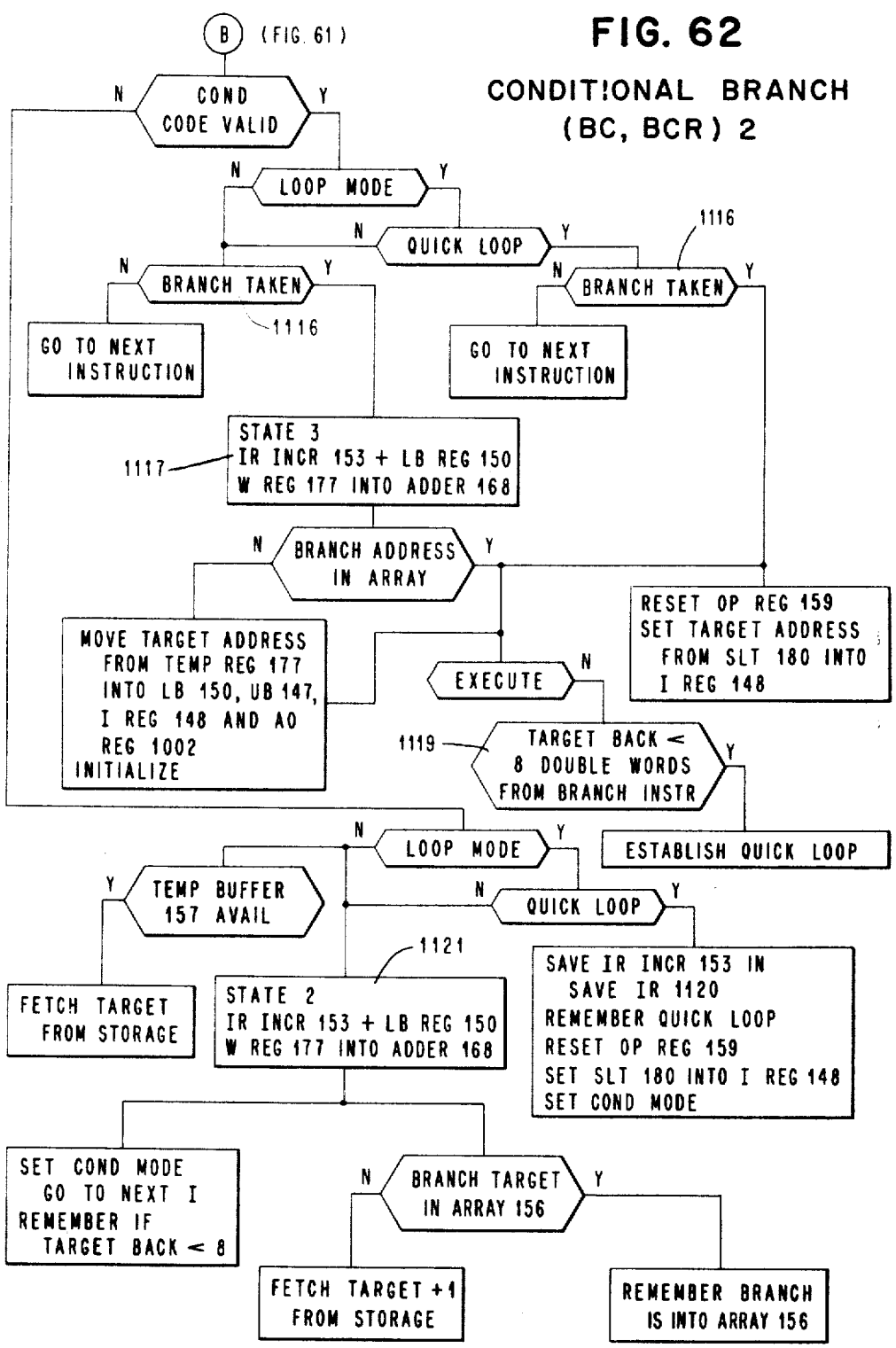

FIGS. 61 and 62 together show the operational sequence for the Conditional Branch type of instruction.

Figure 63:
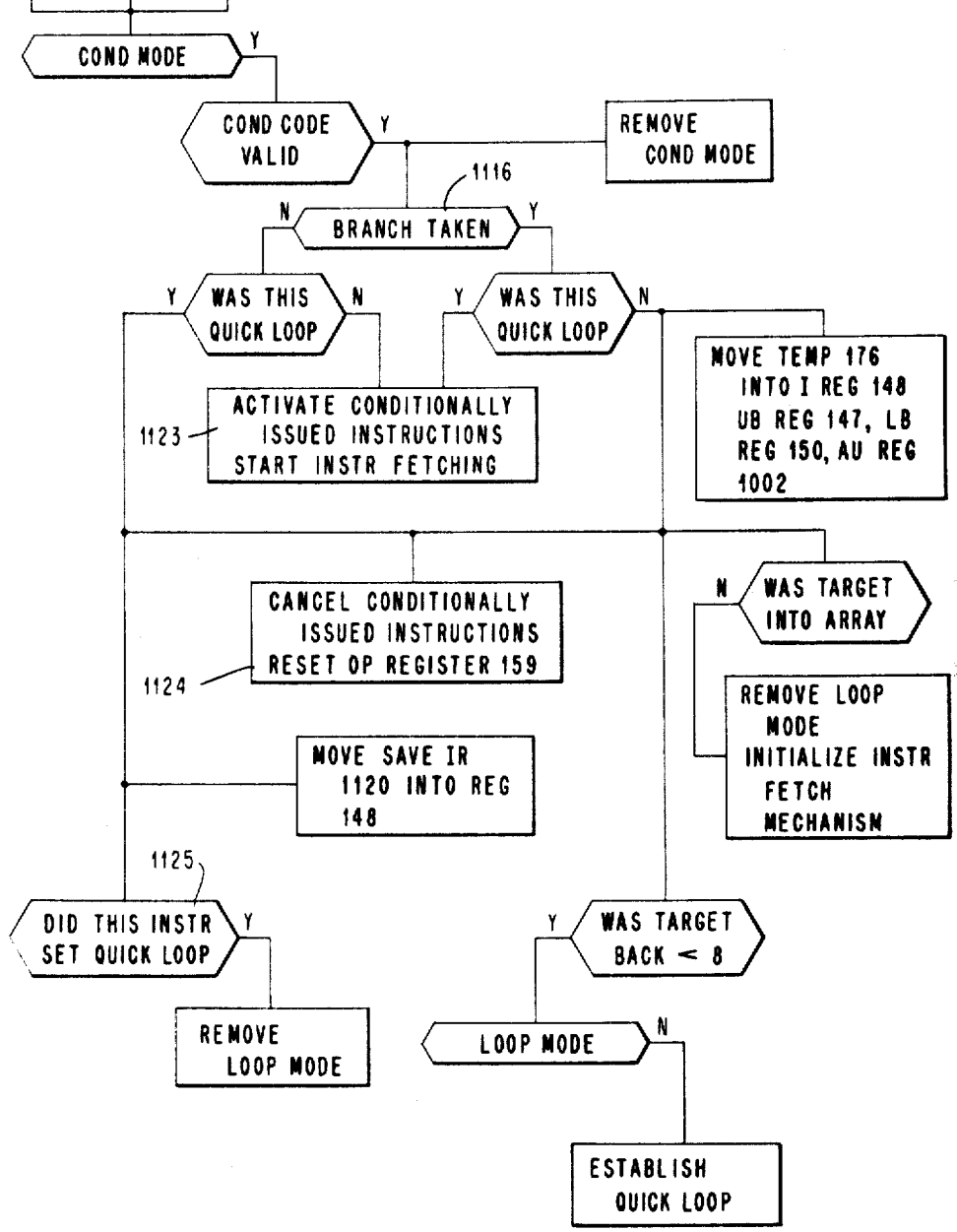

FIG. 63 is the flow chart for the Loop Mode setting of the Instruction Unit.

Figure 64:
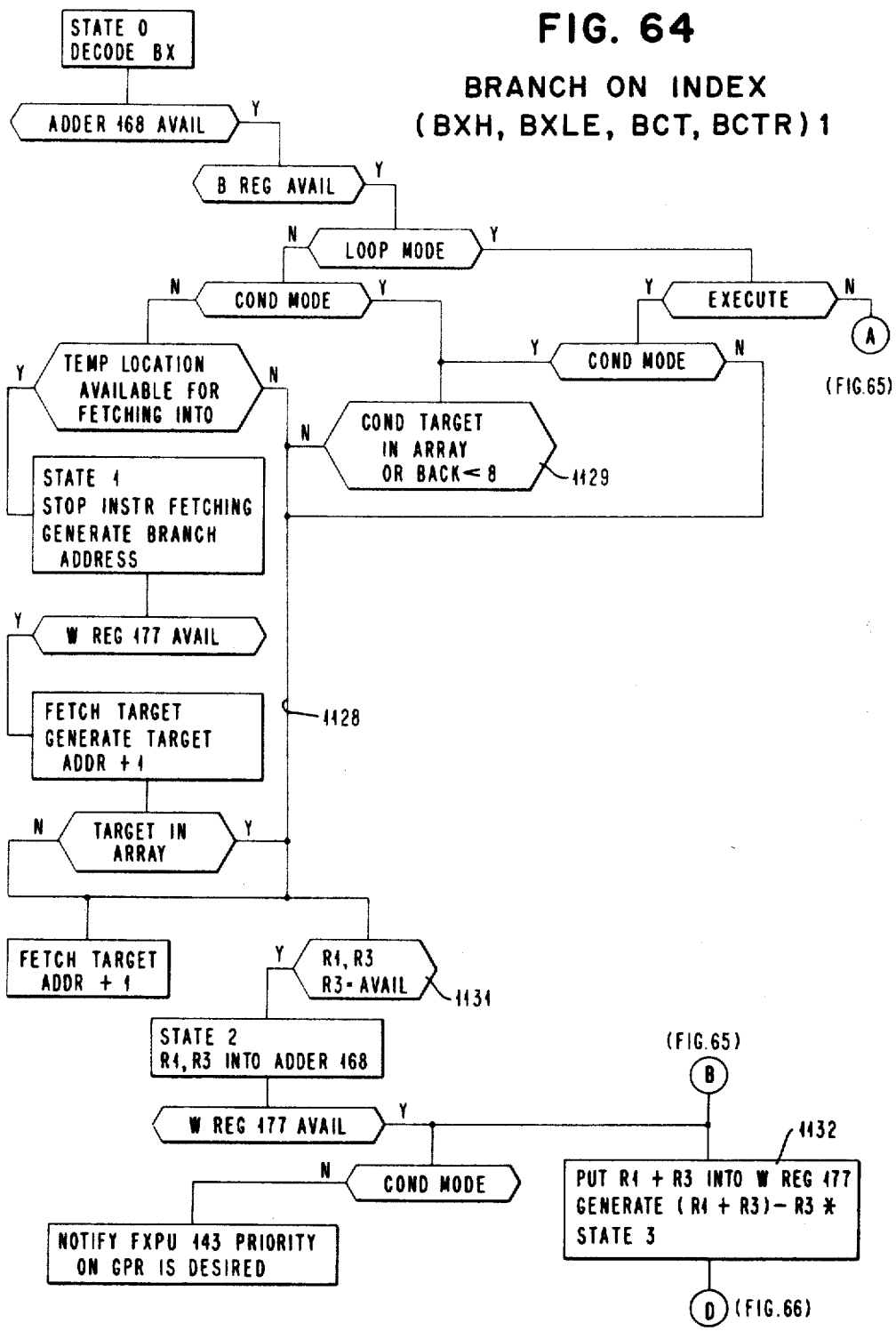
Figure 65:
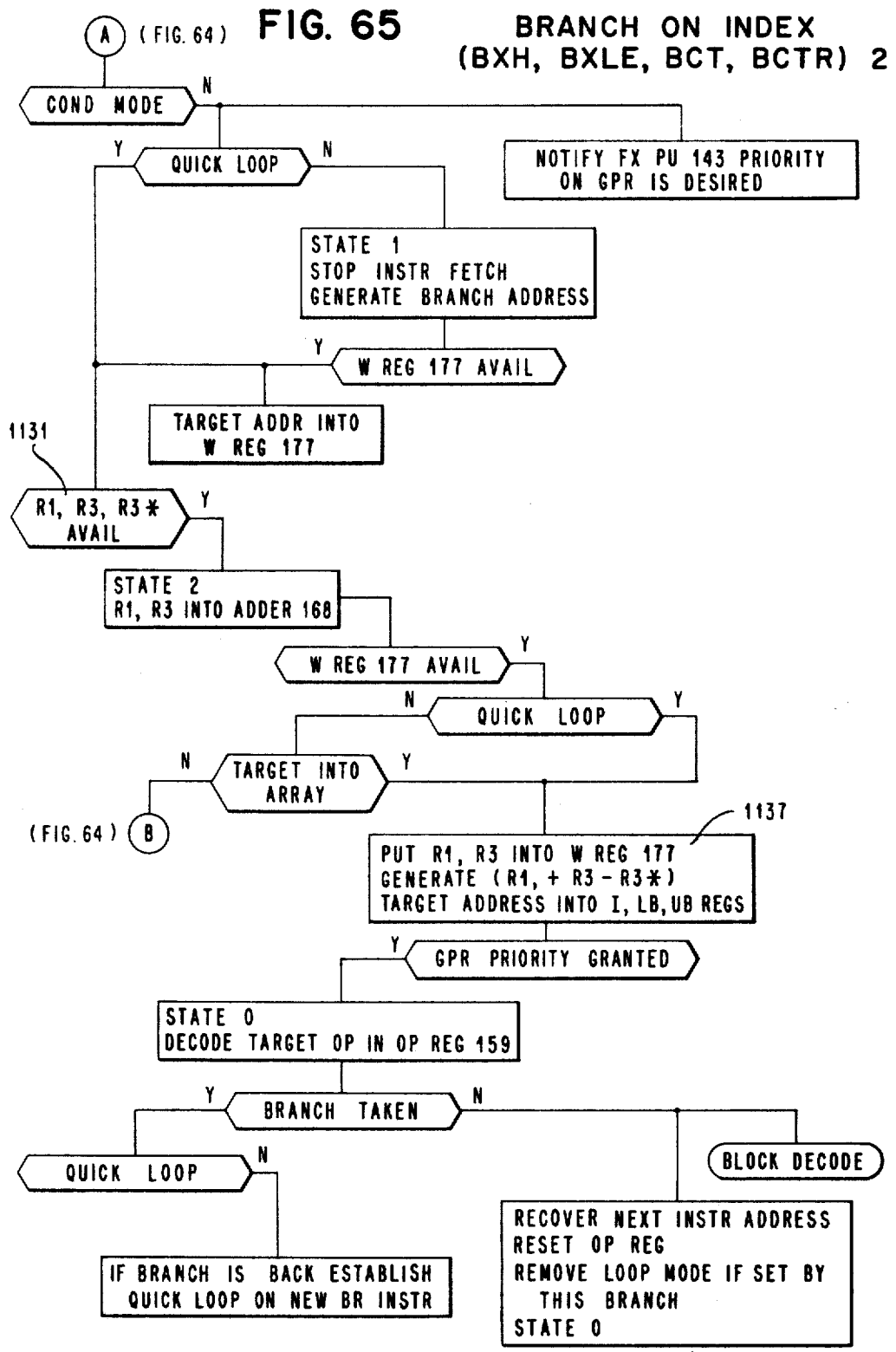
Figure 66:
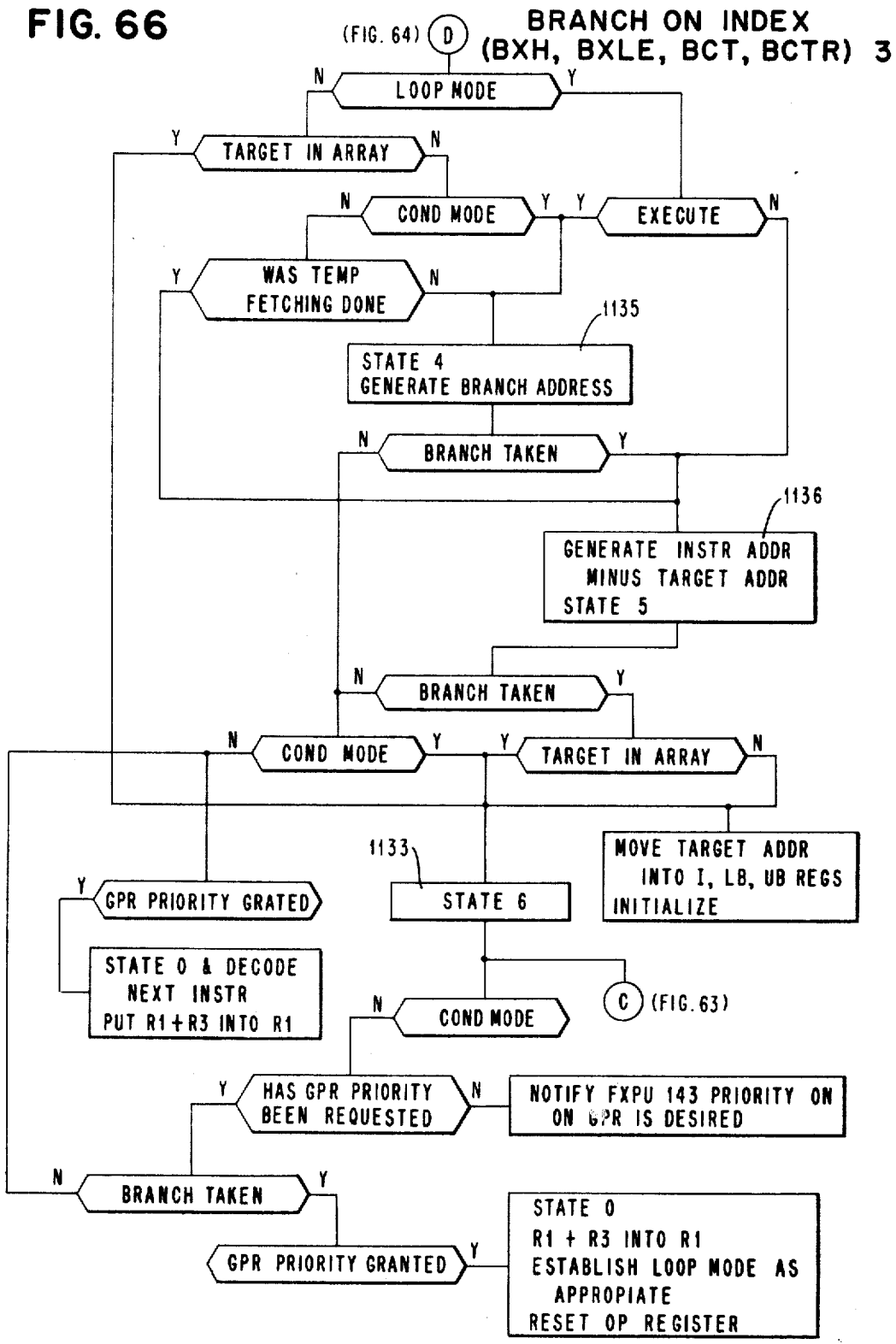

FIGS. 64, 65 and 66 are a flow chart for the sequence of Instruction Unit operations on a Branch On Index instruction.

Figure 67:
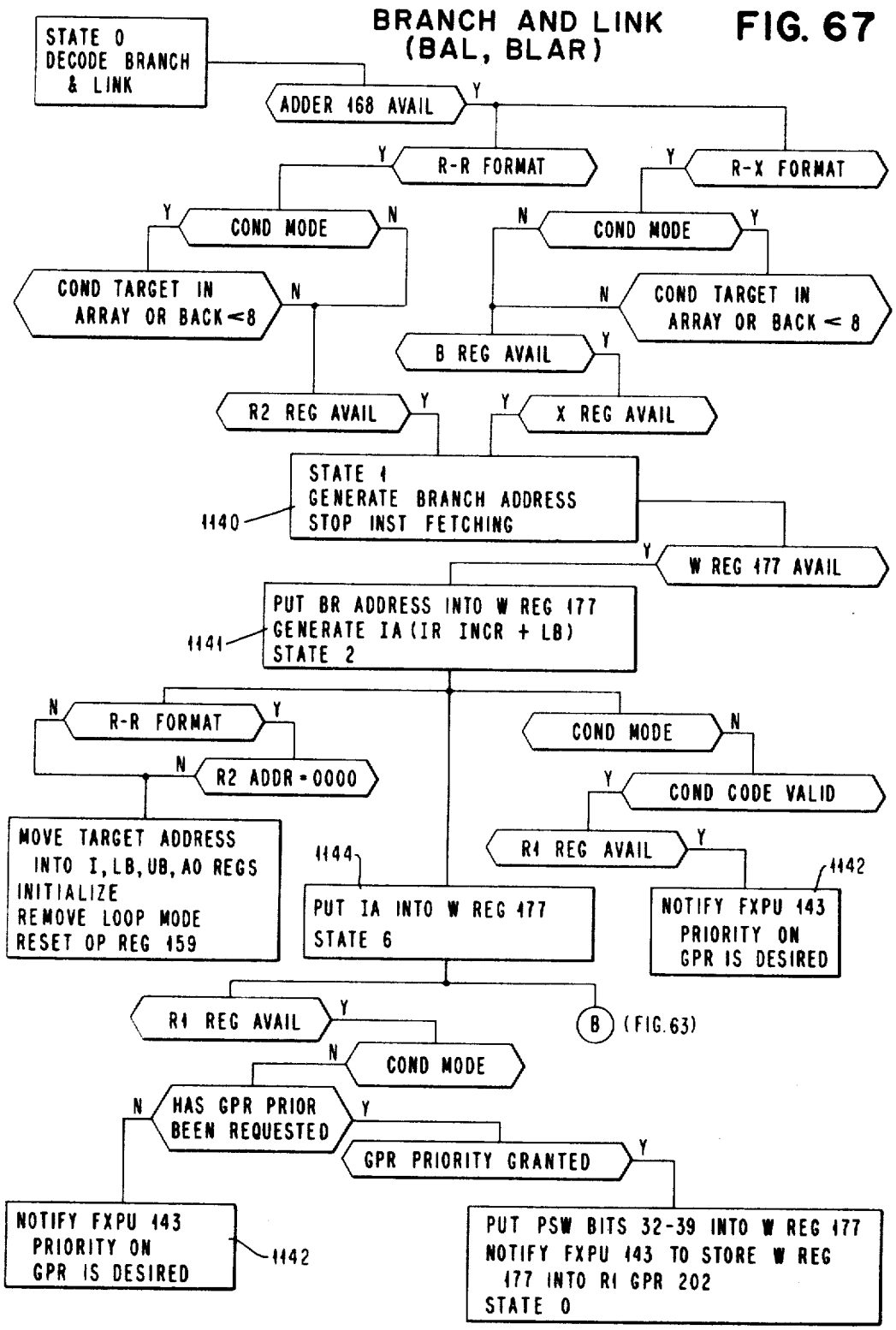

FIG. 67 is the flow chart for a Branch and Link instruction.

Figure 68:
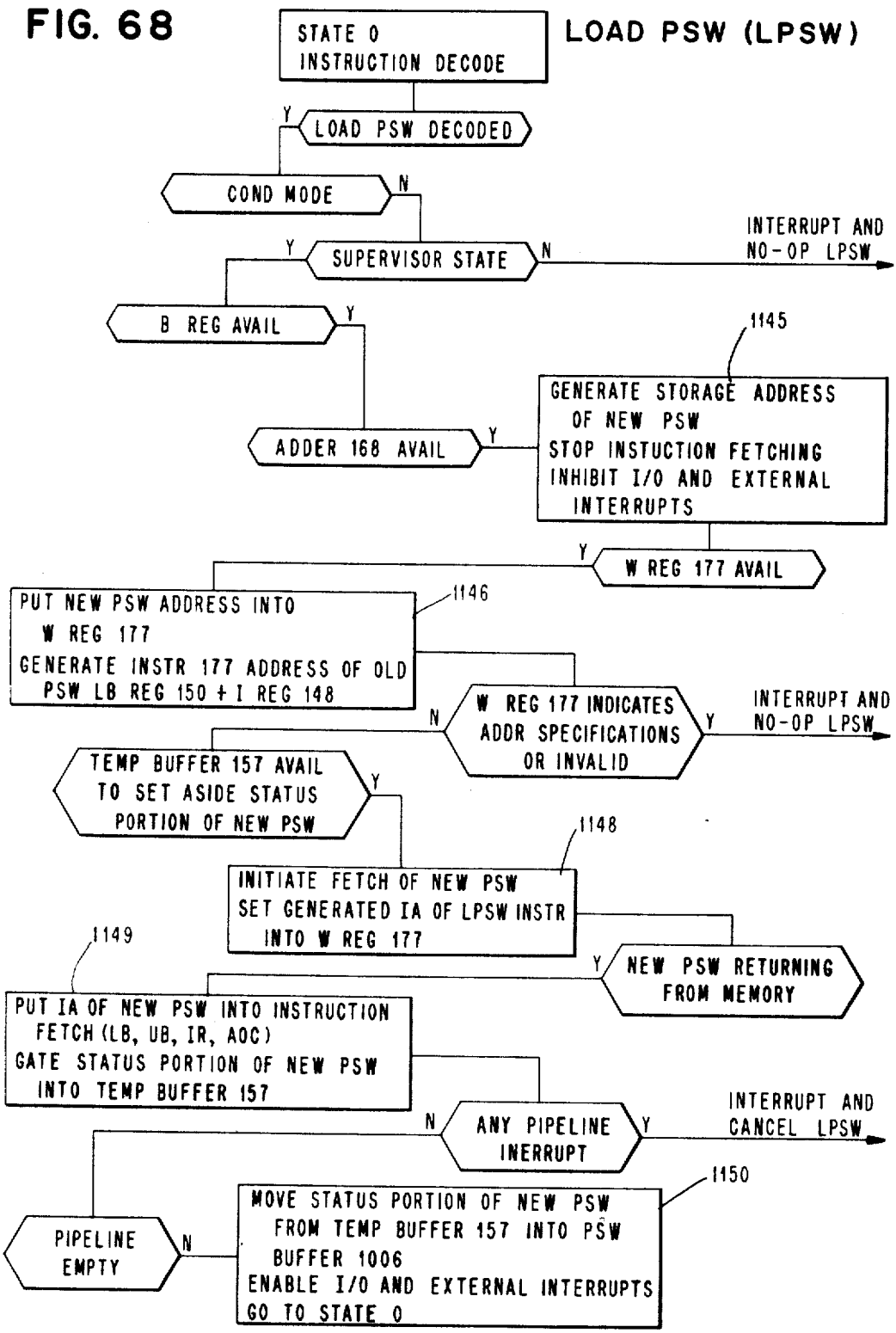

FIG. 68 is the flow chart for the Instruction Unit operations for the Load PSW instruction.

Figure 69:
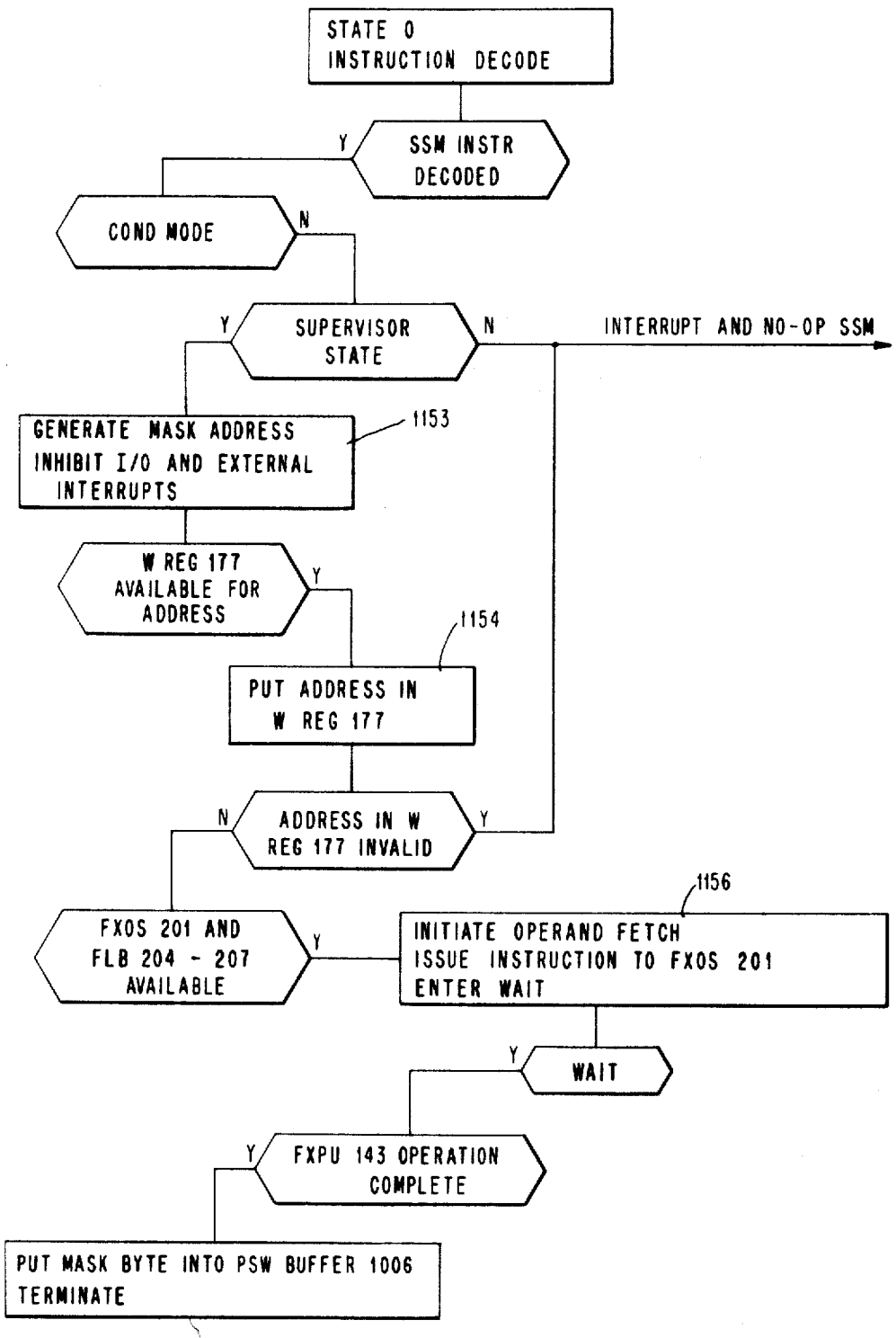

FIG. 69 shows the operations performed for the instruction Set System Mask.

Figure 70:
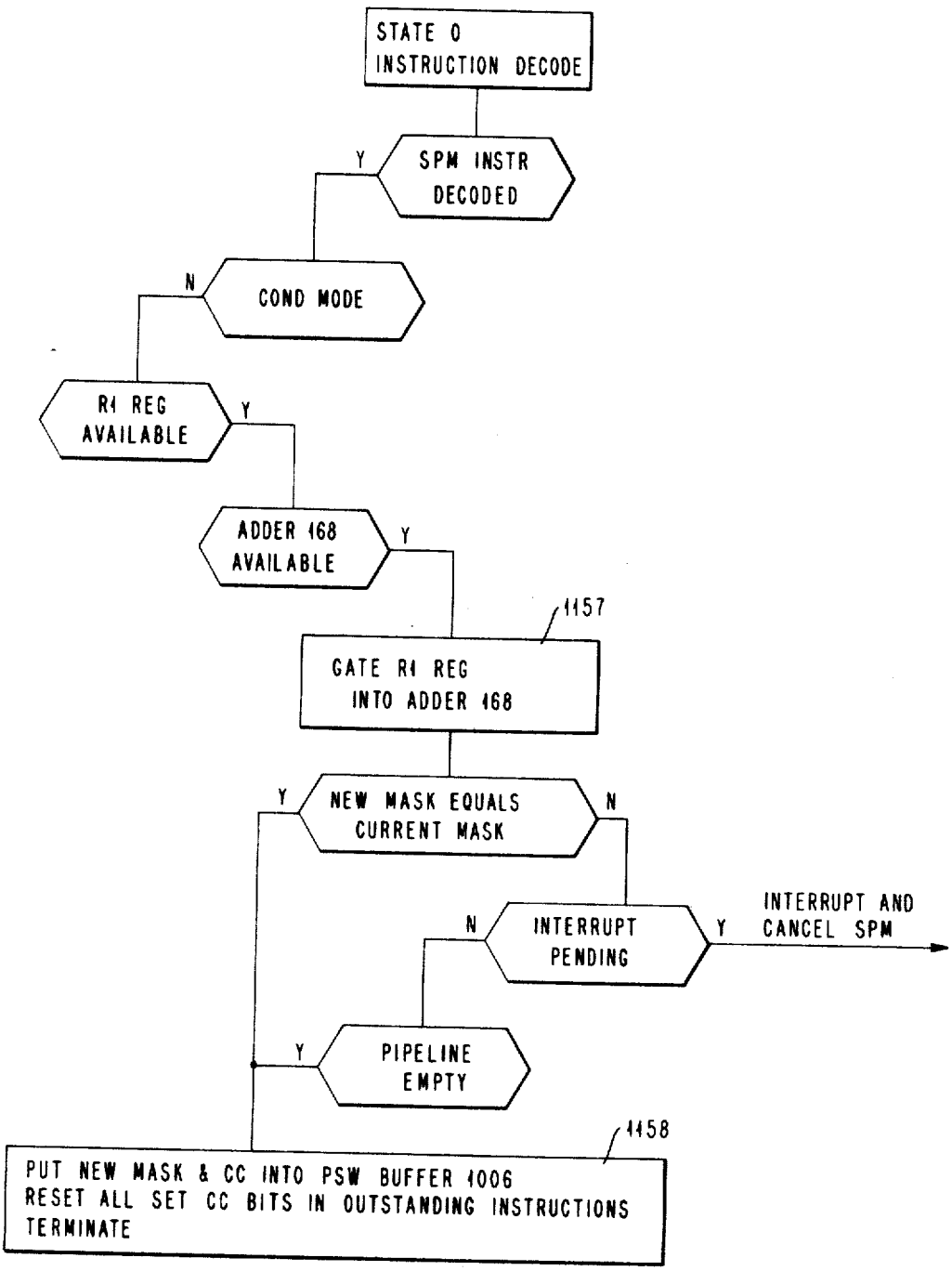

FIG. 70 is the flow chart of the operations need for the instruction Set Program Mask.

Figure 71:
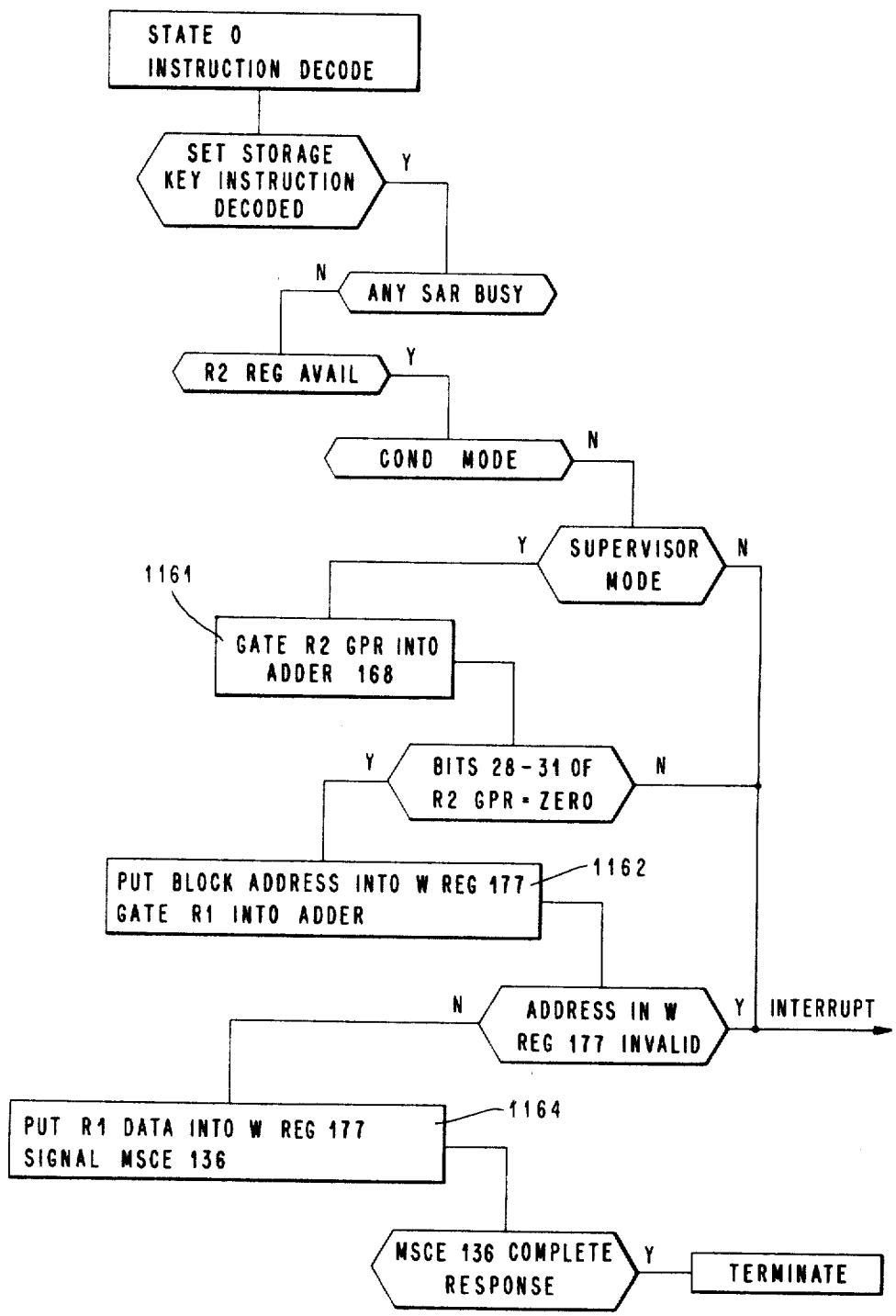

FIG. 71 is a flow chart for the Instruction Unit operations for the Set Storage Key instruction.

Figure 72:
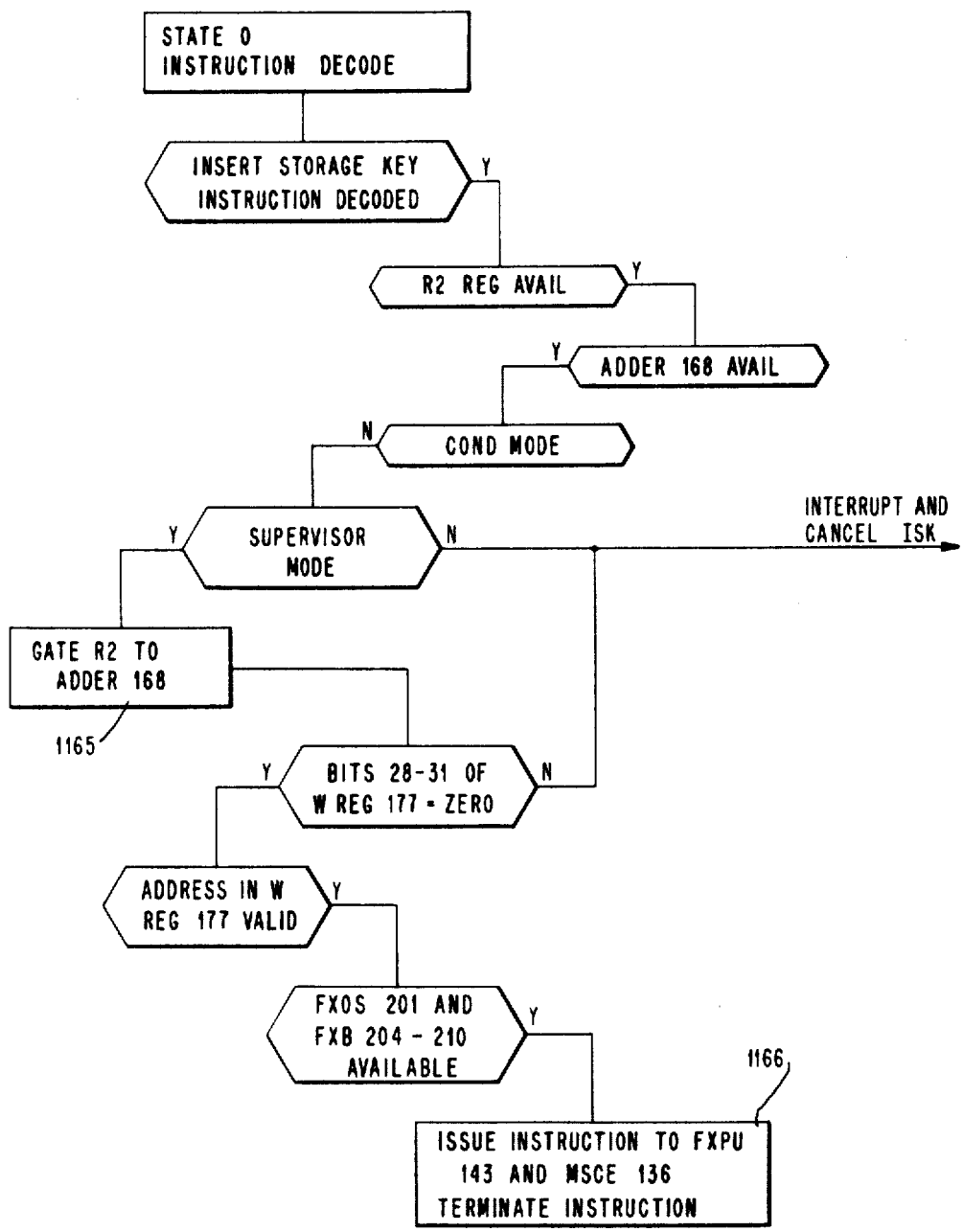

FIG. 72 is the chart of the operational sequence for the instruction Insert Storage Key.

Figure 73:
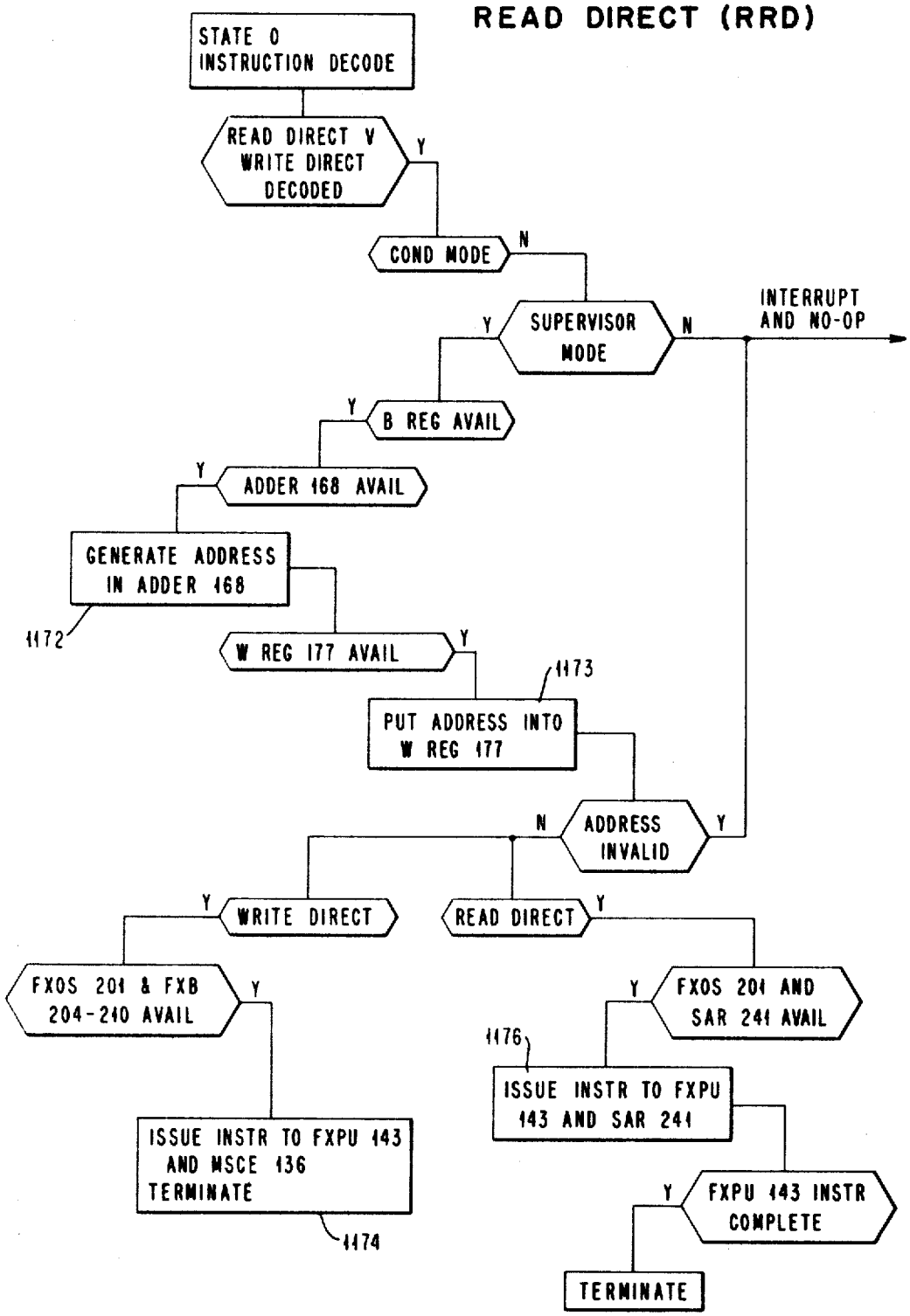

FIG. 73 is a combined flow chart for the two instructions Write Direct and Read Direct.

Figure 74:
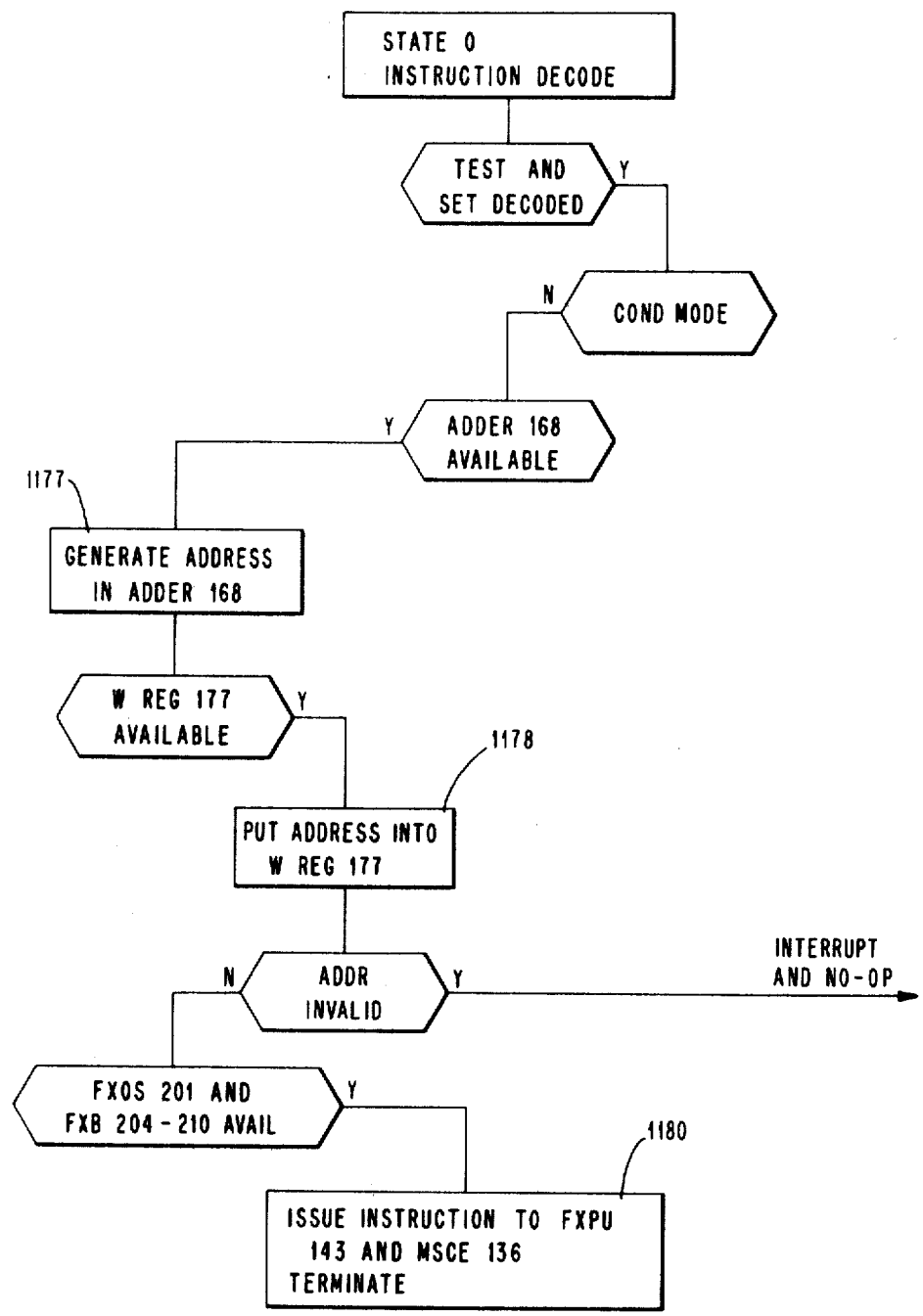

FIG. 74 shows the sequence of operations for the instruction Test and Set.

Figure 75:
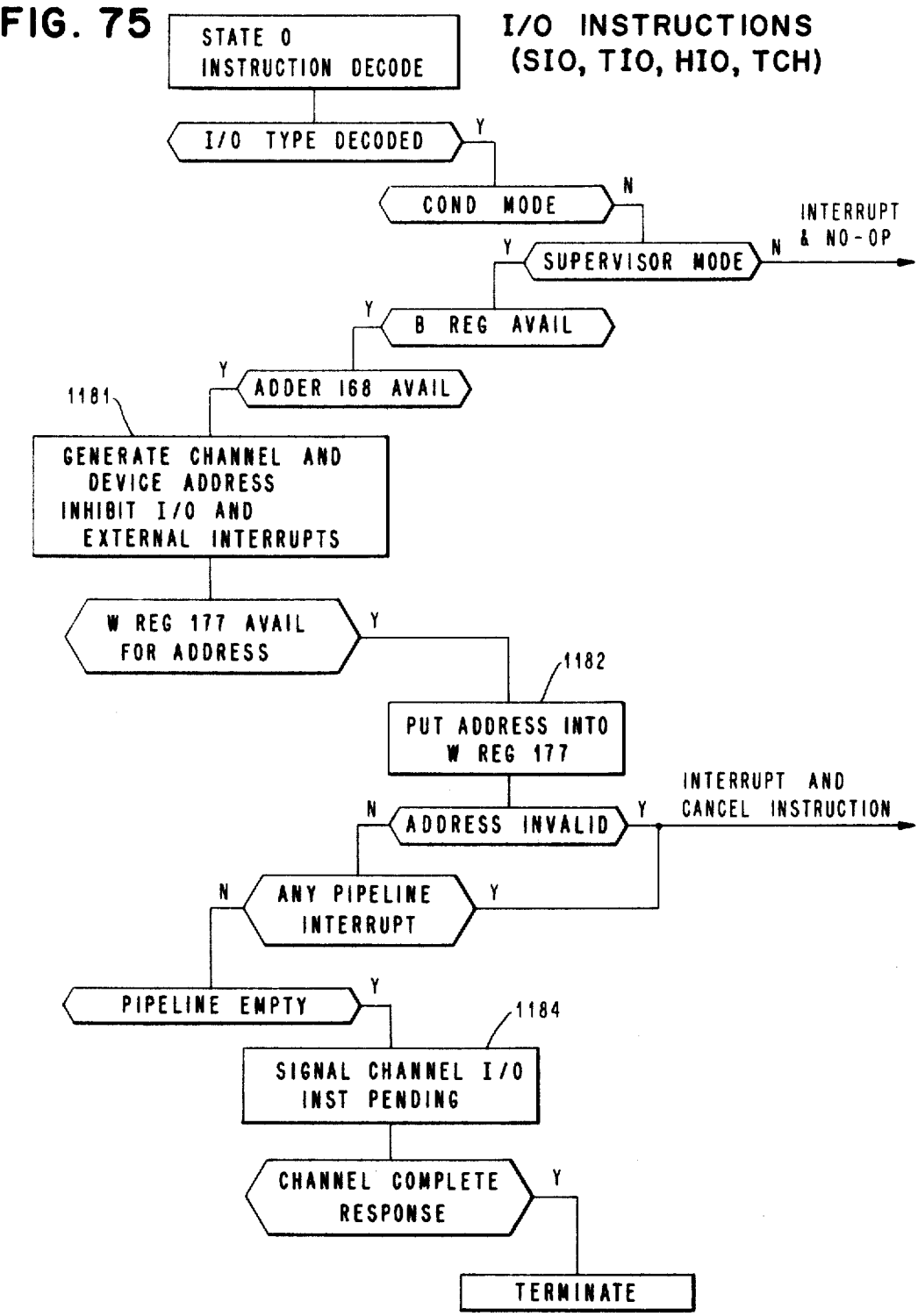

FIG. 75 is a combined flow chart for the Input/Output (I/O) instructions Start I/O, Test I/O, Halt I/O and Test Channel.

FIGS. 76 and 77 together form a flow chart of the Instruction Unit operations in response to an Interrupt.

FIGS. 78A and 78B are a diagram of the connections between the functional elements used to control interrupt processing.

Figure 79:
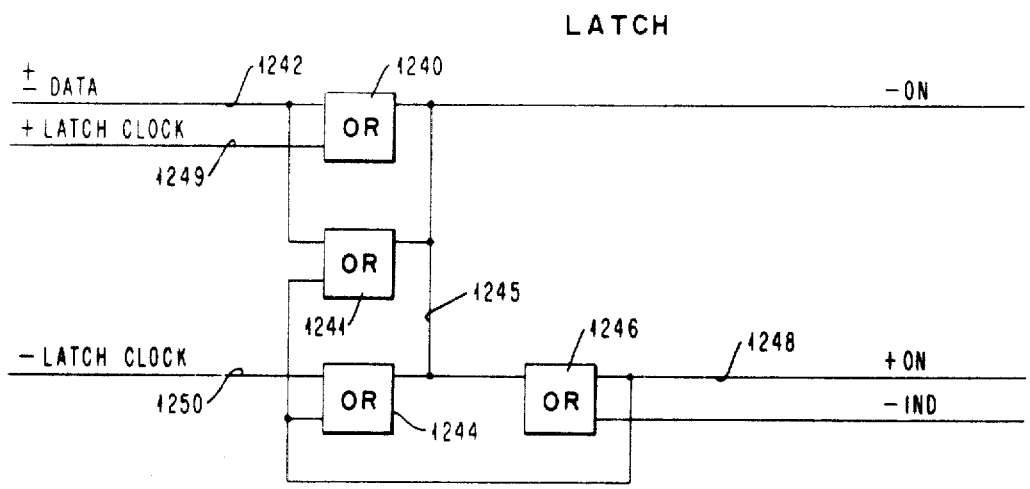

FIG. 79 is a connection diagram of a latch circuit.

Figure 80:
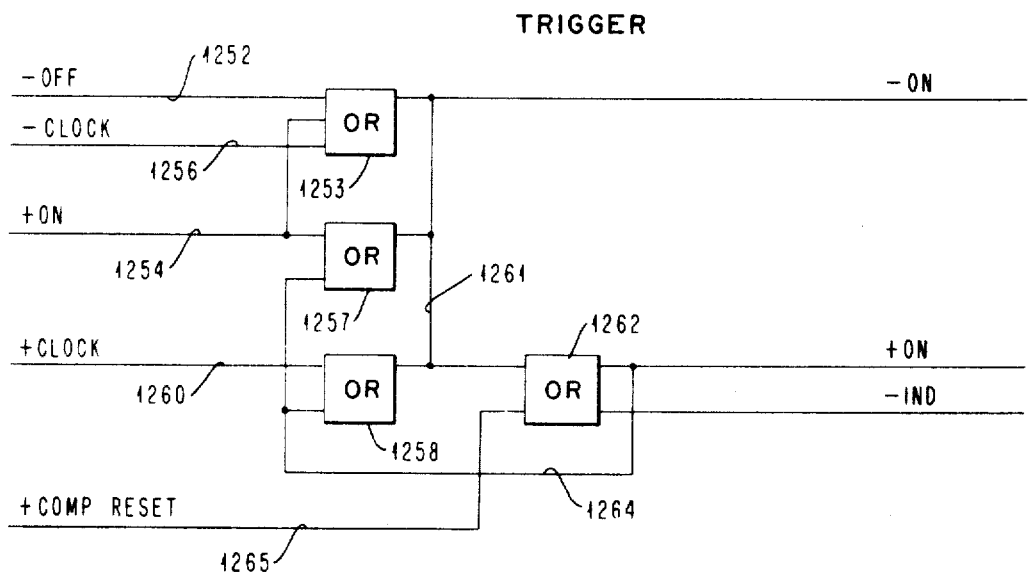

FIG. 80 is a connection diagram of a trigger circuit.

Figure 81A:
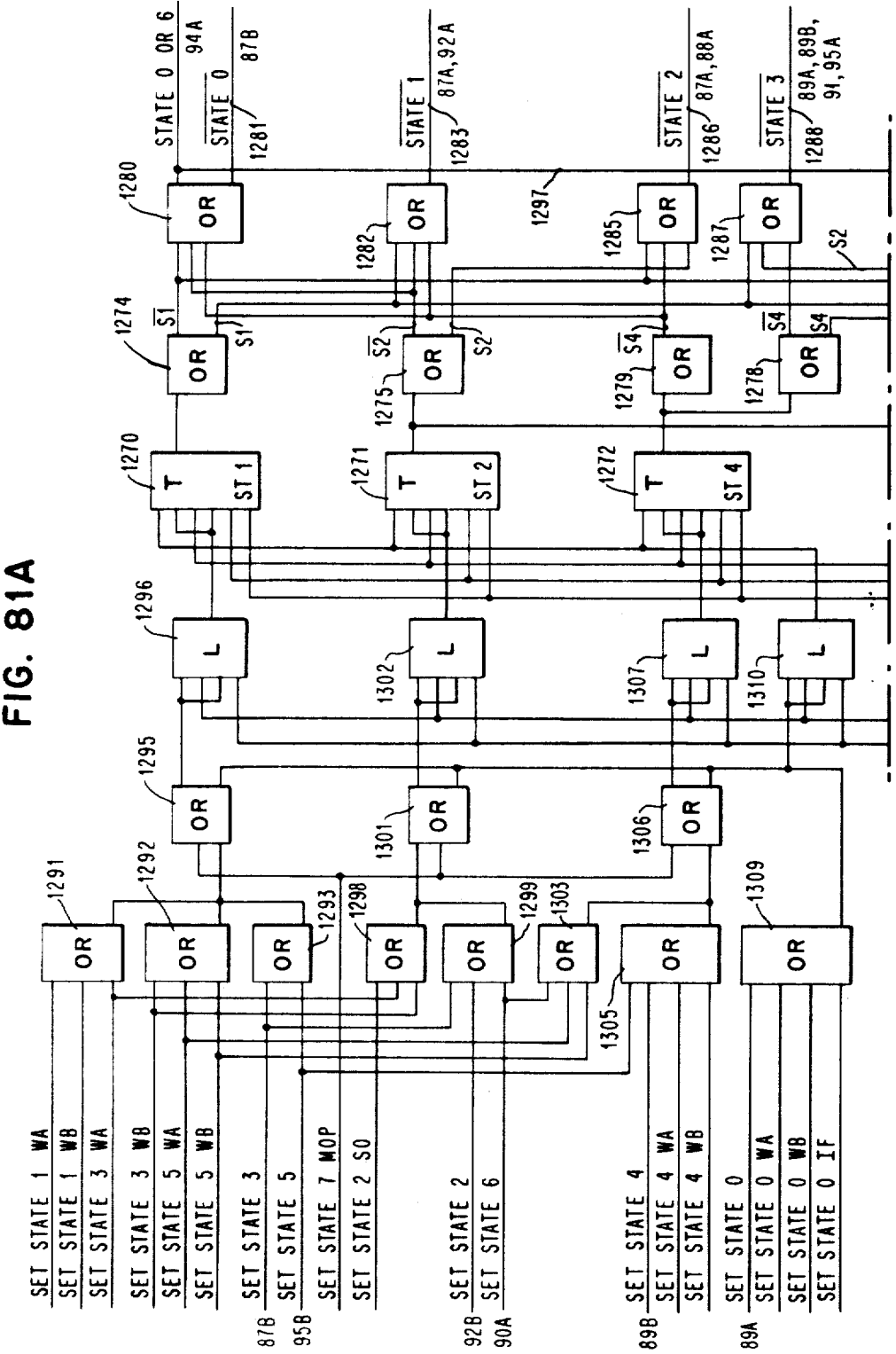
Figure 81B:
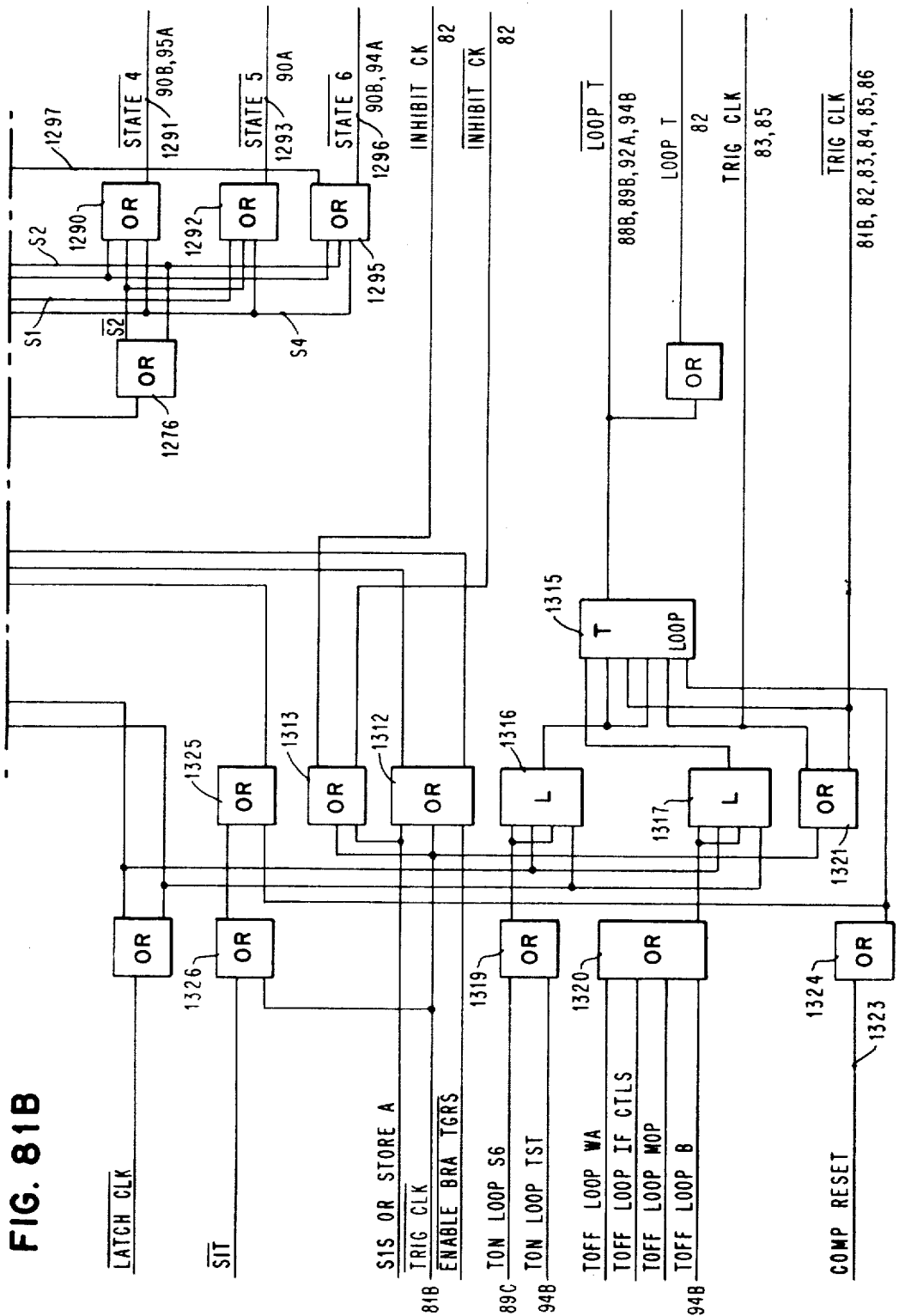

FIGS. 81A and 81B are a detail diagram of the state triggers and their control circuits.

Figure 82:
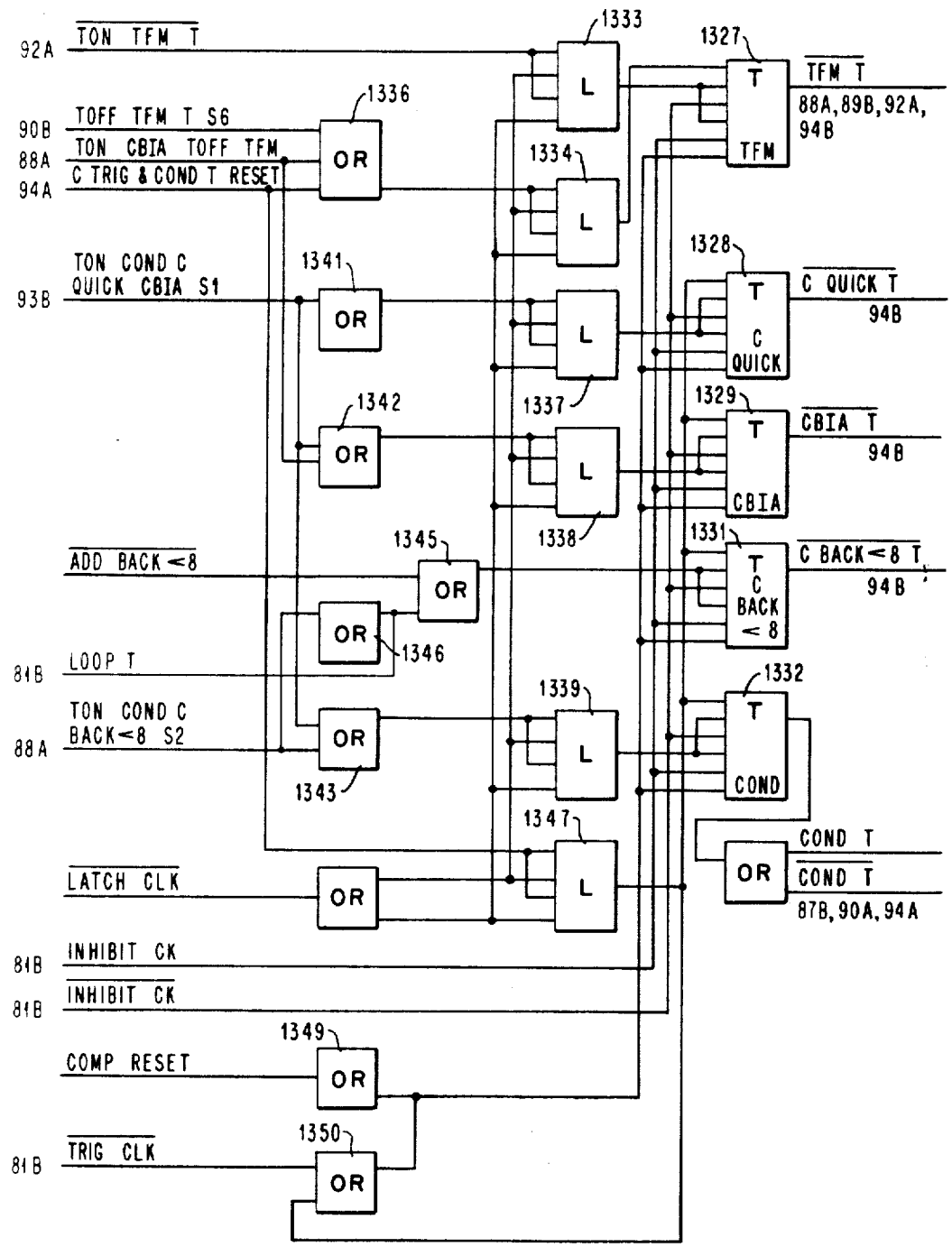

FIG. 82 is a diagram of the circuit connections and controls for the triggers for the Conditional mode.

Figure 83:
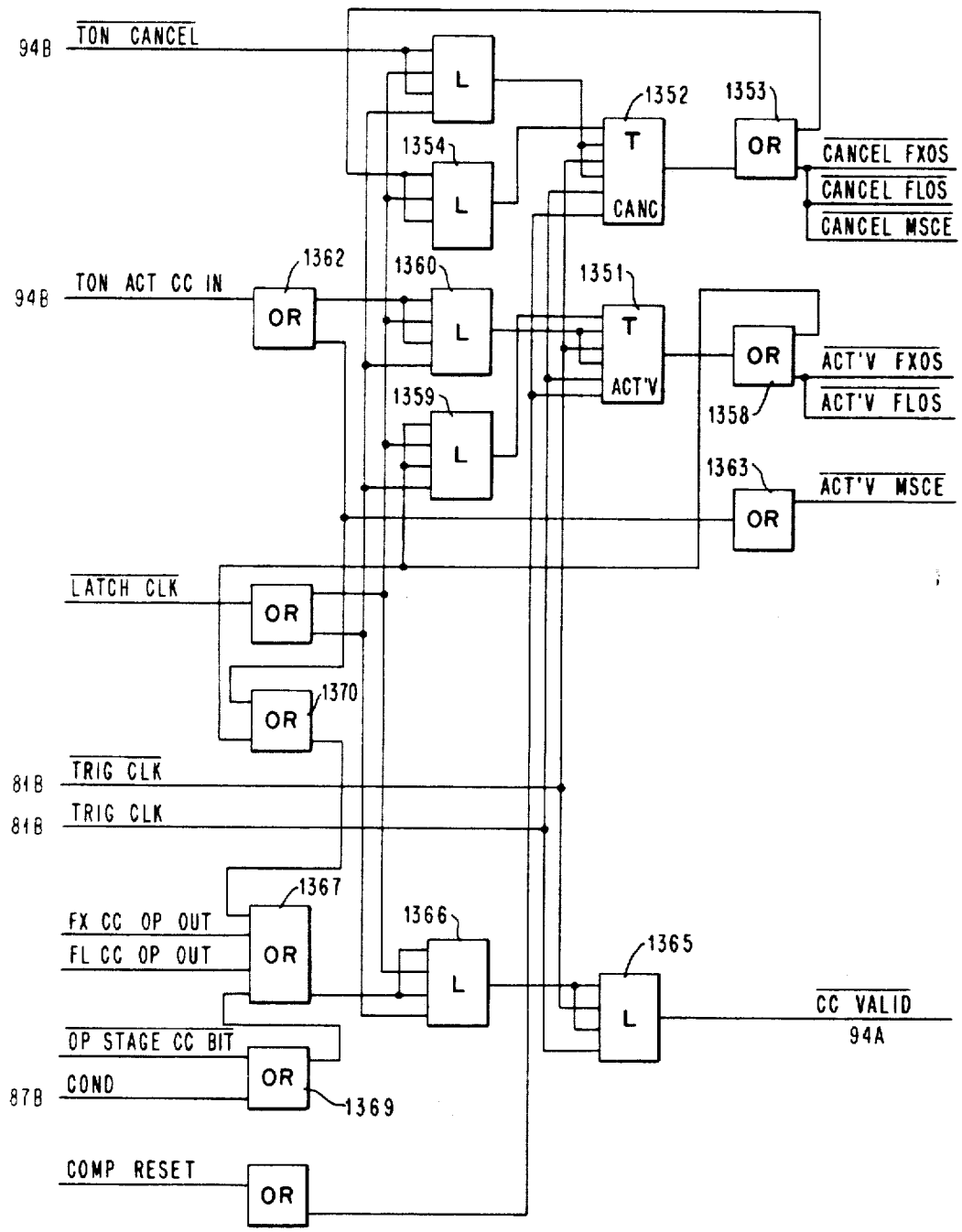

FIG. 83 is a circuit diagram of the condition code controlled cancel and activate triggers.

Figure 84:
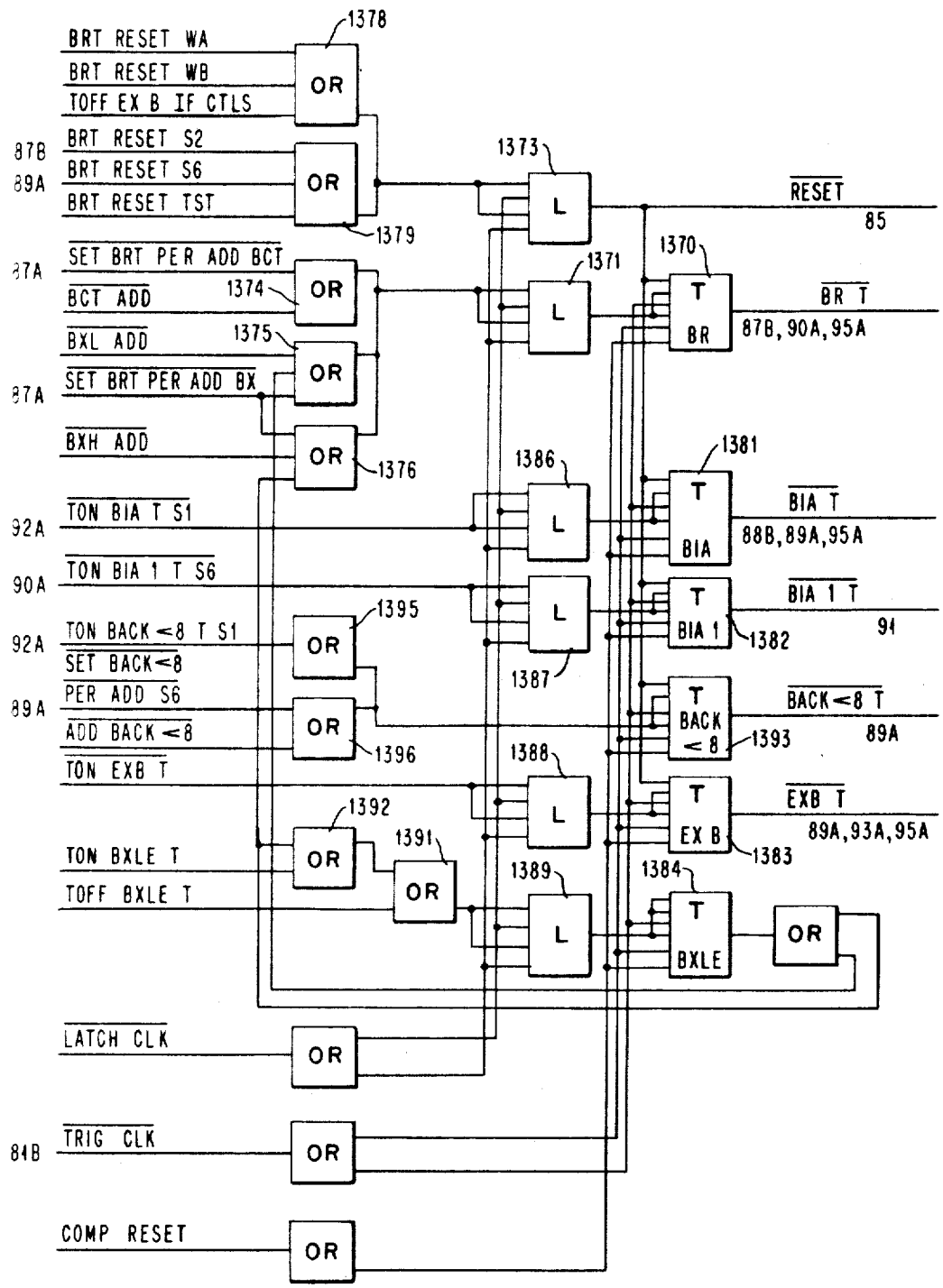

FIG. 84 shows the control circuits for the branch identifying triggers.

Figure 85:
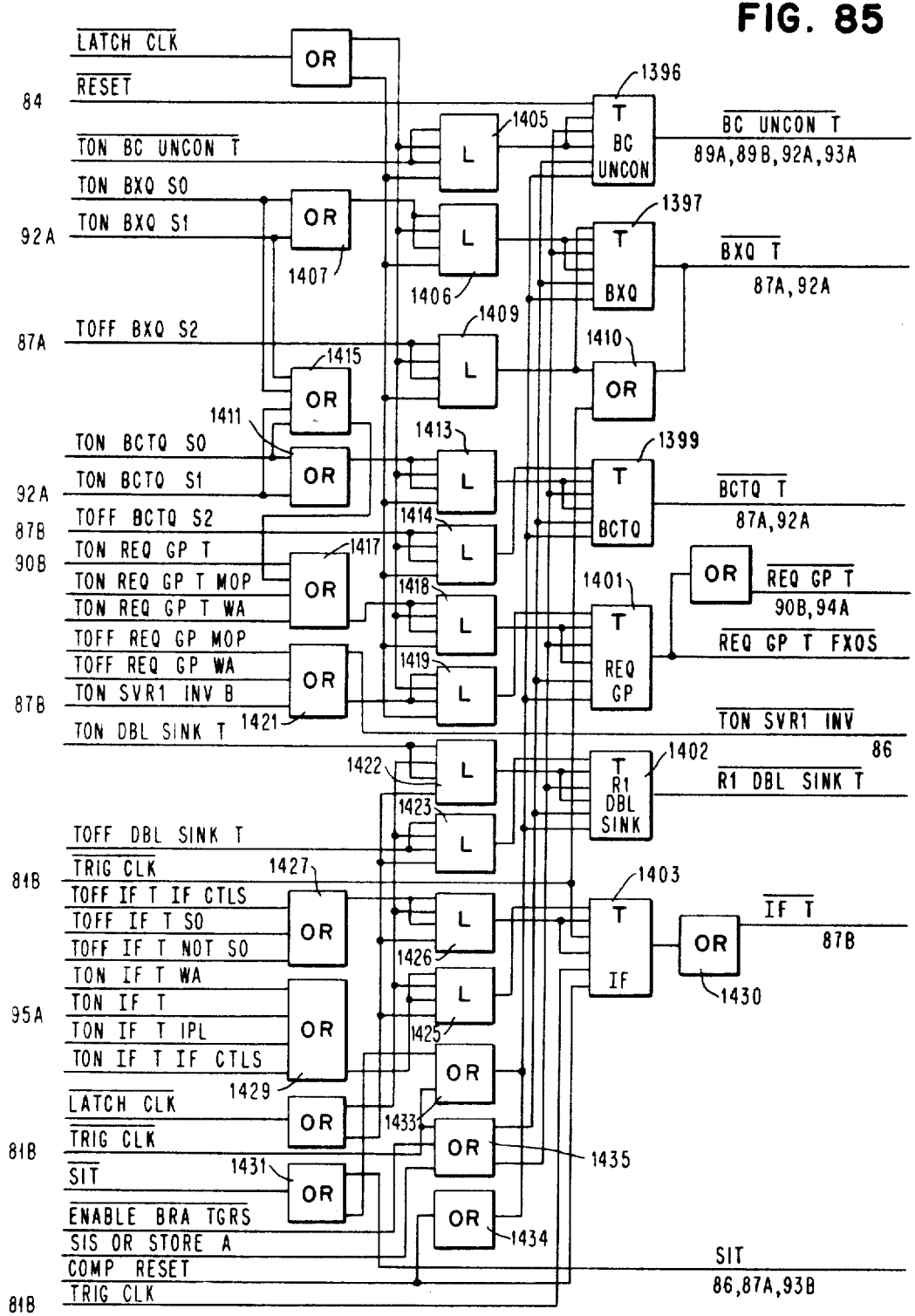

FIG. 85 shows the controls for miscellaneous status triggers.

Figure 86:
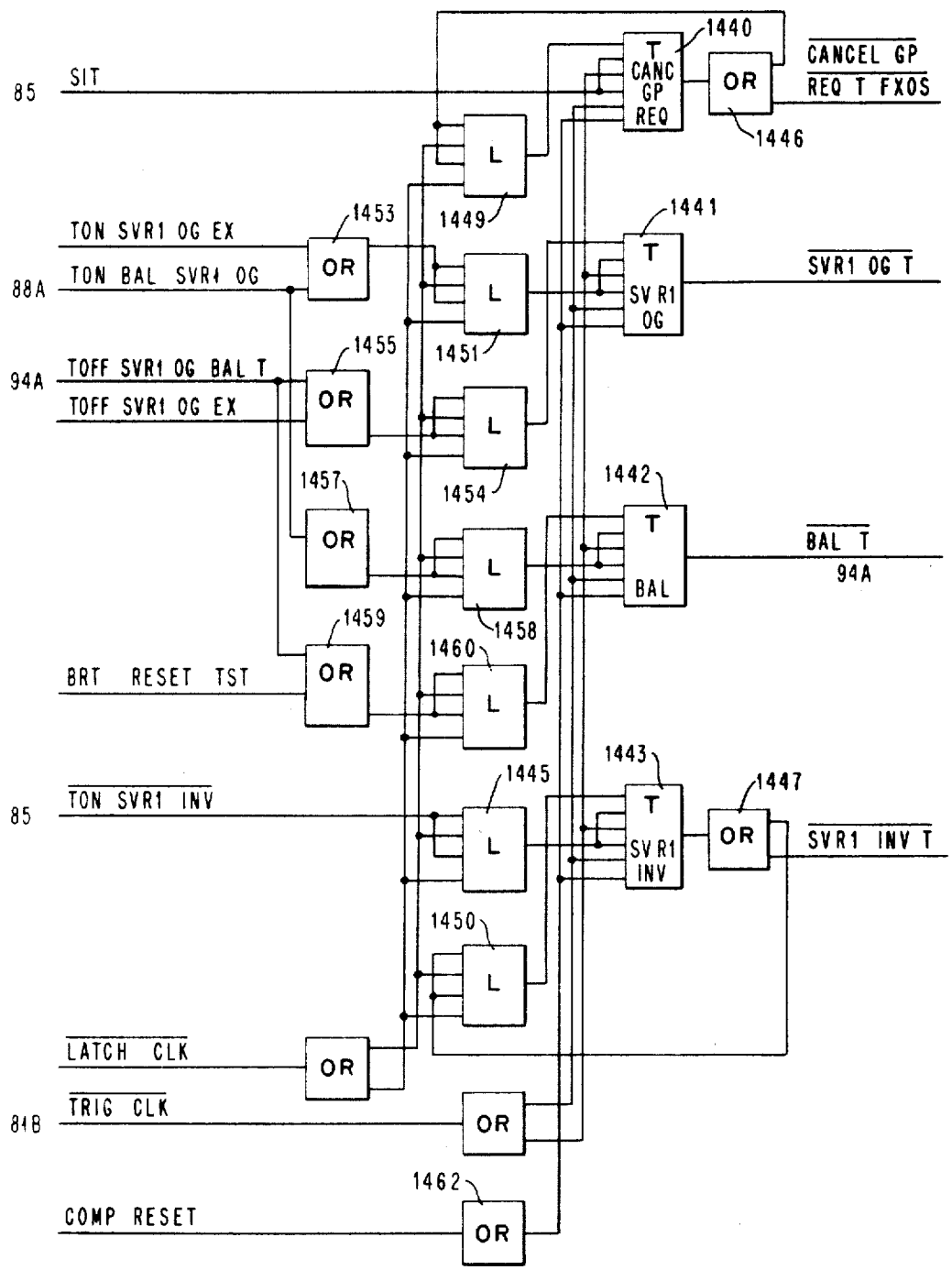

FIG. 86 shows additional miscellaneous triggers and their control circuits.

Figure 87B:
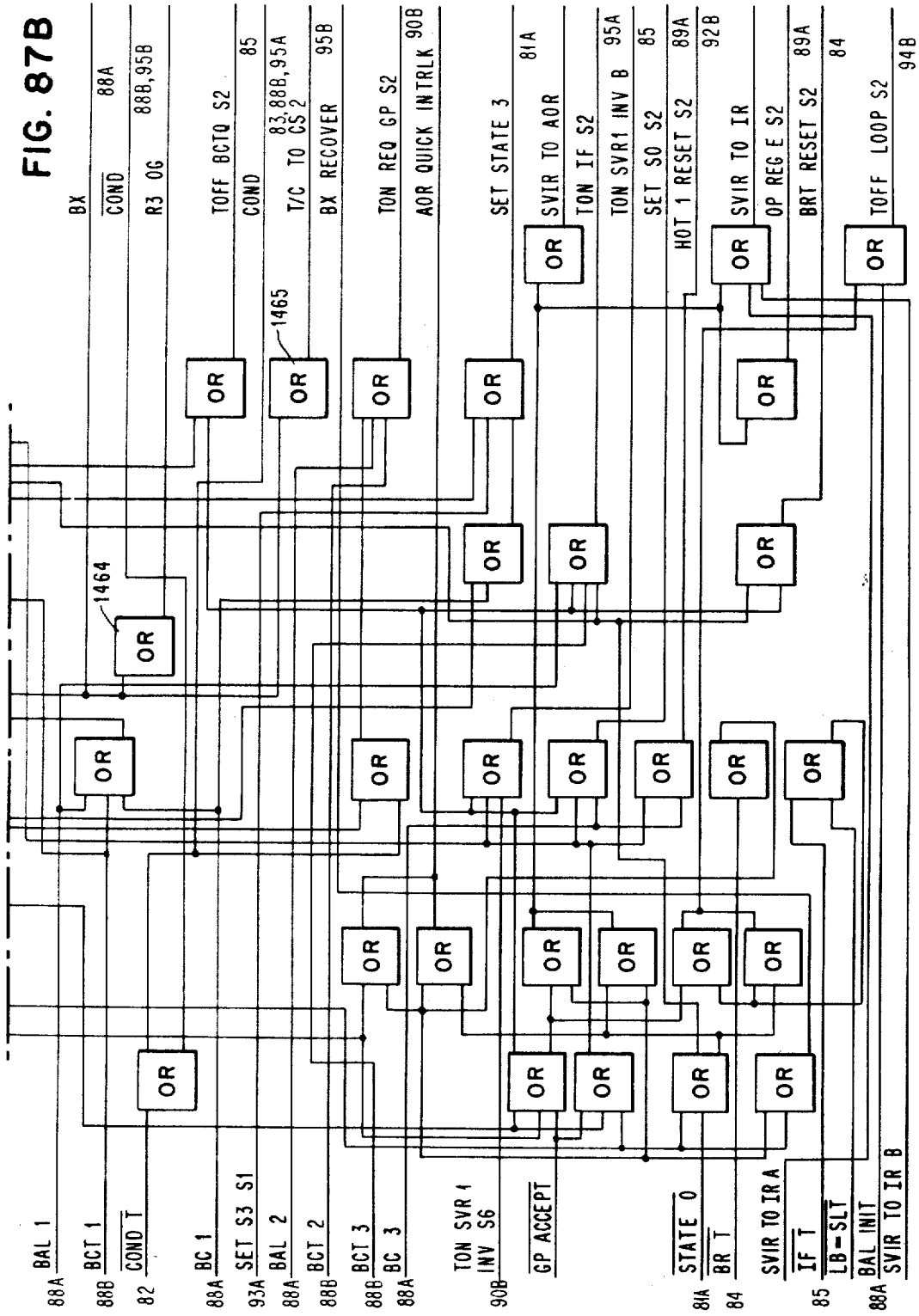

FIGS. 87A and 87B show a number of control circuits used during the S2 state and for quick loop branches.

Figure 88B:
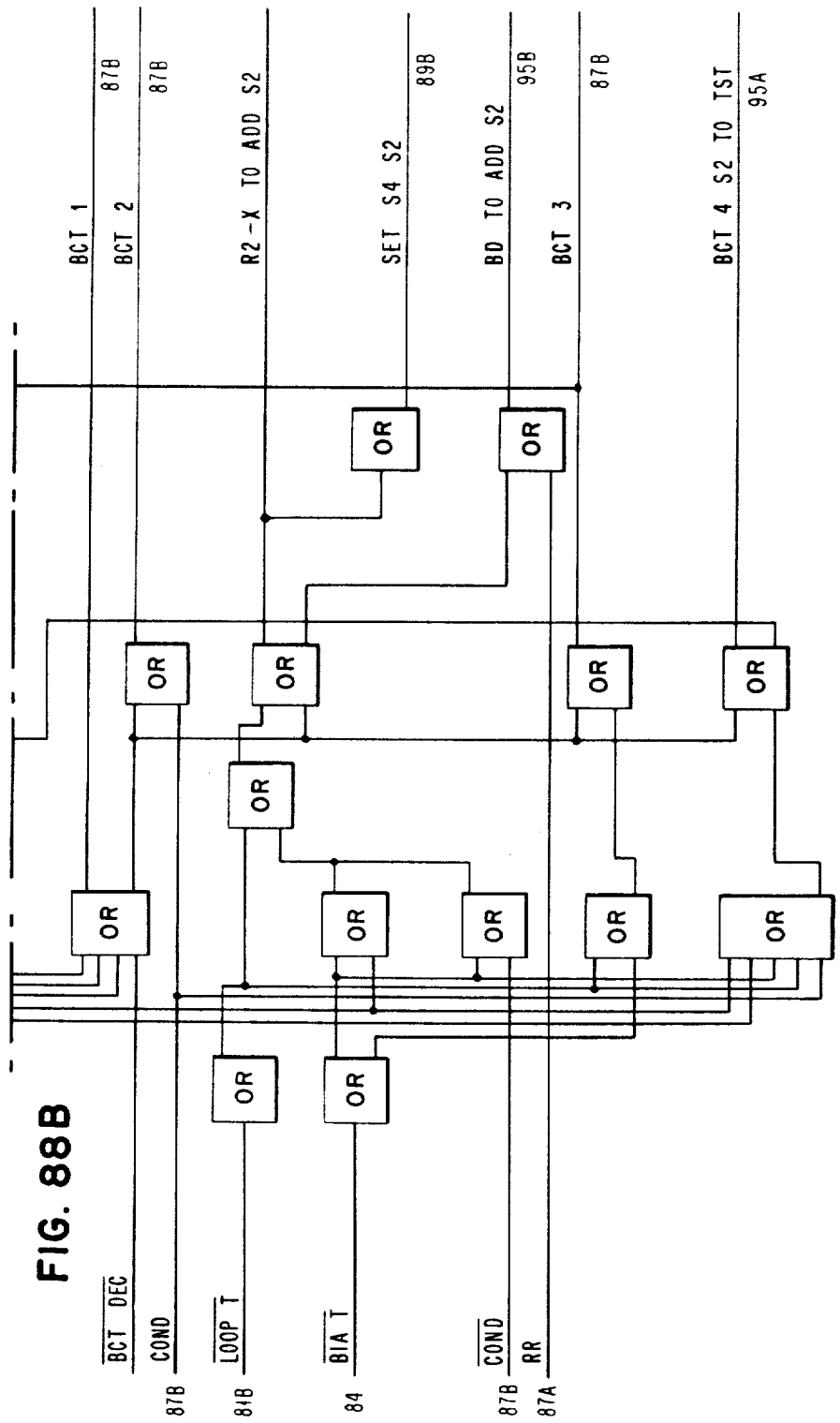
Figure 89A:
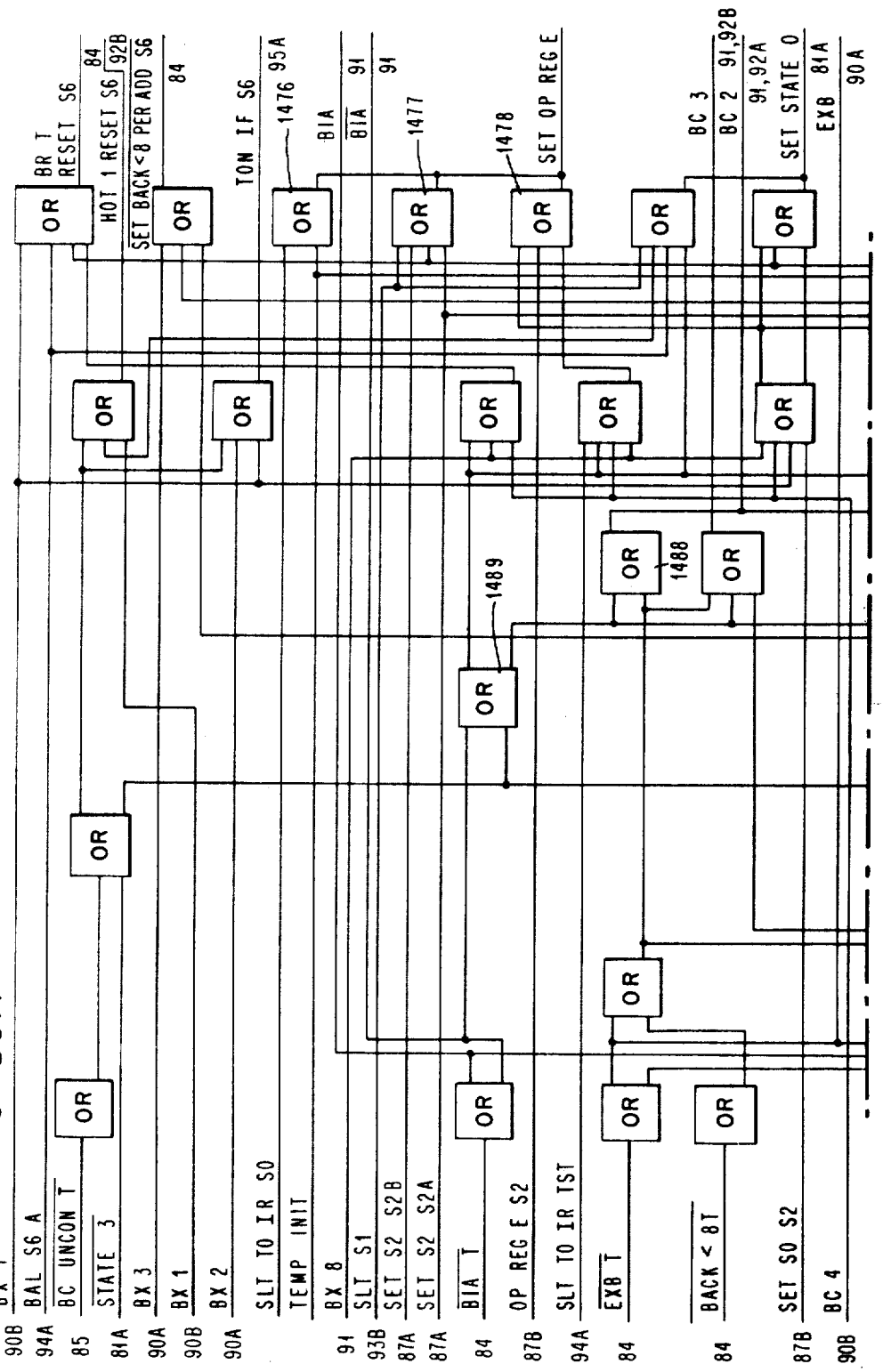
Figure 89C:
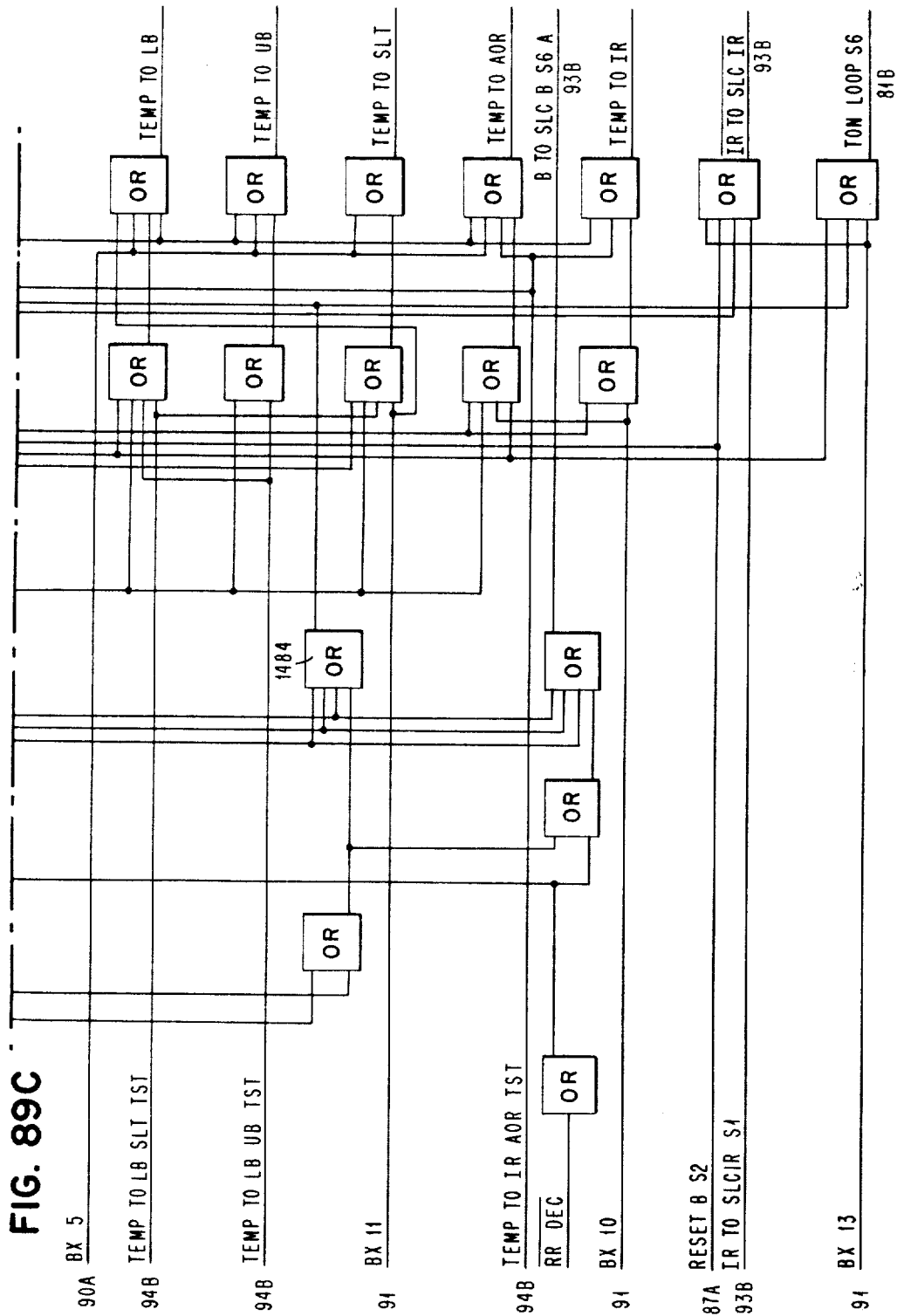
Figure 90B:
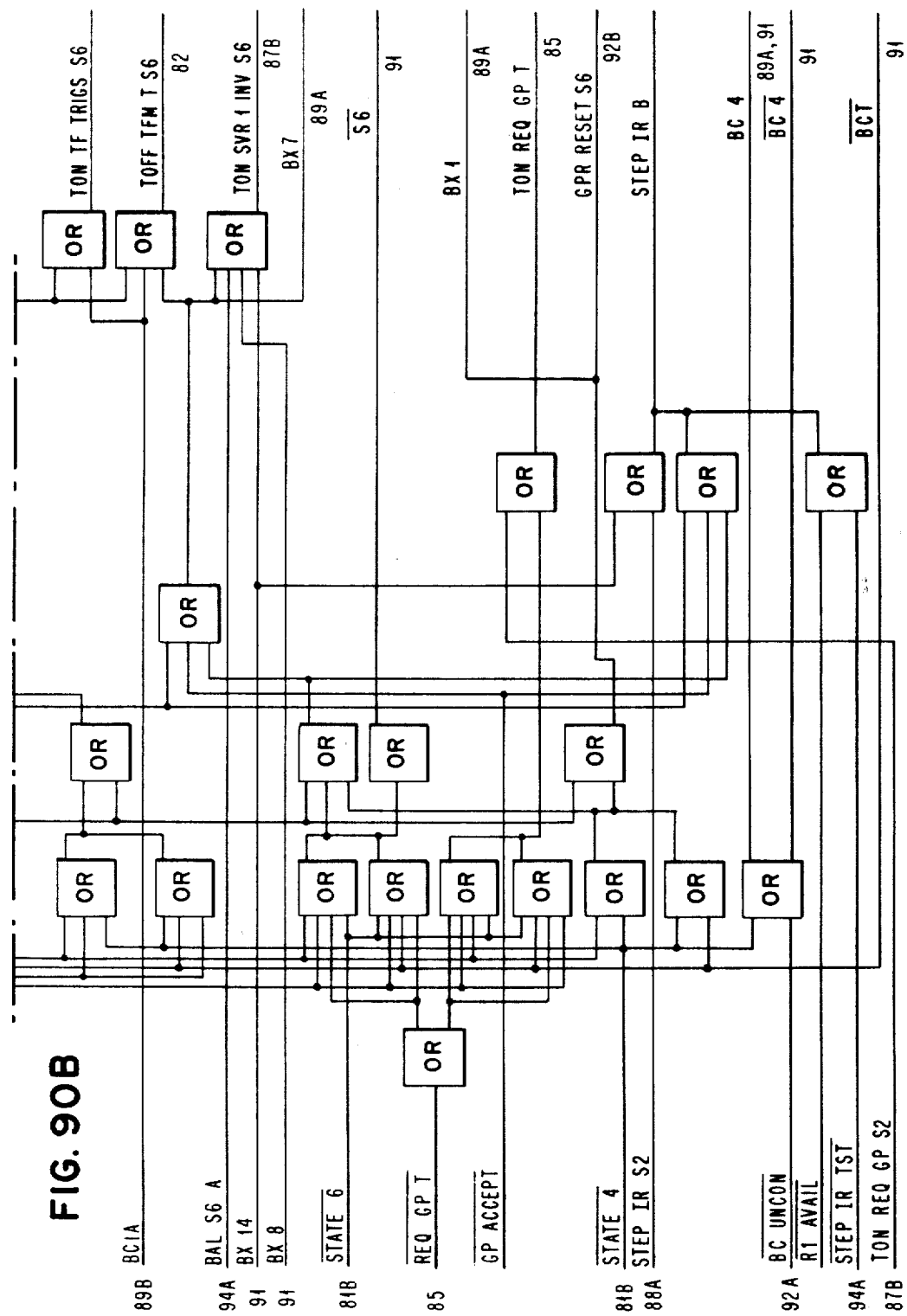

FIGS. 88A and 88B show additional circuits for the S2 state and quick branches.

FIGS. 89A–89C, 90A, 90B, and 91 together show a group of circuits for the States 3 and 4 Branch on Condition instruction, and for States 5 and 6 of the Branch on Index and Branch on Count instructions.

FIGS. 92A, 92B, 93A, and 93B shows a plurality of interconnected circuits for control during the S1 state of the instructions, and FIGS. 94A, 94B, 95A, and 95B show the circuits for the Branch Test, Branch and Link State 6, Branch on Index States 3 and 4, and Branch on Count State 4 controls for the I Box.

*General description*

The preferred embodiment of the invention described herein forms a part of a large size data processing system capable of extremely rapid operation, and operation of many sections in parallel whereby large amounts of data may be processed in a reasonable length of time. Data processors of this nature are of great value in real time circumstances where certain computations must be performed in a short time if the data to be produced is to be of value, or where forecasts are to be made of conditions at points of a three or more dimensional lattice. An example of the first type is in the computer forecasting of weather data where updated weather must be predicted for each of a plurality of stations and that updated weather is then used as the basis for another updating, etc. Obviously, if it takes longer to update the weather forecast for all the stations involved than the real time interval for which the updating is computed, there is no real time gain and the repetitions of computer forecast updating cannot generate forecasts ahead of the actual weather. For useful weather forecasting, a very large amount of data must be processed in a comparatively short time interval.

Another type of problem for which large high speed processors are required is the determination of successive states at coordinate intersections of a three dimensional configuration such as a nuclear pile where accuracy of successive state conditions can be increased by using a finer coordinate system. However, the amount of data to be processed will increase far faster than the increase in the number of intersections on any one of the coordinates. Here again, high speed processing is needed if the data is to be processed in a reasonable time.

Figure 1:
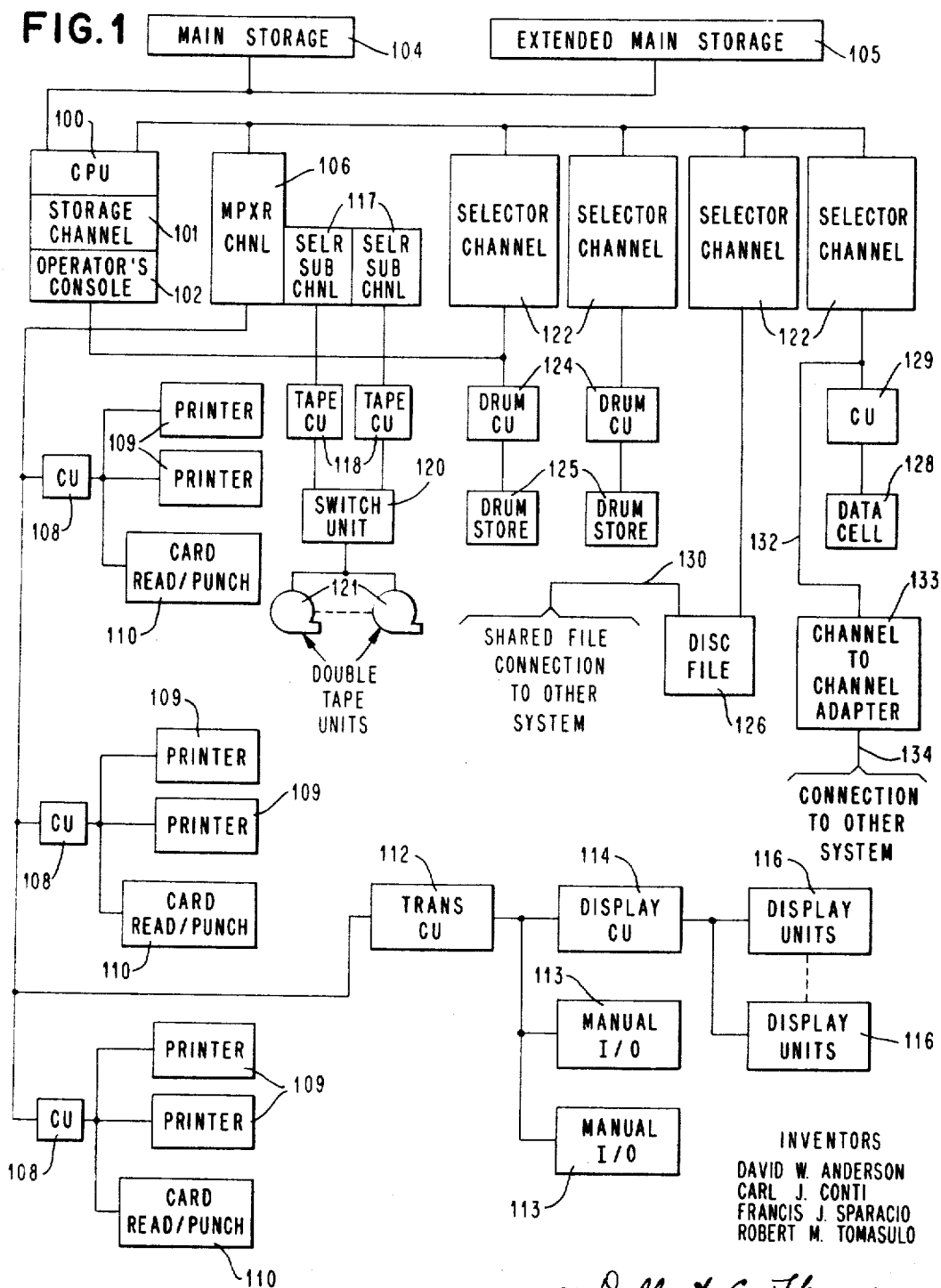
FIG. 1 is a diagrammatic showing of the type of large data processing system in which the invention is incorporated.

Although it is to be understood that the exact configuration of a data processing system will depend upon the form in which data is to be initially supplied to the system and the data outputs desired, a representative configuration of a large system is shown in FIG. 1. Here the Central Processing Unit (CPU) 100, a Storage Channel (SC) 101, and a Maintenance and Operators Console 102, are combined in a main frame which will be uniform for all system configurations. A Main Storage (MS) 104, typically 256 thousand double (64 bits and 8 parity bits) words, will be connected to the CPU 100 to hold the programs and data required by the CPU, and this Main Store 104 may be supplemented by an Extended Main Storage (EMS) 105 of the same or double capacity, i.e. 256+ thousand and or 512+ thousand double words. Due to restrictions on physical size and location, lengths of wire connections, control sizes and the like, data cannot be transferred between the CPU 100 and EMS 105 as rapidly as it can be passed between CPU 100 and MS 104, so that it is preferable to maintain most of the immediately needed material in MS 104 and to make only occasional data transfers from CPU 100 to EMS 105. The Storage Channel 101 which may be almost a small computer is therefore provided in the main frame to control with only occasional commands from the CPU 100, the transfer of large blocks of storage data between the MS 104 and EMS 105, to keep the words in MS 104 reasonably current with needs.

The operators part of Console 102 contains the keyboard, control switches and display units required for operation of the system. To prevent interference with the normally uninterrupted cycling of the machine, the Console 102 is connected to CPU 100 as another Input/Output (I/O) device and not directly, thus enabling the CPU 100 to carry on with the performance of other operations while the Console 102 is being set up for another entry.

The remainder of the system comprises the I/O Devices and their controls to supply the CPU 100, MS 104 and EMS 105 with needed information. A multiplexor (MPXR) channel 106 is provided to receive data from a large number of slow speed devices operating concurrently, and it does this by accepting a byte (eight bits + parity) of data from a connected I/O device as soon as the device has the data available, and assembling the byte with earlier bytes received from the device until it has a double 64 bit word assembled and then transmitting the word to a storage location. The MPXR 106 will also receive a double word and transmit the word by bytes to a connected I/O device. Due to the speed difference between the operations of MPXR 106 and the I/O devices connected thereto, up to 256 devices can be operating concurrently through the MPXR 106. Typical devices shown attached to the MPXR 106 are three control units (CU) 108, each of which controls two Printers 109 and a Card Read/Punch Unit 110. Also connected to MPXR 106 is a Transmission Control Unit 112 for control of remotely located devices, here shown as Manual Input/Output Devices 113, such as keyboard, typewriters, or card machines, and a Display Control Unit 114, which controls a number of cathode ray tube Display Units 116.

Also shown connected to MPXR 106 as a part thereof are two Selector Sub Channels 117, each of which will be connected through a Tape Control Unit 118 to a Switch Unit 120. Any tape unit of a plurality of Double Tape Units 121 can be connected through Switch unit 120 and CU's 118, to either of the Selector Sub Channels 117. A selector Sub Channel such as 117 can be connected to any of a plurality of I/O units, but differs from a Multiplexor Channel such as 106, in that only one I/O device can be operating at a time. Such a Selector Sub Channel will be for devices which supply or receive data at a comparatively high rate and cannot share time with other devices on the same channel.

The system shown also includes four Selector Channels 122, although more or less may be connected as desired, and each Selector Channel 122 may have a plurality of I/O devices connected thereto. Two of the Selector Channels are shown as each having a Drum Control Unit 124, and a Drum Storage Unit 125, connected thereto, a third has Disk File 126 attached thereto, and the fourth is shown connected to a Data Cell 128 through its Control Unit 129. A lead 130 from Disk File 126 indicates that the file may be shared with another system. A Channel-to-Channel Adaptor 133 connected by a Lead 132 to the fourth Selector Channel 122, and by another Lead 134 to another system, may permit direct communication between two systems by making each system appear to be an I/O device of the other system.

The Maintenance and Operators Console 102 may also be connected to a Selector Channel 122 to enable entry of control data by the operator in the same manner as other I/O data, and without arresting the system operation unless such is desired.

These I/O devices, including Multiplexor and Selector Channels 106 and 122, and similar units for supplying and receiving data and instructions, are representative of commercially available devices and as the details of such devices are not part of the inventive concepts claimed herein, no further description of such devices will be given. It will hereafter be assumed that information is supplied by appropriate devices to the Main Storage 104 and the extended Main Storage 105 as it is needed.

*Central processing unit*

Figure 2:
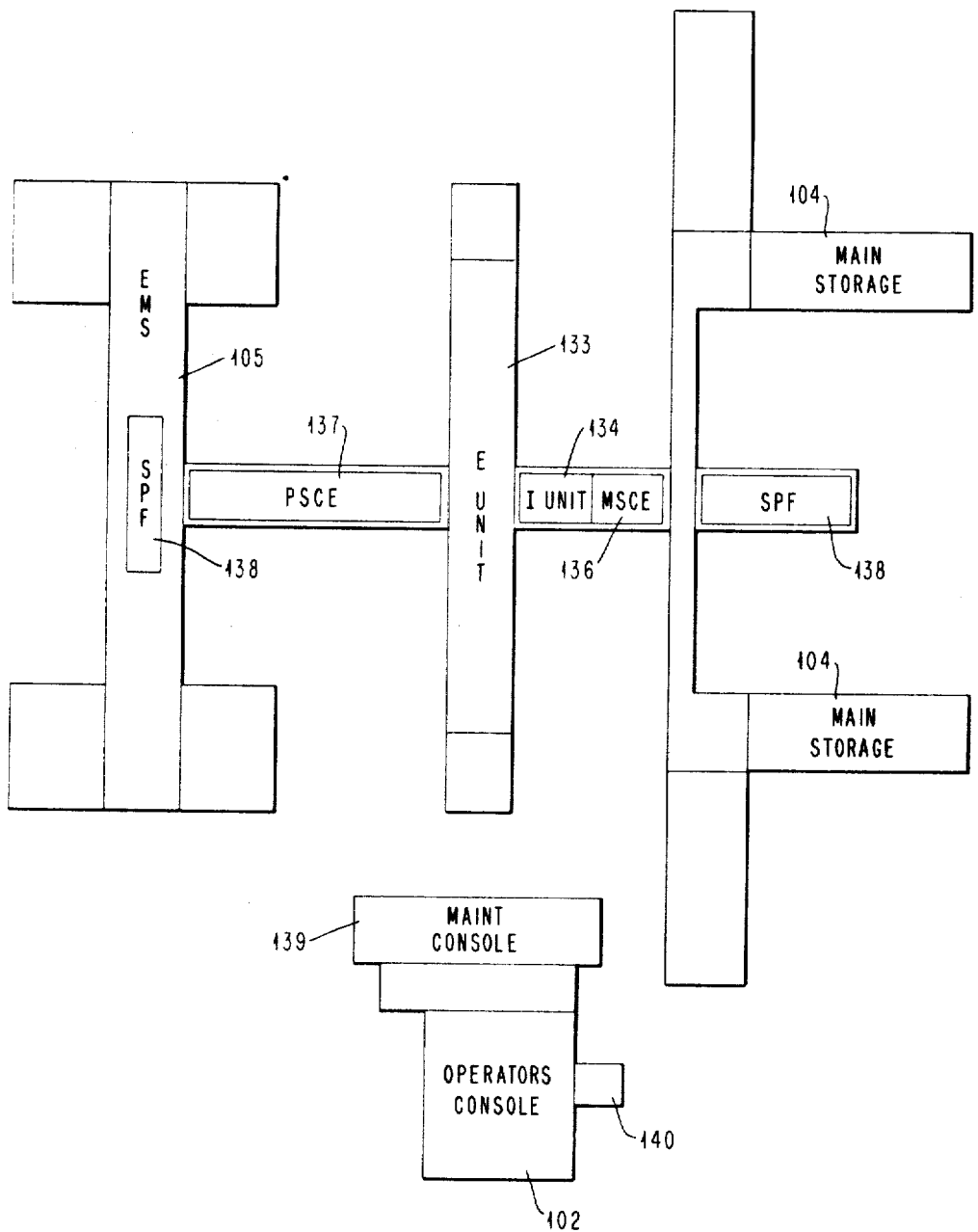
FIG. 2 is a diagrammatic showing of the Central Processing Unit of FIG. 1.

The CPU 100 is the major operating unit of the present system and can logically be subdivided into four more or less independent units. As shown in FIG. 2, the CPU 100 is physically in the form of a cross with four sets of modules connected to a common central junction box. Vertically of the cross and comprising two of the four module sets in the Execution (E Box) Unit 133, which performs all of the arithmetic and logical operations on the data. The inner part of the right hand arm is the Instruction Unit (I Box) 134, which is responsible for all instruction decoding, operand fetching, and an overall control of the operations of the system. The other part of the right arm is the Main Storage Control Element (MSCE) 136 which is the main interface between the I and E units 134 and 133 and the Main Storage 104. Also all communications between the I and E Units 134 and 133 on one hand, and the Peripheral Storage Control Element (PSCE) 137, pass through MSCE 136. The PSCE 137 forms the other, left, arm of the cross and has connected to it the Extended Main Storage 105. Each Storage Unit 104 and 105 has as a part thereof a Storage Protection Feature (SPF) 138 which stores a protection code for each block of storage addresses, and for each reference to its storage, compares the protection code with the program to ensure that the program is permitted access to the called for storage address. As this Storage Protection Feature is fully disclosed and claimed in the assignee's copending patent application, Ser. No. 334,714, filed by G. M. Amdahl, E. D. Councill, R. J. Flaherty and J. J. Zagursky, on Dec. 31, 1963, and titled "Memory Protection System," no further descritpion of the details of the SPF 138 will be given herein.

The systems engineers part of the Maintenance and Operators Console 102 is numbered 139 and the both consoles with an attached CRT Display Unit 140 are combined into a separate stand-alone unit and will be connected with each of the four CPU sections by cabled wiring. The Console 139 can display the states of all settable circuits in the CPU and with the operator's part of Console 102 will provide a serviceman with complete manual control of the system for error diagnosis and repair.

As is indicated in FIG. 3, the CPU 100 can be logically considered as five functional sections connected by information carrying circuits and by control signal circuits. Since the E Box 133 has one portion which is primarily used for computations involving floating point numbers, and a second section used mainly for arithmetic operations on fixed point (integer) numbers, and logical or arithmetic operations on variable length alphanumeric operands, it is shown as the Floating Point Unit 142 and as the Fixed Point (including Variable Field Length) Unit 143. The major communications between units are set out in FIG. 3 where the number of control lines (CL), the number of address busses (24 lines each) (AB) and the number of 72 bit (8 bytes each with 8 data bits and 1 parity bit) data busses (DB) are indicated for each direction of communication between the logical units.

The Maintenance and Operators Console 102 is also included in FIG. 3 as it receives communications from all of the CPU 100 areas. The inputs to Console 102 are mostly individual data bit lines from the CPU, there being 926 from the FLPU 142, 629 from the FXPU 143, 1024 from the I Box 134, 681 from the MSCE 136, and 191 from PSCE 137, for indication purposes. In addition a further group of 53 lines 144 from the Console 102, and 100 lines 146 to a Console 102, connect to a Selector Channel 122 to enable the system operator or a system engineer to communicate with the CPU 100.

*Instruction unit*

The Instruction Unit (I Box) 134 performs under the control of the instruction words of a program and has the following assignments:

(1) Fetching and buffering of the stream of instructions.
(2) Partial decoding of instructions and their assignment to the proper execution unit.
(3) Fetching of operands to the execution units.
(4) Complete execution of branching, I/O and status switching instructions and partial execution of instructions requiring multiple operations.
(5) Handling of interrupts.

The first assignment, instruction fetching is under the control of three registers, the Upper Bound Register (UB) 147, FIG. 4, the Instruction Register (I Reg.) 148, and the Lower Bound Register (LB) 150. Each of these three registers has associated therewith an Incrementer Unit 151, 152, and 153, respectively, which always has an output signal representing one more than the value in its associated register. When the incremented output is fed back into a register, the register assumes the incremented value which then passes to the Increment Unit 151, 152, or 153, to raise it to the next value. Thus, each time the output of the Increment Unit is gated into its register, the register value increases by a unit.

The instruction words from storage, double words of 72 bits each, are received by I Box 134 on a group of 72 lines forming the Storage Bus Out (SBO) 155, and are gated into a set of eight Instruction Buffers 156, numbered 0 to 7, or, under some conditions, into #1 or #2 Temporary Buffers 157. For the present it may be assumed that the first instruction word fetched will be stored in the Instruction Buffer 156 having as its designation the lowest three bits of the double word address of the fetched word. The second word will normally have a sequential address and will be placed in the next higher numbered Buffer until #7 Instruction buffer is filled. The next word fetched will have an address which will end in 000 and the fetched word will be placed in the #0 Instruction Buffer 156.

Initially all Instruction Buffers 156 are considered to be empty as are UB 147, I Register 148 and LB 150. The starting address of the program is placed in UB 147, I Register 148 and LB 150, and a fetch is immediately initiated using the address in UB 147. On the next machine cycle, a second fetch is initiated using the address from Incrementer 151 which address is also placed in UB 147. A third and a fourth fetch are called for on the next two machine cycles with an incrementing of UB 147 on each fetch, after which incrementing the UB 147 will be set to an address three higher than the starting address in I Register 148, and this will be the address of the last word fetched. As will be more fully described later with reference to the MSCE 136, the destination of a fetched word is sent out on the machine cycle before the word is transmitted, and in this instance the input gates to the Instruction Buffer 156 having the address corresponding to the lowest three digits of the storage address will be selected to put the returned word into the appropriate Instruction Buffer 156. Since this is the first fetch, the Operating Register 159 is empty at this time and the fetched word will also be gated into this register. Operating Register 159 is controlled to receive instruction words from any of the Instruction Buffers 156, Temporary Buffers 157 or SBO 155, and holds the current instruction word for decoding and control, and also holds enough of the next instruction word or words to fill up its double word capacity. Successive instruction words are placed in the successive Instruction Buffers 156 as they are received.

In the described embodiment, instructions may be of three lengths, either 16, 32, or 48 bits long and it will be noted that the Operating Register 159 has an elaborate array of gates connected thereto. On the input side, there are four sets of 16 bit gates so that any one or more of the 16 bit positions of Register 159 can be loaded independently. Initially as was noted, the entire 64 bits of the first instruction word on SBO 155 are loaded into OP Register 159. Since instructions may start at any of the four positions within this instruction, it will be clear that the current instruction address in I Reg. 148 will need two low order bits in addition to the fetch address to select the proper part of the instruction word in Register 159 for decoding, and one or more of the 16 bit groups to the left may belong to a previous program and are not to be used. Hence, under control of the I Reg. 148, any of the bits needed to fill out these left orders with significant instructions will be gated into OP Register 159 when the second instruction word is fetched over SBO 155. Thereafter, as instructions are used from Register 159, it is refilled from the Instruction Buffers 156 to maintain the Register 159 filled with unused instructions.

Among the out gates from Register 159 is the operating code set of four groups of eight gates supplying a Bus 160 of eight lines. Since the operating code will always be the leftmost eight bits of an instruction, and the instruction can start at any of the four positions within the Register 159, the lines 160 are gated to the left eight bits of each group of 16 bits.

Storage addresses within instruction words may be in either of two formats. First will be instructions for those operations requiring only the use of some of the General Purpose Registers (GPR) to be described later and designating one or two GPR's in the second eight bits of the first 16 bits of the instruction. These addresses will be gated out of the appropriate positions to a Bus 161 of eight lines. In the other format, a storage address will be set out in the second or third 16 bits of a longer instruction as four bits specifying a GPR which contains a base address and 12 bits specifying the displacement of the wanted address from the base address. The four bits for the GPR selection will, for this format, be gated out of the selected positions to a Bus 162 which is only four bits wide. The accompanying 12 displacement bits of the address will be gated on a 12 bit wide Bus 164 into a storage buffer 165.

The Op Code part of an instruction in Register 159 will be gated out on Bus 160, and into an Operation Decoder 166, under control of the two low order bits of I Reg. 148, which as mentioned above, identify the location of the current instruction within Register 159. The two highest bits of the operation code specify the instruction format and control the readout of the address part of the instruction to Busses 161, 162, and 164. For a 16 bit instruction, the address or addresses on Bus 161 normally specify GPR's which contain operands for an operation within E Box 133, and will be transmitted thereto along with the operation control signals from Decoder 166.

For a medium length, 32 bit instruction, the second half of the first 16 bits may still specify a GPR for use, as for example, as address in Main Store 104, or Extended Main Store 105, and such address will require use of an I Box Adder 168. The Adder 168 has three inputs which are to be added together to produce the effective address of the operand to be fetched. One input 169 is 12 bits wide and is supplied by Buffer 165 which is loaded with the displacement part of the address directly from the Operating Register 159. The base part of the address can be up to 24 bits and will be stored in a GPR which will be gated into a second input 170 of Adder 168 under control of the address on Bus 162. Another factor of the effective address is to be found in an index register which will also be a GPR, and the value in the index GPR, which will be selected by the signals on Bus 161, will be transmitted to the third input 172 of Adder 168.

It should be noted at this time that the GPR's are physically located in the Fixed Point Unit 143, FIG. 3, and not in the I Box 134. As the time required to send a gating signal to the GPR's and receive their stored value is substantial and would cause at least a loss of one machine cycle in the time required to generate an effective address, the numbers stored in the GPR's are made immediately available to the I Box 137 by extending "hot" lines, indicated in FIG. 4 as GPR Bus A, 173 and GPR Bus B, 174 into the I Box from the GPR's, and putting gates at the I Box end of these busses. Thus, when a value in a GPR is needed, it may be immediately gated into Adder 168 despite the physical distance separating the GPR's from the Adder. The only exception to the immediate availability of the GPR settings can arise when a value to be stored in a GPR is generated in Adder 168, and is neded in the next machine cycle, and there is insufficient time available for the value to be stored in the GPR and returned on the Busses 173 and 174. This exception is sensed in the I Box 134 and is compensated for by the provision of a third Temporary Register 176 which is loaded from the output of Adder 168. Whenever I Box 134 determines that the address of a required GPR is the same as that one which has just been loaded from Adder 168, the value stored in Temporary Register 176 is gated to Adder 168 instead of the settings of the associated GPR Bus 173 or 174. Another Register 177, the W Register, also receives the output of Adder 168, and can be gated out to the GPR's or to Main Storage 104, as required.

*Operation of the instruction unit*

In the operation of the I Box structure thus far described, it will be seen that initially UB 147, I Reg. 148, LB 150 and all Instruction Buffers 156 and Temporary Registers 157 are clear of significant values. The address of the starting instruction is loaded into UB 147, I Reg. 148, and LB 150, and instruction fetching is started by requests for double words from the addresses in UB 147. The UB 147 is incremented at each fetch so that it always records the address of the last instruction fetch requested. The UB 147 will request fetches of instruction words until it is three word addresses ahead of the address in I Reg. 148 for a total of four initial words. When the first word returns it is gated into one Instruction Buffer 156 and into Operating Register 159 where the two lowest order bits of I Reg. 148 which have no address function in fetching, control the readout of the initial half word, 16 bit, instruction to the OP Decoder 166, the GPR's etc. As soon as the first instruction is processed by either execution in the I Box, or by being transferred to another unit for execution, the address in I Reg. 148 is increased by the length of the last instruction, this length is indicated in the first two bits of the instruction, and now points to the first part of the next instruction. At this time, the half words of instruction in Operating Register 159, which have been utilized, are replaced by the corresponding half words of the next instruction word from an instruction Buffer 156. Thus, there will always be available in Register 159 at least the operating code part of the next instruction, and the remainder of the instruction can be loaded into 159 as that Op code is being decoded.

Each time the I Reg. 148 is incremented to cause a carry from the two low order bits into a higher order bit, it is an indication that another double word instruction has been completely utilized so far as the I Box is concerned and that decoding has moved into a new word. Since the UB 147 is not now 3 double word addresses ahead of I Reg. 148, a fetch of the next instruction is called for and UB 147 is incremented to again be 3 ahead of I Reg. 148. LB 150 has in the meantime remained at the address of the first instruction word placed in Buffers 156. When UB 147 is eventually incremented so that it calls for a fetch into the same Buffer 156 as the first instruction word was placed in, the address in LB 150 is incremented to point to the next higher address. Thus, in summary, UB 147 contains the address of the last instruction word which has been called for a fetch, I Reg. 148 contains the address of the instruction word being decoded, and LB 150 contains the address of the oldest instruction word remaining in Buffers 156. These operations will continue in this order until a branch point of some kind is reached. For a branch which forms a short enough loop so as to be contained within the past history instruction words already in Buffers 156, as shown by a comparison of the address in LB 150, with the branch address specified in the current instruction, the I Box 134 is set into "Loop Mode."

In Loop Mode, the address in LB 150 is set to the target of the branch and LB 150 is frozen in that state so long as the I Box continues in Loop Mode. It is also possible to generate a Loop Mode state of the I Box if the target of the branch instruction is not contained within the Instruction Buffers 156, but is nevertheless less than eight full double words prior to the address of the present instruction. In such a situation, the entire loop can be contained within the Buffers 156. Upon detection of such a loop, i.e. the branch address is within eight double words of the address in I Reg. 148 but is not at this time contained in Buffers 156, an initialization of the I Box is started. Here, the branch address of the instruction is placed into UB 147, I Reg. 148 and LB 150 as above described, to start instruction fetching. In the Loop Mode state LB 150 is frozen at the starting address and UB 147 is permitted to increase to completely fill the Buffers 156 with future instructions as soon as the necessary machine cycles can be spared after the four cycles required for the initial instruction fetches and after such operand fetches and other storage operations, as have priority, have been taken care of.

In either type of Loop Mode state, the complete instruction loop is contained within the instructions stacked in Buffers 156 and will be decoded and transmitted to the E Box 133 for execution without any need for continuous fetching of the instructions of the loop from storage. It will be evident that any branch instruction which leads to an instruction loop will be a branch on condition type of instruction for otherwise the machine will be locked into an unending loop. The I Box 134 operation for all branch on condition instructions will be substantially the same unless the instruction leads to the first type of Loop Mode where the target instruction is already in Buffers 156. As a preliminary description, the I Box 134 will have no difficulty with an unconditional branch instruction or a conditional branch instruction in which the condition for the branch has occurred prior to the decoding of the instruction after its transfer into Operating Register 159. In these unconditional or predetermined condition branches, the target address of the instruction is placed into UB 147, I Reg. 148, and LB 150, as soon as it is determined through Adder 168 and the condition, if any, is tested and thereafter the I Box 134 proceeds in the same manner as initially described.

If, however, the branch is dependent on a condition which has not been determined, when the branch instruction is decoded, the I Box must proceed in a manner which offers the best chance of avoiding loss of time. Hence, the I Box assumes that the condition will not be met and continues to decode and transmit for execution the subsequent instructions. It does, however, set up a condition test circuit to be activated when the condition has been determined and will also pause long enough to call for two storage fetches starting at the target address of the branch. These two instruction words when they return will be stored into #1 and #2 Temporary Buffers 156, respectively, to be available if the program branch is to be taken. Furthermore, the instructions issued to the I Box 134 or E Box 133 after the conditional branch instruction is decoded will be accompanied by a conditional tag which prevents execution of the instruction so long as it is present since the I Box does not now know if the branch is to be taken or not. When the condition on which the branch depends is determined, such conditionally tagged instructions will have their tags turned off if the condition is not met, or if the condition is met the conditionally tagged instructions will be cancelled and thus not executed. Obviously, if the condition of the branch is not met, the instructions stored in Temporary Buffers 157 will be cancelled or if they have not returned from storage, will be blocked at the gates into Buffers 157, but if the branch condition is met, then the word in #1 Temporary Buffer 157 is transferred into an Instruction Buffer 156 and into Operating Register 159 for decoding as the new instructions. The storage address of this instruction word is placed in UB 147, I Reg. 148, and LB 150, and this address determines which of the Buffers 156 is selected to store the instruction word. The instruction word in #2 Temporary Buffer 157 is now transferred into the next adjacent Buffer Register 156 and UB 147 is incremented. Control will then be transferred back to UB incrementer 151, now pointing to the branch address plus two and further instruction fetching will proceed as first described but from the branch path.

If, however, the conditional branch will set up an instruction loop which can be contained within Instruction Buffers 156, the I Box 134 will for the first iteration proceed exactly as above set out but will additionally be set into Loop Mode to prevent the LB 150 from exceeding the target address until the condition of the branch has been determined. If, however, the LB 150 has already exceeded the target address, and thus the first loop instruction has been dropped from Buffers 156, the I Box will be set into Loop Mode and will then proceed as in any other branch, i.e. the target instruction will be fetched into #1 Temporary Buffer 157, etc. as above described.

So long as the I Box 134 remains in Loop Mode, there will be no additional instruction fetching from the Main Store 104 after the Instruction Buffers 156 have been filled with eight words starting at the branch target address until after the branch condition ceases to be met at the branch point or the target address changes. It was noted above that it is normally assumed that a branch will not be taken and that the I Box will issue instructions along the main path after the branch instruction and will tag such instructions conditional and not to be executed until the branch condition is determined. In Loop Mode, however, the alternative assumption is made, i.e. that the branch will be taken and the conditionally issued instructions will be in the branch back to the loop. They will, however, still be tagged conditional and will not be performed until the condition precedent has been decided. When the branch condition is no longer met, any such conditional instructions will be cancelled, the Loop Mode will be set off and new instructions will be issued along the main path. The LB 150 will be unfrozen and the UB 147 will immediately start fetching new instruction words until the normal relationship between the values stored in UB 147, I Reg. 148, and LB 150, is re-established.

It is also possible to leave Loop Mode or change to a different loop by some operation performed as a result of an instruction within the loop. It will be remembered that when the Loop Mode is entered, the address of the branch target is generated in Adder 168 by summing the values in at least one GPR and the address displacement specified in the instruction and stored in Buffer 165. If, during the processing of a loop, an instruction changes the value stored in one of the GPR's which was used to generate the branch address, the old address is no longer valid, and the branch instruction must be reprocessed to determine the new branch address. Such reprocessing of branch address could be done at each iteration of the loop, but does require a full machine cycle, and it is preferred to add some additional hardware to save this machine cycle. Such hardware comprises a Save Loop Count Instruction Register (SLCIR) 179 into which is gated the address in I Reg. 148 when a Loop Mode branch is detected and a Save Loop Target (SLT) Register 180 which receives the target address of the branch when it is available from Adder 168. Thus, SLCIR 179 contains the address of the instruction which sets the branch, and SLT 180 has the target address for the branch. Whenever in Loop Mode a branch instruction is found, the setting of I Reg. 148 is compared in Comparator 181 with the setting of SLCIR 179, and if they are found to be equal, the value of SLT 180 is gated into I Reg. 148, thus saving one machine cycle. It is to be remembered that Loop instructions after the branch are not to be executed until the branch condition is determined.

The target address in SLT 180 can be in error at the completion of iteration of a loop if one of the GPR's has had its stored value changed since it was used in generating the address in SLT 180. To detect such condition, the I Box 134 also stored during Loop Mode, the numbers of the GPR's which were utilized to generate the SLT 180 address, and also monitors the activity of such GPR's. If there is any alteration of one of these monitored GPR's, the SLT 180 value is considered invalid. Loop mode is therefore cancelled and a new branch address is generated in the same manner as the address was generated in the first loop iteration.

*Instruction issuing*

A second principal responsibility of the I Box 134 is the issuing of instructions to the appropriate units for execution and the fetching of required operands from storage 104 or 105. This task is pipelined in three independent stages so that at any time as many as three instructions may be in process by the I Box, each instruction being at a different stage of processing. This pipeline type of operation naturally provides an improvement in the effective speed of I Box operation, even though a particular instruction may be in process longer than the time needed to similarly process an instruction with straight through hardware.

Assuming that there are no interlocks to hold up operation of I Box 134, the first pipeline stage gates out over Bus 160 the operation code (8 bits) of the instruction in Operating Register 159 as selected by the setting of I Reg. 148. The OP code is decoded in Decoder 166 to the type of operation to be performed, i.e., floating point, fixed point, or other, and whether the execution unit will require operands from storage or not. For a floating point type of operation, the I Box will check to see if the Floating Point Unit (FLPU) 142 can accept the instruction. As will be described later, the FLPU 142 is analogous to a simple computer with an instruction stack to hold some instructions, floating point buffers to store operands and some arithmetic and logic units to operate on the operands. If the instruction stack is full, the FLPU 142 cannot accept the instruction from the Decoder 166. Also, if the instruction calls for operands to be fetched from storage, the I Box 134 checks for availability of a floating point buffer register to receive the fetched operand and checks the availability of Adder 168. The Adder 168 is not available if pipeline stage 3 is full, or if pipeline stage 2 is full and MSCE 136 is not accepting addresses for storage fetches for reasons to be set out at a later point. If any of these conditions is not met, the I Box 134 will stop until the condition is met. As soon as it can proceed, the Decoder 166 determines whether the I Box 134 is operating in conditional mode, i.e., whether a conditional branch has been previously decoded and the condition precedent to the branch has not been determined, and whether the operation will set a condition code signal.

As soon as the requirements are met, the I Box 134 will send to the FLPU 142 a signal including the following 14 bit signals:

1 Full/Empty—Sets tag to indicate valid instruction
1 Conditional Operation—Instruction not to be executed when bit is on
1 Condition Code—This instruction will set a condition code
6 Operation Code—Control the FLPU operations
2 Register Address—Designate the one of four registers having one of the operands
3 2nd Register Address—Designate a second register or a buffer having a second operand.

If the instruction is for a fixed point operation the I Box makes similar checks of its own pipeline status and of the FXPU 143 status to detect any blocking conditions. As soon as there are no such conditions, the FXPU 143 receives a set of 24 bit signals as follows:

1 Full/Empty bit—Set to indicate a valid instruction
1 Conditional Operation—Instruction not to be executed when bit is on
1 Condition Code—This instruction will set condition code
8 Operation Code—Controls the FXPU operations
4 GPR #1 Address—The location of operand #1
4 GPR #2 Address—The location of operand #2
3 Fixed Pt. Buffer—The address of the buffer register which is to have the source operand
2 Storage Address Register—Identifies a Storage Data Buffer to receive a generated operand.

Since both the I Box 134 and FXPU 143 can change the operands in the GPR's, an interlock is provided to prevent the I Box from using these registers before the FXPU can set them in an issued but unexecuted instruction, and also to prevent the I Box 134 from changing the GPR operand if the operand is to be used in an unexecuted operation. The structure for this interlock is associated with the GPR's and will be more fully described in the description of the FXPU 143, but briefly consists of a Register Unavailable for Addressing (RUA) Counter 337 and a Register Unavailable for Modification (RUM) Counter 335 for each GPR. Every instruction which uses a GPR as a sink for data storage increments the RUA counter for that GPR and execution of the instruction decrements the counter. The I Box 134 cannot use a GPR to generate an address until the RUA Counter for that GPR equals zero, at which time the GPR will store the correct value for an address generation. Similarly, the RUM counter is incremented whenever an instruction is decoded which uses the associated GPR as a data source and is decremented as the instruction is executed. The I Box is prevented from using such a GPR until its stored data has been fully utilized. Only when both RUA and RUM are 0 can the I Box use a GPR in a manner which would alter its stored value.

As noted above, when the I Box 134 decodes a branch on condition, it checks the condition code setting to determine which way to branch. Since there may be some instruction in the E Box 133 which has not been executed but which will affect the condition code, the branch cannot be determined until the last instruction capable of changing the code has been performed. Each instruction issued by the I Box 134 which can change the condition code includes a condition code bit and this will turn off all other set condition code tags in both FXPU 143 and FLPU 142. Thus, only one condition code tag can be set at any time, and this will be the last one issued. The I Box must hold off on determination of a branch until that condition code tag is reset.

As above noted, until a branch is decided, the I Box 134 will continue to issue instructions tagged for conditional operation. Any such instruction may have a condition code tag set but this will not reset the tag for the previously issued unconditional instructions. It will, however, reset the condition code tag on any previously issued conditional instruction so that one conditional instruction may also have a set condition code tag. When the conditional tag is cancelled on such an instruction, the presence of a set condition code tag will immediately reset any condition code tag bits among the unexecuted instructions.

There are also instructions which can be fully executed within the I Box 134, such as the branching set out above. In general, when the I Box 134 encounters an I Box instruction, it halts succeeding instruction processing until the instruction is completed, and for some instructions the I Box must wait until all instructions in process, i.e. in the pipeline, are issued before it can proceed.

In pipeline stage two, address generation for the first of any required storage operands takes place. The three operands on Adder Inputs 169, 170, and 172, are gated into the Adder 168, and the sum is gated to the Working Register 177. If the instruction is a store instruction, a quick check is made to see if the store can be to the storage address from which the next instruction now being decoded by OP Decoder 166 was fetched.

In pipeline stage three, the storage address of an operand is passed to an address buffer in MSCE 136, and in a store operation, the address is also checked in the I Box to detect if it is a store to an address from which an instruction fetch has already been made. If so, the I Box stops for one cycle and orders a new instruction fetch from the storage address. The MSCE 136 has, as will be described later, interlocks to insure that the store and fetch will be executed in proper logical order.

*Execution unit*

The Execution Unit (E Box) 133 can be considered as divided into two almost indenpendently operating sections, the Floating Point Unit (FLPU) 142, and the Fixed Point Unit (FXPU) 143, both receiving instructions from the I Box 134 and being connected by data busses to the MSCE 136 for operand transfer.

*Floating point unit*

The overall data flow and instruction storage of the FLPU 142 is shown in FIG. 5. The 14 bit instruction signal from the I Box 134 is received on a Bus 183 and will be stored in the next available one of a set of eight, 14 bit stack registers forming the Floating Point Operating Stack (FLOS) 184. The I Box can issue instructions for storage in FLOS 184 so long as the stack is not filled. The instructions in FLOS 184 are executed in a strict first-in first-out sequence.

The FLPU 142 also has a stack of six 64 bit buffer registers (FLB) forming the FLB stack 185. Each of these FLB's is connected to the Storage Data Out Bus 155, see FIG. 4, to receive operands from Main Store or Extended Main Store through MSCE 136. These operands will have been called from storage by the I Box 134 as the instruction was decoded. The I box will also have assigned one of the FLB's 185 to receive the operand and will have transmitted the address of that FLB to MSCE 136 as the sink to which the data fetched is to be sent, and will also have sent it to the FLOS Register 184 along with the operating code to identify to the FLOS 184 where its operand will be found. There is no requirement that the FLB's 185 be used in sequence for either receiving or transmitting operands.

There is also a stack of four 64 bit Floating Point Registers (FLR) 187. These FLR's normally contain one of the operands for every instruction, and are also the sink into which the result of an operation is placed.

An Add Unit 188 is provided to handle all floating point additions. This Add Unit 188 contains a full carry-propagate carry-lookahead type of adder in which the complete addition of two operands can be made in one machine cycle with the sum latched in a set of Add Result Latches 189. Since a floating point number will consist of an exponent of a base of sixteen as a multiplier factor and also consists of a fraction part, and as only fraction parts having the same exponent can be added or subtracted, it is necessary to compare the exponents of two addition operands and to right shift the fraction part having the lower value of exponent to align the fraction parts properly. This testing and shifting operation is performed in one machine cycle and the aligned operands are set into latches for application to the adder during the next machine cycle with latching of the result into latches 189. Thus, addition of two operands can be performed in two machine cycles, but as the output during the first cycle is set into latches, it is possible to gate the setting of the latches into the adder and at the same time to gate a second set of operands into the exponent comparing and fraction shifting stage for their preliminary handling. It is thus possible to have two sets of operands in Adder 188 at the same time, and by such pipelining to produce results at the Adder 188 output latches 189 at an effective rate of one per machine cycle.

To provide the operands required for such repetitive adder cycles, the Add Unit 188 is supplied with three sets of input buffers 191, each set being effectively an adder and comprising two 64 bit registers to store respectively, a sink operand and a source operand, and also comprising a group of 10 address latches to store the four bit address of the unit whose output will be stored as the sink operand, all zeros indicating that the operand will be from an FLR 187 and a five bit group for the address of the unit whose output will be stored as the source operand. An all zero condition of the five bit group will specify that one of the FLR's 187 will be the source, a 10000 setting will specify the Buffer Stack 185 as the source, while a non-zero condition of the last four bits will identify one of the other add or multiply-divide units as the source. A single bit, the S/L bit, is a part of the original instruction field in the Operating Stack 184, and indicates whether the operation is to be performed with short or long precision, i.e., it controls the gating for the low order group of 32 bits.

The FLPU 142 also contains a Multiply/Divide Unit (M/D) 192 for the multiplication or division of operands supplied thereto. The result of an M/D unit operation is temporarily held in a group of latches, M/D Result 193. To keep the input of the M/D Unit 192 supplied with operands, there are two Operand Storage registers 195 for each input to the M/D unit. This enables a new set of operands to be stored for the M/D unit 192, while a first set is being utilized in the unit. As in the Add Unit 188, there are ten register positions associated with a pair of Registers 195, four positions to retain the address of the unit from which a sink operand will be supplied, five positions to hold the address of the unit from which a source operand will be supplied, and a short/long precision bit.

A Common Data Bus (CDB) 196 is provided to transfer data between the inputs and outputs of the Add Unit 188, the M/D Unit 192, and the FLR's 187, and to gate out the values in FLB's 185. Insofar as data is concerned, the CDB 196 is an extensive set of gates feeding an output OR circuit, so that any selected input to the Bus 196 may be connected to the Output Bus 197, which is common to all data receiving units including the Storage Data Buffers 244 of MSCE 136. The CDB 196 also contains control circuitry to gate the units which are to utilize CDB 196 in accordance with a preselected priority. The FLB's 185 have first priority and when they contain operands will be gated out in sequence from the lowest numbered on to the highest numbered one. When no operands are in FLB's 185, the Add Unit 188 has next priority for the CDB 196 and is strictly on a First In-First Out priority among the Buffer Registers 191 which have all of their needed operands. The M/D unit 192 has the lowest priority and can gate out its results with a First In-First Out priority between its input registers 195 if both sets are ready at the same time. The First In-First Out (FIFO) priority among the inputs of the Add Unit and the M/D unit is to allow staging of operations through these units to maintain a proper sequence of results, and to prevent any undue delay in supplying operand results.

When any unit requires the use of CDB 196 to transfer an operand, it transmits its request to the CDB priority circuit which will, when no unit with higher priority is requesting the bus, return an accept signal and transmit to every operand input circuit, the address of the unit which is to put its operand on the CDB 196. It was noted earlier that each of the Buffer Registers 191 and 195 stored the address of the unit which was to supply its operand and such a register will also be provided in the other units receiving data from CDB 196 as the FLR's 187 and the SDB's 244 supplied by SDB 197. When the address of the transmitting unit appears on CDB 196, it is compared at every input with the stored address, and when an equality is detected, the receiving unit prepares to accept the operand. The CDB 196 will gate out the selected operand to its Output Bus 197 on the next machine cycle at which time the receiving unit will have its gates opened to receive the operand. On the same cycle which transfers the operand, the control section of the CDB 196 can again respond to a bus request and transmit on its address bus, the address of another unit which will supply the next operand on the bus so that effectively the CDB 196 can transmit at a maximum of one operand in each machine cycle.

The FLB's 185 are provided with a direct input to the right hand ones, the sources, of the Buffer Registers 191 and 195, and to the Fixed Point Unit 143 by way of the Buffer Bus (FLBB) 199. Whenever an instruction in FLOS 184 indicates that an operand fetched to an FLB 185 is to be a source operand, the FLB when it receives the operand requests a time slot on the FLBB 199. FLB 199 has controls similar to CDB 196 but simpler in that the only priority is between the FLB's 185 according to their number. When an FLB's request for Bus 199 is accepted, its address is sent to all receiving units and, as described above with respect to the CDB 196, on the next cycle the unit which is to receive the operand will gate it in from FLBB 199.

*Operation of floating point unit*

The FLPU 142 with its own stored program in FLOS 184, its own storage in FLB's 185 and FLR's 187, and its own execution units Add Unit 188 ond M/D unit 192, is essentially a small specialized computer under the overall control of the I Box 134. As was set out in the description of the I Box, any instructions for the floating point unit are sufficiently decoded to identify that the instruction is for FLPU 142 and the operation part of the instruction is sent thereto. If the instruction also specifies the FLR's 187 as the source and sink of the required operands, these two addresses will be also transmitted to FLPU 142. If, however, an operand from storage is needed, the I Box 134 will determine which of the FLB's 185 are available for use, will insert the address of the selected FLB 185 into the instruction sent to FLPU and will include the identification of the FLB as the sink of the fetch request sent to MSCE 136' These instructions are sent to and stored in FLOS 184 in sequential order.

When an instruction in FLOS 184 is ready for execution it is decoded in a Control Unit 200 on the output of FLOS 184 to determine what units are required for execution of the instruction. The full information for the instruction, i.e. Op Code and 2 operand addresses, is transmitted to all execution units. Every unbusy execution unit will sample the transmitted information and it will continue to sample the information on every cycle until it is selected. The sampling of the instructions comprises actually entering the data from FLOS 184 into a set of latches and retaining it until the next set of data is put on the FLOS output. When an execution unit is selected for the execution of the instruction, the operation codes already in its latches will be frozen into the units control circuits, and the addresses which accompanied the OP codes will remain in the selected Buffer Registers 191 or 195 or the SDB's. The execution unit is thereafter tagged busy and will not again sample the control signals until it has completed its operation and placed its result signals on the CDB 196. It is to be understood that for the purposes of this discussion, an execution unit may be considered to comprise an FLR 187, a Storage Data Buffer (SDB), or for arithmetic operations, one pair of Buffer Registers 191 or for arithmetic operations, one pair of Buffer Registers 191 or 195 for any pair of registers will store all of the operands required for an operation and such an operation, with only rore exceptions, can start as soon as all operands are stored. It has actually been determined that the time saved by the provision of three separate Add Units and two separate M/D units instead of one Add Unit 188 with three sets of Buffers 191 and one M/D unit 192 with two sets of Buffers 195 is negligible or non-existant for most programs.

Before any execution unit can be selected it is necessary to bring up a GO signal during a decode cycle. The conditions required for generation of GO are dependent upon the operation to be performed, but may include such tests as:

(1) A precision (S/L) match between an instruction and the data in a sink register.
(2) A precision (S/L) match between an instruction and the data in a source register.
(3) Is Execution Unit Available.
(4) Is operation tagged conditional.
(5) Is the operation cancelled.
(6) Is the FLOS empty.

The next cycle of operation is the Select cycle and comprises some combination of the following operations:

(1) Turn on Execution Unit's Select Trigger for one cycle.
(2) Set Unit Busy Trigger for the selected unit.
(3) Set the FLB name section of the address of the instruction into the FLB address part of the Buffer 191 or 195 and turn on a GO When Full (GWF) tag for the addressed FLB.
(4) Set the FLR part of the address of the instruction into the FLR address part of the Buffer 191 or 195 and turn on a busy trigger for the FLR.
(5) Set a Sink FLR outgate trigger.
(6) Set a Source FLR outgate trigger.
(7) Step the Operating Stack of the next instruction.

It is to be noted that during the decode cycle, an execution unit will receive the address of the unit which is to send it the required operand or operands, and such addresses will be latched in when the unit is selected. During a select cycle of an arithmetic operation, the sink operand from the appropriate FLR 187 will be put on the bus for receipt by the selected execution unit. If, however, the sink FLR has not yet received the operand from a unit, i.e., an FLB 185, the Add Unit 188 or M/D unit 192, it will have its busy tag set as will be described at a later point, and will have in its control circuits the address of the unit which is to supply the operande on the CDB 186 for transmission to FLR 187. If the sink FLR 187 contains a set busy tab during the select cycle when its stored operand is to be transmitted, the FLR 187 will instead transmit the address of the unit to supply the operand and will then be set not busy. This address will replace the FLR 187 address sent to the Buffer 191 or 195, so that when the execution unit which is to supply the operand puts its identification on CDB 196, the identification will be recognized by the control circuits of the receiving unit which will thereupon gate the operand into its Buffer 191 or 195 on the next cycle. This scheme of transmitting the address of the operand supplying unit when the operand is not available is termed "forwarding" and as is evident will enable substantial time to be saved since in this embodiment, it is not necessary to store the operand in the designated FLR 187 and then wait several cycles to transmit it to the using unit. An additional advantage is that the FLR 187 is free to receive a new operand as soon as it has transmitted the address from which its operand was to come.

If the second operand is also to be sent from an FLR 187, another select cycle takes place to transmit either the operand stored in the selected FLR 187 or its stored identification of the unit which is to supply the operand. When the source operand is from main storage, however, the operation is somewhat changed as the FLB 185 to receive the operand is assigned by the I Box when the instruction is decoded in the I Box. Now when the instruction is reached in FLOS 184, the control circuits 200 will look at the addressed FLB and if it is full on the first select cycle, it will be gated out to the execution unit where its stored operand is to be used. If, however, the operand has not been received, the FLB is directed to GO when Full (GWF) as previously noted, and will then puts its operand on the FLBB 199 when it has been received and priority permits.

*Non-arithmetic FLPU operations*

The Control 200 in conjunction with FLOS 184 can perform a number of operations without the use of an arithmetic execution unit. These operations will include a number of variations of a load routine such as load, in either short or long precision, one FLR 187 from an FLB 185, or from another FLR 187, or to load from one FLR to another and to test for a zero, positive or negative condition of the operand. The operations will also include a store routine to transmit an operand from a sink FLR 187 to an SDB by way of the CDB 196. None of these operations involve an arithmetic unit and simply transfer data unchanged. If the move operation is to load an FLR 187 from auother FLR 187, the operand storage address is sent on the decode cycle and the operand is sent on the next cycle. If, however, the sending FLR is tagged busy, its address register contends are forwarded to the receiving registers address register, and the sending one is reset to not-busy. When the sending device is an FLB 185, the FLB will transmit over the CDB 196 if it is full, or will be set to Go When Full, and it is given priority. The address register contents cannot be forwarded for these operations for the SBO 155 of the FLB's does not connect directly to the FLR's 187.

If the operation is a Store Operation, a similar sequence is followed except that an SDB in the MSCE 136 is to receive the operand from an FLR 187. The SDB will be given the address of the source FLR, or the contents of the source FLR's address register will be forwarded to it if the FLR is busy and has not received the operand.

*Fixed point unit*

The Fixed Point Unit FXPU 143, FIG. 3, is a part of the E Box 133 and executes all operations using fixed hexadecimal numbers and all variable length operands, alphabetic and/or numeric. The FXPU 143 comprises five functional units as indicated in FIG. 6. These units are an Operation Stack 201, for both Fixed Point and Variable Field Length operations, a group of 16 General Purpose Registers (GPR) 202, each 32 bits wide and, as previously mentioned in the description of the I Box 134, each connected by "hot" lines to the I Box GPR A Bus 173, and GPR B Bus 174, and six Fixed Point Buffer (FXB) registers FA to FF, individually referenced as FA 204, FB 205, FC 206, FD 208, FE 209, and FF 210. Also included in FXPU 143 are a VFL Logic Unit 212 having associated with it an Immediate Data Input Register 213, and a Fixed Point Execution Unit which may be considered as comprising a 36 bit three input Carry Save Adder (CSA) a 38 bit wide Carry Propagate Adder (CPA) 216 which can feed its output into either half of a 68 bit Accumulator 217, and a Shifter 218 on the output side of Accumulator 217. Shifter 218 is capable of shifting the output signals to the right or to the left up to 32 bit positions and includes an Overflow Detector 220 to detect any significant digit loss on a left shift. A group of Store Bus OR's 221 can combine data to be transferred from different units in the FXPU 143 to the Storage Data Buffers in the MSCE 136 into the one Bus 197.

The Fixed Point Operating Stack (FXOS) 201 contains six 24 bit Buffer Registers. The function of FXOS 201 is to receive mico-coded Op's on an input bus 222 from the I Box 134 as previously mentioned, and to issue the Op's on a First In-First Out basis to the Op decoder 224 for control of the Fixed Point/VFL operations.

The 16 GPR's 202 are used as the sink and source of the operands for most instructions. There are two full word output busses, A Bus 225, and B Bus 226, and only full words can be gated from a GPR 202 to a Bus 225 or 226. The GPR Address Register 228 is a 9 bit register set from I Box 134 on Bus 229 to control the address of the GPR which is the sink of an operation and controls the ingating of operands into the GPR's 202. A single byte (8 bits) a full word (32 bits) or a double word (64 bits) can be ingated on any cycle. An ingated byte will always be stored in bit positions 24 to 31, i.e. the right end of a GPR and a double word will be stored in an even-odd pair of GPR's, i.e. #'s 2 and 3, 4 and 5, etc.

The six Fixed Point Buffers 204–210 are used during Fixed Point/VFL operations as sink and source data registers and all operands from storage will enter the FXPU 143 through these Buffers. Four of the six buffers FA–FD are used for all multi-operation instructions, both Fixed Point and VFL, while the other two FE and FF are used only for Fixed Point operations. A buffer can have either the right or the left 16 bit half outgated to the left half of the left input of CPA 216, or the right half of the buffer can be gated into the right half of the same left input of CPA 216, either alone or in conjunction with the gating of the buffers left half into the remainder of the CPA input. It should be noted that this left input of CPA 216 has a T/C side 231 which may be set to cause entry of the operand (T) or its complement (C) for effective addition or subtraction of the operand.

For VFL operations, the FA and FB buffers 204 and 205 may be used as one 64 bit sink register and any byte may be outgated to the sink bus 232 of the VFL Logic Unit 212. The other two buffers FC and FD 206 and 208 may be used as the 64 bit source register and any byte may be outgated to the Source Bus 233 of the Logic Unit 212. Although not further described at this time, there is a Byte Address Register associated with each Buffer FA, FB, FC, and FD, those with FA and FC being three bits wide to address any byte of the combined 64 bits of FA–FB and FC–FD and those for FB and FD being two bits wide to address any of the four bytes in a register when it is used alone as a 32 bit wide register. Each address register can be incremented or decremented by a unit and the data in the register controls the bytes to be outgated to Busses 232 and 233.

The Carry Save Adder 214 is used only for Multiplying operations and has a Multiply Gate 235 connected to two of its inputs to supply to one input either nothing or a one multiple or a two multiple and to the other input either nothing or a four multiple or an eight multiple. All multiples are of the multiplicand operand without a 0, 1, 2, or 3 bit position left shift, and any multiple can be supplied either plus or minus as required.

The Carry Propagate Adder 216 is 38 bits wide on each input. It is used as a 32 bit wide Adder for Add and Subtract operations, as a 36 bit wide Adder for multiplication and division operations and it is used over its full width in Convert to Decimal operations. Only on the left input is a complement function available.

The Accumulator 217 is 70 bits wide with a right 32 bits, a left 32 bits and a six bit left extension, and is used particularly in Multiplication to buffer partial results. The outgoing circuits go to the Shifter 218 or back to the inputs of CPA 216 with the CPA input circuits settable for a left shift of either one or three orders, or for a right shift or four orders of only the left part and extension. The outgating for the right part of Accumulator 217 enables the value stored in the right half of the Accumulator 217 to be sent to either input of CPA 216, to be partially decoded along with the left part for a string of leading zeros in Leading Strings Decoder 379, or to a Multiplier Decoder 377 which controls the Multiply Gates 235.

The Shifter 218 spans a full 64 bits and is ingated from Accumulator 217 and for the Multiply operation can also receive the right four bits of the six bit left extension. The input can be shifted to the right or to the left and can be shifted any extent up to 32 orders. Zeros will be filled in on the right or left end, ones will be filled on the left end when a complemented negative number is shifted and any significant digit shifted to the left out of the effective output bus will be detected as a spill.

The Immediate Data Register 213 is linked to the VFL Data flow and is also linked to the Operation Stack 201. Its primary function is to hold Immediate Data which will be included in the instruction word. This register 213 can outgate to either the Sink Bus 232 or the Source Bus 233 for the VFL Logic Unit 212.

The VFL Logic Unit 212 has the Sink Bus 232 and the Source Bus 233 as its two 8 bit inputs and has the ability to AND, to OR, or to XOR (Exclusive OR) the two sets of inputs or to gate either input unchanged to the Result Bus 234.

The I Box can supply data directly to the GPR's 202 by sending a 32 bit word, generally an address base, on a Bus 236 and specifying the GPR 202 to receive the data by the signals on Bus 229 to the GPR Address Register. The I Box 134 can receive signals by the 512 "hot" lines connected to the GPR's and an 8 bit OR 237 drives a bus which can transmit any 8 bit byte from the FXB's 204, 205, 206, or 208, to I Box 134.

The Storage Bus Out (SBO) 155 is a 32 bit wide bus and will carry a word from storage as the response to a fetch request. Data on this Bus 155 will be preceded by the I Box assigned address of the FXB into which the operand is to be stored. As described earlier, the detection of its address by an FXB 204–210 will open its ingates on the next cycle to allow the store value to enter the FXB.

The Floating Point Bus is Bus 199 of FIG. 5 and comprises a 64 bit data part and a three bit address part to select an FXB as above. Data will be put on the Bus 199 as a result of a request from FXPU 143.

The Store Bus OR's 221 can be loaded with up to 64 bits of data to be sent to a Storage Data Buffer (SDB) 244 in MSCE 136. The OR's 221 will also be supplied the address of the SDB 244 to which the data is to be sent. The Store Bus OR's 221 can collect data from the FXB's 204–210, from the GPR's 202 and from the Accumulator 217. Either 1, 2, 4, or 8, bytes of eight bits can be gated through the Store Bus OR's 221.

*Fixed Point Unit Operation*

The primary purpose of the decoder 224 is to control the issuing of instructions from the Operating Stack 201. These instructions in FXOS 201 are microcoded in 21 bits with the left eight bits containing the Op code. Three tag bits are also provided for each FXOS buffer register. These three are the Conditional Operation, Set Condition Code, and Full bits which have been previously described.

As Op's are processed, certain signals must be sent to the I Box 134 to maintain up-to-date the I Box counters indicating the status of the GPR's and FXOS. The RUA and RUM Counters 337 and 335 are incremented as OP's are sent to the FXOS and during execution of these OP's the same counters are to be decremented and will indicate that a specific GPR has just completed its function as a sink or a source field. The specific RUM or RUA counter to be decremented will be indicated by the register address field of the Op or from the GPR Sink Address Register 228.

The I Box 134 also maintains the FXOS Counter 203 to indicate the number of unexecuted instructions in FXOS 201. Each Op issued by I Box 134 to FXPU 143 causes the Counter 203 to be incremented, and each OP execution sends a Stack Counter Decrement Signal to the I Box.

Fetches of all operands will have been called for by the I Box when an instruction is decoded, and a specific FXB 204–210 or Floating Point Buffer (FLB) 185 FIG. 4 will have been assigned. In general, all 32 bit operands will be brought into the FXB's while 64 bit operands will be sent to an FLB 185 and will be transferred to the FXB's when requested. The address of the assigned FLB or FXB will be included in the Op sent to FXOS 201. The I Box 134 keeps track of the full or empty status of the FXB's and FLB's by setting a busy trigger when an FXB or FLB is assigned and then having the trigger reset by OP Decoder 224 when the data in the FXB or FLB is used. Also, address generation of operands, branches etc., in I Box 134 will be taking place concurrently with the execution of OP's in FXPU 143. To prevent delay in the I Box processing when Fixed Point operations are in process, the I Box is given priority in making a store into GPR's 202, even to the point of blocking Fixed Point/VFL processing if necessary. This priority is controlled by an ingate priority circuit which monitors all I Box requests for GPR ingating, and as soon as the I Box request for ingating is accepted, it will block an ingate request from the FXPU execution units until the I Box has completed its storing into the GPR's.

In the FXPU 143, the normal processing of Op's in the FXOS 201 is in a serial manner. As an OP is issued to one of the execution units, Fixed Point or VFL, any data required from a FLB 185 is called for and assigned to an FXB 204–210. The FXB's are monitored to detect when all data fields are available to execute the issued Op.

While the execution of one Op instruction is in process in the execution units, the next Op in FXOS 201 is being decoded in Decoder 224 and this will apply for the successive Op's of a multiple Op instruction, as well as for an Op which can be executed in a single cycle. The succeeding Op will be issued as soon as the data facilities for its execution are available to the extent that two or more Op's can be in execution simultaneously if they do not have overlapping hardware requirements.

Most Op's for the FXPU 143 are single Op instructions having, for the control bits 8 through 20, the addresses of the registers containing the needed operands. In these 21 bits, bits 0–7 are for the Op code, bits 8–11 identify a GPR 202 for the first operand, bits 12–15 identify a second GPR 202 for a second operand, bits 16–18 specify which FXB or FLB contain the operand to be sent to storage, and bits 19–20 are the SDB 244 which is to receive the data to be stored in Main Storage 104.

For another type of operation, single operand instructions, bits 12–18 may contain data having a different significance. If the operation is a SHIFT then bit 12 specifies a direction and bits 13–18 are the shift extent, while for a LOAD MULTIPLE or STORE MULTIPLE, there will be a plurality of Op's, i.e., one micro-Op for each word and bits 12–15 are control bits for LEFT, RIGHT, START and END, and bits 16–18 specify the FLB 185 having the storage operand to be processed.

The Fixed Point Unit (FXPU) 143 operations may be grouped into single cycle instructions and multiple cycle instructions. The single cycle instructions include the LOAD instructions in which all operands go through the Adder 216. The source register, either a FXB or a GPR is gated to the left input to Adder 126 and then back to the GPR sink register. If the LOAD instruction includes a test of the operand condition, the test is made at the Adder 126 according to the instruction with the Condition Code being set in accordance with the result of the test. For a LOAD POSITIVE or LOAD NEGATIVE, the T/C gates 231 of Adder 216 are conditioned to enter the operand, complemented as required for the instruction, while LOAD COMPLEMENT always complements the operand. The numeric operations, ADD, SUBTRACT, COMPARE, and the CONNECTIVES, all require two operands and have a GPR 202 as a sink operand storage. The source operand may be from either a GPR 202 source or from an FLB 204–210. For SUBTRACTS and COMPARES, the operand which is to be subtracted is directed to the left input of Adder 216 where it can be complemented as required. The CONNECTIVES, i.e., AND, OR, and EXCLUSIVE OR, are performed within the Adder 216 in a separation data path and ORed into the Adder output. STORE operations route a data operand from the selected GPR 202 to Store Bus OR's 221 for transmittal to an SDB 244.

The multicycle Op's are either a fixed number of cycles, e.g. single word shifts or are data dependent as MULT, DIV, CONVERT TO BINARY, SHIFT DOUBLE WORD, etc. The RUM and RUA Decrement signals and the FXB Not Busy signals are sent to the I Box during the execution of these operations at times dependent upon the operation and the FXOS 201 Buffer Register is released to the I Box as soon as all data has been extracted from it, generally on the second execution cycle.

*Variable field length operations*

The VFL Execution Unit generally operates with alphanumeric operands having no fixed length. Since such operands cannot normally be encompassed in a double word length, the operation is generally with one operand from storage and a second operand from either storage or a GPR 202. The VFL Logic Unit 212 operates for each cycle on a maximum of eight bits from each operand and these 8 bit bytes are supplied over the Source and Sink Busses 232 and 233 from the FA–FB and FC–FD Buffers. Since the length of storage in a buffer is 8 bytes, it will be necessary for the I Box 134 to keep these buffers filled until the whole of the VFL operands is utilized. The I Box 134 will issue an Op for each word to be used as either a source or a sink, will refill each buffer as the data word therein is utilized, and will indicate when the VFL operation is to terminate.

*Main storage control element*

The Main Storage Control Element (MSCE) 136, FIG. 7, is the communication control unit between the E and I Boxes 133 and 134 on one hand, and on the other hand to the Main Data Storage units 104, and, through the PSCE 137, to Extended Storage Units 105 and the I/O units indicated in FIG. 1.

The MSCE 136 is logically divided into the following functional areas as shown in FIG. 7:

(1) Storage Address Bus (SAB) 240, Store Address Registers (SAR) 241 and Sink Bus 243.
(2) Storage Bus In (SBI) 242, Storage Bus Out (SBO) 155 and three Storage Data Buffers (SDB) 244.
(3) The Request Stack (RS) 245, and
(4) The Accept Stack (AC) 246.

The Storage Protect Feature 138, shown in FIG. 7, is as previously noted, described in detail in applicants' pending application No. 334,714, and will not be further described herein. It functions to store a protection code for each block of storage addresses in MS 104, and for every reference to an address in MS 104 it compares the code for the block including that address with the code under which the program is operating to detect and signal any unauthorized storage operations.

The Storage Address Bus 240 receives from the I Box 134, the Maintenance Console 102 and PSCE 137, the address at which a storage operation is to be performed, as well as the instructions for performing that operation. The Storage Address Bus 240 is ingated to the Storage Address Registers 241, the Request Stack 245, the Accept Stack 246, and to the PSCE 137, for those storage addresses which are not contained within the MS 104. The Sink Bus is fed from the Accept Stack, the Maintenance Console 102 and PSCE 137, and carries, one cycle in advance of the presentment of data, the sink address of the unit to receive data requested from storage. The Sink Bus 243 is sensed by each unit which can expect to receive data from storage, i.e. the I Box 134, the FXPU 143, the FLPU 142, the Maintenance Console 102 and PSCE 137.

The SBI 242 is the bus carrying all data for insertion in MS 104 or EMS 105, and its only supply source from CPU 100 is through the SDB's 244 although it can also be ingated from the Maintenance Console 102 or the PSCE 137. Similarly the SBO 155 can receive data from the MS 104, PSCE 137, SPF 138 or Maintenance Console 102, and is outgated to the units which sense the Sink Bus 243, i.e. the I Box 134, the FXPU 143, FLPU 142, PSCE 137 and Console 102. The SDB's 244, as previously noted, are filled over a Bus 197 with data under control of store instructions issued by I Box 134 to itself or the E Box 133.

The Request Stack 245 is a group of four buffer registers to hold storage instructions which cannot be immediately put into operation as they are received, due generally to a "busy" condition of the module of Main Store 104 containing the desired operand. It will normally issue a stored request when the requested storage module becomes available and the stored requests will issue in a random order since there is little likelihood that the storage modules of MS 104 will become available in the same sequence as instructions are stored in Request Stack 245. If, however, there are two requests in Request Stack 245 which can be issued, or if there are two requests addressed to the same module, these will be issued in a First In-First Out status to insure issuance of every request and to preserve logical correctness. The Request Stack 245 has priority over the CPU in issuing instructions to MS 104 and when one of its buffered instructions can be issued, that instruction will be transferred into the Accept Stack 246 in preference to one from CPU 100 which will be blocked from access to the Accept Stack side of SAB 240.

The Accept Stack 246 is the main data control area of the MSCE 136. It is essentially a large pushdown stack of buffer registers in which stored data is moved downwardly one step for each machine cycle, so that it becomes available at various output control stations on a strict First In-First Out basis. The Accept Stack 246 has first a group of five Address buffers 248, each sufficiently large to store the address of any double word in MS 104. There are also a group of eight sink address buffers 249 to retain the return address of a word being fetched from storage, and also a column of 11 module designating buffers 250 to hold the designation of the module of MS 194 in which the fetch or store instruction was being performed.

It should be noted that buffers 248, 249, and 250 are simultaneously loaded with the data on SAB 240 and as all data progresses downwardly one step per machine cycle, the word address in buffers 248 will remain available for five cycles, the sink address in buffers 249 will be retained for 8 cycles and the module address in buffers 250 will be held for eleven cycles. The reasons for retaining such addresses for the given times is related to the ratio between the machine cycle under which the CPU 100 operates and the much slower cycling speed of the MS 104 modules. After an address has been issued to MS 104 and a module thereof has started to cycle, it requires nine machine cycles before the data for a fetch can be gated on to the SBO. However, only three cycles are required before the data for a store can be gated from the proper SDB 244 into the data register of a module. The sink address in buffers 249 is therefore retained in buffers 249 until the eighth cycle when it is gated from the lowest buffer 249 to the Sink Bus 243 to alert all sink units that data for the specified sink unit will be put on SBO 155 on the next cycle. For a store cycle, the stored data contained in the SDR 244 for the SAR 241 which started the store cycle, is outgated to SBI 242 three cycles after the store request is set on the SAB 240, as will be later described in more detail. The sink buffers 249 also store and shift the control data which accompanied the instruction. Such control data can include error signals, Maintenance Console 102 instructions, etc.

The eleven module designating buffers are used to control on the ninth cycle, the Data Out Gating controls to put the fetched data from the proper module onto the SBO 155. The additional buffer locations are required due to the construction of the modules of MS 104. As is conventional, each module is started cycling by supplying to it one of its addresses. After a fixed interval, herein taken as about eight machine (CPU) cycles, the data from the address location is present in a Storage Data Register in the module and can be gated out as is described above on the ninth cycle. For a store operation, some or all of the data at the addressed location is prevented from entering the Storage Data Register and its place is taken by data ingated from SBI 242. During the remainder of the module cycle, the information in the Storage Data Register is copied into the addressed location and after about the 13th machine cycle, the module can be readdressed for another operation. The eleven buffers of module designation stack 250 are continuously monitored to indicate the busy modules. Every address put on SAB 240 is decoded to determine the designation of the module having that storage address and that designation is compared with all of the module designations in stack 250 to determine if the requested module is busy. The storage address is transmitted to all storage modules and the entire information is gated into Accept Stack 246 and Request Stack 245. If, however, the required module is busy servicing a previous storage request, the request is rejected and tagged invalid in Accept Stack 246 where it will be ignored and will be tagged Valid and held in the Request Stack 245. It should be noted that every request is ingated to one of the Request Stack 245 buffers but is only tagged valid if the requested module cannot accept the request. Unless the valid tag is on, a buffer of the Request Stack 245 is considered empty.

One exception to the rejection of requests for data in a busy module is made when a fetch is to be made from a storage location which is already being fetched from or stored into. If the fetch address is contained within the five buffers of Address Stack 248, it is immediately accepted into Accept Stack 246 despite the busy state of the module. As above noted, the Storage Data Register of the module retains the fetched or stored data so that a second outgating of the data can be performed without the necessity of going through another storage cycle with consequent delay in supplying the data to the requesting unit. The Address Stack 248 is limited to five positions as it is believed that the time saved when the later fetch is more than five instructions after the earlier request does not justify the additional hardware and complexity required to eliminate the storage cycle.

Such detection of a request to a storage location presently being accessed is controlled by a Compare Unit 252 which compares on each machine cycle every address within the five buffers of Address Stack 248 and all addresses in the Request Stack 245 with the I Box 134 requested address on SAB 240 to detect any such request which can be accepted even though the addressed module is busy.

As noted above, Request Stack 245 has four buffer registers. In order to save time, each request applied to SAB 240, is stored in a selected one of these four buffer registers. However, the buffer register is tagged valid only when it is determined that the required storage module is busy. If the required module is not busy, the request in the buffer is not tagged valid and is ignored. When an indication is received that a storage module for which there is an outstanding request in Request Stack 245 is about to go not busy, Stack 245 has priority over any new requests from the I Box 134. The Request Stack 235 will therefore put its address on SAB 240 and inhibit the application of an address to this bus by the I Box 134.

Since execution of a fetch request may be started as soon as it is entered into the Accept Stack 246, whereas a store request must wait until all of the required data is available, a situation could arise where a fetch request is received for data from a particular address while an unexecuted store request for storing in that address is in one of the SAR's 241. In order to prevent the fetching of improper data, the fetch request must be inhibited until the store operation has been completed. This objective is achieved by compare unit 254 at the SAR's which compares every address received on bus 240 with each address in the SAR's. A successful comparison in compare unit 254 means that the request cannot be executed and that it must therefore be stored in Request Stack 245. The entry in Request Stack 245 is chained to the corresponding entry in SAR 241, so no attempt to execute the fetch request will be made until the store has been completed.

Various other multiple access conditions to a single memory address may also exist in the system. When multiple fetch requests are made to the same memory address, the fact that there is an unexecuted request to that address in Request Stack 245 is noted by compare circuit 253, and the two requests are chained together. These requests are executed on a first in-first out basis with the second request, in almost all cases, being applied to SAB 240 on the cycle immediately after the cycle that the first request is supplied to this bus. This is the only exception to the rule that a Request Stack entry is not applied to SAB 240 when the required module is busy. More than two requests to the same storage address would be handled in the same manner. If the request is to an address which is already in one of the five address positions of Accept Stack 246, this fact is noted by Compare Unit 252, and the request is validly entered into the Accept Stack even though the indicated module is busy. In this manner multiple access may be had to the same storage address with only a single storage select operation. Again, more than two requests to the same address would be handled in the same manner. Finally, the presence of two successive store requests to the same address is detected by compare circuit 254 and the requests are chained together in SAR 241. Successive store requests to the same address are likewise handled on a first in-first out basis in order to preserve logical continuity.

It is to be noted that each module of MS 104 can retain the readout or stored data in its Storage Data Register until the module is recycled. As above noted, this feature permits a fetch from an address to be performed following a fetch from or a store into that address of the module. Also, the Accept Stack 246 contains no transient information and will store data indefinitely unless during a machine cycle a clock pulse is gated thereto step data down through the Accept Stack 246 and out the bottom. Consequently, no data will be lost if the MSCE is temporarily halted. This feature is quite advantageous for diagnostic error testing where the serviceman can cause the Main Storage 104 and MSCE 136 to progress by single machine cycles to enable each stage of the storage operation to be checked for error.

*MSCE controls*

The controls in MSCE 136 have two main functions. First, a decision must be made as to which addressing source is to be gated on to the SAB 240, and secondly, assuming that some address is put on the SAB 240, another decision must be made as to which of the instruction buffer units is to be selected.

The first decision may be considered as a priority allocation for it enables a selection between simultaneously calling sources. In every machine cycle, the priority conditions are examined to determine which source is to gate on to SAB 240 in the next cycle, and at the same time, the present contents of a previously selected source are being transmitted over the SAB 240. There is thus an overlapping of service and effectively the SAB 240 can service one storage access call during each machine cycle.

The general order of priority is:

(1) EMS 105 data returns to CPU 100 or MC 102.
(2) PSCE 137 request for data from MS 104.
(3) Maintenance Console 102 returns data to the I Box 134 or E Box 133 or applies requests to MSCE 136 for MS 104 or EMS 105.
(4) Request Stack 245 issue to MS 104 for a multi-access request.
(5) SAR 241 request for MS 104 or EMS 105 service.
(6) Request Stack 245 to MS 104 or EMS 105 for service.
(7) CPU 100 request to MS 104 or EMS 105 for a fetch.

Priority 1 is generated as a result of a previously issued request from CPU 100, or MC 102, for a fetch from EMS 105. When PSCE is about to select an EMS 105 storage module, a signal is sent to MSCE 136 to create a time slot on the SBO 155. Such a time slot on SBO 155 is created by not gating anything to SAB 240 during a cycle so that the Accept Stack has a vacant position. Nine cycles later there will be no data gated out of MS 104 when this vacant position reaches the Data Out Gating position in Accept Stack 246 and PSCE is free to put its data on SBO 155, and also, of course, to put the sink unit address on the Sink Bus 243 during the preceding machine cycle. Since the PSCE 137 created the time slot, it knows when the Sink Bus 243 and SBO 155 will be available and it gates its data out accordingly.

Priority 2 arises as a result of the notification by PSCE 137 to MSCE 136 of the need of some data device connected to the PSCE 137 for a storage reference to MS 104. The MSCE 136 continuously decodes the module designations in the upper eight positions of section 250 of Accept Stack 246 and signals to PSCE 137 the designations of the modules which are identified in those positions. Since it requires four machine cycles for the decoded designation to be transmitted from the MSCE 136 to PSCE 137, and for the PSCE 137 to respond by making a request, MSCE 136 notifies PSCE 137 of the availability of a module by signalling a not busy condition of a module four machine cycles prior to the end of the storage cycle. The PSCE 137 has priority over the other users of SAB 240, and it can then issue its request, which it knows will be addressed to a module, which will be available when the PSCE request is received by MSCE 136, and that the request will be received by the Accept Stack 246. It is the responsibility of the PSCE 137 to be ready to accept the data return at the time it is set onto SBO 155.

Priority 3 puts an address from MC 102 on SAB 240 as soon as the requested module is not busy, i.e., its designation does not appear in any buffer of the section 250 of Accept Stack 246 and its busy signal is therefore not energized.

Priority 4 gives next priority to a second instruction of a multiaccess pair of instructions. When the first of such instructions is stored in Accept Stack 246, the MS signal on SAB 240, along with an identification of a buffer in Request Stack 245, causes the contents of the designated buffer to be the next instruction gated out on SAB 240 into Accept Stack 246, so that the instructions are executed in logical order, but without unnecessary intervening storage cycles.

Priority 5 enables a store to MS 104 to be executed when ready. As soon as one of the three SDB's 244 is set with data, the corresponding SAR 241 requests priority within the group of SAR's 241, where priority is on a first in-first out sequence among the ready SAR's. Thus, if the SAR has priority within the SAR's 241, and no higher priority has claimed SAB 240, the instruction on SAR 241 will be put on the SAB 240 for storage in Accept Stack 246, or Request Stack 245, in accordance with the Busy-Not Busy condition of the requested Storage Module.

Priority position 6 is given to the Request Stack 245. Each buffer within Stack 245 with a valid instruction compares the designation of the storage module needed for execution of its instruction with the Busy Not-Busy condition of the module as decoded from the designations of the modules in Section 250 of Accept Stack 246. If more than one Request Stack Buffer compares its module designation with that of a non-busy module, a subpriority of First In-First Out controls which buffer shall be gated on to SAB 240. When a buffer of the Request Stack 245 designates for a fetch request, a storage address which is also contained within an SAR 241, the buffered fetch request is for the fetching of data which has not yet been stored and the request cannot be allowed to complete for priority. It will, however, be designated as a multiaccess buffer and given fourth priority when the instruction in SAR 241 is issued after the required data has been stored in SDB 244.

The last priority position is given to CPU 100 requests for storage service which may comprise a direct request for a fetch, the instruction being stored in either Request Stack 245 or Accept Stack 246, depending upon the Busy-Not Busy condition of the required storage module, or which may comprise storage of the instruction in an SAR 241 for a store cycle. As a safety feature, the CPU 100 cannot issue storage instructions when the Request Stack 245 is full. This prevents possible loss of the instruction for lack of a buffer to store it in.

To optimize the overlap operation of storage units, for optimum priority and optimum utilization of the SAB 240, knowledge of the future condition of availability of a storage unit is as valuable as knowledge of its present availability. The module designations in Section 250 of Address Stack 246 are therefore decoded to generate three module busy signals for each module. A first busy signal is the busy to PSCE signal which does not-busy four machine cycles before the actual end of a storage cycle of a module. The use of this signal enables the PSCE, as above noted, to be preset to claim a module for operation as soon as its cycle times out. A second busy signal is Busy to Priority which drops two machine cycles prior to the end of the modules cycle. This signal when down allows the Maintenance Console 102 or Request Stack 245 to be preset to use the SAB 240 during select time.

The third busy signal for a module is Busy to Select which drops only one machine cycle before the end of the storage module cycle. When this line drops, a select signal can be generated to start the module on its next operating cycle when the SAR 241 or CPU 100 requests the module provided that the use of the SAB 240 is not claimed for a higher priority function. If the SAB 240 into the Accept Stack is so claimed, then the SAR 241 or CPU 100 request is inhibited. Obviously, all three of the busy signals for a module are down when the module is not cycling, and all signals will go busy together when the module starts to operate.

The second control condition is the decision of whether or not a storage module is to be selected for an address on the SAB 240. After it is decided in the priority controls which source, if any, shall gate an instruction on to SAB 240, the MSCE 136 must decide what to do with the information to appear on SAB 240. When data is set on SAB 240, it is stored in the topmost position of Accept Stack 246, an SAB Valid Signal is set for one machine cycle, and the storage address on SAB 240 is sent to all storage modules. The Accept Stack 246 decodes this address to determine the designation of the module containing the address and checks the busy-not busy status of the Busy to Select signal for that module. If the Busy to Select signal is down, the selected module recognizes its address on SAB 240 and retains the requested address and starts cycling. At the same time, the topmost position of Accept Stack 246 is tagged valid.

As the capacity of MS 104 is limited, it may happen that the address set on SAB 240 represents a storage location in EMS 105, and if so, when this address is present on SAB 240, it is routed into a buffer register in PSCE 137 for decoding and selection of a location in EMS 105, as will be later described. In the event that the buffer of PSCE 137 is not available, the storage request will be handled as a request for a busy MS 104 module.

In the event that the needed PSCE 137 or MS 104 module are busy, the instruction information which has already been gated into Request Stack 245 is tagged valid to prevent further stores into that buffer of Stack 245, and as above noted, will be issued to SAB 240 when the required storage module is about to go not busy. The multiple access considerations set out previously for double instruction references to a single address may prevent a selection of a non-busy storage module whose address comes up on SAB 240, or may cause a second instruction to be set into Accept Stack 246 without another selection signal to a busy module. When the multiaccess situation is detected between the SAB 240 address as set in from CPU 100, and a storage address in a store instruction in an SAR 241, it is too late to prevent the issuance of a select pulse to the storage module required, and such a pulse will issue if the instruction would otherwise be executed. However, in this case, the Sink Address Section 249 of Accept Stack 246 is prevented from being set and although the storage module goes through its storage cycle, there is no sink signal sent out on Sink Bus 243, so no unit is alerted to gate in the information on SBO 155, and it is lost for that cycle.

*Peripheral storage control element*

The Peripheral Storage Control Element (PSCE) 137 controls the flow of data between the MSCE 136, the Extended Main Storage 105, and the Input/Output (I/O) channels 106 and 122, see FIG. 1. As indicated in FIG. 8, the PSCE 137 is comprised of three major sections, the Bus Control 260, the Common Channel Control (CCC) 261, and the Storage Channel (CS) 262. The Bus Control (BC) 260 is the central unit of the PSCE 137 and communicates directly with MSCE 137, with EMS 105, with CCC 261, and with SC 262. All accesses to EMS 105 by CPU 100 through MSCE 136, as well as all accesses to MS 104 by either the SC or an I/O unit pass through Bus Control 260. In order to maximize utilization of EMS 105, the Bus Control 260 maintains a request stack that may contain up to eight requests. As any module of EMS 105 becomes available, the Bus Control 260 scans this stack and initiates a storage cycle if there is a request for the not-busy module. Since the BC 260 will start cycling of any needed module as soon as it is not busy, storage requests may be handled out of sequence. Requests to MSCE are similarly handled for as above noted, any module of MS 104 drops its Busy to PSCE signal four machine cycles before the end of its storage cycle, thereby giving the Bus Control 260 of PSCE 137 time to call for use of the module as soon as it is not cycling. Since the PSCE has first priority on calls to MSCE 136, BC 260 can be sure that when it does issue a storage instruction to MSCE 136, the request will be accepted and BC 260 can proceed to another item.

The Common Channel Control (CCC) 261 provides for the attachment of up to five Selector Channels 122 and one Multiplier Channel 106. The channels all attach directly to CCC 261 which in turn communicates with the BC 260. All channel storage requests are monitored by CCC 261 to maintain priority among them, and the CCC 261 also controls the sequencing of the issued I/O instructions, machine interruptions and unusual conditions. When high speed I/O devices fetch from MS 104, the CCC 261 takes on the responsibility of prefetching data into the buffers of Bus Control 260 to insure that data is available when needed.

The Storage Channel (SC) 262 controls data transfers from one storage to the other. The SC 262 appears to BC 260 as a control unit and its I/O device with both attached to a selector channel as 122. It responds to instructions of the selector channel type and uses the command and interrupt formats of such a channel. All communications between SC 262 and the storage modules are handled by the BC 260 and can be overlapped with other system activity.

Bus control

The basic internal structure of Bus Control 260 is shown in FIG. 9, and consists of five major elements. These are the Input Busses, the Queue, the Control Stack, the Output Busses and the Priority Control. There are five Input Busses, of which two, EMS In Bus 264 and EMS In Bus 265, handle fetch returns from EMS 105 with Bus 264 being controllable to feed the PSCE Output bus SBO 155 when the EMS fetch is for CPU 100. The SAR 240 brings in requests passing through MSCE 136 and SBO 155 supplies data returns from MSCE 136. The Input Request Bus 266 enters all storage requests from the CCC 261, from SC 262, and from Maintenance Console 102.

Queue 268 is a stack of eight 115 bit buffer registers having a 72 bit data field (64 data bits, 8 parity bits), a 24 bit address field, a nine bit mark field, a six bit key field and a four bit error field. Each request accepted by BC 260 will be assigned to one of the eight buffer registers until the request has been supplied. The function of the fields are:

Data: Hold data to be stored until the selected storage module has accepted store data during a store cycle, or to receive fetch data when available from a storage module during a fetch cycle.

Address: The storage address of the request is retained here until it can be received by storage.

Mark: An eight bit byte with a parity bit to specify which bytes of the addressed double word (8 bytes) are to be changed during a store cycle. When a bit signal is present the corresponding byte is to receive a data byte from the Data field.

Key: This field is for the Storage Protect Key which must compare with that of the protection key for the addressed storage location.

Error: These four bits are separately settable to indicate which type of error has been detected in execution of the request. The indicated errors are Data Check (bad parity) Address Check (bad parity), Storage Protection Violation (wrong key used) and Invalid Address (not contained in the storage modules).

On a Store request, the assigned queue register holds its data until the memory select signal is generated and the data has been gated into the data storage register of the storage module. On Fetch requests, the buffer register of Queue 268 holds the data therein and remains busy until the storage fetch is complete and the data has been gated out to the requesting unit.

Queue Control Stack 269 is a set of eight 30 bit registers having the following data fields:

Primary Decode: 12 bits to indicate the storage being requested.

Source Address: Eight bits (seven bits plus a parity bit) to identify the unit requesting the storage operation.

Full/Empty: A bit which is set when a word has been returned due to a fetch request.

Hold: A bit to prevent a request from being erased after it has been executed. This bit is used for maintenance to prevent cancellation of a request and may also be used to eliminate a defective register for if this bit is set the associated control register cannot be stored into.

Active: A bit set to indicate that this Control Stack Register is presently occupied by a pending request.

Operation: Three bits individually settable to indicate one of three CPU 100 operations, Set Tag, Insert Tag, and Test and Set.

Queue Link: Three bits plus a parity bit settable in combination to identify the Queue Register which has been assigned to this request.

The Control Stack 269 contains all information necessary to establish priority and initiate storage cycles for requests in the Queue 268. In order to determine a First In-First Out relationship, the Queue Sequencing is accomplished by entering new requests into the bottom of the stack and moving all previous requests toward the top.

There are four output busses which are used to transmit data and control information to storages and channels. The EMS Request Buss 270 provides the data and control path from the registers of Queue 268 to EMS 105. The SBO 155 is used to send requested EMS data to MSCE 136 or the CPU 100 and SAB 240 makes storage requests for MS 104 data for EMS 105. The fourth bus is the CCC Bus 272 which returns data from EMS 105 to the Storage Channel 262 or the I/O Channels by way of CCC 261.

The Control Stack 269 is monitored by Priority Control 273 in order to provide for sequencing and routing of requests in the BC260. The Control Stack 269 is scanned by Priority Control 273 for the following list of functions:

(1) To assign a queue register of Queue 268 to a store or fetch request from CPU 100, SC 262, or CCC 261. The assignment is based on the next available register in Queue 268, and is conditioned by channel activity and priority among requesting elements.

(2) To generate storage requests. This decision is based on the busy status of storage modules and on unit priority when the same storage is being requested by different units.

(3) To return storage fetch data to the Queue 268. To perform this function the Queue link data is sent to the storage module at the start of a fetch cycle and is returned shortly before the fetch data. The Input Priority section 274 of the Priority Control controls the gates for moving data coming in on EMS Bus 264 into or around the Queue 268.

(4) To return fetch data from Queue 268 to the requesting element. The decision depends upon the identity of the requesting unit. For a CPU 100 request fetch data is transmitted to SBO 155 as soon as possible after the fetch data is put in the Queue 268, but this is not necessarily in the same order as the requests were received. For the Storage Channel 262 data remains in the Queue 268 and may be readdressed if the transfer were on a double word boundary. Control words and single data words are returned to the channel when requested. For I/O requests through CCC 261, the data is transmitted when requested by the I/O device.

Every action of Bus Control 260 requires access to either the Input Busses or the Output Busses or both. However, most actions are independent of each other and may be taken concurrently. Some of the independent actions of Bus Control 260 are:

For Input Busses (1) Fetch returns on SBO 155 from MSCE 104 to Queue 268.
(2) Fetch returns from EMS 105 to Queue 268.
(3) Fetch requests from CPU 100 on SAB 240.

(4) Either an I/O Store/Fetch request or a Storage Channel 262 Store/Fetch Request.

For Output Busses (1) EMS 105 fetch return to CPU 100 on SBO 155.
(2) A request to EMS 105 on EMS Request Bus 270.
(3) A request to MSCE 136 on SAB 240.
(4) Either a fetch return to CCC 261 or a fetch return to SC 262 on Bus 272.

*Common channel control*

The Common Channel Control 261 performs the pre-priority function among the Channels 106 and 122 for storage requests and interrupt actions. Effectively, the CCC will pass to the Queue 268 any request received from a channel 106 or 122. It is only when two channels make simultaneous requests that one will be granted a built-in priority and be the first to have its request transmitted to Queue 268. In view of the difference in the operating speeds of a device connected to a channel and the internal operation of the PSCE, the momentary delay in transmitting a request is of no importance to the channel operation.

*Storage channel*

The Storage Channel 262 provides a fast data transfer from one storage to another and as above noted, this transfer can overlap other system activity. The transfer can be between all addressable highspeed core storages connectable to MSCE 136 and to PSCE 137, but cannot include paths to I/O devices connected to channels through CCC 261. A minor limitation is that the data items transferred cannot be bounded in storage addresses by any less than full word boundaries, i.e. no address of a word to be transferred, nor the address to which it is to be transferred can have other than two rightmost zeros.

The SC 262 communicates with the MS 104 and EMS 105 through the Bus Control 260, and consequently takes advantage of the Bus Control Queue 268. Since the function of SC 262 is to transfer words between storage locations, each action of SC 262 requires a Fetch/Store combination of requests. The SC 262 will send fetch requests to the Bus Control 260 as long as space is available in Queue 268. At the same time, the SC 262 will send the corresponding store address to the data portion of the Queue register so that it will in effect accompany the fetch request. When Queue 268 makes the fetch request from the storage location specified in the address portion of the register, the store address is transferred from the data portion into the address portion of the register. Such a change converts the initial fetch request to a store request waiting for data and consequently when the fetch data returns into the data portion of the register, a store request is initiated to put the data into the other storage location.

*Detailed operation of execution unit*

As has been previously indicated with respect to FIGS. 5 and 6, the Execution Unit 133 comprises two substantially independent units, the Floating Point Unit 142 and the Fixed Point/VFL Unit 143. The operating code and other information is ingated from the Op Stage Latches 167 and from the Code and Validity Latches 171 of I Box 134, FIG. 4, into the appropriate FLOS 184 or FXOS 201 over Busses 183 and 222. No I Box selection is needed for determination of the register of the stack which is to receive the instruction since the FXOS 201 and FLOS 184 are First In-First out stacks and will automatically assign a received instruction to the next available buffer. The I Box does, however, maintain a FLOS Counter 186 and a FXOS Counter 203 to keep track of the number of unexecuted instructions in each of the Operation Stacks 184 and 201. The I Box 134 will also order a fetch by MSCE 136 of the operands needed for the instruction it is issuing and will call for the return of these operands to specific ones of the Floating Point Buffers 185 or the Fixed Point Buffers 204-210. The selection of the FLB or FXB for assignment to an operand return is on the basis of an availability list kept in the I Box 134, see also FIG. 58. The list is updated by the I Box and an Execution Unit as they are assigned to an operand and as the operand stored therein is utilized. Fetches will be received on SBO 155 and gated into the sink register identified by the signals on the address part of SBO 155 in the preceding machine cycle. Stores will be made by assignment of a Storage Address Register SAR 241-Storage Data Buffer (SDB) 244 pair of MSCE 136 to an instruction. The address of the store and the identification of the register which contains or will contain the data for storage will be inserted in the SAR 241. As soon as the data is available it will be gated into the assigned SDB 244.

*Fixed point/VFL execution unit*

The FXPU, considered more specifically, includes the FXOS 201 as more particularly detailed in FIG. 10. This figure shows only one of the six registers in FXOS 201 but that one is representative of all of the registers. The register is a 24 bit set of latches or bi-stable state circuits, each latch being of the set dominant type wherein the latch will go to a set condition upon application of both a set and a reset signal thereto and will remain set after the fall of both signals provided that the reset signal is not held up after the fall of the set signal. The 24 bits of data stored in an FXOS 201 buffer are a CO bit settable to indicate that the instruction is only conditionally issued, the F/E bit settable to indicate a register having a valid instruction stored therein, a CC bit settable to enable the instruction to set the condition code bits in the I box 134, a group of eight Op Code bits to specify the operation to be performed and 13 control bits to specify the storage locations of operands, etc.

There is a group of six Triggers T1–T6 connected into an Ingate Ring 280 and settable sequentially into an active state. The presence of a signal on an ADVANCE Line 281 will shift the active state of any trigger to the next trigger of the ring in the conventional manner. Each Trigger T1 to T6 corresponds to one of the Buffer Registers of FXOS 201 and when active will designate its associated Buffer Register for reception of an instruction from the Op Stage 167 of I Box 134. When a Trigger of T1 to T6 is set, its signal is applied to an AND Circuit 282 which also receives a VALID signal from I Box 134 on a line 284 common to all FXOS 201 Buffers and a timing signal. The AND 282 responds to the simultaneous presence of the three signals by emitting a SET signal on a line 285 and a RESET signal on a Line 286. Line 286 is connected to the reset input of each Latch of its Buffer Register of FXOS 201 and will set all of the Latches to represent a "0" digit. The set signal on Line 285 is applied to a group of AND Circuits represented by AND 288. AND's 288 also receive the information signals from Op stage 167 of I Box 134 over Bus 222 and will pass the "1" signals on Bus 222 to the set inputs 289 of the corresponding ones of the latches of the associated Buffer Register 201 to set the latch to represent a "1" digit. Since both the set and reset inputs are derived from AND 282, they will drop simultaneously and the latch, if set, will remain set. The ADVANCE signal on Line 281 will then be raised to shift the active state of ring 280 to the next sequential trigger to select the next sequential Buffer Register of FXOS 201 to receive the next instruction. It is to be remembered that I Box 134 maintains in FXOS Counter 203 (FIG. 4A) a count of the number of instructions in FXOS 201 and is prevented from sending a new instruction if the FXOS 201 is full. There is therefore no danger in having Ring 280 select a Buffer Register of FXOS 201 before the instruction stored therein is used, since I Box 134 is prevented from issuing an instruction at this time.

It will also be remembered that the I Box 134 is capable of issuing instructions to FXOS 201 before the validity of the instruction is determined and that it will tag such instructions conditional by setting the CO bit in the Buffer Register of FXOS 201 storing such instruction. When it is determined in I Box 134 that the previously tagged CO instructions should be performed, it puts a signal on an ACTIVATE Line 290, which thereupon resets all set CO bit latches in all Registers of FXOS, thus freeing them for execution. If, however, the I Box 134 later determines that the CO tagged instructions were erroneously issued, it issues a signal on a CANCEL line 292 which is connected to an AND circuit 293 for each Buffer. The other active input to each AND 293 is connected to the CO bit latch of its Buffer Register so that if the CO bit of a Buffer Register is set, the CANCEL signal on line 292 will pass through AND 293 to the reset input of the F/E bit latch of the same register. Thus, the CANCEL signal will turn off the F/E bit of each Buffer Register containing a set CO bit. The presence of a set CO bit and a reset F/E bit in a Buffer will result in a NO-OP operation which will pass over the instruction without execution but will decrement the count in FXOS Count 203 so that the I Box is free to issue another instruction for that Buffer Register.

The CC (set Condition Code) bit position also requires special handling for not more than one CC bit can be set in all of the instructions to be executed, nor can more than one CC bit be set in all of the conditionally issued instruction. A Reset CC Device 294 is therefore provided for each Buffer Register to reset the CC bit of its register whenever such reset is needed. The Device 294 is responsive to the settings of the CO and F/E bit latches of its Register and to the Set CC and CO signals on Bus 222, and to the CANCEL and ACTIVATE signals on Lines 292 and 290. For any Register which stores a valid instruction and which does not have a CO bit latch set, the Reset CC 294 will reset the set CC bit latch each time the CC bit line signal is brought up on Bus 222. The CC signal will be passed through its AND 288 for only the selected Buffer Register 201, and thus only one CC bit will be set, all others having their CC bits reset. If, however, instructions are being conditionally issued, the set CC bits of the valid unconditionally issued instructions should not be reset since it is possible that the conditionally issued instructions may not be valid. The Reset CC 294 is therefore responsive to the presence of a set F/E bit and a set CO bit in its own register, and to the presence of both a CO bit and a CC bit on Bus 222 to reset its CC bit only if its instruction had been conditionally issued and a later conditional instruction is now issued having a set CC bit. By putting this condition on the CC bit position, it is possible to have a set CC bit in two Registers of FXOS 201, one storing a valid unconditional instruction and one storing a valid conditional instruction.

Since, however, the conditional instructions may be set to an unconditional status by I Box 134, Reset CC 294 is also controlled by the ACTIVATE Line 290 which resets all set CO bit Latches to an inactive condition when the I Box 134 determines that its conditionally issued instructions are to be executed. The Reset CC 294 of each Register of FXOS 291, where a CO bit has not been set, will then reset its CC bit whenever an ACTIVATE signal appears on Line 290 if there is a CC bit set in one of the previously conditionally issued instructions, i.e. the CC bit previously in a conditional instruction is now valid unconditionally and any previously set CC bits should be reset. Obviously, if there is no set CC bit among the conditional instructions, there should be no change in the set CC bits, if any, of the unconditionally issued instructions. CANCEL Line 292 is used to reset the F/E bit of any Register of FXOS 201 which contains a set CO bit latch when the I Box 134 determines that the conditionally issued instructions are not to be executed.

Only those Buffer Registers of FXOS 201 which have their F/E bit latch set to the F (Full) state have valid instructions therein and may take part in the setting and resetting of the CC bit latches.

On the outgating side of FXOS 201, an Outgate Ring 296 comprising triggers T7 to T12 determines by the active state of one of its Triggers, the Buffer Register which is to be outgated for execution of its instruction. The Ring 296 will have the output of its set Trigger T7 to T12 applied to one input of an AND Circuit 297 (one for each bit latch of the associated Buffer Register) which will also receive a READ Signal from Op Decoder 224 and a Timing Clock pulse. The outputs of ANDs 297 pass through an OR circuit 298 into Op Decode 224 which as will be more fully set out later, generates the control signals needed to operate the other parts of FXPU 143 in performance of the instruction. Among the other control inputs to Op Decode 224 are the CO, F/E, and CC bit signals of the Buffer Registers of FXOS 201 to prevent execution of conditionally issued instructions, enable only valid (full) instructions to be executed and control setting of the Condition Code (CC) bits by the execution units performing the instruction. Among the output signals of Op Decode are a signal on a line 301 which will reset the F/E bit latch of a Register when the instruction in the Register has been executed, the previously mentioned READ signal to bring in the next instruction for decoding, an ADVANCE signal to step Outgate Ring 296 to the next active state and an FXOS Count signal on a line 302 to decrement the FXOS Count 203 in the I Box 134, FIG. 4B.

It will be remembered that the FXOS Count 203 of I Box 134 is incremented for each instruction, conditional or unconditional, issued to FXOS 201 and that it cannot issue further instructions when FXOS 201 is full. Since the I Box 134 does not keep track of the number of issued conditional instructions, and cannot therefore correct FXOS Count 203 when a number of conditional instructions are cancelled, the correction of FXOS Count 203 is left to the FXPU 143. The Op Decode 224 will therefore process each cancelled conditional operation far enough to detect the set CO bit latch and the reset F/E bit latch and will thereupon issue the FXOS Count decrement signal on Line 302 but will not issue any execution signals, in effect a No-Op instruction, and will immediately proceed to read out the next instruction. In addition, for each cancelled instruction, all storage requests must be nullified by setting the FXB's 204–210 to which the fetches are to be returned to a Not Busy condition, i.e. empty regardless of the setting of the data bit latches thereof and not receptive to data input signals on FLPU Bus 199 or SBO 155. All manipulations of General Purpose Registers 202 which have been preperformed as required for the normal processing of the now cancelled instruction must be undone and the RUA 337 and RUM 335 counters of I Box 134 are decremented to eliminate the effect of the issuance of the cancelled instructions.

Adders of FXPU

There are two ADDERs in FXPU 143, the Carry Propagate Adder (CPA) 216, and the Carry Save Adder (CSA) 214. CPA 216 can receive a 40 bit input operand at its right input (FIG. 6B) and a 40 bit operand at its left input and generate their sum at its output in one machine cycle. The general configuration of the CPA 216 is described in the article, "High Speed Arithmetic in Binary Computers," by O. L. MacSorley, pages 67–91, January 1961, Proceedings of the IRE, but for the present 40 bit Adder, we prefer to utilize a byte (8 bit) basis for first level carry generation which then requires only the five bytes to be tested for second level carry generation. It may also be noted that the left input has a T/C Side 231 for entry of a complemented operand when required. Since the T/C signal enables either the operand to pass through one set of gates or the complement of the operand to pass through another gate, and since both gates cannot be passing an operand simultaneously, there is effectively only one input to the left inputs, and no combining of the true and complement signals is required. In actual practice, the Exclusive OR of the operand bits with the T/C signal is applied to the left inputs. Such Exclusive ORing will in effect generate the ones complement of the input operand and this is changed to the twos complement by the insertion for complements of a bit into the carry input lead of the lowest denominational order byte. The output of CPA 216 is storable in either the Right or Left half of Accumulator 217, but will normally be placed in the Left half since the double width factor is needed only for multiplication operations.

The CSA 214 is used to combine the two multiplicand operands generated by the MC Gates 235 with the previously generated partial product of the multiplication stored in the Left Half of Accumulator 217 and supplied to CSA 214 on a bus 303. For each bit position there are thus three inputs but only two outputs, see FIG. 1 of MacSorley above. These two outputs will for some instructions be the two inputs to CPA 216.

Shifter

The Shifter 218 of FXPU 143 is more fully disclosed in FIG. 11 and comprises four shift stages, an input Shift Control Decoder and a Spill Detector. The Shifter 218 is connected by 64 bit Input Lines 305 to the Accumulator 217 of the FXPO 143 and can be controlled to shift the bit signals on the Input Lines 305 up to 32 denominational orders in either direction. The Shifter 218 has a first Stage 306 of switching which can be controlled by Control Leads 307 to shift the data on Input Lines 305 either one or two orders to the left or to pass it through without a shift.

A stage of switching can be considered to be logically as in FIG. 12 which illustrates the switching for one denominational order ($\#n$) of the second Stage 309 of switching which has control leads 310. In this FIG. 12, the input leads 311 are the outputs of the N–2 denomination and the n denomination and only one will have a significant signal thereon as determined by the extent of left shift in Stage 306. The active signal on leads 311 will pass through an OR 313 to a line 314 which is an input of each of four AND circuits 315, 317, 318, and 319 for left shifts of 0, 2, 4, or 6 denominational orders respectively. There is one control lead 310 for each AND circuit to enable it to pass a data signal on line 314. The output of AND 315 is connected to the OR 313 of the same denominational order of the next shifter stage, the output of AND 317 is connected to the OR 313 of the second higher denominational order, the output of AND 318 is connected to OR 313 of the fourth higher denominational order, and the output of AND 319 is an input or OR 313 of the sixth higher denomination. Thus, by energization of one of the control lines 310, the data input to a shifter stage can be shifted a varying number of denominational orders.

Referring back to FIG. 11, the third Stage 321 of Shifter 218 can be controlled by its control lines 322 to pass data with either an eight or twelve denominational order left shift or with no shift. The fourth Stage 323 can be controlled by its control lines 325 for either a left shift of 24 denominations, or a right shift of 16 denominations, or for no shift. In FIG. 11, it may be noted that the rightmost 16 bit outputs of the fourth Stage 323 are not connected to any using circuits, and that the Output Register 326 which latches the output of Stage 323 extends 16 denominations toward the left side. This is in effect a built-in shift of 16 orders to the right and must be compensated for in energizing the stages. A Shift Control Decoder 327 is provided to selectively energize the Control lines 307, 310, 322, and 325, and is set by a group of six Shift Extent Lines 329, which are energized combinationally to denote the direction and extent of shift. As indicated in FIG. 11, the Stages 306, 309, 321 and 325 of Shifter 218 are set to shift left 1, left 4, 0, and left 24, which with the built-in right shift of 16 is a resultant left shift of 13 denominations.

It is conventional in the electronic computers to reserve the leftmost bit position of an operand as a sign bit position, the stored bit being a "0" for a positive number and a "1" for a negative number. As the sign of a number does not change when it is denominationally shifted, in effect a multiplication, the left bit position in Stages 306, 309, 321, and 325 does not participate in any shifts and is gated into the leftmost bit position of the Output Register 326, the 16 bit wire connection shift to the left merely balancing out the built-in 16 bit right shift of the shifter so that the sign bit is gated out in the same position as it came in.

To prevent loss of the digits at the left end of an operand, the left end of each of the Stages 306, 309, 321, and 323 are extended to provide denominational outputs for the maximum number of digits which can be shifted to the left of the sign bit position. For Stage 306, this means two output lines and for Stage 309, the left extension must have two input lines and eight output lines. Stage 321 has the eight input lines and 24 output lines with Stage 323 receiving the 24 outputs from Stage 321, and having 48 output lines. If all Stages are controlled for their maximum shift to the left, each of the inputs and outputs of the left extensions will transmit data from the Accumulator 217, but if any shift less than the maximum left shift is called for, some of these outputs will not receive operand digits. This is no problem if only positive valued operands are shifted for any unused output would not supply a signal and would be automatically a "0." For mixed positive and negative operands, this would be unusable for the digits to be filled in for positive amounts are "0's," and for negative amounts are "1's." In each stage of the shifter 218, this filling in of "0's" or "1's" is done by setting a control to force the replication of the sign bit in the leftmost bit position into all unused outputs on the left end of the operand, i.e., in Stage 306, the Left 1 Control Line 307 gates the sign bit into the leftmost line 311, and the "0" shift Control Line 307 enables gates to put the sign bit on both outputs 311 at the left of the Stage 306. In the second Stage 309, the L4, L2, and 0 shift control lines 310 gate the sign bit into the leftmost 2, 4, or 6, output lines respectively. In the third Stage 321, the L8 and 0 Shift Control lines 322 gate the sign bit into the left 8 and left 16 output positions, respectively, and for the fourth Stage 323, the 0 and R16 Shift Control lines 325 gate the sign bit into the leftmost 24 and 40 output lines respectively. By thus gating the sign bit into all unused positions at the left of each Stage, the operands as they are shifted, are filled in with the correct digits. There is no need to fill in the rightmost outputs of the stages when they shift an operand left for they will automatically maintain no output from their AND circuits 315, etc., which will, in effect, enter "0's" in those positions of the next stage. This could introduce an inconsequential error into a negative operand amounting at the most to the value of the rightmost bit position. If it is desired to eliminate even this small operand change, the stage circuits could be connected to shift the sign bit into the unused right end outputs in the same manner as is above described for the left end.

Most shift controls are generated as a result of some Fixed Point operations and should therefore be controlled for a shift which will not lose any significant data from the operand in Accumulator 217. However, if a direct shift instruction, or an erroneous decoding of the number of left zeros in the "0's" Decode Unit 330 (FIG. 6B), to be further described at a later point, or an error in some other shift controlling device will cause a shift of a significant digit off the left end of the digit signals to be set into Output Register 326, such action will be detected by the Spill Detector 220. Detector 220 senses all of the digits which are to be shifted to the left and out of the resultant operand, i.e., a maximum of 32 bits, and determines if they include any significant digits. If a number being shifted is positive, all bits being applied to the Spill Detector 220 should be "0's" and may be applied to a 32 input OR circuit which will give an output, if any input bit is a "1" and thus a spill. If the number being shifted is a negative number, all bits shifted off the left end should be "1's," and the presence of a "0" indicates a spilled digit. This can be detected by a 32 bit AND circuit which will have an output signal only if there is no spill. If desired, the output of the AND could be applied to an Invert circuit to produce an output when there is a spill.

*General purpose registers*

The 16 General Purpose Registers (GPR) 202, FIG. 6A, are the main operand retaining units for the Fixed Point and Instruction Unit areas. Each GPR is a set of 32 data bit latches which can be selectively set by data from three input busses. Bus 236 is the 32 bit Bus from the I Box 134 and can be gated into any GPR. The 64 bit output of Shifter 218 is divided into two Busses 331 for the left half and 333 for the right half, and Bus 331 can be gated into any even number GPR 202 and Bus 333 can be gated into any odd numbered GPR. It is possible to gate both Busses 331 and 333 simultaneously into two GPR's by selecting an even-odd numbered pair of GPR's, the even-numbered GPR (including #0) receiving the data signals on Bus 331 and the odd numbered GPR receiving the data signals on the Bus 333. It may also be noted from FIG. 6A that the right eight bits of each GPR can also receive data over Bus 234 from the VFL Logic Unit 212 or by way of Logic Unit 212 from any byte position of FLB's 204, 205, 206, or 207.

As previously mentioned, every bit position of all GPR's is connected to I Box 134 by an ungated line forming a 512 bit Bus 334 with two sets of individual gates on the I Box end of the Bus 334 so that the I Box has available to it all data in all of the GPR's 202, and can utilize it without the need of waiting for data to be gated on to a bus as a result of a signal from I Box 134. There are two other Busses, A Bus 225 and B Bus 226, each which can be gated to receive the data from any GPR 202. As in the case of Busses 331 and 333, a 64 bit data word stored in an even-odd numbered pair of GPR's can be transmitted at one time by putting the left half of the word from the even numbered GPR on A Bus 225, and the right half of the word on B Bus 226, both Busses being connected to Store Bus OR's 221 with A Bus 225 also gating in to the left (T/C) input of CPA 216, and B Bus 226 gating into the right input of CPA 216, and also into the Multiplicand Gates 235 of the CSA 214.

The ingating to the GPR's 202 is under control of the GPR Address Register 228, which will be loaded from I Box 134 over a Bus 229. Register 228 is a 9 bit register containing four bits to designate the GPR of 202 which is the sink register and two bits to designate what part of the GPR is to receive data from the input Busses 236, 331, 333 or 234. The gating can be eight bits into bit positions 24–31, 32 bits into the full GPR, or 64 bits into an even-odd numbered pair of GPR's. The other bits of Register 228 are used to indicate the one of the FXB's 204–210 which will put the operand (through CPA 216) on the Busses 331 and 333.

The RUM counters 335 and the RUA counters 337, FIG. 4B, are each 3 bits wide and are physically located in the I Box 134 to save transmission time in referencing them, but they are more closely associated with the GPR's 202 in that there is one RUM counter 335 and one RUA counter 337 for each GPR 202. A Select RUA Decoder 338 is responsive to the sink GPR address signals in OP Stage 167 to select the RUA counter 337 for the addressed GPR, and this counter will be incremented by a unit when the instruction in OP Stage 167 is issued to FXPU 143. Similarly, the Select RUM decoder 339 is responsive to the addresses of both the sink GPR and the source GPR 202 in Op Stage 167 to select both of the RUM counters 335 for the sink and source GPR's. The selected RUM counters 335 will also be incremented when the instruction is issued to FXPU on Bus 222. Each time a GPR 202 is used as a sink register in a fixed point instruction, the OP Decode 224, FIG. 6A, will transmit a Decrement RUA signal on an appropriate line of a Bus 341, and similarly each use of a GPR 202 as either a sink or a source register of a fixed point instruction, will cause an appropriate signal to be sent on one or more of the wires of a DECREMENT RUM Bus 342 to decrement the appropriate RUM Counters 335.

For each instruction which would control the I Box 134 to change the value in a GPR, i.e., by storing therein a new base address, the I Box 134 upon decoding such instruction, must check the status of the RUM Counter 335 for that GPR. If that RUM Counter is not at zero, it means that there are unexecuted instructions in the FXOS 201 which will use the data stored in that GPR 202 as a sink or source operand, and further processing in the I Box will be held up until the RUM Counter 335 is at zero. It is true that when the GPR register is to be used as the sink in a number of instructions, the data will probably be altered at each instruction, but this is of no consequence, for the FXOS 201 instructions are executed in sequence and the data in a GPR 202 at the start of execution of an instruction will be the operand for that instruction. It is the I Box that is processing advanced instructions and which must be careful not to interfere with concurrent processing of earlier issued instructions.

When the I Box decodes an instruction which specifies a storage address in MS 104, or EMS 105, as the value in a GPR (Base Register) plus a displacement value and either with or without addition thereto of the value in another GPR (Index Register), the I Box 134 must be sure that the values in the GPR's to be used for generation of the address are those which should be used. If a GPR 202 has any value in its RUA Counters 337, it is an indication that some previously issued but unexecuted instruction will use that GPR as a sink register, and that the data in the GPR is not current with respect to the instructions being decoded. The I Box must wait until the GPR's RUA Counter 337 has been decremented to zero by the OP Decoder 224 of the FXPU 143.

*FXPU operations*

The FXPU 143 is capable of executing a substantial group of instructions most of which require transmission of only a single instruction from I Box 134 to FXOS 201. The Fixed Point instructions, mnemonics and format are:

| Mnemonic | Instruction | Format |
|---|---|---|
| AR, AH, A | Add H/F | RR, RX |
| ALR, AL | Add Logical | RR, RX |
| CR, CH, C | Compare H/F | RR, RX |
| CLR, CL | Compare Logical | RR, RX |
| CVB | Convert To Binary | RX |
| CVD | Convert to Decimal | RX |
| DR, D | Divide | RR, RX |
| LR, LH, L | Load H/F | RR, RX |
| LTR | Load and Test | RR |
| LCR | Load Complement | RR |
| LPR | Load Positive | RR |
| LNR | Load Negative | RR |
| LM | Load Multiple | RS |
| NR, N | Logical And | RR, RX |
| OR, O | Logical Or | RR, RX |
| XR, X | Logical Exclusive Or | RR, RX |
| MR, MH, M | Multiply H/F | RR, RX |
| SLA | Shift Left Single | RS |
| SRA | Shift Right Single | RS |
| SLDA | Shift Left Double | RS |
| SDRA | Shift Right Double | RS |
| SLL | Shift Left Single Logical | RS |
| SRL | Shift Right Single Logical | RS |
| SLDL | Shift Left Double Logical | RS |
| SRDL | Shift Right Double Logical | RS |
| STH, ST | Store H/F | RX |
| STC | Store Character | RX |
| STM | Store Multiple | RX |
| SR, SH, S | Subtract H/F | RR, RX |
| SSRL, SL | Subtract Logical | RR, RX |

In the mnemonic listing, the presence of an R except in Shift instructions indicates that the required operands of the instruction either are or will be stored in GPR's 202 prior to execution of the instruction, and an H indicates that the operand is to be a half word of 16 bits. In Shift instructions, an R means that the shift of the operand will be to the right. In the Instruction column, the H/F indication means that the execution is performed, except for in and out gating, in the same manner for both half and full word operands. In the Format Column, the designation RR means that both operands will be present in named GPR's 202 and will also be indicated by the R in the mnemonic column. RX means that one operand will be in a named GPR 202, and the second will be in a storage address specified by the sum of a base address and an index amount both in named GPR's and a displacement value present in the instruction. For an RS Format, the storage address will be the sum of the base address in a GPR 202 and the displacement value of the instruction, no index amount being included.

The only distinction between the RR, RX, and RS instructions is the location of the second operand. In RR the source operand will be in a GPR while in RX and RS formats, the same operand will be from a storage address and will be fetched into an FLB 204–210 as assigned by I Box 134, and execution cannot proceed until the FLB has received the fetched operand.

*Single cycle instructions*

Most of the above instructions are executed by the FXPU 143 in one machine cycle and include the adds, subtracts, compares, loads, stores and logical connectives. During such machine cycle, the DECREMENT RUM, DECREMENT RUA, FXOS COUNT and FXB NOT BUSY signals will be sent by Op Decoder 224 to I Box 134 to keep current the I Box counters. More specifically, all Loads (LR, LH, L, LTR, LCR, LPR, LNR, and LM) including both RR and RX format types all go through the Adder 216, FIG. 6B. During such machine cycle, the DECREMENT RUM, DECREMENT RUA, FXOS COUNT and FXB NOT BUSY signals will be sent by Op Decoder 224 to I Box 134 to keep current the I Box counters. More specifically, all Loads (LR, LH, L, LTR, LCR, LPR, LNR, and LM) including both RR and RX format types all go through the Adder 216, FIG. 6B. A Load instruction will perform the function of loading a specified sink GPR 202 with data already in another specified location, either another GPR 202 or a storage address fetched into an FXB 204–210. All data paths are from the source register through GPR A Bus 225, or by FXB Out Busses 344 and 345 to the left input of CPA 216. The data passes through the CPA 216, Accumulator 217 and Shifter 218, and is gated into the sink GPR 202. If the data being moved is only a half word long (a LH instruction), the half word is gated on FXB Out Bus 345, and FXB Out Bus 344 receives the sign bit on each of its 16 lines. Load and Test is a Load instruction which also sets the Condition Code latches as called for by the instruction. Load Positive or Load Negative require that the sign of the data be sensed to enable either a true or complement setting of the T/C Side 231 of CPA 216 as required to get the called for sign of the output data and Load Complement always sets the T/C Side for a complementing of the data.

The Adds, Subtracts, Compares, and Connectives (AR, AH, A, ALR, AL, SR, SH, S, SLR, SL, CR, CH, C, CLR, CL, NR, N, OR, O, XR, and X) all have the common property of requiring two operands, a source operand from either a GPR 202 or a FXB 204–210 and a sink operand from a GPR 202, and except for the Compares, all have a sink in a GPR 202. The source operands are all directed over GPR A Bus 225 or FXB Out Busses 344 and 345 to the left input of CPA 216, and for Subtract or Compare operations are complemented in T/C Side 231. The output of CPA 216 will return to the Sink GPR 202 on the Shifter 218 Out Bus 331 or 333. The Logical Operations are the same as the Arithmetic ones except that the Condition Code is set differently, the Arithmetic ones setting the Condition Code to zero, positive, negative or overflow while the Logical ones set one code bit to indicate either zero or not zero, and the other bit to indicate a Carry out or no carry out. The Connective operations are performed in a small Connect Unit 346 which is fed from the data flow diverted out of CPA 126's data paths and which OR's its output into the data output paths of CPA 216. As in Load operations, half words are transmitted on the right half of a bus and the sign bit is replicated to fill the left half of the bus data.

Store instructions (STH, ST, STC) route data from a selected one or pair of GPR's over the GPR A Bus 225 and/or the GPR B Bus 326 to the Store Bus 221 for transmission to the SDB's 244, FIG. 7. The difference between the instructions will be in the gating into Store Bus ORs 221, where a half word will be duplicated in both parts of the Output Bus 197 and a character, one byte, will be replicated across the entire word. Such gating will enable the half word or character to be ingated into any half word or character position of the full storage word addressed by the SAR 241.

*Multi-cycle instructions*

The multiple cycle operations can be of either a fixed number of machine cycles, i.e. single word shifts of up to 32 denominational orders to the right or to the left, or a variable number of machine cycles due to data content, i.e., Divide, Multiply, Convert Decimal to Binary, or are shift value dependent, i.e., Double word shifts where a double word can be shifted up to 64 denominational orders in either direction. The signals to the I Box 134, RUM and RUA Decrement and FXB Not Busy are sent as soon as the execution of the operation has progressed to a point where no further use of the GPR registers or FXB by I Box 134 can cause erroneous operations.

The FXOS 201 is released to the I Box 134 as soon as all data has been extracted therefrom, usually about the second machine cycle. After FXOS 201 has been released to the I Box, the next Op code is tested to determine if it is of a type which can be overlapped with the operation being executed. Generally, all of the VFL operations involving two storage addresses for the operands can be overlapped with either Single Cycle or Multicycle Instruction since the hardware used for each instruction does not overlap that of the other instruction. The conditions for overlap processing of FXPU instructions are indicated in FIG. 13. Here the Fixed Point operations are indicated in the left half where the first test is to determine if an instruction which can be overlapped is being processed. If yes, the next test is release of FXOS 201, i.e. does ring 296, FIG. 10, point to the next instruction, and when both tests are affirmative, the FXPU 143 is set into the FX OVERLAP MODE. In the FX OVERLAP MODE, if the VFL unit is not also processing an instruction, the next Op in FXOS 201 is tested, and if it is for a Storage to Storage operation, except a Translate and Test (TRT) or an Edit and Mark (EDMK) Instruction, the next instruction in FXOS 201 will be issued to Op Decode 224 for immediate execution.

In a similar manner a fixed point instruction may be overlapped with execution of a VFL instruction. As indicated on the right side of FIG. 13, if a storage to storage instruction is being executed by the VFL part of FXPU 143 (except the above TRT and EDMK instructions) and when the FXOS 201 has been released from the last instruction, the FXPU will be set to VFL OVERLAP MODE. In this mode, if there is no fixed point operation in process, and the next instruction in FXOS 201 is either a shift or is in a GPR to GPR (RR) or a GPR to Indexed Storage Address (RX) format (excepting the IC, ISK, CVB, or CVD or a storage instruction) then the next Instruction in FXOS 201 will be issued to Op Decode 224 and its execution started. Once either OVERLAP MODE is set, the FXPU stays in that mode until the end of execution of one of the two overlapped operations at which time another test is made to determine if another overlap is permissible.

Division

Division in the FXPU 143 is one of the Multi-Cycle operations and is basically 36 machine cycles long with a possibility of one additional cycle needed to correct for a negative remainder to the normal division. The Division control sequence is shown on the flow charts FIGS. 14 to 17 inclusive. The first two machine cycles are shown on FIG. 14 where upon at the start of a division operation, a first cycle indication will control the selection of the even-odd pair of GPR's 202 which contain the full 64 bit dividend (DEND). This pair will be specified in the divide instruction in FXOS 201, and the odd numbered one of the selected GPR pair will be outgated onto the A Bus 225. At the same time, the Item Counter (ICTR) 348, FIG. 6A, will be set to a value of 34 over a Bus 349 from the OP Decoder 224 and the sign of the dividend will be checked, Block 350. This sign is in the left hand bit position of the even numbered GPR 202 of the selected pair. If the sign is positive, the decision, Block 350, will be to set T/C Side 231 true, and A Bus 225 will be gated true through T/C side 231 into CPA 216, but if the sign is negative, the decision will be to set T/C side so that the A Bus 225 will be gated into CPA 216 complementally, and a "hot 1" will be gated into the lowest denominational order of CPA 216. The input data will pass through CPA 216 and will be held in the output latches of CPA 216.

In the second machine cycle, a Decision Block 352 checks the Op Code in FXOS 201 to determine if the operation is in RX or RR format, i.e. is the divisor (DVR) already present in a GPR 202, or is it from a storage location. If the DVR is to come from storage, the selected FXB 204–210 is gated onto the Busses 344 and 345 but the Busses are not gated into CPA 216.

Another Decision Block 353 checks the F/E bit of the Buffer Register to see if the fetched operand has been transferred from storage into the FXB 204–210. If the selected FXB is full, its sign is saved for the next cycle. After the DVR sign is saved or if Decision Blocks 352 or 353 have not determined that their condition is satisfied, control passes to a Decision Block 354 which checks to determine if the entry of the low order half of the dividend from the odd numbered GPR caused a carry out of CPA 216. This can happen only if the GPR has no value stored therein, the sign of the dividend is negative so that the entry of the all "1's" complement plus the "hot one" into the right hand carry circuit will cause a carry out of the left end of the adder. This carry out will now be saved by a latch 359 and is to be entered into the right hand carry circuit of CPA 216 to replace the "hot one" normally used on a complement entry. The even GPR containing the high order half of the dividend is then gated onto the A Bus 225 and into the T/C Side 231, which will be set for True or Complement entry by Block 350, set in cycle 1, and at the same time, the low half of the dividend which is latched at the output of adder 216 will be gated into the right half of Accumulator 217. Block 256 will detect if the carry out latch 359 is set and if so will cause injection of the carry into the right hand adder denomination.

Figure 15:
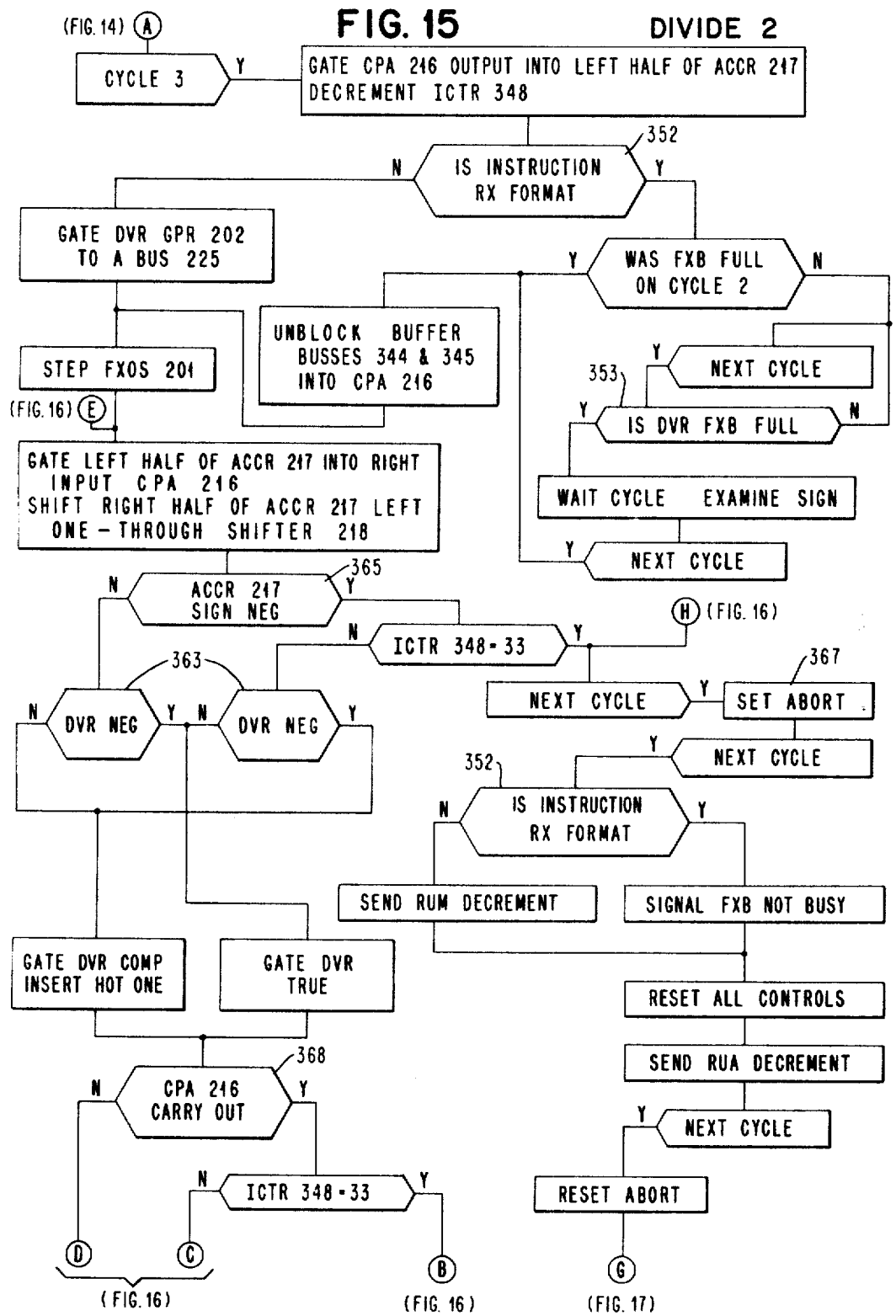

The third division cycle enters the flow sheet at point A of FIG. 15, whereupon the output of CPA 216 is gated into the left half of Accumulator 217 and ICTR 348 is decremented one count by gating into ICTR the output of the Decrement 1 Subtractor 360. As soon as the new ingated value has passed through ICTR 348, the Decrement 1, 360, will generate another value one unit less than the then content of ICTR 348, and will thus be ready for the next decrement cycle. Now, if Decision Block 352 was set to indicate an RX Format at cycle 2, and if another Block 361 was set on at cycle 2 to indicate that the DVR FLB 201 was full, division can proceed by opening the gates from Buffer Busses 344 and 345 to the T/C side 231 and thence to the left input to CPA 216. If, however, Block 352 is not set to indicate an RX format, it is an indication that the divisor is stored in a GPR 202, and in this cycle the DVR GPR is gated to the A Bus 225. When the divisor is being fetched from a storage address, but has not been received in an FXB before the second cycle, Block 352 will be on but Block 361 will be off, and we enter a wait cycle in which block 361 starts the next cycle as a no-operation cycle, and so long as Block 353 does not become set, indicating the return of the fetched divisor, another no-operation cycle will be started. When Block 353 becomes set, the divisor has been returned to an FXB and its sign will be examined in the next cycle to set a DVR NEG Block 363 and control will be returned in the second cycle to pass the data on Buffer Busses 344 and 345 in the same manner as if Block 361 was set when tested. After the DVR is gated on the A Bus 225, or the Buffer Busses 344 and 345, the FXOS 201 is stepped to the next instruction by incrementing Ring 296 FIG. 10, and the FXPU 143 has arrived at the start of a division cycling loop which will generate the quotient digits and which loop will be entered at point E FIG 15.

Figure 17:
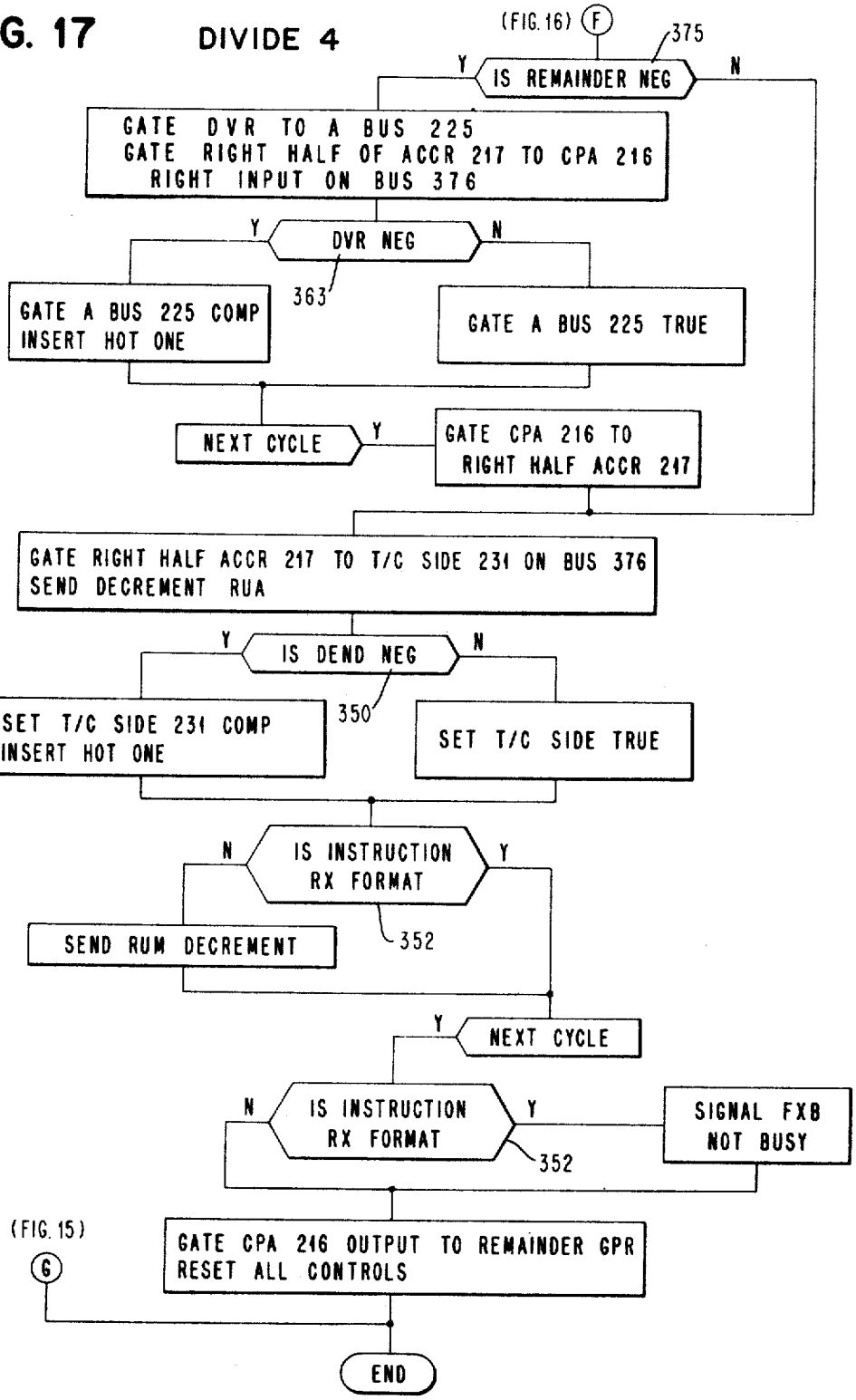
Figure 18:
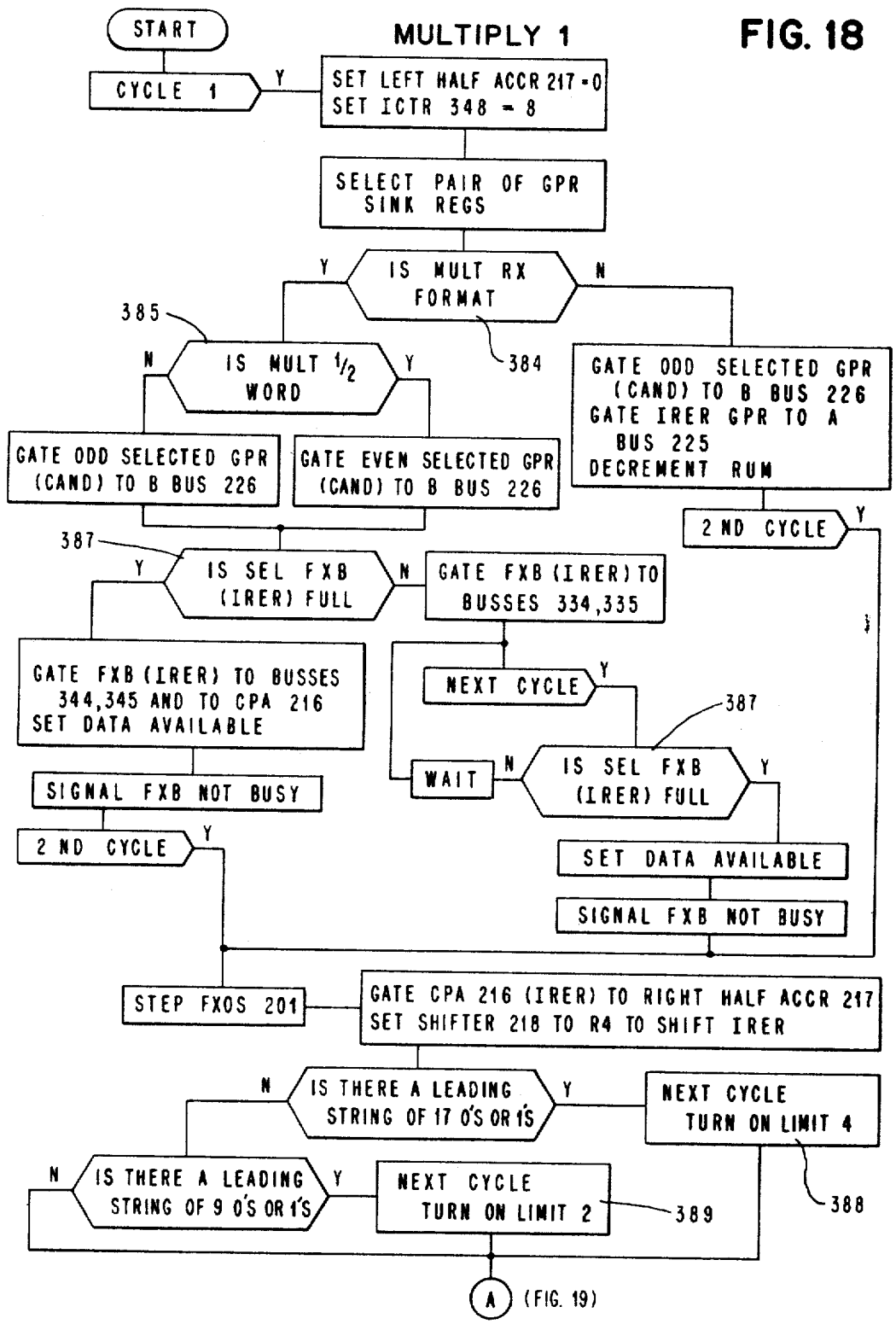

In the division loop, the left half of Accumulator 217 is shifted left one order by a wired in shift and is transmitted over Bus 364, FIG. 6B, to the right input of CPA 216. The right half of Accumulator 217 is shifted to the left one order in Shifter 218 and is transferred over Bus 333 back into the right half of Accumulator 217, with the left hand data bit moving into the left half of the Accumulator 217. The dividend sign in the left half of the Accumulator 217 is tested to detect the presence of a negative dividend, and if it is negative, as indicated by setting of Block 365 to Yes, and at the same time ICTR 348 contains a count of 33, the machine is attempting to start a division with a dividend which has not been complemented to a true magnitude, an error condition, and an abort phase indicated as entry point H is entered. With a signal at point H, the next machine cycle will set an Abort Condition Latch 367 which on the next cycle will test Block 352 to send the signal FXB Not Busy to the I Box 134, if division was in RX Format, or the RUM Decrement Signal on line 343, FIG. 4B, if the Format was RR. In either case, all controls are next reset and the RUA Decrement signal is sent out on line 341 to I Box 134. On the next cycle, the Abort condition latch 367 is reset and the system arrives at exit point G which as shown in FIG. 17 is the end.

If, however, there is no error, the N output of Block 365 will combine with the setting of Block 363 to gate the DVR true through T/C Side 231 into CPA 216 if the DVR is negative, or to gate it complementally through T/C Side 231, if the DVR is positive. If there is now no carry out of CPA 216, Block 368, it is an indication that the division partial remainder is a negative quantity and the system signals to entry D, FIG. 16. If the output of Block 368 is affirmative, the partial remainder is positive, and if on this cycle the ICTR 348 contains the value 33, the system signals to entry B, FIG. 16, otherwise the control signal is to entry C. For an entry at D, FIG. 16, the next cycle enters a quotient bit of 0 into the right end of the Accumulator 217 since the lack of a carry out of CPA 216 indicates that the remainder is negative, and for this remainder the correct quotient digit is zero.

Figure 16:
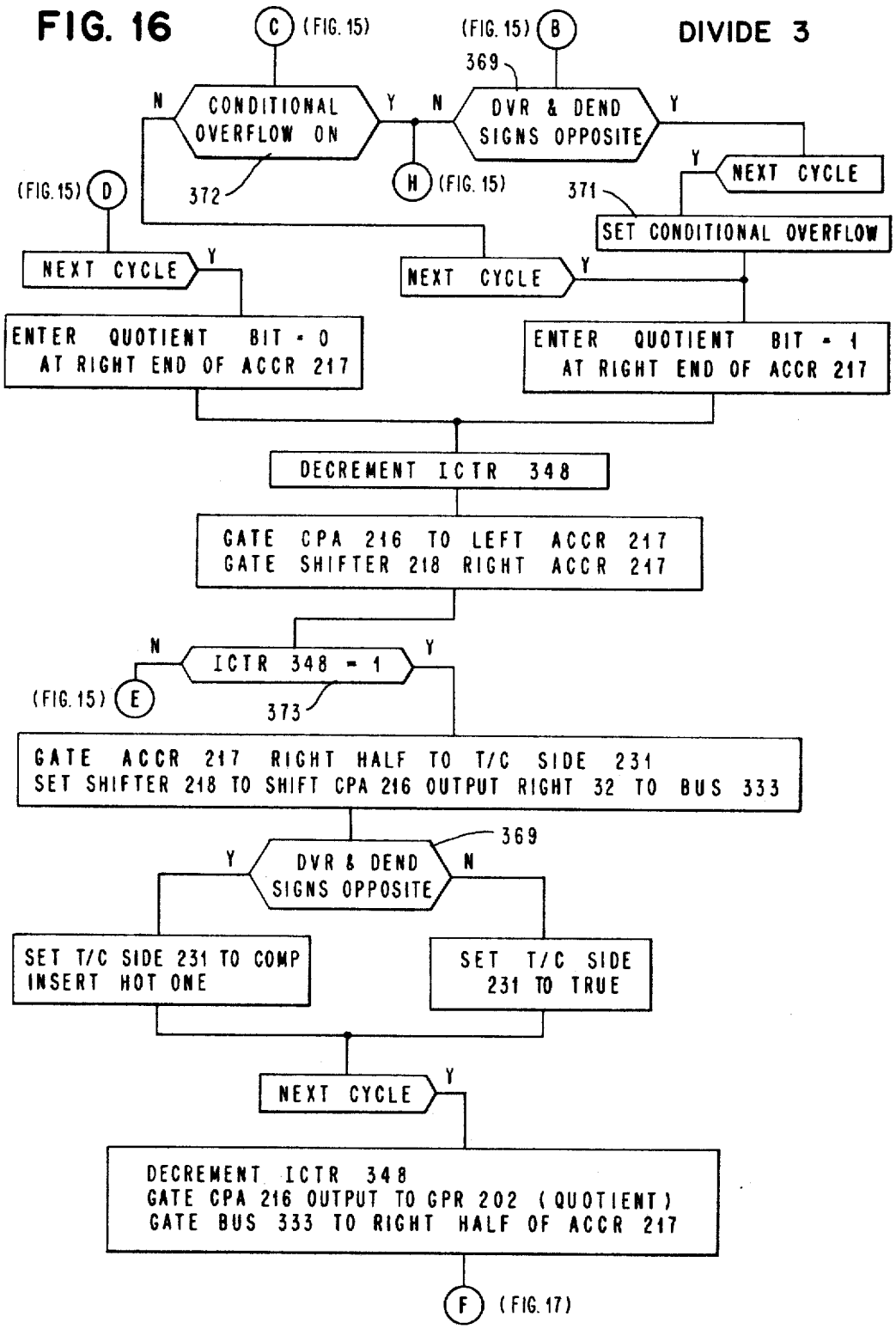

An entry to FIG. 16 on entry B can occur only when the value in ICTR 348 equals 33, i.e., on the first divisor subtraction. If the divisor and dividend have opposite sign characteristics, there is a possibility that the carry out of CPA 216 indicates that the dividend is greater than the divisor although they may also be equal. If the dividend and divisor are of the same sign and there is a carry out of CPA 216, then the control entry is at B and the dividend is greater than the divisor. In the preferred embodiment of the invention, a rule has been set up that in fixed point division operations, with like signs, a positive quotient must always be less than unity, and the divisor must therefore always be greater than the dividend. If the two operand signs are unlike, a permissible quotient could be the maximum negative number of 1.000. . . . Therefore, a quotient of one is permissible on the first iteration cycle if it is not followed by another 1 somewhere in the quotient. To satisfy these conditions, if Block 369 is not set, indicating like signs, an entry at B of FIG. 16 will be passed to entry H, FIG. 15, and the division will be terminated. If the Block 369 is set, then on the next cycle a Conditional Overflow indicator 371 is set.

When the output signal from FIG. 15 is on entry C indicating a subsequent quotient digit of one, and the Conditional Overflow 371 has been set as indicated by a Y condition of Block 372, there is another one digit following the one digit in the units denomination and the control input signal will be passed by Block 372 to entry H, FIG. 15, to terminate the operation. This detection of a second positive remainder is evidence that in a mixed sign division, the magnitude of the dividend was actually greater than that of the divisor, and the operation is a violation of the system rules so must be ended. When the signal on entry B or C passes through its Block 369 or 372 to start the next cycle, a quotient bit of 1 is set into the right end of the right half of Accumulator 217, and regardless of whether the entry was on B, C, or D, the ICTR 348 is decremented, the output of CPA 216 is gated into the left half of Accumulator 217, Shifter 218 is set for a unit shift to the left, and the Shifter Output Bus 333 is gated into the right half of the Accumulator 217. Now, unless Block 373 indicates that ICTR 348 has a value of 1 therein, control is passed from Block 373 N to entry E on FIG. 15 to start another cycle loop iteration.

After 32 iterations of the cycle loop, the value in ICTR 348 has been decremented to a unit and the arithmetic part of the division is complete. The signal to Block 373 now is passed out at Y to start the terminating cycles. In this part of the division cycles, the right half of Accumulator 217, which now contains the absolute value of the quotient, is gated out on Bus 376 to the T/C Side 231, and Shifter 218 is set to shift the output of CPA 216, 32 denominations to the right to put it on Bus 333. If Block 369 has been set to Y, the quotient is the result of the division of numbers of opposite sign and is negative so the T/C Side 231 is set to complement and the quotient on Bus 376 is passed through complementally. If the Block 369 is not set (N), the quotient is positive or zero and is passed through CPA 216 in true form.

In the next cycle, ICTR 348 is again decremented to bring it to zero, the quotient at the output of CPA 216 is gated into the sink GPR (the even one of the even-odd pair of GPR's originally holding the dividend) and Bus 333 having the remainder thereon is gated into the right half of Accumulator 217. A signal is thereupon sent to entry F, FIG. 17. At entry F, if the remainder just sent to Accumulator 217 is negative, as indicated by the setting of Block 375 to Y, a correction cycle is required, for it is another system rule that all remainders of division operations are to be of the same sign as the dividend, so at this time all remainders are to be of positive sign.

For the correction cycle, the DVR is gated from its GPR 202 to Bus 225, and, if negative, is complemented in T/C Side 231, but, if positive, is passed through to CPA 216 in true form. In the next cycle the output of CPA 216 is gated back into the right side of Accumulator 216, and is now a positive remainder since the magnitude of the DVR has been added to the previously negative remainder. The positive remainder is now gated to T/C Side 231 on Bus 376 where the T/C side is set in accordance with the sign of the dividend (Block 350) and the remainder complemented or retained true through CPA 216. At this time if the Instruction was in RR format, i.e., Block 352 is not set, the Decrement RUM signal is sent on line 342 to I Box 134, but in any event the last machine cycle is entered. Herein, if the Instruction was in RX Format, i.e., Block 352 is set to Y, an FLB Not Busy signal is sent to I Box 134 for the divisor FLB, the output of CPA 216 (the remainder is sent to the odd numbered GPR 202 of the even-odd pair originally holding the dividend, and all controls are reset to end the division operation.

Thus, a division operation takes basically 36 machine cycles, 2 preliminary cycles to load the dividend, 32 iterated cycles to perform the actual division and two terminal cycles to store the remainder and quotient in the sink GPR's. In addition, if the remainder is negative at the end of the 32 iterations, one more cycle is required to add the divisor to the remainder to convert it to a positive value.

*Fixed point multiplication*

Fixed Point Multiplication, either MR, MH, or M can multiply a 32 bit multiplicand (CAND) by a 32 bit multiplier (IRER) in not more than 11 machine cycles. These eleven cycles comprise one load cycle, one decode cycle, eight multiply iterations, and one correction shift and product transfer cycle. Since there are 32 IRER bits, four bits are utilized in each of the eight iteration cycles, and if a group of nine or seventeen consecutive bits starting from the high order left end can be found to be non-significant, the iteration normally required to utilize the IRER bits in these positions can be saved. A leading string decoder 379, FIG. 6B, is provided to sense the left 17 bits in the right half of Accumulator 217 to detect after the sign bit a string of either 8 or 16 non-significant figures which will be the same as the sign bit, either all ones or all zeros, at the left end of IRER. Any such string of ones or zeros when found will cause the shifter 218 to be set to skip these bit positions and will reduce the number of iterations by 2 for a string of nine ones or zeros, or by 4 for a string of 17 ones or zeros which string of 17 will also be found for a half word IRER. Thus, multiplication can be as short as seven cycles.

It will be noted in FIG. 6B that the CAND on B-Bus 226 is applied to the CAND Gates 235 which are controlled by the IRER Decode 377. In each cycle the IRER Decode 377 tests the five lowest orders of the IRER then in the right half of Accumulator 217 to select two multiples of CAND, one to be sent to CSA 214 on the Right Bus 381, and one on the Left Bus 383, respectively. The multiple sent on the Right Bus 381 can be either a zero multiple or the CAND itself, or the CAND shifted left one denominational order, and thus the 2's multiple. Also the output multiple can be either the true multiple as above, or it can be the complement thereof. For the Left Bus 383 the output signals are the same but are directed to denominational orders of CSA 214 which are two orders to the left of those for the corresponding Right Bus 381, and are effectively four times as large being the zero, four, and eight multiples of CAND. The IRER Decode looks at the five low orders of the IRER to set the CAND Gates 235 according to the schedule below where an X indicates that the value of that denomination is immaterial. For Right Bus 381 the selected multiples are:

| Accum 217: | Multiple on 381 |
|---|---|
| XX000 | 0 |
| XX001 | +1 |
| XX010 | +1 |
| XX011 | +2 |
| XX100 | −2 |
| XX101 | −1 |
| XX110 | −1 |
| XX111 | 0 |

For Left Bus 383 the multiples are:

| Accum 217: | Multiple on 383 |
|---|---|
| 000XX | 0 |
| 001XX | +4 |
| 010XX | +4 |
| 011XX | +8 |
| 100XX | −8 |
| 101XX | −4 |
| 110XX | −4 |
| 111XX | 0 |

At each iteration cycle, any partial product in the left half of Accumulator 217 will be entered into the right input to CSA 214, and will be combined with the inputs on Busses 381 and 383 in CSA 214 to generate two factors which are combined in CPA 216 and shifted right four orders to become the new partial product in the left half of Accumulator 217. The four right hand bits of the partial product shift into the right half of Accumulator 217, where they participate in a four bit right shift each iteration, and at the end of multiplication, are the right hand half of the final product.

The multiplication cycle is shown on the flow charts FIGS. 18, 19, 20 and 21. With the start multiplication signal and the system in the first cycle, the left half of Accumulator 217 is set to all zeros and ICTR 348 is loaded with a value of eight. The even numbered GPR register specified as the sink register in the multiply instruction is selected for gating to the out Busses 225 and 226. A Decision Block 384 is set (Y) when the instruction is in the RX format and controls the gating out of the operands. If Block 384 is not set (N), the instruction is in RR format and the odd numbered GPR of the pair selected as the sink for the multiplication, i.e., the GPR containing the multiplicand (CAND) is gated to B-Bus 226 and simultaneously the GPR 202 specified in the instruction as the one containing the multiplier (IRER) is gated to A-Bus 225. The Decrement RUM signal for the IRER GPR 202 is sent on line 342 to I Box 134 at this time.

If Block 384 is set, the instruction is in RX format and block 385 is tested to detect a half word multiplication. If full word (N), the odd numbered GPR containing the CAND is gated to B-Bus 226. When the instruction is a half word multiplication (MH) and block 385 is set (Y), only one GPR 202 is needed to retain the product to be generated and this GPR will be the one addressed in the instruction, and not an even-odd pair of GPR's 202. For the half word instruction the GPR 202 specified in the instruction is gated to B-Bus 226. In either event, the F/E bit of the selected FXB 204–210 which has or will contain the IRER from storage (since the instruction is in RX format, the IRER will be received from storage), is tested (Block 387 of FIG. 18) and if full (Y) will enable gating out the selected FXB onto Busses 344 and 345, and will also reset the F/E bit of the FXB to empty, placing the FXB in Not Busy condition. When the selected FXB is not full at this time (N), the system enters a wait loop by first setting the gates from the selected FXB to Buffer Busses 344 and 345 and waiting for the next cycle. On the next cycle, Block 387 is again tested and if still empty the system goes to a wait condition wherein Block 387 is tested in each succeeding cycle. On the cycle after which the FXB becomes full, the system when it finds the Block 387 set to Y, will signal that all multiply data is available, and will switch the FXB F/E bit to E. The three branches of the flow chart (MR, MH, and M) now rejoin and the next item is to Step FXOS 201 by advancing Ring 296 to indicate the next FXOS instruction position which will be decoded at least enough to determine if overlap mode is permissible. The A Bus 225 is gated into the right input of CPA 216 and the output of CPA 216 is gated into the right half of Accumulator 217. Also set is Shifter 218 which is set to a right shift of four bit positions in an Accumulator to Accumulator Shift. The Leading String Decoder 379 is now tested to see if a string of 17 or 9 like bits has been found at the left end of the word and to turn on a Limit of 4 Latch 388, or a Limit of 2 Latch 389, for a 17 or 9 bit string respectively. In any case, the system is now ready for the multiplication iterations and exits to entry A, FIG. 19.

In FIG. 19, the upper set of four blocks test the right five bits of the IRER stored in the right half of Accumulator 217 to set the CAND Gates 235 to select a true or complement, one or two times multiple of CAND for Bus 381. The second set of four blocks indicate the decoding of the same five bits in IRER Decode 377, to select the CAND Gates 235 for putting either the zero, the four, or the eight CAND multiple, either true or complement, on the Bus 383. For the next cycle, the operation shifts control to Entry E of FIG. 20.

In the next cycle, if this is the cycle following the first decode cycle (Y), no operands have passed through the CPA 216, and the only gates set are from the output of the Shifter 218 back into the right half of Accumulator 217, which will eliminate the four right IRER bits, move the fifth bit into the right hand bit position and bring four new IRER bits into the decoding zone of IRER Decoder 377 for setting CAND Gates 235 in the next cycle. If this cycle is not the cycle following the first decode cycle (N), the output of CPA 216 represents a partial product and it is gated into the left half of Accumulator 217. For either decision branch, however, the next step is to turn on the limit four and limit two triggers previously selected by the Leading Strings Decoder 379 and CAND Gates 235 as selected above to enter the and multiples into CPA 216, and to decrement ICTR 348. The system next checks to determine if multiplication is finished by determining, Block 391, if ICTR 348 is at a count of four, and if so, is the limit four trigger turned on. If both decisions are yes, the iteration cycles are terminated by a signal to entry B, FIG. 21, but if limit four trigger is not on the system checks Block 392. If Block 391 indicates ICTR 348 is not at four, Block 393 checks for an ICTR count of two. If no such count is found, the branch is also to Block 392, but if ICTR 348 is at a count of two, the limit two trigger is checked for an on condition which terminates iterations by a signal to entry D, FIG. 21, and otherwise signals Block 392. When Block 392 is found on (Y), ICTR 348 is at zero, and all of the normal iterations have been taken so a terminate signal goes to entry C, FIG. 21. If ICTR 348 is not at zero (N), controls gate the CPA 216 output through the left half of Accumulator 217 to Shifter 218 and the right half of Accumulator 217 to Shifter 218 which is set for a right shift of four. This shift of four denominations to the right with the gating of the Shifter output on Bus 333 into the right half of Accumulator 217, puts four new IRER bits into the decoding zone of IRER Decoder 377 and moves the four right hand bits from CPA 216 into the four left hand bit positions of the right half of Accumulator 217 for preservation. The Shifter 218 output on Bus 331 represents the CPA 216 output, i.e., the partial product, shifted right four denominational orders, and is passed by Bus 331 into the right input of CSA 214, and a signal is passed back to entry A, FIG. 19, to start another decoding cycle.

Since on each iteration after the first, the right half of Accumulator 217 receives the lowest order four bits of the partial product, at the end of a full multiplication, there will be 28 bits of product in the right half of Accumulator 217, and 36 bits in the left half of the Accumulator, while if a leading string of nine similar units was found, there will be only 20 bits in the right half, and if the leading string was 17 similar bits, the right half will have only 12 product bits. In the case of half word multiplication, the right half will have 12 bits and the remaining 20 bits of the product will be in the left half of Accumulator 217.

Entry points B, C, and D, of FIG. 21, control the Shifter to place the product digits in Accumulator 217 into the proper GPR positions. For entry C, a right shift of four will place all significant digits in Accumulator 217 onto the correct output Busses 333 and 334, with Bus 333 receiving the 32 right hand product bits for ingating into the odd numbered sink GPR 202, and Bus 331 transmitting the left 32 product bits to the even numbered sink GPR 202. If there was a leading string of nine non-significant bits detected, an additional right shift of eight for a total right shift of 12 is needed to set the lowest product order into the lowest GPR bit position, and entry D which will be signalled when this condition exists, calls for a right shift in Shifter 218 of 12 units. When the terminating signal is on entry B, it indicates that a leading string of 17 non-significant bits was detected which could have meant that the full word multiplier had 17 insignificant left bits, or that the multiplier was a half word. If full word, a total shift of 20 bit positions to the right is required to properly align the product in the even-odd pair of sink GPR's, but if the multiplication is of half words, the maximum product is 32 bits long and can be placed in either an even or an odd-numbered sink GPR. Therefore, with half word Block 395 set on and the terminating signal coming in entry B, if GPR Sink Odd Block 396 is on (Y), a right shift of 20 bits is called for to put the entire product on Bus 333 for transmittal to an odd number sink GPR, but if Block 396 is off (N), the shift called for is for a left shift of 12 bits to put the entire product on Bus 331 for transmittal to the even numbered sink GPR. Following the setting of the gates of Shifter 218 for the needed shift, the output of Shifter 218 is gated to the Busses 331 and 333, and the Decrement RUA signal for the sink GPR 202 is sent on Bus 341 to I Box 134. In the last cycle, the product on Busses 331 and/or 333 is gated into the sink GPR's 202 and all multiplication controls are reset to terminate the multiplication.

*Shift operations*

The shift operations are covered by the eight shift instructions for the three variables; Shift Right or Left; Shift a single or double word; and Shift Logical or Arithmetic. All single word shifts can be accomplished in two machine cycles, but a shift of a double word requires either three or four cycles, any shift of more than 32 bits needing the fourth cycle. All shift operations take an operand from a GPR 202 through the CPA 216 and into Accumulator 217. If the operand is from a GPR 202 which is one of the even numbered GPR's, the operand is put into the left half of Accumulator 217, while the operands from an odd numbered GPR 202 are placed in the right half of the Accumulator 217. Double word operands are transferred one word at a time from the even-odd pair of GPR's and go into the corresponding parts of the Accumulator 217. On the next cycle, the complete operand is shifted the required amount in Shifter 218 and is transmitted over Bus 331 to the even numbered sink GPR and over Bus 333 to the odd numbered sink GPR. If the shift amount of a double word is more than 32 bits, the shift must be made in two parts, first a 32 bit shift with a transfer from Busses 331 and 333 back into Accumulator 217, and then a second shift for the remaining number of bits followed by a transfer over Busses 331 and 333 to the sink GPR. The only distinctions between an arithmetic and a logical shift are that on a logical shift, all vacated bit positions are set to zero, no condition code changes will be allowed and no test is made for a spill of a significant digit in a left shift, whereas an arithmetic shift operation enables gates in Shifter 218 to fill in replications of the sign bit in the high order bits on a right shift, and in the unused extra left positions on a left shift, the condition code can be set to indicate a zero, less than zero, or greater than zero condition of the shifted operand, and a spill of a significant digit on a left shift will result in an overflow indication.

The shift operation after the loading of the operand in Accumulator 217 takes one cycle if the shift extent is of 32 bit positions or less, or two cycles if the shift extent is greater than 32 bits since 32 bits is the maximum shift which can be called for in one pass through Shifter 218.

FIG. 22 shows the sequencing of the FXPU controls for a single word shift. At the start in cycle 1, the sink GPR 202 is selected and three triggers, Left, Arithmetic, and Odd number GPR are set combinationally as called for by the shift operation being executed, and the selected sink GPR 202 is gated to B Bus 226 with ICTR 348 being set by Op Decode 224 to the value indicating the extent of the shift. In the second cycle, the Decision Block 397 tests to see if the Odd Address Trigger is set, and if not, will cause the output of CPA 216 to be gated into the left half of Accumulator 217, the area which can be gated through Shifter 218 to an even numbered GPR. If the Odd Address Trigger is set, a Block 399 checks to determine if both the Arithmetic shift and the Left Shift Triggers are set, for if all three shift triggers are set, the output of CPA 216 is entered into both the right and left halves of Accumulator 217. If Block 399 is not set (N), only the right half of Accumulator 217 receives the operand. The right side always receives the operand for only the output of this side can be gated over Bus 333 to the odd numbered GPR Sink Register 202. The left half of Accumulator 217 receives the operand in an arithmetic left shift to enable an erroneous spill of a significant digit to be detected. Following the loading of Accumulator 217, FXOS 201 is advanced to the next instruction by stepping Ring 296 to the next stage and the Decrement RUA signal for the sink GPR 202 is sent to I Box 134 on Lines 341.

The Odd Address, Left Shift, and Arithmetic Shift Triggers are now decoded to reset the unused parts of the Accumulator 217 to 0's or 1's as required to fill in the vacated bit positions of the operand. As indicated on FIG. 21, if the GPR address is not-odd, Block 397 is N, and if the shift is to the left, Block 401 is Y, the right half of the Accumulator 217 is filled with zeros which will in part be shifted to Bus 331 for filling in the right end of the operand with zeros. When the GPR Address is not-odd, Block 397 is (N), and the shift is not-left, the above described replication of the sign bit in arithmetic shifts will properly fill in the vacated left end positions on Bus 331. For an Odd GPR Address, Block 397 is Y, and a not-left shift, Block 401 is (N), a test is made of the Arithmetic Shift Trigger, Block 402, and a negative operand trigger, Block 404, and if either Block is N, the left half of Accumulator 217 is set to all 0's, which will be shifted into the vacant spaces at the left end of Bus 333. This combination of settings for the shift means that either the shift is a right shift of an operand which is positive, or the shift is logical or both, and in either event the vacated positions are to be filled in with zeros. Only if both Blocks 402 and 404 are Y, is the left half of Accumulator 217 set to 1's, for in this arithmetic right shift of a negative operand in an Odd Address GPR, it is necessary to fill 1's into the vacated left end positions of Bus 333. For this shift, there is no automatic replication of the sign bit position since such replication can be only for an operand in the left half of Accumulator 217.

For the next step, the extent of shift is read out from the ICTR 348 and is sent over Bus 329 to the Shift Decoder 327 to set the Shift Gates 306, 309, 321 and 323 of Shifter 218, and simultaneously the output of Shifter 218 is gated to Busses 331 and 333. In the last cycle, the operand on the Bus 331 or 333 is gated into the odd or even sink GPR 202 and all controls are reset to terminate the operation.

FIG. 23 shows the operation cycles to shift a double word. This operation requires fewer control decisions since there is no question of whether it is the right or the left half of the Accumulator 217 which is to receive the GPR data since both halves of Accumulator 217 are to participate in the shift. As indicated, in the first cycle the even-odd pair of GPR's containing the double word operand are selected for gating to the output Busses 225 and 226, the Triggers for double word shift, left shift, and logical shift are set as required by the instruction, and the selected even numbered GPR 202 is grated to the B Bus 226 and CPA 216, while the length field of the instruction is gated to the ICTR 348. In the second cycle, FXOS 201 is stepped by advancing Ring 296 to the next position. The output of CPA 216 is gated into the left half of Accumulator 217 and at the same time the selected odd numbered GPR 202 is gated to B Bus 226 and entered into CPA 216. In the third cycle, the output of CPA 216 is gated into the right half of Accumulator 217 so that the entire double word is now in Accumulator 217 ready for passage through the Shifter 218. Also in this cycle, a test is made of the setting of ICTR 348 to detect a shift length of greater than 32 denominational orders. If the block 405 is set to indicate a greater than 32 shift, the Shifter 218 is set for a 32 bit shift, its maximum, with the direction under control of the left trigger which would have been set for the right or left direction in the first cycle. In the next cycle, the output of Shifter 218 on Busses 331 and 333 is gated back into Accumulator 217, and since the shift is 32 bits, a right shift will put all significant digits into the right half of Accumulator 217, the left half being filled with zeros or ones as required by the arithmetic or logical character of the shift, or a left shift will put the low order 32 bits of the word in the left half of Accumulator 217, the right half always being filled with zeros. The ICTR 348 will be decremented by the 32 bit extent of the shift and the remaining amount in ICTR 348 will be decoded to reset the Shifter 218. If the original shift extent is less than 32 bits, the above 32 bit shift cycle is omitted and the setting of ICTR 348 is directly decoded to set the gates of Shifter 218. In either event, the output of the Shifter 218 is placed on Busses 331 and 333, but is blocked from entering the selected GPR's. The DECREMENT RUA signal for the sink GPR's 202 is sent on lines 341 to the I Box 134. In the final cycle, the data on Busses 331 and 337 is gated into the sink GPR's and all controls are reset.

*Binary-decimal conversion operations*

There are two instructions for conversion operations, Convert to Binary (CVB), and Convert to Decimal (CVD). In Convert to Binary a 64 bit word representing 15 decimal digits in a four bit BCD code and an appended four bit sign character is converted to a binary notation in a word of 31 binary bits and a leftmost sign bit. The algorithm is conventional in that the highest denominational decimal digit in its BCD code is entered from the four leftmost bit positions of of the FC Buffer 206 over a four bit Bus 408, through a BCD Decoder 409 and over Busses 410 and 411, into both the right and left inputs of CPA 216. On the successive CVB iteration cycles, the output of the CPA 216 is gated into the left half of Accumulator 217 and is thereupon gated back over a Bus 406 into the left input of CPA 216 with a three binary denominational shift to the left, and is also gated over Bus 376 into ther ight input of CPA 216 with a one denominational order left shift, in effect multiplying the CPA 216 output by both eight and two which when added together provide a 10's multiple of the operand at the output of CPA 216. At the same time, the next BCD decimal digit which has been shifted into the four leftmost positions of FC Buffer 206, is converted in BCD Decoder 409 and is sent on Busses 410 and 411 into the inputs of CPA 216, a decimal number from 0 to 7 being passed directly as the unconverted BCD value over a three wire Bus 410 into the three lowest orders of the left input of CPA 216, a decimal 8 being converted into a BCD seven (111) which is sent over Bus 410 into the left input of CPA 216, plus a signal representing a one (1) on a line 410 going into the lowest denominational order of the right input of CPA 216. For a BCD value of nine (1001) the above inputs for an eight are signalled and the "Hot One" line into CPA 216 is also activated.

Such multiplication of the old balance by 10 and the simultaneous addition of the next decimal digit continues until the addition of the last decimal digit to the old balance, at which time the output of CPA 216 represents the converted binary value and is passed through Shifter 218 to the sink GPR 202. There is a limit as to the value of the decimal digit which can be successfully converted by this process as only 31 binary bits, representing in binary a maximum decimal value 2,147,483,467, can be stored in a GPR, or, since the 32nd bit can be a sign bit, a negative minimum of −2,147,483,468 can be stored. Any attempt to convert a larger decimal value to binary will result in the loss of the higher bits of the binary value, only the lowest 32 bits being saved, and will cause an error signal to be transmitted.

The flow charts FIGS. 24, 25 and 26, show the controls and interactions for the Convert to Binary Operation. At the start, the FXPU 143 sends a request to FLPU 142 for the 64 bit packed decimal data word stored in the identified FLB 185, and when the data is returned on Bus 199, FIG. 6A, it will be stored in FXB's 206 and 207, the high order part being stored in FXB 206, and the low order part in FXB 207, the sign character being in the right hand four bits of FXB 207. ICTR 348 will be set to a binary value of 15, and the left half of Accumulator 217 will be reset to all zeros. On the second cycle, if the requested data is available on Bus 199 it will be gated into FXB's FC and FD, 206 and 207, whereby Block 415 will be set Y to enable the next cycle, but, until Block 415 is set, the system enters the wait loop in which FXOS 201 is stepped to the next instruction to enable a test for a possible overlapped operation.

As soon as data has been transferred to FC and FD, the system will step FXOS 201 if it had not previously gone through the wait loop, and will set the Data Available Signal enabling the rest of the instruction to proceed. The highest decimal digit, i.e., the first 4 left bits in FXB 206, is gated out on Bus 408 to the CVB Decoder 409 for latching therein. Next, the eight bit byte containing the utilized decimal digit and the next decimal digit is gated from FXB 206 on Bus 233 to the input of VFL Unit 212 where it will be skewed left four bits and sent back over Bus 234 to the input gates of the leftmost byte position of FXB 206. Each successive byte position to the right in FXB FC and FD will, on successive pairs of iteration cycles, first be gated on Bus 233 through Logic Unit 212 and Bus 234 to the left byte position of FXB 206 and on the next cycle gated from the left byte position of FXB 206 to Bus 233, passed with a left shift of four bits through Logic Unit 212 and over Bus 234 into the left byte position of FXB FC so that on each iteration cycle, the next four bits to the right can be gated out to Bus 408. The data in the left half of Accumulator 217 is gated out over Bus 406 with a left shift of 3 binary orders to T/C Side 231 which is gated for true entry into the left input of CPA 216, while the same value is gated out over Bus 364 with a left shift of one and supplied to the right input of CPA 216. The flow chart control now proceeds to entry B, FIG. 25. The CVB Decoder 409 has in the meantime tested the decimal digit to see if it is equal to or less than 7, Block 416, and if so will send the three low bits of the decimal number on Bus 410 to the three right inputs of T/C Side 231. If the digit is an eight, Block 417, all lines of Bus 410 will be given a signal and a one bit signal will be sent over Line 411 to the right input of CPA 216. If the digit is a nine, Block 419, the same signals will be sent on Bus 410 and Line 411 as for an eight, and a "Hot One" will be inserted into the lowest order carry entry position. The output of CPA 217 will represent 10 times the value previously present in the left half of Accumulator 217, plus the last entered decimal value. If CVB Decoder 409 detects the presence of a four bit signal having a numerical significance greater than 9, it signals entry point D, FIG. 26, to initiate an error indicating execution stop.

When the digital inputs have been made to CPA 216, ICTR 348 is tested, Block 420, to determine if it stands at a value of two. If so, the highest fourteen decimal digits have been processed and the next numerical processing will be for the last decimal digit. At this time the operation proceeds by processing the sign position for the normal ending routine. In the normal processing Block 420 is not set (N) and ICTR 348 will be tested, Block 421, for a value of one. If the one is found, the conversion is finished and the end of execution can be initiated by a signal to entry C, FIG. 26. Normally, however, ICTR 348 will not be at one and the system proceeds to the next iteration cycle. In this cycle the next four bits of the decimal number are gated from Bus 234 into the left four bit positions of FXB 206 and the output of CPA 216 is gated into the left half of Accumulator 217 while ICTR 348 is decremented by one, and the operation returns to entry point A, FIG. 24, where ICTR 348 is checked for a count of one, Block 421. If ICTR 348 is not one, the next four bits of the decimal number will be cycled into the Bus 234 in preparation for entry into the high order end of FXB 206. In any event, the system will perform another or the last iteration cycle by entering ten times the value in the left half of Accumulator 217 together with the converted decimal value in CVB Decoder 409 into the inputs of CPA 216.

Referring now to FIG. 25 for the ending routines, the Y output of Block 420 is a normal ending transfer and is reached when ICTR 348 contains a value of two so that the next iteration is the last arithmetic cycle. The controls have already cycled the lowest byte (8 bits) from FXB 207 through VFL Logic Unit 212, and Bus 234 into the left end of FXB 206 so that the sign of the decimal number is on the four low order bits of Bus 233 and can be examined by a Digit and Sign Decoder 466, FIG. 30. If the four bits of the sign character have a significance as a decimal digit of less than 10, Block 423, there is an error, since all signs of decimal numbers must have a combination of bits which expressed decimally is from 10 to 15 inclusive, and detection of a sign group of a lower decimal significance will cause a transfer to entry D for an error termination. In the usual case, the sign group is tested, Block 424, for a negative sign, either an 11 or a 13 (Bits 1011 or 1101). Whether the sign is positive or negative, there is a transfer to the next machine cycle during which the CVB sign will be set negative if the detected sign was negative, and a transfer will be made back to enter the four bits from Bus 234 to the left end of FXB 206 for the last iteration loop.

When the entry to FIG. 26 is made at entry C, all arithmetic operations have been performed and the result is to be stored in the GPR 202 identified in the instruction as the sink. The first step is to check for a negative sign for the decimal operand by testing the CVB sign negative indicator which would have been set in the last iteration. If it is set, on the next cycle, ICTR is decremented to zero and the output of CPA 216, the true binary equivalent of the magnitude of the decimal operand is gated into the right half of Accumulator 217, and from there over Bus 376 to T/C Side 231, which will be set to complement and the "Hot One" inserted into CPA 216. The DECREMENT RUA signal for the sink GPR 202 is sent to I Box 134 on the appropriate line 341 and the FXB Busy Trigger is reset. On the last cycle, the output of CPA 216, which is now the complemented binary representation of the initial decimal operand, is transferred to the sink GPR 202, and all controls are reset to end the operation. For a positive decimal sign, the complementing cycle is skipped and the instruction transfers directly to the DECREMENT RUA, etc. point to thereafter transfer the output of CPA 216 directly to the Sink GPR and reset the controls to terminate the operation.

As was noted earlier, there is a maximum decimal value which can be converted into 31 or fewer binary bits (the 32nd bit position is for the sign) and an attempt to convert a larger decimal number will result in an overflow signal. This signal will be given whenever the carry mechanism of CPA 216 generates a signal indicating a carry-out of the 31st binary order into the 32nd binary order during the CVB operation for such a signal means that the capacity of the storage GPR is already exceeded and the converted value is erroneous.

The other convert operation is the conversion from a number expressed in binary notation to the same number in a decimal notation and is the CVD (Convert to Decimal) operation. The algorithm used is to start at the most significant binary denomination and enter the bit at this position into the units order of a decimal accumulator. Then the value in the accumulator is doubled and the next most significant binary bit is added into the units order, etc., until the last binary bit is entered and the decimal accumulator contains the original binary value expressed decimally in a BCD notation. In the present embodiment the CPA 216 and Accumulator 217 are converted into a decimal radix adder by the use of an Over 4's Decoder 426 which detects in any group of four bit positions which represent a binary coded decimal digit in the left half of Accumulator 217, the representation of a decimal value which is five or more, i.e., a set four bit latch with any set lower bit latch or a set eight bit latch. Upon detection of a five or greater, a signal representing a six (0110) is sent on the corresponding four lines of a Bus 427 to the T/C Side 231 to become the left input of CPA 216. At the same time, the value representations in the left half of Accumulator 217 are supplied to the right input of CPA 216 with a left shift of one denomination, in effect, doubled. As is well known, such left shift of one order will effectively double the decimal value but will result in an improper BCD value in any four bit group which before doubling contained a decimal representation of five or more. The addition of the correction factor of six in each such order brings the representation to a proper decimal digit and provides correct carry signals into the next decimal order.

An improvement in the algorithm to reduce the number of machine cycles required comprises shifting into the left half of Accumulator 271 during the first arithmetic cycle, the four bit group containing the most significant digit of the binary number to be converted. Since the actual number to be converted is the magnitude of the binary number, the sign being saved as will be later pointed out, the highest denominational four bit group can contain a maximum representation of seven (0111) for a positive number, or a maximum representation of eight (1000) if the number were negative. In either case, four entries of the highest bits with intermediate doubling could not generate a decimal value greater than the seven or eight and no correction cycle with a six entry could have been required. These four bits can therefore be entered at one time and three machine cycles saved. It will also be clear that if the most significant group of four bits does not contain a significant binary digit, and if the next lower group of four bits does not contain a value greater than nine, an additional shift of four bits making a total shift of eight binary denominations can be made without entering an improper decimal representation into the lowest order four bit groups of the decimal accumulator. This shift may be increased by four binary denominations for each consecutive group of four bits to the right so long as the next group of four bits having a significant bit does not represent an improper BCD number. The leading string decoder 379, FIG. 6B, is used to decode for such leading strings of four non-significant digits and will test the groups from orders 0–4, 5–8, 9–12, etc., to indicate the number of groups of four zeros or four ones present at the left end of the binary number. It will be noted that the first group is five bits wide and that each group tested includes the leftmost denomination of the next lower group of four bits. The inclusion of the highest denominational bit of the next lower group of four is to prevent the entry of an improper BCD number into the denominations representing the units denominational order, a number of eight or nine being considered improper to simplify the decoding logic. Actually the test should be for the joint presence of the four bits of a group being either an all zero or an all one condition, and in the next lower four bits the lack of the combination of a significant eight bit with either a significant four or a significant two bit. The highest order group is made five bits wide to prevent the shifting of more than four denominations when the maximum negative number (1.000 . . .) is being converted.

The sequence of operations for the CVD instructions is shown on the flow charts FIGS. 27, 28 and 29. At the start, the designated source GPR 202 is gated out on A Bus 225 to the T/C Side 231, and ICTR 348 is set to a value of 28. Also the identification of the SAR 241 containing the Storage address at which the resultant BCD value is to be stored is fetched from the FXOS 201 Instruction Buffer and is retained in an SAR Name Register 467, FIG. 30. The sign of the operand on the A Bus 225 is detected in T/C Side 231 and if the sign is negative, Block 428, the operand is passed complementally through T/C Side 231 and through CPA 216. If the sign is positive, the operand passes true to the output of CPA 216. In the next cycle for either case the sign of the operand is preserved in a sign trigger 430, FIG. 6B. The DECREMENT RUA Signal for the GPR 202 is sent to the I Box 134 on the appropriate line 341, FIG. 4B, and the output of CPA 216 is gated into the right half of Accumulator 217 with the left side of the Accumulator being set to zeros. The Shifter 218 is set for a left shift of four and Leading Strings Decoder 379 tests the value in the right half of Accumulator 217 for a leading string of 5, 9, 13, or 17 non-significant bits as above noted. At the end of this cycle FXOS 201 is stepped to enable decoding of the next instruction for a possible overlapped operation.

The third cycle tests the Leading Strings Decoder 379 and if a leading string of 17 zeros or ones were found, sets the Skip 4 Trigger, if a string of 13 zeros or ones were found a Skip 3 Trigger is set, while if the string is 5 zeros or ones, the Skip 1 Trigger is set, and for all branches the control signals pass to entry point A, FIG. 28. At entry point A, FIG. 28, the output of Shifter 218 on Busses 331 and 333 is gated into the Accumulator 217 and under control, Block 431, of the saved binary sign bit in Binary Sign Trigger 430, the sign of the decimal number is put into the four right end bits of the right half of Accumulator 217.

There are two different numeric codes in general use for expressing decimal digits and they have different combinations of bits in the four right hand positions of the decimal word to indicate the sign of the number. The two codes are the "Extended Binary Coded Decimal Interchange Code" (EBCDIC), and the "American Standard Code for Information Interchange" (ASCII), where the positive and negative signs are 1100 and 1101 for EBCDIC, and 1010 and 1011 for ASCII, respectively. The particular code which the present system is using is indicated by a bit trigger set in the PSW Buffer 1006 in I Box 134, see FIG. 58, and having its setting transferred to FXPU 143. Referring again to FIG. 28, the saved binary sign in Trigger 430 and the EBCDIC-ASCII signal from I Box 134, control the Force Decimal Sign Unit 432 to put the appropriate sign signals on the four right hand lines of Bus 333 for entry in the four right positions of the right half of Accumulator 217.

After the Shifter Output Busses 331 and 333 are gated into Accumulator 217 to shift the binary value four orders to the left and to enter the correct sign character into the four right hand orders, the Skip 1, Block 434; Skip 2, Block 435; Skip 3, Block 436; and Skip 4, Block 438; are tested in sequence to detect if one has been set, and if one has been set, to set the gates of Shifter 218 for a left shift of four, eight, 12, or 16 denomination positions, respectively, or if none was set, to signal entry point C, FIG. 29. If a Skip Trigger has been found set, the next cycle resets the Skip Trigger, gates the Busses 331 and 333 back into Accumulator 217 to effect the left shift and resets the ICTR 438 to 24, 20, 16, or 12, to reflect the number of iterations saved by this left shift and the control transfers to entry point B of FIG. 29.

The first part of the operation following entry to FIG. 29 is the same for entry points B or C, and comprises setting the Shifter 218 to shift the right half of Accumulator 217 one denomination to the left and back into the Accumulator 217, one bit thereby being shifted into the left half of the Accumulator. Before this shift of the right half is completed, the left half of the Accumulator 217 is shifted out with a one denomination left shift on Bus 364 into the right input of CPA 216, and simultaneously the Over 4's Decoder 426 transmits the needed corrective sixes to the left inputs, T/C Side 231, of CPA 216 for any groups of four bit positions of the left half of Accumulator 217 which had contained a representation of a decimal number of five or more. If ICTR 348 has not been decremented to zero, Block 439, the next cycle is started to first decrement ICTR 348 and to then gate the outputs of Shifter 218 back into Accumulator 217, and also gate the output of CPA 216 into the left half of the Accumulator. It should be noted that the least significant denomination from CPA 216 will always be a zero in this CVD operation for the output represents a doubled value and will be an even number. The input from Bus 331 will be all zeros except for the least significant bit position which may have a signal representing a one bit. The ORing of the two signals will insure that this bit position will be set to a one if such a signal is transmitted over Bus 331. This completes one convert iteration and control is transferred back to entry B for another iteration. When ICTR 348 has been decremented to zero, Block 439, the next cycle starts the terminating routine in which the CVD Fixup controls are set. In the succeeding cycle, the availability of the SDB 244 which is to receive the converted decimal number is checked, Block 440, and until it is available the FXPU waits. After the SDB 244 is available, the I Box 134 priority is checked to insure that the Storage Bus 197 is free, and as soon as the Bus is free, the FXPU gates out the left half of Accumulator 217 containing the four bit groups representing the BCD digits and the leftmost four bits of the right half of the accumulator which, as a result of the shifts, now holds the sign bits originally inserted into the right end of the Accumulator. The converted decimal number with its sign is transmitted over a Bus 442 to the Storage Bus Ors 221, where the remaining higher digits are set to zeros, and the entire 64 bits are sent to the SDB 244 for subsequent storage. In the next cycle all controls are reset to terminate the Convert to Decimal operation.

*Multi-OP instructions*

There are two fixed point instructions which require more than one OP code in FXOS 201 to perform the instruction which is received by the I Box 134. For these instructions the I Box generates a sequence of micro-orders, each micro-order to perform one phase of the instruction. The first such instruction to be considered is Load Multiple (LM) which instruction will cause the moving of a block of data from consecutive storage addresses into the group of consecutively numbered GPR's 202 starting with the one named in the instruction. The I Box will first fetch from the first storage address the double word containing the first word to be stored in the named GPR, and will direct it into an FLB 185, FIG. 5. The I Box 134 will call for a fetch of the double words at succeeding addresses until either the FLB's 185 are all being utilized or the required words are fetched. Any initially unfetched words will be called for as soon as an FLB is free to receive it. The first micro instruction in FXOS 201 will call for a double word to be transferred from the named FLB to a pair of FXB's, either 204–205 or 206–207 and will identify the GPR 202 which is to receive the first 32 bit word. As the word to be loaded can be in either the 0 to 31 bit number part of the double word, or the 32 to 63 bit number part of the double word, the first instruction will also contain an indication that it is the first instruction (Bit 14 set) and that either both parts of the word, or just the low order half (Bit 13 set) are to be loaded into GPR's. If both halves are to be loaded, the high order or left half is first loaded into the named GPR whose address has by now been loaded into GPR Address Register 228, while if only half is to be loaded, the low order or right half is loaded into that GPR. On the next machine cycle, if Bit 13 is not set, the GPR Address Register 228 is incremented to name the next numbered GPR and the remaining half of the first double word is loaded into that GPR. If Bit 13 is set or after the second cycle with Bit 13 not set, on the next cycle, the next micro-instruction in FXOS 201 will be executed by transferring the next named FLB's data into the other pair of FXB's and then loading the left half of that next word in this other pair of FXB's into the next GPR, and on the next cycle the remaining half into the succeeding GPR. Simultaneously the next double word will be fetched from the next identified FLB. The GPR Address Register 228 will be incremented on each cycle to name the next GPR to receive a word, it being understood that the Register 228 will wrap around from 15 to 0.

Each instruction in FXOS 201 can thus load two GPR's 202 with either one or both halves of the first double word, and with both halves thereafter until the last Load Multiple micro-instruction. This last instruction (Bit 15 is set) can load either the high order half of the data in the FXB's or can load both halves, a set bit in the instruction (bit 12), indicating that only the high order 32 bit word is to be loaded into a GPR 202. After the proper number of loads required by the last instruction have been made, the FXPU resets itself and steps FXOS 201 to the next instruction.

On each cycle wherein a GPR is loaded, the corresponding DECREMENT RUA signal is sent to I Box 137 on lines 341. Data is fetched alternately into the FXB pairs 204–205 and 206–207 from the FLB's and is outgated in the order 206, 207, 204, 205, 206, 207, etc., to load the GPR's in the proper order. As soon as the both parts of data in a pair of FXB's have been loaded, another fetch of a double word from the next FLB is initiated. Consequently, after an initial delay of two cycles for the first fetch from an FLB, data can be loaded into the GPR's at a maximum rate of one word per cycle. Delays can be caused by the I Box having priority for storing into a GPR, lack of available data in the FLB's, or disruption in the issuing of micro-coded Op's from I Box 134 to FXOS 201. During the last machine cycle, FXB NOT BUSY Signals for FXB's 204, 205, 206, and 207 will be sent to I Box 134.

The data path for words from an FXB is from the FXB outgates to Busses 344 and 345, the high order half of the word to Bus 344 and the low order half of the word to Bus 345 and these Busses are gated true into T/C Side 231 of CPA 216. From the output of CPA 216, the word will be gated into the left half of Accumulator 217 for transfer straight through Shifter 218 to Bus 331 for gating to an even numbered GPR 202, or from the output of CPA 216 to the right half of Accumulator 217, and straight through Shifter 218 to Bus 333 for gating into an odd numbered GPR. The single LM instruction is thus broken up into a number of micro-instructions each of which will cause transfer of two words from storage (in an FLB 185) to two GPR's. As above noted, the first and last micro-operation may cause transfer of only one word if the group of words to be loaded starts or ends in the middle of a double storage word. The determination of the last micro-instruction and whether one or two words are to be stored thereby is under control of a counter in the I Box 134 which is set to the number of the first GPR to be loaded as given first in the instruction, and is incremented by one or two for each micro-instruction issued until the I Box 134 determines that the next micro-instruction to be issued shall be the one to load the last GPR, i.e., the GPR number given second in the instruction, and this last micro-instruction will be set to cause either one or two words to be loaded.

The other multi-operation instruction is Store Multiple (STM) which when decoded in I Box 134 will be issued as a series of micro-instructions, each to transfer a pair of words from an even-odd pair of GPR's over the A Bus 225 and B Bus 226 to the Store Bus ORs 221, for transmittal over Bus 197 to an SDB 244, FIG. 7. If the first GPR to be stored is an odd numbered one, both it and its lower numbered even GPR are gated out to the Busses 225 and 226, but the I Box 134 will have notified the SAR 241 for this SDB that only the right word of the double word is to be stored. Each micro-instruction thereafter will store two GPR's into an SDB for storage in Main or Extended Main Storage until the I Box determines, in the same manner as for loads, that the next micro-instruction will be the last one required by the original instruction, and will so tag the instruction (Bit 15 set), together with a tag bit (Bit 12 set), to indicate that only the even numbered GPR is to be transferred if it is the one named in the instructions as the last GPR to be stored. Here again the SAR 241 for the SDB 244 receiving the data from both the even-odd pair of GPR's is notified that it is to store only the left half of the double word received.

The DECREMENT RUA signals for the registers being stored are sent to I Box 134 on Bus 341 with two signals for operations storing two GPR's, but only one DECREMENT RUA signal is sent to the RUA Counter for the GPR actually being stored if the micro-instruction is for only one GPR to be effectively stored, even though both GPR's are outgated to the SDB 244. The GPR's will be stored at a rate of one machine cycle for each micro-instruction which can store the data in either one or two GPR's per cycle. Delays in such store processing can be caused by a condition in I Box 134 which delays issuance of the micro-instructions in view of higher priority operations, and also by unavailability of SDB's 244 to receive the GPR data.

*VFL execution unit*

The Variable Field Length Execution Unit (VFLEU) may be considered to be the group of units which works in the FXPU 143, FIG. 6, to control and execute the following instructions:

| Mnemonic | Instruction | Format |
| --- | --- | --- |
| NI, NC | And | SI, SS |
| OI, OC | Or | SI, SS |
| XI, XC | Exclusive Or | SI, SS |
| CLI, CLC | Compare Logical | SI, SS |
| MVI, MVC | Move | SI, SS |
| MVN | Move Numerics | SS |
| MVZ | Move Zones | SS |
| TR | Translate | SS |
| TRT | Translate & Test | SS |
| ED | Edit | SS |
| EDMK | Edit and Mark | SS |
| MVO | Move with Offset | SS |
| PACK | Pack | SS |
| UNPK | Unpack | SS |
| TM | Test under Mask | SI |
| TS | Test and Set | SI |
| SSM | Set System Mask | SI |
| WRD | Write Direct | SI |
| RDD | Read Direct | SI |
| IC | Insert Character | RX |

An SI instruction is one which specifices an operation to be performed on two operands, each of one byte length.

The first operand is at the storage address specified in the instruction, and the second operand is an eight bit immediate data byte transferred from the instruction in the I Box 134. The SS format is for performing operations on variable length operands wherein both operands are fetched from storage, a double word at a time, the operation is performed on the operands one byte from each operand at a time and when the last byte of the double word of the sink operand is processed, the result is restored to the storage location from which the sink operand was received and the next double word of the sink operand is fetched.

For the source operand, the entire double word containing the first byte address is fetched, but processing starts with the byte addressed. As soon as the last byte of the double word is processed, processing of the double word from the next sequential storage address is started and processing continues until the last byte has been processed.

The variable field length operations are for non-arithmetic operations on data which is generally mixed alphabetic and numeric although some, such as the PACK and UNPACK instructions, work with decimal numbers but change only their written format, not their numeric value. Generally, the operands are treated by eight bit bytes, although in a few instances, the right or left half of a byte may be treated separately. Processing may start at any byte position and proceeds from left to right in contrast to the processing of operands in a GPR where the processing involves the entire contents of the GPR. As the length field in any VFL instruction is limited to eight bits, the maximum length of a VFL word is 256 bytes, for the system always processes one more byte than the value set out in the length field which has a maximum numerical value of 255. Operations which introduce data from the instruction stream into the VFLEU as an Immediate Data operand, i.e., SI Format instructions, are restricted to an eight bit byte from storage to be processed with the eight bit byte from the instruction stream.

The Editing operation is one of the special numeric instructions and starts with a pattern field and packed decimal field wherein each byte represents two decimal characters and processes the operands to unpack the digits to one digit in each byte together with zone bits and inserts non-significant symbols and punctuation marks where appropriate. The PACK and UNPACK instructions also operate on words of decimal characters to change from one format to the other. In other operations no internal data structure is required and all bit configurations are considered valid.

The SS type instructions are micro-coded by I Box 134 into one or more micro-instructions. For the instructions TR, TRT, ED, EDMK, PACK and UNPK, there is an I Box dependency in that I Box 134 cannot process other instructions until the VFLEU reaches certain specific points which for TRT, EDMK and also SSM and RDD is the end of execution of the instruction. All SS instructions require the use of the four FXB's 204, 205, 206, and 207. The other VFL instructions use only one FXB except for instructions MVI and RDD which do not utilize the FXB's. The SS format instructions are microcoded by the I Box 134 into one or more micro-instructions which may have one of several different formats, the selected format being dependent on the instruction. The mico-instructions are shipped to FXOS 201 for buffering.

As previously noted, an FXOS 201 buffer Register is 24 bits wide and the bit positions are divided into six groups which are:

Bits:              Function

0–7 _____ Instruction Code.
8 _____ Not used in VFL Operations.
9–11 _____ FXB Address of Source Operand.
12–15 _____ Control bits—to be described.
16–18 _____ FXB Address of Sink Operand or Sink Operand Starting Byte Address.
19–20 _____ SAR Name Tag.
21–23 _____ CO, F/E, CC Tags previously described.

Generally all necessary information for a VFL instruction is derived from the micro-instruction in FXOS 201, but some instructions, as TR, TRT, etc. need additional information about data field length, argument bytes, terminations, and interlocking and the additional information supplied will be described with the flow charts of the specific instructions.

The structure of the FXPU 143 which is primarily utilized in the execution of VFL instructions and hence may be considered to be the VFLEU is shown in detail in FIG. 30. In this figure the FXB's FA–FD, 204, 205, 206, and 207, and VFL Logic Unit have previously been described with reference to FIG. 6, but are duplicated herein to more clearly set out their cooperation in VFL instruction executions. The FXB's 204 and 205, FA and FB can be utilized alone as 32 bit buffers but can also be considered as a single 64 bit buffer when double words are being stored from Bus 199. Likewise the FXB's 206 and 207, FC and FD can function alone for word buffers or can be combined as a 64 bit double word buffer. The FA–FB Buffers 204 and 205 are gateable by bytes to the VFL Sink Bus 232 and FXB's FC and FD are similarly gateable to the VFL Source Bus 233.

The VFL Logic Unit is supplied by the Sink Bus 232 and the Source Bus 233 and has the capability of performing an AND, an OR, or an EXCLUSIVE OR function on the two input bytes on Busses 232 and 233 and it can gate either half of one input byte and the other half of the second input byte to the Output Bus 234. It can also generate parity for the output byte. The Immediate Data Register 213 is an eight bit Buffer which can outgate its stored operand to either Bus 232 or 233 for entry in either input of Logic Unit 212 and can be set by either the output of VFL Logic Unit 212 over the VFL Result Bus 234, or by a Bus 451 connected to bit positions 8 through 15 of the FXOS 201 Buffer which is controlling the VFLEU. The VFL Logic Unit 212 has its output feeding the VFL Shifter 452 and the Skew Register 453 with the outputs of Shifter 452 and Skew Register 453 being combined on the Result Bus 234 which in addition to its connection to the Immediate Data Register 213, can also be gated into any bit position of the FA, FB, FC, and FD FLB's 204, 205, 206, and 207. The data on either input Bus 232 or 235 can be passed through Logic Unit 212 unchanged by the usual expedients of setting the Unit to an OR function and holding open the input gates from the other bus.

The Ending Byte Address Unit is used to determine the address of the last byte of a VFL word being processed, and can be used in conjunction with bit 15 of the FXOS 201 instruction being executed to determine the end of a VFL operation. Bit 15 is one of the control bits of the FXOS Buffer Registers and for a VFL operation is set to indicate the last instruction of the multi-operation instruction which will then be terminated when the byte addressed by the Ending Byte Address Unit is processed. This Ending Byte Address Unit consists of a three bit Adder 455 and an Ending Byte Address Register (EBAR) 456, together with a Compare Unit 457. On the first micro-instruction of a multi-op instruction, the Byte Address Register 458 for the FA–FB FXB's is set over a Bus 459 by bits 16 to 18 of the FXOS 21 being decoded to the three bit byte address of the first byte to be processed from the Buffers FA–FB 204 and 205. At the same time, the length field from the instruction being decoded in I Box 134 is sent on a Bus 460 to a Source Length Counter 461 which will be set thereby to a value of one unit less than the number of bytes to be processed. The three low order bits from Source Counter 461 are sent on a Bus 463 to one input of Adder 455 which also receives the starting address in BAR Counter 458 on Bus 464 at its other input. The three low order bits of this sum with carry out neglected are the byte address of the last byte to be processed and are stored in EBAR 456. Assume for example that the starting byte address is 3, 011 in BAR Counter 458, and that the length field specifies some number of full words and ends in 100 (4) meaning that the full words and five more bytes (one more byte than the numerical value of the length field) are to be processed. The output of Adder 455 will be 111 (7) the address of the last byte, for bytes 3, 4, 5, 6, and 7 would be processed in addition to the required number of full words. When the microinstruction being executed has its bit 15 set, the address of the byte being processed from BAR Counter 458 on Bus 464 and the address stored in EBAR are continuously compared in the Ending Byte Address Compare Unit 457. When the two inputs are equal, Unit 457 sends a signal to terminate the execution operation.

The VFL Shift Register 452 is used in the MVO instruction and in the decimal handling instructions ED, EDMK, PACK, UNPK. It has the limited shifting ability of gating the high order four bit digit (HOD) of the output of Logic Unit 212 to either the high order four bits or the low order four bits of VFL Result Bus 234, and can also gate the low order four bits digit (LOD) of the output of Logic Unit 212 to either half of the VFL Result Bus 234. Thus the two digits of the output of Logic Unit 212 can be gated directly to the Result Bus 234, or can be gated with the two digits of the output crossed to the Result Bus 234. Obviously, either digit of the output can be gated individually to either half of Result Bus 234.

The Skew Register 453 is a four bit register which can store either the high order digit HOD or the low order digit LOD of the output of Logic Unit 212, and can outgate the stored digit to the low order half of Bus 234.

The VFL Logical Compare Unit 465 is connected to the VFL Sink Bus 232 and to the VFL Source Bus 233 and functions to compare the values on the two Busses. It can signal that the two Bytes are equal or that the sink byte on Bus 232 is greater than, or is less than, the source byte on Bus 233.

The SAR Name Register 467 retains, until a store operation is needed, the name of the Storage Address Register 241 in MSCE 136 which holds the storage address into which the next word is to be stored, and thus identifies the Storage Data Buffer 244 in which the word is to be buffered until the storage is ready for it.

*Execution of VFL instructions*

The instructions XC, OC, NC, MVZ and MVN comprise a group of operations which are always of the sink and source type. The difference between these operations is entirely in the processing performed in the VFL Logic Unit as the bytes pass through. In every case, the double word having the sink starting byte is transmitted from the proper FLB 185 to FXB's FA, FB, 204 and 205, and the address of the first byte is stored in BAR A–B Counter 458 and the double word having the source starting byte is transmitted from another FLB 185 into FXB's 206 and 207 and the starting byte address is stored in the BAR C–D Counter 468. The starting byte of each operand is gated out on Busses 232 and 233 to the VFL Logic Unit 212 where the processing is performed and the result gated out on Result Bus 234 back into the same byte position of the sink FXB 204, 205. When the source operand has been utilized as indicated by outgating byte seven from FXB 206, 207, a new source operand is obtained from the same FLB 185 as was originally used for the source operand, the I Box fetching the next operand as soon as one is sent to the VFLEU. When the last byte of the sink operand is processed, the sink word in FXB's 204 and 205 is transmitted as soon as possible to the assigned SDB 244 and a new FXOS instruction is decoded to fetch the next sink word and to name a new SAR 241. When the FXOS instruction has a set bit 15, it indicates that it is the last instruction to be issued and that the EBA Compare 457 should be examined every machine cycle to terminate the operation when the last byte is processed, i.e. when EBA Compare 457 shows an equal comparison.

The distinction between processing these instructions is that in the EXCLUSIVE OR instruction, (X) each output bit is the sum modulo two of the two corresponding input bits. In the OR instruction (OC) each output bit is the logical sum of the two corresponding input bits and in the AND instruction (NC), each output bit is the logical product of the two corresponding input bits. In the Move Zones instruction (MVZ), the four leftmost bits of the source operand byte and the four right bits of the sink operand byte replace the sink byte and the Move Numerics instruction (MVN) is just the opposite, the four lower bits of the source operand byte and the four left bits of the sink operand byte are combined in a byte which replaces the sink operand byte.

The flow chart for these five instructions is shown in FIG. 31. As shown, if the instruction is NC, OC, XC, MVZ or MVN, on the first cycle, the sink word is requested from the FLB 185 designated by I Box 134 to buffer the sink operand fetch from storage and identified in bits 16–18 of the instruction. In the next cycle the source operand is requested from the FLB 185 identified in bits 9–11 of the instruction and bits 19 and 20 are stored in the SAR Name Reg 467. The Ingate Counter 469 is set to zero. The BAR A–B and BAR C–D Counters having been set from the low orders of the I Box Address generators over Byte Address Buffer Bus 471, the outgates for the byte of FXB FA–FB (204, 205) addressed by BAR A–B Counter 458 and the outgates for the byte of FXB FC–FD (206, 207) addressed by BAR C–D 468 are opened to Busses 232 and 233 respectively and EBAR 456 is set. The control then transfers to entry point A which is the main starting point for processing. At this point we wait until both the FXB FA–FB and FXB FC–FD have an available sink and source operand respectively. As soon as both operands are available, their first bytes pass over Busses 232 and 233 to VFL Logic Unit 22 and then over Result Bus 234 back into the byte of FXB FA–FB addressed by BAR A–B Counter 458. Both Counters 458 and 468 are now stepped to outgate their next bytes on Busses 232 and 233 and control is passed back to entry A for an iteration cycle with the next pair of bytes. At one of these iteration cycles, the BAR C–D Counter 468 will be at a count of 7 indicating that the last byte of the source word will be the next byte to be gated out for processing. If at this time the sing FXB FA–FB has data available, and the next FXOS 201 position is full for the next micro-coded operation, the last source byte will be processed in the next cycle. The next source word is then called for from the FLB 185 identified in the next instruction word in FXOS 201 as holding the next source word and control is transferred back to entry A, which will hold up processing after this last byte is used, until the next source operand is returned to FXB's 206, 207.

There will also be a time when BAR A–B Counter 458 will stand at seven indicating that the next cycle will process the last sink byte. If data is available in the source word so that the processing of the last byte can be done, and an SDB is available to store the old sink operand, the next sink operand is fetched from the FLB 185 into which it has been buffered by the I Box 134, and whose address is in the next instruction of FXOS 201 which is already being decoded in Op Decoder 224, FIG. 6A. The sink operand in FXB 204, 205 is gated out on Bus 472 to the Storage Bus Or's 221 for transmission to the SDB 244 corresponding to the SAR named in SAR Name Register 467. The old Op is now completely utilized and FXOS 201 is stepped to the next micro-instruction, to assign a new SAR 241 and name the FXB for the next sink operand. Processing will continue from entry A as soon as the called for fetch is returned.

During the processing of the last pair of bytes EBA Compare has signalled equal and the last FXOS 201 instruction had a set bit 15 to indicate that it was the last instruction of the string, so that the next signal to entry A should start the termination of the instruction rather than another processing cycle. In this end of instruction, the last sink operand is sent to the SDB 244 as soon as it can be sent and the condition code triggers are set if the operation was to set such trigger, all execution controls including the FXB Busy signals are reset and execution is terminated.

There is one condition which can cause interference between the sink and source operands and this occurs when the source operand byte is within eight bytes behind the sink operand byte for this means that at some time the processed operand will be entering into the sink word and the source byte should be gated out from the same word. Clearly as the sink word has not been stored yet, the store operand as fetched would not be the correct word. To correct for such a possibility, an address comparator in I Box 134 detects the condition where the sink address minus the source address is less than eight but not negative, and when this is detected will set bit 13 in the micro-instruction word to indicate an overlap condition. In such overlap condition, the processed byte is gated into the same byte position in the source FXB 206, 207 as it is stored in the sink FXB 204, 205 so that when it is later gated out as the source byte, it is the updated byte, not the earlier incorrect byte, which will be gated out. There is an Overlap Tag latch for each byte of the FXB 206, 207, and when a byte is gated in as above described during Overlap Condition, the tag is set on and will not be turned off until the byte has been used as the source byte in later processing. If a new source word is fetched into the source register, the new word will not be gated in to those byte positions having their overlap tags on, and thus the correct source bytes are not altered when a new source word containing incorrect bytes is fetched.

If the byte addresses are eight or more bytes apart, no overlap is possible for the interlocking controls in MSCE 136 will hold up a fetch from a storage location whenever there is an earlier unexecuted store instruction for the same address. This kind of overlap can also occur in the instructions MVC, PACK, UNPK and MVO. The CLC and TRT instructions cannot involve an Overlap Condition as the processed operands are not stored.

The Compare Logical (CLC) Instruction is used with the SS format to compare two operands for equality. Comparison is from left to right, and proceeds byte by byte until an inequality is found or the ends of the operands is reached. Operation is similar to the above VFL instructions with the exception that the VFL Logical Compare Unit 465 receives the operand bytes on the Sink and Source Busses 232 and 233, and there is no resultant byte for storage back into the sink FXB 204, 205.

The flow chart for the CLC instruction is shown in FIG. 32, where in the first cycle of execution of a CLC instruction, the sink operand is requested from the FLB 185 to which it was fetched by the I Box 134. In the next cycle, the source operand is fetched from its FLB 185, the Ingate Counter 469 is set to zero, the EBAR 356 is set to the Ending Byte Address, and control is transferred to entry point A. When data is available in both FXB's, the sink and source, the first byte of each operand is gated out to Busses 232 and 233 and to the Logical Compare Unit 465 which will then signal whether the sink byte is greater than, less than, or equal to the source byte. So long as the bytes are equal, Block 473, the next source and sink bytes are gated to Busses 232 and 233 by incrementing BAR Counters 458 and 468 and returning control to entry point A. The obtaining of new source and sink operands from the FLB's 185 is the same as for the VFL instructions above, but the sink operand in FXB's 204, 205, is not stored, and the normal end of operation occurs when a set bit 15 in the decoded FXOS instruction allows EBA Compare 457 to terminate the instruction when the address in BAR A–B Counter 458 compares equal with that in EBAR 456. The termination includes setting the condition code to the last output of Compare Unit 465. If, however, any two bytes do not compare equal in Compare Unit 465, control transfers to the left at Block 473, which sets the termination controls, sets a cancel mode device and sets the condition code in I Box 134 to the condition of the output of Compare Unit 465. In Cancel Mode, it is necessary to pass through the unexecuted ops of the instruction to cancel them and to request any unused sink and source operands then residing in the FLB's 185, thereby freeing the FLB's for other use. The execution controls may then be reset to terminate the CLC instruction.

Another VFL instruction in the SS format is Move Character (MVC) which will move the source word into the storage address of the sink word. In this instruction only the source word is fetched, and its bytes are successively passed through the VFL Logic Unit 212 and stored in the addressed byte locations of the sink FXB's 204, 205. When the sink FXB is full, the sink word is transferred to the SDB identified by the SAR Name Register 467. In this CLC operation, it is possible that there is a correspondence at the three bit byte address level between the sink and source addresses. If so, it is possible to transfer full double words at one cycle so long as the source to be transferred is that long. If parallel operation is possible, any odd bytes before the first full double word will be transferred to the sink FXB 204, 205 and stored, thereafter the incoming source words will be gated into FA–FB 204, 205 as well as into the source FXB's 206, 207, and will be immediately sent to the SDB for storage. This full parallel transfer will continue until less than a double source word is left, at which time the instruction will proceed by one byte operands until termination. This instruction does not set a condition code. This instruction can be so addressed that the address of the source operand byte is less than eight byte addresses behind the address of the sink byte, so that an Overlap Mode operation is possible as above described but this cannot occur if parallel mode is available.

The flow chart for this MVC instruction is shown in FIG. 33 where on the first cycle, the first source operand is requested from FLB 185, Ingate Counter 469 is zeroed, the Ending Byte Address is determined and set into EBA Register 456, and a test is made of the byte addresses and length fields to see if any parallel mode processing can be done. When the source operand is returned to FXB 206, 207, processing begins with a test for parallel mode, Block 475, which can only be set when BAR A–B Counter is equal to zero. If parallel mode, Block 475, is set, the entire source operand is transferred into FXB 204, 205 and the next source operand is requested from the FLB 185. The sink operand is transferred over Bus 472 to the Store Bus Or's 221 to go to the SDB's 244. As soon as the next source operand is returned, it is gated into both the source and sink FXB's and immediately transferred to the SDB's 244, and a new source operand requested.

For the serial operations when Block 475 is not set to parallel mode, the source byte addressed by BAR C–D 468 is gated out on Bus 233 to the VFL Logic Unit 212 which is set to an OR function to Bus 234 and into the FXB 204, 205 at the byte address indicated by BAR A–B Counter 458. The BAR C–D Counter 468 is incremented to gate out the next byte on Bus 233, and the operation transfers back to entry A. At the same time that the data is being processed, the end of operand tests are made to detect the end of each operand by checking each of the Counters 458 and 468 for a setting of seven indicating that the last byte is being used. For the source byte, this causes the next source operand to be requested, and for the sink operand, it causes the values in FXB 204, 205 to be sent to the identified SDB for storage, steps FXOS 201 for the next micro-instruction and returns control to entry A. The system can be set into parallel mode Block 475, only when BAR A–B Counter is at zero, so it could be set at this time and it will remain set until the last cycle bit 15 is found to be set in the active FXOS 201 micro-instruction. If the EBAR is at seven, the entire source operand is to be transferred and it will be done in parallel mode. Otherwise, the processing will be serial byte by byte and will terminate when the EBA Compare tests equal. The last sink operand will be stored and all execution controls will be reset to end the MVC operation.

The Translate (TR) and Translate and Test (TRT) instructions are similar in that they make use of a table of eight bit bytes in main storage and address the table one byte at a time. In the Translate instruction, the table will be identified by the address of its first byte stored in a GPR 202 and the digits of a byte from the sink operand will be added to this address to generate the address of the desired byte of the table, which byte will thereupon be fetched and replace the sink byte. When the sink double word has been entirely replaced, it will be stored and the next word fetched for processing. The instruction is useful to change data from one code to another. During the processing of this instruction, it is possible for a table byte to be called from the word which is currently being constructed in the sink register, and this condition will be detected by comparison of the fetch address with the store address currently in the SAR 241, concurrently with the table byte address being lower than the sink byte address. In this condition the correct table byte is in the sink FXB, and the VFLEU stops for one cycle and transfers the table byte from the sink FLB directly into the sink byte address.

The Translate and Test instruction is particularly useful in detecting special bytes in a string of data and is similar to the Translate in that the byte from the sink is sent to the I Box 134, and added to the address in the GPR 202 to generate the address of a table byte. The byte is returned and tested, and if it is other than zero, the full address of the table byte is retained in a first GPR 202, while the byte from the table will be retained in a second GPR 202. The condition code will be set to indicate if all table bytes were zero, if a non-zero byte was found before the end of the sink operand, and if the last byte from the sink operand addressed a non-zero table byte.

The flow chart for the TR and TRT instructions is shown in FIGS. 34 and 35. In the first cycle of the instruction, the first sink operand is requested from the FLB 185 assigned by the I Box 134, and whose address is in the first FXOS instruction, the Ingate Counter 496 is set to zero and the first sink byte position addressed by BAR A–B Counter 458 is gated from FXB FA–FB to Bus 232. The ending byte address is generated and stored in EBA Register 456, FXOS 201 is stepped to the next instruction and control is passed to entry B, FIG. 34. Here as soon as the sink word is available in FXB 204, 205, the first byte passes to Bus 232 and out through the OR 237 to the I Box 134. In the I Box, it is combined with the starting address of the table to form the address of the byte requested which address is sent to the MSCE 136 to request a fetch of the word (a 32 bit word only is needed) and the low order two bits of the byte address of the table word are sent over Byte Address Bus 476 to BAR C–D Counter to control the outgating of the wanted byte to the Bus 233. At the same time the byte address of the sink byte is transferred to Ingate Counter 469. The VFLEU requests the first table word from the FLB 185 which is to receive it. Control now passes back to entry B for transmittal of another sink byte to I Box 134. The two low order bits of the second table byte address are now sent over Bus 476 and entered into Byte Address Register D 477. As the FXB's 206 and 207 are now being used as 32 bit buffers, the BAR C–D Counter is reserved for FC 206 and a separate counter BAR D is used to indicate the byte address in the D register. After the first 32 bit table word is returned to FC 206, the transfer of control to entry B is also a transfer of control to entry A, FIG. 35, which determines the processing of the returned source bytes. The byte in FC 206 identified by the setting of BAR C–D Counter 468 is gated out on Bus 233 through the VFL Logic Unit (OR condition) and to Bus 234. Ingate Counter 469 will control the gating of the byte into the indicated byte position of FA–FB 204, 205 and will be stepped to the next number. The next table word will be returned to FD 207 and the byte identified by BAR D 477 will be outgated into the next byte position of FXB 204, 205 by Ingate Counter 469. By alternating the return of table words to FXB's 206 and 207, it is possible to handle one table byte per cycle. When the last sink byte from the table has been returned and entered into the sink FXB, Block 479, FIG. 34, the sink word is outgated into the named SDB 244 and the next sink word is requested from the FLB 185 named by the instruction in FXOS 201. FXOS 201 now is stepped to the next microinstruction and control is passed back to entry B for another iteration.

In the TRT instruction, the table words in the FC–FD FXB's 206 and 207 will have their selected bytes similarly gated to Bus 233 but the byte will be checked in Digit and Sign Decoder 468 for a zero condition and will not be gated into the sink FXB's. Each table byte checked will cause a Byte Counter 478 to be incremented. Also in TRT when a sink operand is used, Block 480, FIG. 34, the next sink operand is immediately requested from the FLB 185. The FXOS 201 is then stepped and control is passed back to entry B for a new iteration.

When a termination signal is given to finish the TR or TRT instruction, this can be the normal end of a TR instruction only when the last sink byte has been processed and the table byte returned and entered into the sink FXB 204, 205. In the Translate instruction, therefore, when the End of Instruction, Block 481, FIG. 34, is set, the last sink operand is stored and all execution controls are set. If the instruction is TRT at the normal end of instruction, the TRT controls will set the condition code units in I Box 134 to either an all zero indication or a last byte not zero indication, and will reset all execution controls to end the operation. If, however, a non-zero condition of a table byte is detected prior to the normal end of operation, Block 481 is not set, and the TRT instruction goes down the left branch where Block 483 is checked to be sure termination is due to a non-zero table byte. If so, the execution is terminated and the byte count in Byte Counter 478, FIG. 30, is sent to I Box 134 through the OR 237, the cancel mode triggers are set, the condition code triggers in I Box 134 are set to indicate that the operation terminated prematurely due to a nonzero table byte and control is passed back to entry B, which since there is no further operand available, will transfer to entry point A, FIG. 35, and since Cancel Mode, Block 484 is now set, the TRT controls will request all unused table words and sink operands in the FLB's 185 before resetting all execution controls.

The Edit (ED) instruction is utilized to convert decimal data in a packed format, i.e. two decimal digits in an eight bit byte, into a zoned format with one decimal digit in the lower four bits of the byte and numeric zone characters, either 1111 for the EBCDIC Code, or 0101 for the ASCII Code in the higher four bits. The editing includes inserting special characters between the unpacked decimal digits when called for by a pattern operand. The special characters can be print symbols such as Dollar Signs, commas, decimal points and credit symbols, etc. or a significance start character. The pattern operand occupies the sink register and the source operand is the packed decimal operand to be edited. The resulting characters are stored in the sink field and the character stored will depend upon three conditions, the decimal digit or sign read from a four bit section of the source field, the pattern character and the state of a trigger called the significance trigger S. The actions taken in the Edit instruction will be to either expand the source digit to zoned (unpacked) format and store it in the sink byte to make no change in the pattern digit, or to store a fill character.

The S trigger is set to a zero state at the start of an operation and is subsequently changed depending upon the source number and the pattern characters. The three pattern characters of special use in editing are the digit-select character, the significance-start character and the field-separation character. They will be replaced by either a source digit or a fill character and the first two represent a possible digital position for storing a decimal digit. The digit-select character causes either a source digit or a fill character to be stored in the result field. The significance start character does the same as the digit-select character, but also causes setting of the S trigger. The field separation character signifies the end of a decimal number field and is replaced by a fill character, resets the S trigger and in effect starts a new decimal number. For example, the pattern could represent a number of groups of three digit selecting characters and a comma followed by a group of two digit selecting characters, a significance start character, a decimal point, two more digit selecting characters and a sign dependent character. With this pattern the operation will proceed to inspect a source digit for each digit-select pattern and will replace it with a fill digit so long as the source digit is zero. Any commas will likewise be changed to fill characters. When a digit other than zero is detected in the source field, the S Trigger is set, the digit is expanded to the zoned format and is stored in the result field. From here on every digit select character will cause the source digit, zero or not, to be expanded and stored, and the other pattern characters as commas or decimal points will be left unchanged in the result field. When the significance start character is sensed, the S Trigger, if it has not previously been set, is set so that for the two source digits sensed after the decimal point is passed, the fill character is not inserted. The sign dependent character will be entered when the sign of the decimal number is negative. Thus, a number in packed decimal format may be converted into a decimal number ready for printing. The Edit and Mark operation is identical in all respects to the above described Edit operation and will also store in a GPR, the address of the first significant (not zero) result digit.

The flow chart for ED and EDMK is shown in FIG. 36 where on the first part of an ED or EDMK operation, the source and sink operands are requested from the FLB's 185 in consecutive machine cycles, the Ingate Counter 469 is set to zero, the first sink and source bytes are gated out to Busses 232 and 233 respectively, and the EBAR 456 is set to the ending byte address. When the sink operand is returned to FXB 204, 205, the first byte thereof, normally the fill character, will be gated into the Fill Register and control is transferred to entry A. Now as soon as both FA–FB and FC–FD have operands available for execution, processing starts by gating the source byte to Bus 233 where the Digit and Sign Decoder 466 inspects the two source digits on Bus 233 for an illegal decimal digit and for zeros and into Logic Unit 212 which gates out the high order digit to the shifter 452 for a four bit right shift. If the high order digit is found to be illegal, the I Box 134 is notified of a Data Interruption and control returned to A for termination of the operation. Normally, however, if the source digit is found by Digit and Sign Decoder 466 to be not zero, the S Trigger will be set and the digit will be expanded by feeding to the high order four bits of Bus 234, the zone digits required by the effective code, but if the source digit is found to be zero, the fill digit in Fill Register 485 will be gated to Bus 234 in its place. If the next pattern byte is a digit-select or a significance start character, it will be analyzed by Pattern Byte Decoder 487 on Bus 232 which will thereupon gate in Bus 234 to the sink byte position. If the pattern byte when decoded is not one of the three patterns of digit-select, significance-start or field separation, the BAR A–B Counter 458 is incremented to gate out the next pattern byte to Bus 232 and for each successive pattern byte which is not one of these three, the BAR A–B Counter is incremented to pass that byte. As soon as the first byte is gated from Bus 234 into FXB 204, 205, the next digit on the low order four bit positions of Logic Unit 212 is passed directly through Shifter 452 but will be gated to Bus 234 and expanded only if the S Trigger is on, otherwise the Fill Register 458 will be again gated to Bus 234. Thus, the Pattern Byte Decoder will gate Bus 234 into each byte position of FXB 204, 205 which contains a digit-select or significance-start or field separation character, and will skip unchanged the other pattern characters. The Digit and Sign Decoder 466 will inspect the source digits seriatim to control their gating into Shifter 452, to set the S Trigger when a non-zero digit is gated out and to maintain the correct bytes on Bus 233.

When the last byte of a sink operand word of the pattern is being processed, the BAR A–B Counter stands at seven and this condition, Block 488, will start the storing of the processed sink operand as soon as the last byte is returned into FA–FB, and will request the next sink operand from the FLB 185 named in the instruction in FXOS 201. The FXOS 201 will then be stepped to the next operand. Similarly when the last byte of the source operand is outgated to Bus 233, a new source operand is requested from the FLB and a notice is sent. As there is no fixed relationship between the pattern words and the source words, the requesting of source operands is unpredictable and I Box 134 will normally fetch only the next source word with each succeeding word when needed. The normal instruction ending is initiated when the EBAR 456 and BAR A–B Counter 458 are found equal in EBA Compare 457, and the last instruction bit 15 is set in the instruction word then being decoded in FXOS 201.

In the EDMK operation only, all of the above operations are performed in the same manner as above described, and additionally Byte Counter 478 is incremented every time a pattern byte is utilized. When Digit and Sign Decoder 466 finds a significant decimal digit in the byte part being gated from Logic Unit 212, and Pattern Byte Decoder finds a digit-select or Significance-start pattern on Bus 232, then the count of Byte Counter is sent through OR's 237 to the I Box 134 where it is added to the starting byte address to generate the address of the first significant digit in the result operands and the generated address is sent by I Box 134 to a GPR for storage. Further operations will proceed exactly as in the ED instruction until the normal termination.

There are three VFL operations which are distinguished by having two length fields specified in the I Box 134 instruction. One of the lengths is for the source field and the other is for the sink field and the lengths are stored in the VFLEU in counters, FIG. 30, Counter 461 for the source operand and Counter 489 for the sink operand. Each processing of a byte from an operand causes a decrementing of its associated counter, and if both counters reach zero at the same time, the instruction has been completed in a normal manner, but if the Sink Counter 489 reaches zero first, the operation is terminated by cancelling all outstanding source operands (if any). If the Source Counter 461 reaches zero first, only the source has been used and the sink operand is filled with zeroes until its counter 489 reaches zero and the instruction is completed.

These three instructions are also distinguished in that all operations proceed from right to left through the operands and therefore the above-mentioned filling out of the sink field with zeros does not alter the values of the decimal digits. In the Pack instruction, the first (right hand) source byte contains both a decimal digit in the four right hand bits, and sign information in the four left bits. When passing through VFL Shifter 452, these four bit groups are interchanged to put the sign bits in the right hand position and the digit value in the left position. Thereafter, the second decimal digit which will be in the four right bits of the second byte is placed in the Skew Register 453, and on the next cycle, the third digit which will be in the right four bits of the third source byte will be shifted in Shifter 452 into the high order (left) four bits of Bus 234, while the Skew Register will be gated out to the right orders of Bus 234 thereby packing both digits into one sink byte. When the sink FXB is full, it is stored in the SDB identified by the SAR Name Register 467. For the Unpacking instruction, the operation is substantially the reverse of Packing. The first source byte containing a right hand sign group and a left hand digit group has the groups interchanged in Shifter 452. Thereafter the source bytes are handled in two operations, first the low order digit of the source byte is gated out to Bus 234 with the proper zone characteristics while the high order digit is stored in Skew Register 453. The byte on Bus 234 is then stored in the next byte position of FXB 204, 205. On the next cycle, the Skew Register 453 is outgated to the four low order positions of Bus 234 with the zone bits placed in the four left bit positions, and the byte stored in the next available sink byte. These last two cycles continue until the sink field runs out as above noted.

The flow chart of the PK and UNPK controls is shown in FIG. 37, where the control in the starting cycle, requests the first source operand from the FLB designated in the first FXOS 201 instruction, sets Ingate Counter 469 to zero and opens the gate for the first right end source byte to Bus 233. As soon as FXB FC-FD is indicated full, the byte on Bus 233 is ingated into VFL Logic Unit 212, and the high and low four bit halves interchanged in VFL Shifter 452, so that the four sign bits are in the proper half of the output Bus 234, and the result is gated into the sink byte of FXB's 204, 205 for the right end byte and control passes to point A. Here, so long as a source operand is available, the iterations will proceed. In the PK mode the next source byte on Bus 233 has its right hand four bits passed through Logic Unit 212 and into Skew Register 453, and on the next cycle, the next source byte is passed through Logic Unit 212, has its four right hand bits shifted left in VFL Shifter 452 to the high order half of Bus 254 while Skew Register 453 is outgated to the low order half of the Bus. The resultant byte is stored in the next byte position of Sink FXB's 204, 205. This will be repeated for each pair of source bytes until the sink or source field is exhausted as indicated by a zero condition of either counter 461 or 489.

In the UNPK mode, the iterations proceed by gating the second source byte into Logic Unit 212 and passing the low order half directly through Shifter 452 to Bus 234, where the zone bits are provided, and storing the result byte into FXB's 204, 205. The high order four bits are stored in Skew Register 453 and on the next cycle are gated out to the low order bits of Bus 234 and are filled out with the zone bits to make a byte for storage in FXB's 204, 205. This iteration will proceed with each source byte being converted into two sink bytes.

In both PK and UNPK modes the common procedure is to decrement the sink counter 489 each time a byte is stored in the FXB FA-FB, and to decrement the source counter each time a source byte is gated to Bus 233, and thereupon return control to entry A.

At entry A, when the BAR C-D Counter 468 is set at zero, it is an indication that the last byte of the source operand is being used (byte use progresses from right to left), and the I Box 134 is instructed to obtain a new source operand. The address of the next source cannot be supplied to the FXOS 201 buffer area for there is not a one to one correspondence between the source and the sink words used so the I Box cannot tell the micro instruction in which the FLB address of the next source word should be stored. The I Box therefore does the next best scheduling, it prefetches the source words into the FLB's 185 but supplies them only on call from the VFLEU. There is, however, one sink word generated for each FXOS microinstruction which will therefore contain the identification of the SAR 241 controlling the store. When BAR C-D Counter 258 stands at zero at entry A, the last byte being stored in the FA-FB FXB's is the last byte and the sink operand is sent via the Storage Bus OR's 221 to the SDB 244 as soon as it is completed. FXOS 201 is then stepped to provide the next micro-instruction containing the next SAR address.

Also at entry A, if the sink field has been used up, Block 491, i.e. Sink Counter 461 stands at zero, the last sink byte position is being filled from Bus 234 and the termination procedure is initiated. At this time, the last sink operand in FXB 204, 205 is stored and the source counter 461 is tested for a zero condition, Block 492, and if zero, the operation is ended by resetting the execution controls. If, however, Source Counter 461 is not at zero, there is a likelihood that I Box 134 has fetched some advanced source words into some FLB's 185 and the cancel mode controls are set when Block 491 is set, but Block 492 is not set. In the cancel mode, the I Box 134 requests all FLB's 185 to send all unused source operands to the FXB's 206, 207 which frees up the FLB's 185 reserved for these source operands. The execution controls are then reset and execution terminated.

For the other condition where the sink operand field is not used up, Block 491 is not set, but the source field is exhausted, the controls ingate a byte of all zeros into the sink FXB and returns controls to the entry B where Blocks 491 and 492 are again tested. The zero byte entry will be repeated until Block 491 becomes set to enable an exit to the end.

The third instruction which is processed from right to left is the Move with Offset (MVO) instruction which in effect shifts all bits of the source operand four bits to the left. As this leaves a gap of four bits at the right end, these four bits are taken from the sink operand field, enabling a sign bit or some special character to be appended to the source operand. At the start, the source operand is fetched into the FC-FD FXB's 206, 207, the sink operand is fetched into the FA-FB FXB's 204, 205, only one sink operand will be fetched, and the Sink and source counters 461 and 485 are set. Then the sink operands right hand byte is gated to Logic Unit 212 where its low order four bits are put into Skew Register 453. Next, the rightmost source byte is passed through Logic Unit 212 and has its right hand four bit group shifted in Shifter 452 into the high order bits of Bus 234. At the same time the four low order bits of the sink operand are gated out to Bus 234 and the result byte gated into the FA-FB FXB's 204, 205 and the high order four bits at the output of Logic Unit 212 are gated into the Skew Register 453. This operation with the source byte will be iterated until either the sink field or the source field are exhausted to cause an execution termination.

The flow chart for the MVO operation is shown in FIG. 38 where at the start the first sink and source operands are requested from the FLB's 185, Ingate Counter 469 is zeroed and the location of the first sink byte to be processed is gated out to Bus 232. When the sink operand is available, Block 493, the first sink byte is processed by having its low four bits stored in Skew Register 453, and control goes to point A for the iteration cycles. When the source operand is returned and FXB FC–FD is full, Block 495, the first source byte is gated to Bus 233 into Logic Unit 212 where as above noted, its high order four bits go into Skew Register 453, its low order four bits are shifted by Shifter 452 to the high order four bits of Bus 234, and the odd value in the Skew Register is outgated to the low order four bits of Bus 234. The byte on Bus 234 is thereupon gated into the first sink byte position of FA–FB FXB 204, 205, and control passed back to entry A for another iteration.

At the time a source byte is being processed, if BAR C–D counter 468 stands at 0, Block 496, the last byte of the source is being processed and a new source is requested by the I Box 134 from the FLB's 185 and control passed back to entry A to go when the new source word is supplied. If, however, it is BAR A–B Counter 458 which stands at zero, the last byte of the sink operand is being supplied from Bus 234. The sink operand will thereupon be gated out to Store Bus OR's 221 for transmission to the SDB 244 named in the SAR Name Register 467. This completes the use of information supplied in the present Op so FXOS 201 is stepped to provide the next needed information. At the time when the sink field is used up, Block 491, as shown by a zero value in Sink Counter 485, the last sink operand is stored and a test is made of the state of Source Counter 461, Block 492. If Counter 461 also stands at zero, both fields have terminated simultaneously and a normal end execution is executed, but if Counter 461 is not at zero, the Cancel Mode condition is entered. In this cancel mode, all unused source operands are requested to be sent to FXB 206, 207 and the FLB's reserved for these operands are freed before the execution is terminated. The other condition which can arise is that the Sink Counter 485 is not at zero but the Source Counter 461 is at zero. Under this condition, a byte of zeros is gated into the sink FXB, the Sink Counter 485 is decremented and control passed back to entry B for another test of Block 491, and thereby a continuous gating of zero bytes into the sink operand until the sink field is utilized and the controls enter the termination path.

Since in the MVO operation, it is possible that the source byte to be processed can be from a word being generated in the sink FXB's, an overlap mode is possible and will be detected when the source address is less than eight bytes greater than the sink address (processing is proceeding from right to left). When overlap mode is detected, all MVO processing is on a byte basis and every sink byte is stored away before the next source byte is called for.

*Partial word storage controls*

In the description thus far set out, it has been stated that the sink operand in FA–FB FXB's 204 and 205 is sent over Bus 472 to the Store Bus Or's 221 for storage. Since, however, it is possible to start byte entries in or to terminate byte entries at any byte address, it will be seen that the valid part of the sink operand being sent out may be as little as one byte length, and that the remainder of the transmitted operand does not represent valid data. The VFLEU contains an eight bit Mask Register 498 controlled by the ingate controls of FA–FB 204, 205. Whenever an entry of a byte is made into the sink FXB, a latch for that byte is set in Mask Register 498 so that the pattern of set latches in Register 498 is an indication of the valid bytes in the sink FXB. When the word in the sink FXB is sent to an SDB 244 for storage, the pattern of set latches in MASK Register 498 is sent over a Bus 499 to the MSCE 136. In MCSE, the mask pattern is used to cause storage of only those bytes whose pattern bit is significant and to preserve unchanged those stored bytes corresponding to a non-significant pattern byte. Such a provision prevents changes in data which is a part of the storage word at the storage location, but is not to be superseded by the results of the operation being performed.

*Immediate data instructions*

The Immediate Data Instructions are all single instruction operations and are performed on a single byte of data from a source word together with a byte from the instruction. The instruction format in FXOS 201 is eight bits for the operation code, eight bits of immediate data, three bits to name the FXB source register, and two bits to name the SAR 241 having the store address. When the op is issued by FXOS 201, the immediate data from bits 8 to 15 is placed in the Immediate Data Register 213 over a Bus 451, the SAR Name Register 467 receives bits 19 and 20, and the byte address from I Box 134, is placed into the BAR Counter for the selected FXB.

The instructions And Immediate (NI), Or Immediate (OI) and Exclusive Or Immediate (XI) are all two machine cycle operations. When the data is returned to the selected FXB and its full tag is on, the byte identified by its BAR Counter is gated out on a Bus 232 or 233 and the byte in Immediate Data Register 213 is gated to the other Bus 232 or 233. The VFL Logic Unit 212 performs the indicated operation on the two bytes and puts the result on Result Bus 234 from where it is gated back into Immediate Data Register 213. On the next cycle, the Immediate Data Register 213 is gated out on Bus 501 to the Store Bus Or's 221 for transmission on Bus 197 to the named SDB 244.

The Compare Logical Immediate (CLI) and Test Under Mask instructions are one cycle operation and set the Condition Code Triggers in I Box 134. They have no significant output byte and the result byte is not stored. In Compare Logical Immediate, the selected source byte and the immediate data byte are gated into the Logical Compare Unit 465 which indicates whether the source byte is less than, equal to, or greater than, the immediate data byte. In Test Under Mask, the immediate data byte is the mask in which a bit setting of one indicates that the corresponding bit of the source byte is to be tested but a bit setting of zero indicates no testing of the corresponding source bit. Both bytes are gated into the VFL Logic Unit which is set to an AND condition and tests the output for all zeros for an all zero condition of the selected bits. The Logic Unit 212 then switches to an Exclusive OR condition and tests for all zeros to see if all of the selected bits were ones. The Condition Code Triggers are set to indicate an all zero condition of the selected source bits, an all ones condition of the selected source bits or a mixed zeros and ones condition.

The Move Immediate (MVI) instruction is another one cycle operation. It causes gating of the Immediate Data Register 213 to Bus 501 for transmission to the Store Bus ORs 221 and to the selected SDB 244.

There are two special operations which make use of the Immediate Data Register in communications with external devices. These instructions are Write Direct (WRD) and Read Direct (RDD). In Write Direct, a byte of data from a source word in a FXB has previously been gated into Immediate Data Register 213, and on the instruction, is gated through VFL Logic Unit 212 to Result Bus and into the Write Direct Register 502, from which it will be gated to the PSCE 137 for use. In the Read Direct instruction, a byte of data on the Direct In Bus 505, see also FIG. 6A, from the PSCE 137 is gated in to the Immediate Data Register 213 during a hold interval. After the hold interval, the byte of data is gated out on Bus 501 to the SDB 244 for storage. Due to the hold interval required for the Write Direct data to be utilized and that required for the Read Direct data to be supplied, these two direct operations cause a stop of the CPU 100 processing until the operation is completed.

The Set System Mask (SSM) instruction sets a byte of data from a source word in an FXB into the Immediate Data Register 213, from which it is transmitted to I Box 134, for insertion in the system mask area of the program status word in PSW Buffer 1006, see FIG. 58. Since this may change the status of the entire system, the I Box 134 cannot issue any further instructions until the operation is completed by sending an OP COMPLETE signal which causes the I Box 134 to ingate the data into the proper latches. The Test and Set (TS) instruction gates the selected byte of the source word in an FXB and tests the highest order bit of the byte for a zero or non-zero condition. The condition code latches in I Box 134 are set accordingly. The Convert to Binary instruction has previously been discussed and the VFLEU's part in this instruction comprises requesting the operand from the FLB into FXB's 206, 207, the shifting of the proper four bit groups into the highest denominations of FXB 206 for gating out to the CVB Decoder, and the concomitant checking of these groups for decimal validity.

The Insert Character instruction loads one selected byte of data from a source word into bit positions 24–31 of a GPR. When the source word is available, the selected byte is gated through the Logic Unit 212 to Bus 234 and from there into the right hand byte of the named GPR 202.

It will be noted in FIG. 30 that a parity check 506 is shown on each Bus 232 and 233. It will be remembered that every eight bit byte of data is accompanied by a parity bit and as is conventional, the accuracy of the data transmission is checked by the parity checkers 506 and cause a program interrupt when a parity error is detected. The parity generator 507 on Result Bus 234 is required to generate a new parity bit for the result data since after passage through Logic Unit 212, the original parities of the operands are no longer applicable, and a correct parity must be appended to the result byte.

From the foregoing description of the FXPU 143, it will be evident that this section of the preferred embodiment of the invention provides a wide range of data processing operations which can process data in fixed length words, or in variable length words, in words in a binary format, or in a decimal format, and from full words to individual bits of a word.

*Floating point unit*

As was previously set out in relation to FIG. 5, the Floating Point Unit is comprised of the Floating Point Operating Stack (FLOS) 184, a set of eight Buffer Registers to retain an instruction, the six Floating Point Buffer Registers (FLB) 185, each a 64 bit register to receive an operand from storage and connected by gates to both the Common Data Bus (CDB) 196 and to the inputs to each of the Execution Units, a set of four Floating Point Registers (FLR) 187, each 64 bits wide and capable of receiving data from the CDB 196, and supplying data to the CDB 196 or to either Execution Unit, an Add Unit 188 having three pairs of input Storage Registers 191, and a Multiply Divide M/D Unit 192 having two pairs of input Storage Units 195. The CDB can be gated into from the FLB's 185, the FLR's 187, the Add Unit 188 and the M/D 192, and can in turn be gated into the FLR's 187, any Storage Register 191 or 195 for the Add and M/D Units or to the SDB's 144 in MSCE 136. Another bus, the FLB Bus 199, can also be fed the output from the FLB's 185 and connects to one Storage Register 191 or 195 of each pair for the Add and M/D units and is also connected to the FXPU 143 for supplying the 64 bit operands as above set out for the Fixed Point Unit. The FXOS 184 (the FLB's 185 and the FLR's 187, together with the Control Circuits 200 may be considered the Floating Point Instruction Unit (FLIU) and it handles the Load Instructions to one FLR 187 from either another FLR 187 or from Storage by way of an FLB 185, the Load and Test Instructions where an operand is transferred between two FLR's 187 and tested for a positive, negative or zero condition and the Store Instructions wherein an operand in an FLR 187 is transmitted over Bus 197 to an SDB for storage. The M/D Unit 192 and the Add Unit 188 comprise the Floating Point Execution Unit (FLEU) and actually execute the instructions with the M/D Unit 192 performing the Multiplies and Divides, and the Add Unit 188 handling the remainng instructions.

*Floating point instruction unit*

As previously described, the I Box 134 issues instructions to FLOS 184 and directs any required operands to the FLB's 185, the identification of the selected FLB 185 replacing that of the storage location specified in the original instruction. The first register specified in a floating point instruction is always one of the FLR's 187, it contains one of the operands, and is also the sink register to receive the results of the operation. The second register, if any, identified in the instructions can be either the FLB 185 which receives the operand from storage, or another one of the FLR's 187, or in the case of a store instruction, the SAR 241 containing the storage address.

Instructions are gated out of FXOS 184 in strict sequential order when they have been validly issued by I Box 134 (No Conditional Operation Tag is set and the FXOS 184 position is tagged Full) and are decoded in Control 200. Each operation as issued is decoded sufficiently to enable decisions about the unit to execute the instruction, the operand gating out and the setting of the sink ingating circuits. Normally, instructions are handled in Control 200 for two cycles, a decode cycle and a select cycle, with the cycles of sequential operations overlapped so that a decode and a select cycle are in simultaneous process.

Operations are issued from FLOS 184 a maximum rate of one per machine cycle but, due to execution times, priority conflicts, etc., the instructions may not be completed in sequential order. This is somewhat of a problem in the preferred embodiment of the invention for two instructions may use the same sink register, the second instruction operating on the result of the first and normally would require a halt in operations on the second instruction until the operand was available. In the preferred embodiment, however, such a situation is not allowed to interrupt processing and the only condition for issuance of an instruction is the availability of a unit to execute it. The preferred solution to this problem of overlapped instruction is to transmit the operand to the executing unit if the operand is available, but if it is not available, to forward in its place, the identification of the unit which will supply the operand. Then when the operand is made available, it is gated into the waiting Execution Unit which then proceeds with the processing of the operands.

When an instruction is issued from FLOS 184, it is checked to determine the controls needed for the type of operation to be performed, i.e., (1) an operation for the Add Unit 188, (2) an operation for the M/D Unit 192, (3) a two operand operation requiring one operand from storage (an FLB 185 source), (4) a two operand operation using operands in two FLR's 187, (5) a single operand instruction, (6) the sink FLR 187 is busy or available, (7) the source FLR 187 is busy or available, and (8) can the instruction be executed within the FLIU. The first, second and last are needed for a selection of the unit to execute the instruction, and the others are used to determine the routing of operands. The determination of the unit selection for execution is by the operation code and preliminarily decoded into five groups. The groups are:

(1) Adder Unit required—Includes all arithmetic operations to be executed by the Add Unit 188 and are

| Operation: | No. of variations |
|---|---|
| Add | 8 |
| Subtract | 8 |
| Compare | 4 |
| Halve | 2 |
| Load Positive | 2 |
| Load Negative | 2 |
| Load Complement | 2 |

(2) M/D Required—Includes the operations to be executed by the M/D Unit 192 and are

| | |
|---|---|
| Multiply | 4 |
| Divide | 4 |

(3) Operations handled in the FLIU including

| | |
|---|---|
| Load | 4 |
| Load and Test | 2 |
| Store | 2 |

(4) Single Operand Instructions—A special indication is made for the single operand instructions above, i.e., for the 12 Load and 2 Halve Instructions with a separate indication for the two Store instructions which are also single operand but require special handling.

On the above list of instructions, one of the variables for each set is the length of the operands used for there is a full set of instructions for short precision operands of 32 bit length, and an equal set of instructions for long precision operands of 64 bit length. If four variations are noted, the other variable is the location of source operand, either an FLB 185 or an FLR 187. The Add and Subtract operations also have a third variable, i.e., whether the operation shall be performed with normalized or unnormalized operands. There is no need to decode the instruction for the length and source operand variables, for the instruction contains an SO bit position which is set to indicate that the source operand is from an FLB 185, and an S/L bit position whch is set to indicate a short precision operation.

During the first or decode cycle, Control 200 transmits the operation code (four bits) the SO bit, the S/L bit, a four bit sink operand tag, and a four bit source operand tag to the Unit Communication Controls (UCC) (to be described in more detail at a later point), of all execution units which it will be remembered include the four FLR's 187, three sets of input registers for the Add Unit 188, and two sets of operand registers for the M/D Unit 192. The sink and source operand tags specify the operand Bus 197, 199, or 551, over which the operand will be supplied, and for the Busses 197 and 551, the identification of the unit which will supply that operand to the bus.

Only those execution units which are not busy will sample the output of Control 200 and they will sample every cycle until they are sent a select signal which latches in the decoded output of Control 200 and sets the UCC to a busy condition. The select signgal in Control 200 will not be sent until a GO signal is generated to start the select cycle. The GO signal is dependent upon a variety of conditions within the FLPU 142 which typically include, (1) Precision Match (Instruction & Sink FLR 187) or Sink FLR 187 available.
(2) Precision Match (Instruction & Source FLR 187) or Source FLR 187 Available.
(3) Execution Unit Available for Instruction.
(4) Not Conditional Operation (No CO Bit).
(5) Not a Cancel Operation.
(6) Not FLOS 184 Empty (F bit Set).

The second FLIU operation handling cycle is the select cycle and is entered when the GO signal is generated and starts with an updating of the FLPU controls. Updating consists of a combination of some of the following, dependent upon the operation to be performed.

(1) Turn on unit select trigger for one cycle.
(2) Turn on unit busy trigger for unit selected.
(3) Set new address into the FLB's 185 Status trigger and turn on Go-When-Full trigger.
(4) Set new address into FLR 187 Status trigger and turn on FLR's 187 Busy Trigger.
(5) Set the sink FLR outgate trigger.
(6) Set the source FLR outgate trigger.
(7) Step FLOS 184.

During the select cycle, the unit select signal is sent directly to the UCC of the reservation station chosen to execute the operation, the source operand (if available in a FLR 187) is gated to the FLR Bus 551 and to the execution unit to receve it. It will be remembered that during the decode cycle, every free UCC receives, among other signals, the source and sink tags which are the identification of the busses 197, 199 or 551, over which the unit will receive the source and sink operand. If the source operand is available in a source FLR 187, it will be transmitted on the select cycle along with the identification of the sending FLR 187. Since all free UCC's for the execution units are set to the source and sink tags on the decode cycle, and are retained in that state when the select signal is received, the set UCC will respond to the unit identification signal to gate the source operand into the execution unit.

To have a number of machine cycles, and to reduce the number of registers and data handling operations, a forwarding system has been incorporated in the preferred embodiment to eliminate combinations of store and transmit cycles for a GPR 187. Consider for example, the sequence of instructions wherein an operand in a sink FLR 187 is processed and the result is returned to the sink, the first result is gated out to a bus as a source operand, is processed and the second result is returned to another FLR 187. During the time the first operand is being processed, the sink FLR 187 retains the name of the unit which will send the first result to it and as soon as the first result is stored in the FLR, it will be re-transmitted to another execution unit. Clearly, one machine cycle could be saved and the FLR 187 freed for other operands if the first result could be sent directly to the execution unit which is waiting for it. This is accomplished in the present embodiment of the invention by the process of forwarding to the execution unit, the tag stored in the status register of an FLR 187 called for in an instruction if the operand is not in the FLR 187, and thereupon setting the FLR 187 to a Not-Busy status so that it can be utilized in another instruction. Now the receiving unit knows the identification of the execution unit which will put the required operand on a data bus and will accept it without the need for the operand to pass through an FLR 187. Thus, one machine cycle is saved and the number of FLR's 187 needed for free flow of operands is reduced. These tags for the source and/or sink GPR's are supplied to the execution units during the decode cycle, and are retained by the unit select signal at the start of the select cycle. If any execution unit should put the required operand on a data bus during this select cycle, the selected execution unit is in condition to gate the operand into its receiving gates. In the same manner, if the source operand is present in an FLB 185, the address of the unit selected to receive it over the FLB Bus 199, or a direction to use the CDB 196, would have been sent to the FLB 185 during the decode cycle, and the FLB 185 would have been instructed to Go-When-Full. Since it was full, it would have transmitted its data out on the indicated bus with its identification on the CDB 196, or the identification of the receiving unit on the FLB Bus 199. The selected receiving unit, upon an equal compare of the identification of the name in its status registers, and the name on the CDB 196, or recognition of its own name on FLB Bus 199, would gate the operand into its input registers during the select cycle. If the operand is not available, the receiving unit tests the identified bus on every cycle until the correct operand is available for gating in and in the meanwhile it waits.

*FLIU handling of arithmetic operands*

When the conditions for the GO signal are met, the operands for an arithmetic operation having one operand supplied by storage are handled for two cycles. The GO conditions are an execution unit available and either a match between the precision bits of the instruction and the sink operand or the operand is available in a GPR 187. If the sink GPR 187 has the operand available, it will be outgated to Bus 551 during the select cycle for gating into the selected execution unit, and if it were tagged busy, its tag bits in the status register would have been forwarded to the execution unit on the decode cycle. The second operand is always in an FLB 185 for this type of operation and if the FLB 185 has the operand available, it is outgated to either a Bus 552, to the CDB 196, or to the FLB Bus 199, along with its identification for CDB 196, or that of the receiving unit for Bus 199 to control ingating to the execution unit. If the FLB 185 does not have the operand yet available, the FLIU sets a GO-WHEN-FULL trigger for the Bus selected (GWF-FLBB or GWF-CDB) and the operand together with the FLB name or that of the receiving unit will be transmitted out as soon as the operand arrives and the outgating Bus is available.

If both operands are to be supplied by FLR's 187, then in addition to the above conditions, a GO signal requires a precision match for the instruction and source operand, or that the source operand be available. If both of the two FLR's are busy during the decode cycle, their tag bits in their status register areas would have been transmitted on the decode cycle and the FLR's 187 set to a Not Busy status, but if one operand is available, that operand along with the FLR identification is gated out to Bus 551 during the select cycle. When both operands are available in the FLR's 187 during the instruction decode cycle, an extra machine cycle is required for operand transmission. The source operand is transmitted over Bus 551 during the select cycle and then the sink operand is gated to Bus 551 during the extra cycle. The extra cycle is gained by suppressing the stepping signal for FLOS 184 and holding up on the gating signal for the sink operand to Bus 551. A two cycle trigger is set on the select cycle and turned off during the extra cycle. When the two cycle trigger is on, it sets the outgates for the sink FLR 187 and steps FLOS 184 at the start of the extra cycle. This extra cycle is never needed for single-operand FLR to FLR operations as there is no sink operand to send to the execution unit.

*Operations within FLIU*

The two load operations of transferring an operand from storage to an FLR 187 are strictly data transfer with no data manipulation and are handled within the FLIU area. The operand is fetched from storage by the I Box 134 and is tagged for one of the FLB's 185 which is identified in the instruction in FLOS 184. When the operand arrives at the FLB, the FLB Full tag is turned on and the operand is available. When the instruction in FLOS 184 is decoded, the address of the source FLB 185 is sent to all Not-Busy execution units as above described and the GO signal for the select cycle depends on the availability of the sink FLR 187, or a precision match on operand lengths. When the GO signal is on, either during the decode cycle or thereafter, the updating and select cycle will follow. The updating consists of setting the FLB 185 address into the tag register of the sink FLR 187 and turning on the GO-WHEN-FULL (GWF-CDB) for the source FLB 185. During the select cycle, if the operand has been returned to the FLB 185 at this time, its full tag and GO-WHEN-FULL tags are both set on, and it will be gated out to the FLB Bus 552, and thence through CDB 196 into the FLR 187. If the operand has not been received, the FULL Trigger is not on, and nothing more happens in the select cycle. When the operand is returned to the FLB, it will be gated out as soon as the CDB 196 to the FLR is available. The other four load operations, i.e., Load (Short/Long) and Load and Test (Short/Long) are all data transfers from one FLR 187 to another FLR 187, with or without the test of the transferred operand for a zero, positive, or negative fraction part (all operands herein are in floating point format). For the data transfer function, the Source FLR 187 is gated to the FLR Bus 551, through the CDB 196, and into the Sink FLR 187. If the data is already present in the source FLR, the operation requires three machine cycles, the first of which is the decode cycle in which the sink FLR 187 has its UCC set to the address of the source. The GO signal merely requires availability or a precision match for both the source and sink FLR 187. When the GO signal is set, the update activity will inhibit the STEP FLOS signal, inhibit the normal outgating of the sink FLR 187, so that the source FLR will be the only one which can be gated out, inhibit the CDB 196 priority logic, effectively reserving a time slot on the CBD 196, and turn on a Move Data Trigger. In the first data cycle the Move Data Trigger will thereupon turn on the outgate for the source FLR and the ingate for the sink FLR 187. It will also generate the STEP FLOS signal and turn off the sink FLR busy signal if it is on. In the second data cycle, the first available time slot which can be guaranteed to be clear on the CDB, the operand is passed over the CDB 196 to the sink FLR 187. For the other situation in which the source operand is not available in the source FLR 187 at the update time, the operation is simpler. In this case it is only necessary to move the tag from the source FLR to the sink FLR and set the source busy trigger off, and the sink busy trigger on. It will be remembered that the transfer of the tag informs the sink FLR that the operand it is expecting will be put on the CDB 196 by the named unit. Every busy execution unit monitors the tag of CDB 196 so that when the CDB tag matches the units tag, the ingating can be opened in the next cycle to enter the wanted operand.

The load and Test operation in addition to transferring the selected operand will set the condition code triggers in the I Box 134, provided that the CC bit in FLOS 184 remains set at the decode time. The Move Data Trigger will also turn on the Zeros Tester 553 so that when the data moves over CDB 196, the Tester 553 will, if the CC bit from FLOS 184 is set, test the data with the required Short/Long precision as specified by Control 200. For the second case above where the data is not in the source FLR 184, the tag from the source FLR is transferred to the Tester 353 at the same time it goes to the sink FLR 187. When the zeros Tester 553 recognizes the tag on the CDB as that for its operand, it responds by performing the required test.

The other strictly FLIU operations are the two stores (Short/Long) in which the contents of a designated sink FLR 187 are transferred over Bus 197 to the SDB 244 identified in the instruction. The store operation requires either two or three machine cycles depending upon the conditions which generate the GO signal. The required conditions are either a precision match or an available signal for the sink FLR 187, and an empty condition in the named SDB 244. The empty condition is known to the FLIU since the status of each of the three SDB's 244 is sent to the FLPU 142 for monitoring. The store operation for an operand already in an FLR 187 requires the same three cycles as above set out for the Register to Register Load, i.e., a decode cycle and two select cycles. When the GO signal is set, the FLIU will update at the start of the first select cycle by turning on the outgate trigger for the sink FLR 187, by inhibiting the CDB 196 priority logic, thus reserving the second cycle time slot on the CDB, by inhibiting the STEP FLOS signal and by turning on the Move Data Trigger. The Move Data Trigger will enable a gating out of the sink FLR 187 to CDB 196 by way of FLR Bus 551, will turn on a select to the SDB 244, and will generate the STEP FLOS signal. For the other situation where the sink FLR 187 is tagged busy and has not yet received its operand, only one select cycle is needed in addition to the decode cycle. In the decode cycle, the tag of the busy FLR 187 is moved to the SDB's UCC and the SDB is sent its select signal on the next cycle to latch in the tag bits. The sink FLR 187 is then set to Not-Busy and thus freed for further use and the UCC of the selected SDB monitors the CDB 196, Lines 197, to detect when its wanted operand will be on the BUS 197.

The precision match above referred to is the agreement of the S/L bit of the instruction being decoded with the similar S/L bit of the operand to be processed. Clearly, a long precision instruction should not be performed on short precision operands, nor can a short precision operation be performed on a long precision operand without loss of significant data. A conflict between the precision settings is indicative of either a programming or data transfer error and the indicated instruction should not be performed. Instead, an interrupt process should be initiated to notify the operator of the type of error and the operands involved. If the FLR 187 is available, i.e., not storing an operand, there is no conflict possible and the operation can proceed. Insofar as the CDB 196 is concerned, all units which gate onto the CDB do so in long precision completely filling the CDB 196. At the same time, all units which ingate from the CDB 196, have split ingates and each will gate in either the short or long operand as indicated by the setting of its S/L bit latch. The S/L bit latch will have been set in a previous cycle, either a decode, an update cycle, or a select cycle when the tag bits were set. The ungated part of the CDB 196 will not be utilized on this operation.

The FLOS 184 is a set of eight buffer registers holding the floating point instructions from the I Box 134. In general, the FLOS 184 is similar to the FXOS 201 described above, and has a set of Ingate Controls 555 which can be set to progressively open the gates between the Bus 133 from Box 134, to one of the FLOS Registers 184. After an instruction from I Box 134 has been stored in an FLOS Register 184, the Ingate Controls 555 are stepped by a signal from the I Box 134 to designate the next FLOS Register 184, for ingating the next instruction. There is also an Outgate Control 556 which selects one of the FLOS Registers for gating out to a Bus 557 going to Control 200. After the instruction on Bus 557 is decoded by Control 200, the STEP FXOS signal above mentioned, steps the outgate Controls to gate out the next FLOS Register 184 to Control 200 for instruction decoding. Instructions will be issued from FLOS 184 in the same order as received.

When the FLOS 184 is empty, the Outgate Control 556 will be set to indicate the same FLOS Register 184 as the Ingate Control 555 and that register, even though it is empty, is continuously outgated to Control 200. As soon as the first instruction is received from I Box 134 on Bus 133, it passes through the FLOS Register to Bus 557 and into Control 200 to be decoded in the same cycle as it is received. The Ingate Controls 555 are incremented as the instruction is received and the Outgate Controls 556 are stepped as the instruction is decoded so the Outgate Controls 556 cannot logically get ahead of the Ingate Controls 555. The FLOS Counter 186, FIG. 4B, has previously been mentioned and is incremented every time the I Box 134 sends an instruction to FLOS 184. The FLOS Counter will be decremented by one every time the Outgate Controls 556 receive a STEP FLOS signal, and hence the value in the FLOS Counter 186 will indicate the number of unexecuted instructions in FLOS 184. When the Counter 186 has a value of eight therein, the FLOS 184 is full and I Box 134 is blocked from issuing any further floating point instructions to FLOS 184 until a STEP FLOS signal is issued to step the Outgate Controls 556 and thereby release one FLOS Register position.

FLOS signals

The control signals from the I Box 134 to FLOS 184 are largely similar to those above set out in the description of the FXOS 201 and will therefore be only briefly described at this point. The control signals are:

(1) Condition Mode
(2) Activate Condition Ops
(3) Cancel Conditional Ops
(4) Set Condition Code to FLOS
(5) Valid operation to FLOS.

The FLOS 184 also returns some control signals to I Box 134. These signals are:

(1) Condition Code Outstanding
(2) An FLR is busy
(3) Decrement FLOS Counter 186
(4) FLB Busy Release (6 signals-one per FLB).

Briefly described, the Conditional Mode (CO) signal is sent so long as I Box 134 is operating in conditional mode. All instructions issued during this time will have the CO bits set in its FLOS Register 184 as it is gated into the FLOS Register. When an instruction having this CO bit set is outgated to Control 200, it is not decoded and the FLOS stepping will be stopped, thus arresting issue of further instructions.

The Activate Conditional Ops indicates that I Box 134 has determined that the previously conditionally issued instructions may now be processed. When this signal is sent, any FLOS Register having an unexecuted conditionally issued instruction will have its CO bit latch set off. The previously conditional instructions are now valid and can be issued in the normal manner.

The Cancel Conditional Ops signal is just the opposite of the Activate signal for it indicates that the I Box 134 has determined that the previously issued conditional instructions are not to be executed. This signal when present will turn off the Full bit latch of each instruction having a CO bit set. These instructions will now be issued by the FLOS in cancel mode. In the cancel mode, Control 200 will not select any arithmetic units, store instructions are not processed, and no tags are changed. The FLB's 185 will, if one is involved in an instruction and has its busy tag bit set on, will have a cancel trigger set so that it can send an FLB release signal to I Box 134 immediately if it is already storing an operand or when it does receive the data.

The Set Condition Code (CC) signal is sent to all areas of the machine whenever I Box 134 issues an instruction which can change the state of the condition code register. The CC signal will set the CC bit latch of the instruction then being stored in FXOS 201 or FLOS 184 and will reset the CC bit latch in all other instructions in either the FXOS 201 or FLOS 184. Any instruction which has been conditionally issued will not have its CC bit reset however unless the I Box is operating in conditional mode in which case setting of a CC bit latch in a conditional instruction will not reset the CC bit latch in an unconditional instruction. When the I Box 134 is in the normal mode, the setting on of a CC bit latch in an instruction in FXOS will not only turn off any CC bit latch in all other valid instructions in FLOS 184 (also FXOS 201), but will also reset the CC bit latches in Zeros Tester 553 and any of the Input Buffers 191 of the Adder Unit 188. The net result of the CC bit latch setting is that at most two CC bits can be set at any time, one for the normal instructions and one for the conditionally issued instructions.

The signal Condition Code Outstanding is sent to the I Box whenever a CC bit latch is set in the normal instructions in FXOS 201, in FLOS 184, in Zeros Tester 553, or in an Adder Unit Buffer 191.

The Valid Operation to FLOS signal enables the FLOS to gate in the instruction on Bus 133 and sets the F/E bit to Full to indicate a valid instruction.

The FLR Busy signal is sent to the I Box so long as any FLR has a busy signal set. This indicates that the last instruction issued by FLOS 184 has not been fully executed and thus that processing is still proceeding. When this signal drops, the I Box knows that the FLOS is empty of unconditionally issued instructions.

The six FLB Busy Release signals turn off the busy signals which the I Box 134 turns on when it assigns an FLB 185. When the FLB 185 has received and outgated the operand, or the operand has been cancelled, the busy signal for this FLB 185 in the I Box 134 is turned off to indicate that the FLB is free for another assignment.

The instruction format as transmitted by I Box 134 to FLOS 184 comprises the FLOS control signals i.e., the F/E bit, the CO bit and the CC bit, which have previously been described. In addition to these signals the FLOS 184 also receives the Short/Long (S/L) precision bit, a four bit operation code field, a two bit field to identify the sink FLR 187, a Source Operand (SO) bit to define the source address as either the address of an FLR 187 or the address of one of the FLB's 185 or the SDB 244's, a three bit source address field to identify either an FLR 187 or with a set SO bit, one of the FLB's 185 or an SDB 244.

Floating point buffer bus

The FLB Bus 199 is used to transmit long or short source operands to the floating point execution units, or to the registers of the FXPU 143. The only units which can gate on to the FLB Bus are the six FLB's 185. When any FLB 185 has its GWF-FLBB latch set on and its F/E bit is set to full, a signal is sent to the FLBB Controls 559. The priority among the FLB's 185 is simple priority with the upper FLB having first priority down to the lower unit having least priority. When a request is made for the use of FLBB 199, and if no FLB 185 of higher priority is requesting the Bus, the FLB request is accepted and the FLB 185 will be outgated to the FLBB 199 on the next cycle. During the accept cycle, the unit identified in the FLB sink address register will be notified to gate in the FLBB 199 data during the next cycle. These units which can gate in data from the FLBB 199 are the three source operand registers 191 for the Add Unit 188, the two source operand registers 195 for the M/D Unit, or the Fixed Point Buffers 204, 205, 206, and 207, see FIG. 6.

Floating point registers

There are four Floating Point Registers (FLR) 187, each of which is 72 data bits wide to hold a 64 bit floating point operand and the required parity check bits. An FLR has associated with it a group of status bits to indicate the condition of the operand. These bits are the S/L bit which controls the precision of the next data to be ingated into the FLR 187 or the precision of the data stored therein, the Busy bit which indicates when set that the FLR 187 has been selected to receive an operand from a source connected to the CDB 196, and that the operand, if any, is not available, a group of four tag bits which indicate the source of the operand to be gated into the FLR 187 (Busy bit on) or the source of the operand in the FLR 187 (Busy bit off) and two special multiply tags ME Busy and ME M1/M2 used only in short precision multiply operations as will be set out later. Each FLR 187 also includes a four bit comparator which if the Busy bit is on, compares the setting of the four tag bits with the source addresses on CDB 196, and upon an equal comparison, open the input gates to the data register to gate in the operand on the next cycle.

The status bits are updated on each instruction issued by FLOS 184 in which the FLR 187 is the sink register, unless the data in the FLR is outgated only, i.e., in Store or Compare operations. The updating consists in setting the S/L bit to the precision of the operation, setting the tag bits to the address of the unit which will execute the instruction and turning on the Busy bit.

All FLR's 187 outgate to the Floating Point Register Bus (FLRB) 551 which is connected to be selectively gated into any of the Add Unit Registers 191, or any of the M/D Unit Registers 195, or, for some of the Move instructions, to CDB 196. The FLR's ingate operands only from the CDB 196.

Common data bus

The Common Data Bus (CDB) 196 is capable of transmitting long floating point operands and results between FLB's 185, FLR's 187, SDB's 244, the Add Unit 188, and the M/D Unit 192. Each unit which uses the CDB 196 is assigned an identification, a combination of four binary bits, and when a unit requires use of the CDB to transmit an operand, it must make a priority request for use of the Bus 196. Priority is assigned to the top FLB 185 first, through the FLB's in order to the lowest FLB 185 in sixth place, followed by the three Adder Unit pairs of operand registers 191 on a First in-First out basis, and lastly the two pairs of M/D Registers 195 also on a First in-First out basis. As was noted earlier, when the FLIU requires use of the CDB, it can suspend the priority of the CDB controls so that in effect the FLIU has an overriding priority. When a request is received at the priority part of CDB 196, and no unit with a higher priority is requesting the bus, an accept signal is returned to the requesting unit and the identification of the requesting unit is transmitted to all sampling units on the CDB tag lines. Both of these signals are maintained for one cycle. When the requesting unit receives the accept signal, it will gate out its data to the CDB 196 on the next machine cycle.

Each unit which can sample the CDB 196 has a four bit tag register which will have been set on a decode cycle of the FLIU and a comparator. When the units busy tag is set, it will test every identification sent on CDB's tag lines until it finds a tag equal to the setting of its tag register, and it will then ingate the data transmitted over the bus on the next cycle. Thus when a unit finds that the unit which is to transmit the operand for which it is waiting, is going to put that operand on CDB 196, it opens its input gates to accept the operand.

Since it is quite possible in a two operand instruction for both required operands to be from FLR's 187, and also possible that at the decode time in the FLIU, neither of the FLR's 187 has received its operand, the CDB 196 contains two sets of four bits lines into which each FLR may have its tag bits gated. One of these sets will receive the tag bits from the sink FLR and the other will receive the tag bits from the source FLR. This arrangement will save a cycle on each decode of such an instruction for there will be no need to send the two sets of tags in separate decode cycles. The execution units which scan the tags from the sink FLR 187 are the three sink operand storage registers 191 of the Add Unit 188, the two sink operand storage registers 195 of the M/D Unit 192, and the three SDB's 244. The units scanning the source operand tags are the three source operand storage registers 191 of the Add Unit 188, the two source operand storage units 195 of the M/D unit 192, the four FLR's 187, and the Zeros Tester 553.

As an example of how the sequencing of instructions having dependent operands is accomplished by utilizing the tags of the FLR's 187 in conjunction with the CDB 196, consider the following sample program. It will be noted that in FIG. 5, the FLB's 185 are numbered from 1 to 6, the FLR's 187 are given the even numbers 0, 2, 4, and 6, the three pair of input buffers 191 for Add Unit 188 and the two pairs of input buffers 195 for the M/D Unit have been numbered. The numbers are for identification only as except for priority on the FLB's 185, there is no distinction between the registers of a group.

| Instr. | Reg. | Busy | Tag | Remarks |
|---|---|---|---|---|
| Load FLR0 from FLB1. | FLR0 | 0 | 0 | This is how a Storage-Register load instruction appears to the FLOS. Upon reaching the bottom of the FLOS, the OP is decoded, and a check is made on the status of the sink register FLR0. If a precision conflict exists, the FLOS will wait until the sink FLR has Busy =0 to proceed. |
|  | FLR0 | 1 | FLB1 | When no precision conflict exists a GWF-CDB signal is sent to FLB1 and the sink FLR status is updated. If the FLB is already full or is being loaded, it will request the CDB as soon sa it receives the GO signal. If the FLB is not loaded, it will request the CDB as soon as it becomes full. |
| MULT FLR0 by FLB2. | FLR0 | 1 | FLB1 | Now the FLIU checks for the availability of a multiply unit. If FL0 were not busy, its operand would be transmitted to the selected multiplier, say MD1 sink along with the select signal. Since FLR0 is busy, the tag, FLB1, is sent instead and M/D is thus instructed to get its sink operand off the CDB when FLB1 is using the CDB. The sink FLR tag is updated to M/D1. FLB2 is tagged with the M/D1 address and instructed to Go-When-Full via the FLB bus. When the operand arrives from storage, the FLB2 will transmit it to M/D1's source register. If there is a precision conflict, the FLOS will wait until the register 195 has a Busy=0 before proceeding. |
|  | M/D1 Sink. | 1 | FLB1 |  |
|  | FLR0 | 1 | M/D1 |  |
|  | FLB2 | 1 | M/D1 |  |
| Load FLR2 from FLB3. | FLR0 FLR2 | 1 1 | M/D1 FLB3 | The above occurrences are repeated for this set of OPS using FLR2, M/D2 Sink and different FLB's. |
| MULT FLR2 by FLB4. | FLR0 FLR2 | 1 1 | M/D1 M/D2 |  |
| Add FLR2 to FLR0. | FLR0 FLR2 | 1 1 | A1 M/D2 | Next comes a Register to Register instruction where both FLR's are busy. The sink FLR Tag is updated as before, assuming adder A1 Sink is available. The tag of the source FLR |
| Store in SDB1. | FLR0 FLR2 | 1 1 | A1 M/D2 | is also shipped to A1 source but the source FLR2 is not updated. Only sink FLR's have their tags changed. When the store instruction is decoded, a check is made via the store controls on on the availability of SDB1. If it is available, a select signal is sent to it by the FLOS control. The sink FLR tag A1 was sent to the SDB during the decode cycle of the store instruction. The select signal informs the SDB1 to keep the A1 tag, compare it to the CDB tag, and sample the CDB on the cycle after a match is detected. The sink FLR is not updated on store instructions. |
| Load FLR0 from FLB5. | FLR0 FLR2 | 1 1 | A1 M/D2 | It should be noted that Load Register from Storage Instructions may be executed even though the sink registers are still tagged busy. The only inhibiting condition is a precision conflict. If none exists, the FLB is given the GWF-CDB signal and the sink FLR tags are updated. |
|  | FLR0 FLR2 | 1 1 | FLB5 M/D2 |  |

At the end of this sequence of instructions, the following tag pattern exists:

Register: Tag
- FLR0 — FLB5
- FLR2 — M/D2
- M/D1, Source — 
- M/D1, Sink — FLB1
- M/D2, Source — 
- M/D2, Sink — FLB3
- A1, Source — M/D2
- A1, Sink — M/D1
- SDB1 — A1

None of the units may begin execution until they have received both operands. Therefore, each of the multiplications will start on the cycle after their respective FLB's 185 use the CDB 196 to load the number 0 and 2 FLR's 187. The add operation cannot start until the last multiplication has used the CDB 196. The SDB 244 will sample the CDB 196 when the A1 uses the bus for its result. It does not matter which of the independent multiplications finishes first. Also, the Load Storage to Register instructions are not dependent upon completion of previous instructions except on precision conflicts. The busy bit of an FLR 187 is reset once the tag has been used to sample the CDB. This is also the only time at which the CDB is gated into an FLR.

*Summary of CDB operation*

On the decode cycle, the instruction is decoded, the instruction code and the tags of the busy FLR's 187 are sent to all execution units, the precision of the FLR operands is checked against the precision of the instruction, status changes and the required output gates are set up, and decisions are made about the availability of operands and a unit to execute the instruction. When the conditions are met, the GO signal is generated, and the select cycle is initiated. The unit seletc signal and one of the available register operands are sent on the select cycle.

These decode and select cycles are overlapped so that the decode cycle of instruction 2 is simultaneous with the select cycle of instruction 1. Instructions are issued in strict sequence from FLOS 184 dependent only on the availability of an executing unit if no precision conflict exists. When a precision conflict exists, the register operand(s) must be available (when a conditionally issued instruction is reached in the operation of the FLOS 184, it is not issued, and the FLOS stops until the conditional hold is removed).

Executing units perform their functions as soon after they have been selected as both operands become available. These units acquire storage operands from the FLB's 185 over the FLB Bus 199 either one cycle after they receive the select signal or one cycle after the FLB is loaded from storage, whichever is later. Register operands are either sent with the select signal via the FLR bus 197, or are taken off the CDB 196 when the address of the unit whose result is to be sent over the CDB 196 matches the tag sent to the waiting unit by the FLOS 184.

The use of the CDB 196 and forwarding of tags allows strict sequencing of dependent instructions, out of sequence execution of independent instructions, and simultaneous entry of operands into an FLR 187 and all units waiting for that operand. Two cycles before an arithmetic unit completes execution, it requests the CDB for a time slot for its result. If no priority conflict exists, it will be given the bus at the conclusion of its execution. Bus conflicts may be resolved arbitrarily, since the tags ensure correct sequencing. When a unit is granted the bus, its identifying number is sent to all other units, to the SDB's 244, and to the FLR's 187. SDB's 244 never put anything on the CDB, but take off operands according to the tags. FLB's on the other hand never take any operands off the CDB 196 but request the use of CDB 196 if they are full and a GWF-CDB signal has been received from FLOS 184.

*Unit communication controls*

There are three Unit Communication Controls (UCC) 560 for the Add Unit 188, one UCC 560 for each pair of Input Operand Registers 191, and two UCC's 561 for the M/D Unit 192, one UCC 561 for each pair of Input Operand Registers 195. The FLR's 187 and the SDB's 244 also have elementary UCC's but as the only function of their UCC's is to monitor the busy status and tag register to detect an ingate condition from the CDB 197, these UCC's will not be further described herein. The purpose of the UCC's 560 and 561 for the Add Unit 188 and the M/D Unit 192, respectively, is to control the gating of the operands from the three data busses FLR Bus 551, FLB Bus 199, and CDB 196 into the operand storage registers 191 and 195. Each UCC 560 and 561 receives the following information during the decode cycle:

(1) *Sink Tag*.—The sink tag is a 4-bit tag which identifies the sink operand source. A non-zero tag identifies a unit whose result on the CDB 196 will become the sink operand. If the sink tag bits are all zero, the sink operand will be coming from the FLR's 187 via the FLR Bus 551.

(2) *Source Tag*.—The source tag is a 5-bit tag which identifies the unit supplying the source operand. The bit field contains four bits identifying the source of an operand on the CDB, and an SO bit specifying the FLB's 185 as the source. If the source tag bits are zero and the SO bit is one, the source operand will come from one of the FLB's 184 via the FLB Bus 199. When the source tag is zero, and the SO bit is zero, the source operand will come from one of the FLR's 187. If the source tag is nonzero, the tag will identify a unit whose result on the CDB 196 will become the source operand.

(3) *Bus Tag*.—The bus tag is a 4-bit tag which identifies the unit whose result will be transmitted over the CDB 196 during the next cycle.

(4) *S/L Bit*.—The S/L bit is a part of the instruction field from FXOS 184. It indicates whether the operation will be short or long precision.

(5) *Select Bit*.—The select bit signifies that the information which was gated in from the control Unit 200 is valid for this unit.

The operation of each UCC 560 and 561 with references to the flow charts FIGS. 39, 40, 41 and 42 is as follows:

The select line, when it appears, will turn on the unit busy trigger 563. While the UCC is not busy, the sink and source tag fields and the S/L bit from the FXOS Control 200 are ingated into their respective latches. It should be remembered that the tag field, S/L, and the read in latches are set each cycle if a set condition signal is present, and are reset if they were on and the set condition signal is not present. If the unit busy trigger is on, the tag field and S/L triggers will become locked at the start of the next cycle, whereas the read in triggers, after being turned on, will be reset and held off to prevent further reading in to the latches.

The FLIU sends the sink and source tag bits for each operation at the same time and shortly after the select signal has latched up the unit selected in the previous cycle.

The select line is a private line from FLOS control 200 to each execution unit, and as mentioned previously, sets the unit busy trigger, which inhibits the read-in of any following tags. The read-in triggers for each bus (sink and source) are set upon condition each cycle. If the unit is selected, these triggers will be reset at the start of the next cycle and will be held reset.

The operands for any arithmetic operation can appear on the data busses as in this table:

| Source Operand | Sink Operand | Sink Tag | Source Tag |
|---|---|---|---|
| CDB 196 | CDB 196 | ≠0 | ≠0 |
| CDB 196 | FLR Bus 551 | =0 | ≠0 |
| FLR Bus 551 | CDB 196 | ≠0 | =0; SO=0 |
| FLR Bus 551 | FLR Bus 551 | =0 | =0; SO=0 |
| FLB Bus 199 | FLR Bus 551 | =0 | =0; SO=1 |
| FLB Bus 199 | CDB 196 | ≠0 | =0; SO=1 |

The two operands can be read in from the CDB 196 on the same cycle if the one operand is doubled. The source tag and the sink tag are then identical, and both sink and source full triggers, and CDB operand read-in triggers, are turned on. When both operands are to come from the FLR's 187 it is not possible to determine which operand comes from a particular FLR, since the tags for both operands are zero. The FLIU will send the source operand over the FLR Bus 551 before the sink operand if the source operand is available. For this case, the UCC will not turn on the sink-full trigger and will not generate a sink register ingate signal until the source read-in trigger is reset. The sink read-in trigger, however, will be set and held for two cycles.

If either of the operands are coming from the CDB 196, the time at which the data will appear with respect to the select cycle is undefined. If either of the operands is coming from the FLR Bus 557, the earliest time at which the data can be received is the next cycle after the select signal is received. If the source operand is from the FLB Bus 199 the earliest time at which the data can be received is the second cycle after the select cycle.

The source tag bits are examined for an all-zero condition, Block 564. If the all-zero condition is not present, entry point 1, FIG. 40, and the source tag is identical to the bus tag, Block 565 (determined by exclusive or circuitry on a bit-by-bit basis), the following will occur:

(a) If the unit busy trigger is on, Block 563, indicating that this unit has been selected and the source-full trigger, Block 567, has not been set, the source-full trigger and the CDB Read-In trigger will be turned on.

(b) If the unit busy trigger, Block 563, is not on, the source-full trigger and the CDB Read-In trigger will be set, but no operand will be ingated.

If the unit busy trigger, Block 563, is on, the CDB read-in signal for this unit's source operand storage will be generated. If this is a long precision operation, the entire source reservation station is read into; for a single short-precision operation, only the high-order source operand bits are read in. This is true for all operand read-in signals. The source-full trigger will be reset when the unit receives a CDB accept signal. If the unit busy trigger is not on, the source full trigger will be reset at the next cycle unless there is a tag match and information will be read in.

Figure 39:
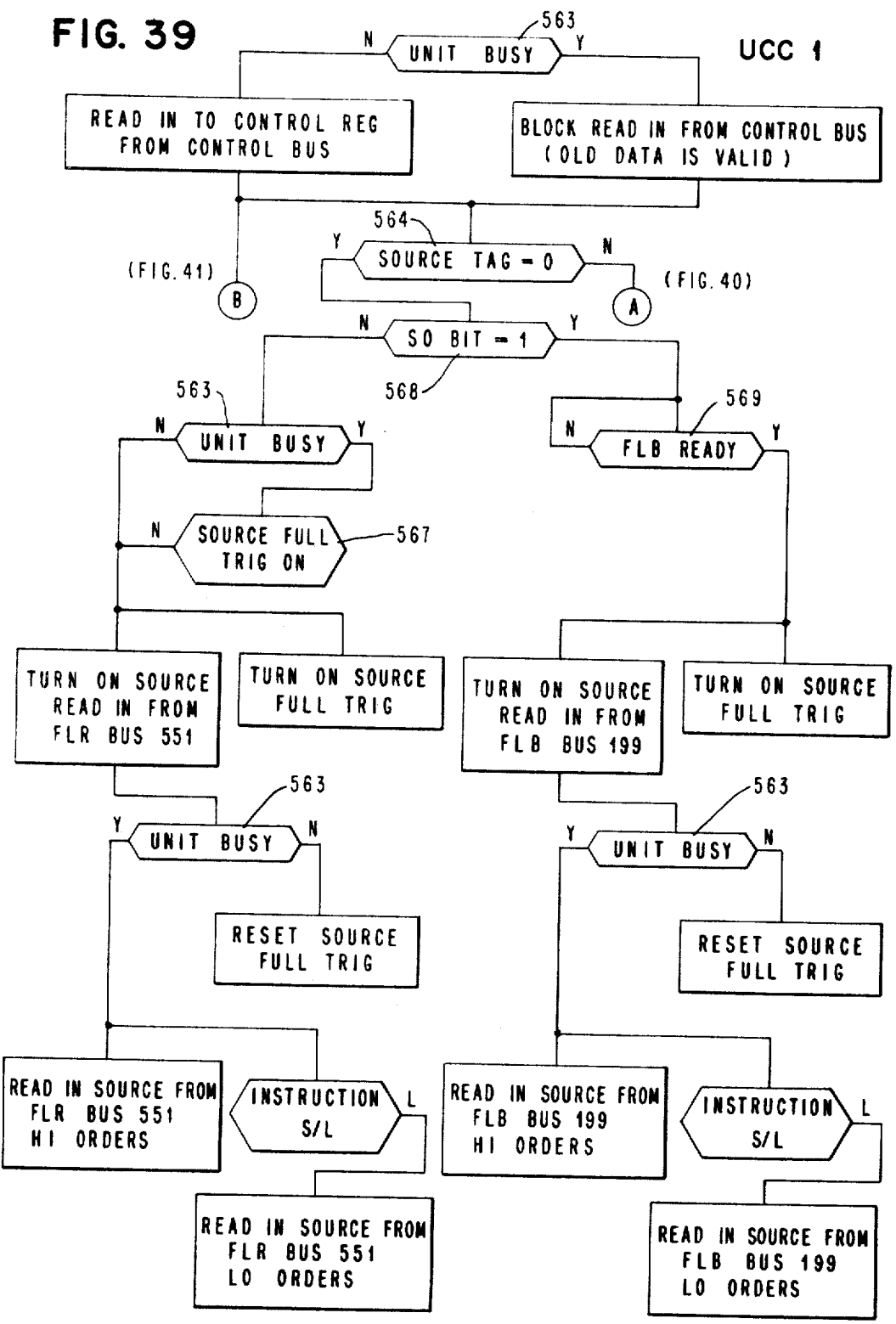

The situation, see FIG. 39, where both the source tag field and the SO bit are zero, Block 568, is also a possibility. If the unit is busy, Block 563, and the source full trigger is not set, Block 567, or if the unit is not busy, both the source read-in from FLR Bus trigger and the source-full trigger will be turned on. If now the unit goes busy, data will be read in from the FLR Bus 551 into the source operand storage register.

If the source tag field is zero but the SO bit is one, Block 568, and the FLB ready line, Block 569, is set, the source-full trigger and the source read-in from FLB Bus trigger will be set. If the unit is busy, Block 563, the FLB Bus will be read into the source operand storage register.

Figure 41:
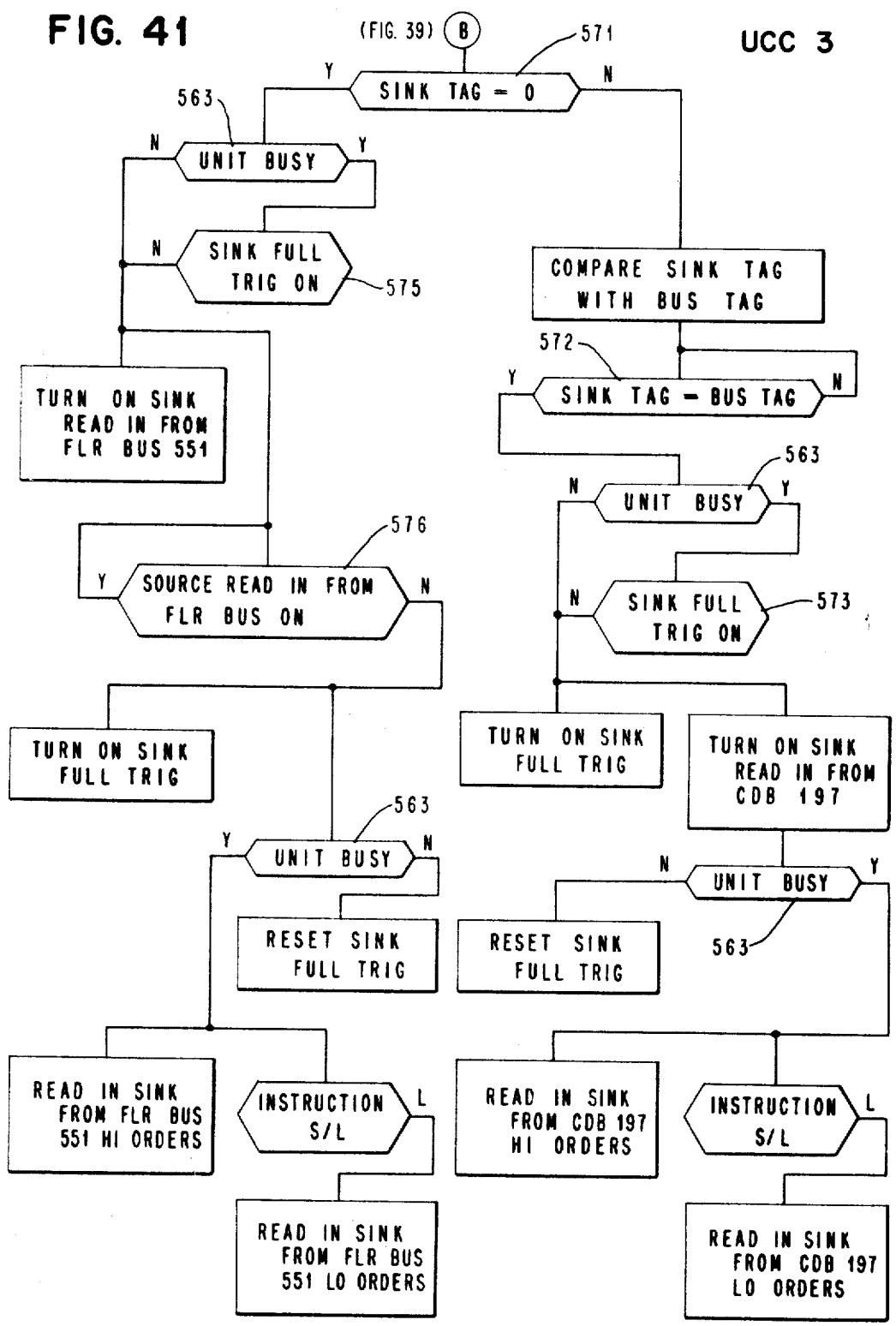

The sink tag field is also examined, see FIG. 41, for an all-zero condition, Block 571. If the all-zero condition is not present and the sink tag is identical with the bus tag, Block 572, the sink-full trigger and the read-in from CDB trigger will be turned on provided that:

(a) the unit is not busy, Block 563, or
(b) the unit is busy, Block 563, and the sink-full trigger, Block 573, is off.

If the unit is busy, Block 563, the read-in sink operand signal is generated, and the sink-full trigger will be reset when the unit receives an accept signal. If the unit is still not busy, the sink-full trigger will be reset in the next cycle, unless there is another tag bit match.

If the sink tag field is zero, Block 571, the sink read-in from FLR Bus trigger is turned on provided that the unit is not busy and also if the unit is busy but the sink-full trigger, Block 575, is not on. The sink-full trigger is set under these same conditions provided that the source read-in from FLR Bus trigger, Block 576, is not on. If the unit is busy, and the Block 576 is not on, the signal for read-in from the FLR Bus into the sink operand storage register is generated.

Figure 42:
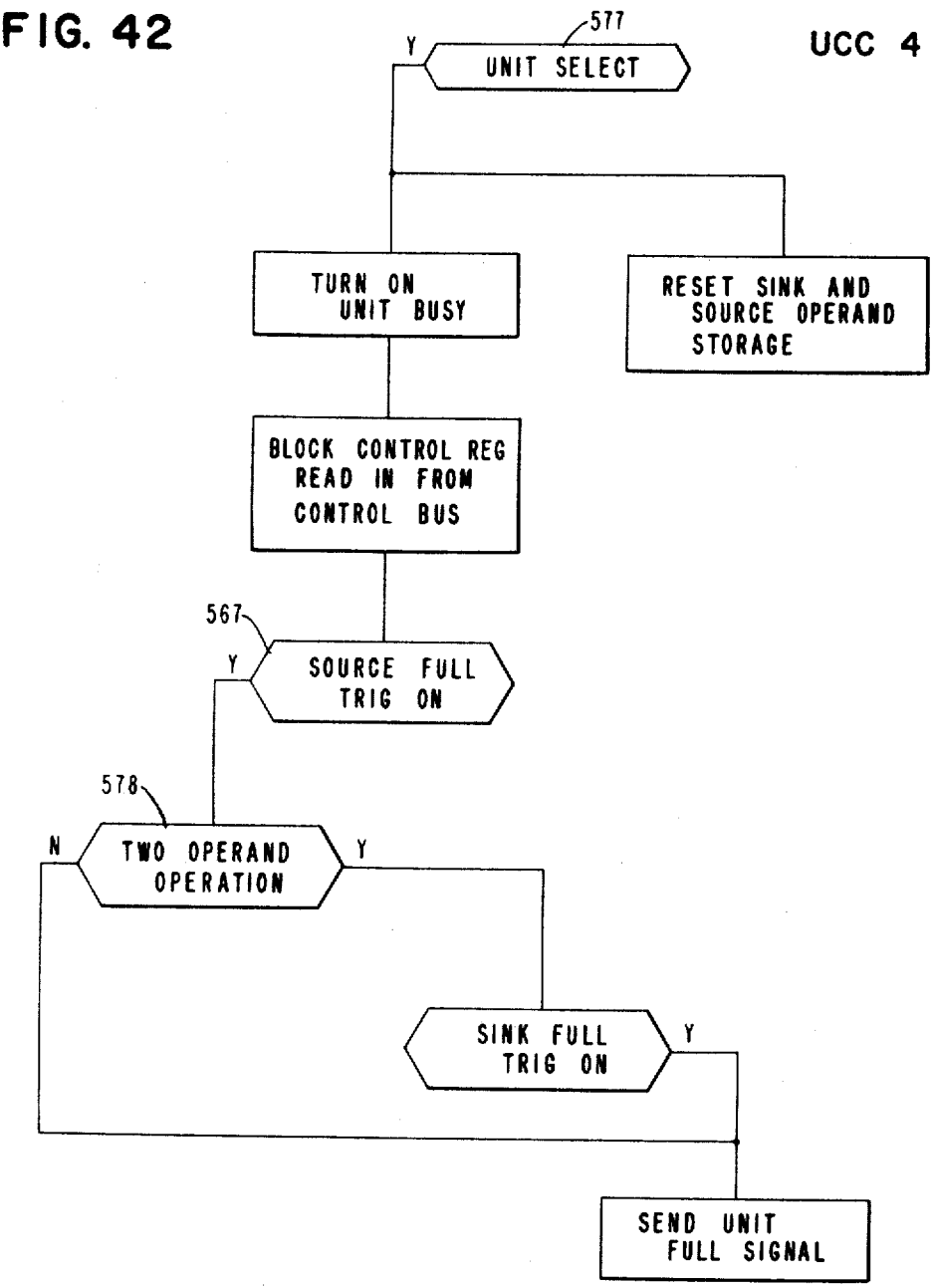

The select signal for a particular unit, Block 572, FIG. 42, will also reset the unit's operand storage registers and will transmit a unit-full signal to the start control unit if:

(a) the source-full trigger, Block 578, is on, and it is a one-operand operation, or
(b) it is a two-operand operation, Block 578, and both source and sink full triggers are on.

The sink-full trigger will be normally reset when the unit receives an accept signal. However, if the unit busy trigger is not on, Block 563, FIG. 41, the sink-full trigger will be reset at the next cycle, unless there is a further tag match.

*Floating point add unit*

Floating point number systems are generally used for scientific types of computation as contrasted to commercial computation for the range of numbers in scientific arithmetic can range from very large to extremely small in value, while commercial operations use a much smaller range. Another distinction is in accuracy of results where the scientific operations are concerned more with relative magnitudes, with little interest in the low denominations of the operands, whereas commercial calculations must be exact to the lowest denomination. The floating point number system has the advantage of a built-in scale factor to express almost all numbers of whatever magnitude to the same accuracy. Conventionally, a floating point number will be written as a fraction part multiplied by a base digit raised to some exponent, e.g.

.5486912 . . . ×10 to the fifth power

The floating point section of the preferred embodiment of the invention writes floating point numbers with hexadecimal digits (base 16) and will write the magnitude of the fraction part as either 6 or 14 hexadecimal digits (short or long precision, a hexadecimal digit being four binary bits). An exponent of seven binary bits expressing a number from 0 to 127 decimally is written in bit positions 1 through 8, and since the exponent is expressed in an excess 64 notation, the actual value of the exponent can range from a −64 to +63. The base which is raised to the exponent is 16, but as this base value is constant, it is implicit and need not be expressed in the floating point number representation. The leftmost bit of the floating point number is the sign bit to indicate whether the fraction whose magnitude is given is a positive or a negative value.

The steps involved in the addition or subtraction of two floating point numbers start with a comparison of the exponents of the two numbers involved to determine which number has the smaller exponent and the difference between the exponents. For each unit of the exponent difference, the smaller number is shifted one hexadecimal order (4 binary bit positions) to the right and its exponent increased by one unit until the exponents are the same. In the present embodiment all of this shifting and exponent updating may be done in one step. When the two numbers have the same exponent, they may be added or subtracted as required unless the shifting needed for the smaller number is such as will shift it entirely out of the significant hexadecimal denominational orders, i.e. 6 for a short precision, or 14 for a long precision number, in which case, the larger operand is retained unchanged. If the operation is add, it is possible that there has been a carryout of the highest hexadecimal denomination. If there has been such a carryout, the entire result is normalized by being shifted one order to the right and the exponent incremented by a unit. On the other hand, it is possible in a subtract operation that there will be one or more hexadecimal orders at the left end which have only zero bits therein. This result will be normalized by a determination of the number of consecutive hexadecimal digits at the left end, a left shift of that number of hexadecimal denominations, and an updating of the exponent by subtracting that number from the original exponent. It is to be understood that a normalized number in the present embodiment is a number which has a significant digit representation in any one or more of the four left end bit positions, and not as in binary machines where the left bit position of a normalized number must contain a significant digit representation. If the adder output for either addition or subtraction is a normalized number, no output shifting or exponent updating is required. It may also be noted that there are a number of unnormalized addition and subtraction operations, and for these there will be no shifting of the result, and only so much shifting of the inputs as is needed to bring the exponents to equality.

The above description is based on the assumption that the larger number has a positive sign in which event a carryout of the highest order meant an overflow requiring a one digit right shift in an addition operation, or a positive remainder in a subtraction operation. Since, as will be shown, only the smaller input number can be right shifted, and as there is no True/Complement circuit between the shifter and the Adder input, the smaller number will always be entered into the Adder 188 in its original form as a true magnitude. The larger number is entered through a true complement unit and will be entered as the complement for all operations on which the effective sign is negative. The effective sign is the sum, modulo two, of the number of negative signs between the sink operand, the source operand and the operation sign. If there are none, or two negative signs, the effective sign is positive, and if there are one or three such signs, the effective sign is negative.

There are two possible interpretations for a carryout of the highest order of the floating point adder, for if the effective operation is addition, a carryout indicates an overflow condition requiring a right shift of four bit positions and exponent incrementing for normalizing, but if the effective operation is subtraction, a carryout indicates a negative remainder, and with the entry of the carryout as an end around carry, the so-called "fugitive one," the adder output is the correct magnitude of the negative remainder and will be gated out true. If there is no carryout, the remainder is positive and will be complemented at the output of the adder. Thus, an effective sign indication of subtraction always causes complementing of the input through the true-complement gate, and causes either complementing of the adder output, if there is no carryout, or an end around carry within the adder if there is a carryout.

*Add unit instructions*

The floating point add unit performs the following set of instructions, all in either short or long precision:

(1) Add Normalized
(2) Add Unnormalized
(3) Subtract Normalized
(4) Subtract Unnormalized
(5) Compare
(6) Load Complement
(7) Load Negative
(8) Load Positive
(9) Halve The adds, subtracts and compares are two operand instructions and the remainder have only the one operand. All instructions will set the condition code except the halve instruction. The operation of the Add Unit for the two operand adds and subtracts has been set out above, and compare is considered to be a subtract operation, but the result is not gated out of the Adder since only the setting of the condition code is desired. As a special feature to improve precision of a short precision instruction, the smaller operand is gated into 28 bit positions rather than the 24 bits of a short precision fraction, the extra four bits being on the right end to preserve through the adder one digit which would otherwise be shifted out and lost. The digit thus preserved through the Adder is not gated out of the Adder output, but could cause a change in the next left digit if an end around carry occurred within the Adder.

In the one-operand instructions, the source operand is the only one in the operand storage registers 191 for the instruction, and will be gated out true through the true-complement input into the adder input and there added to zero. For Load Positive, the output sign is forced positive, for Load Negative, the output sign is forced negative, and for Load Complement the output sign is inverted. For the Halve operation, the output is shifted one bit position to the right in the result register outgating circuits and the exponent and sign bits are unchanged. The result will not be normalized if the highest hexadecimal order position is thereby set to zero.

*Floating point add unit structure*

The data paths for the parts of the operands in the Add Unit 188, FIG. 5, are shown in detail in FIG. 43. Here, the operand storage registers 191, are shown as each separated into four parts, the 56 bit fraction magnitude part, the seven bit exponent magnitude part, a group of seven bits, each bit being the parity of one fraction byte, and a parity bit for the exponent. There are six registers in each group, three for sink (SK) operands, and three for source (SR) operands, the three pairs of registers enabling three Add Unit instructions to be buffered until their operands are available.

Considering first the exponent side, the two exponents for the two operands to be processed are gated out of the buffers 191, onto Bus 580 for the sink exponent and onto Bus 581 for the source exponent. The two exponents are gated into the inputs of Exponent Subtractor 582 where the sink exponent is subtracted from (by adding its complement) the source exponent. This order is selected to simplify the hardware for one operand instructions where the source operand is the only one used. If the source operand has the larger exponent, there will be a carryout signal on a Line 584 from the highest order of Subtractor 582, and the Subtractor output on Bus 585 will be the true value of the number of hexadecimal digit orders which the sink operand must be shifted to the right in a Digit Preshifter 592 to equalize exponents. If there is no carryout signal on Line 584 from Subtractor 582, the sink operand is the larger and the signals on the output Bus 585 of Subtractor 582 are the complement of the number of hexadecimal digit orders which the source operand is to be right shifted in Preshifter 592. When the two exponents are equal there will be a carryout signal on Line 584, but the result on Bus 585 will be equal to zero indicating no shift of the operands, and since there is a carryout of Subtractor 582, it is the sink operand which will be passed through the Preshifter 592.

On the fraction side of FIG. 43, the source and sink fraction parts of the operand storage registers are gated to the Source Bus 588 and to the Sink Bus 589, respectively, as will be later described. The Busses 588 and 589 connect to an Assign Gate 586 which is controlled by the signal on Line 584 from the exponent carryout. If there is a significant signal, then the source operand on Bus 588 is gated out to a True-Complement (T/C) Unit 591, and the sink operand on Bus 589 is gated out to Preshifter 592, but if there is no significant signal on Line 584, then the sink operand on Bus 589 is directed to the T/C Units 591, and the source operand on Bus 588 is gated to Preshifter 592. The T/C unit is controlled by a Line 593 from the UCC 560, to be later described, to pass the operand either in true or ones complement form for an effective addition or subtraction as above noted.

The output signals of Subtractor 582 on Bus 585 are converted in a Decoder 595 to control signals for Preshifter 592. Preshifter 592 is substantially similar in function and structure to Shifter 218 of the FXPU 143 but is smaller in that it has only two levels of gating and can only right shift. The first level of gating can shift the 56 bit fraction operands 0, 1, 2, or 3 hexadecimal digits to the right, and the second gating level can shift the operands either 0, 4, 8, or 12 hexadecimal digits to the right, enabling any shift from 0 to 13 digits. The gates in each level are controlled by signals from Decoder 592 and by a S/L precision signal on a line 596 from the USS 560, so that if the shift is 6 or more for a short precision fraction, or is 14 or more for a long precision fraction, no operand is passed through the Preshifter 592, and for short precision fractions, only the left 28 bits of the shifted number will be grated out for the reason set out above.

The two operands from the T/C Unit 591 and Preshifter 592 are entered into a Main Adder 597 of the carry propagate type, see the description of the CPA 276 in the FXPU above, and their sum is gated out through a True-Complement Interface 598 into a set of Latches 599. The T/C Interface 598 is controlled as above noted by the effective sign signal on Line 593, and by the carry-out signal on a line 601 from Main Adder 597, to complement the adder result signals, if, as above noted, the effective operation is subtraction and there is no carryout signal on Line 601. The output of Latches 599 goes to a Zero Detector 602 and a Postshifter 603. The Zero Detector will, if there is a carryout in an effective subtraction operation, decode the Main Adder result from Latches 599 to determine how many of the consecutive hexadecimal digits starting at the left end are zeros and will put this number on a Bus 605. The number on Bus 605 will be converted in a Decoder 606 to a number of shift control signals which are supplied to Postshifter 603. Decoder 606 is also controlled by the effective sign Line 593 and by the Main Adder Carryout Line 601 to cause a shift of the Main Adder Result in Latches 599, one hexadecimal digit to the right if there has been a carryout in an effective addition operation, or to shift the result to the left the number of digits indicated by Detector 602 if the effective operation is subtraction.

The Postshifter 603 is similar to Preshifter 592 in that it has two levels of gating, a first level for left shifts of 0, 1, 2, or 3 digits, and a second level for left shifts of 0, 4, 8, or 10 digits. There is a build-in right shift of one denominational order so that a zero shift is effectively a one digit right shift and all left shifts will appear as a set of control signals from Decoder 606 for one more than the correct left shift. The maximum left shift for which Postshifter 603 can be set is 14 digits which is effectively as 13 denominational order left shift to put the right hand digit into the left denominational order. A fourteen denomination left shift can be determined by Zeros Detector 602 when the result is all zeros, but Decoder 606 will not respond to this extent of shift and none of the gates of Postshifter 603 are opened so there will be no number passed through to the Latches 189. The output of Postshifter 603 is gated into the Add Result Latches 189 from which it may be gated to CDB 197.

Since any shift in postshifter 603 changes the magnitude of the fraction output, the exponent part must be updated when a postshift is made. The larger exponent of the two in Register 191 for the two operands being processed is gated out on a Bus 607 to one input of an Exponent Update Unit 609. The other input of Updater 609 is gated to either the output Bus 605 of Zeros Detector 602, or to a line 610 which is activated when an overflow condition is detected in Decoder 606. The Exponent Updater 609 will subtract from the exponent value on Bus 607, the shift value on Bus 605, or will effectively add one of the exponent if a right shift signal is present on Line 610. The updated exponent at the output of Updater 609 is gated into a seven digit section of Result Latches 189 and is gated out of Latches 189 to CDB 196 with the fraction magnitude.

*Error checking*

The checking of Add Unit 188 for errors in generally a conventional parity scheme with parity of inputs and outputs checked at the byte level and internal parity checked to the four bit digit level. Considering briefly the checking of the exponent side of FIG. 43, the exponent byte on Bus 580 for the sink operand is gated into a Parity Generator 611 where two parities for the two digit halves thereof are generated on a two line Bus 613, and the two parities combined to a single parity bit on an output Line 614. The parity bit in the operand word for the exponent byte is gated on a line 615 and both Line 514 and 615 are inputs to an Exclusive Or 617 which will put an error signal on Input Error Line 618 if the two parities are different. An identical parity generator 620 receives the source operand exponent on Bus 581 and generates two digit parities on Bus 621 and a byte parity bit on Line 622. Line 622 and the parity bit on line 624 are combined in Exclusive Or 625 to put an error signal on Input Error Line 618 if the source exponent has a parity error.

There is a corresponding parity checking logic for each byte of the source and sink operands. The sink operand on Bus 589 is an input to parity generator 627 which generates 14 digit parities on a Bus 628, and seven byte parities on a Bus 629. The parity bits on Bus 629 are individually combined in Exclusive Ors 631 with the parity bits from the original sink operand and the outputs of the Exclusive Ors 631 are ORed together to an Input Error Line 632 to signal if any corresponding pair of parity bits are different. The source operand on Bus 588 is similarly passed to Parity Generator 635 which puts out the 14 digit parity signals on a Bus 636 and seven byte parity signals on a Bus 637. Bus 639 carries the original parity bytes from the original source operand and its bit signals are combined in Exclusive Ors 640 with the signals on Bus 637 to generate individual byte parity error signals which are combined to a single error signal on Input Error Line 632. These Exponent and Fraction parity checks will detect any single bit error in the operands entering the Add Unit 188.

To check the correctness of operations within the Add Units 188, the digit parity Busses 628 and 636 are inputs to an Assign Gate 641 controlled by line 584 to switch the source and sink digit parity bits to Bus 642 for the operand with the larger exponent, and the other operands digit parity bits to a Parity Preshifter 645. Parity Preshifter is similar to Preshifter 592 but is smaller and shifts its input to the right one position for each unit of exponent difference rather than four bit positions as in Preshifter 592. Parity Preshifter 645 is controlled by the output of Decoder 595 and acts to eliminate from its output those digit parity signals corresponding to digits eliminated in Preshifter 592. The remaining parity bits from Parity Preshifter 592 are sent to Parity Generator 649 which generates a single parity bit for its output. The two parity bits from Parity Generators 644 and 649 are combined to a single parity bit for both input operands in Parity Generator 651 which single parity bit is sent to a Latch 652.

This single parity bit must be combined in a Parity Generator 653 with the parity of the carries generated within the Main Adder 597. The Carry Parity Generator and Predictor 655 is responsive to the Main Adder input operands from T/C Unit 591 and Preshifter 592 and to the carry signals generated within the Main Adder 597 to generate predicted carry signals. This Carry Parity Generator and Predictor 655 is functionally similar to that shown in U.S. Patent No. 3,078,039, issued on Feb. 19, 1963 to S. F. Anderson, and titled, "Error Checking System for a Parallel Adder." There is a minor difference in that the checking system of the patent is applied only to alternate denominational orders of the Main Adder 597 and will thus detect any error which would affect a plurality of denominational orders and may not be detected by a parity check. Single errors not found by the carry checking system will be found by the conventional parity checking of the carry signals. The output of this Predictor is held in a set of Latches 656 which can be gated out to a set of Exclusive Or Circuits 657 to compare the actual carry signals with the predicted ones and send a signal on an intermediate Error Line 659 if a mismatch is found. At the same time the carry signals from Latches 656 are sent to the Parity Generator 653 where the predicted parity of the output of Main Adder 597 is generated on a Line 660. The output signals from the Main Adder Latch 599 are entered into another Parity Generator 661 which provides a single parity bit for the entire sum on a Line 663, and the parity signals for each digit of the sum on a Bus 664. The signals on lines 663 and 660 are combined in an Exclusive Or 665 to generate a signal on a second Intermediate Error Line 667 if the predicted and actual sum parity signals are not the same.

The parities of the digits on Bus 664 are entered into a Parity Postshifter 668, where they are shifted either right one position or left up to 13 positions. Parity Postshifter is similar to the Digit Postshifter 603 and is controlled by the same signals from Decoder 606 to shift the parity bits the same number of positions as the digit positions the Main Adder sum is shifted resulting in elimination of those parity bits corresponding to shifted out digits. The remaining digit parity bits are combined in a Parity Generator 669 to supply the byte parity bits for the sum to the Result Latches 189. The actual sum gated onto CDB 196 from the Result Latches 189 is converted in a Parity Generator 671 to the byte parity signals which are compared in Exclusive Ors 672 with the predicted byte parity signals from Parity Generator 669 to generate an error signal on a Result Error Line 673 if any mismatch is found.

The correctness of the Exponent operations is checked in a similar but simpler manner. The digit parity bits from Parity Generators 611 and 620 on Busses 613 and 621, together with the predicted carry signals from Exponent Subtractor 582, as generated in a carry Generate and Predict Circuit 675, and held in a Latch 676, are combined in a Parity Generator 677 to determine the predicted exponent difference parity on a Line 679. The parity of the actual exponent difference on Bus 585 is generated in Parity Generator 680 and combined in Exclusive Or 681, to generate a signal on Intermediate Error Line 683 if there is an error. Also the actual carries from the Exponent Subtractor are compared with the predicted carries in a set of Exclusive Ors 684 to signal any carry error on Intermediate Error Line 685. The final exponent byte is checked by generating the parity of the high order digit on Bus 607 in a Generator 687, the parity of the low order digit on Bus 607 in a Generator 688, the parity of the high and low order digits on the Zero Detector Bus 605, or on Bus 610 in Generators 689 and 691, respectively, and combining these parities together with the carry signals generated within the Exponent Updater 609 in a parity generator 692, to determine the predicted parity of the exponent. This predicted parity will be held in an output Latch 189, and when the Result Operand is gated to CDB 196, it will be compared in an Exclusive Or 696 with the parity of the actual exponent on CDB 196 as supplied by Parity Generator 695. Any difference between the predicted and actual parity will result in an error signal on Result Error Line 697.

*Add unit controls*

The Unit Communication Controls (UCC) 560, FIG. 5, whose operation has been described above, and with reference to FIGS. 39, 40, 41 and 42, are shown in FIG. 44. There are three UCC's 560, one for each sink-source pair of operand storage registers 191. Each UCC 560 comprises a four bit Sink Tag Register 701 and a Source Tag Register 702, which are set on every instruction decode cycle by Control 200, FIG. 5, in accordance with the instruction over the Common Sink Tag Bus 703 and Common Source Tag Bus 705, respectively, so long as the unit adder represented thereby is not selected. Each pair of operand storage Registers 191, and the corresponding UCC 560, are considered to represent an add unit for only one add result can be gated to CDB 196 on any cycle, and it has been found that a common Add Unit 188 with three sets of input buffer registers can do the same work as fast as three completely separate add units. When the source tag is zero, FIG. 39, the Source Ingate Control 706, when the unit is not busy, or when the Source Full Trigger 707 is off, with a set Unit Busy Trigger 709, will condition the Source Gate 710 to gate in the operand from the FLR Bus 551, FIG. 5, or the FLB Bus 199 and to set the Source Full Trigger 707 when the unit adder is identified on the FLR Bus or FLB Bus tag lines. If the Unit Busy Trigger 709 is now set by a select signal from Control 200 on an individual Unit Select Line 711, the operand on the FLR Bus 551, or FLB Bus 199, will now be gated into the Source Operand Register 191 for the selected unit adder.

Figure 40:
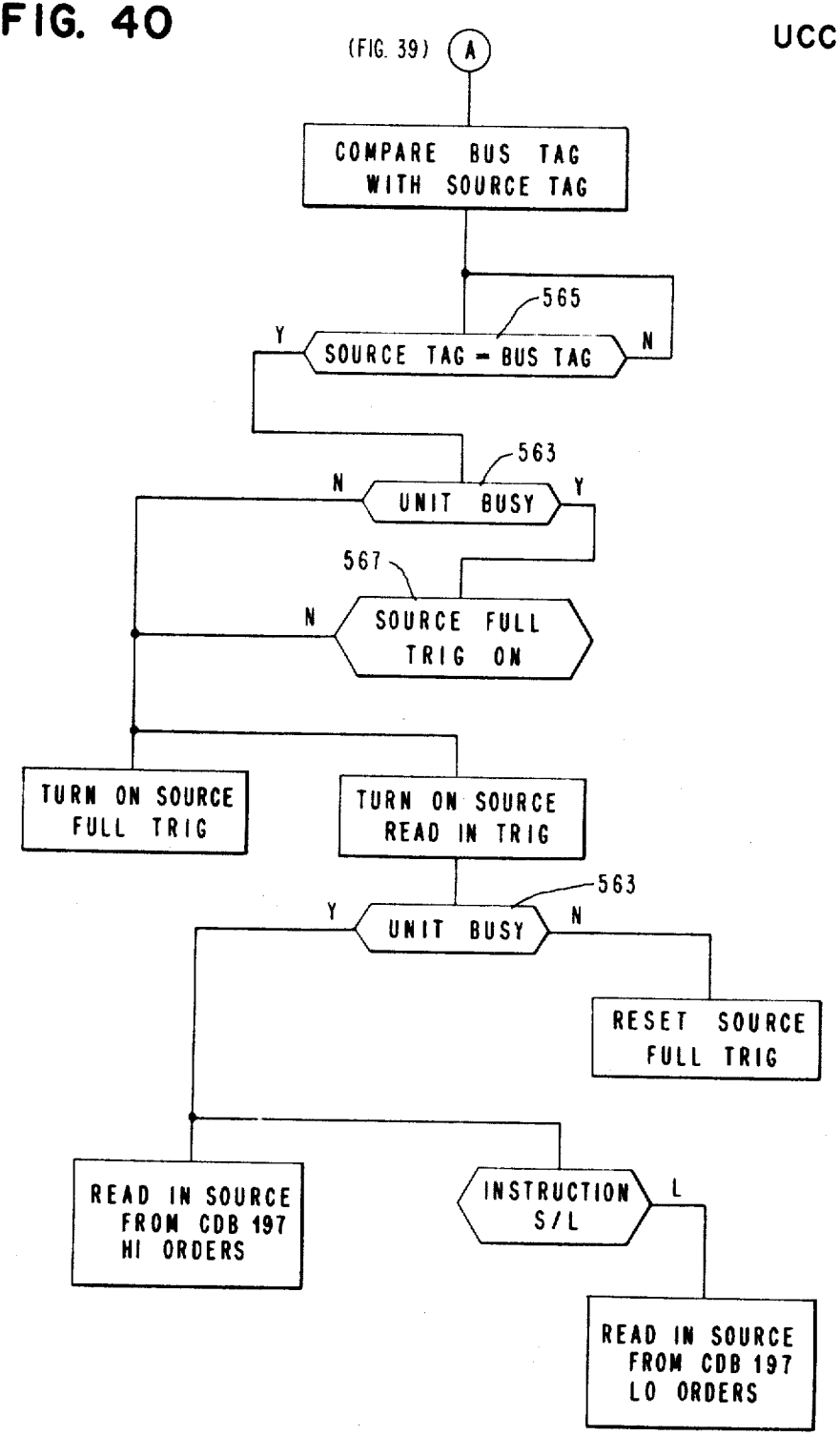

If the source tag is not zero, the source tag in Register 702 is continuously compared with the CDB 196 tag on lines 712 in a Source Comparator 713, see the flow chart FIG. 40. When equality is not found, or if the equality is found and Source Full Trigger 707 is not on, the read-in Gate Controls 710 are set to read in the source operand from CDB 196, and if the unit is now selected by a signal on Unit Select Line 711, the operand will be gated in from CDB 196 to the corresponding Source Operand Register 191.

A similar set of controls are in the UCC 560 for the sink operand, see the flow chart, FIG. 41. If the sink tag in Register 701 is zero, and the Unit Busy Trigger 709 is not on or if it is on, then the Sink Full Trigger 713 is off, the Gate in Sink Operand Control 714 will be set to gate the sink operand into Sink Operand Register 191 when the unit is named on the FLR Bus 551, unless the Source Gate Control 710 is on and the source operand is being gated in. If the source tag in Register 701 is not zero, then when the CDB 196 tag on Lines 712 is compared with, and found equal to, the number in the Sink Tag Register in a Sink Tag Comparator 716, the Sink Full Trigger 713 and the Sink Ingate Control 717 are set to control Sink Gate Control 714 for storing the sink operand in the corresponding Sink Register 191. If the unit is now selected by Control 200 setting the Unit Busy Trigger, the next operand on CDB 196 will be gated into Register 191.

When the Unit Busy Trigger 709 is on and both the Sink Full Trigger 713 and Source Full Trigger 707 are set to indicate that both operands are stored in Registers 191, the Unit Full Trigger 718 will be set to signal on a Line 720 that the unit is ready for execution of its operation. It should be understood, as indicated in FIG. 42, that if the instruction is a single operand one, the Unit Full Trigger 718 will be set when only the Source Full Trigger 707 and Unit Busy Trigger 709 are set on.

The Start Control 726 is to establish a priority for starting an add operation for any add unit (pair of operand storage registers 191 and UCC 560). The Start Control will give priority to the units in the order in which they have been selected, but only if the Unit Full Trigger 718 is set on. A two denomination counter 727 capable of being incremented and decremented is used to keep a count of the number of add units selected at any time. The counter is incremented by a signal on a Select Line 711 for any of the add units entering an Increment Control 728 and will be decremented each time an accept signal is received on one of the three Accept Lines 730 connected to the Decrement Control 731. Counter 727 does not wrap around and cannot be incremented above three, nor decremented below zero. When at three the Counter 727 prevents Control 200 from issuing any more add unit select signals and when at zero it blocks any further requests for CDB 196 time slots. The Increment and Decrement Controls 728 and 731 are interconnected so that simultaneous select and accept signals on lines 711 and 730, respectively, will cancel each other and not alter the value in counter 727.

The control over add unit start signals is exercised by a Push Down Stack 732 which is essentially a three stage shift register having two bit positions per stage and each stage of which can be set to a zero condition to represent an empty stage or to one of three values to represent one of the three add units. The value in Counter 727 is used in the Stack Input Circuits 734 to indicate how many stages of Push Down Stack 732 are set, and which stage of the Stack 732 should be next set. A signal on a Select Line 711 in conjunction with the Counter 727 value activates the Stack Input Circuits 734 to set the lowest available stage of Stack 732 to represent the add unit selected. The unit representing settings of the stages of Stack 732, together with the signals from the Unit Full Trigger 718 of the three UCC's 560, are received by a Priority Control 735 which will select the next add unit to be sent a start signal. The Priority Control 735 as above noted will select the add units in the order of their selection provided the Unit Full Trigger 718 is on. Selection of an add unit is enabled by the setting of a Start Trigger 736 for the unit selected which will set signals on Start Lines 738 to gate the operands of the add unit selected into the Add Unit 188 circuits, FIG. 43, and will simultaneously set a request trigger for a time slot on the CDB Bus 196. When a Start Trigger 736 has been set, its signals are sent to a Stack Reset Control 739 which will reset the stage of Push Down Stack 832 which contains the identification of that add unit. Such clearing of a stage of Stack 732 will cause every higher stage to be pushed down one stage to shift the order of priority. The request trigger will remain on until the CDB 196 sends an accept signal for the unit on one of the Lines 730.

It is to be noted on FIG. 43 that the Add Unit 188 has two sets of latches for the fraction part of the operands, the Intermediate Latches 599, 656, and 652, and the Result Latches 189, and thus two sets of operands can be in process simultaneously, one set being entered into the Main Adder 597, and the earlier set being transferred into the Result Latches 189. It is then possible to have a Start Trigger 736 on the next cycle after a first pair of operands have been gated into Add Unit 188, and thus start a second pair of operands into Unit 188 and set a second request trigger. The CDB 196, as above noted, will maintain priority on a First Come-First Served basis among the add units started. A third Start Trigger 736 cannot, however, be set until the first set of results are cleared from the Result Latches 189 to allow the other operands to proceed through Add Unit 188. The conditions for issuing the start and request signals from Start Control 726 are shown in the flow charts FIGS. 45 and 46. If the Add Unit 188 is not full, Block 740, as above described, the Priority Unit 735 tests the lowest stage of Stack 732 to see if the add unit, if any, named therein has its Unit Full Trigger 718 set, and if it finds a match will exit to the entry point on FIG. 46 for that add unit 1, 2, or 3, and if no match is found, control is passed to a second part of Priority Circuit 735. The second part of Priority Circuit 735 makes a similar test of the middle stage of Stack 732 to see if the add unit, if any, named in this stage has its Unit Full Trigger 718 set and, if so, the control passes to the entry on FIG. 46 for that add unit, but if not match is found, then the second circuit passes control to the third part of Priority Circuit 735, entry point 4 on FIG. 46. This third part of Priority Circuit 735 tests the upper stage of Stack 732 to see if the add unit named therein has its Units Full Trigger 718 set and if so, it passes control to the entry point 1, 2, or 3, for that counter, but if no match is found here, it signals that no add unit is ready for execution. When the Priority Circuit 735 finds a set Unit Full Trigger for an add unit named in one of the stages of Stack 732, it turns on the Start Trigger 736 for that unit.

When the Start Trigger 736 is on for an add unit, the request trigger for that unit is turned on and that trigger will, if the operation is one of the compare instructions, request the FLIU for a time slot to transmit its condition code to the I Box 134, or if the operation is not a compare to request the CDB 196 for a time slot thereon.

So long as the Add Unit 188 is not in Scan Mode (a diagnostic procedure) the turning on of the Start Trigger 736 for a unit will also gate the Source Operand Storage Register 191 to the Add Unit 188, and if the operation is a two-operand one, it will also gate the Sink Operand Storage Register into Add Unit 188.

There are three Instruction Decoders 742, one for each add unit, and each of which can be set to the instruction code output from Control 200 on Bus 743 when a unit select signal is received on the corresponding Select Line 711. Each Instruction Decoder 742 includes a decoder to control the gating signals within Add Unit 188, a first cycle trigger, a second cycle trigger, and outgating controls for each section of each of the operands of its Registers 191, i.e., the sign bit, the seven exponent bits, the left six hexadecimal digits of its fraction, the right eight digits of its fraction, and the exponent and fraction parity bits.

The sequence of operations within an Instruction Decode Unit 742 is shown for one unit in FIG. 47. As all three units are similar, this flow chart will apply to all. When the Start Trigger 236, FIG. 44, is turned on, Block 744, FIG. 47, the first cycle trigger is turned on and gates the exponent, long or short precision fraction, sign bit and both sets of parity bits into the Add Unit 188 from the Operand Storage Registers 191 holding the operand or operands for the instruction. The first cycle trigger will also set the ingating trigger for the Main Adder Result 597 into the Latches 599, and will turn on the second cycle trigger, Block 746. During the next machine cycle, the second cycle trigger will, depending on the sign of the output of Exponent Subtractor 582, FIG. 43, gate the larger of the source and sink exponents over Bus 607 into Exponent Updater 609, and also will gate the sink sign for a two operand instruction or the source sign for a one operand instruction to the Sign Control Logic, see FIGS. 48 and 49.

The Execution Control Unit 748 of the Add Unit 188 includes logic to reset the UCC 560 and Instruction Decoder 742 for a unit, to activate the gates of the Result Latches 189, to control the output sign setting, and to control the condition code setting. The Unit Reset Logic 749 will on receipt of a CDB 196 accept or compare signal on one of the Lines 730, generate a reset signal for a group of Latches of the unit involved. The reset latches include the Valid Condition Code, Start Trigger 736, Request Trigger, First Cycle Trigger of Decoder 742, Unit Busy Trigger 709, the Source Full Trigger 707, and the Sink Full Trigger 713, for the unit accepted.

The Outgate Trigger 750 and the Ingate Trigger 754 are responsive to the S/L precision bit set into each Instruction Decoder 742 and to the unit accept signal on an Accept Line 743 to control the ingating from Latch 599, Parity Generator 669, the Exponent Updater 609, and Parity Generator 692 into Result Register 189, and to control the gating from the Result Register 189 on to CDB 196. Only the appropriate bit positions in the result will be entered into Result Register 189 under control of the Short Precision Output Line 752 or the Long Precision Output Line 753 from the Outgate Trigger 750, and only these bit positions will be gated to the CDB 196 by Outgate Trigger 750.

The Condition Code Network 756 will respond to a Set Condition Code Line 757 and a unit select signal on a select Line 711 to set a Valid Condition Code Trigger for that unit, and when the instruction for that unit is executed, this Trigger will enable the setting of the condition code bits on a pair of condition code lines 758 for transmission through the FLIU to the Condition Code Latches in I Box 134. The outgating of these condition code bits is dependent upon the receipt of an accept signal on the units Accept Line 730 which can be signalled by either a CDB 196 accept or an FLIU accept signal. The Condition Code Lines 760 and the Sign Line 761 to the Condition Code Network will indicate either a zero fraction, a positive fraction, a negative fraction, or a fraction overflow for an add or subtract operation, or when the operation is a compare one, whether the source operand is equal to, greater than, or less than the sink operand.

The operation of the Condition Code Network 756 is set out in the Flow Charts FIGS. 50 and 51. When the Condition Code is set by Line 757, the unit select signals on Lines 711 are tested and the activated one will set the Valid Condition Code Trigger for the selected unit and for each unit will send a signal to entry 1 on FIG. 51. Also, when the Valid Condition Code Trigger is on, the Network 756 is responsive to the turning on of the Unit Accept Trigger by the Units Accept Line 730 for the unit whose Valid Condition Code Trigger is on to set the Outgating Trigger for the CC Bus 758. When the Outgate Trigger turns on, it gates the set condition code to Bus 758 and simultaneously signals the FLIU that the needed code is on that Bus. Referring now to FIG. 41, when the Valid Condition Code Trigger of any unit is set, the Network 756 also executes a number of tests on the code signals and operand signs. Starting at the entry point 1, the FLIU is signalled that there is an outstanding instruction which is to set the condition code. If the code is to be set and the select signal for an adder unit is received, the network waits until the Second Cycle Trigger of the Instruction Decoder 742 is set and then proceeds to set the code. If the instruction is a compare operation, Block 762, the signs of the two operands are compared, Block 764, to see if they are the same for otherwise the operands cannot be equal unless they are both all zeros. If the signs are unlike and the result fraction from Main Adder 597 is not zero, then the sign of the sink operand is tested to set the right code bit if the sign is positive and the left code bit if the sign is negative. If the operand signs are alike and the result fraction is all zeros, then the condition code is 00 and no code bits are set. When the result fraction is not zero, the sink sign bit is tested for a positive condition and the Exponent Subtractor carryout is tested to determine if the source operand exponent is larger or smaller than the sink operand exponent, and if there is an end around fraction carry in Main Adder 597. From these conditions the larger of the sink or source operands can be determined, and the condition code bits set accordingly. When the operation is not a compare operation, Block 762, the result fraction is tested for an all zero condition, which if found does not set the condition code bits. If the result fraction is not zero, but there has been an overflow of the Exponent Updater, then both condition code bits are set, but if the result is a normal number, then the right condition code bit is set for a negative output sign and the left bit is set for a positive output sign.

The meaning of the condition code settings may be summarized as follows:

| Code | Add/Sub. | Compare |
|---|---|---|
| 00 | Result Zero | Equal. |
| 01 | Result negative | Source less. |
| 10 | Result positive | Source greater. |
| 11 | Exponent Overflow | |

The Sign Control Logic of FIG. 44 comprises the Effective Sign Generator 765 and the Sign Modifier 766. The Effective Sign Generator receives the sign signals from the operands being gated out of the Operand Storage Registers 191 into Add Unit 188, the add, subtract or compare instruction signals from the Instruction Decoders 742, and delayed start signals from Start Triggers 736 through Latches 768 to signal on Line 593 to the Add Unit 188, whether the instruction is to be effectively an addition or subtraction. If, among the three sign signals, one or all three are negative, then the operation is effectively a subtraction but if none or two are negative, then the operation will be in effect an addition. For addition, the T/C Unit 591 of FIG. 44 will be set true and for subtraction, it will be set to complement the operand passing therethrough. The delayed start signals through gates 768 are further delayed in a second set of latches to control the gating of the sign of the result fraction into the Result Register 189. These start signals in the Sign Modifier 765, together with the effective sign on Line 593, and the instruction code from the Instruction Decoders 742, together with the carryout signals from Exponent Subtractor 582 and Main Adder 597 enable the Sign Modifier to determine the sign of the result fraction and to transmit it to Result Register 189 over line 761. The sign for Addition or Subtraction instructions will be the sign of the sink operand on addition, and in subtraction if there is an end around carry in, both the Exponent Subtractor 582 and Main Adder 597, or if neither has an end around carry. For the Load Positive-Load Negative or Load Complement (single operand instructions) the sign to line 761 is forced to the required sign by the Sign Modify Unit 766 under control of the Instruction Decoders 742 and the unit start signals from Latches 769.

The operation of the Sign Control Logic is described in the flow charts of FIGS. 48 and 49 where when the first cycle trigger is on in an Instruction Decoder 742, the effective sign is computed by inspecting the sign of the sink, Block 771, the sign of the source, Block 772, and the sign of the operation, Block 773, to detect if none or two of the signs are positive, in which case, the operation is addition and the operand to the T/C unit is gated through true. If either one or all three of the signs are negative, the operation is effectively a subtraction, and an Effective Subtraction Trigger is set. The setting of the Effective Subtraction Trigger will set the T/C unit to pass the operand through in ones complement form. The output sign to the Result Register 189 is determined as in FIG. 49, where if the first cycle trigger is on (FIG. 48) a control signal is sent to entry point 1, FIG. 49. Here when the effective sign is determined, FIG. 48, when the Second Cycle Trigger comes on in the Instruction Decoder 742 for an operation being performed, the operation code is tested for an Add or Subtract instruction, Block 775, and if such operation is not found, then the test is for a Load Positive, Block 776, a Load Negative, Block 777, or a Load Complement, Block 779, and the output sign is set correspondingly. If the operation is an addition or subtraction then the effective sign is inspected to see if it is an effective add operation in which case the output sign is set to the sign of the sink. If the effective sign is a subtraction, however, then the carryout signals of the Exponent Subtractor, Block 780, and of the Main Adder 597, Block 781, are inspected to see if either both or none have had an end around carry signal, in which case the sign of the output is the sign of the sink, or if only one of them has had an end around carry, in which case the sign of the result will be the sign of the sink complemented. When the output sign is determined in Sign Modifier 766, it is sent into the left end position, the sign position, of Output Register 189.

*Multiplication-division unit*

The M/D Unit 192, FIG. 5, is conveniently separable into a fraction Multiplying Section 790, FIG. 52, and an Exponent Section 791, FIG. 53. Considering first the Fraction Multiplying Section 790, FIG. 52, it will be seen that it can be fed operands from two pairs of Operand Storage Registers 195. As in the case of the Add Unit 188, it has been found that multiplication operations using two sets of input buffer registers and one very fast multiplication unit can be performed almost as rapidly as if two completely separate multiplication units were used. We therefore consider each pair of Operand Storage Registers 195 and the common multiplying structure as effectively a complete Multiply/Divide Unit and refer to them as M/D1 and M/D2, the way they look to the FLOS 184 and Control 200.

As described above, the M/D1 and M/D2 Source Storage Registers 195 are connected to the FLB Bus 199 to receive operands from storage, to the FLR Bus 551 to receive operands from the FLR's 187 and to the CDB Lines 197 to receive forwarded operands. The two Sink Operand Storage Registers 195 are connected only to the FLR Bus 551 and to the CDB Lines 197 for sink operands are never supplied directly from storage. The Source Registers 195 can also receive operands on the Prenormalization Bus 792, while the Sink Operand Registers can receive operands from both the Bus 792 and a Bus 794, used in division operations as will be later set out.

As soon as an operand is received into an Operand Storage Register, it is gated to a Common Bus 795, and into a Zeros Decoder 796, where the number of hexadecimal zeros of four bits at the left end of the operand is decoded and the number signalled on a Bus 798 for transmittal to a Left Shifter 799, and to the Exponent Section 791. The Left Shifter 799 is a two stage shifter similar to those previously described for the Add Unit 188 and capable of shifting an operand on Common Bus 795, either 0, 4, 8, or 12 hexadecimal orders to the left in the first stage, and capable of a left shift of 0, 1, 2, or 3 hexadecimal orders in the second stage. The two stages are controlled by the signals on Bus 798 for a maximum shift of 13 digits to the left, and will outgate the now normalized operand to Prenormalization Bus 792 from which it is gated back into the same Register 195, from which it was originally outgated to Bus 795. This prenormalization operation requires only one machine cycle and is performed on every unnormalized operand as soon after it is received, as the M/D Unit 192 is clear and no operand of higher priority is to be normalized. When both operands for an instruction have been received into the associated pair of Operand Registers 195, and both are normalized, the UCC 561 associated with that pair of Registers 195, starts the multiplication operation. The both source operand Registers 195 are connected by busses to a set of Multiplicand (CAND) Gates which also receive a number of other operands in a division operation and which gates are settable by each UCC 561 to pass its source operand through the CAND Gates 800, the OR's 801, and over a Bus 802 to a set of six Multiplier (IER) Gate Latches 804, numbered one to six from right to left. The sink operands in Registers 195 each pass over a Bus 805 to a set of Multiplier (IER) Gates 806. The Gates 806 are each controlled by their associated UCC 561 when it is controlling a multiplication operation to gate out to an IER Decoder 808, a 13 bit group of the operand bits. The multiplication operation in the present embodiment of the invention utilizes a 12 bit group of the bits of the multiplier operand in each multiply cycle except the first. As there are a maximum of 56 bits in the sink fraction operand, the full sink operand will be gated into the IER Decoder 808 in five multiply cycles. Due to pipelining of these operands, the machine performs the complete operation in three machine cycles from the start of the operation. It should be noted at this point that due to the short logic paths required to add a partial product back into the data pipeline and the other short logic paths between levels where operands can be latched and retained, the multiply clock has a substantially higher frequency than the main machine clock, so that the multiply and machine cycles do not coincide. At the end of the first multiply cycle, the low order 9 bits of the IER are gated from Gates 806 and decoded in IER Decoder 808, and the decoded result is latched at the Decoder 808 output.

The 13 bits of a group (9 on the first multiply cycle) are converted in IER Decoder 808 into control signals for the six IER Gates 804. Each group of two bits is decoded with reference to the lower signal of the next group to the left into signals representing a 0, 2, or 4 times the multiplicand, and either an add or subtract sign. The decoding takes place according to this table.

| Lo Bit Next Group | Group Bits | Multiple | Sign |
|---|---|---|---|
| 0 | 00 | 0 | |
| 0 | 01 | 2 | + |
| 0 | 10 | 2 | + |
| 0 | 11 | 4 | + |
| 1 | 00 | 4 | − |
| 1 | 01 | 2 | − |
| 1 | 10 | 2 | − |
| 1 | 11 | 0 | |

This is a well-known algorithm for shortcutting a multiplication operation, and in effect adds a unit to every pair of multiplier bits having a unit in the lower order, and compensates for this added unit by subtracting four units from the next lower pair. For the first decoding cycle, only the low order 9 bits are gated into IER Decoder 808, giving no signals into the four right hand address, so that the 9 bits are decoded as effectively 13 bits, including four right hand zeros. For each of the next four multiply cycles the IER Gates are stepped 12 bits to the left to supply the next group of 13 bits, one bit, the right one, having been the left bit of the previous group.

On the second multiply cycle, the six IER decoded signals and signs are sent to the IER Gate Latches 804, Nos. 1 to 6, respectively. At each IER Gate 804, the CAND on Bus 802 is gated one bit position to the left if a 2 multiple signal is received, and two bit positions to the left if a 4 multiple signal is received. This shifted signal will be changed to its ones complement if the same IER Gate 804 receives a subtract signal and the "hot one" will be inserted into an unused position of the following adder.

For purposes of illustration, the following adder may be considered as being 71 bits wide, numbered P3, P2, P1, 0, 1, 2, . . . 67, from left to right, to receive up to six 56 bit wide fractions with a possibility of a left shift compared to the CAND through the #1 IER Gate Latches 804, of up to 14 bit positions for the #6 IER Gate Latch fraction, and a possible carry digit from the last position. Clearly not every possible input will be utilized and it will be understood that if any input is not utilized, it will not be implemented. The outputs of the IER gates 804 are connected to the bit positions of the adder as follows, it being noted that the output of an IER Gate can be shifted left either one or two positions and will thus be 57 bits wide for a 56 bit fraction.

No. 1 IER Gate—positions 10 through 66
No. 2 IER Gate—positions 8 through 64
No. 3 IER Gate—positions 6 through 62
No. 4 IER Gate—positions 4 through 60
No. 5 IER Gate—positions 2 through 58
No. 6 IER Gate—positions 0 through 56

The relation between the bit positions of the multiplier, the IER Gates 806, the input to IER Decoder 808, the bit positions inspected to control the six IER Gates #1 to #6, and the adder orders into which each IER Gate 804 transmits the CAND Multiples is shown in FIG. 54. On the first iteration, it will be seen that the four right hand positions of IER Decoder 808 cannot receive a significant input and are in effect all zeros. The same situation is true in the fifth iteration for the leftmost bit which does not correspond to a bit position of the sink operand. The three left hand adder inputs marked P cannot have a positive input during multiplication, but are needed for sign control where the #6 IER Gate 804 can have a complemented output during the first four iterations.

The actual addition of the six multiples of the CAND and the previous partial products is done in a group of Carry Save Adders (CSA) 811 through 816, with CSA's 811, 813 and 816 having their output signals retained in a set of latches. Each CSA has a full binary adder for each bit position and can receive three input signals to each binary adder and supply a sum signal to the corresponding output bit position and a carry signal to the next higher bit position. The latches at the outputs of the CSA's 811, 813, and 816 aid in preventing skewing of the operand bits as they pass through the adders, and enables pipelining of multiply cycles in an overlapping manner, for it is possible to have a first set of partial products at the output of CSA 816, a second set latched in CSA 811 and 813, and a third set entering from IER Gates 804. Each latched CSA position may be constructed as shown in the U.S. application No. 471,021 filed July 12, 1965 by John Earle and titled, "High Performance Carry Save Adder Loop," and assigned to the assignee of this application. For CSA's without the latch feature, it is only necessary to open the feed back loops which make the latches hold. As shown in FIG. 52, CSA 811 receives at each bit position an input from the IER Gates #1, #2, and #3, and generates sum signals on its Sum Output Bus 818, and the carry signals on the Carry Output Bus 819. Likewise, the CSA 812 receives the three sets of multiples from IER Gates #4, #5, and #6, and provides sum signals on Bus 820, and carry signals on Bus 822. Busses 819, 820, and 822 are the three inputs to CSA 813 which has latches on its outputs to Sum Bus 823 and Carry Bus 824. The outputs of CSA 811 on its Carry Bus 819, despite the presence of the output latches, will be present at the same time as the outputs from CSA 812, and can be combined with those outputs to generate the latched outputs of CSA 813 on Sum Bus 823 and Carry Bus 824. CSA 814 has as its inputs the Busses 818, 823, and 824, and generates its sum signals on Sum Bus 826 and carry signals on Carry Bus 827. The two outputs of CSA 814 are the combined six input multiples and cannot be further reduced by CSA's but are added to the sums and carries in the corresponding bit positions of the previous partial products of the multiplication in CSA's 815 and 816. The latched sum signals on Sum Bus 828 and the latched carry signals on Carry Bus 829 represent the previous partial product at the output of CSA 816, and are to be added to the next set of Sum and Carry signals on Busses 826 and 827 respectively.

Since there was a twelve bit left shift of the IER bits which generated the outputs of CSA 814, relative to the previous ones which generated the outputs of CSA 816, the right 12 bit positions of the partial products on Busses 828 and 829 do not correspond to any of the bit positions of partial product digits now coming from CSA 814. As only the leftmost 56 bits of a long precision product, and only the leftmost 24 bits of a short precision product are used, these right 12 bits cannot be saved and the most they can do is to affect the lowest bit position of the new partial product. To determine if they do have such an effect, the sum and carry signals on the right 12 bits of Busses 828 and 829 are passed into a 12 bit wide Spill Adder 831, which is of the carry propagate type previously described, and can generate its output sums in one multiply cycle. As we are interested only in the possibility of the discarded bits affecting the retained bits, the sums from Spill Adder 831 are not utilized, although they could be if it were desired to save the entire product, but the carryout of the highest order is latched and is fed back on a Line 832 into the lowest denominational of itself for combining with the 12 sum and 12 carry bits of the low orders of the next partial product from CSA 816.

The remaining signals on Bus 829 are supplied to an input of CSA 815 with a wired-in 12 bit right shift so as to be in proper denominational relationship with the new sum and carry signals on Busses 826 and 827. The remaining sum signals on Bus 828 cannot be entered into CSA 815 so they are delayed in a set of Sum Latches 833 in order to retain a proper time relationship between the signals. The sum and carry signals from CSA 815 and the output sum signals from Sum Latches 833 on Busses 835, 836, and 837 respectively, are inputed into CSA 816 and become the sum and carry signals on Busses 828 and 829 of the new partial product.

When the inputs from the fifth iteration of entries has progressed through CSA 816, the 67 bit signals on Busses 828 and 829 represent the final product of the multiplication and are combined in CPA 839 to generate the final product in single operand form. At this time, any carryout of Spill Adder 831 represents a carry into the lowest order of the final product so is entered into CPA 839 as a "Hot One." The final 68 bit product at the output of CPA 839 is the final product correct to 68 bits and is sent to and latched in Result Register 193. Result Register 193 has two sets of output gates from its latches to the CDB 196, one set directly and one set to give a one hexadecimal left shift, and these two sets of gates form the Postshifter 340. It will be recalled that both operands of the multiplication were digit normalized before the operation started, and under these conditions there can at the most be one left zero digit. This condition is detected at the output of CPA 839, and if a zero is detected, the Postshifter 340 is set for the one digit left shift. The highest 56 bits of the post shifted product for a long precision multiplication, or the highest 24 bits of the product for a short precision multiplication, will be gated out of the Postshifter 840 onto CDB 196. The Exponent Adder 791 is also notified and will gate out the exponent less one unit to bit positions 1 through 7 of the CDB 196.

*Exponent section*

The function of the Exponent Section 791 is to form and transmit the exponent and sign of any product or quotient generated in the Floating Point M/D Unit. In addition, it must generate and transmit signals indicating when an exponent overflow or underflow has occurred, i.e., exponent is greater than 128 or less than 0 (excess 64 code). The Section 791 computes the resultant exponent by adjusting the exponents for any prenormalization shift, by adding or subtracting the exponents of the source from that of the sink, and by adjusting for any post shift of the resultant fraction. All arithmetic is performed in true and two complement operands for positive and negative exponents respectively, despite the excess 64 code used to write the exponents. The conversion to the True/Complement code is performed by inverting the highest exponent bit and writing the inverted bit into all readout bus orders to the left. This is effectively equal to adding or subtracting (modulo 128) the excess 64 from each exponent and leaves the remainder in true or twos complement form. When the final exponent is determined, a reinversion of the highest exponent digit will restore the exponent to the excess 64 code.

Referring now to FIG. 53, Exponent Section 791 has a pair of exponent Source Registers 842, and a pair of exponent Sink Registers 843, each forming a part of the corresponding source or sink Buffer 195 and each of which can receive its operand from the FLR Bus 551 or the CDB 197, and the Source Registers 842 also being connected for receiving an operand from the FLB Bus 199. There is also an Adder Bus 844 which can be gated into both Registers 842 and 843. Each Register 842 and 843 has nine digit bit positions, a parity bit position and a sign bit position. The exponent byte on the incoming bus will have only seven exponent bits and, as above noted, the leftmost (seventh) bit of the exponent is inverted and the inverted bit is fed into bit positions 7, 8 and 9 of Register 842 and 843, with the original parity bit for the byte also inverted. The nine exponent bits in each Register 842 and 843 can be gated out on Busses 846 and 847 for the source and sink exponents respectively. The two Busses go to inputs of a nine bit wide Carry Propagate Adder (CPA) 848 with the sink exponent on Bus 847 always entering without change and that on Bus 846 being entered in true form for a Multiply operation and complementally with a "Hot One" on an Adder Line 850 for a Division operation through a T/C Gate 851. A Shift Data Register 852 receives and stores the amount of the prenormalization shift for an operand, and this shift will be sent in ones complement form to the free input of CPA 848, while the true exponent in the Register 842 or 843 will be sent to its related side of CPA 848 and a "Hot One" inserted on Line 850. The output of CPA 848 is the updated exponent of the operand and will be gated out on Bus 844 and back into the operands Exponent Register 842 or 843 at the same time that its associated fraction is prenormalized. The multiply or divide operation is ready to start when both operands are normalized, and on the first cycle of operation, the two sign bits in the Source and Sink Registers 842 and 843 are sent over Lines 854 and 855, respectively, and combined to set a Sign Result Latch 856. In the second cycle of operation, the nine bits of the source and sink exponents are gated over Busses 846 and 847, respectively, to their inputs of CPA 848, the exponent on Bus 846 being complemented in the T/C Gates 851 in division operations with the "Hot One" inserted on Line 850 to give the exponent of the result, and this exponent is gated out of CPA 848 to Bus 844 and back into the Source Register 842.

It will be remembered that it was stated that a postnormalization shift of one digit to the left could occur in a multiplication operation. As the need for this shift will, for the worst timing conditions, be known only a very short time prior to gating the result to the CDB 196, and as there will not be sufficient time to correct the exponent in Register 842 for this shift, the exponent for a postnormalization shift is precalculated by sending the result exponent in Register 842 to the left input of CPA 848 during the third machine cycle, and entering a subtractive unit, a string of ones, into the right input. The new exponent, correct if a postnormalization shift is required, is sent to the Sink Register 843. Now, if there is no postnormalization shift, the exponent in Register 842 is correct and is gated to CDB 196 over a Bus 858. If there is a postnormalization shift required, the exponent in Sink Register 843 is gated on Bus 859 to CDB 196. In each instance, the true or twos complement exponent is converted to an excess 64 code by inverting the seventh bit as the Register value is gated to CDB 196.

During the initial division cycle, it is sometimes necessary to right shift the dividend one digit to obtain a quotient which will be within the range of the iterative hardware, i.e., a quotient digit not greater than one. The extent of this shift either a zero or a one, is retained and is added to the exponent in Source Register 842 in CPA 848, as above described. The addition of this shift amount is always performed during the third machine cycle of a Division operation. The corrected exponent is returned on Bus 844 to Source Register 842. If the operation is division, there is also, as will be described later, a possible right shift of the final quotient of one hexadecimal digit for normalization. This is prepared for during the fourth machine cycle in Division operations by gating out the Source Register 842 on Bus 846, as above, and through T/C Gate 851 true into the left input of CPA 848, together with the entry of a unit digit into the right adder input. The updated exponent appears on Bus 844 and is gated into Sink Register 843. On the readout cycle, the Source Register 842 is gated out on Bus 858 to CDB 196, if no postnormalization is called for, and the Sink Register 843 is gated out on Bus 859 to DB 196, if the one digit right postnormalization shift is performed.

The nine bit positions of the Source and Sink Registers are needed to avoid any possibility of loss of a high order digit of the quotient. The maximum exponent possible during a Division operation is +142, comprising a +63 exponent divided by a −64 exponent with a prenormalization shift of 13 for the divisor and the possible two right shifts for alignment and postnormalization, and the minimum exponent can be −154 in a Multiplication Operation for a −64 exponent operand multiplied by a second −64 exponent operand with a 13 digit prenormalization shift of both the multiplier and multiplicand. Any exponent larger than +63 or smaller than −64 constitutes an overflow or underflow respectively, and will cause an error signal to be transmitted by an Underflow-Overflow Detector 860. An exponent overflow or underflow in Source Register 842 can be detected by the presence of two different types of bits in positions 7, 8, 9 of Source Register 842, i.e., all zeros is proper for a positive exponent of 63 or less, and all ones is proper for a negative exponent up to 64. The Sink Register 843 exponent cannot overflow in multiplication without a source overflow indication, for it is one unit less than the source, nor can it underflow in Division operations without the source also underflowing, for it is one unit greater than the source. An overflow of the exponent to be stored in Sink Register 843 can be decoded by detecting a string of all ones in the low order six bits of Source Register 842 during the incrementing cycle to find the exponent to be used for a postnormalized quotient and an underflow of the exponent to be stored in Sink Register 843 can be detected by finding a string of all zeros in the exponent from the Source Register 842 during the exponent decrementing cycle of a multiplication. These possible underflow-overflow signals will be stored until it is determined that postnormalization is needed and that it is the Sink Register 843 containing the out of bounds exponent which is to be gated to CDB 196. An overflow-underflow detection of the exponent in Source Register 842 will also be stored until it is determined that there is to be no postnormalization, and that it is the exponent in the Source Register 842 which is to be gated to CDB 196.

*Error detection*

Single error detection of the multiplication operation is performed by an overall residue checking system, plus additional hardware for error isolation. Referring to FIG. 55, a 56 bit input Residue Tree 862 is connected to Bus 795 and receives the sink (IER) operand on that Bus. The Residue Tree 862 will generate the two residue bits (Modulo three) of the 56 bit sink fraction, and its first two levels will also be used to partially generate the IER parity. The output of these first two levels of the Residue Tree 862 is transmitted out on Bus 863 to Parity Tree 864 where it is reduced to seven parity bits on Bus 866. The original parity bits for the sink in Register 195 are gated out on Bus 867 at this time to the Exclusive Or Comparing Circuit 868, where any difference between the generated and original parity bits generates an error signal on a Line 870.

The residue at the output of Residue Tree 862 is passed through a Switch 871 into a Sink Residue Latch 872. In the second machine cycle, the source operand in Register 195 is gated to Bus 795 and Residue Tree 862. The Parity Tree 864 will generate the source parity which will be tested as above to detect any error in the input of the source operand and will also detect any single error in Preshifter 799, if it were used. At the same time, the source residue generated in Residue Tree 862 is passed through Switch 871 and stored in Source Residue Latch 874. These two residues in Latches 872 and 874 are then multiplied together in Residue Multiplier 875, which puts the predicted residue of the product on a pair of Lines 876. It will be remembered that on each multiply cycle, the 12 low order bits of the sum and carry signals from the Loop 878 (CSA's 815, 816, etc.) are sent to Spill Adder 831 and are lost. Since these bits are part of the full product, their residue must be subtracted from the predicted residue on Lines 876. The residue of each set of bits is determined in a Residue Tree 879, and sent to a Residue Adder 880, which determines the residue of the spill signals and stores it in a set of Latches 882. As the signals pass through Loop 878, five times, each time discarding the 12 low order bits, the output of Latches 882 is returned to Adder 880 for combining with the residues of the next 12 bit groups. After the last interation, the final residue for the entire spill is in Latches 882, and is subtracted in Residue Subtractor 883, to supply the corrected predicted product residue on Lines 884 to a pair of Latches 886.

The output of the CPA 839, the final product, is transmitted on the Bus 794 to an Output Residue Tree 888, where the product residue is determined and sent for comparison to a Compare 890 where it is compared with the predicted residue in Latches 886 to give an error signal on Line 891, if the predicted and actual residues do not agree. The product on Bus 794 is also entered into a Parity Tree 892 which, with appropriate compensation for any post shifting, determines the parity bits for the product bytes and supplies them to CDB 196 with the product. There is a difference of only three levels of logic between the data input and the parity bit data to CDB 196, so the parity can go along with the data, but this is not true for the residue. The residue check cannot be completed until the next machine cycle and, unless the CDB 196 is servicing a higher priority instruction, the residue check will not be completed until after the product has been transmitted. This will not cause loss of data since the operands will usually be retained in the operand Registers 195, where they can be retrieved in an interrupt or diagnose operation.

The detection of an error in the Exponent Section 791 is entirely by use of parities as indicated in FIG. 53. The parity bit initially stored in Registers 842 and 843 with the operand is from the original parity on the input bus which parity bit was inverted when the exponent was expanded from seven to nine bits to change from an excess 64 code to a True-Complement code, but it still contains the parity for the sign bit. For each Register 842 or 843, the parity bit is converted to that of the exponent only in an Initial Parity Updater 894, which receives the sign bit and parity bit from a Register and supplies the exponent parity on a Line 895. The parity bits on both Lines 895, are supplied to a Parity Predictor 896, the source parity Line 895 passing through a T/C Gate 898 for complementing on Division Operations. The Parity Predictor 896 also receives the carry signals from the CPA 848 and generates the predicted parity on a Line 899 which is gated to Bus 844 to return an updated parity with the new exponent to Register 482 or 483, and also is received by a Parity Checker 900, which will signal a CPA 848 error on Line 901.

The extent of any prenormalization shift is transmitted to Register 852 and is stored with its parity. The overall parity of this byte is tested in a Parity Check 902 which will signal any error in transmission or storage of the shift amount by a signal on Line 904. When the extent of shift of an operand is subtracted from an operands exponent in CPA 848, the parity of the shift extent is combined with the parity of the operand and that of the carry signals to generate the new parity for the new exponent in the same manner as above described. When the exponent is gated out of either the Source Exponent Register 842 or the Sink Exponent Register 843 to the CDB 196, the internal parity stored with the exponent is not a valid parity, for it does not include the sign bit, and bit seven is to be inverted, and bits eight and nine dropped. The required correction is performed in the Output Parity Updater 905 for the Register 842 or 843. The Updater 905 receives the internal parity bit, the result sign bit and exponent bits eight and nine, and generates the parity for the exponent as gated to CDB 196. A Parity Checker 906 compares the bus parity with that of the exponent byte to detect an outgating error, and if it finds one will send an error signal on a Line 908.

*Division operations*

Division in the described preferred embodiment is performed by a high speed algorithm which, while it has been previously used in programs in computers which had no mechanism especially designed for division, e.g. Harvard MK3 computer, is not known to have been reduced to a hardware form. As is obvious, the quotient of a dividend divided by a divisor is equal to the product of the dividend multiplied by the reciprocal of the divisor. The reciprocal of a number can be generated by a convergence scheme where a first approximate reciprocal is converged to the true reciprocal by iterated multiplications. In the present embodiment, both divisor and dividend are multiplied by a first factor which will guarantee a significant digit and a plurality of non-significant digits at the left of the divisor. The new divisor is now used to determine a new multiplier which is multiplied by dividend and new divisor to give a new divisor having twice as many non-significant left digits. This iteration is repeated until the entire divisor to the right of the first significant digit has been converted to non-significant digits, the final divisor being either 1,000 . . . 00 or 0.11111 . . . 11, either of which is 1 to the limit of machine accuracy.

Two modifications are made in the convergence scheme to adapt it for use in a particular machine and to speed it up. Firstly, the best that the strict convergence scheme can do is to double the number of non-significant digits at each iteration and thus it starts off slowly. This is relieved by obtaining the first multiplier factor from a table having the multiplier factor appropriate to each combination of the first seven divisor bits, the left hand bit being always equal to a one. The table gives the multiplier factor to 12 bit positions, and the divisor can be multiplied by this factor in one pass through the multiplication circuits without need for passing through the CSA Loop 815 and 816. The new divisor is therefore gated from the outputs of CSA 814, FIG. 52, over Sum Bus 826 and Carry Bus 827 to CPA 839, which combines the factors and puts the new divisor on Bus 794. To further save time, the multiplication of the dividend by the reciprocal of the divisor is not held off until the reciprocal is determined, but is performed interleaved with the determination of new divisors. It will be recalled that the time for a multiple to pass through the CSA tree is substantially longer than the multiplication iteration cycle, and that several multiples are pipelined. The multiplication of the dividend by the divisor multiple takes place in these otherwise free intervals, so that very little extra time is needed after the divisor reciprocal is determined.

At the beginning of a division operation, the dividend and divisor will have been normalized to the digit position if they were not already normalized when received, by the same Zero Decoder 796 and by Left Shifter 799, as above described for multiplication, for the division cannot start until both operands are normalized. For the division operation, however, the dividend cannot be normalized until it has been determined that the divisor is not zero. It is an operating rule that if a division by zero is detected, the operation is to be suppressed and the dividend must remain unchanged. This is accomplished by sending the dividend as received, even if unnormalized, to CDB 196 as the output of the divide operation. To pass the dividend, a psuedo-multiply by one is performed to pass the dividend to the Result Register and it is outgated with a zero post shift. When the divide execution begins, the divisor is bit normalized, i.e., it is shifted to the left one, two, or three bit positions under control of Zeros Decoder 796, until its most significant bit is in the highest bit position. The shifting takes place in Bit Shifter 909 connected to Bus 795 and having three stages for a shift of left zero or one, left zero or two, and right zero or four respectively. The output of Bit Shifter 909 on a Bus 910 is passed to the CAND Gates 800 as a multiplicand and the right seven bits of the leftmost byte are sent to a Table Lookup 912. The initial bit normalized divisor is indicated on Line D0 in FIG. 56, where a zero or a one is shown in a bit position if the value of that bit position is known, but is shown as an $x$ where the value can be either a zero or a one as determined by the initial operand. There is no need to send the leftmost bit of the dividend to Table Lookup since it is known to be a one, the divisor having just been bit normalized. The Table Lookup will send to the IER Decoder on a Bus 913, a 13 bit first multiplier having the format shown in the R0 line of FIG. 56. This multiplier is decoded in the IER Decoder in the same manner as described for multiplication to set the IER Gates 804 and pass through the multiples of the divisor which is at the CAND Gates 800. As soon as the divisor has passed through the IER Gates 804, the dividend is gated to Bus 795 and is given a left shift in Bit Shifter 909 of the same extent as was applied to the divisor. If this shift would cause an overflow of the dividend, the Zeros Decoder 796 will also activate the right four bits shifter of Bit Shifter 909 to make a one digit right shift of the dividend. Notification of this right shift will be sent to the Exponent Section to correct the exponent for the operation. The dividend is now held in CAND Gates 800.

On the next multiplication cycle, the dividend in the CAND Gates 800 is multiplied by the same multiplier used on the previous cycle for the divisor and started through the CSA tree. When the divisor has passed through CSA 814, it is passed on Busses 826 and 827 directly into the inputs of CPA 839 where the resultant divisor D1, see FIG. 56, will be generated and will have the format indicated on the third line of FIG. 56, i.e., a one followed by seven zeros, or a zero followed by seven ones with the remainder of the divisor having some unknown digits. The output divisor will be transferred over Bus 794 into CAND Gates 800 with a 6 bit right shift enforced by a Divide Shifter 916. Bit positions 5 through 17 of Bus 794 are gated by a Division Bit Selector 914, over a Bus 915, into IER Decoder 808 as the next multiplier. This multiplier as shown on Line R1 of FIG. 56, is the bits 5-14 as the complement of the Bus 794 signals and bits 15-17 as ones. With the left three bits always the same, the #6 IER Gate 804 will not pass a multiplicand signal. It should be noted, however, that the remaining left bits of the effective multiplier R1 should generate a one times multiple of the divisor and this multiple is passed from Bus 794 to the output lines of #6 IER Gate 804, through the Divisor Gate 918, the six bit right shift in Divide Shifter 916 putting the Divisor fraction in the proper denominational positions in CAND Gates 800. The multiplication of the D1 divisor by the R1 multiplier will now be started through the CSA tree, and when the first dividend product is generated on Bus 794, it will similarly be passed through Divide Shifter 916 with the six bit right shift into CAND Gates 800, and through Divisor Gate 918. This first dividend product will now be multiplied by the R1 factor and passed into the CSA tree.

When the second divisor D2 is present on Bus 794, bit positions 12 through 23 thereof are gated complementally through the Division Bit Selector 914 on Bus 915 with bit 24 sent as a one to IER Decoder 808 as the next multiplier R2, and this time the Divisor, the D2 term of FIG. 56, is gated through the Divide Shifter 916 with a 12 bit right shift into CAND Gates 800. The multiplication of the shifted divisor in Gates 800 with the entry of the unshifted divisor through Divisor Gate 918 starts the third iteration. The dividend when it appears on Bus 794 will also be multiplied by the R2 multiplier.

When the next divisor term, the D3 of FIG. 56, is on Bus 794, bit position 21 through 32 are put complementally on Bus 915 by Division Bit Selector 914, and bit position 33 is sent as a one on the Bus to IER Decoder 808. The Divisor D3 on Bus 794 is now right shifted 21 bit positions in Divide Shifter 916 into CAND Gates 800 and directly through Divisor Gate 918. The multiplication of D3 by the IER Decoder 808 outputs in IER Gates generates the D4 Divisor. The third dividend is now similarly multiplied to generate the fourth dividend term, and this fourth is the correct quotient to 28 bit positions, and if the division is in short precision, may have the left 24 bits gated out as the short precision quotient. When the D4 divisor is generated, it is at least half non-significant digits, and as above noted, the number of non-significant digits can be doubled in one iteration. It is therefore certain that in one more iteration, the divisor can be made equal to one to the limit of accuracy, i.e., a 1 followed by 56 zeros, or a zero followed by 56 ones, and it is not necessary to generate this term. The divisor D4 is therefore gated into Sink Operand Storage Register 195 over Bus 794. The fourth dividend term when it is generated by CPA 839 will be retained in the Result Register 193 and on Bus 794 with an entry into CAND Gates 800, after a 30 bit right shift in Divide Shifter 916. The bit positions 54-64 of the Divisor Register 195 are now gated out by Gates 806 complementally with two low order ones to IER Decoder 808 for a fifth multiple, bit positions 42-54 are gated complementally through IER Gates 806 to IER Decoder 808 for the sixth multiplier and bit positions 30-42 are gated out complementally as the seventh multiplier. When the seventh multiplier is used to control the IER Gates 804, the #6 IER Gate will not be activated due to the three like digits in the three high order positions and Divisor Gate 918 is opened instead to supply the unshifted fourth dividend. As more than one 13 bit multiplier is used in this last multiplication, the CSA's 815 and 816 are used with the return of the output sum and carry signals back to the inputs of CSA's 815 and through Sum Latch 833 to the inputs of CSA 816 to combine with the newly generated products. As described in the multiplication description, the last two operands, a sum and a carry operand are combined in CPA 839 to produce the final dividend term which since the divisor is now a one, is the quotient of the division. There are only two possible shift values required to normalize the quotient, either zero or a one digit right shift. The post shift is detected at the Result Register 193 and the quotient is gated out to CDB 196 with the required shift. The post shift correction of the exponent gated to CDB 196 has been previously described in the operation of the Exponent Section 791.

The alignment of the divisor bit positions with the CAND Gates 800 for the successive divide cycles is shown in FIG. 57, where the CAND Gate 800 bit positions are indicated on the first line, and the ones of these positions which receive bits of the generated divisors through Divide Shifter 916, and the divisor bits it receives are indicated on succeeding lines. The dividend bits are entered in exactly the same way on the next multiplier cycle. The lower half of this FIG. 57 shows the bit positions of the divisor which are gated complementally through the Division Bit Selector 914, or IER Gates 806, to form the successive multipliers sent to IER Decoder 808. A bit position indicated as $z$ receives a zero value and a bit position indicated with a $w$ receives a one value during the multiply cycle.

As the major part of the divide operation is a series of multiplications, the previously described multiplication checking will detect most error conditions. The basic difference is that division is checked on each iteration. The residue of the dividend is determined in the Residue Tree 862 and the Table Lookup 912 also generates the residue of the multiplier to be used on a Line 919 connected to Switch 871, where it is stored to be multiplied by the residue of the dividend to generate the residue of the first product. Each time the new divisor is returned to the CAND Gates 800, there is a right shift and consequent spill. The residue of this spill is determined in a Residue Tree 920 and combined with the residue on Lines 921 of the previous dividend from Output Residue Tree 888 in a Residue Adder 922 to generate the predicted residue of the new dividend on Bus 794. The predicted residue will be stored in Latch 886 for comparison with the generated output residue from Tree 888 to test for an error on the iteration. The divisor generation will be checked in the same manner. On the last three multiplication cycles, there is a multiplication of the dividend factor by three 12 bit multipliers, and the intermediate partial products must be generated and returned to the CSA Loop 878. This reintroduction of the partial product gives rise to the 12 bit right shift during the re-entry of the partial product and requires use of the Spill Adder 831 and its associated Residue Trees as above described for multiplication.

*Instruction unit*

The Instruction Unit 134 is shown in substantially more detail in FIG. 58. To recapitulate, the I Box 134 contains 10 64-bit Buffer Registers for storing instructions sequentially. Eight of the Registers, reference numeral 156, are normally used for storing eight double words of instructions with each Register 156 identified by a three bit binary number and every instruction word fetched from storage being stored in the Register 156 identified by the last three bits of its storage address, i.e. bits 19, 20, and 21, of the 21 bit double word address. The other two Buffer Registers, reference number 157, are #1 Temporary and #2 Temporary, and are used for storing instructions out of the normal stream of instructions. All 10 Registers 156 and 157 are connectable by gates to a Storage Data Out (SBO) Bus 155, and all Registers 156 and 157, as well as SBO 155, can be gated to an Output Bus 1001, and any or all 16 bit half word groups can be gated into the corresponding areas of a 64 bit wide Operations Register 159 for instruction decoding.

For the purpose of fetching instruction words and loading and unloading the Buffer Registers 156 and 157, a plurality of instruction count registers are provided. These counters are the Upper Bound (UB) Register 147 with an Upper Bound Incrementer 151, a Lower Bound (LB) Register 150 with a Lower Bound Incrementer 152, a seven bit wide Instruction Register (IR) 148 with an IR Incrementer 153 and an Advanced Outgate Register (AOR) 1002 with its AO Incrementer 1003. Each register with its incrementer forms a counter wherein the actual count is stored in the register and is sent to the incrementer which generates a count one unit higher and transmits the count back to the registers input gates. The IR Incrementer 153 is somewhat modified in that it can receive either a +1 signal, a +2 signal or both signals from an Operation Decoder 1005 to generate an output signal of either 1, 2, or 3 units more than is in the Instruction Register 148. In each instance when it is desired to increment the register, the output of the incrementer is gated into the register to change the value stored therein. After a latching interval, usually one half of a system clock cycle, the input gates are again closed and the circuit from the register is opened to send the new value to the incrementer for generating the next sequential value to be entered into the system.

There is a considerable amount of information needed in a large data processing system in addition to the constantly changing information available in registers and in the present embodiment, this information collectively is known as the Program Status Word (PSW) and will be stored, except for the instruction address in the PSW Buffer 1006. The instruction address part of a PSW is entered from bit positions 40 to 63 inclusive of SBO 155 into UB Reg. 147, IR 148, LB Reg. 150 and AO Reg. 1002, with the indicated group of the right 24 bits of a 32 bit wide word (Bits 8–31) going into each register indicated in FIG. 58. Generally, a change to a new PSW is equivalent to changing to a new program and is made whenever it is necessary to depart from the current program. The old PSW may be retained in storage to enable performance of programs of higher priority and when it is desired to resume the interrupted program, the old PSW can be brought back into the PSW Buffer 1006 to continue the old program from the interrupted point.

When the PSW is to be changed the new PSW will be fetched and bits 0–39 will be held in #1 Temporary Register 157 until all previous instructions, if any, have been processed and will then be transmitted over a Bus 1007 into PSW Buffer 1006. The instruction address part, bits 40–63 thereof on SBO 155 will be gated to a transmission Bus 1008 and from there bits 25–28 will be set into AO Register 1002, bits 8–28 into UB Register 147, all 24 bits 8–31 into LB Register 150, and bits 25–31 into I Register 148. The UB Register is the fetch control for new instructions and will retain the address of the last instruction word which has been called for from storage irrespective of whether the word is in the Buffers 156 or not. The output of the UB incrementer is therefore the address of the next instruction word to be fetched, and since the UB Register 147 does not include address bits 29, 30, or 31, the UB address is a double word address. The I Register 148 contains the address within the Buffers 156 of the instruction word being decoded which is in half word units so that the bit 31, which is for the byte within the half word, is not used but is received from SBO 155 to be checked for a zero to insure that an improper odd-byte address was not received. As instructions can be 1, 2, or 3 half words long, and as this length is set into IR Incrementer 153, the output of Incrementer 153 is the address within Buffers 156 of the first byte of the next instruction to be decoded. Bit 25 of the instruction address is not needed for identification of an instruction in the Buffers 156 but is required to regenerate the full instruction address when it is wanted. The LB Register 150 contains the full address of the earliest instruction word which is contained within Buffer Registers 156, and which is not to be replaced by an instruction word being fetched but not yet received. The full storage address of the instruction in Buffers 156 which is the next to be decoded can be regenerated by combining bits 8 through 25 of LB Reg. 150 with the output of IR Increment 153, i.e. the buffer address of the next instruction. Since the IR Incrementer 153 could be indicating an address which is within the same group of eight double words as is the address in LB Register 150 or it could indicate an address in the next group of eight double words, bit 25 of LB Register 150 and bit 25 of IR Increment are compared in an Exclusive Or Circuit 1007 to see if they are the same for the same group of eight, or are different indicating that the LB Register address and the IR Increment address are in different groups of eight. When the next instruction word address is to be generated, bits 8 through 25 of LB Register 150 are gated on the LB Bus 1009 into the corresponding bit positions of the middle input 170 of three-input Adder 168, and bits 26 through 31 of the IR Incrementer 153 are gated to a Common Bus 1010 which is connected to a Bus 1015 to transmit the IR Incrementer address to bit positions 26 to 31 of the same Adder Input 170. If the Exclusive Or 1007 indicates that the bits 25 it receives are the same, the combined input of bits on Input 170 is correct and will pass through the Adder 168 unchanged, but if the Exclusive Or 1007 has found that the two bits are different, a unit is added to bit position 25 by a signal on a line 1011 to change the generated address to a corresponding one within the next group of eight words.

As it is also desirable at times to know the full address of the instruction being decoded, another Exclusive Or Circuit 1012 compares the bit positions 25 of the LB Register 150 and I Register 148 to determine if they are the same or are different. The address will be generated in Adder 168 as above described for the next instruction address except that bit positions 26 to 31 of I Register are gated to Bus 1010. The additional unit on line 1011 will now be gated in under control of exclusive Or 1012 rather than Exclusive Or 1007 as for the next instruction address.

The AO Register 1002 contains the identification of the Buffer Register 156 from which 16 bit groups are to be gated into OP Register 159. AO Register 1002 will usually be one word ahead of the word address in I Register 148 and will be incremented under control of a signal on a Word Boundary Line 1013 from IR Incrementer 153 which detects each time the incremented address is in a new double word, i.e. when bit position 29 sends a carry signal into position 28.

The initialization of I Box 134 has been previously broadly described but will be more specifically set out herein. As soon as the starting instruction address has been set into UB Register 147, LB Register 150, I Register 148 and AO Register 1002, a comparator 1016 comparing the low order part of the output of UB Incrementer 151 on a Bus 1017 and the I Register output on a Common Bus 1010 signals on a Line 1019 that the Upper Bound Address is less than four greater than the I Register Address and another Comparator 1020 testing the bit positions 25 to 28 of UB Incrementer 151 on Bus 1017 and those of LB Register 150 on Bus 1009 determine the next Upper Bound Address is not eight more than the Lower Bound Address. With these conditions, the data in UB Register 147 will be gated to an Upper Bound Bus 1021 and sent from there to Storage Address Bus 240 as the address part of an instruction fetch. On the next machine cycle, the UB Register 147 receives the Incrementer 151 address data which is also transmitted over Bus 1021 for a second instruction fetch address. This will be repeated until Comparator 1016 signals on a Line 1023 that the incremented upper bound address is four more than the I Register address and stops instruction fetching. When the first instruction fetch is sent, a Comparator 1024 compares the AO Register 1002 address, one more double word than the I Register 148 address, against the UB Incrementer address to determine that the fetched instruction word should be gated from the SBO 155 directly into the OP Register 159 as well as into the Buffer Register 156. A Decoder 1025 at the input to I Register 148 from transmission Bus 1008 decodes the starting instruction address to outgate the proper half words (16 bit groups) of the first fetched instruction into OP Register 159.

Remembering from the description of the MSCE 136 that the words may not return from storage in the same order as the sending of their fetch requests, and that every word put on the SBO 155 is preceded by the address of the sink into which it is to be gated, an Incoming Sink Register (ISR) 1026 receives the sink address from MSCE 136, and if the sink is within the I Box 134, will decode this address in its Decoder 1028 to select the correct Buffer Register 156 or 157 to gate in the data arriving in the next machine cycle. When a comparator 1029 responsive to the ISR 1026 address and the AO Register address, now one unit more than the first instruction address fetched, indicates that the next sink address is less than the AO Register address, the next instruction word received has its valid instruction groups gated into OP Register 159 directly from SBO 155.

Each time that I Register 148 is incremented past a double word boundary, as indicated by a signal on Word Boundary Line 1013 and gating of the IR Incrementer 153 address into I Register 148, Compare 1016 signals that UB Incrementer 151 address is no longer four more than the I Register 148 address, and a new instruction fetch is called for from the UB Increment 151 address. This address is also gated into UB Register 147 to increment it to the last instruction address called for. These I Register conditions will also cause AO Register 1002 to be incremented to stay one double word address ahead of I Register 148.

To this time, no instruction words have been returned from storage into Buffers 156, and no further I Box action takes place until the first called for instruction word is returned and gated into its Buffer Register 156, and into OP Register 159, at which time the first instruction will be decoded. The I Register 148 will be incremented each time an instruction is decoded and UB Register 150 will be incremented and a new instruction word fetch request made each time a word boundary is crossed, until Comparator 1020 determines that the UB Increment address is eight more than the address of the LB Register 150. This means that the next fetched instruction word from the address in UB Increment 151 would be returned to the Buffer Register 156 holding the lower bound instruction word. No more fetching from the Upper Bound Registers address can be performed so long as this condition is present, but normally there is no further need for the instruction word at the lower bound. Therefore, when the next instruction word is called for a fetch, both UB Register 147 and LB Register 150 are incremented each time the I Register is incremented past a word boundary. Under such conditions, the UB Register will maintain instruction word fetches three double words ahead of that being decoded under control of I Register 148 and LB Register 150 will contain the address of the earliest instruction still surely available in Buffer Register 156. It will be remembered that some of the last fetches called for by UB Register may not have been returned and therefore some instruction words prior to that at the LB address may still be present in Registers 156, but these could be changed at any moment by return of a fetch to that address and it is preferred not to rely in any manner on such program dependent events.

As a matter of interest, it may be noted that when UB Increment 147 is four words ahead of I Register 148, as indicated by Comparator 1016, this does not constitute a condition for a full stopping of advance word fetches, but it does drop such fetches to a lower priority rating. If under these conditions, a time slot to MSCE 136 becomes available for an instruction word fetch, the word fetch will be initiated. It is therefore possible for the UB Register to be a full seven words ahead of I Register 148, so that the entire set of Buffer Registers 156 is full of unused instruction words. Such a condition can actually occur when a loop of programs starting at the LB address is present within Buffers 156. The UB Register 147 is permitted to call for new fetches at each opportunity until the UB Increment 157 address is eight more than the LB Register 150 address as indicated by the output of Comparator 120.

*Instruction stream discontinuities*

The I Box 134 will continue to fetch and decode instruction words as described above with the UB Register 147 trying to remain about three instruction words ahead of the one the I Register 148 has selected for decoding and with about four used words in the Buffer Registers 156, until a discontinuity in the instruction stream is reached. Such a discontinuity may be a branch operation, a machine interruption or a store into the instruction stream. Branch operations may be subdivided into four categories, each of which will be processed differently. Branches may be grouped as (1) Unconditional branches (including branch on a condition which has been determined at the decoding time) to a word address in advance of the I Register address, or to a word address more than eight word addresses back, (2) a branch on a condition not yet determined and to an address as above, (3) a branch on condition, determined or not at the decoding time to an address less than eight words back but beyond the address in the LB Register 150 and (4) a branch on condition determined or not at the decode time to an address between that in the LB Register 150 and that in I Register 148.

An unconditional branch or a conditional branch for which the condition code has been set (bits 34 and 35 of the 40 bits of the 64 bit PSW in the PSW Buffer Register 1006) will be to an address in a GPR 202 of the FXPU 143, or to an address generated by the addition of the addresses in two GPR's 202 and a 12 bit displacement value specified in the branch instruction. In either event, the branch address is generated in Adder 168. The data in all GPR's 202 is brought by continuously connected Lines 334 to two sets of gates 1030 and 1032 in I Box 134, and when called for in an instruction is gated through either gates 1030 to Adder Bus A 173, or Gates 1032 to Adder Bus B 174, or both, as will be brought out later. If the instruction also includes a displacement factor, this factor will be temporarily held in a Buffer 165 and will then be gated out with the GPR 202 data on Adder Busses A and B, to provide the new instruction address at the output of Adder 168. This address will be entered into Working Register (WR) 177 and into Temporary Register 176, and transmitted on a Bus 1033 which will be gated to Transmission Bus 1008 and gated into the I Register 148, UB Register 147, LB Register 150 and AO Register 1002. This is the same condition as previously described for the start of a new program and further I Box 134 operation will be as set out above, but now proceeding from the branch address.

If the branch is on a condition which has not yet been decided as evidenced by the setting of the CC Bits in PSW Buffer 1006, the I Box makes the initial assumption that the branch will not be taken and will continue to decode the remaining operands which are already stacked in Buffer Registers 156, or have been called for in an issued fetch. No new instructions will be called for to continue fetching on this branch, however, but instead the I Box fetches the first two double instruction words on the branch path to have them available if the branch is found to be the correct way to proceed. The address of the branch target register will be generated in Adder 168 as above described, and transmitted over a Bus 1034, gating to Storage Address Bus 240 in MSCE 136, see FIG. 7, where it becomes the address of the fetch request being sent from I Box 134 at this time. The sink address for this fetch is specified to be #1 Temporary Buffer 157. On the next machine cycle, another fetch is called for with the next succeeding double word address generated by returning the address in WR 177 back on Bus 1036 into an input of Adder 168, and simultaneously injecting a unit signal on a Line 1037 into the 28th bit position of Adder Input 169. The new address is now sent to MSCE 136 on Bus 1034 and is so labeled as to be returned to #2 Temporary Register 157 for storage. The I Box 134 will now proceed to decode and issue the remaining instructions already fetched and being fetched into Buffer Registers 156. As earlier noted, however, each of these instructions will have a conditional tag bit included therein, and will not be executed until the conditional bit is turned off. When the Condition Code bits of PSW Buffer 1006 are set valid, if the condition of the branch instruction is not met, the conditionally issued instructions are to be performed and the I Box 134 proceeds to send out an ACTIVATE Signal to set all conditional tag bits to zero and thereby enable the already decoded instructions to be executed. If, on the other hand, the condition of the branch is met by the valid condition code, then the I Box 134 sends a CANCEL signal to all execution units to cancel the Full signal for the conditionally issued instructions. When the condition of the branch is met, the branch target address retained in Temporary Register 176 is transmitted through the Adder 168 and over Busses 1033 and 1008 to the AO, LB, UB and I Registers. At the same time, the instruction words in #1 Temporary Buffer 157 are gated out to Bus 1001 and transferred to both the Buffer 156 for its storage address and into OP Register 159 for immediate decoding to start a new instruction sequence. On the next cycle the next instruction word in #2 Temporary Buffer 157 is transferred into the next higher numbered Buffer 156. For this second instruction word transfer, UB Register 147 is incremented to the address of the second fetched word, and is then released to start further instruction word fetches along the branch path as described for normal instruction word fetching. It is to be understood that when the CC bits of PSW Buffer 1006 are set to a valid condition, the I Box 134 will take immediate action to continue proper instruction decoding. If the branch condition is not met, the ACTIVATE signal will be sent immediately, any fetches to the #1 and #2 Temporary Buffers 157 will not be issued and any issued fetches will be ignored, and all controls will be returned to normal condition. If the branch condition is met, the CANCEL signal is sent to the execution units and the fetch into #1 Temporary will be gated directly into its Buffer 156 and OP Register 159 when it is returned. The fetch return for #2 Temporary Buffer Register 157 will also be passed from SBO 155 into its Buffer Register 156. Also the I, UB, LB and AO Registers will be reset to the branch target address. In short, in conditional mode, as soon as the CC bits are set valid, they are tested and the I Box 134 takes immediate action to continue on the correct branch path as soon as possible.

Instruction loop mode

It can happen that a branch on condition will have a target address which is within the seven earlier instruction word addresses and can therefore form a loop of instructions containing eight or less double instruction words. As previously described for a branch on condition, the I Box 134 will not take any positive action until the CC bits of PSW Buffer are set valid, but when the branch is decoded, a test is immediately made to see if a loop of instructions can be set up. For this test, the full instruction address is generated by sending the LB Register bits 8 to 25, I Register bits 26 to 31 to Adder Bus A 173, and the possible additional bit to bit position 25 of Adder Input 169. Simultaneously, the target address in Temporary Register 176 is sent on a Bus 1038 to Adder Input 172 and complementally through Adder 168 to subtract it from the Instruction address. If the output of Adder 168 is positive and less than eight, a loop can be formed and I Box 134 sets itself into a potential loop mode state. At this time, the WR 177 address is sent on a Bus 1040 to a Comparator 1041 where it is compared with both the UB Register 147 address and the LB Register 150 address to see if the target address is within the instructions already in the Buffers 156. If the branch target address is not present in Buffers 156 but the target is less than the seven words back, the I Box 134 will continue on as in any branch instruction by fetching the two words along the branch path into Buffers 157 and will then issue conditional instructions along the normal path from those instructions already fetched, but as mentioned will not issue new fetches along this path. Consequently, the UB and LB Registers will not be incremented. If, when the CC bits of PSW Buffer 1006 become valid, it is found that the branch is to be taken, the action above described for a normal branch will be taken by resetting the UB, LB, I and AO Registers to the target address and starting decoding of the new instruction words along the branch from the target address.

If, on the other hand, a possible loop mode exists but the branch target instruction is already present in the Buffers 156 as determined by Comparator 1041, the precautionary fetches to #1 and #2 Temporary Buffer Registers 157 are unnecessary and will not be issued. For either situation, steps are taken to save as much time as possible each time the branch on condition instruction is decoded in loop mode. The first time the possible loop mode is detected by finding the target address is less than eight words back of the I Register address, the I Register address is sent on Bus 1010 to Save Loop Close Instruction Register (SLCIR) 179 for storage therein, the lower digits (25 to 31) of the target address in W Register 177 are gated into the Save Loop Target Register (SLT) 180 and the identifications of the GPR's 202 whose data was used as the base and index values and added with the displacement value for generating the branch target address are stored in the Save Loop Close Base (SLCB) and Save Loop Close Index (SLCX) Registers 1042 and 1044 respectively, for use if it is later found that an instruction loop will be performed.

For either type of loop mode, when the CC bits of PSW Buffer 1006 are valid and if the branch path is selected, a loop mode trigger is set and depending upon the output of Comparator 1041, two courses of action are available. If the Comparator 1041 indicates that the branch target address is not within the Buffers 156, but is less than the present instruction address, a full normalization is performed and any conditionally issued instructions are cancelled, but the loop mode state remains set. In the normalized condition, as above noted, the target address is inserted in the AO, UB, LB and I Registers 1002, 147, 150 and 148, respectively, and fetching of instructions is resumed. In the loop mode state, a Comparator 1045 keeps a continuous check on bits 25 to 31 of the LB Register 150 against the bits of the SLT Register 180, and when it finds an equality, will prevent any further incrementing of LB Register 150. This will maintain in Buffers 156 the target instruction of the branch and when UB Register 157 has completed fetching of the full set of eight instruction words, including some past the branch instruction if space and time are available, the locking of LB Register 150 will in combination with Comparator 1020 prevent further advance of UB Register 147. The instructions now in Buffers 156 will be decoded starting at the entered branch target address and will be sent to the execution units for a second iteration of the instruction loop.

If, however, Comparator 1041 indicates that the target instruction is still present in Buffer Registers 156, the target address is not entered into the UB and LB Registers 147 and 150, but only into the AO and I Registers 1002 and 148, thereby starting the next loop iteration. Any previously issued conditional instructions are cancelled as above noted. Fetching of additional instructions under control of UB Register 147 continues as space on the storage controls becomes available and LB Register 150 will be incremented for each fetch until Comparator 1045 indicates that the bits 25 to 31 of LB Register 150 are equal to those in the SLT Register 180 to stop further incrementing of LB Register 150, as above noted. The instructions of the loop will be further decoded in the normal manner until the original branch instruction is again decoded. It will be remembered that in normal instruction processing, it is assumed that a branch instruction condition will not be met and instruction decoding is continued in the conditional mode past the branch point, thereby saving time when the CC bits are valid if the assumption is correct. If the assumption is not correct, and the branch is taken, the correction cycles only use time which would be required under the branch conditions and no further time loss occurs. This assumption is changed when the system is in loop mode for now it is known that the branch was taken at least once and it is assumed that branching will continue. The conditional instructions are therefore issued along the branch path when the I Box 134 is in loop mode. When the CC bits in PSW Buffer 1006 become valid, they are tested in the usual manner to see if the branch is to be taken and if not, an initialization takes place. There is no need to fetch any additional instructions into #1 or #2 Temporary Registers 157 for it is known that the next instructions are already in Buffers 156.

When the branch instruction is again decoded with the I Box 134 in loop mode, one machine cycle can be saved if the previous target address is used rather than using the instruction addresses, GPR's 202 and Adder 168 to regenerate the address. At each branch point decoded, the I Register 148 address is compared in Comparator 181 against the address in SLCIR 179 to see if this is the same instruction which set the I Box into loop mode. If the two addresses are the same, the target address is also presumably the same and the target address in SLT Register 180 is transferred over Bus 1008 into the I Register to start another iteration of the instruction loop. Since the performance of the instruction loop iteration depends on the CC bits, the previously described conditional issuing of instructions will apply, but the instructions will be issued along the branch path.

There is, however, one set of circumstances under which the target address saved in SLT Register 180 is not the correct target and this arises when the data in the GPR's 202 used in the original generation of the branch target address has been modified during the last loop iteration. To check for this possibility the identification of the GPR 202 whose data was used for the base address is saved in SLC B Register 1042, and the identification of the GPR 202 storing the index address is saved in SLC X Register 1044. On each instruction, the identification of the sink GPR 202 is compared in Comparators 1046 and 1048 respectively, with the identifications in SLC B and SLC X Registers 1042 and 1044, and if any equality is found, it indicates that the target address in SLT 179 is no longer valid. The new target address will now be determined from the branch instruction as in the first branch instruction. The B and X identifications and target address will again be saved, but unless there is an internal change within the loop, the next iteration will again use the same GPR's and such saved addresses will be of no value.

Thus, the I Box can handle with a minimum time loss, the possible types of branching where there is an unconditional branch forward or back to a target more than eight double words back, where the branch is conditional and more than eight double words back, and the two loop mode branches where the target address is less than eight double words back and is or is not already within the instruction Buffers 156.

*Storing into instruction stream*

There are two instances in which an executed instruction may cause a change in an instruction of the stream of instructions in such a way as to require special handling. A first such instance is when an I Box 134 instruction generates an address value to be stored in one of the GPR's 202 and the next instruction uses that GPR as the source of its base or index address value. It will be remembered that the GPR's are physically located in the FXPU 143 and are connected to I Box 134 by Hot Wires 334. Due to the high repetition rate of the present embodiment of the invention, there is not sufficient time available from one cycle to the next for the signals to be sent to the GPR 202, pass into and through the register latches and return over the Bus 334 in time to be used in the next cycle. To avoid the necessity of holding up further I Box operations until the data is available on Lines 334, the Save R1 Register 1049 is set on every cycle to the address of the GPR 202, if any, specified in the instruction as the instruction sink register. The data stored in that GPR 202 will be generated in Adder 168 and retained in W Register 177. On the next cycle, the value in the Save R1 Register 1049 is compared in Comparator 1050 with the identification on Bus 162 of the base register for that cycle and in a Comparator 1052 with the identification on Bus 161 of the GPR acting as Index Register for the cycle. If either Comparator 1050 or 1052 finds an equality, the correct data is not yet available at gates 1030 or 1032, of the A or B Adder Bus 173 or 174. Therefore, the address data in W Register 177 is gated over Bus 1033 to A Adder Bus 173 or to B Adder Bus 174, depending on whether it is the B or the X instruction word address which matches the Saved R1 address and the corresponding gate from Bus 334 to the Adder Bus will not be opened. This will enable gating in of the updated Register 202 contents without the need for waiting for the updated signals to return.

The second instance of a store into the instruction stream is the alteration of a storage word when the original word has been returned to and is buffered in a Buffer Register 156 or is being fetched. For this situation, the W Register which will have generated the address at which the storage data is to be entered will contain a value which is equal to or less than the value in the UB Register 147 which is the address of the last fetched instruction word and will also be equal to or greater than the address in the LB Register 150 which designates the earliest instruction word in Buffers 156. If the value in W Register 177 is between the values in the UB Register 147 and that in LB Register 150, there will be an output signal from Comparator 1041. This signal will set off the tag bit for the Buffer 156 having or to receive the instruction word from the address which is to store the new data and will call for a new fetch of the word at the storage address designated by the W Register 177 to refill the Buffers 156. If the instruction word has already been passed by I Register, only the fetch time will have been wasted, but such a fetch of a past word is required if an instruction loop including that word has been or will be set up. It is considered preferable to always refill the instruction Buffers 156 for these circumstances rather than provide the extra hardware needed to remember which Buffers 156 are empty and call for a fetch to that Buffer if a loop mode state is set up. Such a late fetch could halt the I Box 134 operations until it has been returned.

A special problem arises when the store operation is to an address which is that of the next instruction to be decoded. Due to the overlapping of instruction decoding and pipelining of operations, even the best timing would not generate and transmit the address of the store instruction before the next instruction was being decoded so that the instruction to be altered would already be in the pipeline. To avoid this possibility, a quick check is made to see if the effective address of a store operation could refer to either of the next two instructions following the store. A Comparator 1053 checks at every store operation the low order part of W register 177 against the word part of I Register 148 and another Comparator 1054 simultaneously checks the low order part of W Register 177 with the word part of I Register 148 increased by three units. If on such store operation the compared part of the store address in W Register 177 is more than the I Register 148 address as checked in Comparator 1053 and it is equal to or less than the I Register value increased by three units, there is a possibility that the store is to an instruction word being decoded. The I Box 134 will immediately pause for one machine cycle until the Comparator 1041 has made a check of the full addresses for checking the instruction store for a conflict. Such one cycle delay will occur on less than about 25% of the store operations.

Such a store into the instructions already in the Buffer Registers 156 can also require changes when in loop mode, a store is made to the instruction address which has been the branch instruction. In addition to the above noted refetching of the new instruction word and possible one cycle hold up, this type of store requires that the system be reset from loop mode since there is no assurance that the changed instruction will be a branch one or even if it is a branch that the same loop will be set up. The W Register is therefore on a store operation compared with the saved I Register address in SLCIR 179 by a Comparator 1056. If the store is to an instruction in the Buffers 156, and this instruction is the one which initially set up the branch loop, as indicated by an equality in Comparator 1056, then the I Box is reset from loop mode to enable a fresh start for obviously, if the new instruction were not a branch, the I Box would continue to the end of the instructions in Buffers 156, and would come to a halt.

Instruction issuing

The second principal responsibility of I Box 134 is the decoding of instructions in sequence, the issuing of instructions to the appropriate units, and the issuance of fetch instructions for the required storage operands. Instructions may be received in five different formats, one of which is one half word long, three of which are two half words long, and the last one being three half words in length. The formats are designated as the RR format which is for all instructions in which the required operands are in the registers within the E Box 133, either the GPR's 202 for instructions for the FXPU 143 or the FLR's 187 for FLPU 142 operations. Instructions in this format are one half word (16 bits) in length and comprise an eight bit operation code, a four bit code identifying the register in which a sink operand is stored, either a GPR 202 or an FXR 187 depending upon the operation code, and a second four bit code identifying the similar register in which a source operand is stored. The first two bits of an RR format instruction are 00 which is interpreted to mean a RR format. The third bit is a one for instructions for the FLPU 142, while a zero in the third bit indicates instructions for the FXPU 143 or the I Box 134, the fourth bit distinguishing between them with a zero for the I Box 134 instructions and a one for FXPU 143 instructions. The remaining four bits of the operation code distinguish between the different instructions within a unit.

The second format is the RX format identified by the first two bits from the left being 01. This instruction is two half words long (32 bits) and includes an eight bit operation code, a four bit identification of the register, either a GPR 202 or an FXR 187, storing the sink operand, a four bit identification of a GPR 202 containing an index value, a third four bit group identifying a second GPR 202 containing a base address and a 12 bit address displacement. The values in the index and base GPR's are added to the displacement value to generate the effective storage address of the source operand to be fetched. In some instructions, no sink register is utilized and the four bit sink register address can be utilized for other purposes, e.g. as a mask group. For this instruction format a one in the third bit position indicates an instruction for FLPU 142, and a zero in that position designates an instruction for either the I Box 134 or the FXPU 143.

The third and fourth formats may be considered together since both are two half words (32 bits) long and each has the three leftmost bits as 100. In the RS format, the first eight bits are the operation code as in all of the other instructions, and the next four bits specify the GPR 202 which contains the sink operand or which is the first of a series. The second four bits is the identification of a second GPR 202 which may contain a second operand, be the last one of a series, or may be meaningless in some instructions. The last 16 bits are always the identification of a storage address and will comprise a four bit identification of a GPR 202 having a base address and a 12 bit displacement value which will be added to the value in the base GPR to generate the effective storage address for the instruction. In the SI format instructions, only one byte of the storage word is processed and the second operand, if any, is always the byte of immediate data in the second eight bits from the left of the instruction, bits 8 to 15. Some instructions using the SI format do not have an immediate operand byte and for these instructions the bits 8 to 15 are meaningless and are ignored. Most of these operations are I Box 134 instructions relating to machine status changes or to input/output equipment commands.

The last format is the SS format and is used where two storage locations are to be specified. The left eight bits is the operation code with the two leftmost bits being 11 to identify the format. The SS format is always 3 half words (48 bits) long with the two right hand 16 bit half words each identifying a base address storing GPR 202, and a displacement value which are added as above described to generate the two storage addresses. The remaining eight bits can be either two four bit length fields to specify the number of pairs of operands to be processed, or can be an eight bit length field to specify the number of bytes of data to be processed, the specific meaning depending upon the operation code.

As previously mentioned, the I Box 134 will process instructions in three pipelined stages with up to three instructions being in different phases at the same time. In the first stage, the left eight bits of the instruction are gated from OP Register 159 on the OP Bus 160 to OP Decode 166 which will set the OP Stage information including the E Unit, FXPU or FLPU to receive the instruction, whether the results of the instruction are to set the condition code, the operation code and the identification of all registers and buffers which are to contain the operands.

As previously mentioned, there are six FXOS Buffer Registers 201 and each time an instruction is issued to the FXOS 201, over Bus 222, an FXOS Counter 203 in the I Box 134 is incremented by a unit value under control of an FXOS Counter Control 1060 which is responsive to issuance of an instruction to FXOS 201 from OP Stage 169 to gate into FXOS Counter 203 the incremented value from the Counter Incrementer 1061. When an instruction is gated out of FXOS 201 and executed in the FXPU 143, a signal STEP FXOS is generated on a Line 302 and sent to FXOS Counter Control 1060 which is thereby conditioned to gate into FXOS Counter 203, the output of the Decrementer 1062 to thereby reduce the reading in the FXOS Counter 203 by one unit. A Compare Unit 1064 is continuously coupled to the FXOS Counter 203 and will generate a signal when the value in FXOS Counter 203 is equal to six (0110). This signal is returned to the FXOS Counter Control 1060 on a Line 1065 and is passed out on a Line 1066 to stop the I Box 134 from issuing any more instructions to FXOS 201 which is full and cannot accept them. FXOS Counter Control 1060 is also capable of balancing out the increment and decrement signals so that if both are received on the same cycle, no signal is passed to the FXOS Counter which will be unchanged. FXOS Counter Control 1060 also provides a fast control over the stop signal on Line 1066 since it can utilize the incoming STEP FXOS signal on Line 302 to block the signal on Line 1065 substantially before the decremented value can pass through the Counter 203 and Comparator 1064 to drop the signal on Line 1065. A substantially similar set of units is provided to control issuance of instructions to the eight instruction Buffer Registers in FLOS 184. The FLOS Counter 186 is provided with an Incrementer 1068, a Decrementer 1069 and a Comparator 1070 which generates an output signal when the value in FLOS Counter 186 is equal to eight indicating that FLOS 184 is full and can accept no more instructions. The FLOS Counter Control 1072 receives a signal from Bus 183 each time an instruction is issued to FLPU 142 and in response thereto will gate the incremented value from Incrementer 1068 into Counter 186. When a STEP FLOS signal is received from the FLPU 142 on a Line 1073, the Counter Control 1072 will gate into Counter 183 the value output from Decrementer 1069, and as above noted for FXOS Counter 203, if both signals are received on the same cycle, no change will be made in the reading of Counter 186. Similarly also the stop signal from Comparator 1070 on a Line 1074 is passed through FLOS Counter Control 1072 to a Line 1076 which signals the I Box 134 to stop issuance of instructions to FLPU 142.

It will also be recalled that many of the machine instructions for execution units identify one or more General Purpose Register 202 as the source register for operands or as the sink register for operands to be generated by the instruction, and other instructions use the values in identified GPR's 202 as base addresses. As there is no fixed sequence of decoding and execution of instructions, it is important to prevent the I Box 134 from using the data in a GPR 202 for an address before the Execution Unit 133 has generated the correct data for that GPR 202. The I Box 134 is therefore provided with a Register Unavailable for Addressing (RUA) Counter 337 and a Register Unavailable for Modification (RUM) Counter 335 for each GPR 202. Each RUA Counter 337 is incremented by a unit each time an instruction is issued from OP Stage 167 which specifies the associated GPR 202 as the sink register for an instruction, and the same RUA Counter will be decremented by a unit each time the associated GPR 202 is used as such a sink by the E Unit 133.

It is also necessary to prevent the I Box 134 from changing the data in a GPR 202 if there is an outstanding instruction which specifies that the GPR 202 is the source of data for an unexecuted instruction and therefore each instruction which is issued from OP Stage 167, and which identifies a GPR 202 as a source register, will cause the RUM Counter 335 associated with that GPR to be incremented by a unit. This RUM Counter 335 will be decremented by the unit when the GPR 202 data has been utilized in the instruction being executed. The RUA Counters 337 and RUM Counters 335 are essentially the same and may be a conventional type of Add-Subtract Counter since the only condition of interest is a counter reading of zero. Each instruction set into OP Stage 167 will receive from Bus 161 the identification of a sink register R1 and possibly a source register R2. The R1 sink register identification on Bus 161 is decoded in Select RUA Control 338 to determine an RUA Counter 337 to be incremented, and if the instruction is determined by OP Decoder 166 to be one in which a sink GPR 202 is specified, the Select RUA Control 338 is signalled on a line 1077 to send an increment signal over Bus 1078 to the selected RUA Counter 337. When the FXPU 143 executes this instruction, it returns a signal to the same RUA Counter on a corresponding line of Decrement RUA Bus 341 to decrement the RUA Counter by a unit. When the RUA Counter is at zero, there are no outstanding instructions which can change the data therein and its data is now logically available to I Box 134 for use as an address factor in a later instruction.

The set of RUM Counters 335 are physically the same as the RUA Counters 337 and are selected for incrementing by the Select RUM Control 339 when an address for what could be a source register designation is present on address Bus 131. If the OP Decode 166 determines that the instruction being issued is one using a GPR 202 as a source register, it sends a signal on Line 1079 to the Select RUM Control 339, to cause an increment signal to be sent on Bus 1080 to the selected RUM Counter. When the FXPU 143 executes the instruction for which the identified GPR is the source operand storage, the FXPU sends a Decrement RUM signal to the appropriate RUM Counter on Bus 342. As long as the FXPU 143 needs the data in the GPR as a source operand, it is not permissible for the I Box to modify the data as a result of a logically following instruction although it would be permissible to use the data in GPR 202 as an address since there is, so long as the corresponding RUA Counter is at zero, no instruction to be executed which will change the data in the GPR. Thus the I Box 134 is not allowed to use or modify a GPR 202 so long as the RUA and RUM Counters 337, 335 are not at zero.

One of the major functions performed by I Box 134 when it issues an instruction to the FLPU 142 or the FXPU 143 is to call for a fetch of the operand or operands required from storage for the execution of the instruction and it must send with the fetch request the identification of the Buffer Register which is to receive the operand and retain it until it is utilized. This same identification will be sent with the instruction in place of the original storage address so that the execution unit can find the operand. To determine the buffer register which may be assigned for an instruction, I Box 134 maintains a Busy Trigger 1082 for each of the six Fixed Point Buffer Registers 204–210, and a Busy Trigger 1083 for each of the six Floating Point Buffer Registers 185. When an instruction requires the use of an FXB 204–210, the I Box selects a non-busy one and transmits its identification with the fetch request to MSCE 136 and enters the identification over a Bus 1084 into OP Stage 167 as a part of the instruction to be sent to FXOS 201. This identification on Bus 1084 will be decoded in a Set FXB Busy Control 1086 to set the corresponding FXB Trigger 1082 to a busy status. This Trigger 1082 remains set and prevents further assignment of this FXB 204–210 by I Box 134 until the operand in the FXB is gated out and used in the FXPU 143. At this time, the FXPU 143 sends a Reset FXB Busy signal on the proper line of a Bus 1087 to reset the Busy Trigger 1082, thereby freeing the Buffer Register 204–210 for further assignment by I Box 134.

The FLB's 185 are similarly assigned by I Box 134 for buffering of fetched storage operands and may be assigned on either a floating point or a fixed point instruction. The FLB Address Bus 1088 will receive the address of an assigned FLB 185 for setting the OP Stage 167 to transmit the identification as a part of an instruction and will also transmit the address to the Set FLB Busy Control 1090. The Control 1090 will decode the FLB address and will set the corresponding FLB Busy Trigger 1083 to prevent further assignment of the corresponding FLB 185. When the operand in FLB 185 has been transmitted to an operand utilizing area, a Reset FLB Busy signal is sent on the corresponding line of a Reset FLB Busy Bus 1091 to reset the FLB Busy Trigger 1083 and free the corresponding FLB 185 for reassignment by I Box 134.

A substantially similar arrangement is provided for control of storage operations. There are three Storage Address Registers (SAR) 241–Storage Data Buffer (SDB) 244 pairs in MSCE 136. When the I Box 134 decodes a store instruction, it selects one SAR 241 to receive the address in storage to receive the operand and simultaneously sends to OP Stage 167 on either the FXB Address Bus 1084 or the FLB Address Bus 1088, the identification of the selected SAR 241 for inclusion as a part of the instruction. When the storage address is sent to the selected SAR 241 from W Register 177 on Bus 1034 to SAB 240 in MSCE 136, the Pipeline 3 Storage OP Register 1092, to be further described, simultaneously transmits control information thereto and this information is utilized to set an SAR Busy Trigger 1094 preventing further assignment of the assigned SAR 241. After the execution unit has executed the instruction by sending the desired operand to the associated SDB 244, and the MSCE fully executes its part of the store operation, a RESET SAR signal is returned by MSCE 136 on one of the Lines 1095 to reset the associated SAR Busy Trigger 1094 and free the SAR 241 for another assignment by I Box 134.

It has previously been stated that I Box 134 can handle instructions in several phases at the same time. In the first cycle, an instruction has its first eight bits on the left sent to OP Decoder 166 which determines the unit to receive the instruction, assigns Buffer Registers for the operands to be fetched, and passes to the OP Stage 167, the designations of the Registers, either GPR's 202 or FLR's 187, to be utilized in the execution of the instruction and transmits this assembled information to the executing unit. If the instruction is an RR type, that is all that is needed and it will be complete at the end of the cycle unless as earlier noted, the executing unit cannot accept additional instructions, in which case the I Box 134 stops until it can transmit the instruction.

If the instruction is in an RX format, an address generation is required for the storage operand and OP Decode 166 will gate into the B Bus GPR Selection Controls 1095 the four instruction bits (12–15) designating the GPR 202 storing the index value, will gate into the A Bus GPR Selection Controls 1096 the four instruction bits (16–19) designating the GPR 202 storing the base address and will gate into Buffer 165 the 12 bits (20–31) of the displacement value. On the next machine cycle, the setting of the A Bus GPR Selection Controls 1096 will be decoded to open the Gates 1030 to gate to A Bus 173 the data in the GPR 202 designated as the index register, and the setting of B Bus GPR Selection Controls will be decoded to open the Gates 1030 to gate to B Bus 174 the data in the GPR 202 designated as the base register and will gate out Buffer 165 to Adder Input Bus 169. The three sets of data will be added together in Adder 168 to generate the effective fetch address and at this time the previously described quick check of the three low order bits of the address is made in a store instruction to see if the instruction can be a store into the next instruction already being decoded. If the store could be to the next instruction, the next instruction is held up for one machine cycle. At the end of this cycle, the effective address is retained in W Register. All control information necessary for the fetch or store was sent in the decode cycle to a Pipeline 2 Buffer Register 1098 for retention, and at the end of the second cycle this data is transferred to Pipeline 3 Buffer Register 1099.

During the third cycle the address in W Register 177 is transmitted on Bus 1034 to SAB 240 in MSCE 136, and the control data in Pipeline 3 Buffer Register is sent to MSCE. If the instruction is a store instruction, the previously noted comparison of the address in W Register 177 is compared in Comparator 1041 to determine if the store is to an address already in the Instruction Buffers 156 or being fetched for a Buffer 156. If so, the Buffer 156 is set to an empty status and a new fetch is issued to follow the store instruction. Also, on a store instruction, the address of the designated SAR 241 is decoded in SAR Control 1101 to set the SAR Gates to receive the address and control data, and also sets the associated SAR Busy Trigger 1094 to prevent selection of the SAR 241 for another store operation.

If the instruction is in RS format, the I Box operation is the same except that the bits 12–15 of the instruction are not used as the designation of an index register, and consequently the B Bus GPR Selection Controls are not set to open a set of Gates 1032 on the next cycle. For an SI format instruction, the I Box acts the same as for an RS format even to gating the eight bits 8–15 of the instruction into the OP Stage 167. In this instruction, however, these bits represent data, not register designations.

The last instruction format, the SS format, is distinct in that it may contain one or two length fields and contains two storage addresses, each with a base register designation and a displacement factor. The length fields or field are transferred on Bus 161 to an L Register 1102 for later use, and the first address, bits 16–31, is decoded as in the RS format. In this SS format the decoding of the next instruction is held up for one machine cycle during which the second address is processed in the same manner as the first address was processed in the previous cycle, thus enabling the Pipeline Buffers 1098 and 1099 to issue two fetch instructions on successive cycles. If there should be any holdup in the acceptance of instructions by MSCE 136, the entire I Unit 134 will stop processing all instructions requiring communication with MSCE 136 until the instructions can be accepted.

There are two inputs to I Box 134 which should be briefly mentioned at this time. In the instructions Translate and Translate and Test, the FXPU 143 requires bytes from a table in storage. The address of the byte is generated by adding to the basic table address held in W Register 177, the byte transmitted from OR 237, FIG. 6A, into a Byte Buffer 1103, and from there gated to Adder Bus B 174. The resultant address is used to fetch the needed table word. The other input is used in operations such as Pack and Unpack in the VFL part of FXPU 143. Here it is at times possible to have operands being stored in and fetched from the same addresses on successive cycles. Due to the prefetching of operands required to maintain rapid processing, this condition must be detected for special processing. When the I Box 134 finds this condition, it sets controls to insure that the FXPU 143 will not be given a fetched byte of a word until the word has been stored. In effect all prefetching is suppressed when overlap can occur. To speed this up as much as possible, the store and fetch control information from the VFL section of FXPU 143 are introduced directly into Pipeline 3 Buffer Register over a Bus 1105, to start the fetch or store at the first available cycle.

*Flow charts for branching instructions*

In the following description of the accompanying flow charts, certain of the Mnemonics such as RR, RS, RX, SI and SS refer to the instruction format and have just been described. Others as B, X, GPR, FLR, FXR, FLB, FXB and SAR, have been referred to in earlier sections of this description and relates to hardware registers of the described embodiment of the invention.

In the flow charts, the rectangular boxes indicate the operation of setting status or control triggers and the diamonds or double pointed boxes are logical decisions which determine the triggers to be set on the next clock pulse if all preceding conditions are met.

Adder Available is a reference to the Address Adder 168 and implies that the Adder is either currently not used or if used, its output will move into W Register 177.

Register (X, B, RI etc.) Available refers to the GPR's or other storage registers which are available when they are not currently tagged as sinks (or sources if I Box will modify them) for fixed point operations, i.e., RUA or RUM ≠ 0.

When a result is to be put into a GPR 202, an early request is signalled because two cycle timing is required in the request-accept loop even though I Box 134 is given top priority.

One of the most general branching instructions is the EXECUTE instruction which is an unconditional one cycle branch to an instruction identified by the EXECUTE instruction. The EXECUTE instruction is in RX format in which the instruction address is determined by the sum of the data in the index (X) GPR 202, the data in the base (B) GPR 202, and the displacement data in the instruction. The addressed instruction is fetched with a return sink address to #1 Temporary Buffer 157, and if the target instruction can be across a double word boundary, the next consecutive double word address is generated by recirculating the address in W Register 177 and entering a unit on Line 1011 into the adder inputs. This fetch is to be returned to #2 Temporary Buffer 157, and is required because the instruction could be across the double word boundary. When returned, the first instruction word is gated into OP Register 159 starting at the half word addressed by the execute instruction (an odd address to a byte is considered an error and stops the instruction), and when the second word is returned, it is gated into the remainder of the OP Register 159 and the instruction is now decoded for execution. During the decoding, bits 24–31 of the data in the GPR 202 identified in the EXECUTE instruction are gated out through the GPR gates 1030 to Adder Bus A 173, and pass to the Execute ORs 1106 where the bits are ORed with bits 8–15 of the fetched instruction to effectively insert new register addresses or operand lengths into the fetched instruction. This fetched instruction is executed as modified and the next instruction in the normal sequence is the next to be executed as the I Register 148 is incremented on an EXECUTE instruction, but is not loaded with the address of the target instruction.

Referring to the Execute Flow Chart, FIG. 59, state zero is the initial I Box status in which the instruction is decoded to set the controls specific to the instruction. When the Execute instruction is decoded, Block 1108, a check is made of the availability of the Adder 168, and, by reference to their RUA counters 337, of the availability of the two GPR's identified as the index and base registers. If the instruction is being conditionally issued, the GPR specified as the source of bits to be ORed with the target instruction must also have its RUA counter at 0, but if no conditional mode is set, the condition of this GPR is not considered at this time. One machine rule is that no execute instruction may have another execute instruction as its target since this could lead to an unending loop of execute instructions. If this condition is detected, Block 1109, and the I Box 134 is not operating in conditional mode, an interrupt condition is signalled to eliminate or record the programming error. Under the normal conditions, the N exit from Block 1109 is taken to cause generation of the target instruction address, to stop other instruction fetching and to set controls to state one. In state one, on the next cycle, if the W register 177 is available for use, the OP Register 159 is reset to remove the used EXECUTE instruction which has the X and B register identifications in the B Bus and A Bus GPR Selection Controls 1095 and 1096 respectively, and the R1 identification is stored in the SAVE R1 1049. A fetch of the target storage address is called for with a sink in #1 Temporary Buffer 157. The next consecutive storage address is generated by incrementing W Register 177 through Adder 168 and stage 2 conditions are set.

In the next cycle, a check of the starting address of the target instruction is made to see if it ends in either 100 or 110, i.e. starts in either of the last two half words of a double word, for if so the target instruction could extend into the next word which will be fetched as soon as the address is available in W Register 177. After the fetch request is sent, or if the target instruction cannot extend over the word boundary, the I Box is set to state 3.

In the state 3 cycle, a check is made of the R1 address for an R1 address of zero means that the target instruction is to be executed unmodified and as soon as the availability of the R1 register is determined (its RUA Counter 337=0) the R1 register gates 1030 are set to put the R1 data on A Adder Bus 173 and to the Execute OR 1106 and for either event, the I Box 134 is set to state 4. As soon as all target fetches are returned, in state 4, and are set into OP Register 159, the I Box is returned to the original state zero to enable a decoding of the new instruction. For this target instruction decoding the I Box remembers, Block 1109, that it is decoding the target instruction of an execute instruction and that it is to interrupt if the target is also an execute instruction. The execution of this type instruction permits indirect length, index mask, immediate data, and arithmetic-register designation in an instruction by data stored in a GPR which data can be modified as desired to alter the effect of the instruction without any changes in the target instruction.

There is no specific UNCONDITIONAL BRANCH instruction, but it is possible to execute a BRANCH ON CONDITION instruction unconditionally. A BRANCH ON CONDITION instruction can be in either an RR format (BCR) or an RX format (BC) wherein the four bits 8–11 normally specifying a sink register are now a condition code mask, and the branch address is contained in either the GPR 202 identified in the last four bits of the RR format or is the address generated as the sum of the specified index GPR data, the specified base GPR data and the address displacement given in the instruction. There are two condition code bits in the PSW Buffer 1006 which can be set individually to zeros or ones thereby being settable into four combinations, namely, 00, 01, 10, and 11. Each of the four mask bits correspond to one of these four combinations and if any mask bit is a one, the branch will be taken if a corresponding combination is present in the condition code bits. Clearly, if all four mask bits are ones, the branch will be taken no matter what condition code bits are set, and will be in effect an unconditional branch. If either all four mask bits are zeros or the four bits for the branch GPR designation are all zeros, the branch will not be taken and is equivalent to a null operation.

The flow chart conditions for an UNCONDITIONAL BRANCH operation are shown in FIG. 60, where the chart starts with the I Box 134 in state 0 and an unconditional branch decoded. If the Adder 168 is available, Block 1111, the format of the instruction is checked for an RR format in which the R2 GPR address is checked for an all zero condition which if found automatically sets the I Box 134 to no-op the instruction without further investigation. If the R2 address is any value other than zero, the RUA Counter 337 for the R2 GPR 202 is checked for a zero condition indicating R2 is available. If the format is found to be RX a check is made of the RUA Counters 337 for the GPR's designated as the base and index registers. For either format, if the I Box 134 is not remembering that the present instruction is the target of an EXECUTE instruction, see FIG. 11, but the quick loop condition is set, Block 1112, the OP Register 159 is reset and the target address is moved from the SLT Register 180 into the I Register 148 and AO Register 1002, Block 1113. The I Register 148 moves the target instruction from its Buffer Register 155 to the OP Register 159 for decoding as described. The quick loop condition, Block 1112, is present when the target of the branch instruction is present in the Buffer Registers 155, i.e., is equal to or more than the LB Register 150 address as indicated by the Comparator 181 determining that the I Register 148 address is the one for which the target address is saved in SLT Register 180.

When the instruction is the target of an EXECUTE instruction or the quick loop mode trigger is not on, Block 1112, the branch address must be generated as required by the instruction format, Block 1115, and the conditional mode status is determined. If the I Box 134 is not in conditional mode, the availability of a Temporary Buffer 157 is determined. If a Temporary Buffer 157 is available, and we are not set in loop mode, the I Box 134 is set into state one and normal instruction fetching is stopped. When a Temporary Buffer 157 is not available, or the I Box is already in loop mode, or if the I Box 134 is in conditional mode but the conditional branch target is not in the Buffer Registers 155, the I Box goes to a state two condition and stops instruction fetching. As soon as W Register 177 is available in either state, i.e., the branch target address is held therein, state two shifts to state three and state one will shift to state three after a fetch request is issued for at least the target instruction to be returned to the Temporary Buffer 157 as a sink, or if the branch address is not already in the array of Buffer Registers 156, then after a fetch request is issued for the instruction at the next address after the target address. In state three, a test will be made to find if the branch target is lower in magnitude than the address of the branch instruction. This is determined by generating in Adder 168 the branch instruction address from the LB Register 150 and the IR Incrementer 153, and adding thereto the complement of the branch address in W Register 177. When the branch target is already in the array of Buffers 156, control is transferred to Block 1113 to start decoding instructions along the branch, or if the branch target is not in the Buffers 156, the target address is transferred into the LB, UB, I and AO Registers and the I Box Buffers 156 are normalized as previously described. Now if the instruction is not the target of an EXECUTE instruction, and the target address is less than eight double words earlier than the branch instruction, the quick loop condition, Block 1112, is established so that on the next decoding of the branch instruction the branch will be taken immediately. It may be noted that even if the branch target is not in the array of Buffers 156, the first time the branch instruction is decoded, the decoding of the target address as less than eight double word earlier than the branch together with the initializing and establishment of the quick loop mode, will insure that the target will remain in the loop for further iterations. Another feature to note is the ability to set the I Box for loop mode even if the target instruction is more than eight double words earlier. This results in conditional instructions being issued along the branch rather than continuing along the main instruction path as when loop mode is not set. This can save some fetching and instruction cancelling as it is considered more likely that a branch once taken will continue to be taken rather than that only one loop iteration will be made. With this assumption, there will be fewer decoded and conditionally issued instructions to be cancelled than if it were always assumed that the branch would not be taken.

The CONDITIONAL BRANCH instruction is substantially similar to the UNCONDITIONAL BRANCH just described but is subject to several additional restrictions. For instance, if a CONDITIONAL BRANCH is decoded with the I Box 134 already operating in conditional mode, the operation stops for it would not be proper to have two branches depending upon the same condition. Also, for such a branch, instruction prefetching must be set up for the branch path, or the main path if I Box 134 is set in loop mode. The important conditions are the branch target address is back and loop mode can be set, the target address is back less than eight double words but is not now in the Buffers 156 so loop mode can be set, or the target address is already within the Buffers 155 and a quick loop can be set up.

Considering the flow charts, FIGS. 61 and 62, a decoding of a CONDITIONAL BRANCH instruction checks for availability of Adder 168, and if the format is RR, for availability of the named R2 Register, or if the format is RX, for availability of the B and X Registers. When the registers are available and the I Box is not in conditional mode, the target instruction of an EXECUTE instruction will wait for the condition code to become valid and will go either to the next instruction for a no branch condition, or for a branch condition will generate the branch address in Adder 168, and go to state 1 of UNCONDITIONAL BRANCH, FIG. 60. The usual branch instruction will not be the target of an EXECUTE instruction and the I Box 134 will be set to state 1, and instruction fetching halted. At the same time, the loop status will be tested and unless both loop mode and quick loop have been established, the branch address will be generated in Adder 168, but if both loop mode and the quick loop are set, then the address of the next instruction will be generated. In state 1, as soon as the W Register 177 is available, i.e., contains the address of the next instruction to be fetched, control passes to FIG. 62 at entry point B, at which point the condition code in PSW Buffer 1006 is tested, and if valid, enables the branching decision to be made immediately. If both the loop mode status and quick loop status are set, and the branch is not to be taken, Block 1116 (N), the I Register 148 is incremented to the next instruction, but if the branch is found to be proper, the OP Register 159 is reset to clear out the next instruction which is not to be decoded and the SLT Register 180 is gated into I Register 148 to start the new instruction loop. When the I Box 134 condition is such that either loop mode status or quick loop status is not set, the branch test, Block 1116, will switch between the next instruction for a no branch decision and the state 3 condition for a branch decision. In state 3, Block 1117, the test is made for a possible loop by generating the difference between the next instruction address and the target address in Adder 168. If the branch address so generated is already in the array of Buffers 156, then the control is the same as the output of Block 1116 in a quick loop, i.e., reset OP Register 159 and set the target address into the I Register, this time directly from W Register 177. If the branch address is not in the array of Buffers 156, then the target address is transferred to the instruction unit controls and the I Box is initialized as set out above. For either case in state 3, the quick loop will be established if the target is less than eight words back of the I Register 148 address, Block 1119 (Y).

When the condition code is not yet valid at the decoding of a branch instruction, it is desirable to proceed with instruction decoding along one of the possible paths in hope that when the condition code does become valid, we can have some instructions preprocessed and ready for execution. We must not, however, make any changes which cannot be reversed if we have selected the wrong path. Therefore, as previously described, we assume there will be no branch if the I Box is not in loop mode, and that there will be a branch if the I Box is in loop mode. Instructions will be processed along the selected path until it becomes evident that the wrong path was taken. If the I Box is not set for a quick loop mode, it will save some fetch times if we also make some fetching for the instructions along the non-selected path and store them in Temporary Buffers 157. All instructions issued in this state are tagged conditional and are not to be executed. Referring again to FIG. 62, when the condition code is not yet valid when I Box 134 is in state one, if both the loop mode test and the quick loop test are (Y), then the next instruction address (IR INCR 153) is saved in the SAVE IR Register 1120, and the branch target address in SLT Register 180 is set into I Register 148 to start the loop iteration. The OP Register 159 is reset and the conditional mode state is set to prevent execution of instructions until the condition code becomes valid. If either loop mode or the quick loop is not set at the time the condition code is tested, the I Box 134 goes to state two and the target instruction is called for by a fetch request since it will be needed in any event. If we are in loop mode, but not in a quick loop, this instruction is the next one to be decoded and processing of further instructions will be halted until it is returned into a Temporary Buffer 157 and also directly into OP Register 159. Instructions will still be called for even though decoding of instructions along the main path continues. In state two, Block 1121, the Adder 168 is again used to determine if the target instruction is within eight double words of the I Register 148 address. The Adder 168 is furnished the output of IR Incrementer 153, the output of the LB Register 150, and the complement of the target address in W Register 177, to determine if the branch target is backward or forward and how far. In this state two, the conditional mode status is set and the I Register 148 is incremented to the next instruction address. If now the branch address is already in the array of Buffers 156, this is remembered, but if the target address is not in the array, then the target address in W Register 177 is incremented in Adder 168 to generate the next instruction address to be fetched and buffered in #2 Temporary Buffer 157.

FIG. 63 shows the controls for establishment of the loop mode condition for any of the conditional branch instructions. When a control signal is received at input A, from FIG. 61, indicating that the I Box is in state zero of a CONDITIONAL BRANCH instruction, and so long as the conditional mode is set up, the condition code stages of PSW Buffer 1006 are tested. When the condition code becomes valid, the conditional mode is removed to enable further instruction executions to continue, and the branching conditions are tested to determine if the branch is to be taken or not. If the branch is to be taken and the I Box 134 is in quick loop status, a correct assumption was made of the correct instruction path. At this time then, Block 1123, the conditionally issued instructions are activated and instruction fetching continued. This will also be true if the branch is not to be taken and I Box 134 is not in a quick loop status. Under these conditions, further proceedings will be as in Block 1123.

In the reverse situation where the branch is taken but I Box 134 is not in a quick loop status, or if the branch is not taken but a quick loop status was set, instruction decoding has proceeded along the incorrect path and must be corrected, Block 1124. In this condition, the cancel signal is sent to all conditionally issued instructions, and the OP Register 159 is reset. If this is the change from a loop mode to no branch, the saved next instruction address in Save IR Register 1120 is set into I Register 148 and decoding continues on the normal path, but if the change is into the branch path for the first time, then the branch target address saved in Temporary Register 176 is set into the UB, LB, I, and AO Registers 147, 150, 148 and 1002 to start the new instruction decoding sequence. In the first of these two situations, i.e., not branching while in a loop state, there is a possibility that the loop mode was actually set up by a later instruction and that loop mode should continue. This is tested by comparing in Comparator 181, the I Register 148 contents with that of SLCIR Register 179. If they are the same, Block 1125, then the loop mode state was set by this instruction and is removed.

In the other situation where the branch was taken and I Box 134 was not in quick loop state, when the target address test indicates that the target was less than eight words back, the quick loop status is set. Also, if the target address is not in the array of Buffers 156, as indicated by the output of Comparator 1041, the loop mode status is removed to enable proper fetching and the Instruction Buffers 155 and I Registers, etc. are normalized to start out anew. Since the quick loop is still set, however, the LB Register 150 cannot be incremented to drop instructions of the loop from the effective buffered instructions.

There is a group of four branch instructions which may be considered together since their differences are minor. These are BRANCH ON COUNT, BCTR in RR format, and BCT in RX format, BRANCH ON INDEX HIGH (BXH) and BRANCH ON INDEX LOW OR EQUAL (BXLE), both in RS format. In all of the instructions, the branch address is specified in some way in the instruction and will be generated at the output of Adder 168. For the BCT instruction the branch address will be the sum of the X and B register contents with the displacement value of the instruction. For BXH and BXLE it will be the sum of the B register contents with the displacement, and for BCTR it will be the R2 register contents alone passed directly through the Adder 168.

In the two BRANCH ON INDEX instructions, the two specified GPR's 202 have their contents added and the sum returned on Bus 236 to the first specified GPR 202. Then this sum, still in W Register 177, is compared with the value in the GPR which is the odd numbered one of the even-odd pair containing the second specified GPR 202, and the branching decision taken in accordance with the comparison result. It will be evident that if the sum is gated from W Register 177 over Bus 1036 complementally into B Adder Bus 174, and the comparand from the GPR 202 is sent over A Adder Bus 174 and entered true into Adder 168 and addition performed with a Hot One on a Line 1127, then there will be an end around carry in Adder 168, if the sum is less than or equal to the comparand, and no carry if the sum is greater than the comparand. This end around carry can be tested against the condition of the branch instruction to determine if the branch is to be taken to the address still held in Temporary Register 176.

For the two BRANCH ON COUNT instructions, the branch target address is set into Temporary 176 as above either as a sum or directly from the GPR through Adder 168. Now the first specified GPR is gated out on A Adder Bus 173 to Adder 168 and is reduced by one unit. This unit can be entered by setting the B Adder Bus 174 for a complemental entry without gating any external value to the input. If the Hot One is not signalled on line 1127, there is a net subtraction of one unit. As in the BRANCH ON INDEX instructions, this result is sent over Bus 236 to the sink GPR 202 and is entered complementally into Adder 168 over Bus 1036 and B Bus 174 with a Hot One on Line 1127, but without any GPR 202 being gated in over A Adder Bus 173. If the sum in the sink GPR 202 has been reduced to zero, there will be an end around carry in Adder 168 and this carry can be used as the signal that normal instruction sequencing is to proceed. The BRANCH ON INDEX instruction is the more comprehensive of these instructions, and its controlling factors will be described with reference to its flow charts FIGS. 64, 65 and 66, since the BRANCH ON COUNT can be derived therefrom by elimination of some of the GPR controls.

In FIG. 64, when a BRANCH ON INDEX instruction is decoded, the first check is to see if Adder 168 is available for use in the instruction, and then to check the RUA and RUM counters 337 and 335, respectively, for the GPR 202 designated as the base register to be sure it is available. If now the I Box 134 is in loop mode and the instruction is not the target of an EXECUTE instruction, then control exits to entry point A of FIG. 65. If the instruction is the target of an EXECUTE instruction, a check is made of the conditional mode status. If conditional mode is not set, control is passed to a Line 1128, but if the conditional mode status is set, then a test, Block 1129, is made to see if the conditional branch target address is or will be within a quick loop (loop mode is already set) and if not control is passed to Line 1128. If Block 1129 is set Y, then no action will be taken until the conditional mode status changes to N, passing control directly to Line 1128.

When it is sensed that loop mode is not set but conditional mode status is set, further control is passed to Block 1129 to prevent further action if the conditional branch target within the quick loop which would be established if the branch were to be taken. When the conditional mode status is removed, the availability of the Temporary Buffer Registers 157 is tested and if neither is available, control is again sent to Line 1128, but if one or both are available, the I Box goes into state one to fetch the instructions along the branch path (loop mode is not set). In this state one, the normal sequential instruction fetching is halted and the branch target address is generated from the instruction data. When the W Register 177 has the branch target address available, the address is sent on Bus 1034 to MSCE 136 for a fetch into the Temporary Buffer 157, and also back through Adder 168, to increment the address to the next address. As the target address fetch is being made, a test of the comparator 1041 is made to see if the target address is already in the array of Buffers 156, or is being fetched for them, and if so control is passed to Line 1128. If the target address is not available to the array of Buffers 156 then a fetch request is made for the now generated target address plus one and control sent to Line 1128.

Line 1128 is the entrance to the testing part of the instruction and starts at a Block 1131 where the availability of the GPR's 202 designated as the index register R1, the increment register R3 and the comparand register R3* is checked and further processing is halted until all are available. The designation R3* is for the odd numbered member of the even-odd pair of GPR's 202 of which the R3 GPR is a member. The R3* can be either the R3 register or the next higher numbered one depending on whether R3 is odd or even. When these registers are available (RUA and RUM counters=0) the I Box passes to state 2 and gates the R1 and R3 GPR's into Adder 168. As soon as W Register 177 is available to accept the sum of R1 and R3, state three is entered and, if the I Box 134 is not in conditional mode, the FXPU 143 is notified that I Box 134 requires priority to enter data into a GPR 202, i.e., into R1.

In state three, Block 1132, the R1, R3 sum is gated into W Register 177 and passed back to the input of Adder 168 to be subtractively combined with the data from the R3* GPR and control is passed to entry D on FIG. 66. At entry D, FIG. 66, if I Box 134 is not in loop mode but the target address has been determined to be in the array of Buffers 156 (Comparator 1041, FIG. 10), the I Box shifts to state six, Block 1133. If, however, the target is not in the array, a check is made of the conditional mode status and if we are in conditional mode, the I Box shifts to state 4, Block 1135, but if not in conditional mode, the status of Temporary Buffers 157 is looked at. If no fetching was done, I Box 134 also shifts to state 4, Block 1135, which will generate the branch target address and will then wait until the decision on the branch conditions is met. If, on the other hand, there was fetching to the Temporary Buffers 157, the I Box 134 goes into state five, Block 1136. State five is also reached from state 4, Block 1135, when it is decided that the branch conditions have been met and the branch is to be taken. In state five, the difference between the instruction address from I Register 148 and LB Register 150, and the target address from W Register 177 (Block 1132, FIG. 16) is determined in Adder 168 to decide if loop mode can be set up. If when the branch decision is made, the branch is to be taken, the test is made to see if the target address is in the array of Buffers 156 (Comparator 1041, FIG. 58), and the I Box 134 goes into state six, Block 1133. If the target is not in the array, then it is also necessary to initialize the I Box 134 by transferring the target address to the I, LB, UB, AO Registers and setting SLT and SLCIR if a quick loop is to be set up. From either state 4, Block 1135, or state five, Block 1136, if the branch is not to be taken, the instruction sequence is to proceed along the normal path so the conditional mode setting is checked. If we are still in conditional mode, the I Box 134 shifts over the state 6. State six has an exit to entry C of FIG. 63 to enable a setting for loop mode if possible, and also waits until the conditional mode status goes off. At this time, if priority on the use of the GPR's 202 had not been previously requested, priority is now requested of FXPU 143 to store the sum of R1 and R3 into the R1 GPR 202. If priority had been requested, and the branch taken, as soon as GPR priority is granted, I Box 134 is shifted to state zero, the R1, R3 sum is transferred to the R1 GPR 202, loop mode status is set if appropriate and the OP Register 159 is reset for the new instructions.

If the branch has not been taken in this control sequence or the branch had not been taken during state four, Block 1135, and conditional mode was not set, then a wait is set up until the GPR priority is granted. As soon as granted, the I Box 134 is shifted to state zero to finish the instruction and decode the next instruction in OP Register 159. The sum of R1 and R3 is also transferred to the R1 GPR 202 for storage. Thus, as soon as the I Box 134 is not in conditional mode, if the branch is to be taken, the I Box is initialized and set into loop mode as required or if the branch is not to be taken, processing is continued in the normal instruction decoding sequence.

Another combination of initial conditions and control sequences is possible at the start of a BRANCH ON INDEX instruction, and this is shown in FIG. 65, which is reached from exit A on FIG. 64, i.e., the I Box 134 is in loop mode and the present instruction is not the target of an EXECUTE instruction. At entry point A, FIG. 65, nothing proceeds until any conditional mode state of the I Box 134 is set off, at which time a request is made for a priority slot on the GPR 202 controls in FXPU 143. Also a check is made of the quick loop status and if the status is not set, the I Box 134 goes to state one wherein the normal instruction fetching is stopped and the branch target address is generated from the BXinstruction. When the W Register 177 is free, it receives the target address and Block 1131 is tested. Block 1131 is also tested directly rather than through state one if the quick loop status is set. As soon as the R1, R3 and R3* GPR's 202 are available, the I Box 134 shifts to state two and gates the R1 and R3 GPR's into Adder 168 to generate the new index value. When W Register 1177 is again available to receive the new index value, the quick loop status is tested, and if the I Box is in a quick loop state, or if the target address is already in the array of Buffers 156 (loop mode is already set) processing is to proceed conditionally along the branch path, Block 1137. If the quick loop status is not set, and the target is not in the array, then control is shifted out at exit B to entry B and Block 1132 on FIG. 64.

When processing is conditionally along the branch path, Block 1137, the R1, R3 sum from Adder 168 is put into W Register 177 and fed back into Adder 168 for subtractive combination with the data from the R3* GPR 202, and the target address is passed back into I, LB, UB, AO Registers, the SLT etc. registers of I Box 134 as required. As soon as the priority on the GPR 202 bus is granted by FXPU 143, the R1, R3 sum in W Register 177 is sent on GPR Bus 236 for storage in the R1 GPR and I Box 134 switched into original state 0 wherein decoding of the next instruction in OP Register 159 is started. This will be the target instruction of the branch for this address has been sent to I Register 148, etc. for control. After the determination of whether the branch conditions are met or not, a quick loop status is to be set if the branch is to be taken and I Box 134 is not already in quick loop status. If, however, the branch is not to be taken a recovery must be made to the normal instruction sequence. This recovery first blocks the OP Decode 166 to prevent issuance of the instruction then in OP Register 159 as it is now determined to be the wrong one. Instead, the next instruction address is recovered from Save IR 1120, the OP Register 159 is reset, and if loop mode had previously been set by this instruction in a prior loop iteration (IR=SLCIR Comparator 181) it is now reset. From this condition the I Box is reset to state zero to continue with the decoding of the next instruction in the normal instruction sequence.

Thus, the instruction first effects an addition of the data in the designated R1 and R3 GPR's 202 and stores the sum in the R1 register. The sum and the data in the R3* register, either R3 or the next higher numbered GPR 202, are combined subtractively and the result is tested for the branch condition. If the branch is to be made, it is made to the address generated by adding the data in the GPR 202 designated as the base register to the address displacement given in the instruction. A branch instruction occurring in conditional mode will be halted at the branch point until the conditional mode status is removed, but if not in conditional mode, the instruction prefetching to the Temporary Buffers will be made when loop mode is not set, otherwise decoding of instructions is continued around the instruction loop.

The BRANCH AND LINK instruction is an unconditional branch instruction which also stores in a designated GPR 202, the right half of the Program Status Word so that the condition status of I Box 134 can be reconstructed at a later time if it is desired to resume the normal instruction sequence. In this instruction the branch address is first determined either by direct reading from the GPR 202 designated in the instruction as the R2 Register (RR format) or by combining the base address data in the GPR's 202 designated as the index and base registers with the displacement amount from the instruction. This address will be held in W Register 177 while the next instruction address in the normal sequence is generated in Adder 168 from the LB address in LB Register 150, and the incremented instruction address from the IR Incrementer 153 with or without the bit 28 correction as needed. The branch address is now moved into the I, LB, UB, etc. registers to start the new series of instruction fetches. The W Register 177 is now free to accept the next instruction address from Adder 168. The PSW half to be stored in the GPR 202 designated as R1 in the instruction is composed of the 24 bits of the full instruction address from W Register 177, and an eight bit byte from the PSW Buffer 1006. The eight bit byte comprises a two bit instruction length code, either 01 for the BALR instruction (RR format) or 10 for the BAL instruction (RX format), the two bits of the condition code and a four bit program mask which indicates the conditions that will be allowed to interrupt the program being performed.

Referring now to the BAL flow chart, FIG. 67, it will be seen the first part of the controls is the same for either instruction format and that after the BAL instruction is decoded, the availability of Adder 168 is tested. As soon as it is available, the conditional mode status and conditional target address are checked to halt operations if there is a possibility that a conditional mode instruction loop could be set up, and the RUA counters 337 of the required GPR's 202 are checked to insure availability of the GPR's 202. When the GPR's 202 are available, the I Box shifts to state one, Block 1140, wherein it generates the branch address in Adder 168 and stops further instruction fetching. As soon as the W Register 177 is available to accept the branch address in Adder 168, the I Box shifts to state two, Block 1141, and transfers the branch address into W Register 177. At the same time the IR Increment 153 output and the LB Register 150 outputs are gated into Adder 168 to generate the address of the next instruction in the normal sequence. It is a convention in the preferred embodiment of the invention that in branch instructions, an R2 designation of 0000 in the instruction does not indicate the GPR 202 numbered zero, but instead indicates no branching. This convention is checked for in state two by a test for RR format and R2 address of 0000, and if either is (N), the branch is taken by moving the branch target address into the I Register 148, the LB Register 150, etc., to initialize the I Box 134 and start it on a new series of instruction fetches. If loop mode has been set, it is removed and OP Register 159 is reset to prevent decoding of instructions after the branch.

In state two, the FXPU 143 is notified that the I Box 134 requires a priority time slot in the GPR 202 entry controls, Block 1142, if the conditional mode status is not set, if the condition code in PSW Buffer 1006 is valid, and if the R1 GPR 202 is available (RUA 337 and RUM 335=0) for receipt of the PSW data. Another function in state two is to transfer the updated instruction address from Adder 168 into the W Register 177 and to transfer the I Box 134 to state six, Block 1144. In state six a control signal is transferred to the loop mode controls, FIG. 63, and with the designated R1 GPR available, if the I Box 134 is not in conditional mode, a check is made of the GPR priority request status, and if not request has been sent, one is now sent, Block 1142. If a priority request had been sent, or after the request is now sent, a pause is made until the FXPU 143 notifies I Box 134 that the priority request is granted. The PSW bits 32–39 (ILC, CC, and PM bits) are now transferred into bit positions 0–7 of the W Register 177 and along with the updated instruction address (link) in the W Register is sent over Bus 236 to the FXPU 143 for storing in the R1 GPR 202. The I Box 134 is now returned to state 0 for the next instruction decode which will be along the branch path.

*Status switching and I/O instructions*

These instructions comprise a group of 14 instructions which are handled within the I Box 134 of the CPU without reference to the execution units of the CPU.

133

The instructions of the group are:

| Mnemonic | Instruction | Format |
|---|---|---|
| LPSW | Load PSW | SI |
| SPM | Set Program Mask | RR |
| SSM | Set System Mask | SI |
| SVC | Supervisor Call | RR |
| SSK | Set Storage Key | RR |
| ISK | Insert Storage Key | RR |
| WRD | Write Direct | SI |
| RRD | Read Direct | SI |
| TS | Test and Set | SI |
| SIO | Start I/O | SI |
| TIO | Test I/O | SI |
| HIO | Halt I/O | SI |
| TCH | Test Channel | SI |

These instructions affect or are associated with basic changes in the status of the machine, either change of program or system controls, or communication with Input/Output (I/O) equipment. It is expected that the frequency of their occurrence will be low as compared with other instructions of the system. Consequently, no sophisticated hardware is provided to enhance their execution as the total time saved would be inconsequential.

A major interlock on the issuance of all of these instructions is with the conditional mode status. The I Box 134 cannot proceed with the decoding of any of this group of instructions until the outstanding condition test is completed for the changed machine status may alter the effect of an instruction execution, may alter protection features or make other changes which cannot be recovered from if the wrong branch is selected for execution. Furthermore, many of the instructions require that all outstanding instructions be completed prior to their execution for the execution can change system aspects required for execution of the earlier instructions, e.g., an interrupt signal arising during drain of the pipelined instructions has logical precedence over status switching changes or all outstanding store instructions must be executed prior to executing I/O commands or changing storage protection codes.

The LOAD PROGRAM STATUS WORD instruction fetches a new PSW from storage and sets it into the PSW Buffer 1006 with the instruction address part going into the I Register 148, the LB and UB Registers 150 and 147, respectively, and into the AO Register. Since the new PSW will contain a system mask to enable selected input channels, a storage protection key, a group of indicators to set a code format, wait state, problem state, etc., and the 32 bit word comprising two bit positions to be filled with an instruction length code, two bits specifying the condition code, the four bit program mask and the next instruction address, loading of a PSW is equivalent to changing to a new program or resuming one at an interrupted point. Furthermore, as instruction steps are considered logically as if fully executed in sequence, no PSW change may be allowed to interfere with execution of prior instructions.

The LOAD PSW instruction is written in the SI format and is implemented in the following manner as shown in the flow chart, FIG. 68. First, during the decode cycle, the conditional mode status and supervisor mode status are checked in addition to the normal interlocks (RUA, RUM) requiring availability of the address register. The SI format for this instruction specifies only the operation code and one storage address, therefore, only the base register need be checked for availability. Second, Block 1145, current instruction fetching is terminated, I/O and external system interrupts are inhibited and the double word storage address of the new PSW is generated. Third, Block 1146, the instruction address of the LOAD PSW instruction is reconstructed from the I Register 148 and LB Register 150 data and the address of the new PSW is retained in W Register 177. The instruction address of the old PSW is generated to be available if an interrupt due to an error is signalled, at which time this address may be stored with the old PSW sent to storage. Fourth, the new PSW address is checked for specification and invalid exceptions which can terminate the instruction and signal an interrupt. If no such exceptions are found the new PSW fetch is requested, Block 1148, and the instruction address is shifted into W Register 177. Fifth, the return of the requested PSW from storage initializes the instruction fetching mechanism with the new instruction address, Block 1149, with the rest of the PSW being set aside in #1 Temporary Buffer Register 157. Sixth, when the pipeline is empty, the new PSW is moved, Block 1150, into PSW Buffer 1006 to start the new program sequence in I Box State 0, but if before the pipeline is emty, an interrupt is signalled from the CPU as a result of an invalid condition, the LOAD PSW instruction is cancelled and the old PSW with the saved instruction address is loaded into storage as part of the interruption procedure.

This instruction is a privileged instruction, not encountered in normal programs and can be executed only when the I Box 134 is set to the supervisor status, i.e., bit 15 of PSW Buffer 1006 is set to zero. The address specification above referred to indicates that the given address is not to a double word boundary, i.e., does not have three low order zeros, and consequently cannot fetch a full PSW. An invalid address is one which is not contained in the actual storage modules incorporated with the system.

The SUPERVISOR CALL (SVC) instruction is an RR format instruction which is valid in either a program mode or supervisor mode, and is the only instruction which can change the I Box from a program mode to a supervisor mode. The instruction actually causes an interrupt operation in which bits 8–15 of the SVC instruction are stored into bit positions 24–31 of PSW Buffer 1006 as the interrupt code. During the interrupt operation, bits 16–23 of PSW Buffer 1006 are made zeros, the whole PSW is stored into address location 32, and the new PSW is obtained from storage address 96. The design objective is merely to overlap the entry to the supervisor call interruption with the drain of the instructions in the execution units and being issued by the I Box 134. During such pipeline drain, however, no steps should be taken which would destroy the logical sequence of instruction execution.

When the SVC instruction, is decoded, an interrupt condition is signalled, instruction fetching is stopped, the instruction address of the SVC is generated in Adder 163 and the storage address of the new PSW is forced to the MSCE 136 as part of a fetch request for this storage address. The instruction address of the SVC instruction is held in W Register 177 and the address of the next instruction is generated in Adder 168 from the data in LB Register 150 and the IR Incrementer 153. After the new PSW is returned it will be stored in Temporary Buffer 157 except for the instruction address part which will be set into I Register 148, UB Register 147, LB Register 150, etc., to initialize the I Box 134 and start the new instruction fetching sequence. Any interruptions due to execution of instructions in the pipeline will be given priority and can still store the old PSW in PSW Buffer 1006 with the address of the instruction (SVC) being decoded at the time of the interruption. Such an interrupt will be processed exactly the same as if no SVC instruction were being processed, and the effect will be to cancel the SVC instruction. After the pipelined instruction are all executed, the address of the next instruction will be set into W Register 177 to become a part of the old PSW. This address will be used to resume the program at the interrupted point at a later time. The portion of the new PSW in Temporary Buffer 157 will now be transferred into PSW Buffer 1006 and the first instruction of the new sequence will be decoded to start the new program. The new PSW can set the system to any status and to any program insructions desired by the programmer.

The SET SYSTEM MASK instruction is in the SI format specifying only an OP code and a byte address. The instruction substitutes the addressed byte for bits 0–7, the system mask, in PSW Buffer 1006. The system mask specifies which of the system I/O channels can interrupt the CPU, a one bit in the mask allowing a channel to interrupt. As only one byte is to be handled in this instruction, the FXPU 143, FIG. 6, is utilized as it alone can work with single bytes. The I Box 134 will send a fetch request to MSCE 136 for the word including the byte and direct that the fetched word is to be returned to an available FXB 204–207. It also issues an instruction to the FXOS 201 and includes with this instruction the byte address. When this instruction is reached in normal execution of the FXOS 201 instructions, the selected byte will be gated out to either Bus 232 or 233 and sent through OR 237 to I Box 134. Since I Box 134 is still set in the decode of the SSM instruction, the byte will be passed through gate 1152 into bit positions 0–7 of PSW Buffer 1006.

There is no need to wait for drain of the pipeline for the system mask is not affected by nor affects interrupts within the CPU. However, the FXPU will be empty and little FXPU activity is expected due to the number of elapsed cycles. Any I/O and external interrupts are inhibited during execution of the instruction to insure that if there are any such interrupts, the correct system mask will be available to enable or disable the interrupts.

Referring to the SSM flow chart, FIG. 69, when the SSM instruction is decoded with the I Box 134 in state zero, the decoding status, the I Box status is checked for a not conditional mode and for a supervisory state before the instruction can proceed. A finding of not supervisory mode is cause for an interrupt action with cancellation of the SSM instruction, for this instruction is a privileged one and can be executed only in supervisory states. If the preliminary tests are passed, the mask byte address is generated, Block 1153, in Adder 168 and the interrupt controls are inhibited from responding to external or I/O interrupt requests, since it is necessary to have the updated system mask available for these interrupts. Actually, the new mask may bar an interrupt which is inhibited during the SSM operation. When the byte address is generated in Adder 168, W Register 177 is tested for availability to receive the address as soon as it is free, Block 1154.

When the mask byte address is in W Register 177, it is checked for validity, and if it is not within the connected storage addresses, the instruction is interrupted, but for a valid address, the FXPU 143 indicators, FXOS Counter 203, and the FLB Busy Triggers 1082, are checked for availability and the operand fetch is issued, Block 1156, to MSCE 136 naming a selected FLB 204–207 as the sink. The OP Stage 167 issues the required instruction to FXOS 201 and a waiting state is entered. After the FXPU 143 completes its operation and gates the required byte out through OR Gate 237, FIG. 6, the byte is passed through gate 1152 into bit positions 0–7 of PSW Buffer 1006, and the instruction terminates.

The SET PROGRAM MASK (SPM) instruction is in the RR format with an OP code and only one register R1 designated. The instruction acts to replace bits 34–39 of PSW Buffer 1006 with bits 2–7 of the word stored in the R1 register. The R1 register data is not changed. Comparing this instruction with the BRANCH AND LINK instruction, it will be seen that the bits to be loaded into Buffer 1006 could have been set into the R1 GPR on an earlier BAL instruction, thereby recovering from the earlier branch. The set bits are the two bits of the condition code and the four bit program mask which indicates the arithmetic conditions that are to be allowed to cause system interrupts.

The SPM instruction can be executed in any program state as it is not privileged but logical correctness must be preserved. Therefore, prior to a program mask change, all operations under the old mask must be completed for the old mask must be stored as part of the old PSW when an interrupt occurs. For the same reason no new instructions after the PSM instruction can be executed until the mask is changed. Therefore, the I Box 134 will wait for the issued instructions to be executed before the SPM instruction is executed, unless the old and new program masks are the same. In this case, there is no conflict and the instruction will be executed immediately.

In the flow chart, FIG. 70, for the SPM instruction, it will be seen that when the instruction is decoded, the not conditional mode status, the availability of the R1 GPR 202 (i.e. RUA counter=0) and the availability of Adder 168, enable the GPR Selection Mechanism 1096, FIG. 10, to open the appropriate gates 1030 to gate the designated R1 GPR 202 into Adder 168, and from its output into W Register 177, Block 1157. If the new program mask bits and the old mask bits are equal, the six bits of the condition code and mask, Block 1158, are immediately sent over Bus 1160 into PSW Buffer 1006. Simultaneously, the Set Condition Code bits in all issued instructions are reset, for the new CC setting logically follows these instructions. When the new and old masks are not the same, any pending interrupts will be processed to terminate the instruction, and I Box 134 holds up until the pipeline of issued instructions is empty before the new mask is transferred as in Block 1158. Execution of Block 1158 operations terminates the SPM instruction.

*Storage protection keys*

The storage protection feature was briefly mentioned in the discussion of the MSCE 136, and comprises a separate small storage unit having one storage location for each block of 2048 bytes of storage. The storage key is a five bit key stored in the storage location corresponding to the protected block of storage. The key is four bits to specify the program to which the storage block is assigned, and which therefore has full access to the block, and a fifth bit which specifies whether the storage block is protected against storage operations, with fetches of the data permitted, or is protected against both storage and fetch operations. Any number of blocks can have the same protection keys except that a zero key indicates no protection.

Two privileged instructions are available for processing the storage key groups. The SET STORAGE MASK instruction is in RR format and is used to transmit to MSCE 136 a group of five bits from bit positions 24–28 of the register identified by the R1 address field. The group of five bits is stored in the storage protection storage at the address designated by bits 8–20 of the GPR 202 identified by the R2 address field. Bits 28–31 of this register are required to be zero, otherwise an address exception is signalled and the instruction cancelled on an interrupt. The INSERT STORAGE MASK instruction is also in the RR format and is used to inspect the storage key group for a block of storage locations. Here the key for the block of storage locations identified by bits 8–20 of the GPR 202, identified by the R2 address field, is stored in bit positions 24–28 of the GPR 202, identified by the R1 address field, and bits 29–31 of the register are set to zero. Bits 28–31 of the R2 register must be zero in this instruction. In both the SSK and ISK instructions, a special signal is sent to MSCE 136 to inform it that the addressed storage location is in the storage protection area, not main storage.

The flow chart for the SET STORAGE KEY instruction is set out in FIG. 71. When the SSK instruction is decoded, the I Box 134 waits for the conditional mode trigger to be set off and then tests the SAR Busy Triggers 1094, the availability of the R2 GPR (RUA=0) and the supervisor mode status which must be on since this is a privileged instruction. If I Box 134 is in problem state, an interrupt is signalled and the SSK instruction cancelled, but in the supervisor mode, the data in GPR 202 identified by the R2 address field is gated by GPR Selection Control 1095 through Gates 1032, FIG. 58, into Adder 168, Block 1161. If bits 28–31 of this data are not all zeros, an interrupt is signalled with cancellation of the SSK instruction, otherwise the storage address part, bits 8–20, of the R2 GPR is passed into W Register 177, and the GPR 202 identified by the R1 address field is gated through Gates 1032, FIG. 58, by GPR Selection Controls 1095 into Adder 168, Block 1162. If the address in W Register 177 is invalid as identifying a storage location outside of those provided in the system storage modules, an interrupt is signalled to cancel the SSK instruction, but the normal operation is to gate the storage key, bits 24–28 from Adder 168 into W Register 177, Block 1164. The W Register data is then sent out over Storage Address Bus 240, see also FIG. 7, into MSCE 136 along with a SSK signal. When this signal is received, the data goes directly into the storage protect feature 138 and not into an SAR 241 as does a normal storage instruction (no SAR's are busy at this time). When the storage key is successfully put into the protect storage 138, a completion signal is returned by MSCE 136 to I Box 134, and receipt of this signal terminates the instruction.

The flow chart for the ISK instruction is set out in FIG. 72. Here when the ISK instruction is decoded in I Box 134, the availability of the GPR 202, designated by the R2 field, the availability of the Adder 168 and not conditional mode status are ascertained, and the supervisor mode is checked to call for an interrupt and cancellation of the instruction if it is not present. If I Box 134 is also in the supervisor mode, the data in the designated GPR 202 is gated through the Gates 1032 into Adder 168, and from there into W Register 177, Block 1165. At this time the bits 28–31 of the data are inspected for an all zero condition. If any of these bits is a one, the interrupt mechanism is signalled and the ISK instruction ended, but if the address bits are all zeros, and the address is valid for the attached system storage, the FXOS Counter 203 is tested for a less than six state, and the FXB Busy Triggers 1082 are tested to find if FXOS 201 can accept an instruction and if there are available at least two FXB's 204–210. As soon as all conditions are met, the I Box issues a fetch request to MSCE 136 and an instruction to FXPU 143, Block 1166. This fetch request will call for the storage key for the designated block of addresses to be sent in a word to a designated source FXB. The instruction to FXOS 201 in the FXPU 143 will call for the fetching of the sink GPR 202 designated by the R1 address field of the instruction into an FXB 204–210, the insertion in its right hand byte of the mask bits from the word from MSCE 136, and the return of the R1 word back to its sink GPR 202. The I Box 134 does not need a response signal from FXPU 143 to terminate the instruction and can proceed as soon as the instruction is sent to FXOS 201.

Multi-system communications

When two or more data processors are connected into a multiple CPU system, various facilities are provided to permit data communications between the different CPU's. The facilities can include a shared I/O device, a shared storage unit, or a channel-to-channel adapter. Control and request communications are accomplished by a direct control feature wherein one system can instruct another to read or write a byte of information. The present preferred embodiment utilizes two instructions for such control information and processes them through the FXPU 143 since byte handling is involved.

The instruction WRITE DIRECT (WRD) is in SI format and will make available as a set of static signals, the data byte addressed by the base and displacement part of the instruction, and will also provide the eight bits of immediate data from the instruction as in instruction byte for a period of about eight to 16 machine cycles. The word containing the byte is sent to the FXPU 143 which is instructed to put the addressed byte of that word into the Write Direct Register 1168, FIG. 6, where it will be retained indefinitely. The eight bits of immediate data in the instruction are sent to the Immediate Data Register 213, and when the instruction is executed, the Immediate Data Output Bus 1169 will receive the data in the Register 213 for a plurality of machine cycles, at least long enough for the associated system to recognize that a communication is being received and to perform its interrupt cycles.

The instruction READ DIRECT (RRD) is also in the SI format and will be a part of the normal response to a communication issued by a WRITE DIRECT in another system, although it can also be used after recognition that other outside data is desired. In this instruction an eight bit byte available as static signals on a Bus 1170, FIG. 6, is placed into a storage at the byte location given by the base and displacement areas of the instruction. The byte of immediate data in the instruction is transmitted out as instrutcions for the system sending the data to be read in. A hold signal from the sending system must be absent to enable the system read-in. This hold signal is normally present only when the data signals are being changed during the WRITE DIRECT instruction.

The WRD and RRD flow chart is shown in FIG. 25. As shown when a RRD or WRD instruction is decoded while the I Box 134 is in state zero, the conditional mode status is checked for a not conditional mode and the supervisor mode status is tested to interrupt the program and abort the operation if the I Box 134 is not in supervisor mode. If it is in a supervisor mode, the Adder 168 is checked for availability as is the GPR designated as the base register (RUA=0). With both of these available, the GPR is gated under control of the GPR Selection Controls 1096 through Gates 1030 into Adder 168 along with the displacement data from the instruction to generate the address of the byte in storage, Block 1172.

As soon as W Register 177 becomes available, the generated address from Adder 168 is stored in it, Block 1173. This address is checked for validity to be sure that it is within the bounds of the connected storage locations, otherwise an interrupt operation is initiated and the instruction aborted. Now, if the instruction is a WRD, the FXOS Counter 203 is checked for a count of less than six, and the FXB Busy Triggers 1082 are inspected to find a non-busy FXB 204–210. When these are present, an instruction is sent to FXOS 201, Block 1174, and a fetch request is sent to MSCE 136. The MSCE request specifies the storage location to be fetched and the FXB 204–210 into which the fetch is to be returned. The FXOS 201 instruction contains the byte address of the word being fetched and instructions to gate out the selected byte through the VFL Logis Unit 212, FIG. 6, into the Write Direct Register 1168. The instruction in FXOS 201 also contains the eight bits of immediate data from the program instruction and this is sent over Bus 451 into the Immediate Data Register 213. When the instruction is executed, the FXPU waits until the Write Direct Register has been loaded and then gates out the data in the Immediate Data Register 213 on Bus 1169 for about eight to 16 machine cycles. When the I Box 134 has issued the fetch request and the instruction to FXOS 201, it has no need to wait and terminate its execution of the instruction.

When the instruction is RRD, after the address is checked for validity, a check is made of the FXOS Counter 203 for a count of less than six, and the SAR Busy Triggers 1094 are inspected to find a non-busy one. As soon as both conditions are met, Block 1176, the FXOS 201 is issued an instruction including the immediate data byte and a store instruction is issued to a selected SAR 241 specifying the byte address into which data is to be stored. The I Box 134 is latched up to prevent its decoding any further instructions at this time. When the FXOS 201 instruction is decoded, the immediate data in the instruction is put into Immediate Data Register 1168, FIG. 6, over Bus 451, and is then gated out over Bus 1169 for from eight to 16 machine cycles. After this time, the RDD Bus 1170 is gated to Bus 234 and into the Immediate Data Register 213 from which it is passed on Bus 501 through the OR's 221 to Bus 197 and to the SDB 244 for storage. At this time an FXPU instruction complete signal is sent to I Box 134 which may then terminate its execution of the RDD instruction.

The TEST AND SET instruction is in the SI format and is an interlock feature to enable one CPU to be interlocked with another CPU. In this instruction, a word is fetched from storage into an FXB and one byte is gated therefrom to FXPU 143 and tested there to set the right hand bit of the condition code in accordance with the left hand bit of the byte. When the MSCE 136 performs the fetch of the selected ardress word, it rewrites this word back into storage in the usual manner but with the selected byte set to all ones.

The TEST AND SET instruction, see the flow chart, FIG. 74, requires only a check for a non-conditional mode status. When the Adder 168 is available, the GPR 202 identified in the B instruction field is gated out through Gates 1030 into Adder 168 at the same time the displacement is gated from Buffer 165 to generate the address of the byte, Block 1177. As soon as the W Register 177 is available, the address is transferred into it, Block 1178, where it is tested for invalidity and if found to be out of the connected storage, starts an invalid address interrupt with cancellation of the instruction. If the address is valid, the FXOS Counter 203 is checked for availability of an FXOS 201 location and the FXB Busy Triggers 1082 are checked to be sure an FXB is available. As soon as all conditions are met, the word fetch request is issued to MSCE 136 and the instruction is sent to FXOS 201, Block 1180. The I Box 134 is not required for any further action on this instruction and it is terminated.

*Input/output instructions*

There are four instructions for controlling the operations of the Input/Output devices connected to a system. All of these instructions are privileged and can be executed in the supervisor state only. All are in the SI format with no immediate data and consist of the Operation Code and a storage address in Base-Displacement form. The sum of the data in the GPR designated by the base field and the displacement data specifies in the third byte, bits 16–23, the address of a channel, only addresses 0–6 being valid, and in the fourth byte, bits 24–31, specifies the identity of a device connected to the specified channel. The CPU program initiates the I/O operation with a START I/O (SIO) instruction identifying the channel and the device on that channel. The channel will then fetch a channel address word (CAW) from a fixed location in main storage. The CAW contains the protection key and the address in main storage of the first of the channel command words (CCW). The CCW specifies the command to be executed and the storage area, if any, to be used.

If the channel is not busy when the SIO instruction is sent it, it attempts to select the required device by sending the device address to all connected units. The unit which recognizes its address connects itself logically to the channel and responds by sending its address back to the channel. The channel then sends the command code part of the CCW over the connecting lines and the selected device responds with a status byte indicating whether it can execute the command. This terminates the execution of the START I/O instruction, and its results are indicated by setting the condition code bits in the PSW Buffer 1006, FIG. 10. Further control over the device is through the CCW's which may be chained one to the other to keep the device busy for an interval.

The TEST I/O (TIO) instruction sets the condition code bits of PSW Buffer 1006 in accordance with the condition of the addressed device. The address is generated as above.

The HALT I/O (HIO) instruction is used to end operation of the addressed I/O device prior to the programmed termination of the devices operation and will set the condition code bits to correspond to the channel condition. The TEST CHANNEL (TCH) instruction sets the condition code bits in PSW Buffer 1006 in accordance with the status of the channel at the time of the test. The state of the channel is not affected and no channel action is caused. The address is generated as above for both the HIO and TCH instructions, but for the TCH, only bits 16–23 of the address are of interest and bits 24–31 are ignored.

There are four conditions in the channels, sub-channels (multiplexor channel only) and I/O devices which are of interest and for which the condition code may be set. These conditions are (1), Available (A), (2), Interruption Pending (I), (3), Working (W), and (4), Not Operational (N).

The condition code setting for the conditions of interest are set out in the table below where an X indicates that the state of the component is not significant, the first column (C) being for the channel, the second column (S) being for a subchannel, if any, and if there is no subchannel, it is considered as available for condition code purposes, and the third column (D) is for the device status. In the condition code columns, they are START I/O, TEST I/O, HALT I/O and TEST CHANNEL, in that order.

| Component | | | Condition Code | | | |
| --- | --- | --- | --- | --- | --- | --- |
| C | S | D | SIO | TIO | HIO | TCH |
| A | X | X |  |  |  | 00 |
| A | A | A | (a) | 00 | 00 |  |
| A | A | I | *01 | *01 | *01 |  |
| A | A | W | *01 | *01 | *01 |  |
| A | A | N | 11 | 11 | 11 |  |
| A | I | °X | 10 | (b) | 00 |  |
| A | W | °X | 10 | 10 | *01 |  |
| A | N | °X | 11 | 11 | 11 |  |
| I | X | X |  |  |  | 01 |
| I | A | A | (a) | 00 | *01 |  |
| I | A | I | *01 | *01 | *01 |  |
| I | A | W | *01 | *01 | *01 |  |
| I | A | N | 11 | 11 | 11 |  |
| I | I | X | 10 | (b) | 00 |  |
| I | W | °X | 10 | 10 | *01 |  |
| I | N | °X | 11 | 11 | 11 |  |
| W | X | X | 10 | 10 | 10 | 10 |
| N | X | X | 11 | 11 | 11 | 11 |

°These conditions can occur only in the multiplexor channel 106 and its subchannels 117.

(a) The conditioncode is 00 if a regular I/O operation is initiated and is *01 if the channel end condition is signalled and no date transfer takes place.

(b) The condition code is *01 when the pending interrupt is for the addressed device and is 10 if the pending interrupt is for another device.

*This symbol indicates that the status of the channel is stored in a fixed location in main storage. The status stored includes the protection key, the address of the next CCW, the conditions and errors associated with the channel and subchannel and the number of unit counts left from the last CCW used.

Due to the high speed of the CPU and the fact that channel operations are asynchronous with the CPU operations, a number of interlocks are required. First, since the START I/O command directs that the channel fetch control information and it is possible that the CPU may have just issued an instruction to generate and store that CAW, the channel cannot be started until the store is completed. Secondly, since the SIO, TIO, and HIO instructions sometimes store the status in main storage if certain irregularities are detected, the CPU must be held up until the channel indicates that its functions are complete. Logic considerations dictate that the CPU must be held on the I/O instructions until the channel completes its operation. The time required may be in the order of 150 to 200 machine cycles.

The only difference in the I Box 134 in the issuance of these instructions is the OP code which is transmitted to the channel and this is taken directly from the program instruction. All I Box operations for the I/O instructions are the same and are shown on the combined flow chart, FIG. 75. As shown, when the I Box 134 decodes an instruction as being an I/O type, it checks for a non-conditional mode status and waits until such status is present. The supervisor mode is then inspected and the operation nullified during an interrupt, if the I Box is not in the supervisory mode. Otherwise, as soon as the GPR 202 identified in the B field as the base register and the Adder 168 are available, the address data is gated into Adder 168 to generate the channel and device address, Block 1181. The I/O and external interrupt signals are inhibited at this time from causing interrupt operations. As soon after this as W Register 177 is available, the address is transferred into it, Block 1182, and the W Register is tested for an invalid address, which if found will cause an interrupt. The I Box 134 now waits for the issued operations to be executed and the pipeline emptied so that if any interrupt conditions, not I/O or external, are found they may be handled in a logical manner with the logically premature I/O instruction cancelled. When the pipeline is empty, the channel concerned is signalled, Block 1184, that an I/O instruction is pending. The channel will accept the instruction as soon as it can and will signal I Box 134 when it has completed its required action. The I Box 134 will wait until the channel completion response is received before it terminates its action and proceeds to the next instruction. As was noted in the I/O table for the condition code settings, on START I/O, the presence of some conditions may change the condition code settings during the starting up of the selected I/O device.

*Multiple operation instructions*

As was earlier pointed out, the responsibility for execution of all instructions except for the branching, I/O and status switching instructions is outside of the I Box 134. For most of such other instructions, the I Box 134 issues a single OP instruction to the execution area, either FXPU 143, or FLPU 142, and will make at most only one storage request, either fetch or store. There is, however, a class of instructions which do not follow this pattern in that they each require the I Box 134 to issue a plurality of OP instructions (always to FXPU 143) and generally each OP will require at least one storage request. All but two of these instructions (LOAD MULTIPLE, STORE MULTIPLE), are in the SS format, i.e., contain two storage addresses, each storage address in a base-displacement form.

The multi-Op instructions are broadly as follows:

(LM) LOAD MULTIPLE, (STM) STORE MULTIPLE—The GPR's 202 starting with a specified one and ending with another specified one, are loaded from or stored to successive storage addresses starting from the one specified in the instruction. Uses one OP per word moved.

(TR) TRANSLATE, (TRT) TRANSLATE AND TEST—Each byte of the source word is replaced by a corresponding byte from a table. For the test part, any non-zero byte from the table stops the instruction. Requires one OP per source word and one fetch for each source word byte. A length field determines the number of bytes processed but the TEST can terminate sooner.

(NC) AND, (DC) OR, (XC) EXCLUSIVE OR, (CLS) COMPARE LOGICAL—The indicated operation is compared on each pair of bytes from the two words. Requires one OP for each sink word used and two fetches per OP.

(MVZ) MOVE ZONE, (MNV) MOVE NUMERIC, (MVC) MOVE, (MVO) MOVE WITH OFFSET—The second operand bytes or the numeric (right 4 bits) or the zone (left 4 bits) part are moved into the first operand location bytes or the bytes are moved into the first location with a left shift of 4 bit positions.

(PK) PACK, (UNPK) UNPACK—These are decimal operations in which an eight word byte is spread out to two bytes including zone bits or two bytes are packed into one by eliminating the zone bits.

(ED) EDIT, (EDMK) EDIT AND MARK—These instructions substitute into a pattern operand, certain types of bytes of the second operand. The byte address of the first occurrence of one type of byte in the second operand is MARKED into the I Box 134.

These multi-OP instructions have several common characteristics. For one, all instructions have variable length data fields. For another, the responsibility for executing the instructions is divided between the I Box 134 and the FXPU 143 with I Box 134 responsible for fetching and storing of operands, and for staging in OP Stage 167, and issuing the necessary OP's and the FXPU 143 instruction units (FXOS 201) and execution units (VFLEU) jointly responsible for the interpreting of the OP's and the processing of the operands. For a third characteristic, the multi-OP instructions are the only ones (except for CONVERT TO BINARY) which cause operands to be fetched into the FLB's 185 (FIG. 5) for use in the FXPU 143. These multi-OP fetches provide greater buffer capacity than by using the FXB's 204–210 directly, and enable use of the FXB's as working registers in the execution of the instruction. These multi-OP instructions require availability of an FLB 185 for the fetch sink, but render four of the six FXB's 204–207 unavailable until the instruction is completed.

Generally, the I Box has completed its part of a multi-OP instruction when it has issued the last OP for the instruction except for TRT and EDMK which may require generation of a byte address as a result of data conditions. For the two exceptions, the instruction can be considered completely issued only when possibility of byte address storing has been passed. The I Box 134 can move to decoding of a succeeding instruction as soon as it has completed a multi-OP instruction. If this next instruction is in the FXPU 143 it can probably be issued with assignment of one of the extra FXB's 209, 210 unless it is in the SI format for which the operands can be handled only from the FXB's tied up by the multi-OP instruction. Another possible holdup in resumption of instruction issuing after a multi-OP instruction occurs if the next instruction makes use of the L Register 1102, FIG. 10, i.e., another multi-OP or an SVC instruction. In this case, it is possible that the FXPU 143 has not yet finished with the length information from the L Register 1102, and therefore any instruction which will change the contents of L Register 1102 must be delayed until the assimilation of the length information is complete.

The I Box 134 issues fetch requests for operands, a double word at a time, as rapidly as possible based on the availability of Floating Point Buffers (FLB's) 185 and its knowledge of the needs of the FXPU 143. Similarly, it sets up store instructions for double word operands based on the availability of the Storage Address Registers (SAR's) 241. The extent to which this storing and fetching can proceed and the I Box knowledge of the needs of the processing in FXPU 143 is also limited by the availability of buffer positions in FXOS 201, since the names of the FLB's and SAR's must be passed to FXPU 143 by means of OP's issued to FXOS 201. The I Box 134 has the capability of issuing both a fetch and a store instruction simultaneously for those sink operands which must be both fetched and stored. Generally, there are no particular problems associated with the fetch and store requests since MSCE 136 can handle the operands in their logical order bit special recognition and handling is necessary for those instructions whose operand streams overlap in storage, or for those instructions which may be prematurely terminated upon detection of a condition.

The instruction issuing part of the I Box 134 involves the staging and issuing of OP's to the FLPU 143. Staging refers to the process of setting into OP Stage 167, the assorted pieces of information which must be conveyed to the execution areas. As the staging is completed, the OP Stage is set valid for FLPU 142 or FXPU 143 and the instruction is issued. For most OP's the staging is completed in one cycle and can be issued at the beginning of an address generating cycle whereas a multi-OP instruction may require several cycles for staging each OP which will be issued at the end of an address generating cycle.

The following sequence tables show the sequences of instructions, fetch and store requests, and the issued OP's containing the FLB 185 and SAR 241 assigned for each storage request. In the tables F and S represent fetch and store requests, SC is the source double word, SK is the sink double word. A time axis can be considered as running down the table, i.e., two storage requests on the same line will be issued on the same cycle, but consecutive lines do not necessarily represent consecutive cycles and the OP number is the OP which contains the identification of the FLB 185 or SAR 241 associated with the storage operations on that line.

Table 1 is specifically for an AND instruction and is representative of the I Box action for a group of operations including NC, OC, XC, MVZ, MVN and, with elimination of all store operations, of CLC. Each of these operations processes a byte from the sink and source words and (except CLC) puts the result back into the sink word which is later put in storage. The VFL portion of the FXPU 143 will control the entry of the source and sink words into its registers and the sending of completed sink words to the SDB's 244.

SEQUENCE TABLE 1

Instruction: NC
Length=12 bytes
Source Starting Byte Address=000
Sink Starting Byte Address=101

| Storage Operations | Comments | OP No. |
|---|---|---|
| F SC 1 | | OP1 |
| F SK 1 S SK 1 | | OP1 |
| F SC 2 | | OP2 |
| F SK 2 S SK 2 | | OP2 |
| F SK 3 S SK 2 | SC stream involves only 2 double words. | OP3 |

In this sequence, source procesing starts at the leftmost byte and sink processing at the sixth byte so the sink work will be used after three bytes and will be sent to the SDB specified in OP1, after which the next sink operand will be transferred from the FLB 185 specified in OP2. The original source operand will still be used but will be used up before the sink operand is exhausted and will be transferred in from the FLB 185 identified in OP2 for the source operand. This alteration will continue until the total number of bytes have been processed.

Sequence Table #2 is for a TRANSLATE (TR) or TRANSLATE AND TEST (TRT) instruction represented by a TR instruction. For TR and TRT, table word fetches will be about eight times as frequent as operand word fetches. This one operand ahead is maintained by fetching two operand words at the start and then fetching a new operand word each time the FXPU 143 signals that the one ahead operand word has been taken from the FLB 185.

Table word addresses are generated by the I Box Adder 168 adding the argument byte from FXPU 143 sent over the Byte Buffer 1103. FIG. 58, together with the base and displacement factors of the table origin from the instruction. For TR this means that the I Box 134 responsibility is not completed until the fetch for the last table word has been sent to MSCE (FXPU 143 will identify this last byte). For TRT the I Box 134 responsibility is greater for it must be prepared to generate the address of a byte found by FXPU 143 to be non-zero. The byte count will be sent to the I Box 134 to generate the byte address and store it in GPR #1. With this possibility, the I Box 134 is not free to proceed until the last table byte has been examined. The set SAR—Valid entry in the comments relates to possible overlap operations wherein the store may not be made without forwarding its data to FXPU 143, or the store may be into the table area as will be more fully brought out later. The TRT instruction does not store the generated results and would not require the store operations in Table 2.

SEQUENCE TABLE 2

Instruction: TR
Length=12 bytes
Argument Starting Bytes Address=101

| Storage Operations | Comments | OP |
|---|---|---|
| F OPR WD 1 S OPR WD 1. | | OP1 |
| F OPR WD 2 S OPR WD 2. | Set SAR for OPR WD 1 VALID | OP2,3,4 |
| F TBL WD 1 | TBL WD 1 address per OPR WD 1, BYTE 5. | OP2 |
| F TBLE WD 2 | TBL WD 2 address per OPR WD 1, BYTE 6. | OP3 |
| F TBL WD 3 | TBL WD 3 address per OPR WD 1, BYTE 7. | OP4 |
| F OPR WD 3 S OPR WD 3. | Set SAR for OPR WD 2 VALID | OP's 5-12 |
| F TBL WD 4 | TBL WD 4 address per OPR WD 2, BYTE 0. | OP5 |
| F TBL WD 5 | TBL WD 5 address per OPR WD 2, BYTE 1. | OP6 |
| F TBL WD 6 | TBL WD 6 address per OPR WD 2, BYTE 2. | OP7 |
| F TBL WD 7 | TBL WD 7 address per OPR WD 2, BYTE 3. | OP8 |
| F TBL WD 8 | TBL WD 8 address per OPR WD 2, BYTE 4. | OP9 |
| F TBL WD 9 | TBL WD 9 address per OPR WD 2, BYTE 5. | OP10 |
| F TBL WD 10 | TBL WD 10 address per OPR WD 2 | OP11 |
| F TBL WD 10 | TBL WD 10 address per OPR WD 2, BYTE 6. | OP11 |
| F TBL WD 11 | TBL WD 11 address per OPR WD 2, BYTE 7. | OP12 |
| F TBL WD 12 | TBL WD 12 address per OPR WD 3, BYTE 0. | OP13 |

In the table, it will be noted that the first two instructions are combined fetch and store instructions with the store having to wait until the FXPU 143 sends the sink word to the SDB 244. The table words are fetched as soon as the FXPU can start sending the bytes of the first operand word. As soon as the FXPU 143 has used all of the bytes of the first operand, it moves the second operand word from the FLB 185 and this transfer will be signaled to I Box 134 which will thereupon issue the next fetch. Such I Box fetch issuing will be continued until it has issued all of the fetches needed to exhaust the length field entry in L Register 1102.

Sequence Table #3 is for the MOVE instruction (MVC) which transfers data from one storage location to another. Unless the addresses overlap so that a fetch may have been made from a storage location into which a storage is pending, whereby the wrong data is fetched, there are no particular problems. For this possible overlap, the I Box notifies the FXPU 143 in the first OP. The only other feature of interest is the method of handling the sink byte address. Ordinarily this is sent with the sink operand to the FXPU 143, but for the MVC instruction, no sink operand is fetched so it is necessary to send the sink byte address with the first OP. The Table #3 is otherwise about the same as Table #1 with alternate fetch source and store sink instructions sent to MSCE 136.

SEQUENCE TABLE 3

Instruction: MVC
Length=12 bytes
Source Starting Byte Address=101
Sink Starting Byte Address=010

| Storage Operations | Comments | OP |
|---|---|---|
| F SC 1 | | OP1 |
| | S SK 1 1st OP contains starting SK byte address. | OP1 |
| F SC 2 | | OP2 |
| | S SK 2 | OP2 |
| F SC 3 | | OP3 |
| | SK stream involves only 2 double words. | |

There is no dependency between the I Box decoding and the operation of the FXPU 143 during this instruction, and as soon as the last OP is issued, the I Box 134 is free to proceed with the decoding of the next instruction.

Squence Table #4 represents the EDIT (ED) and EDIT AND MARK (EDMK) instruction sequencing. The instructions use a pattern word into which some bytes will be substituted from a source word or into which some filler bytes will be inserted depending upon the source bytes. The instructions are the same except that EDMK may need a byte address generated and stored in GPR #1. The sing field length for the pattern is known but the source field may be from one-half of the pattern length to more than the pattern length. Also the relative length of the operands as well as the processing rate are data dependent. To accommodate this situation, the I Box functions are tied to the data rate of the FXPU 104. After the first two source and sink (pattern) words are requested by fetches, a new word will be fetched only when the FXPU 143 has finished with a corresponding word. It has been made a rule herein that the FXPU 143 will step to a new OP in FXOS 201 each time it finishes with a pattern word and that I Box 134 will issue a new OP each time it fetches a new pattern word.

SEQUENCE TABLE 4

Instruction ED
Length=21 bytes
Source Starting Byte Address=000
Pattern Starting Byte Address=110

| Storage Operations | | Comments | OP |
|---|---|---|---|
| F SC1 | | | 1 |
| F P1 | S P1 | This OP is issued unconditionally | |
| F SC2 | | | 2 |
| F P2 | S P2 | This OP is issued unconditionally | 2 |
| F P3 | S P3 | P3 is fetched and a store is set up when the VFLEU requests P2 per OP2; OP3 is issued with information on a new pattern only. | 3 |
| F SC3 | | SC3 is fetched when the VFLEU requests SC2 per OP3; note that this fetch is not sufficient for issuing this op (i.e., OP4). | 4 |
| F P4 | S P4 | P4 is fetched and a store is set up when the VFLEU requests P3 per OP3; OP4 is issued with information on new pattern and new source. From the instruction, it can be seen that this is the last P fetch. | 4 |
| (SC3) | | No new SC WD is fetched because SC3 has not been needed by the VFLEU. This OP is issued when P4 is requested, in case SC3 is needed to complete P4. Since it turns out that SC3 is not needed to complete P4, this OP will have to be cancelled. No new P is fetched, since P4 was last. | 5 |

In the table it will be noted that as the sing (pattern) starts byte processing at the sixth byte of its word, and the source operand starts at the zero byte of its word, the sink word will be used up first. This causes the second OP to be decoded to bring in the next pattern word and the first byte at the left of this next pattern word will be processed and a new OP is requested. This request will cause the next pattern word to be requested and the FLB will be assigned for the next sink word for which a fetch request is issued, but the old FLB number will be repeated for the second source word. Note, however, that no fetch request is sent for the source word until the second source word is transferred into the FXPU 143. The identification of the FLB 185 receiving the new (third) source word is saved to put into the fourth OP next to be issued. It is to be noted that the third source word is available if it is needed, but since sink and source words are used at different rates, the third source word was not required before the end of the pattern field was reached. Each OP issued will contain the designation of the FLB 185 which is holding the last fetched source word so that the FLB designation may carry over a number of OP's. The I Box 134 must remain available until the end of the EDMK instruction to generate the byte address of the first non-zero source byte.

For the MOVE WITH OFFSET (MVO) instruction only the first sink word needs to be fetched. This is because in this instruction, the four righthand bits of the first sink word remain the same and the others are all replaced by the source data. The first fetch is therefore for the first source word and the next fetch is for the first sink word accompanied by a store sink instruction. The FLB's 185 designated for these operands are identified in the first OP. The next source word is requested and then a store for the second sink word is issued. The FLB's for these operands are identified in these instructoins. The source fetching and sink storing are terminated when the I Box 143 has issued enough requests to take care of the operations required by the length fields.

For PACK (PK) data is being taken from two source bytes and compressed into one byte. This requires fetching a new source word twice for each sink word stored, but as there is no sink fetching, the byte address to be used to start the packing at the correct byte position is sent to the FXOS 201 with the first OP. One OP will be issued for each source word used with two source words being fetched at the start of I Box OP issuance. Each OP contains the designation of the SAR to receive the sink word and succeeding OP's continue the same SAR designation until the sing word is stored.

The UNPACK (UNPK) instruction is the reverse of the PACK in that two sink words will be stored for each source word fetched. An extra source word will be fetched at the start and a sink store request set up in a SAR 241. Each OP thereafter will contain the FLB designation of the next source word until the word is transferred to a FXB for use, at which time the next fetch will be set up by I Box 134. Each OP will include the designation of the FLB containing the next source word and the address of the SAR designated to receive the next sink word. Normally in PACK and UNPACK instructions, the sink word is not fetched at any time, but it can happen that a sink word is to be stored at the location from which the advanced source word was fetched. Since logically the store should have been made before the fetch, it is necessary for I Box 134 to recognize this overlap situation and to correct for it by holding up the source fetch until the sink word has been stored.

The LOAD MULTIPLE (LM) or STORE MULTIPLE (STM) instructions load or store double words into or from an even-odd pair of GPR's 202 from or into adjacent double words of storage. The double word store or fetch requests are issued from I Box 134 with each OP loading or storing the two GPR's. The only point of I Box 134 control is that on the first OP, a fetch or store of only the right hand word may be necessary, and on the last OP only the lefthand word may be of interest. These are taken care of by use of bits signifying first OP, last OP, and partial operand for the instruction. The I Box 134 is not tied up after the last OP is issued to load or store the last identified GPR 202.

*Overlapping operands*

All Storage-Storage (SS) format instructions involve two operand fields and these fields can overlap in storage in any way. In a high speed processor with prefetching, this can lead to some conflicts in those instructions which modify one of the operand fields in storage. Clearly, if a source operand is logically fetched from a storage location before there is a storage operation into that location, there is no problem for the source bytes are used before the data at their storage address is to be modified. Similarly, if the source word address is greater than a full double word less than the sink word address, there will be a store of the sink word at a storage address before the data at the address can be logically fetched for the source, recognition of such a store-fetch possibility being a function of MSCE 136. If, however, the sink address is less than eight bytes more than the source address, an overlap is possible which cannot be corrected by MSCE 136. For this situation, the I Box must test the sink and source starting addresses to determine if their difference is less than eight byte addresses. If such a difference is found, an overlap bit is set in the first OP to be issued. The MSCE 136 is notified that for this instruction it is to suppress its multi-accessing linking whereby a single storage access can be used for a fetch-fetch or fetch-store or store-fetch combination of requests. All storage accesses for this condition must be in strict logical order. The test for possible overlap takes place after the two operand fetches and the sink store instruction have been issued, so that their storage addresses are available but before the OP containing the designations of the FLB's for these fetches has been issued. When the FXPU 143 has been notified of a possible overlap situation, it is up to the FXPU 143 to maintain its operands in proper condition.

This notification of possible overlap is sufficient for the I Box part of the instructions NC, OC, XC, MVC, MVZ and MVN. For MVO the instruction is processed from right to left rather than left to right as in the above instructions. For this instruction, the sink address is subtracted from the source address to determine if the difference is positive and less than eight which is the same test as above but in the opposite direction.

In the TRANSLATE instruction, the table bytes are taken at random over the table area, and hence it cannot be told from the instruction parameters whether there is any actual overlap, and thus the FXPU 143 cannot be informed of possible overlap in the first issued OP. The only apparent way is to detect when a fetch request (for a table word) is from the same double word address as the word being processed. When notified of this comparison, the FXPU 143 can make the proper corrections. For this comparison, the I Box 134 makes use of the address comparators already in the MSCE 136. The I Box 134 can control the valid bits of the SAR's 241, and for this instruction enables only the valid bit for the SAR pertaining to the sink word being processed. Now, when the MSCE 136 receives a fetch for the same address as is in the SAR 241, it notifies the I Box 134 of such comparison but does not link the two requests together in its normal fashion, and merely sends a dummy fetch to the FLB, i.e., sets it full but does not set up a storage access, and tags the RLB 185 to note the matching address. When the FXPU enables transfer to the byte to its FXB from the FLB, the empty FLB with the matching address tag notifies it that the desired byte is in its own sink register and to process it from there. In the PACK and UNPACK instructions, the operands are used up at different rates so that it is possible to have a dynamic overlap during the execution of the instructions. In addition, therefore, to the notification of possible overlap as above set out, a test is made in UNPACK to see if the sink starting address is less than eight bytes smaller than the source starting address, or in PACK to see if the source starting address is smaller than but within 16 byte addresses of the sink starting address. In both of these cases the source and sink may overlap and the FXPU 143 and I Box 134 go into a "hand holding" mode in which the I Box 134 will issue a fetch and an OP only when the FXPU completes processing of either a source or a sink word. This is slow but insures that the store instruction to the MSCE will be executed before the overlapping fetch is executed, thus maintaining proper sequencing.

The TRANSLATE AND TEST and the COMPARE instructions do not modify storage and cannot therefore have any overlap problem. The EDIT and EDIT AND MARK instructions can have overlapping fields but are considered safe and not subject to modification because of overlap since the definition of the instruction for this embodiment is that the result of overlapping fields is indeterminate and not to be relied upon. In the instructions TRANSLATE AND TEST and COMPARE it is possible for the execution of the instruction to be terminated prior to the end of processing of the operand fields. In such early termination, it is necessary for the unused OP's in FXOS 201 to be cancelled and those FLB's 185 tagged busy with the operands for these OP's are to be freed for further use. The OP's are cancelled and the FLB's 185 freed substantially as in cancellation of conditionally issued OP's, i.e., the FXOS 201 steps through them setting the Full tags off and setting empty the identified FLB's and/or SAR's.

Interrupts

Many situations can arise during the execution of a problem program by a data processing machine which requires that the program be departed from for at least a time and that some other routine be performed, either a program having a higher priority or a program to correct an error detected during the processing of the program. As defined in the present embodiment, such interruptions will initially store in a fixed storage location, all data necessary to re-enter the old program at the point of interrupt if this is possible. Each type of interrupt has its own interrupt priority, and any interrupt operation can be interrupt by one of higher priority. When the higher priority interrupt has been executed, it returns control to the interrupted one which finishes its operation if possible and returns control to the original program. Generally, an interrupt operation cannot be broken into by another interrupt of the same or lower priority for this could lead to an endless loop of interrupts where a static machine condition is present.

It will generally be possible for the I Box 134 to store in the PSW Buffer 1006, FIG. 58, an interruption code representing the interrupting reason and the address of the next instruction to be decoded (IR INCREMENT 153+LB Reg. 150) but for some interrupts the offending instruction has been passed on to the FXOS 201 or FXOS 184, and the instruction address is no longer available. Such interrupts for which the interrupt causing instruction cannot be directly identified are termed imprecise interrupts. Program exceptions which fall into this imprecise class are:

(A) Fixed Data Overflow, Incorrect Data Format and Fixed Divide error signalled from the FXPU 143.
(B) Exponent Overflow, Exponent Underflow, Significance and Floating Divide error signalled from FLPU 142.
(C) Protect Violation signalled from MSCE when a protected area of storage is addressed.
(D) Address specifications which arise by violation of the word boundary conditions for data fetching and storing and signalled after completion of the address generation.
(E) Invalid address in which an attempt is made to fetch or store outside of the available storage addresses, signalled after address generation.

These imprecise exceptions are identified by storing a 00 in the ILC section (bits 32–33) of the PSW Buffer 1006. The pipeline of instructions already issued is drained by execution of these instructions prior to honoring the interrupt and any further imprecise interrupts due to execution of these instructions will be ignored and lost to the programmer. However, the instruction stored in the old PSW will point to the next instruction to be issued, making it possible to return to the program without logically missing any instructions, although the results may be adversely affected by the detected exception. It is also possible, since operations can be executed out of sequence, for the first interrupt condition recognized to be logically after a second condition which is lost.

Imprecise interrupts which arise from conditionally issued instructions are merely noted and will be either activated or cancelled when the conditional instructions are activated or cancelled. Where basic machine status changes are involved, all instructions issued prior to the status change will be executed before the change. For example, an instruction issued under a program mask is completed prior to a program mask change, thus insuring that any interrupts will be able to store the mask which enabled the interrupt. Logical consistency is maintained when an invalid, privileged operation, execute, supervisor call, precise address or precise specification interrupt precedes an imprecise one. Should the imprecise one occur during the drain of the pipeline, required prior to honoring the precise interruption, the original interruption will be cancelled. Since the address stored is that of the next instruction, the effect when the program is resumed of the cancellation of the interrupt is to treat the instruction leading to the precise interruption as never having occurred.

In the hardware implementation for handling the interrupt routines, the efficient handling of the singular interrupt case is particularly important since single interrupts are by far the more frequent. When the I Box 134 is signalled to execute an interrupt, it first halts the OP Decoder 166 to prevent any new instructions from being initiated or issued, and then waits for the completion of the current instruction. A new PSW corresponding to the type of interrupt is fetched and the instruction address in the new PSW is used to initialize the instruction fetching mechanism in the same manner as for a branch with the rest of the PSW being retained in a Temporary Buffer 157. After the instruction pipeline has emptied, the old PSW is stored at an address corresponding to the type of interrupt, and with a code indicating the type of interrupt. The remainder of the new PSW is then transferred into the PSW Buffer 1006 and the OP Decoder 166 re-activated to continue I Box operations on the new interrupt program. This new interrupt program will be designed for the type of interrupt encountered and may restore control to the original program after the interrupting condition is taken care of. If a higher priority interrupt condition arises due to a logically earlier exception, the first interrupt is sequenced to the pipeline empty state and then the PSW for the new interrupt is fetched.

Interrupt conditions may be considered as divided into the precise and imprecise exceptions with the imprecise ones having the higher priority since they are due to conditions logically prior to those causing the precise interrupts. Such priority prevents programming inconsistencies such a storing with a PSW on an interrupt, a program mask indicating that the system should not have been interrupted. This requires that the imprecise interrupts must be recognized independently of the others, but there is also priority within the group of imprecise interrupts such that a first recognized signal inhibits all subsequent interrupt signals until it is honored. Should more than one interrupt signal occur simultaneously, an internal priority will cancel all but one and the cancelled ones are lost. The priority among the imprecise interrupts is:

(1) Data, FXPU Overflow, FXPU Division
(2) FLPU Exponent Overflow
(3) FLPU Exponent Underflow
(4) Significance
(5) FLPU Division
(6) Protect Violation
(7) Specification
(8) Invalid Address The Specification and Address interruptions may be signalled as a result of conditional fetching operands. These are recognized as conditional, i.e. they do not suppress recognition of later arising signals which are associated with unconditional instructions, but they do stop I Unit decoding. When the conditional mode is removed, they are cancelled or emit a simulated signal which is recognized as an interrupt signal.

The precise interrupts are those which are signalled while the instruction address in I Register 148 still refers to the interrupting instruction. Among these the operations, privilege, EXECUTE and SUPERVISOR CALL exceptions are recognized as the instruction is decoded, while the specification and invalid address may occur during the time the instruction is within the I Box 134. These interrupts are inhibited by any other interrupt trigger being on and the instruction giving rise to this interrupt will be treated as if it had not been decoded. Its instruction address will be stored with the old PSW and it will be the first instruction decoded when a return is made to the program.

External signals calling for an interrupt are of a fixed duration and will be remembered if they are received during execution of a program for a prior interruption. The external signal is stored in a captivity trigger which maintains a signal replacing the external signal and will be recognized after all internal interruptions are processed. The I/O interruption signals are direct coupled until they are honored in the I Box 134. They are lowest on the priority tree and will wait until all other causes of interrupts have been taken care of.

The sequence chart for the interrupts is shown in FIGS. 76 and 77. There are two basic entry points into the sequencing for interruptions:

(1) Normal, which is the usual situation for a singular exception and
(2) Priority Usurpation, entry A, which occurs when a first interruption is being sequenced and the associated drain of the execution unit instructions leads to an imprecise interruption.

In the normal situation which is applicable to all interruptions, the recognition of the interruption signal immediately halts decoding of any further instructions by OP Decoder 166. Nothing more happens as a result of the interrupt signal until the I Box 134 is in an interruptable state. This requires that any instruction which requires I Box 134 sequencing and has been initiated will be either completed or will be processed to a point wherein it signals a precise interrupt at which time it will be cancelled. This instruction which now signals an interrupt is logically later than the one whose interrupt signal is being processed and programming-wise should not yet have been reached for processing.

After the execution pipeline is drained, the I Box 134 and E Units 142 and 143 must not be set in a conditional state, an interlock made necessary by a hardware sharing facility, and the Adder 168 must be available. Once these conditions are met, the I Box 134 is interruptable and sequencing of the interrupt signal can be initiated. If the interrupt is not an imprecise type, Block 1187, an interlock, Block 1188, is set to prevent a further interrupt by an interrupt signal of lower priority. At the same time, Block 1189, all lower priority interrupts are cancelled, the address of the new PSW corresponding to the interrupt is sent in a fetch request to MSCE 136, and the addresses in LB Register 150 and I Register 148 are sent to Adder 168, FIG. 10, on Busses 1009 and 1015 to generate the instruction address of the instruction causing the interrupt. If the program interruption is of the imprecise type and the I Box 134 is not already processing a precise type of interrupt, the sequence also passes to Block 1189.

After the address generation, Block 1189, or if an imprecise interrupt is signalled during the sequencing of a precise interruption, entry point A, the present instruction address from Adder 168 is transferred to W Register 177, and the fetch of the new PSW whose address is on Bus 1034 is initiated. When the fetch of this new PSW is complete, its instruction address is put into the instruction fetching part of the I Box 134, as in initializing, and instruction decoding for the interrupt can be started. If the interrupt is an external or I/O interrupt, nothing was in error and the program can be resumed after the interrupt has been processed at the instruction which was being decoded when the interrupt was signalled and it is this address which is now stored in both W Register 177 and Temp. Register 176. If, however, it is a precise program type of interrupt which is being processed, the program should resume at the next instruction after the one causing the interrupt. The type of interrupt being processed is therefore looked at, Block 1191, and if it is a precise type of program interrupt, the next instruction address is generated by gating the LB Register 150 and IR Increment 153 over Busses 1009 and 1015 to Adder 168 and this address will be transferred into W Register 177 with the I Box 134 going into a waiting state. If the interrupt is not a program type of precise interrupt, the next instruction address is not formed and the I Box goes directly into the wait state, entry B, FIG. 29.

After the MSCE 136 has accepted the fetch request for the new PSW, the wait state is terminated and the address at which the old PSW is to be stored is set on the SAB 240 of MSCE 136 from Bus 1034. Now the I Box 134 waits until the instruction pipeline is completely empty and it then gates out the old PSW from PSW Buffer 1006 over Bus 1192 to the first SDB 244 in MSCE 136 and including the saved instruction address from W Register 177, which is sent to the SDB 244 over Bus 1193 from the W Register.

At this time the possibility of a priority usurpation is checked by seeing if a precise type of interruption is being processed and, if so, whether an imprecise interruption is now pending. If this new interruption is found, Block 1195, and after the new PSW has been fetched, all lower priority interrupt signals are removed, the saved instruction address in Temp Register 176 is returned to the input of Adder 168, and the address for the new PSW corresponding to the new interruption is set on the Bus 1034 for transmission to the SAB 240 in MSCE 136. The sequencing is then resumed at entry point A, FIG. 28, since the preliminary steps need not be repeated.

If the program is not to be usurped, the interrupt being sequenced may be completed. The old PSW will be gated into the SDB 244 to enable its storage in the proper storage address set in the SAR 241, and the store operation will be activated. If the interrupt is not an I/O sequence, the I Box waits until the PSW fetch is completed by transfer from Temp Register 157 into PSW Buffer 1006, and the fetching mechanism is set to the new instruction address. The interruption is now complete and the OP Decoder 166 is freed to continue with instruction decoding. This new instruction decoding will normally be along a special program sub-routine to compensate or correct or accommodate the cause of the interrupt, and may be any needed instructions. This subroutine will normally transfer control back to the PSW which was in control when the interrupt was signalled. If the cause of the interrupt was due to the I/O equipment, a signal will be sent at this time to the I/O Channel that its interrupt signal is being processed. As soon as the channel response to the interruption is complete, the control also waits for completion of the PSW fetch and termination of the interrupt sequencing.

It should be noted that certain of these interruptions, i.e., the FXPU Overflow, the Decimal Overflow in CVB instructions, the exponent underflow and significance checks, can be inhibited by lack of a set bit in bit positions 36 to 39 of the PSW Buffer 1006. Such interrupts will be ignored until the program mask is changed by a new PSW or a SET PROGRAM MASK (SPM) instruction. There is another interrupt mask in the PSW and this is bit 13 which is set if a machine check, i.e., a detection of a processing error, is to be allowed to interrupt system processing. When a machine check interrupt is recognized, the CPU 100, except for MSCE 136, is stopped at the earliest feasible clock point. A log out of the CPU data configuration is initiated and when complete is followed by a reset of CPU 100. Further sequencing is the same as for an imprecise interruption except that there is no need to wait for I Box interruptibility or pipeline drain as the CPU reset has removed all interlocks and set the execution units to an empty state.

It is to be recognized that the PSW for each interrupt contains the program mask bits to allow a higher priority interrupt but to inhibit one of equal or lower priority. This will prevent establishment of a loop of interrupts, none of which is completed before it is interrupted by another.

A block diagram showing the interconnections between the interrupt controls is presented in FIG. 78. At the top, the eight line bus 1196 from L Register 1102, FIG. 58, carries the interrupt code stored in the L Register 1102 from a SUPERVISOR CALL instruction. The group of external signals on Bus 1197 are as above noted, direct wire signals and are shaped into pulses in Unit 1199, and set into the External Captivity Triggers 1201, by a timing signal on line 1202. The signals from these External Captivity Triggers are screened through an External Mask 1203 to set the External Identify Triggers 1205 for those signals which will be recognized, and these will be returned over a Bus 1206 to reset the recognized ones of the External Captivity Triggers 1201.

The I/O Channel interrupt signals are received over a Bus 1207 and those which pass through the system mask, bits 0–7 of PSW Buffer 1006, can set the I/O Interrupt Triggers 1209. The next Bus 1210 carries the signals for the precise type of program interrupts and sets corresponding triggers in the Precise Program Interrupt Group of Triggers 1211. Bus 1213 carries the imprecise program interrupt signals some of which are maskable and all of which have a corresponding Trigger 1214.

The outputs of all of these triggers 1201, 1205, 1209, 1211, and 1214, are fed to the Control Circuits 1215 which function for recognition of interrupt signals, priority recognition, generation of the interrupt codes needed for insertion in PSW Buffer 1006, and generation of the new PSW address for fetches and the old PSW address for stores. The interrupt code is gated out when required to SDB 244 in the MSCE 136 over bit position lines 21–31 forming a part of PSW Buffer Bus 1192, FIG. 10. The address which is generated for the PSW fetches and stores is transmitted to the Storage Address Bus 240 over Bit Position Lines 25–28 of the address Bus 1034. Since PSW's are a full double word, the three low bits 29–31 are always zeros and the permanently assigned storage locations for PSW's are at the start of storage so there is no need for higher order bit position lines for these PSW address bits are also all zeros.

The Sequence Triggers and Combinational Logic Unit 1217 is the processing control for the interrupt circuits. It receives from Control Circuits 1215 an identification of the kind of interrupt being processed and on Lines 1216 from other I Box indicators the status signals indicating interruptibility of I Box 134, #1 Temporary Buffer Register 157 available, Pipeline empty, fetch return to Temporary Buffer 157, and a channel response to an I/O interrupt. At the times indicated on the sequence charts, FIGS. 28 and 29, the Sequence Triggers 1217 issue to the Triggers 1205, 1209, 1211, and 1214, a signal on a Line 1218 enabling reset of the lower priority triggers when a higher priority interrupt is signalled to Control Circuits 1215, and it also controls a signal on a line 1219 to completely reset all Interrupt Triggers 1201, 1205, 1209, 1211 and 1214, at the end of an interrupt. For the Imprecise Program Interrupt Triggers 1214, there is a special line 1221 which signals that interrupt signals previously set in conditional mode are to be switched to unconditional interrupt triggers as the condition has been resolved.

On the control side of Unit 1217, a signal on a Line 1222 will gate out to Bus 1034 the address of the new PSW for a fetch request, and a signal on Line 1223 will gate to Bus 1034 the address in which an old PSW is to be stored, both addresses being generated by the Control Unit 1215. There is also a Signal Line 1225 which gates to Bus 1192 the old PSW in Buffer 1006, and including the interrupt code on Bit Positions 21–31 from the Control Circuits 1215. Since the Instruction Length Code (ILC), bits 32 and 33 of PSW depend upon the type of interrupt, the two lines 1226 and 1227 signalling not a precise program interrupt and a precise program interrupt respectively, are gated out under control of Line 1225 to gate the correct ILC bits to the Storage Data Buffer 244 when the old PSW is being stored. The other output Signal Lines 1229, 1230, 1231, and 1233 are, respectively, to control transfer of a new PSW from Temporary Buffer 157 into PSW Buffer 1006, to gate the Instruction address of a new PSW into the instruction fetch registers (LB, UB, I and AOC), to stop I Box 134 decoding for the interrupt and to signal the I/O channels that an interrupt is being taken.

It will be noted that the system of interrupt priorities enables an interrupt sub-routine brought into action as a result of one type of interrupt to be interrupted, program mask permitting, by another type of interrupt which may in turn have its fixup sub-routine interrupted. It is thus possible to have three or more interrupts pending at the same time and each at a different stage of its program. By proper sub-routine programming it is possible for each interruption when completed to transfer control back to the sub-routine which it interrupted so that each interrupt will be finally processed in order of priority with eventual return to the problem program at an instruction following the one which caused the interrupt.

*Branch and loop mode controls*

The I Box 134 as previously described with reference to its data flow in FIGS. 58 to 78, has a built-in control structure to control the various gating circuits thereof. In the above description of the flow charts, a number of references have been made to various machine states wherein specified control actions take place, or which in combination with other conditions set further controls. These machine states are actually determined by a set of trigger circuits and, so far as it can be conveniently developed, functions common to a number of different instructions have been grouped under control of a single state trigger so that the triggers are common to all of the I Box instructions.

*Output control signals*

Many other functions, in addition to the machine states, are common to more than one instruction, and the branch and loop mode controls are therefore set up so that a single function control signal may be generated as a result of a plurality of conditions in different instructions. In the drawings FIGS. 81 to 95, the following control signals are generated for transmittal to other areas of the machine for the purposes indicated. In FIG. 82, the COND T signal is transmitted to the execution units to inform them that any further instructions are to be tagged conditional. In FIG. 83, the CANCEL FXOS, CANCEL FLOS, CANCEL MSCE, ACTIVATE FXOS, ACTIVATE FLOS, and ACTIVATE MSCE, are sent to the FXOS 201, the FLOS 184 and the MSCE 136 to cancel or activate the conditionally issued instructions. It should be noted here that the line above the name of a signal indicates only that the voltage level of the normal signal is at a more positive level. An overlined signal is one which is at a higher (positive) voltage level when a non-controlling signal is being transmitted, and which drops to a lower voltage to indicate the presence of a significant signal in contrast to the unlined signals which shift from a lower voltage to a more positive signal level to indicate the presence of a controlling signal. In FIG. 84, the REQ GP T FXOS signal goes to the FXOS 201, FIG. 6, to request a priority slot for entry of data into a GPR. The R1 DBL SINK T signal indicates that an operand to or from the GPR 202 designated as the R1 register is a double word wide and that availability of the even-odd pair of GPR's must be checked before processing the instruction.

FIG. 86 generates a CANCEL GP REQ T FXOS signal which is sent to FXOS 201, FIG. 6, to cancel a request for priority in access to a GPR 202. The SVIR OG opens the outgate from the Save IR register 1120 to the Common Bus 1008, and the SVIR INV signal indicates that the data in Save IR Register 1120 has been used or is otherwise invalid. For FIG. 87, the IR INCR TO SVIR, SVIR TO AOR AND SVIR TO IR signals control the gating of data from the IR Incrementer 153 to the Save IR Register 1120, or from Save IR Register to the AO Reg. 1002, or I Reg. over Bus 1008. The R3* OG signal works in conjunction with the B Bus OG Controls 1095 to gate the designated (R3*) GPR 202 to the Adder 168. The AOR QUICK INTLK prevents the gating out of the next instruction word from buffers 156 to the OP Register 159 when a quick branch is detected, and the BX RECOVER is generated when the I Box is to be cleared of the effects of an instruction loop erroneously started at a Branch on Index instruction when the loop was conditionally entered in loop mode and it is later found that the loop is not to be taken.

In FIG. 88 the TON R1 OG IN B is sent to the OG Controls 1096 to set the gate 1030 for the selected GPR data to be gated in to Adder 168. The B signal designation indicates that it is the B Bus input to the Adder 168 which receives the data. The INGATE ILC signal goes to the PSW Buffer 1006 to open the gate from the Buffer 1006 to the Working Reg. 177 to enable the right half of the PSW to be stored in a GPR 202 on a BAL instruction. The WR TO ADD A OG signal outgates the Working Register 177 to Adder Input Bus A over Bus 1036. The PPLN 2 F T2 B is used to indicate to Pipeline Stage 2 that a fetch is to be called for the #2 Temp. Buffed 157, and the R2-X TO ADD S2 is generated to set the OG Controls 1095 for the B Bus of Adder 168 for the GPR specified in the R2 (or X) field of the instruction, the field being the same bit positions but having different functions for the GPR 202 identified therein in different instructions.

For FIG. 89 the SET OP REG E sets on an empty tag for the OP Register 159, thereby preventing any further instruction decoding until the next instruction is loaded into it. The signals WR TO LB, WR TO UB, WR TO SLT, WR TO AOR, WR TO IR, TEMP TO LB, TEMP TO UB, TEMP TO SLT, TEMP TO AOR and TEMP TO IR open the gates from the Working Register (WR) 177, or Temporary Register (TEMP) 176 to Bus 1033, and from Bus 1033 to the indicated Lower Bound 150 (LB), Upper Bound 147 (UB), Save Loop Target 180 (SLT) Advanced Outgating Register 1002 (AOR), or to the Instruction Register 148 (IR), respectively. The IR TO SLCIR opens the gates from I Register 148 to Common Bus 1008 to transfer the I Register 148 data to SLCIR Register 179. In FIG. 90 the R3 OG S6 signal is generated only when the system is in state 6 and controls the OG Controls 1095 to set the Gates 1032 to gate out the data in the GPR 202 designated in the instruction as R3 to Adder 168. The TON I F TGS S6 is another signal generated when the system is in state 6, to turn on the Instruction Fetch Triggers to call for a new instruction. The STEP IR B signal is one line of a number which control the incrementing of I Register 148 by transferring to it the data in the IR Incrementer 153.

Figure 91:
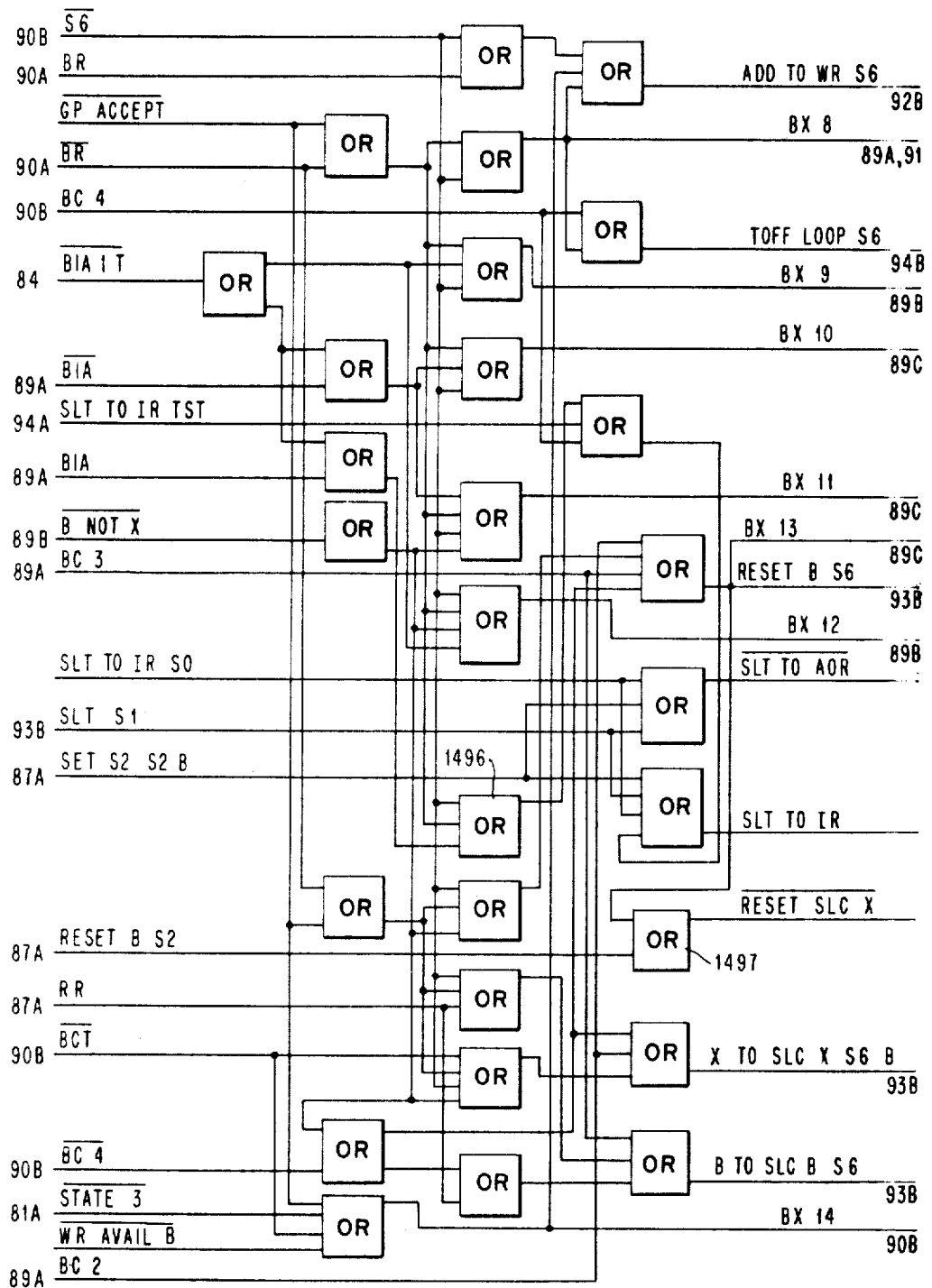
Figure 93A:
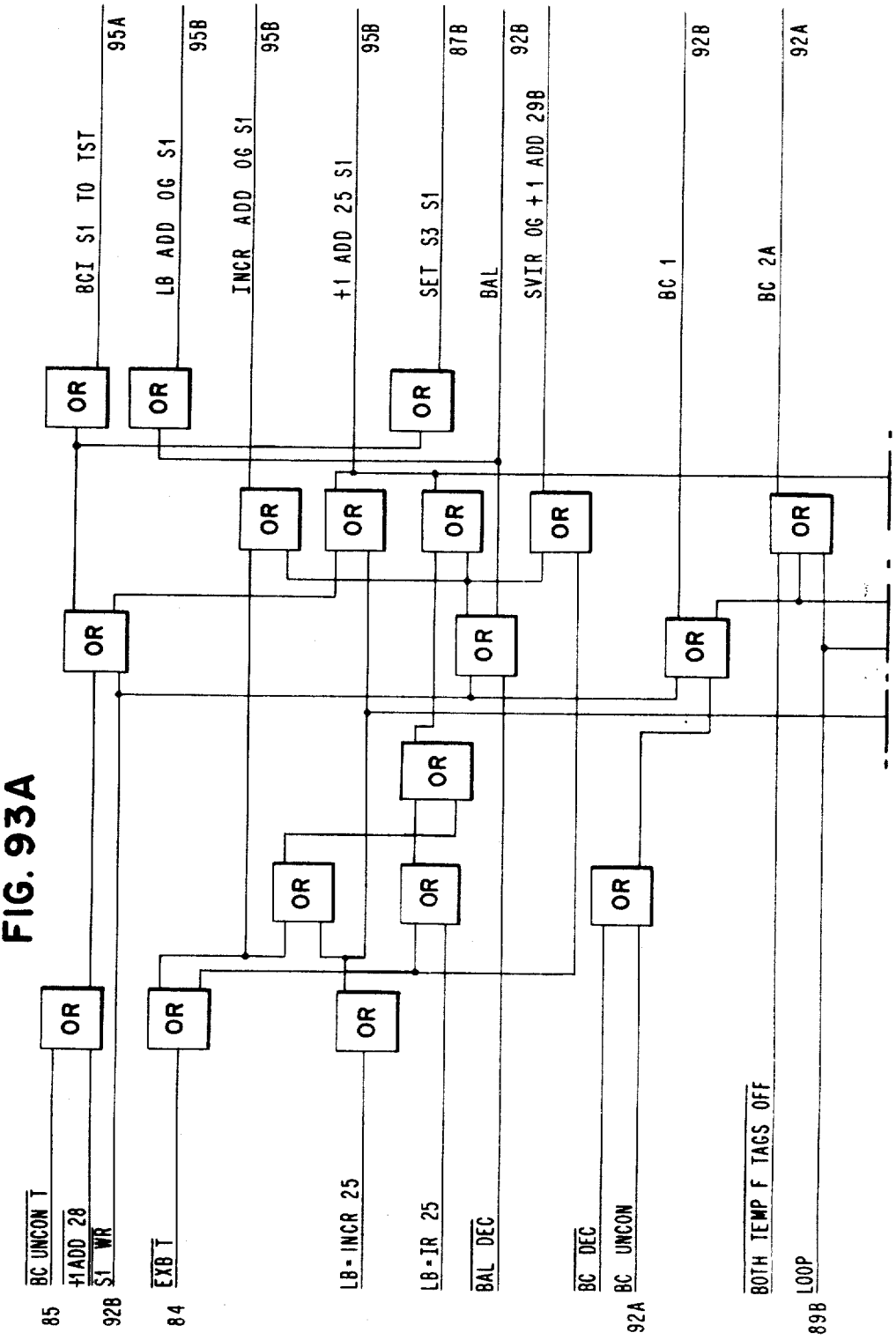
Figure 94A:
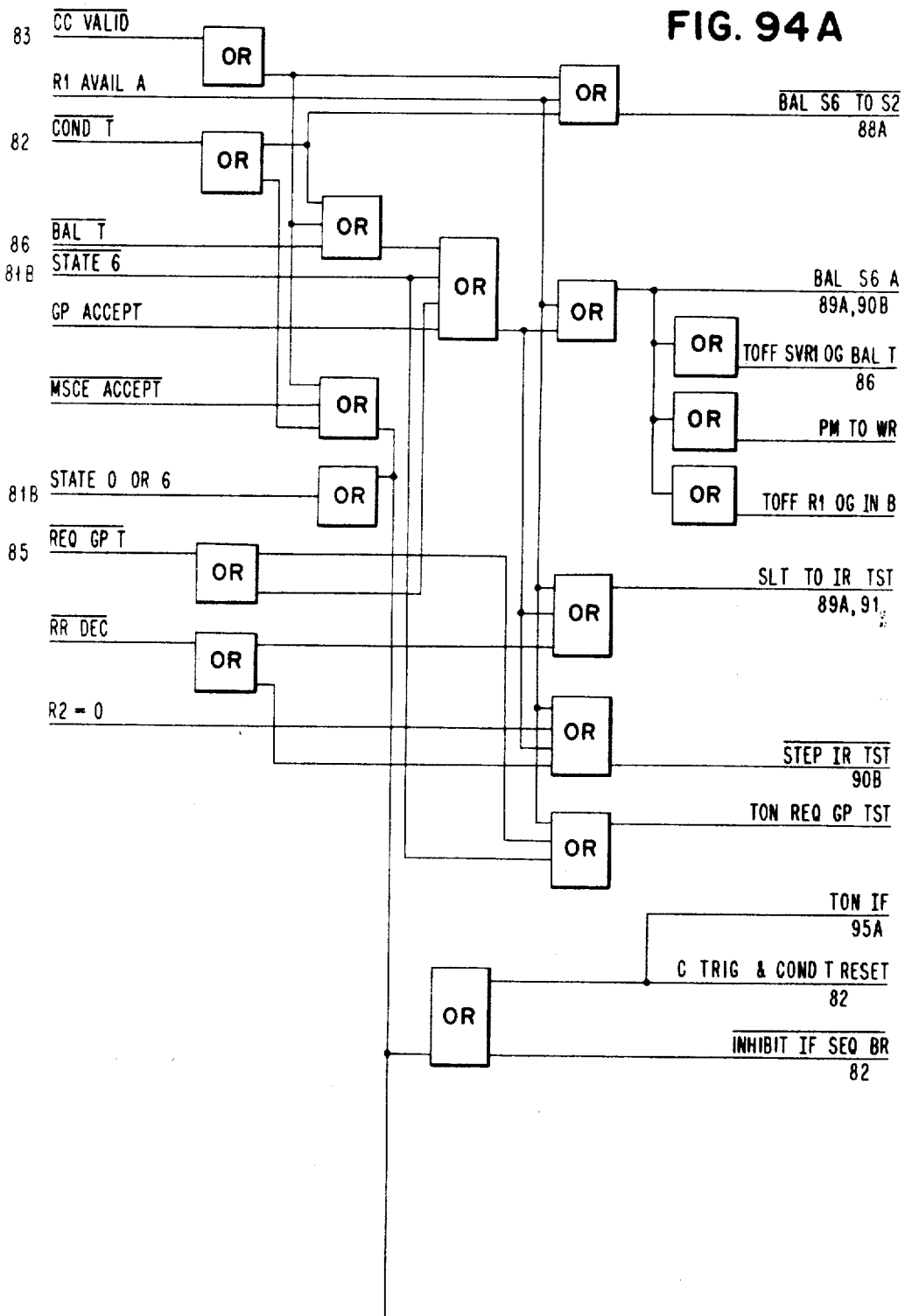
Figure 94B:
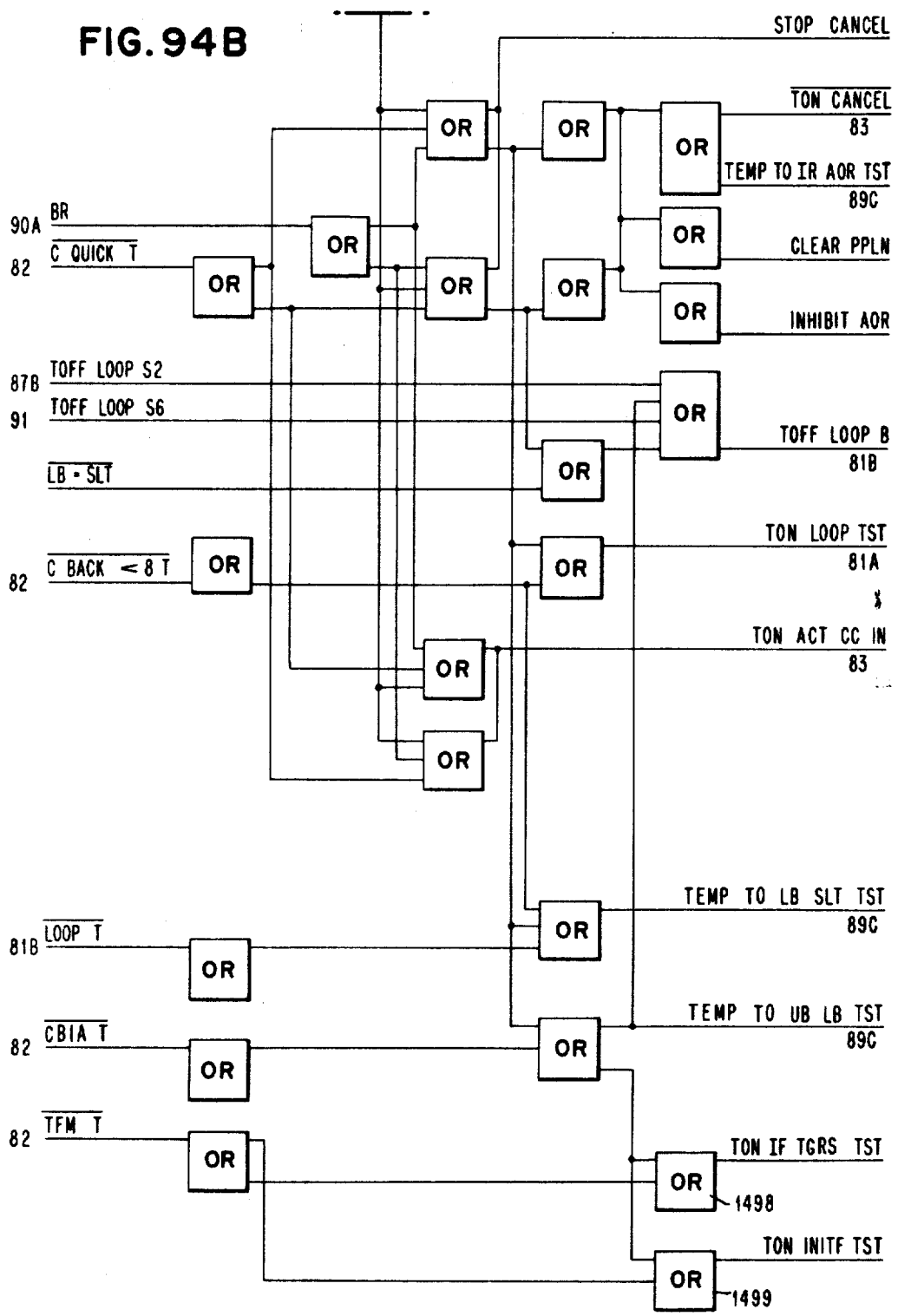
Figure 95A:
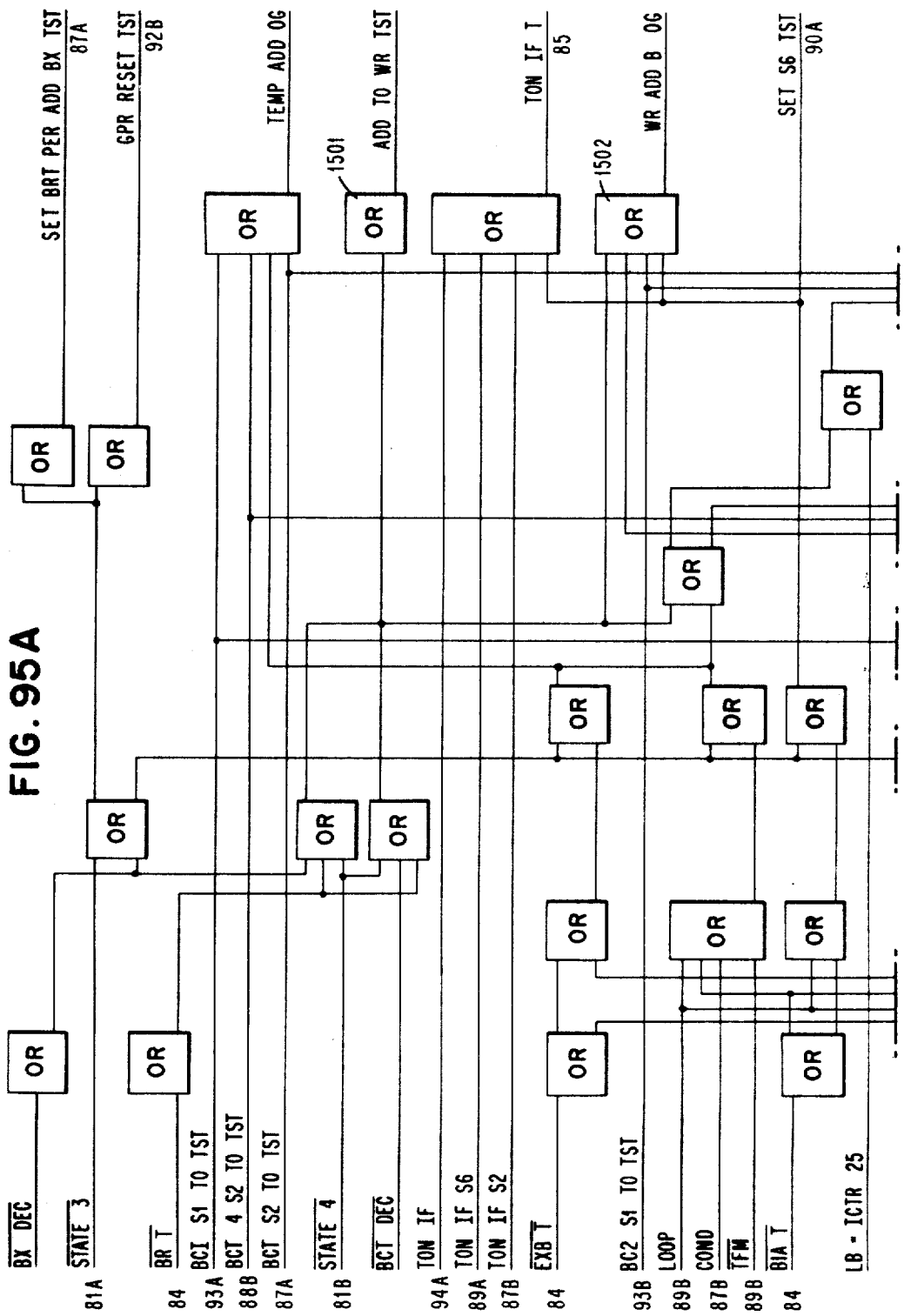

The outputs of FIG. 91 are the ADD TO WR S6 which opens the gates between the output of Adder 168 and Working Register 177 during the state 6 condition, the SLT TO AOR signal which gates data transfer between Register 180 and 1002 over Common Bus 1008, the SLT TO IR signal for data transfer from the SLT Register 180 to I Register 148, and the RESET SLC X which resets the SLC X Register 1044 when its data is no longer needed, as when the Instruction Unit leaves the loop mode state. In FIG. 92, the TON+1 ADD 28 sets a trigger to open a gate to connect the line 1037 to the Bit 28 input on Bus 169. The TON F TAG T1 and TON F TAG T2, respectively, turn on the fetch tags for Temporary Registers 1 and 2, Buffers 157 to indicate that a fetch is outstanding for the associated register. The ADD TO TEMP B and ADD TO WR B signals control the outgating of Adder 168 to the Temporary Register 176 or the Working Register 177, respectively, and the R1 ADD OG and R3 OG S1 signals control the OG Controls 1095 and 1096 to gate the GPR's 202 designated as the R1 and R3 registers to the Adder 168. The HOT 1 RESET will reset any of the triggers which have been set to gate in a Unit to input 169 or 1127 of Adder 168, and this signal with the GPR RESET signal which rests all triggers in the OG controls 1095 and 1096 and therethrough gates 1030 and 1032, constitute an Adder Clean Up pair of signals. The SVIR OG−+1 ADD 29 B signal gates out the SVIR Register 1120 to Bus 1015 and puts a unit value into the Adder Bit position 29 as required to generate with the Lower Bound data a new instruction address. The R–X to SLC X and B to SLC B signals ingate the R or X Register identification on Bus 161, and the B identification on Bus 162, respectively, into the SLC X and SLC B Registers 1044 and 1042. The RESET SLC B signals will reset the SLC B Register 1042 to zero.

For FIG. 94, the PM TO WR signal opens the gates to send the Program Mask in PSW Buffer 1006 to the Working Register 177, the TOFF R1 OG INH B, resets the trigger which inhibits the outgating of the R1 Register to Adder 168 (Adder 168 is no longer full or WR 177 is available), and the TON REQ OP TST will Request Priority on the GPR addressing bus when a branch test is made. The CLEAN PPLN signal cancels the data stored in the Pipeline Stages 1098 and 1099. The INHIBIT AOR signal prevents the AO Register 1002 from outgating any further data from an Instruction Buffer 156 to the OP Register 159. The TON IF TGRS TST and TON INIT F TGRS are generated during a test for a branch instruction to turn on the Instruction Fetch and Initial Fetch Triggers, respectively, to thereby control a fetch of an instruction and to indicate that the fetches being made are the initial fetches required to start the fill of the instruction buffers 156 and thus have priority.

For the outputs of FIG. 95, the TEMP TO ADD OG signal outgates the Temporary Register 176 to Bus 1038 for transmission to the B Bus input to Adder 168. The ADD TO WR TST opens the gates during a test for branch cycle to transfer the data in Adder 168 to the Working Register 177 while the WR ADD B OG will open other gates from Working Register 177 to Bus 1036, and from Bus 1036 into the B input to Adder 168. The +1 ADD 25 B signal is one of the signals which can set the gate to Line 1011 to add a unit to bit position 25 of Adder 168 as required in reconstituting the present instruction address from the part of the address in LB 150, and the Instruction Buffer address data in I Register 148. The LB ADD OG B signal is one of the signals which will outgate the LB Register 150 to Bus 1009 for transmission to the A Bus input (bit positions 8–25) of Adder 168. The IR INCR ADD OB B can be set along with the above LB outgate signal to transfer the IR Incrementer 153 address data to Busses 1010 and 1015 into bit positions 26–31 of the A input of Adder 168 as is required for generating the address of the next instruction. The +1 ADD 31 signal sends a unit signal into the 31st bit position of Adder 168 to generate the address of the next byte when the present byte address is known at the input of Adder 168. The T/C TO CB signal sets the T/C side of Adder 168 to complement the input data as when subtracting the target address in the Working Register 177 from the present instruction address generated from the LB Register 150 and I Register 148 data inputs into the A Bus input of Adder 168. The OG B BRANCH signal will control the outgating of the Branch.

*Input control signals*

The input signals into the branch and loop mode control circuitry are different from the output signals generally in that the output signals are to control actions within the I Box 134, whereas the input signals are mostly indications of conditions of parts of the I Box 134, and may be used in more than one control circuit. Most of these input signals are continuing signals and each will remain in effect until the condition which they indicate changes. There are a few signals, however, which have an S0, S1 or S6 tag and these signals are present only when the I Box is in the state indicated. It should again be noted that the other tags such as WA, WB, TST, IF CONTLS, etc. are indications that the signals for the same function may come from several different areas, and for hardware reasons, not logic reasons, such signals are functionally ORed in these controls. The "from" structure is in FIG. 58, unless otherwise noted.

The incoming signals are:

| Signal | FIG. No. | Description | From— |
|---|---|---|---|
| AND BACK <8 | 82, 84 | Branch Address is back less than 8 double words from the branch instruction. | Adder 168. |
| BRT RESET WA | 84 | Reset the Branch Trigger. | OP Decoder 166. |
| BRT RESET WB | 84 | do | Do. |
| BRT RESET TST | 84 | do | Do. |
| BCT ADD | 84 | The condition of the Adder 168 after the increment of the Branch on Count or Branch on Index instruction is added to the Adder. | Adder 168. |
| BX DEC | 87, 90, 92 | Branch on Index Instruction | OP Decoder 166. |
| BAL DEC | 88, 93 | Branch and Link Instruction | Do. |
| BC DEC | 88, 93 | Branch on condition instruction | Do. |
| BCT DEC | 88, 90, 94 | Branch on Count instruction | Do. |
| BOTH TEMP F TAGS OFF. | 93 | The fetch outstanding tags for both Temporary Registers 157 are off, i.e., all outstanding fetches are returned. | Reg. 157. |
| ENABLE BR TRGS | 81, 85 | A Branch Instruction is found and the branch control Triggers are to be enabled. | OP Decoder 166. |
| EXB T | 89 | The B Trigger of the Execute Triggers is set. | Execute Controls. |
| FXCC OP OUT | 83 | A valid instruction to set the condition Code is outstanding in the Fixed Point Unit. | Decoder 224, FIG. 6. |
| FLCC OP OUT | 83 | A valid instruction to set the condition code is outstanding in the Floating Point Unit. | Control 200, FIG. 5. |
| GP ACCP T | 87, 90, 91, 94 | The GPR 202 controls have granted the requested priority. | FXPU 136, FIG. 6. |
| IR EQ SLCIR | 87, 93 | The address in I Register 148 is equal to that in SLCIR 179. | Comp 181. |
| LB EQ IR INCR 25 | 87, 88, 89, 93, 95 | The bit in bit position 25 of LB Register 150 and that in IR Increment 152 are the same value. | EXCL OR 1007. |
| LB LE WR LE UB (both voltage levels are present). | 87, 88, 89, 92 | The address in the Lower Bound Register 150 is less than or equal to the address in the Working Register 177 which in turn is less than or equal to the address in Upper Bound Register 147. | Comp 1041. |
| LB EQ SLT | 87, 94 | The address in Lower Bound Register 150 is equal to the one in SLT 180. | Comp 1045. |
| LB EQ IR 25 | 93 | The Lower Bound address bit 25 is the same as the one in I Register 148. | EXCL OR 1012. |
| MSCE ACCP T | 88, 92, 94 | The MSCE 136 has accepted a fetch or store request. | MSCE 136, FIG. 7. |

| Signal | FIG. No. | Description | From— |
|---|---|---|---|
| OP STAGE CC BIT | 83 | The instruction in OP Stage 167 is to set a conditional code. | OP Stage 167. |
| +1 ADD 28 T | 92 | The Add 1 Trigger for bit position 25 of Adder 168 is set. | Gate 1011. |
| RR DEC | 87, 89, 93, 94 | An instruction having an RR format is decoded. | OP Decode 166. |
| R2-X EQ Q | 88, 94 | The R2 (or X) field of an instruction being decoded is all zeros. | OP Decode 166. |
| R1 AVAIL | 90, 91, 92, 94 | The GPR designated in the R1 field of the instruction is available for use. | Select RUA 338. Select RUM 339. RUM & RUA counters 337, 335. |
| R3 AVAIL | 92 | The GPR designated in the R3 field of the instruction is available. | Select RUA 338. Select RUM 339. RUM & RUA counters 337, 335. |
| SET STATE (X) | 81 | Signals coming from external sources to set the indicated state triggers for use in the different instructions. | E Box 133, 1 Box 134 etc. |
| SIT | 81 | Store Interlock Trigger to indicate that a store instruction is being issued to an address whose old data is already in the buffers 155. | Comp 1041. |
| SIS or STORE | 81, 85 | Store may be into instruction stream or next instruction in OP Register 159. | Pipeline Stage 2, 1098. |
| SET BRT PER ADD BX S6. | 89 | Set the Branch Triggers in accordance with the condition of the Adder after the incrementing of the Branch on Index instruction. | OP Decode 166. |
| SVIR TO IR | 87 | Ingate the address in Save IR Register 1120 over Bus 1008 into I Register 148. | I Box 134. |
| SLT TO IR | 89, 90 | Ingate the address in SLT Register 180 over Bus 1008 into I Register 148. | I Box 134. |
| TOFF LOOP (3 inputs) | 81 | These lines turn on or turn off as indicated, the triggers indicating Loop Mode, Execute, Branch on Index Low or Equal, Unconditional Branch, Quick Branch on Index, Quick Branch on Condition, Request for GPR Priority, the trigger indicating that the R1 address field indexes a double word and the trigger indicating that instruction fetches are being made. | I Box 134. |
| TOFF EX B T | 84 | | |
| TON EX B T | 84 | | |
| TON BX LE T | 84 | | |
| TOFF BX LE T | 84 | | |
| TON BC UNCON | 85 | | |
| TON BXQ | 85 | | |
| TON BCQ | 85 | | |
| TON REQ GP T (2 inputs) | 85 | | |
| TON R1 DBL | 85 | | |
| SINK T | | | |
| TOFF R1 DBL | 85 | | |
| SINK T | | | |
| TOFF IF T (3 inputs) | 85 | | |
| TON IF T (3 inputs) | 85 | | |
| TON SVIR OG EX | 86 | Signals during the Execute Instructions to outgate the Save IR Register 1120 to Bus 1008. | OP Decode 166. |
| TOFF SVIR OG EX | 86 | | |
| TEMP INIT | 89 | An initial fetch is being requested for a Temporary Buffer 157. | I Box 134. |
| TFM | 90 | A fetch has been made to a temporary buffer 157. | I Box 134. |
| WR AVAIL | 87, 88, 92 | The Working Register 177 is available to receive the output of Adder 168. | Working Register 177. |
| WR LE IR | 87, 89, 92 | The address in Working Register 177 is less than or equal to that in I Register 148. | Comp 1053. |
| WR TO ADD A S6 | 88 | The value in Working Register 177 is to be gated into the A input of Adder 168. | I Box 134. |

In several figures the common lines Latch Clock and Trigger Clock are shown. These may be different phases of the system clock with the two trigger clock phases generated as in FIG. 81. The Computer Reset signal is a manually controlled signal common to the system.

The input and output signals not referred to in the above listings are generated or used within the branch and loop controls of FIGS. 81 to 95, and the figure of origin of input signals or figures of destination output signals are indicated adjacent the lead carrying the signal.

FIG. 79 is a detailed view showing the type of latch circuit used herein. It comprises four NAND blocks, each of which is, in positive logic, an OR circuit driving an amplifier, or a current switching circuit. The block has a number of inputs and a pair of outputs, the lower output being in phase to the OR function of the inputs and the upper one being out of phase to the OR function. The circuit block is also equivalent to a negative AND circuit with the same output. Each output is driven by an emitter follower circuit to provide sufficient output power. A first and and second circuit 1240 and 1241 each have the data line 1242 as an input with Circuit 1240 also having the + phase of the latch clock signal as an input The third Circuit 1244 receives the − phase of the clock signal. All Circuits 1240, 1241, and 1242 have their out of phase outputs connected together in a dot OR configuration (common emitter load), the Lead 1245 of which is applied as an input to the fourth Circuit 1246. The out of phase output 1248 of circuit 1245 is returned as an input to circuits 1241 and 1244, and is also the latched data output of the same phase as the data input. The signal or the dot OR output lead 1245 is a faster response to an input data signal, but is of an opposite phase. In operation, a + data signal on line 1242 will cause the outputs of Circuits 1240 and 1241 to be negative, and at some later time the − clock input to Circuit 1244 will be positive. The outputs of the three Circuits 1240, 1241, and 1244 are then all negative, and Lead 1245 will now be at the negative level driving Circuit 1246 to turn its output 1248 positive which output will, when applied to Circuit Blocks 1241 and 1244, hold the output of these two blocks negative. This condition will hold so long as the data signal on line 1242 remains positive. When the data signal on line 1242 next becomes negative, only Block 1240 can change its output since Line 1248 holds Block 1241 and 1244 set with positive inputs and Block 1240 can raise its output to the positive level only when the + clock Line 1249 goes to its negative level. At this time the positive out of phase output of circuit Block 1240 will switch the Circuit 1248 to a negative output on Lead 1248, which in conjunction with the negative data Line 1243 will switch the output of Circuit 1241 to positive to maintain Lead 1245 positive to generate a negative latch output signal on Lead 1248. This condition will be static so long as data Line 1242 remains negative.

When the data Lead 1242 again becomes positive, it turns the outputs of Circuits 1240 and 1241 negative, but until the − clock Line 1250 become positive, Circuit 1244 with a positive output will hold Lead 1245 positive. If the data Line 1242 changes its voltage level during the time that the + Clock Line 1249 is positive, and — Clock Line 1250 is correspondingly negative, no output change will take place for each Circuit 1240, 1241, and 1244 will have one positive input. If, however, the + Clock Line 1249 is negative with Line 1250 positive, Circuit 1244 will always have a negative output and may be disregarded. A positive to negative data change will make both inputs to circuit 1240 negative raising its output to positive and making output Lead 1248 negative. For a negative to positive shift, both Circuits 1240 and 1241 will have their outputs shifted negative to raise the output Lead 1248 to positive. Thus, during the in phase part of a clock cycle, the latch circuit is held in whichever state it was in at the beginning of the phase, but during the out of phase part it can assume a state corresponding to the input data signal. Naturally, in using this latch circuit, it is expected that the data changes will be made during the in phase part of the clock cycle to cause an output change at the start of the out of phase part of the cycle, and that the data output will be used only after the circuit has had sufficient time to change to a new state.

The Trigger circuit of FIG. 80 is exactly the same as the Latch of FIG. 79 with an additional input 1252 into the first circuit Block 1253. The new Line 1252 is termed the Off input and will normally be at a positive voltage to allow the trigger to become set. The other inputs to Circuit 1253 are the On Input 1254 which will be pulsed from a negative to a positive level to set the trigger and — Clock Line 1256. A second circuit 1257 also receives the On Input 1254 and a third Circuit 1258 receives an input fom a + Clock Line 1260. The out of phase outputs of Blocks 1253, 1257, and 1258 are dot ORed on Line 1261 which is an input to Circuit Block 1262 whose out of phase output is returned as a feed back input 1264 to Blocks 1257 and 1258.

Assume that the trigger is in an On state with output 1264 at a positive level, holding the outputs of Blocks 1257 and 1258 at a negative level. If the off line 1252 is at its normal positive level, the output of Block 1253 is also negative, resulting in the Dot OR Lead 1261 being negative to hold Block 1262 conducting and output 1264 positive. This configuration will be stable without regard to the Clock pulses. To turn the trigger off, a negative pulse is placed on Off Line 1252, which with the normal negative voltage on Line 1254 will turn off Block 1253 when the — Clock Line 1256 goes negative in the clock cycle. The Block 1253 now drives the OR Line 1261 positive to drop the output Line 1264 to negative. Now the normally negative On Line 1254 and Feedback 1264 combine at Block 1257 to hold OR Line 1257 positive, and the Trigger is in a stable reset state. It should be noted that the off signal on Line 1252 may be of any length above the minimum necessary to switch the trigger to the reset state, but must be present during the negative (in phase) part of the — clock cycle.

When the trigger is off, the + Clock line will be negative half of the time, and in conjunction wth the Feedback Line 1264 will energize the Block 1258 to provide a positive output during these out of phase parts of the + clock signal, so the trigger cannot be changed during this phase. During the in phase part of the cycle, the Circuit Block 1257 is the only one holding the OR line 1261 at the positive level. If during the in phase part of the clock cycle, the On Line 1254 is given a positive voltage pulse, the output of Block 1257 will go negative lowering the OR line voltage to the negative level to set the trigger to a positive output voltage on Line 1264. It will thus be seen that the trigger can be set by a positive pulse on Line 1254 or reset by a negative pulse on Line 1252 during the in phase part of a clock cycle and cannot be changed during the out of phase part of the clock cycle. A Computer Reset Line 1265 may be provided as an input to Block 1262, and will normally be at a negative level but can be pulsed positive to reset the trigger at any time. The forced negative output on Feedback Line 1264 and the normally negative input on line 1254 force the output of Block 1257 positive to hold the trigger reset. For both Latch and trigger circuits, the in phase output of the fourth control Block is normally not otherwise used and may be connected to an indicator light on the maintenance operators panel to show the status of the circuit.

*Branch control triggers*

FIGS. 81 to 86 show the circuits and connections used to set and reset the triggers which control the branch instructions. The Latch Clock and Trigger Clock inputs are common to these figures but, except for noting that the + and — phases of the trigger clock are generated in FIG. 81 from a trigger clock input, and are distributed from there to the other figures, these inputs may be considered as solely for timing purposes and need not be further described. Also, it should be noted that the indication that an output signal goes to a particular input does not necessarily mean that the output is not used elsewhere in the I Box 134, although it will not normally be so used.

FIG. 81 has three triggers which are settable in combination to indicate any I Box state from zero to six. The Triggers are the S1 Trigger 1270, the S2 Trigger 1271, and the S4 Trigger 1272, each of which has an output which is at the negative level when the trigger is set. A circuit 1274 connected to the output of S1 Trigger 1270 generates an in phase and an out of phase S1 signal. Likewise a pair of Circuits 1275 and 1276, connected to the S2 Trigger 1271, and a Circuit 1278 connected to the output of the S4 Trigger 1272, generate the in phase and out of phase S2 and S4 signals with a second Circuit 1279 connected to Trigger 1272 generating a second out of phase S4 signal. It is assumed for these triggers that a negative voltage level is a significant signal, and that a Circuit Block may be considered as a —AND block so that it requires all negative input signals to generate a negative output signal at the in phase output, then the out of phase signal is a not signal. A —AND circuit 1280 receives the not S1, the not S2 and not S4, and will give a negative State 0 signal on in phase output Lead 1281 when none of the triggers are set. A —AND circuit Block 1282 receives the S1, the not S2 and the not S4 signals to give a negative State 1 signal on Line 1283. Another —AND circuit 1285 receives the not S1, the S2 and the not S4 signals as inputs and generates a state 2 signal on its output line 1286. The —AND 1287 is connected to the S1, the S2, and the not S4 signals to generate a state 3 signal on Line 1288. For a state 4 signal, the —AND Block 1290 receives the not S1, not S2 and the S4 signals as inputs and provides the state 4 signal on Line 1291. The state 5 and state 6 signals are similarly generated by Circuit Blocks 1292 and 1295, respectively, receiving the S1, not S2 and the S4 or the not S1, the S2 and the S4 signals to provide the state 5 and state 6 signals on their outputs 1293 and 1296. The out of phase outputs of the State 6 AND 1295 and the State 0 AND are dot ORed to provide on a Line 1297, a positive going signal which is positive when the state is either State 0 or State 6. The Triggers can also be set from the maintenance operators panel (MOP) to a State 7 in which all triggers are set. There is no —AND or output signals for this state since it is effectively a "null" state and no I Box processing can be going on.

The Triggers 1270, 1271, and 1272 can be turned on combinationally by a positive going signal on one of a plurality of Set State Lines at the left of FIG. 81. Some of these Set State Lines come from outputs of the Branch and Loop Controls, FIGS. 81 to 95, but the majority are from other parts of I Box 134. All Set State Lines which are to set an odd numbered state output, i.e., States 1, 3, or 5 are inputs to one of three Circuit Blocks 1291, 1292, and 1293 which have their in phase outputs Dot ORed to form an input of a Circuit 1295 while the Set State 7 Input is fed directly to an input of Block 1295. An input signal on any line will drive the out of phase output of Block 1295 negative and this output will be supplied to a Latch 1296 which will time the effect of the input signal and provide a positive signal to turn on Trigger 1270.

In a similar manner the signals which can set the S2 Trigger 1271, i.e., the Set State 2, Set State 3 and Set State 6, are ORed in Blocks 1298 and 1299 which have their in phase outputs Dot ORed as an input to an OR 1301, which also receives the Set State 7 signal. The out of phase signal from Block 1301 is sent to a Latch Circuit 1302 where it is timed and issued as a positive signal to turn on S2 Trigger 1271. Likewise the signals which can turn on the S4 Trigger 1272, i.e., the Set State 4, Set State 5 and Set State 6 signals are inputs to two Blocks 1303 and 1305 whose in phase outputs are Dot ORed and are an input to Block 1306, which also receives the Set State 7 signal and whose out of phase output is sent to a Latch 1307 where it is timed and issued as a positive signal to turn on the S4 Trigger 1272.

As it is desired that all of the Triggers 1270, 1271 or 1272, when set as a result of a Set State signal, shall remain set until a new Set State Signal changes the combination of Triggers, the in phase outputs of Blocks 1295, 1301, and 1306 are Dot ORred with the in phase output of a Block 1309 which has all of the Set State 0 lines as its inputs. The Dot OR circuit will then go positive when any Set State input receives a signal, and this signal as an input to a Latch 1310, will be timed and passed through the Latch 1310. The —ON output of the Latch 1310 is connected to the off input of each Trigger 1270, 1271 and 1272 to activate the reset input of each Trigger when any Set State signal is received. By examination of the Trigger circuit, FIG. 80, it will be seen that the Trigger circuit is set dominant so that if both a —Off and a +On signal is received the Trigger will give a set output which will be retained if both control signals change simultaneously, or the +On signal remains up after the —Off signal is up. Therefore, any Trigger which also receives a +On signal from its Latch 1296, 1302, or 1307 will stay set even though it is receiving a —Off signal and only those Triggers which receive the —Off signal alone will be reset off. When all Set State signals are off, the On and —Off signals to Triggers are returned to their ineffective state, but as above noted, this allows the Triggers to remain in their Set or Reset states.

To enable control over the Triggers 1270, 1271, and 1272, their clock signals are developed as the in phase and out of phase signals from a Circuit Block 1312 which has the —TRIGGER CLOCK, the —ENABLE BRANCH TRIGGERS and the +SIS or STORE signals as inputs so that the —TRIGGER CLOCK signals will be frozen at the out of phase state if either the —ENABLE BRANCH TRIGGERS signal is at its positive, nonsignificant level, or the SIS or STORE signal rises to its positive level. With the TRIGGER CLOCK signals so frozen, the S1, S2, and S4 Triggers cannot change their state.

The SIS or STORE and the —TRIGGER CLOCK input signals are also inputs to a Circuit 1313 which passes clock signals to its +INHIBIT CLOCK and —INHIBIT CLOCK outputs unless the SIS or STORE signal goes positive to freeze the clock signals in their out of phase state. These outputs prevent change in the Conditional Triggers of FIG. 82.

A Loop Mode Trigger 1315 has its +On (Set) input driven by the +On output of a Latch 1316 and its —Off (Reset) input driven by the —On output of a Latch 1317. The out of phase output of a Circuit Block 1319 receiving all of the TON LOOP signals is the controlling input of Latch 1316, while the in phase output of a Block 1320 receiving all of the TOFF LOOP signals is the controlling input of Latch 1317. Since it is not desired to have the —ENABLE BRA TGRS nor the SIS OR STORE signals control the Loop Mode Trigger 1315, the —TRIGGER CLOCK signal is the sole input to a Block 1321, whose outputs are the clock signals for Trigger 1315 and are also sent to other machine triggers. All triggers can be reset by a COMPUTER RESET signal on a Line 1323 which is powered in a Block 1324, whose in phase output is sent to the Loop Mode Trigger to reset it and also combined in Block 1325 with an out of phase —SIT·—TGR CLK signal from Block 1326 to reset the S1, S2, and S4 Triggers on either COMPUTER RESET or the coincidence of a —SIT (Store Interlock Trigger) with a —TRIGGER CLOCK signal.

The Triggers of FIG. 82 are the TFM (Temporary Fetch Made) Trigger 1327, and a group of four conditional mode Triggers, C Quick Trigger 1328, for a Conditional Quick Loop, the C BIA Trigger 1329, for a Conditional Branch Into the Array of Buffer Registers 156, the C BACK < 8 Trigger 1331, for a conditional Branch to an address less than eight double words back, and the COND Trigger 1332 for a Conditional Branch. The TFM Trigger 1327 has a turn on latch 1333 set by the —TON TFM T signal, and a turn off Latch 1334 for its controls with the turn off Latch 1334 being settable by any of the three inputs TOFF TFM S6, TON C BIA TOFF TFM, or CTRIG —COND T RESET to Block 1336, which controls the Latch 1334.

The three Triggers C QUICK, C BIA, and COND are each settable by a Latch 1337, 1338 and 1339, respectively, with C QUICK Trigger 1328 being settable through Block 1341 by the TON COND-C QUICK-C BIA S1 signal, the C BIA Trigger 1329 being settable through Block 1342 by either the TON C BIA-T OFF TFM or the TON COND-C QUICK-C BIA S1 signals, and the COND Trigger 1332 being set through Latch 1339 controlled by Block 1343, having as inputs the TON COND-C QUICK C BIA S1 and the TON COND-C BACK < 8 S2 signals. The C BACK <8 Trigger 1331 is directly settable by the out of phase output of a Block 1345, which receives the —ADD BACK <8 signal directly, and the —TON COND-C BACK <8 S2 through Block 1346.

The four Triggers 1328, 1329, 1331, and 1332 are reset by a common Latch 1347, which is set by the C TRIG —COND T RESET input or the triggers can be reset at any time by the Computer Reset signal through Block 1349 Dot ORed with a negative signal from Latch 1337 and combined with a negative trigger clock signal in Block 1350.

FIG. 83 provides two triggers and a latch circuit related to the validation or cancellation of conditionally issued instructions. The Cancel Trigger 1352 has its output driving a Circuit Block 1353, which has its in phase output distributed as a —CANCEL signal to the FXOS 201, the FLOS 184, and the MSCE 136, to cancel any conditionally issued instructions therein. The out of phase output of Block 1353 is fed back to a Latch 1354 to turn off Trigger 1352. Due to the clock timing intervals in the Latch 1354 and Trigger 1352, the —CANCEL signal will be transmitted for about one clock cycle. Trigger 1352 will be turned on by a —TON CANCEL signal passed through a Latch 1355 to the set input of Trigger 1352. The Activate Trigger 1357, Circuit Block 1358, Reset Latch 1359, and Set Latch 1360, form the same circuit to send an ACTIVATE signal to the FXOS 201 and the FLOS 184 to set any conditionally issued instructions to a valid and executable state. The Activate latch is turned on by a TON ACT CC IN signal which is inverted in a Circuit 1362. To save some time in the activation of fetches and stores in the MSCE 136, the ACTIVATE MSCE signal is taken from the in phase output of Block 1362, and inverted in a Block 1363, to generate a fast ACTIVATE MSCE signal which occurs sooner but is not precisely timed nor turned off as precisely as those from the ACTIVATE Trigger.

A —CC VALID signal to indicate that the setting of the condition code positions in the PSW Buffer 1006 of FIG. 58 is valid is generated by a pair of serially connected latches 1365 and 1366, which due to the serial connection and their different clock inputs, will generate an output —CC VALID signal at the same time as the Triggers 1352 and 1357. The —CC VALID signal is controlled by four inputs to a Circuit Block 1367, two of which signal that an instruction which is to set the condition code has been issued to the FXOS 201, or the FLOS 184. A third input of Block 1367 is the out of phase output of a Block 1369, which will signal whenever the OP Stage 167 contains a condition code setting instruction, except when the instruction is issued in the conditional mode. The fourth input is the OR from Block 1370 of the TON ACT CC IN signal from Block 1362, and the +ACTIVATE signal from Block 1358, the ORing providing a slightly longer signal than either of the input signals.

FIG. 84 details the normal branching control Triggers. The BR Trigger 1370 is set for all branch operations and generates the —BRT signal. Two latches 1371 and 1373 are provided to set and reset the trigger as in the above description of TFM Trigger 1327, FIG. 82. The BR Trigger will be set by the signals —SET BRT PER ADD BCT and —BCT ADD inputs to Block 1374, or by signals —BXL ADD and —SET BRT PER ADD BX inputs to Block 1375, or by signals —BXH ADD and —SET BRT PER ADD BX inputs to Block 1376. Only one of Blocks 1375 and 1376 is allowed to be effective, depending upon the setting of the BXLE Trigger, for if the Branch is to be on an index high condition, the condition of the adder with respect to a low or equal indication or the reverse situation should not be allowed to determine a branch. The out of phase output of each block will go positive when both input signals are present indicating that the branch is to be taken depending upon the condition of the Adder output, and that the adder output conditions for the branch are present. The Dot OR of the Block outputs is the control input for the set BRT Latch 1371. The Reset Latch is energized by the OR in Blocks 1378 and 1379 of the five BRT RESET signals and the TOFF EX B signal from the initial fetch controls.

Four other Triggers BIA 1381 (Branch address is In Array), BIA1 1382 (a similar indication), EX B 1383 (one of the triggers set on an EXecute instruction), and BXLE T 1348 (Branch on the IndeX value Lower than or equal to a comparand), are each settable through their Latches 1386, 1387, 1388, and 1389, respectively. The BIA Trigger 1381 will be set by the —TON BIA T S1 signal and the BIA1 Trigger will be set by the —TON BIA1 T S6 signal. The EX B Trigger 1383 will be set by the —TON EX BT signal. The BXLE Trigger is slightly modified by having the +On and —Off inputs connected together. By reference to FIG. 80, it will be seen that this effect will set the Trigger when the input signal is positive, and will reset it when the signal goes negative. The control signal for the trigger is the OR from Block 1391 of the —TOFF BXLE T which will always reset the trigger and the set control signal which is the out of phase output of Block 1392 which receives the BXLE T signal and the TON BXLE T signal to hold the trigger on once it is set, and to set it if it is not already set.

A fifth trigger BACK<8, 1393 is set to indicate that the branch address is less than eight double words back from the instruction being decoded, and that a program loop has been found which can be entirely contained within the Buffers 156. The Trigger 1393 is set directly by a TON BACK<8 T S1 signal through Block 1395. Another Block 1396 has its out of phase output Dot ORed with the in phase output of Block 1395, and since it receives the signals —ADD BACK<8 and —SET BACK<8 PER ADD S6, will also set the Trigger BACK<8 if the testing signal is present and the address is actually back less than eight double words. All Triggers 1370, 1381, 1382, 1383 and 1393 (not Trigger 1384) are reset by a signal from the Reset Latch 1373, whose output is also sent to FIG. 85 or the —RESET signal.

The circuits of FIG. 85 include six triggers which include the BC UNCON Trigger 1396, which will be set whenever a Branch on Condition instruction finds that the conditions for the branch have been met, the BXQ Trigger 1397 which is set when a Branch on Index instruction generates a quick loop, and the BCTQ Trigger 1399 which is set when a Branch on Condition instruction generates a quick loop. The REQ GP Trigger 1401 is set to request priority for the I Box in referencing the General Purpose Registers 202. The R1 DBL SINK Trigger 1402 is not particularly involved with the other branch control circuits since it indicates when a sink word requires successive references to adjacent GPR's 202. This requires that other I Box controls reissue a GPR Priority Request from Trigger 1401. The IF Trigger (Instruction Fetch) 1403 is set when instructions for the Buffer Registers 156 of the I Box are being fetched to buffers in the I Box 134.

The BC UNCON Trigger 1396 is set by a signal —TON BC UNCON T which passes through a latch 1405. The Trigger is reset by a negative signal RESET from the Latch 1373 of FIG. 84. The BXQ Trigger 1397 is set by a signal from Latch 1406 which is controlled by the out of phase output of a Block 1407 which has the two signals —TON BXQ S0 and —TON BXQ S1 as its inputs. Another signal —TOFF BXQ S2 is applied through a Latch 1409 to turn off the BXQ Trigger 1397. As it is desirable to turn off the —BXQT signal rapidly, i.e., to switch it to the non-significant positive level, an input of a Block 1410 is also connected to the resetting output of Latch 1409. Block 1410 has its out of phase output Dot ORed to the —ON output of the Trigger 1397 and has the —TRIG CLK signal as another input. When the Latch 1409 output signal goes negative to reset Trigger 1397, this Block 1410 can respond rapidly to turn off the —BXQT signal.

The BCTQ Trigger has, with the exception of Block 1410, the same set and reset controls as BXQ Trigger 1397. The Trigger is set by the signals —TON BCTQ S0 and —TON BCTQ S1 through Block 1411 to set Latch 1413 and is reset by the —TOFF BCTQ S2 signal applied directly to the reset Latch 1414. Since both the Branch on Index and the Branch on Count instructions require access to a GPR 202, the four set signals for the BCTQ and BXQ triggers are ORed together in a Block 1415 whose output is ORed in another Block 1417 with three other TON REQ GPT signals. The out of phase output of Circuit Block 1417 is the control input to set Latch 1418 for Trigger 1401. The reset Latch 1419 for Trigger 1401 is controlled by the in phase output of a Circuit 1421, which receives two TOFF REQ GP T signals and a TON SVR1 INV signal. The out of phase output of Block 1421 is transmitted out as the —SV R1 INV signal. It will be remembered that the Save R1 Register 1049, FIG. 58, is checked every cycle to insure that a GPR 202 is not gated out through gates 1030 and 1032 to Adder 168, if new data had been stored therein in the preceding cycle, and has not yet returned to the inputs to gates 1030 and 1032. Reference is instead made to the Working Register 177 for the needed data. If, however, sufficient time has elapsed for data to be returned to the Gates 1030 and 1032, and what is more important, if Working Register 177 could have been changed in intervening cycles, the data in Save R1 Register 1049 is of no further value and should be marked invalid to prevent a possible erroneous operation.

The R1 DBL SINK Trigger 1402 has a set Latch 1422 and a reset Latch 1423 controlled respectively by the signals —TON R1 DBL SINK T and TOFF R1 DBL SINK T.

The IF (Instruction Fetch) Trigger 1403 also has a set Latch 1425 and a reset Latch 1426 with the out of phase output of a Circuit 1427 which receives three TOFF IF T signals connected to the reset Latch 1426, and the in phase output of a Block 1429 having four TON IF T signals as inputs, connected to the set Latch 1425. It is to be noted that for this Trigger 1403, the normal set and reset inputs have a reversed significance so that the Trigger output is positive when the Trigger is set. This is of no logical significance and the output signal is brought to the normal negative voltage level when on and given additional power in Circuit Block 1430, acting as an inverter.

The IF Trigger 1403 can be additionally reset by the presence of a —SIT signal transmitted to the out of phase output of a Block 1431, thereby preventing any instruction fetching when the Storage Interlock Trigger indicates that a store into the instruction stream is outstanding. The other Triggers of this FIG. 85 are resettable by the OR of the —SIT signal through Block 1431 and Block 1433, and the COMP RESET signal through Block 1434. Block 1435 performs similarly to Block 1312 of FIG. 81 to enable control of the Latch Clock circuit for the R1 DBL SINK and IF Triggers by the —ENABLE BRA TGRS and SIS OR STORE signals.

FIG. 86 shows the remaining group of four triggers for the branch and loop mode controls. These Triggers are the CANCEL OP REQUEST Trigger 1440, which is set when a request for a GPR priority if found to be unnecessary or unwanted, the SVR1 OG Trigger 1441 to gate out the data in Save R1 Register 1409, FIG. 58, the BAL Trigger 1442 set to indicate that a Branch and Link instruction is being performed, and the SVR1 INV Trigger 1443 which is set to indicate that the data in Save R1 Register 1049 is no longer of value. The Trigger 1440 is set by a signal on a direct input line SIT, FIG. 85, and the SVR1 INV Trigger is set through a set Latch 1445, controlled by a —TON SVR1 INV signal. Each of these triggers is to be reset at the first clock pulse after the setting signal is removed and for this purpose, a Circuit Block 1446 and 1447, respectively, is placed in the output line of the Trigger with the out of phase output of the Block 1446 or 1447 being fed back to the reset Latch 1449 or 1450 for the Trigger. As soon as either Trigger is turned on, the feed back circuit will energize the Latch 1449 or 1450 to send the reset signal. Since the Triggers are set dominant, this Off signal will not reset the Trigger until the set signal is removed.

Trigger 1441 has its set Latch 1451 activated by the out of phase output of a Block 1453 having the signals TON SVR1 OG EX and TON BAL T —SVR1 OG as inputs and having its reset Latch 1454 activated by the output of Circuit 1455, which has input signals T OFF SVR1 OG EX and T OFF SVR1 OG —BAL T. Trigger 1442 is similarly settable by signal TON BAL T —SVR1 OG through Circuit 1457, whose out of phase output sets the set Latch 1458 and is resettable by the OR of input signals TOFF SVR1 OG —BAL T and BRT RESET TST in Block 1459 which sets reset Latch 1460. All Triggers can be reset by the signal COMP RESET through Block 1462.

*Branch intercontrol circuits*

The circuits detailed in FIGS. 87 to 95 are the ones which combine the outputs of the triggers and Latches of FIGS. 81 to 86 with external signals to generate the I Box control signals required for the branch instructions. The signals which are transmitted from these controls have already been described, but it will be noted that many signals are used internally in these controls and are not generally transmitted out of these drawings. For such signals, every signal received on a drawing from another figure of these control drawings, is marked with the figure of origin and every signal transmitted from a figure is marked with the figure or figures to which it is directed. It will be seen that in many instances, there is no logical distinction between output signals which have different names but are logically the same output. For example, in the lower half of FIG. 87, the output BX is shown as coming from a line which is the output of a Block in the upper half of the figure. The signal R3* OG is derived from the same line through a circuit 1464, and the signal T/C to C S2 is also from the output of Block 1463 through Block 1465. Logically, a single line could carry all three signals, but to have a single circuit block driving all of the signal transmission lines in parallel would result in a slow change of signal output. It is, therefore, preferred to utilize a duplication of hardware to attain an improvement in speed of operation.

Considering now the derivation of only the externally transmitted signals, on FIG. 87, the IR INCR TO SVIR signal is derived as follows. The output of Block 1467 is the OR of —Block 1468 and —Block 1469. Block 1468 is the OR of —Block 1470 and —LB LE WR LE UB and —Block 1471. The input of Block 1471 is the —IR EQ SLCIR signal. The output of Block 1469 is the OR of —Block 1470 and Block 1471 and SIT. The output of Block 1470 is the OR of —Block 1472 and —Block 1474. The Block 1472 output is logically $$(-BXQ\ T)+(-STATE\ 1)+(-WR\ AVAIL)$$

and the output of Block 1474 is logically, $$(-BCTQ\ T)+(-STATE\ 1)+(-WR\ AVAIL)$$

Combining and simplifying the terms, the

IR INCR TO SVIR signal=STATE 1·WR AVAIL·
(BXQ T+BCTQ T)·(LB LE WR LE UB)·
[(—IR EQ SLCIR)+IR EQ SLCIR·(—SIT)]

which can be interpreted to mean that if an instruction being performed is either a Branch on Index or Branch on Count, and the quick loop trigger is set, the State 1 trigger is set, and the Working Register is available, then if the working register address is an address which is already in the buffer registers, and the instruction being decoded is not the branch instruction which set the quick loop state, or if the instruction is the one which set the quick loop state, then the Store Interlock Trigger is not set, the address of the next instruction to be decoded, i.e., the data in the IR Incrementer 153, shall be transmitted to Save IR Register 1120.

It is not believed necessary to so analyze each output signal, but briefly in FIG. 87, the R3* OG signal which outgates the odd numbered GPR 202 of the pair identified in the R3 field of the instruction, is derived from

WR AVAIL·[BXQ T·STATE 1+STATE 2·
BX DEC·(—BXQ)·(—BCTQ)]

Translated this means that if the Working Register 177 is available, the GPR 202 identified as R3* will be passed through the Gate 1032 if either the controls are in state one of a quick loop of a Branch on Index instruction, or are in state two of a Branch on Index instruction which is not in a quick loop. The —BCTQ signal herein is superfluous, but due to its normal signal level can cause no trouble since if the —BCTQ signal is present, the BX DEC signal will necessarily also be down so the output signal will be of the correct polarity.

The AOR QUICK INTRLK signal is logically $$(BCTQ\ T+STATE\ 0·BXQ\ T)·(-BRT)$$

and indicates that the AO Register 1002 is locked if the Branch Trigger 1370, FIG. 84, is not set during a Branch on Count, or State 0 of a Branch on Index instruction with the controls in a quick loop mode.

The SVIR to AOR signal transfers the Save IR Register 1120 to the AO Register 102 when recovering from a conditionally started branch in loop mode, and is logically equal to (—BRT)·(BXQT·STATE 0
+STATE 2·GP ACCEPT·BCTQT)

Note that this signal is the same as the OP REG E S2 signal. The SVIR TO IR signal is the same as the SVIR TO AOR signal, with the additional facility of being also generated by either the SVIR TO IR A or SVIR TO IR B external signals.

The BX RECOVER signal controls recovery from the processing past the branch point of a Branch on Index instruction when it is found that the wrong branch path was assumed and is BXQ T·(—BR T) so the signal is generated when the controls are in a quick loop Branch on Index state and the Branch Trigger is reset.

Referring now to FIG. 88, it will be seen that the TON R1 OG IN B, the TON SVR1 OG—BAL T and the INGATE ILC signals are all the same, but are transmitted to different areas where different functions are performed. The TON R1 OG IN B signal gates the GPR designated by the R1 instruction field into the B Bus input to Adder 168, turns on the SVR1 OG Trigger 1441 to outgate the Save R1 Register 1049, turns on the BAL Trigger 1442, FIG. 86, and gates the instruction length field from the PSW Buffer 1006 into Working Register 17. The signal is derived as

BAL DEC·STATE 2·(—BXQ T)·(—BCTQ T)

and will be present in State 2 of a Branch and Link instruction if neither of the BXQ or BCTQ Triggers 1397 and 1399, respectively are set.

The WR TO ADD A OG transfers the data in Working Register 177 over Bus 1036 to the A input 170 of Adder 168, and is generated by the OR of the two WR TO ADD A S1 or WR TO ADD A S6 signals, or by a BX signal or by a

BIA T·(—LOOP)·BCT DEC·
WR AVAIL·BCTQ·STATE 2 signal or by a (—LB LEWR LE UB)·TFMT·BC DEC·
MSCE ACCEPT·(—BC UNCON)·
(—BCTQ)·(—STATE 2)

signal. The last two signals provide for the signal in State 2 with Branch on Count quick loop set, but the loop mode not set and for the generation of the output signal when a temporary fetch has been made and accepted by MSCE in a Branch on Condition instruction. The branch address is not in the array and the instruction is not unconditional, otherwise the fetch would be to the buffers 156 in an initializing operation. This last signal is also transmitted out as the PPLN 2 F T2 signal to set a pipeline trigger for a fetch to #2 Temporary Buffer 157.

Another signal TON CBIA is generated as

STATE 2·(—BCTQ)·(BC UNCON)·
MSCE ACCEPT·BC DEC·
LB LE WR LE UB which gives a conditional quick loop setting if the conditional target is already in the buffer array. The other external signal of FIG. 88, is the R2—X TO ADD S2 which controls the gating of the GPR 202 selected by the R2 or X instruction field on Bus 161 into Adder 168. This signal is

STATE 2·(—BCTQ)·WR AVAIL·BCT DEC·
(LOOP)+BIA T [COND+(—TFMT)]

indicating generation of the generation of the signal if the Working Register during available in State 2 of a Branch on Count instruction which is not yet a quick loop, but wherein the loop mode is set or the branch target is in the array in a conditional mode, or if no temporary buffer fetch has been made.

In FIG. 89 the first external signal noted is SET OP REG E which sets the empty tag trigger for OP Register 159 to stop any further instruction decoding. It will be noted that this signal is the OR of each of the inputs of four Circuit Blocks 1476, 1477, 1478, and 1480. These inputs are (1), SLT 180 to 1 Reg 148, State 0; (2), Temporary Buffers 157 initialized; (3), SLT 180, State 1, (4), Set State 2 from State 2; (5),

BC UNCON T·STATE 3·(—BIA)·
(—TFM)·LB LE WR LE UB i.e., an unconditional branch back to an address within the array for the first loop; (6), Set State 2 from State 2, logically same as (4); (7), Temporary Register 176 to I Register 148 on a branch test; (8), the OP Register 159 empty tag is on in State 2; (9), SLT 180 to I Register 148 on Branch Test; (10),

BIA·BC UNCON T·STATE 3

(11), BC4; and (12), BX8. Signal 10 indicates that the branch is unconditional to a target address within the buffer array, and the controls are in State 3.

The T ON INIT F signal to turn on the initial fetch circuits is from the OR of BX6, BX4, BAL INIT and

STATE 3·BC UNCON·(—TFM)·
(—BIA)·(LB LE WR LE UB)

i.e., a signal from Block 1480 meaning an unconditional branch to an address not in the buffer array, and for which no temporary fetches have been made. A further group of signals control the gating of data from the Working Register 177 to the LB Register 150, the UB Register 147, the SLT Register 180, the AO Register 1002, and the I Register 148. Each signal is the OR of a number of input signals and the controlling signals can be easily identified except those from Circuit Blocks 1481, 1482, and 1484. The signal from Block 1481 is

STATE 3·BC UNCON T·LB LE WR LE UB·
(—BIA)·(—TFM)

the same as the output of Block 148, except that now the branch is to an address in the buffer registers 156. The signal from Block 1482 is the same as that of Block 1481 ANDed with WR LE IR·(—EXB) and the signal from Block 1484 is the same as that of Block 1482 ANDed with a (—LOOP) signal.

Another group of signals controls the transfer of data from the Temporary Register 176 to the LB Register 150, the UB Register 147, the SLT Register 180, the AO Register 1002, and the I Register 148. These signals will be required when the working register has been used after it generated the branch address which has been retained in Register 176. As above noted, each of these signals is likewise the OR of a number of input signals, most of which are inputs to the figure. The input from Circuit 1485 is

BC UNCON 2·STATE 3·(—BIA)·TFM i.e., the fetches have been made to the temporary buffers 157 in State 3 of an unconditional branch. The signal from Block 1486 is

BC UNCON T·STATE 3·BIA·EX B·(—LOOP)

and the output of Block 1488 is

BC UNCON T·STATE 3·BIA·(—EX B)·BACK≤8 i.e., the unconditional branch address is in the array and either the instruction is the target of an Execute instruction and loop mode is not set, or the instruction is not the target of an Execute and the target is in the array. The output of Block 1489 is simply

BC UNCON T·STATE 3·BIA indicating that the unconditional branch is back to an instruction in the array. The last external signal transfers the address from the I Register to the SLCIR 179, to enable the branch point of a loop to be located.

FIG. 90 has the outputs R3 OG S6, TON IF TRGS S6 and STEP IR. The R3 OG S6 output controls the gating of the GPR 202 selected by the R3 instruction field to the Adder 168. It is generated as the AND signal (BRT+CONDT)·BX DEC·[STATE 5
+STATE 4·(—BRT)]

from Block 1490.

The —TON BIA 1 S6 signal from Block 1490 is the OR of the (—STATE 5)+(—BR)+(—BCTDEC)·(—BXDEC)

signal from Block 1492, the input —LB LE WR LE UB and the

[(—LOOP)+(—EXB)]·[LOOP+TFM·(—CONDT)]

signal from Block 1492. The TON IF TRGS S6 is either BC14 or the output of Block 1493 which is

STATE 5·BR T·(BCT DEC
+BX DEC)·TFM·(—CONDT)·(—LOOP)

which sets the initial fetch trigger when the temporary fetches have been made in a Branch on Count or Branch on Index instruction, if the controls are not already in a Loop or Conditional mode. The STEP IR signal from the branch controls is an OR of the signal

BX14, STEP IR S2, STEP IR TST· RE AVAIL with the signal (BRT+CONDT)·GP ACCP T·(BCT DEC
+BX DEC)·(STATE 4+STATE 5
+STATE 6)·REQ GP T·(—CONDT)

which is broadly after the GP Priority has been granted in a Branch on Count or Branch on Index instruction.

FIG. 91 has the pair of signals —SLT TO AOR and SLT TO IR which are from opposite polarity outputs of their circuit blocks. Each is set to its significant voltage level by the OR of SLT TO IR S0, the SLT S1 and the SET S2 32 signals. In addition to this control, the SLT TO IR signal can be set by any one of the SLT TO IR TST, the BC4 or the S6·BIA·BIAIT·BR·GP ACCPT signals through Block 1496. The —RESET SLCX signal resets the SLCX Register 1044 when leaving a loop mode state and is generated by a Block 1497 and is logically (—RESET B S2)·(—BC2)·(—BC3)·[—BC4
+(—B·NOT X)]·[—S6+(—BIA)·(—BIA 1)
+(—BR)+(—GPACCPT)]

FIG. 92 shows a group of miscellaneous signals used in the fetching for the Temporary Buffer Registers 157. The TON+1 ADD 28 signal determines the entry of a unit into bit position 28 of the Adder 168 to be added to the address in W Register 177 to generate the second address along the branch path. The TON F —DPP3 signal turns on the fetch trigger and the D state of the 3rd stage of the pipeline. The TON F TAG T1 —SINK PP3 and TON F TAG T2 —SINK PP3 turn on the fetch tags for Temporary Buffers 176 #1 and #2, respectively, and send the sink address of the selected Temporary Buffer to the 3rd stage of the pipeline for transmittal to the MSCE. The ADD TO TEMP signal opens the gate from Adder 168 to Temporary Register 176 to enable retention of a branch address when it is necessary to utilize the W Register 177 for other functions. In FIG. 92B, the function of the R1 ADD OG and R3 OG S1 signals is to gate out the selected GPR through the gates 1030 or 1032 to the inputs of Adder 168. The ADD TO WR signal transfers the output of Adder 168 into the W Register 177 for retention. The HOT 1 RESET and GPR RESET signals are used in recovering from a conditionally started branch when it is found that the branch is not to be taken and turn off all unit inputs to the Adder 168 and all gate control triggers in the outgoing controls 1095 and 1096.

The circuits of FIG. 93 generate the control signal SV IR OG— +1 ADD 29 which has the dual function of outgating the Save IR Register 1120 to Bus 1015 for transmittal to the A Bus input to Adder 168, and also sets a trigger to actuate the hot one input to bit position 29 of the left input of Adder 168 to generate the next instruction address after that stored in the Save IR Register 1120. This address is to be stored in the PSW Buffer 1006 when the target of an Execute instruction is a Branch and Link instruction. Logically, the signal is EXB·BAL DEC·S1·WR AVAIL.

The —(R2—X TO SLCX) signal gates into the SLCX Register 1044, the part of the Bus 161 which contains the identification of the GPR 202 specified as the R2 or X register for the instruction being decoded. This data is needed for every loop mode branch. Logically, the signal is —[X TO SLCX S2+X TO SLCX S6A+X TO SLCX S6B+LOOP+BC UNCON+(—BC DEC)+(—S1·WR)].

The —(B TO SLCB) signal is similar to the preceding one but is for the designation of the GRP 202 which is specified as the base register for the loop forming branch instruction. The logical description of this signal is —[B TO SLCB S2+B TO SLCB S6 A+B TO SLCB S6B +LOOP+(—BCDEC)+(—S1 WR)+BC UNCON] which is the same as the preceding signal but for the B register instead of the X register.

The —RESET SLCB signal sets the SLC B Register 1042 to zero when the GPR designation therein is of no further value as when leaving loop mode. The signal is generated logically as —[RESET B S2+RESET B S6+X TO SLCX S6A+(—LOOP)·(—BC UNCON)·BC DEC·S1·WR].

FIGS. 94 and 95 show a number of circuits for the branch test, Branch and Link State 6, Branch on Index States 3 and 4, and Branch on Count State 4. The external signal PM TO WR gates the Program Mask portion of PSW Buffer 1006 to the Working Register 177, when the link data is to be stored in a Branch and Link instruction. The signal is derived as [R1 AVAIL·GP ACCPT·REQ GPT·STATE 6·BALT·(—CONDT)·CC VALID]. The signal TOFF R1 OG IN B turns off the Trigger in the OG controls 1095 which enables selection of a gate 1032 for the B Bus 174 input to Adder 168, and is derived exactly the same as the PM TO WR signal above.

The TON REQ GP TST signal is passed externally to test the external controls which set the REQ GP Trigger 1401, FIG. 85. The signal is logically R1 AVAIL·(—REQ GPT)·STATE 6·(—CONDT)·CC VALID·BALT).

The —INHIB SEQ BR will prevent the initial fetch sequencing for a branch operation. It is a positive signal at most times and is an effective negative signal for the conditions [STATE 0 OR 6·(—CONDT)·(—MSCE ACCPT)·(—CC VALID)].

The STOP CANCEL signal is [CONDT·MSCE ACCPT·STATE 0 OR 6·CC VALID·(C QUICK)·(—BR)+(—C QUICK)·BR] and thus holds up cancellation of conditionally issued instructions while in conditional mode, and a new branch is detected.

The CLEAN PPLN signal allows the pipeline of instructions to be cleared before further processing continues, and is logically identical to the STOP CANCEL signal above. The INHIBIT AOR holds up on the gating of new instructions to the OP Register 159, and is also the same as the two preceding signals.

The signals TON IF TGRS TST and TON INIT F TST are alternates depending upon the state of the TFM Trigger. When the other input signal (CBIA)+(—BR)+C QUICK+(—STATE 0 OR 6)+(—MSCEACCPT) +(CONDT)+(—CC VALID) to Blocks 1498 and 1499 is negative, the first signal will be sent if TFM Trigger 1327 is set and the second will be sent if the TFM Trigger 1327 is not set.

On FIG. 95, the TEMP TO ADD B OG signal transfers the data in Temporary Register 176 to the B Bus 174 into Adder 168 for generation of a subsequent address or a test of the generated address for setting a quick loop. The signal is (BCT S2 TO TST+BC1 S1 TO TST+BCT)4 S2 TO TST+BX DEC[EXBT·LOOP+(—LOOP)· (—COND)·(—BIAT)·TFM].

The test signal ADD TO WR TST gates the output of Adder 168 into the Working Register 177 and is generated in Block 1501 as (BIA T·(—LOOP)·BX DEC· STATE 3+(BCT DEC+BX DEC)·BRAT·STATE 4).

The Block 1502 generates the signal WR TO ADD B

OG which gates the W Register 177 into the B Bus input to Adder 168. It is the OR of the same signals generating the ADD TO WR TST signal above with the BC2 S1 to TST and BC1 S2 TO TST input signals.

The signals LB ADD OG, IR INCR ADD OG, +1 ADD 31 and T/C TO C all have a common input from the Blocks 1504, 1505, 1506, and 1507, all of which receive the same inputs and also have the common input BCT S2 TO TST. An input BC1 S2 TO TST is common to all except the T/C TO C signal. Thus the common signal to all is (BCT S2 TO TST+BC1 S2 TO TST+BC1 S1 TO TST+BCT4 S2 TO TST)+[BX DEC·STATE 3·EX B T+BX DEC·STATE 3·(−BIAT)·(−COND)· (−LOOP)]. Further controls on LB TO ADD OG are BC2 S1 TO TST and LB TO ADD OG S1. For IR INCR ADD OG the additional controls are BC2 S1 TO TST and IR INCR ADD S1 and for +1 ADD 31 the only additional control is BC2 S1 TO TST. The T/C TO C signal is also generated by the T/C TO C S1, the T/C TO to C S2 and the T/C TO C S6 inputs.

Another signal +1 ADD 25 is generated as +1 ADD 25 S1++1ADD25S2B++1ADD25S2A+(−LB EQ IR INCR 25)·[(−BXDEC)+(−STATE 3)+(−EXBT)]. [(−BXDEC)+(−STATE 3)+BIAT+COND+LOOP +(−TFM)], and is used with the above group of signals in generating the next instruction word address, or in determining the R3* address, or if the branch address is back less than eight double words and similar operations.

The OG B BRANCH signal gates the GPR 202 designated in a branch instruction as the base register of the branch address out to the Adder 168. It is developed as B−D TO ADD S2+(−BX DEC)·(−STATE 3)· (−BIAT)·(LOOP)·|COND+(−TFM)+LOOP·EXB].

It is believed that the foregoing description of the output signals of the branch and loop controls will be sufficient to indicate the functions performed by these controls, and the manner in which other sections of the I Box 134 are controlled. The signals used internally in these controls are identified as to their place of origin and use, and in view of the above analysis of the externally used signals, it is thought that the derivation of these internal signals can be carried out without difficulty. For the input signals not generated in the branch and loop controls, the majority are from hardware shown mainly in FIG. 58, or the FXPU 143, FIG. 6, or the FLPU 142, FIG. 5, and their generation is described in the part of the specification pertaining to those figures or other detailed parts thereof. For those few external signals not so described, their effect is fully described herein and their origin and reasons for generation will be clear from the flow charts for the instructions performed in the Instruction Unit 134.

While the invention has been particularly shown and described with reference to a preferred embodiment thereof, it will be understood by those skilled in the art that various changs in form and details may be made therein without departing from the spirit and scope of the invention.

What is claimed is:

1. In a data processing system of the class described having a main data storage unit, an instruction unit and an execution unit, said instruction unit including a plurality of devices each settable in turn from said main data storage unit in accordance with the data of a corresponding instruction of a data processing program in said storage unit to each provide a buffer for an instruction to be decoded and a decoding unit to inspect and decode each buffered instruction in turn, to transmit said instruction to said execution unit for subsequent execution, and to control said main storage unit to cause transmission of required operands to said execution unit, the improvement comprising:

means in said instruction unit to indicate that an instruction being decoded may require a departure from the normal sequence of instructions;

means responsive to said indicating means to thereupon determine the identification within said storage unit of the first instruction of the sequence to be decoded and processed if a departure from the normal sequence is required;

means connected to said decoding unit to further decode said instruction being decoded to select the conditions to be tested to determine if the further instructions to be processed are in the normal sequence or the departure sequence;

indicators of said conditions settable by said execution unit as a result of the execution of a previously decoded instruction;

at least one additional device settable in accordance with the data of any fetched instruction word;

means to interrupt the processing of instructions of the normal sequence;

and control means responsive to said decoding means and to said condition indicating means to activate said interrupt means and to then instruct the main data storage unit to transfer the identified first instruction of said departure sequence to said additional settable device for immediate use if the departure sequence is to be decoded.

2. The invention as set forth in claim 1 including:

a branch control means set by said control means to cause said instruction unit to then continue processing further instructions of said normal sequence and issuing said further instructions to said execution unit, each such issued instruction including an indication that the instruction is conditionally issued and is not to be executed;

means to cancel said indications to free said conditionally issued instruction for execution; and a testing device controlled jointly by said condition indicators and said further decoding means to determine if said indications are to be cancelled and to so control said cancelling means.

3. The invention as set out in claim 2 including:

a device to store said identification in said main data storage unit of the first instruction of said departure sequence;

an instruction register to control selection for decoding of instructions from said buffer devices; and gating control devices activated by said testing device when said indications are not to be cancelled to transfer said identification from said device to said instruction register to control further selections of instructions to be in the sequence starting from said first instruction of said departure sequence, to clear said plurality of settable buffer devices and to transfer for decoding said identified first instruction of said departure sequence from said additional settable device into the buffer device corresponding to said instruction words storage address.

4. In a data processing system of the class described having an addressable main data storage device, an instruction unit, and an execution unit, said instruction unit including a plurality of buffer registers for storing a sequence of prefetched instructions of a program to be executed, instruction fetching means to fetch into said buffer registers a sequence of instructions from said main data storage device and means for decoding instructions in the fetched sequence from said buffer registers, the combination of:

at least one additional buffer register into which any instruction may be fetched;

means settable by said decoding means to indicate that an instruction being decoded from said buffer registers is a conditional branch instruction;

an address generating means responsive to data signal from said decoding means to develop the address in said main storage device at which the first instruction of the branch sequence is stored;

a unit within said decoding means settable to indicate the machine conditions under which the program branch will be initiated;

a condition code register settable by said execution unit to indicate the machine conditions resulting from the execution of a prior instruction;

means controlled by said decoding unit and said address generating means when an instruction capable of setting said condition code register is pending, to halt instruction decoding to issue a fetch request for said first branch instruction, and to specify its return to said additional buffer register;

control means to thereafter set said instruction unit to resume issuance of instructions to said execution unit and to indicate that said instructions are issued only conditionally;

means responsive to said decoding means and controlled by said condition code register when set to validate said conditionally issued instruction if the conditions for a program branch are not met and to indicate that the fetched branch instruction word is not to be used, and additional means responsive to said decoding means and said condition code register when set, to cancel said conditionally issued instructions if the branch conditions are met and to thereupon transfer the branch instruction from the additional buffer register into the buffer register corresponding to the main storage address of the instruction for decoding as the first instruction of the branch sequence.

5. The invention as set out in claim 4 including an instruction register in said instruction unit to control the seriatim decoding of said instructions in said buffers;

further means to perfetch a subsequent instruction to a buffer register as the instruction in the buffer is decoded and transmitted to the execution unit;

gating means to transfer into said instruction register and to said further means, the storage address of the first branch instruction to enable decoding of the branch instruction and fetching of further instructions subsequent to the first branch instruction; and control means responsive to setting of said condition code register and said unit to indicate machine conditions to transfer said branch target address to said instruction register.

6. The invention as set out in claim 5 including an additional device responsive to said condition code register and to the data of the decoded branch instruction when the machine conditions determining branches are not present to validate said conditionally issued instructions and to cancel the fetched instruction from said additional buffer register.

7. A branch control device for the instruction unit of a data processing system of the type having an addressable data storage unit, an execution unit and an instruction unit to decode instructions of a program, said instruction unit including a plurality of buffer registers for storing a sequence of prefetched instruction words of a program, an instruction decoding unit to decode said prefetched sequence of instruction words seriatim and to transmit the decoded instructions to said execution unit for execution, an instruction register to indicate the instruction within the buffer registers which is being decoded and means to prefetch new instructions to the buffer registers as the older prefetched ones are decoded, the combination of:

means within said decoding unit to detect an instruction which may require a branch from the normal sequence of instructions and to decode from the instruction the conditions under which the branch shall be taken;

a branch address generator controlled by data signals from address fields in the branch instruction to determine the address in said storage unit of the first instruction of the branch;

means controlled by said decoding unit means to call for a fetch of said first branch instruction from the generated storage address;

a temporary buffer register additional to said buffer registers and into which said first branch instruction is buffered;

control means settable by said decoding means to enable a resumption of decoding of the prefetched instructions of the normal sequence;

a group of condition code devices individually and combinationally settable by said execution unit;

circuits within said control means to cause instructions decoded after the branch instruction to be issued with a notice of conditional issuance; and branch control circuits responsive to the setting of the condition code devices and to the decoded branch conditions to validate said conditionally issued instructions and to cancel said prefetched branch instruction if the branching conditions are not met or to cancel said conditionally issued instructions and to start instruction processing with the first branch instruction in said temporary buffer register if the branch conditions are met and the branch is to be taken.

8. In a program branch control unit for the instruction unit of a data processing system of the type also having an addressable data storage device, and an instruction execution unit, said instruction unit including a plurality of instruction buffer registers, means to prefetch instructions seriatim into said buffers from said storage device, means to outgate instructions in sequence from said buffers and an instruction decoding means to receive said outgated instructions and to at least partially decode instructions for data fetching purposes, the combination of:

means in said decoding means to detect an instruction which may require a branching from the normal sequence of instruction decoding and to decode from the instruction the conditions under which the branching will be made;

a device to determine from the branch instruction, the address within said data storage device of the first instruction of said branch;

control means to enable said prefetching means to fetch at least said first branch instruction;

at least one additional buffer register to receive said prefetched branch instructions; and control means for said instruction decoding means and responsive to both said condition decoding means and to actual conditions within said data processing system to control outgating of instructions from either said buffer registers or said additional buffer register to said instruction decoding means.

9. The invention as set out in claim 8 including:

means responsive to said control means to enable resumption of issuance of decoded instructions along the normal sequential path as soon as the fetch request for said first branch instruction has been generated;

a circuit to tag such issued instructions as conditionally issued and therefore not to be executed; and a condition responsive circuit to cancel or validate said conditionally issued instructions.

10. The invention as set out in claim 9 including:

a next instruction fetch address device within said means to prefetch instructions;

means to transfer to said fetch address device the address of the first branch instruction to start instruction fetching of the branch instructions; and means controlled by said condition responsive circuit to so transfer said branch address when it is determined that the branch instructions are to be executed.

11. The invention as set forth in claim 10 including within said control means for said instruction decoding means, gating means controlled by said condition responsive circuit to cancel all prefetched instructions in said buffer registers and to transfer the prefetched branch instructions in said additional buffer register or registers into both said cleared buffer registers and at least the first branch instruction into said decoding means.

12. In a data processing system of the class described having an addressable instruction storage device, an instruction execution device and an instruction decoding unit, said instruction decoding unit having a plurality of buffer storage registers, an instruction fetching mechanism to call for instructions sequentially from said storage device, means to store received instructions sequentially in said buffer storage registers and instruction decoding means to at least partially decode said instructions in sequence, the combination of:

two additional buffer storage registers;

means in said instruction decoding means to detect an instruction which may cause a branching in said sequence of instructions and the conditions under which said branch is to be made;

a branch instruction address generating means responsive to signals representing the data of said instruction being decoded and to the instruction decoding means to generate the address of the first branch instruction;

a control over said instruction fetching mechanism settable by said instruction decoding means when a conditional branch instruction is detected to interrupt the fetching of sequential instructions, to set said fetching means to fetch the two instructions at the branch address in said address generating means and at the next sequential branch address, and to buffer said instructions when returned in said two additional buffer registers;

means thereupon set to enable resumption of instruction decoding of the instructions remaining in said buffer registers and to tag said instructions as conditionally issued; and a branch determining means to cancel the conditional tags of any issued instructions, to resume the sequential instruction fetching and issuing, and to cancel any instructions in said two additional buffer registers as soon as the branch determining means finds that the branch determining conditions are not met or to cancel said conditionally issued instructions, to transfer the address of the branch instruction to be next fetced to said instruction fetcing mechanism and to transfer said branch instructions from said two additional buffer storage registers into said plurality of buffer storage registers as soon as it determines that the branching conditions are met.

References Cited

UNITED STATES PATENTS

| | | | |
|---|---|---|---|
| 3,325,788 | 6/1967 | Hackl | 340—172.5 |
| 3,292,155 | 12/1966 | Neilson | 340—172.5 |
| 3,268,872 | 8/1966 | Kimlinger | 340—172.5 |
| 3,234,519 | 2/1966 | Scholten | 340—172.5 |
| 3,201,760 | 8/1965 | Schrimpf | 340—172.5 |

PAUL J. HENON, *Primary Examiner.*

GARETH D. SHAW, *Assistant Examiner.*